United States Patent [19]

Burt

[11] Patent Number: 4,595,982

[45] Date of Patent: Jun. 17, 1986

[54] EXPERT SYSTEM AND METHOD FOR MAKING DECISIONS IN ACCORDANCE WITH THE DECISIONS OF A MENTOR

[76] Inventor: Frank N. Burt, 2178 Coach Way, Bloomfield Hills, Mich. 48013

[21] Appl. No.: 529,081

[22] Filed: Sep. 2, 1983

[51] Int. Cl.$^4$ .............................................. G06F 9/00
[52] U.S. Cl. ................................................... 364/300
[58] Field of Search ... 364/200 MS File, 900 MS File, 364/300, 513

[56] References Cited

U.S. PATENT DOCUMENTS 3,601,811 8/1971 Yoshino ............................. 364/900
3,794,982 2/1974 McCormick et al. ............... 364/900
4,130,881 12/1978 Haessler et al. ...................... 364/900

OTHER PUBLICATIONS

Wiener et al., "Computerized Medical Decisions in Evaluating the Diabetes Patient," *Comput. Biol. Med.*, vol. 12, No. 3, 1982, pp. 241–251.

Stefik et al., "The Organization of Expert Systems, A Tutorial," *Artif. Intell.*, vol. 18, No. 2, 1982, pp. 135–173.

Michalski et al., "Knowledge Acquisition by Encoding Expert Rules Versus Computer Induction from Examples: A Case Study Involving Soybean Pathology," *Int. J. Man–Machine Studies*, vol. 12, 1980, pp. 63–87.

Addis, T. R., "Knowledge Refining for a Diagnostic Aid (An Example of Applied Epistemics," *Int. J. Man–Machine Studies*, vol. 17, 1982, pp. 151–164.

Primary Examiner—Raulfe B. Zache
Attorney, Agent, or Firm—Ratner & Prestia

[57] ABSTRACT

This invention relates to an expert system and method for decision making using computer generated paramorphic models of an expert's decisional process.

14 Claims, 1 Drawing Figure

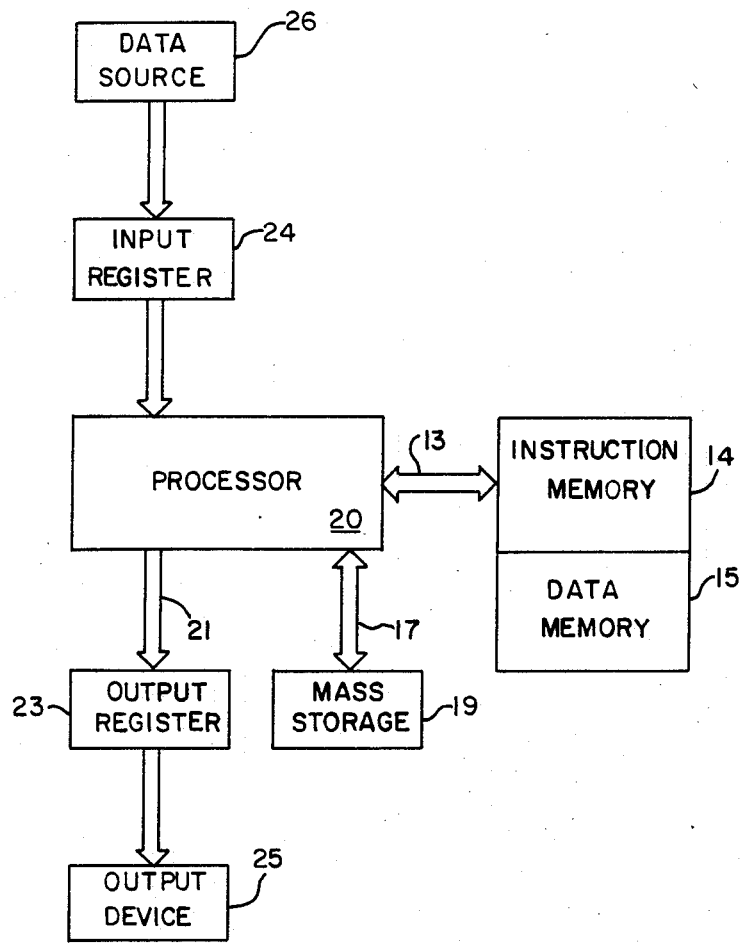

EXPERT SYSTEM AND METHOD FOR MAKING DECISIONS IN ACCORDANCE WITH THE DECISIONS OF A MENTOR

BACKGROUND OF THE INVENTION

A. Field of the Invention

This invention relates to expert systems and methods for decision making using computer-generated models of human decisional processes.

B. Background Art

Many systems have been proposed for use as "expert systems". Among there are Internist by Miller, Pople and Myers; Aesculapius by Shafer, Shafer, Foxlee, and Prost; and AQ11 by Michalski and Larson. These systems are "data driven", that is, they store and make decisions on the basis of values of individual data points. Analysis of these values allows the computer to apply explicitly programmed rules for decision making. In such programs, the relative importance of the various data points, termed weighting, is arrived at by statistical analysis of the data itself or by the application of probabilistic estimates supplied from human sources. None of these systems has the ability to: "learn" by watching the process of an expert decision-maker; function in more than one problem sphere without extensive reprogramming; emulate the decision-making processes of its teachers; or measure the logical significance of the information it learns to use in dealing with a specific problem.

SUMMARY OF THE INVENTION

The present invention involves a computer-based system and method for making decisions within the sphere of a specific problem. An expert mentor provides descriptions of the specific information he uses (data) to make judgments within the sphere of the problem. The expert then makes representative decisions on the computer terminal, characterizing situations in terms of their data values. From this interaction, the cmputer system of this invention is able to generate an internal representation of the logical processes of the expert and to characterize each situation in terms of a series of intermediate judgments. As a result of structuring, the system of this invention can determine the relative logical importance of each of the data points and to classify each as being of major or minor significance. The system is able to compare the intermediate judgments characterizing any new situation with the stored set of intermediate judgments (the "judgment base") representing its view of the logical sphere of the problem. The logical significance of the new situation can be defined in terms of the major and minor logical differences from the reference situations so stored.

BRIEF DESCRIPTION OF THE DRAWINGS

The drawing is a block diagram of system components in the decision-making system.

DETAILED DESCRIPTION OF THE INVENTION

Referring to the drawing, there is shown a block diagram of a decision-making system 100 which includes a processor or CPU 20 of the general purpose type which includes the ability to decode and execute instructions. CPU 20 communicates over bus 13 with memory 14 containing instructions from the program (called the "PARADOCS" program) which controls the operation of system 10. CPU 20 is also in communication over bus 13 with data memory 15 which is used during execution of the instructions stored in memory 14. Processor 20 is also in two-way communication over bus 17 with mass storage device 19 which is used for on-line information storage during program execution and at other times for non-volatile storage.

Processor 20 receives input via bus 22 from input register 24 which receives data from a suitable data input source such as a keyboard, magnetic tape reader, or card reader. CPU 20 also transmits output via bus 21 to output register 23 and thence to a suitable data output device 25 which may be a cathode ray tube, printer, or modem.

In general, the PARADOCS program creates a paramorphic model of an expert's decision-making processes by construction of a judgment base. The judgment base contains information about the logical relationships among intermediate judgments used by the expert in his treatment of the problem area. The program is further able to display to users the logical relationships sotred in the judgment base.

The PARADOCS program functions within a problem area which is defined by an expert. This expert must act as a mentor to "train" the program in the particular problem area by first giving definition to the data used in representing the problem. This is done by having the mentor list specific pieces of data needed for description of the problem area and providing parameters for each piece of data. These parameters include: (1) the name of the piece of data; (2) the units of measurement for the piece of data; (3) a range of values which has some logical significance for the piece of data; and (4) an indication as to whether entry of the data is always necessary in order to make a decision.

Data may be either scalar or dichotomous, that is, it may have a numeric value or it may be binary. If data is binary it would be either "YES" or "NO". If data is not binary, it is assumed to be scalar and the user will be asked to present a logical range associated with that piece of data. The logical range may be either a normal range, or a significant abnormal range. The mentor will then answer the question "Is this data required—Yes or No?"

The mentor is given the opportunity to define as many pieces of data as he feels are necessary to adequately deal with the problem area. The mentor then defines a reference state by entering a value for each piece of data in the problem area. Finally, the mentor enters an interpretation of what that reference state represents in terms of his professional experience.

The PARADOCS program then generates a "judgment base" against which it will evaluate all future data entered. It generates this judgment base by arriving at an "intermediate judgment" about each of the entered data points. This intermediate judgment is simply the logical relationship between the entered data and the range limits for that data point. That is, whether the data is: (1) Within range; (2) Above range; (3) Below range; (4) Entered without intermediate judgement; (5) Not Entered; (6) Deleted; (7) "No"; (8) "Yes". The judgment base changes dynamically as the PARADOCS program is shown more situations and integrates this experience into the judgment base. The judgement base also contains information about the relative logical significance of each piece of data. PARADOCS analyzes the effect of a change in a given piece of data on the conclusion state generated. It then assigns lesser relative weights to those which have a lesser effect on the totality of the conclusion states. The program then groups these data points and assigns "major" and "minor" classification to the data points.

In adding experiences to the judgment base, PARADOCS accepts only those situations which are logically distinct from all previously encountered situations. The judgment base is, therefore, a logically consistent body of information.

In use, a situation is presented simply by identifying the problem and entering the data representative of that example. The PARADOCS program then executes a series of procedures in order to analyze the significance of the presented situation and report that significance to its user.

PARADOCS examines the judgment base and attempts to determine if the judgment base contains an experience which is logically identical to the one being presented. If a logically identical experience exists in the judgment base, PARADOCS reports the interpretation of that experience as previously given to it by the mentor.

Failing in its attempt to find a logically identical situation in the judgment base, PARADOCS again examines the judgment base in an attempt to locate any experiences which are logically identical to the presented situation only with regard to the data points which are of "major" logical signficance. If such experiences are located, PARADOCS reports the interpretation of those experiences along with the minor differences between the presented situation and the stored experience.

The third level of action is similar to the previous one and is used by the program only if no major identical situations are located. It attempts to locate experiences in the judgment base for which major data points match the presented situation to a specified degree. The program then reports the interpretation along with any major and minor differences between the presented situation and the stored experience.

The differences reported by the program can be used by the expert to modify his or here definition of the problem area and thereby refine the expertise of the PARADOCS model. This refinement of the program can take one of several forms: adding more data points to the problem area, deletion of a data point, reinstatement of a previously deleted data point, or "linking" into a new problem area. In any case, the program's performance is paramorphic; it behaves as the expert behaves in his refinement of the problem area.

In the event that the judgment base contains no experiences which are similar to the presented situation, PARADOCS reports this fact and requests that its mentor enter his or her interpretation of the presented situation. This interpretation is stored and the situation is integrated into the judgment base for future reference.

By continually expanding and recalculating the judgment base, the PARADOCS program can become independent of its mentor and operate to provide the benefit of "expertise" beyond even the direct experiences of its mentor to users other than its original mentor.

The PARADOCS program is also able to report to its users the internal structure of its judgment bases. This report is able to display the system's conclusion states and their definitions with regard to the logical interrelationships of the data to the reference state. In addition, the conclusion states which are logically most similar are grouped togheter.

The program is further able to display the logic of its mentor in a tree-structure and thus communicate the underlying processes of the expert's decisional processes.

DESCRIPTION OF THE PROGRAM

The PARADOCS program is composed of a series of interdependent program modules which perform the functions outline above. These modules are the PROBLEM module, the ANALYSIS module, the REPORT module, the EXAMPLE module, the LISTING Module, the USERFILE module, the TREEPRNT module and the LINKPROB module. Although the modules contained in the appendix are coded in Pascal, it will be understood by one skilled in the art of computer software that any suitable language may be used to implement the functions of the PARADOCS program.

The program modules all create and maintain a series of data files on a mass storage medium of the following structures:

PROBLEM-FILE
RECORD 000:
  Problem-code
  Description
  Total Number of Questions
  Number Required—Major
  Number Not Required—Major
  Number Required—Minor
  Number Not Required—Minor
  Number of Times Used
  Topic Code
  Data First Entered
  Date Last Used
  Mentor Code
  Number of Situations
  Minimum Logical Importance for Major Data
  Calculate Logical Importance Flag
  Primary Problem Code
RECORDS 001-999:
  Question Number
  Question Description
  Yes/No Question
  Calculated Question Flag
  Unit Description
  Lower Limit
  Upper Limit
  Required?
  Logical Importance
  Experiential Importance
  Logical Interaction
  Experiential Interaction
  Logical Completeness
  Experiential Copleteness
  Status Code (Active, Deleted, Reinstated)
SITUATION-FILE
  Situation Number
  Short Situation Description
  Next Situation Record Number
  Problem Link Codes:
    1
    2
    3
    4
  Author Code
  Date First Entered
  Date Last Used Number of Times Encountered
  Interpretation String
DESCRIPTION-FILE
  Next Record Number
  Situation Number
  Text
USER-FILE
  User Code
  User Name
  User Title
  Address Line:
    1
    2
    3
  Phone Number
  Maximum Status Code (Mentor, Teacher, User)
  Printer?
  Number of Problems Accessed
  Data Put On System
  Date Last Used System
  Total Number of Times Used
USER-PROBLEM-FILE
  Next Record Number
  User Code
  Problem Code
  Status Code (Mentor, Teacher, User)
  Number of Times Used
DATA-BASE RESPONSE FILE
Record 000:
  Primary Key
    Problem Code
    Date of Entry
    Sequence Number
    Record Number
  1st Secondary Key
    Problem Code
  2nd Secondary Key
    Problem Code
    Situation Number
  3rd Secondary Key
    User Code
  4th Secondary Key
    Example ID
  Additional Data
    Example Name
    Next Sequence Number
Record 01-N:
  Primary Key
    Problem Code
    Data of Entry
    Sequence Number
    Record Number
  1st Secondary Key
    All Spaces
  2nd Secondary Key
    All spaces
    Zero
  3rd Secondary Key
    All Spaces
  4th Secondary Key
    All Spaces
  Additional Data
    First Response
    Second Response
    Third Response
    Fourth Response The PROBLEM module is the mentor's method of access to the judgment base. The module first accepts a problem file code from the input device and determines whether that file exists. If the file does not exist, a name for the file is requested and the file is created. The new file will then be filled by entry of the data described above. Alternatively, an existing problem file may be altered in a similar manner. When all data has been entered, the program reevaluates the information about the problem stored in the PROBLEM-FILE at RECORD 000 and re-stores this information. The PROBLEM module then terminates.

The ANALYSIS module generates a situation table, an experience table and a computation table based on the history of the program's experience to data. The module calculates the logical importance (decimal fraction representing the ratio of defined situations which would be undistinguishable if the data point were deleted to the total number of situations), the experiential importance (decimal fraction representing the number of past experiences whose situations would no longer be distinguishable if that data point were deleted to the total number of past experiences for that situation), the logical completeness, the experiential completeness, the realization ratio, the number of possible situations, the number of situations until the model reaches the ability to discriminate, and the number of situations until the model reaches independence of the mentor, for each data point. Further, the PROBLEM-FILE is updated at RECORD 000 and the analysis is displayed to either the system console device or printer.

The EXAMPLE module is the mentors's, users' and teachers' access to the PARADOCS program. For the purpose of entering data descriptive of examples or of new situations, the module is used to obtain an interpretation of a presented situation. The module opens the correct files and accepts or calculates its own answers to each of the questions which define the problem of interest. The system makes intermediate judgments which are coded into an internal representation by formulation of situation strings which are then compared to the SITUATION-FILE as corrected for deletion of reactivation of questions to arrive at a conclusion. The system will also permit linkages to separate problems if required and will transfer all responses stored to data into a separate new judgment base.

The REPORT module generates a REPORT-FILE to the mass storage devices or other output device. The REPORT-FILE contains all information derived from the PARADOCS program in its analysis of a problem. The module generates a summary which includes a summary of the problem, and a description of each situation presented in terms of its differences from a common reference situation and from oher logically similar situations.

The LISTING module simply generates a data entry form on the printer for a given problem in case an on-line terminal is unavailable. The questions and allowed answers are taken from the problem stored and formatted into a questionaire.

The USERFILE module allows access to the program's user records. These records control access to the program and define an individual as a mentor, teacher, or user for a given problem. It is this definition which controls the level of interaction allowed for a given operator during collection of data and construction of the paramorphic model.

The TREEPRNT module prints a "decision tree" from the experience of a PARADOCS problem model. This tree is a two dimensional representation of the problem space which graphically demonstrates the logical processes underlying the mentor's expertise.

Lastly, the LINKPROB module allows the definition of a special type of problem which is "linked" to another in a hierarchical manner. A primary problem interpretation may contain a link to one or more secondary problems. Thus, if the primary conclusion is reached, the linked problem may be invoked to further refine the judgment process. Up to 4 levels of linkages are allowed from any conclusion state.

Further information which, when taken with the drawing and claims, will enable those skilled in the art to make and practice the present invention is included herewith as Appendix A and Appendix B.

Appendix A is entitled "PARADOCS Technical Specifications Manual".

Appendix B comprises the source code listing in the Pascal language of the PARADOCS program in accordance with the present invention. Also included in Appendix B are flowcharts of the procedures used in the program.

While the invention has been shown and described with reference to a specific set of computer instructions, i.e. Pascal, it will be understood that the spirit of this invention can be implemented in other computer languages and can be modified without avoiding the scope of the invention claimed herein.

APPENDIX A

```
****************************************************
*                                                  *
*          s y n t e l l i g e n c e               *
*                                                  *
*               P A R A D O C S                    *
*                                                  *
*          TECHNICAL SPECIFICATIONS MANUAL         *
*                                                  *
****************************************************
```

PARADOCS SPECIFICATIONS

TABLE OF CONTENTS

| ROUTINE | DESCRIPTION | COL. NO. |
| --- | --- | --- |
|  | Definition of Terms | 9 |
|  | File Layouts | 9 |
| PROBLEM | Problem File Maintenance | 15 |
| EXAMPLE | Capturing and Interpreting an Example | 23 |
| ANALYSIS | Reporting Descriptive Parameters for a Problem | 31 |
| REPORT | Printing a Report for a Problem | 39 |
| LISTING | Printing a Listing for a Problem (Questionaire) | 45 |
| USERFILE | User File Maintenance | 47 |
| TREEPRNT | Decision Tree Printing Routine | 49 |
| LINKPROB | Linked Secondary Problem File Maintenacne | 55 |
| SUPER | "Super" PARADOCS Generation Routine |  |
|  | Development Utilities | 69 |
|  | Implementation on the TI Professional Computer | 69 |

DEFINITION OF TERMS

PROBLEM: Specific sphere of information in which decisions are to be made

EXAMPLE: Collection of data values (e.g., a patient)

DATA POINT: A question, the answer to which can be evaluated by the system to produce either an INTEGER VALUE or an INTERMEDIATE DECISION in the form of one of thirteen possible conditions:

1. Below both ranges
2. Below primary range only
3. Within both ranges
4. Above primary range only
5. Above both ranges
6. Below range
7. Within range
8. Above range
9. Entered, no judgement
10. Not entered
11. Absent (or "NO")
12. Present (or "YES")
13. Deleted (not considered)

NOMINAL DICHOTOMOUS QUESTION: A data point whose answer is "YES/NO" and whose intermediate decision code is a value of 10 - 13 inclusive as shown above SCALAR QUESTION: A data point whose answer may be expressed either as an integer (-32765 to +32767) with no intermediate decision code, or as a real number (-99999.99 to +99999.99) whose intermediate decision code is a value of 1 to 10 inclusive or is a value of 13 as shown above SITUATION: A conclusion state which is logically unique based on the sum of all intermediate decision points MAJOR vs. MINOR DATA: Initially determined as whether a data point is required, but as PARADOCS gains information, the system will make this determination automatically in terms of each point's "importance"

LOGICAL IMPORTANCE (LI): A value (0 to 100) calculated from the ratio of the defined situations which are no longer uniquely distinguishable if that data point is deleted, to the total number of situations EXPERIENTIAL IMPORTANCE (EI): A value (0 to 100) calculated from the ratio of the number of encounters (e.g., patients) whose situations are no longer uniquely distinguishable if that data point is deleted, to the total number of encounters for that problem INTERPRETATION: The written description of the conclusion state for each unique situation encountered to date (which may, in turn, call up one or more other problems for entry of additional data points)

EXPERT: Someone who consistently makes useful (internally consistent) decisions within a given problem MENTOR: The primary teacher (who defines data points, ranges & interpretations)

TEACHER: Any user who is allowed by the mentor to add interpretations of new situations to a problem USER: Anyone who uses the system but does not add data points or interpretations PROBLEM_FILE Layout (a RELATIVE file whose name is the Problem Code)

```
                                                          * user entered
    RECORD 000:
                                    --
        Problem Code                PROBLEM_CODE        8 A  *
        Description                 DESCRIPTION         30 A *
        Next Question Number        NEXT_QUESTION       INT
        Number of Integer Questions INT_QUESTIONS       INT
        # Times Used                TIMES_USED          INT
        Future Use                  TOPIC_CODE          8 A
        Date First Entered          DATE_ENTERED        8 A
        Date Last Used              DATE_LAST_USED      8 A
        Mentor Code                 MENTOR_CODE         6 A  *
        # of Situations             NUM_SITUATIONS      INT
        Minimum LI for Major Data   MINIMUM_LI          INT
        Calculate LI value?         CALC_LI_FLAG        Y/N
        Future Use                  FLAG1_FUTURE        1 A
        Future Use                  FLAG2_FUTURE        1 A
        Future Use                  FLAG3_FUTURE        1 A
        Update Data Base?           DATA_BASE           Y/N
        Primary Problem Code        PRIMARY_CODE        8 A
```

SITUATION_FILE layout (a RELATIVE file whose name is the Problem Code)

```
                                                                    * user entered
RECORDS 001 - 999:

Question Number              NUM_QUESTION         2 N
        Question Description         DESC_QUESTION        30 A   *
        Yes / No Question ?          YES_NO               Y/N    *
        Calculated Question ?        CALCULATE            Y/N    *
        Integer Question ?           INT_QUEST            Y/N    *
        Reference Question ?         REFERENCE            Y/N    *
        Unit Description             UNIT_DESC            10 A   *
        Number of Boundaries         BOUNDARIES           INT
        Primary Lower Boundary       LOWER_1_LIMIT        REAL   *
        Primary Upper Boundary       UPPER_1_LIMIT        REAL   *
        Secondary Lower Boundary     LOWER_2_LIMIT        REAL   *
        Secondary Upper Boundary     UPPER_2_LIMIT        REAL   *
        Required ?                   REQUIRED             Y/N    *
        Logical Importance           LGCL_IMPT            INT
        Experiential Importance      EXPR_IMPT            INT
        Logical Interaction          LGCL_INTR            INT
        Experiential Interaction     EXPR_INTR            INT
        Logical Completeness         LGCL_CMPL            INT
        Experiential Completeness    EXPR_CMPL            INT
        Status Code (A,D,R)          STATUS_CODE          1 A
            Active
            Deleted
            Reinstated
        Sort Flag                    SORT_FLAG            1 A
        Future Use                   FLAG6_FUTURE         1 A
        Future Use                   FLAG7_FUTURE         1 A
        Future Use                   FLAG8_FUTURE         1 A
        Situation Number             SIT_NUM              4 N
        Short Situation Description  SIT_DESCRIPTION      80 A   *
        Next Situation Record No.    NEXT_SIT             INT
        Problem Link Codes           PROB1_LINK           8 A    *
                                     PROB2_LINK           8 A    *
                                     PROB3_LINK           8 A    *
                                     PROB4_LINK           8 A    *
        Author Code                  AUTHOR_CODE          6 A    *
        Date First Entered           DATE_ENTERED         8 A
        Date Last Used               DATE_LAST_USED       8 A
        # Times Encountered          NUM_ENCOUNTERS       INT
        Interpretation String        SINC_STRING          50 INT
        Future Use                   FLAG1_FUTURE         1 A
        Future Use                   FLAG2_FUTURE         1 A
        Future Use                   FLAG3_FUTURE         1 A
        Future Use                   FLAG4_FUTURE         1 A DESCRIPTION_FILE layout (a RELATIVE file whose name is the Problem Code)

Next Recoord Number          NEXT_RECORD          3 N
        Situation Number             SIT_NUMBER           3 N
        Text                         TEXT                 80 A   *

COMPUTATION_FILE layout (a RELATIVE file whose name is the Problem Code; this
                file stores the formula for any computation question)

Question Number              RCD_NUMBER           2 A
        Computation Formula          FORMULA              80 A   *

SUPER_MENTOR_FILE layout (a RELATIVE file whose name is the Problem Code; this
                file contains the mentor code and question numbers
                he/she contributed to a SUPER-PARADOCS program)

Next Record to be Written    NEXT_RCD             INT
        Mentor Code                  MENTOR               6 A
        Question Numbers Contributed QUESTIONS            50 INT
```

USER_FILE  layout  (a RELATIVE file initially and later a KIF file
                                         whose primary key is the User Code)

```
                                                              * user entered Next Record / Record Number   NEXT_RECORD      4 N
         User Code                     USER_CODE        6 A  *
         User Name                     USER-NAME        30 A *
         User Title                    USER_TITLE       30 A *
         Address Line 1                ADDRESS1         30 A *
         Address Line 2                ADDRESS2         30 A *
         Address Line 3                ADDRESS3         30 A *
         Phone Number                  PHONE            12 N *
         Maximum Status Code           MAX_STATUS       1 A
             Mentor
             Teacher
             User
         Printer ?                     PRINTER?         Y/N
         # of Problems Accessed        NUM_PROBLEMS     4 N
         Date Initially Put on System  DATE_ENTERED     8 A
         Date Last Used System         DATE_LAST_USED   8 A
         Total # Times Used            TOTAL_TIMES      6 N
```

USER_PROBLEM_FILE  layout  (a RELATIVE file initially and later a KIF file
                                         whose key is the User Code / Problem Code)

```
         Next Record / Record Number   NEXT_RECORD      4 N
         User Code                     USER_CODE        6 A
         Problem Code                  PROBLEM_CODE     8 A
         Status Code                   STATUS           1 A
             Mentor
             Teacher
             User
         # Times Used                  TIMES_USED       4 N
```

RESPONSE Layout (a KIF file used on larger systems to maintain a data base
               of all responses entered for all problems by all users)

```
   RECORD 00:

PRIMARY KEY:
         Problem Code                  PROBLEM_CODE     8 A
         Date of Entry                 ENTRY_DATE       8 A
         Sequence Number (1-9999)      SEQUENCE         INT
         Record Number (constant "00") RCD_NUMBER       INT 1st SECONDARY KEY:
         Problem Code                  SECOND_CODE      8 A 2nd SECONDARY KEY:
         Problem Code                  THIRD_CODE       8 A
         Situation Number              SIT_NUMBER       INT 3rd SECONDARY KEY:
         User Code                     USER_CODE        6 A 4th SECONDARY KEY:
         Example ID                    ID_EXAMPLE       15 A ADDITIONAL DATA:
         Example Name                  EXAMPLE_NAME     30 A
         Next Sequence Number          NEXT_SEQ         10 N
```

RECORDS 01 - 25:

PRIMARY KEY:
```
    Problem Code                  DTL_PROBLEM        8 A
    Date of Entry                 DTL_ENTRY          8 A
    Sequence Number (1-9999)      DTL_SEQ            INT
    Record Number ("01" to "25")  DTL_RCD            INT
```

1st SECONDARY KEY:
```
    All Spaces                    FILLER1            8 A
```

2nd SECONDARY KEY:
```
    All Spaces                    FILLER2            8 A
    Zero                          FILLER3            INT
```

3rd SECONDARY KEY:
```
    All Spaces                    FILLER4            6 A
```

4th SECONDARY KEY:
```
    All Spaces                    FILLER5           15 A
```

ADDITIONAL DATA:
```
    First Response                RESP1             10 A
    Second Response               RESP2             10 A
    Third Response                RESP3             10 A
    Fourth Response               RESP4             10 A
```

```
                              PROBLEM PROGRAM
                               FIRST SCREEN
           1         2         3         4         5         6         7         8
  12345678901234567890123456789012345678901234567890123456789012345678901234567890
01          P A R A D O C S    D E V E L O P M E N T    S Y S T E M
02              **** PROBLEM    MAINTENANCE ****
03   YOUR USER CODE:     [     ]          XXXXXXXXXXXXXXXXXXXXXXXXXXXXX
03   YOUR USER CODE:     [     ]          This user code is not valid
03   YOUR USER CODE:     [     ]          Sorry, you are not a mentor
04   PROBLEM CODE:       [     ]                          NEW ?    [ ]
04   PROBLEM CODE:       [XXXXXXXX]       Sorry, you are not the problem's mentor
05
06   PROBLEM NAME:   [                                 ]  UPDATE DATABASE ? [ ]
07
08      DO YOU WISH TO DELETE OR REINSTATE A QUESTION ?   [ ]     DELETE ? [ ]
09
10       QUESTION NUMBER:      [ ]       List "00" when completed
11       DESCRIPTION:      [                                  ]
12       YES / NO QUESTION ? [ ]         CALCULATED QUESTION ?      [ ]
13       FOR REFERENCE ONLY ? [ ]        INTEGER VALUE ?            [ ]
14       UNIT DESCRIPTION:   [         ]
15         LOWER INT. LIMIT: [         ]   UPPER INT. LIMIT:  [          ]
15         1ST LOWER BOUNDARY:[        ]   1ST UPPER BOUNDARY:[          ]
16         2ND LOWER BOUNDARY:[        ]   2ND UPPER BOUNDARY:[          ]
17       REQUIRED ?          [ ]           STATUS :  xxxxxxxx
18       PLEASE ENTER CALCULATION FORMULA (SEE OPERATING INSTURCTIONS):
19         ENTER CONSTANT, QUESTION NO. ("#nn"), OR PREVIOUS ("P"): [       ]
20         NUMBER OF PREVIOUS TIME PERIODS TO BE READ FROM DATA-BASE:  [  ]
20         OPERATION CHARACTER: [ ]     + add,  - subtract,  * multiply,  / divide,
21         E exponent,  R square root,  C change sign,  A absolute value,  S store
22                    ANY MORE ENTRIES ? [ ]   FORMULA TOO LARGE
23    REPRESENTATION OF THE FORMULA (MAXIMUM 80 CHARACTERS):
 #1,S;#2,-;#3,/;#4,E;2,S;#5,*;#6,S;2,E;P,/;#7,E;P,/;
24         ARE YOU SURE YOU WISH TO DELETE THIS QUESTION ?    [ ]
24         ARE YOU SURE YOU WISH TO REINSTATE THIS QUESTION ? [ ]
24               THIS QUESTION IS DELETED
24               THIS QUESTION IS NOT DELETED
  12345678901234567890123456789012345678901234567890123456789012345678901234567890
           1         2         3         4         5         6         7         8
```

The PROBLEM routine allows only a mentor to add or change any problem code on the system. The program establishes a file in the problem (PROB), situation (SIT) and description (DESC) directories under the name of the problem code (up to 8 characters - cannot start with a number nor can any "special" characters be included). Questions may also be deleted or reinstated. Problems may be changed only by the mentor who created them.

When a new problem is added to the system, the program enforces some sort of
problem name and at least one question. Each question is given a description
and identified as either a yes/no or numeric. If the latter, a "unit descrip-
tion" is accepted (which describes the type of numeric entry) and up to two sets
of "boundaries" to describe the reference state may be entered. These limits
can only be entered in pairs, the upper must be greater than or equal to the
lower and the secondary boundaries, if entered, cannot be within the primary
boundaries; all boundaries may be +/- 999999.99. A numeric question may also be
designated "for reference only" which causes it to be ignored during interpreta-
tions. The system initially establishes a logical importance of "50" for re-
quired questions and "00" for questions not required. All questions are estab-
lished with a status code of "A" (active) and a minimum LI value (to distinguish
major from minor data points) of "25".

If a question is not a yes/no type, the system will ask whether it is a calcula-
ted question; a positive response will mean that the system will not accept a
response in the EXAMPLE program, but will calculate the response based on a
formula as established in this pr_____ After the upper and lower limits (if
any) are entered by the operator, _____ em will accept a "REQUIRED?" entry
(used only for "major" determination) and accept up to 80 characters as the
calcualation formula. This consists of 1 to N sets in the following format:

A. One of the following:

1. A real number, including optional decimal point (2 places to right of
           decimal maximum) and/or a minus sign to left of the number; OR 2. A valid question number (in the form "#nn") which is a numeric question
           with a smaller question number than the one being entered and indicates
           to the calculation routine to retrieve the entered response for that
           question ("no entry" causes a "no entry" to be returned); OR 3. A "P" to indicate the previous result; OR 4. A valid question number in the form "@nn" which will return the
           response value of that question at a previous record in the data-base
           (this capability is only allowed on larger systems)

B. A comma

C. One of the following:

1. A valid operation character as follows:
           + is addition            E is exponent           S is store entry
           - is subtraction        R is square root
           / is division            C is change sign
           * is multiplication     A is absolute value ; OR 2. A positive integer value used with "@nn" indicating the number of "time
           periods" (or sequence numbers) prior to the current data-base seq. no.

D. A semi-colon

The PROBLEM program will check for validity of all sets entered and return an
error message indicating the bad character position for any mistakes. The
formula is terminated with the first space found and any subsequent characters
are removed. As an example, the formula on the left would be represented by the
character string on the right:

```
              5             #6
      (#1 - #2)   *   (#3 + #4)           #1,S;#2,-;E,5;#3,S;#4,+;E,#6;P,*;
      -------------------------
            /-------------------
           /    #2  -  2.5              #2,S;2.5,-;
          /   -------------------
         /      2       3
         V    (#3)  -  (#2)             #3,S;E,2;#2,S;E,3;P,-;P,/;P,R;P,/;
```

Once a valid formula is established, it is stored in a relative access file in
a formula directory with a file name of the problem code and a record number of
the question number.

In both the PROBLEM and EXAMPLE programs, the calculation routine uses a "stack"
of an entry field and 4 registers plus an "enable" switch as follows:

```
[    READ        If ENABLE : R4:=R3, R3:=R2, R2:=R1, R1:=F, F:=value, set ENABLE
  NEW VALUE ]    If not ENABLE : F:=value, set ENABLE
```

| | |
|---|---|
| [ READ PREV.<br>QST. VALUE ] | If ENABLE : R4:=R3, R3:=R2, R2:=R1, R1:=F, F:=value, set ENABLE<br>If not ENABLE : F:=value, set ENABLE |
| S | R4:=R3, R3:=R2, R2:=R1, R1:=F, re-set ENABLE |
| + | F := R1 + F, R1:=R2, R2:=R3, R3:=R4, set ENABLE |
| - | F := R1 - F, R1:=R2, R2:=R3, R3:=R4, set ENABLE |
| / | F := R1 / F, R1:=R2, R2:=R3, R3:=R4, set ENABLE |
| * | F := R1 * F, R1:=R2, R2:=R3, R3:=R4, set ENABLE |
| E | F := R1 to the F power, R1:=R2, R2:=R3, R3:=R4, set ENABLE |
| R | F := square root of F, set ENABLE |
| C | F := -1 * F, no change to ENABLE |
| A | F := absolute value of F, no change to ENABLE |
| SPACE | Return value in F as the response to this question |

The following are conditions under which a response of "no entry" will be returned from the calculation routine:

1. The value in F is negative when the "E" op code is specified;

2. The value in F is negative when the "R" op code is specified;

3. The value in F is zero when the "/" op code is specified;

4. The response from a previous question (either "#nn" or "@nn") was "no entry";

5. The calculated value exceeds the capacity of the response field;

6. In the PROBLEM routine, ANY formula which references "@nn";

7. In the EXAMPLE routine, ANY formula in which the "@nn" specified sequence number does not exist in the data base.

---

Integer value questions are limited to 15% of the total questions, so one of these data points may not be entered until at least 6 other questions have been established. Their value (as stored in the situation string) may be -32765 to +32767 with -32767 representing a "not entered" status and -32766 reserved for an inactive status in the REPORT routine. The mentor must establish discrete limits for the possible values which may be captured, however.

Changes or additional questions may be added to existing problems, but the system cannot prevent the corrupting of a study if a mentor changes the logical meaning of an existing question once the system has gained experience on that problem. This screen terminates by entry of "00" in the question field.

--

PROBLEM PROGRAM -- SECOND SCREEN

```
           1         2         3         4         5         6         7         8
  12345678901234567890123456789012345678901234567890123456789012345678901234567890
01         P A R A D O C S     D E V E L O P M E N T     S Y S T E M
02
03                        **** SITUATION DATA CAPTURE ****
04            Please enter "REFERENCE" responses for all questions
05
06      PROBLEM CODE:        XXXXXXX          XXXXXXXXXXXXXXXXXXXXXXXXXXXXX
07                                                              INTERMEDIATE
QUESTION      DESCRIPTION             UNIT       RESPONSE        JUDGEMENT
   01    XXXXXXXXXXXXXXXXXXXXXXXXXXXX XXXXXXXX [            ]  XXXXXXXXXXXXXXXXXX
   02    XXXXXXXXXXXXXXXXXXXXXXXXXXXX XXXXXXXX [            ]  XXXXXXXXXXXXXXXXXX
   03    XXXXXXXXXXXXXXXXXXXXXXXXXXXX XXXXXXXX [            ]  XXXXXXXXXXXXXXXXXX
   04    XXXXXXXXXXXXXXXXXXXXXXXXXXXX XXXXXXXX [            ]  XXXXXXXXXXXXXXXXXX
   05    XXXXXXXXXXXXXXXXXXXXXXXXXXXX XXXXXXXX [            ]  XXXXXXXXXXXXXXXXXX
   06    XXXXXXXXXXXXXXXXXXXXXXXXXXXX XXXXXXXX [            ]  XXXXXXXXXXXXXXXXXX
   07    XXXXXXXXXXXXXXXXXXXXXXXXXXXX XXXXXXXX [            ]  XXXXXXXXXXXXXXXXXX
   08    XXXXXXXXXXXXXXXXXXXXXXXXXXXX XXXXXXXX [            ]  XXXXXXXXXXXXXXXXXX
```

```
                                    21                                                  22
       09  XXXXXXXXXXXXXXXXXXXXXXXXXXXX XXXXXXXX [          ] XXXXXXXXXXXXXXXXXXX
       10  XXXXXXXXXXXXXXXXXXXXXXXXXXXX XXXXXXXX [          ] XXXXXXXXXXXXXXXXXXX
       11  XXXXXXXXXXXXXXXXXXXXXXXXXXXX XXXXXXXX [          ] XXXXXXXXXXXXXXXXXXX
       12  XXXXXXXXXXXXXXXXXXXXXXXXXXXX XXXXXXXX [          ] XXXXXXXXXXXXXXXXXXX
       13  XXXXXXXXXXXXXXXXXXXXXXXXXXXX XXXXXXXX [          ] XXXXXXXXXXXXXXXXXXX
       14  XXXXXXXXXXXXXXXXXXXXXXXXXXXX XXXXXXXX [          ] XXXXXXXXXXXXXXXXXXX
       15  XXXXXXXXXXXXXXXXXXXXXXXXXXXX XXXXXXXX [          ] XXXXXXXXXXXXXXXXXXX
       24                               CORRECT ?  [ ]
       12345678901234567890123456789012345678901234567890123456789012345678901234567890
                1         2         3         4         5         6         7         8
```

```
             INTERMEDIATE JUDGEMENT MESSAGES               ERROR MESSAGES
             -------------------------------               --------------

1 = "Below Both Ranges    "                  "ENTRY REQUIRED"
              2 = "Below Primary Range  "                  "Y / N REQUIRED"
              3 = "Within Both Ranges   "                  "ENTER NUMERIC"
              4 = "Above Primary Range  "                  "ENTRY TOO LARGE"
              5 = "Above Both Ranges    "                  "OUT OF RANGE
              6 = "Below Range          "                    LIMITS: 9999 TO 9999"
              7 = "Within Range         "
              8 = "Above Range          "
              9 = "                     "    (no judgement or integer value)
             10 = "Not Entered          "
             11 = "Absent               "
             12 = "Present              "
             13 = "Deleted              "
                  "For Reference Only   "
```

Once the questions have all been entered the system will ask the operator to
describe the "reference" situation. This screen will appear if this is a new
problem, if new questions have been added to an existing problem, or if one
or more deleted questions have been reinstated.

All responses are checked for validity (see error messages above), and an
intermediate judgement is made and displayed. If a question(s) has been
reinstated, the system checks to see if the new reference situation entered
equals the present reference situation; if they are the same the program
terminates, but if they are different, the same logic applies as if a new
question was added to the problem.

PROBLEM PROGRAM
                              THIRD SCREEN

```
                1         2         3         4         5         6         7         8
       12345678901234567890123456789012345678901234567890123456789012345678901234567890
       01          P A R A D O C S    D E V E L O P M E N T    S Y S T E M
       02
       03              **** INTERPRETATION DESCRIPTION ****
       04                    Please describe this situation
       05
       06   PROBLEM CODE:        XXXXXXXX           XXXXXXXXXXXXXXXXXXXXXXXXXXXXXXXX
       07
       -----------------------  B A S I C    D E S C R I P T I O N  ------------------
       XXXXXXXXXXXXXXXXXXXXXXXXXXXXXXXXXXXXXXXXXXXXXXXXXXXXXXXXXXXXXXXXXXXXXXXXXXXXXXXX
       -----------------  A D D I T I O N A L    D E S C R I P T I O N S  ------------
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       XXXXXXXXXXXXXXXXXXXXXXXXXXXXXXXXXXXXXXXXXXXXXXXXXXXXXXXXXXXXXXXXXXXXXXXXXXXXXXXX
       23   Linked Problems for this situation: XXXXXXXX XXXXXXXX XXXXXXXX XXXXXXXX
       23           XXXXXXXX is not a valid problem code
       23           XXXXXXXX is not a secondary code for this problem
       24                             CORRECT ?   [ ]
       12345678901234567890123456789012345678901234567890123456789012345678901234567890
                1         2         3         4         5         6         7         8
```

This screen will allow a basic 80 character description to be captured and optionally an additional 12 80-character lines only if this is a new problem. If new questions are added to an existing problem, the system writes the previous "normal" situation (record "0") to the end of the file (i.e., assigns a new situation number) along with its associated description. The new "normal" is then built up based on the responses in screen 2; the description from the old reference situation is displayed and may be changed by the operator to represent the new refernece description. This is also the case when a new reference situation is established by reinstating one or more questions.

If the system finds linked problem codes within the additional description lines in the form [PROBCODE], it will check to make sure these are valid problems which have been set up through the LINKPROB routine specifically for this primary problem. The system will not ask CORRECT? until all linked codes (a maximum of four) are valid, and then will display them on line 23 for verification. These linked problems will be called up automatically in the EXAMPLE program if a full interpretation is made on a situation containing them.

CAPTURING AND INTERPRETING AN EXAMPLE

Capturing and interpreting an example (i.e., a collection of data values for a pre-defined problem) consists of the following:

1. User identifies his/her code and this is verified through the security module. Information on whether this user is local or remote, whether a printer is available, etc. is also checked.

2. A problem code is entered and the system checks the status of this user for this problem code (user, teacher or mentor).

3. An example (or patient) name and ID is captured for reporting (and later for the Data Base Manager).

4. Each question is displayed in order, and, if not deleted, the system accepts a valid response and displays the intermediate decision (as described above). A response "string" made up of the intermediate decision values (and integer values, if any) is thus generated.

5. When completed, the system interprets the results as follows:

a. All known situations are read into memory with any "deleted" or "reference only" question having its intermediate decision value changed to the deleted code.

b. The system checks for a match between the response string and any known situation string; if found, the interpretation module is terminated and the appropriate interpretation description is stored (termed a "full" interpretation).

c. A major "string" is created in memory for each situation. Major data points are those having a logical importance ("LI") value greater than the minimum LI value (stored in the base problem record). All minor data points are given a "blank" value. The response string is similarly translated. A similar process also occurs to create minor "strings" for the response and all situations.

d. The system checks for a match between the major response string and any major situation string; for EACH situation found, the appropriate interpretation description(s) and list(s) of which minor data points didn't "match" are stored (termed a "major criteria match with minor differences"). The interpretation module is terminated.

e. If no exact match is found in "d" above, the system will check the number of major question matches it found compared to the total number of major questions. For EACH situation in which this percentage is 85% or more, the appropriate interpretation description(s) and list(s) of which major data points didn't "match" are stored (termed a "descriptive" interpretation). The interpretation module is terminated.

f. If no previously known situation qualifies in "e" above, the fact that the system cannot respond to this example (termed "ignorance") and the interpretation module is terminated.

6. The interpretation descriptions stored from 5. above will then be displayed and/or printed.

7. If the status of the operator is a "user", no further system interaction with the problem is allowed unless additional problem codes are "linked" to a full interpretation (see below).

8. If the status of the operator is a "teacher" and the result was something other than a "full" interpretation, the system will allow:

a. This new situation string to be added for this problem;

b. A descriptive interpretation to be entered representing this new situation;

c. Optionally up to 4 linked problem codes to be entered which will be called up by the system if a "full" interpretation is generted in the future for this situation string. These linked secondary problem codes are entered in the "additional description" area and must be enclosed in brackets as follows:
   [PROBCODE]

NOTE: Linked problem codes must FIRST be established through the LINKPROB routine and cannot be the same as any other "standalone" problem code already on the system. They may however be "generated" from existing problem codes, in which case the system transfers all the questions and knowledge (i.e., situation and interpretation data base) directly into the new problem code file. (See the specifications for the LINKPROB routine.)

9. If the status of the operator is a "mentor", the system will allow all capabilities listed in "8" above plus the ability to change the descriptive information for a "full" interpretation.

10. If linked problems have been indicated in the full interpretation description, each of these problems will be called up by the system one at a time, and require the operator to provide responses. The program will function just as has been described above with the exception that linked problems cannot themselves be linked to more problem codes.

```
                         EXAMPLE PROGRAM
                          FIRST SCREEN 1         2         3         4         5         6         7         8
  12345678901234567890123456789012345678901234567890123456789012345678901234567890
01          P A R A D O C S    D E V E L O P M E N T    S Y S T E M
02                    **** EXAMPLE INTERPRETATION ****
03 YOUR USER CODE: XXXXXX          This user code is not valid
03 YOUR USER NAME: XXXXXXXXXXXXXXXXXXXXXXXXXXXXXX
04    PROBLEM CODE: XXXXXXXX       XXX(no entry when completed)XX
05 EXAMPLE NAME: XXXXXXXXXXXXXXXXXXXXXXXXXXXXX  ID NUMBER : XXXXXXXXXXXXXX
06                                                        INTERMEDIATE
   QUESTION       DESCRIPTION             UNIT    RESPONSE   JUDGEMENT
     01     XXXXXXXXXXXXXXXXXXXXXXXXXXXX XXXXXXXX [        ] XXXXXXXXXXXXXXXXXXX
     02     XXXXXXXXXXXXXXXXXXXXXXXXXXXX XXXXXXXX [        ] XXXXXXXXXXXXXXXXXXX
     03     XXXXXXXXXXXXXXXXXXXXXXXXXXXX XXXXXXXX [        ] XXXXXXXXXXXXXXXXXXX
     04     XXXXXXXXXXXXXXXXXXXXXXXXXXXX XXXXXXXX [        ] XXXXXXXXXXXXXXXXXXX
     05     XXXXXXXXXXXXXXXXXXXXXXXXXXXX XXXXXXXX [        ] XXXXXXXXXXXXXXXXXXX
     06     XXXXXXXXXXXXXXXXXXXXXXXXXXXX XXXXXXXX [        ] XXXXXXXXXXXXXXXXXXX
     07     XXXXXXXXXXXXXXXXXXXXXXXXXXXX XXXXXXXX [        ] XXXXXXXXXXXXXXXXXXX
     08     XXXXXXXXXXXXXXXXXXXXXXXXXXXX XXXXXXXX [        ] XXXXXXXXXXXXXXXXXXX
     09     XXXXXXXXXXXXXXXXXXXXXXXXXXXX XXXXXXXX [        ] XXXXXXXXXXXXXXXXXXX
     10     XXXXXXXXXXXXXXXXXXXXXXXXXXXX XXXXXXXX [        ] XXXXXXXXXXXXXXXXXXX
     11     XXXXXXXXXXXXXXXXXXXXXXXXXXXX XXXXXXXX [        ] XXXXXXXXXXXXXXXXXXX
     12     XXXXXXXXXXXXXXXXXXXXXXXXXXXX XXXXXXXX [        ] XXXXXXXXXXXXXXXXXXX
     13     XXXXXXXXXXXXXXXXXXXXXXXXXXXX XXXXXXXX [        ] XXXXXXXXXXXXXXXXXXX
     14     XXXXXXXXXXXXXXXXXXXXXXXXXXXX XXXXXXXX [        ] XXXXXXXXXXXXXXXXXXX
     15     XXXXXXXXXXXXXXXXXXXXXXXXXXXX XXXXXXXX [        ] XXXXXXXXXXXXXXXXXXX
23                            CORRECT ?   [ ]
24
  12345678901234567890123456789012345678901234567890123456789012345678901234567890
           1         2         3         4         5         6         7         8
```

INTERMEDIATE JUDGEMENT MESSAGES

```
 1 = "Below Both Ranges   "
 2 = "Below Primary Range "
 3 = "Within Both Ranges  "
 4 = "Above Primary Range "
 5 = "Above Both Ranges   "
 6 = "Below Range         "
 7 = "Within Range        "
 8 = "Above Range         "
 9 = "                    "    (no judgement or integer value)
10 = "Not Entered         "
11 = "Absent              "
12 = "Present             "
13 = "Deleted             "
     "For Reference Only  "
```

ERROR MESSAGES

```
"ENTRY REQUIRED"
"Y / N REQUIRED"
"ENTER NUMERIC"
"ENTRY TOO LARGE"
"OUT OF RANGE
   LIMITS: 9999 TO 9999"
```

EXAMPLE PROGRAM
SECOND SCREEN

```
          1         2         3         4         5         6         7         8
 12345678901234567890123456789012345678901234567890123456789012345678901234567890
01       P A R A D O C S    D E V E L O P M E N T    S Y S T E M
02                  **** INTERPRETATION DESCRIPTION ****
03
04   EXAMPLE NAME: XXXXXXXXXXXXXXXXXXXXXXXXXXXX   ID NUMBER : XXXXXXXXXXXXXX
05
06   PROBLEM CODE: XXXXXXXX           XXXXXXXXXXXXXXXXXXXXXXXXXXXXX
07
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
23
24                    READY FOR MORE ?  [ ]
24        DO YOU WISH TO DISPLAY THIS INTERPRETATION AGAIN ?  [ ]
24            DO YOU WISH TO PRINT THIS INTERPRETATION ?    [ ]
24        DO YOU WISH TO CHANGE THE INTERPRETATION DESCRIPTION ? [ ]
 12345678901234567890123456789012345678901234567890123456789012345678901234567890
          1         2         3         4         5         6         7         8
```

EXAMPLE PROGRAM
THIRD SCREEN

```
          1         2         3         4         5         6         7         8
 12345678901234567890123456789012345678901234567890123456789012345678901234567890
01       P A R A D O C S    D E V E L O P M E N T    S Y S T E M
02                  **** INTERPRETATION DESCRIPTION ****
03                    Please describe this situation
04   EXAMPLE NAME: XXXXXXXXXXXXXXXXXXXXXXXXXXXX   ID NUMBER : XXXXXXXXXXXXXX
05
06   PROBLEM CODE: XXXXXXXX           XXXXXXXXXXXXXXXXXXXXXXXXXXXXX
07
---------------------- B A S I C    D E S C R I P T I O N ----------------------
XXXXXXXXXXXXXXXXXXXXXXXXXXXXXXXXXXXXXXXXXXXXXXXXXXXXXXXXXXXXXXXXXXXXXXXXXXXXXXXX
--------------- A D D I T I O N A L    D E S C R I P T I O N S ---------------
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
```

```
XXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXX
23  Linked Problems for this situation: XXXXXXXX XXXXXXXX XXXXXXXX XXXXXXXX
23           XXXXXXXX is not a valid problem code
23           XXXXXXXX is not a secondary code for this problem
USE A PREVIOUS INTERPRETATION AS A BASIS FOR DESCRIBING THIS NEW SITUATION?  [ ]
24      LIST THE SITUATION NUMBER OF THE PREVIOUS INTERPRETATION:   [   ]
24                          CORRECT ?   [ ]
12345678901234567890123456789012345678901234567890123456789012345678901234567890
         1         2         3         4         5         6         7        8
```

This section of the EXAMPLE program follows the same specifications set forth
in the PROBLEM routine, except that when a major or approximate match occurs,
the operator is given the opportunity to list a previous situation number so
that its interpretation may be used as the basis for the new description.

CAPTURING AND INTERPRETING AN EXAMPLE

SAMPLE REPORT FORMAT

USER NAME:     XXXXXXXXXXXXXXXXXXXXXXXXXXXXX      DATE: 99/99/99

PROBLEM CODE:  XXXXXXXX      XXXXXXXXXXXXXXXXXXXXXXXXXXXXX

EXAMPLE NAME:  XXXXXXXXXXXXXXXXXXXXXXXXXXXXX      ID: XXXXXXXXXXXXXX

| QUESTION | DESCRIPTION | UNITS | RESPONSE | JUDGEMENT |
|----------|-------------|-------|----------|-----------|
| 99 | XXXXXXXXXXXXXXXXXXXXXXXXXXXXXX | XXXXXXXXX | XXXXXXXXX | XXXXXXXXXXXXXXXXXXX |
| 99 | XXXXXXXXXXXXXXXXXXXXXXXXXXXXXX | XXXXXXXXX | XXXXXXXXX | XXXXXXXXXXXXXXXXXXX |
| 99 | XXXXXXXXXXXXXXXXXXXXXXXXXXXXXX | XXXXXXXXX | XXXXXXXXX | XXXXXXXXXXXXXXXXXXX |
| 99 | XXXXXXXXXXXXXXXXXXXXXXXXXXXXXX | XXXXXXXXX | XXXXXXXXX | XXXXXXXXXXXXXXXXXXX |
| 99 | XXXXXXXXXXXXXXXXXXXXXXXXXXXXXX | XXXXXXXXX | XXXXXXXXX | XXXXXXXXXXXXXXXXXXX |
| 99 | XXXXXXXXXXXXXXXXXXXXXXXXXXXXXX | XXXXXXXXX | XXXXXXXXX | XXXXXXXXXXXXXXXXXXX |

I N T E R P R E T A T I O N

[ "Ignorance" ]
Not possible to make an interpretation on the basis of the present experience.
Please enter your description of this situation.

[ "Full Interpretation" ]
This combination of data suggests:
XXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXX

[ "Major Criteria Match" ]
The major criteria in this example are those of (situation # 999):
XXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXX
Minor differences are:
         XXXXXXXXXXXXXXXXXXXXXXXXXXXXX is XXXXXXXXXXXXX
         XXXXXXXXXXXXXXXXXXXXXXXXXXXXX is XXXXXXXXXXXXX

[ "Descriptive Interpretation" ]
This example resembles the pattern seen in (situation # 999):
XXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXX
Except that in this case:
         XXXXXXXXXXXXXXXXXXXXXXXXXXXXX is XXXXXXXXXXXXX
         XXXXXXXXXXXXXXXXXXXXXXXXXXXXX is XXXXXXXXXXXXX

PROBLEM ANALYSIS

The purpose of the problem analysis routine is to calculate and report various descriptive parameters for problems. For each question, these include logical and experiential values for IMPORTANCE, COMPLETENESS and (later) INTERACTION. Additional parameters include the number of possible situations, the number of situations required until the program is DISCRIMINANT for every data point, and an expression of INDEPENDENCE, which predicts when PARADOCS will be able to provide a tentative interpretation of any allowable situation for a problem.

Certain ANALYSIS functions are accomplished automatically after any example is accessed through the EXAMPLE routine or all may be run for any existing problem code by calling up the ANALYSIS program. For the latter, the results may be displayed and/or printed.

For each question, ANALYSIS partitions the set of situations observed to-date into mutually exclusive subsets using two separate grouping schemes. The first grouping assigns situations to subsets by the interpretation code value of the particular question being analyzed. These subsets are referred to as "response sets". In the case of a simple YES/NO question where entry is required, two subsets would be created; one of situations with a response equal to "yes" and the other of situations with a response equal to "no". The number of subsets will be the number of different observed responses (2 to 3 for a yes/no question and 1 to 6 for a scalar question, and 1 or above for an integer question).

The second grouping is based on examination of the remaining interpretation code values for each situation, temporarily ignoring the value of the question being analyzed. Each situation is assigned to a "parity" subset depending on the number of situations which are IDENTICAL to it. Every situation has at least parity equal to 1 since it must be identical to itself. Likewise, since every situation is required to be unique in its "full" form, the maximum number of parity sets equals the number of different judgement values observed for the question. In the case of a required yes/no question, the maximum parity will be 2 with each situation represented by both a "yes" and a "no" variant for the question. All other situations will have parity of 1, representing either a "yes" or a "no". Conceptually, the parity sets divide up the observed situations by assigning a "response" (i.e. parity) to each of the strings of interpretation codes created by deletion of the particular question.

Internally, ANALYSIS defines the sets and their respective number of elements by reference to two tables which it creates from the SITUATION file for the problem:

a. An EXPERIENCE table is generated which counts the number of occurences of each interpreration code value (the columns) encountered to-date for each question (the rows). The number of non-zero entries in each row is the number of different responses that have been observed in that row and is stored in column 13 of the table (PARADOCS allows 12 distinct judgement values other than "deleted", "for reference only" or integer questions). The number of possible responses for each question (its "factor") is stored in column 14 (see below). Integer value questions store the number of different values ecnountered in column 13 and the number possible (based on the limits entered by the mentor) in column 14.

b. A COMPUTATION table is then generated by setting up a column for each question and a row for each situation. Listed in an additional column is the number of times that each situation has been encountered. Every point in each row is initialiazed to the value of the row number. One at a time, each undeleted data point (question) is temporarily eliminated from every interpretation code string. For each situation whose row number has not already been altered, the remaining portion of that string (the "reference" string) is compared to the remaining portion of the interpretation code string of each higher numbered situation. If the strings are equal, the situation number of the "reference" string is inserted into the row of the higher numbered string to which it is equal, at the column (question position) which was eliminated. Within each column, the parity of each situation is defined by the number of times the row value assigned for the situation appears in the column. The final two rows of the COMPUTATION table contain the TOTAL_DUPLICATES and NUMBER_LOST by this process for each question (column). The first term is the number of rows in the column whose final numbers are represented by two or more duplicates. The second term is the sum of the number of encounters of the duplicated situations.

The parameters which define IMPORTANCE can then be calculated as follows:

$$\text{LOGICAL IMPORTANCE} = \frac{\text{TOTAL\_DUPLICATES}}{\text{TOTAL\_SITUATIONS}} * 100$$

$$\text{EXPERIENTIAL IMPORTANCE} = \frac{\text{NUMBER\_LOST}}{\text{TOTAL\_ENCOUNTERS}} * 100$$

TOTAL_SITUATIONS is the number of unique conclusion states the PARADOCS program has experienced to-date (i.e., all entries in the SITUATION file). LOGICAL IMPORTANCE of a data point is the percent of situations which are no longer distinguishable if that data point were eliminated from the judgement base. TOTAL_ENCOUNTERS represents the total number of examples experienced to-date and EXPERIENTIAL IMPORTANCE for the data point is the percent of examples which could no longer be distinguished if that data point were eliminated. Both values of IMPORTANCE range from 0 to 100.

The system must then check to see if it has had enough experience in this problem to be able to use these calculated LI values as the basis for differentiating between major and minor data points. This is done by determining a MINIMUM LOGICAL IMPORTANCE value as follows:

$$\frac{\text{The sum of TOTAL\_DUPLICATES} * 100}{\text{No. Questions} \times \text{No. Situations}} * \frac{\text{Largest LI} - \text{Smallest LI}}{\text{Largest LI}}$$

It is stored in the minimum LI field of the base problem record. If the number of questions with a LI value greater than or equal to this figure is less than 40% of the total number of questions, the system will use the REQUIRED? field to differentiate between major and minor data: all required questions will be given a LI value of "50", non-required questions a value of "00" and the minimum LI a value of "25". Once a problem has over 40% majors from the calculated LI, however, the CALC_LI flag is set to "Y" and the system will never revert back to using the REQUIRED? field as the means of differentiating between major and minor data points.

The COMPLETENESS parameters derived by ANALYSIS provide users with information about the internal relationships of the actual judgement value codes experienced by a PARADOCS application program. ANALYSIS first derives two groups of subsets described above by reference to the EXPERIENCE and COMPUTATION tables. From these subsets, an additional internal structure, the RESPONSE-PARITY table, is created for each question being analyzed. A sample of this new table for a required Yes/No question and for a bounded, required scalar question follow:

QUESTION_NUMBER: #1

| RESPONSE! | PARITY VALUES 1 | 2 | TOTAL |
|---|---|---|---|
| YES ! | a | b | a+b |
| NO ! | c | d | c+d |
| TOTAL ! | a+c | b+d | a+b+c+d = TOTAL_SITUATIONS |

QUESTION_NUMBER: #2

| RESPONSE! | PARITY VALUES 1 | 2 | 3 | TOTAL |
|---|---|---|---|---|
| LOW ! | e | f | g | e+f+g |
| WITHIN ! | h | i | j | h+i+j |
| HIGH ! | k | l | m | k+l+m |
| TOTAL ! | e+h+k | f+i+l | g+j+m | e+...+m = TOTAL_SITUATIONS |

Table headings represent designated PARITY and RESPONSE subsets, and the table entries represent the number of elements in the intersections of the rows and columns. As discussed above, the maximum parity is the number of observed responses, and in the maximum parity subset, each observed response must be be equally represented (in the examples, b = d and g = j = m). Allowed responses not yet observed will not appear in this table.

LOGICAL COMPLETENESS (LC) is defined to be the percent of conclusion states
(i.e., situations) in the RESPONSE-PARITY table which have the maximum parity.
In the above two example questions, this would be b + d divided by the total
situations for question # 1, and g + j + m divided by total situations for question # 2. EXPERIENTIAL COMPLETENESS (EC) is obtained in a similar manner, but
the values of the table elements represent the number of encounters experienced
rather than the number of situations, and the divisor is total encounters. COMPLETENESS parameters, however, are meant to convey the extent to which ALL possible judgement values for individual questions have been observed by a PARADOCS
program. To correct for "unrealized" but allowed responses (i.e., any intermediate judgement codes which are possible, but have not yet been experienced by
the system for each question), the system adjusts both COMPLETENESS parameters
by dividing each by the REALIZATION RATIO as described below.

The number of possible situations is at least as great as the product of
the distinct responses observed to date for each question. For example, if
there are m yes/no questions with 2 possible responses and n scalar questions
with 3 possible responses, the number of possible situations will be 2 to the
power of m times 3 to the power of n. The actual maximum possible situations
is determined by the mentor based on the type of questions and whether each
question is required, which will increase the number of possible responses
by one as shown in the following table:

REQUIRED-ALLOWED RESPONSES TABLE

| QUESTION TYPE | REQUIRED | FACTOR |
|---|---|---|
| 1. Yes / No | yes | 2 |
| 2. Yes / No | no | 3 |
| 3. Scalar -- two ref. ranges | yes | 5 |
| 4. Scalar -- two ref. ranges | no | 6 |
| 5. Scalar -- one ref. range | yes | 3 |
| 6. Scalar -- one ref. range | no | 4 |
| 7. Scalar -- no ref. ranges | yes | 1 |
| 8. Scalar -- no ref. ranges | no | 2 |
| 9. Integer -- lower limit >0 | yes | upper -- lower + 1 |
| 10. Integer -- lower limit >0 | no | upper -- lower + 2 |
| 11. Integer -- lower limit <1 | yes | upper -- lower + 2 |
| 12. Integer -- lower limit <1 | no | upper -- lower + 3 |

If required questions are added after the problem has gained some experience,
their factor will be that of the non-required question of the same type.
The maximum possible situations can then be computed as the product of the
factors in the table for all non-deleted questions. In practice, however, the
number of different responses actually observed for any question may be less
the allowed responses. A REALIZATION RATIO may be computed for each question
as the number of observed responses divided by the maximum possible responses
(the "factor" from the above table). A question will be fully REALIZED when
its realiztion ration equals 1. The "factor" for each question is stored in
the 14th column of the Experience Table.

To relate the experience of the PARADOCS program to the possible situations
an EXPERIENCE RATIO is calculated by the following formula:

$$\text{Experience Ratio} = \frac{\text{Number of Situations To-Date}}{\text{Number of Possible Situations}} \times 1000$$

Here "Possible Situations" is interpreted in terms of allowed responses. To
define the experience ratio in terms of observed responses only, Possible
Situations may be multiplied by the product of the realization ratios for
all questions.

A guide to a program's "maturity" is an estimate of the number of situations
which need be entered to insure some degree of logical importance for every
question (i.e., a LI value > 0 for every question). The estimate of how many
siutations must be learned to attain such a DISCRIMINANT status is based upon
the following ratio:

$$\frac{\text{Number of Questions with LI} > 0}{\text{Total Number of Questions}} = \frac{\text{Number of Situations To-Date}}{\text{No. of Situations to DISCRIMINATION}}$$

Therefore, the formula for calculating the number of situations to discrimination (which will be used only after the CALC_LI flag discussed above has been set to "Y") is:

$$\text{Number of Situations To-Date} \times \frac{\text{Total Number of Questions}}{\text{No. of Questions with LI} > 0}$$

A PARADOCS program becomes INDEPENDENT when, for any new situation entered, either a full interpertation or one or more major matches with only minor differences will be reported. The number of situations required for INDEPEDENCE will not be calculated until the program is DISCRIMINANT (see above). The minimum number of situations to achieve INDEPENDENCE is .85 times the product of allowed responses for all data points designated as major. An existing program experience can therefore be checked for INDEPENDENCE by simulating major data point strings and checking if a known situation exists whose major data points match more than 85% of those of the simulated situation. Listing the situations representative of the "unmatchable" strings allows identification of the "gaps" and causes "directed learning" by the system; this is where the system presents specific hypothetical situations (which have not yet been experienced) to the mentor or a teacher and asks for an interpertation. It should be noted, however, that even an "independent" program may have much more to "learn" from its mentor and teachers.

As part of the analysis summary report, the system will examine all situations for each question. If a pattern can be found where all intermediate judgement codes are the same or similar (excluding "not entered" code "10"), the following comments will print for that question:

| Judgement Code | Comment |
|---|---|
| 1 | Always Below Both Ranges |
| 2 | Always Below Primary Range |
| 1 and 2 | Always Between Both Lower Limits |
| 3 | Always Within Both Ranges |
| 4 | Always Above Primary Range |
| 4 and 5 | Always Between Both Upper Limits |
| 5 | Always Above Both Ranges |
| 6 | Always Below Range |
| 7 | Always Within Range |
| 8 | Always Above Range |
| 10 | Never Entered |
| 11 | Never Present |
| 12 | Always Present |

For numeric questions which do not already have other comments, the system will check for an "Always Out of Range" condition. If there is one set of boundaries this comment will be made if judgement code "7" never occurs; if there are two sets of boundaries, the comment will be generated by code "3" never occurring.

ANALYSIS PROGRAM
SCREEN FORMAT

```
         1         2         3         4         5         6         7         8
12345678901234567890123456789012345678901234567890123456789012345678901234567890
01          P A R A D O C S    D E V E L O P M E N T    S Y S T E M
02                     **** PROBLEM ANALYSIS ****
03         YOUR USER CODE: XXXXXX       Sorry, this code is not valid
03         YOUR USER NAME: XXXXXXXXXXXXXXXXXXXXXXXXXXXX
04          PROBLEM CODE: XXXXXXX     XXX(no entry when completed)XX
05
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXXXXXXXXX
```

```
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
24                 READY FOR MORE ?   [ ]
24         DO YOU WISH TO DISPLAY THIS REPORT AGAIN ?  [ ]
24            DO YOU WISH TO PRINT THIS REPORT ?    [ ]
12345678901234567890123456789012345678901234567890123456789012345678901234567890
         1         2         3         4         5         6         7         8

ANALYSIS PROGRAM
                               REPORT FORMAT 1         2         3         4         5         6         7         8
12345678901234567890123456789012345678901234567890123456789012345678901234567890

USER NAME:     XXXXXXXXXXXXXXXXXXXXXXXXXXX       DATE: 99/99/99

PROBLEM CODE:  XXXXXXXX    PROBLEM NAME: XXXXXXXXXXXXXXXXXXXXXXXXXXXXX

D A T A    A N A L Y S I S

IMPORTANCE   COMPLETENESS   PERCENT
QUEST    DESCRIPTION / COMMENT     REQ TYPE LOGIC EXPER  LOGIC EXPER   REALIZED
-----    ---------------------     --- ---- ----- -----  ----- -----   --------
 99      XXXXXXXXXXXXXXXXXXXXXXXXXX  X  XXX   999   999    999   999     999
         XXXXXXXXXXXXXX
 99      XXXXXXXXXXXXXXXXXXXXXXXXXX  X  XXX   999   999    999   999     999
         XXXXXXXXXXXXXX
 99      XXXXXXXXXXXXXXXXXXXXXXXXXX  X  XXX   999   999    999   999     999
         XXXXXXXXXXXXXX
 99      XXXXXXXXXXXXXXXXXXXXXXXXXX  X  XXX   999   999    999   999     999
         XXXXXXXXXXXXXX
 99      XXXXXXXXXXXXXXXXXXXXXXXXXX  X  XXX   999   999    999   999     999
         XXXXXXXXXXXXXX
 99      XXXXXXXXXXXXXXXXXXXXXXXXXX  X  XXX   999   999    999   999     999
         XXXXXXXXXXXXXX
 99      XXXXXXXXXXXXXXXXXXXXXXXXXX  X  XXX   999   999    999   999     999
         XXXXXXXXXXXXXX

The maximum number of unique situations for this probem is 999999999999.

The experience ratio in dealing with this problem is 99.

The program so far has learned 999999 unique situations.
                                           [and is "discriminant". ]
                                           [and is "independent".  ]

The program will be "discriminant" when it has learned 999999 unique situations.

The program will run independently when it has learned 999999 unique situations.

REPORT PROGRAM
                                 FIRST SCREEN 1         2         3         4         5         6         7         8
12345678901234567890123456789012345678901234567890123456789012345678901234567890
01           P A R A D O C S    D E V E L O P M E N T    S Y S T E M
02                     **** PROBLEM SUMMARY REPORT ****
03           YOUR USER CODE: XXXXXX       Sorry, this code is not valid
03           YOUR USER NAME: XXXXXXXXXXXXXXXXXXXXXXXXXXXX
04            PROBLEM CODE: XXXXXXXX      XXX(no entry when completed)XX
05
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXX
```

```
                              PLEASE WAIT
XXXXXXXXXXXXXXXXXXXXXXXXXXXXXXXXXXXXXXXXXXXXXXXXXXXXXXXXXXXXXXXXXXXXXXX
            THE SYSTEM IS NOW ANALYZING SITUATION NUMBER  999
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
24                    READY FOR MORE ?   [ ]
24           DO YOU WISH TO DISPLAY THIS REPORT AGAIN ?  [ ]
24             DO YOU WISH TO PRINT THIS REPORT ?   [ ]
12345678901234567890123456789012345678901234567890123456789012345678901234567890
         1         2         3         4         5         6         7         8
```

This program allows a summary of experience to be generated and displayed and/or
printed along with a listing of all questions which make up the problem.  See
the next page for a format of this report.

```
                REPORT PROGRAM -- REPORT FORMAT
         1         2         3         4         5         6         7         8
12345678901234567890123456789012345678901234567890123456789012345678901234567890

USER NAME:      XXXXXXXXXXXXXXXXXXXXXXXXXXXX       DATE: 99/99/99

PROBLEM CODE:   XXXXXXXX    PROBLEM NAME: XXXXXXXXXXXXXXXXXXXXXXXXXXXXXX
                 P R O B L E M    S U M M A R Y
                                                        INTEGER ENTRY
                                                        !  CALCULATED
                                         BOUNDARIES     !  !   REQUIRED
NO.       DESCRIPTION           UNITS    LOWER   UPPER  !  !   !  TYPE
--    ------------------------  --------- ------- ------- --- --- --- -----
99 XXXXXXXXXXXXXXXXXXXXXXXXXXXX XXXXXXXXX                           REQ   MAJ

99 XXXXXXXXXXXXXXXXXXXXXXXXXXXX XXXXXXXXX    999     999 INT        REQ   MIN

99 XXXXXXXXXXXXXXXXXXXXXXXXXXXX XXXXXXXXX 99999.99 99999.99    CAL       REF
          FORMULA:                        99999.99 99999.99
    ###############################################
99 XXXXXXXXXXXXXXXXXXXXXXXXXXXX XXXXXXXXX 99999.99 99999.99         REQ   MAJ

99 XXXXXXXXXXXXXXXXXXXXXXXXXXXX           * * * * * D E L E T E D * * * * *

S U M M A R Y    O F    E X P E R I E N C E
```

999 types of data are used by the system to evaluate this problem, including
999 major and 999 minor data types.   99 of the questions are now deleted and
99 of the questions have been reinstated.   999 unique situations have been
identified in the 99999 examples encountered.   This problem was last used on
99/99/99 and was established on 99/99/99 by XXXXXXXXXXXXXXXXXXXXXXXXXXX The reference situation (encountered 999 times) has these characteristics:
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXX
       MAJOR DATA:
                   XXXXXXXXXXXXXXXXXXXXXXXXXXXXX is XXXXXXXXXXXXX
                   XXXXXXXXXXXXXXXXXXXXXXXXXXXXX is XXXXXXXXXXXXX
                   XXXXXXXXXXXXXXXXXXXXXXXXXXXXX is XXXXXXXXXXXXX
                   XXXXXXXXXXXXXXXXXXXXXXXXXXXXX is XXXXXXXXXXXXX MINOR DATA:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX Situation Number     2    encountered 999 times, was described on 99/99/99 by
                                    XXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
This situation differs from the reference situation as follows:
     MAJOR DATA:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
     MINOR DATA:

1         2         3         4         5         6         7         8
12345678901234567890123456789012345678901234567890123456789012345678901234567890

Situation Number  9999   encountered 999 times, was described on 99/99/99 by
                                    XXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
This situation differs from the reference situation as follows:
     MAJOR DATA:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
     MINOR DATA:
                    XXXXXXXXXXXXXXXXXXXXXXXXXXXXX is XXXXXXXXXXXXXX
In terms of major criteria, this situation is the same as Situation No. 9999
XXXXXXXXXXXXXXXXXXXXXXXXXXXXXXXXXXXXXXXXXXXXXXXXXXXXXXXXXXXXXXXXXXXXXXXXX
In this case, however:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
In terms of major criteria, this situation is the same as Situation No. 9999
XXXXXXXXXXXXXXXXXXXXXXXXXXXXXXXXXXXXXXXXXXXXXXXXXXXXXXXXXXXXXXXXXXXXXXXXX
In this case, however:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX

*     *     *     *     *     *     *     *

--

Situation Number  9999   encountered 999 times, was described on 99/99/99 by
                                    XXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXXXXXXXXXXXXXXXXXXXXXXXXX
This situation differs from the reference situation as follows:
     MAJOR DATA:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
     MINOR DATA:
                    XXXXXXXXXXXXXXXXXXXXXXXXXXXXX is XXXXXXXXXXXXXX
In terms of major criteria, this situation is the same as Situation No. 9999
XXXXXXXXXXXXXXXXXXXXXXXXXXXXXXXXXXXXXXXXXXXXXXXXXXXXXXXXXXXXXXXXXXXXXXXXX
In this case, however:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
In terms of major criteria, this situation is the same as Situation No. 9999
XXXXXXXXXXXXXXXXXXXXXXXXXXXXXXXXXXXXXXXXXXXXXXXXXXXXXXXXXXXXXXXXXXXXXXXXX
In this case, however:
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX
                    XXXXXXXXXXXXXXXXXXXXXXXXXXXXX is XXXXXXXXXXXXXX

*     *     *     *     *     *     *     *

LISTING PROGRAM
FIRST SCREEN

```
          1         2         3         4         5         6         7         8
12345678901234567890123456789012345678901234567890123456789012345678901234567890
01         P A R A D O C S    D E V E L O P M E N T    S Y S T E M
02                   **** PROBLEM QUESTIONAIRE LISTING ****
03
04         YOUR USER CODE: XXXXXX      Sorry, this code is not valid
04         YOUR USER NAME: XXXXXXXXXXXXXXXXXXXXXXXXXXX
05
06         PROBLEM CODE: XXXXXXXX      XXX(no entry when completed)XX
07
08
09
10
11
12
13
14              READY TO PRINT THIS QUESTIONAIRE ?   [ ]
15
16
17
18
19
20
21
22
23
24
12345678901234567890123456789012345678901234567890123456789012345678901234567890
          1         2         3         4         5         6         7         8
```

This program allows a questionaire to be printed for any valid problem code. The listing can then be filled out and used as an input document for the See EXAMPLE program. See the next page for a sample listing format.

LISTING PROGRAM
REPORT FORMAT

```
          1         2         3         4         5         6         7         8
12345678901234567890123456789012345678901234567890123456789012345678901234567890
```

USER NAME:     XXXXXXXXXXXXXXXXXXXXXXXXXXXXXX          DATE: 99/99/99

PROBLEM CODE:  XXXXXXXX      PROBLEM NAME: XXXXXXXXXXXXXXXXXXXXXXXXXXXXX

EXAMPLE NAME:  _____   ID NUMBER: _____

Q U E S T I O N A I R E    L I S T I N G

| QUEST | DESCRIPTION | UNITS | REQUIRED? | RESPONSE |
|---|---|---|---|---|
| 99 | XXXXXXXXXXXXXXXXXXXXXXXXXXXXX | XXXXXXXXX | YES | _____ |
| 99 | XXXXXXXXXXXXXXXXXXXXXXXXXXXXX | XXXXXXXXX | NO  | _____ |
| 99 | XXXXXXXXXXXXXXXXXXXXXXXXXXXXX | XXXXXXXXX | YES | _____ |
| 99 | XXXXXXXXXXXXXXXXXXXXXXXXXXXXX | XXXXXXXXX | NO  | _____ |
| 99 | XXXXXXXXXXXXXXXXXXXXXXXXXXXXX | XXXXXXXXX | YES | _____ |

```
99   XXXXXXXXXXXXXXXXXXXXXXXXXXXXX    XXXXXXXXX    NO       ___ _____

99   XXXXXXXXXXXXXXXXXXXXXXXXXXXXX    XXXXXXXXX    YES      ___ _____

99   XXXXXXXXXXXXXXXXXXXXXXXXXXXXX    XXXXXXXXX    NO       ___ _____

99   XXXXXXXXXXXXXXXXXXXXXXXXXXXXX    XXXXXXXXX    YES      ___ _____

99   XXXXXXXXXXXXXXXXXXXXXXXXXXXXX    * * * CALCULATED BY SYSTEM * * *

99   XXXXXXXXXXXXXXXXXXXXXXXXXXXXX    * * * * * D E L E T E D * * * * *
```

```
                          USERFILE PROGRAM
                           FIRST SCREEN 1         2         3         4         5         6         7         8
    12345678901234567890123456789012345678901234567890123456789012345678901234567890
01        P A R A D O C S    D E V E L O P M E N T    S Y S T E M
02                     **** USER FILE MAINTENANCE ****
03
04       ENTER YOUR USER CODE :    [XXXXXX]    XXXXXXXXXXXXXXXXXXXXXXXXXXXXXX
04       ENTER YOUR USER CODE :    [XXXXXX]    This user code is not valid
04       ENTER YOUR USER CODE :    [XXXXXX]    Sorry, you are not a mentor
05
06       CODE TO ADD OR CHANGE :   [      ]    XXX(no entry when completed)XX
06       CODE TO ADD OR CHANGE :   [XXXXXX]    IS THIS A NEW USER ?         [ ]
06       CODE TO ADD OR CHANGE :   [XXXXXX]    CHANGE DATA SHOWN BELOW ?    [ ]
07
08           USER CODE :      [      ]         SURE YOU WANT TO CHANGE CODE ? [ ]
08           USER CODE :      [      ]         THIS CODE IS ALREADY USED
09           USER NAME :      [                                    ]
10           TITLE :          [                                    ]
11           ADDRESS LINE 1 : [                                    ]
12           ADDRESS LINE 2 : [                                    ]
13           ADDRESS LINE 3 : [                                    ]
14           PHONE NUMBER :   [999-999-9999]
15
16           MAXIMUM STATUS CODE : [ ]  M = Mentor    T = Teacher    U = User
17
18
19       PROBLEM CODES TO WHICH THIS USER HAS ACCESS:
20
21           PROBLEM CODE :   [      ]    XXX(no entry when completed)XX
22
23           STATUS CODE :    [ ]  T = Teacher    U = User    D = Deny Access
24
24                       This code exceeds the maximum status
    12345678901234567890123456789012345678901234567890123456789012345678901234567890
             1         2         3         4         5         6         7         8
```

The USERFILE routine is used to provide minimal security to the system and to
differentiate between mentor, teacher and user for any given problem. The
system will establish an initial user code of "EKS" with the status of mentor,
and thereafter, only mentors may use the USERFILE routine. Likewise, only
mentors may use the PROBLEM routine and they may only add teachers and users
for the problem codes for which they are the mentor. They may also deny access
to any teacher or user previously allowed to use a problem code, or vice-versa.

When changing information for any given code, the operator may also change
the code itself (as long as it is not all spaces or equal to any other code
currently in the system). This allows changing the original "EKS" to some
other code for security if desired. When a user code is changed, the system
will scan the User/Problem file and make all the necessary changes in that
file as well; if the User/Problem record identifies that code as a Mentor
for a problem, the system will change the "O" record in the Problem file and
also update the Super-Paradocs Mentor file if it exists.

DECISION TREE PRINTING ROUTINE

The purpose of the TREEPRNT routine is to "construct" and print a decision tree for any valid problem code listed, based on the experience the system has gained so far for that problem. The system uses work files on disk (both relative and key-index files) to construct and then store the decision tree and then the tree is printed out in vertical pages of 70 horizontal positions per page. When the numbered pages are taped together from left to right, the printed representation of the decision tree will be complete. Blank sections of the tree represent portions of the sphere of experience in which interpretations have not yet been confirmed by the mentor or teachers.

The decision tree is constructed of seven-line blocks, each representing one question and the intermediate judgement responses (answers) which have been experienced by the system to-date for that question. The questions are printed out in order of their logical importance (decending LI values). The seven lines for each block are as follows:

```
LINE     CONTENT                    REPRESENTATION

1    Text of Question         XXXXXXXXXXXXXXXXXXXXXXXXXXXXXXX
  2    Vertical Line                            :
  3    Horizontal Line          .............................
  4    Verical Line                 :           :           :
  5    Response(s)         XXXXXXXXXXXXX ... XXXXXXXXXXXXX ... XXXXXXXXXXXXX
  6    Vertical Line                :           :           :
  7    "Arrow"                      V           V           V
```

The program performs its functions in four steps: 1) Creation of a work table, 2) Creation of a sequence table, 3) Creation of print records on disk, and 4) Printing of the tree in logical pages. The following is a detailed explanation of each of these steps:

1. Creation of a Work Table -- The work table is used to derive and store parameters describing:

* The "logical sphere" of the problem (the number of horizontal print positions and veritcal lines it will take to represent the decision tree)

* The relative discriminatory order of the questions (decending LI values)

* Spacial relationships between the questions

Each line of the work table represents one question in the problem and has the following fields:

Q : The question sequence number when arranged in decending values of logical importance; if two or more questions have the same value, their relative order will be the order they appear in the problem file LI : The Logical Importance value for this question Qo : The original question number as found in the problem file NA : The number of different responses experienced for this question (this will be the value of the last column of the Experience Table -- see ANALYSIS write-up)

NE : The total number of entries to be written on the Qth level of the tree; this is equal to the NA for this question times the NE for the previous question, unless Q = 1 in which case the NE is the same value as the NA Once all the lines have been created in the work table (one for each question), the total width of the "paper" required to print the tree (W) is calculated by multiplying the last (i.e., the maximum) NE value by 16 (the number of characters to print "half" a question plus one space; this printing of a question on two lines would only be necessary if the question has only one observed response). The remaining fields in the work table may then be calculated and entered into the table INCR : The horizontal increment between reponses (answers) in this level, which is equal to W divided by NE SPR : The starting point of the first response to this question (this is the mid-point of the text of the response), expressed as the number of characters to be subtracted from the mid-point of the question text; this is equal to:

$$\frac{(NA - 1) \times INCR}{2}$$

2. Creation of a Sequence Table — The Decision Tree Routine must use a consistent sequence with which to report the responses (answers) to each question, and to only print the responses actually encountered. This is done by changing the Experience Table into a Sequence Table. For each row (question), start with the first non-zero entry and insert a "1", the next non-zero entry a "2" and so on. The resulting table will show in what sequence the responses will print on the tree for each question. Responses to integer questions are stored in temporary relative access work files on disk.

3. Creation of Print Records on Disk — The tree is printed from a file which contains a record for each component (question, response, vertical line, horizontal line segment, and interpretation) to be printed. A key indexed file (KIF) is used with a primary (and therefore unique) key value of Line Number / Starting Position / Ending Position. The Line Number is used as a secondary key.

The file is constructed by tracing the pathway used by each conclusion (situation) and the system attempts to create a record for each component used. The use of a key indexed file allows duplicate pathways to be "thrown away". The file has the following format:

| FIELD | LENGTH |
|---|---|
| Line Number | 5 |
| Beginning Position | 5 |
| Ending Position | 5 |
| Type Code | 1 |
|     1 = Vertical Line | |
|     2 = Horizontal Line | |
|     3 = Text | |
| Number of Characters | 2 |
| Text | 30 |

The logic for constructing this file is as follows:

* Each situation in the Situation File is examined one at a time.

* Each data point in the situation is examined in "Q" order based on the Work Table.

* A vertical line record is written at the last vertical line position (for the first data point, this will be W divided by 2). The line counter is incremented by one.

* The text of the question is written with a starting position of the vertical line minus 15; the question should be "centered" based on the position of the last non-space character in the 30 character text line. An exception to this will be if there is only one response to the question, in which case 2 lines of 15 characters are written with a starting position of the vertical line minus 7. The line counter will be incremented by one or two.

* Another vertical line record is written at the same position and the line counter is incremented by one.

* The sequence number of the response in the situation record is determined from the Sequence Table. The starting point of the first response under this question is calculated by subtracting the SPR from the position of the mid-point of the question. The sequence number found is decremented by one, multiplied by the INCR, and added to this starting point. A horizontal line record is written with a
beg. pos. as the position of the last vertical line, and the ending
position as the one just calculated (i.e., the line will be written
left to right or vice versa). The line counter is incremented by one.

* The text of the response is written to the file at a beginning pos-
  ition of the last calculated position minus 7 and the line counter is
  incremented by one. The calculated position becomes the beginning
  position of the first vertical line of the next level, or it minus
  7 becomes the beginning position of the interpretation text lines.

* The interpretation text is written in up to 15 character lines, but
  the system will write less than that if it can find the last space
  character before the end of the line (so that words are not split).

4. Printing of the Tree in Logical Pages — The report will be printed in
  "pages" with a width of 80 print positions; this may represent more than
  one vertical page of paper. At the top of each logical page the system
  will print a solid, horizontal line of astericks for allignment
  purposes, and then the problem code, problem name, date and page number.
  Each key file record will be read in line number order and checked to
  see if any portion of its length falls within the 80 characters being
  printed. The pages will be "compressed" so that only columns which have
  text description or vertical lines will actually be printed.

```
                         TREEPRNT PROGRAM
                          FIRST SCREEN 1         2         3         4         5         6         7         8
    12345678901234567890123456789012345678901234567890123456789012345678901234567890
 01          P A R A D O C S    D E V E L O P M E N T    S Y S T E M
 02                   **** DECISION TREE PRINTING ROUTINE ****
 03              YOUR USER CODE: XXXXXX       Sorry, this code is not valid
 03              YOUR USER NAME: XXXXXXXXXXXXXXXXXXXXXXXXXXX
 04               PROBLEM CODE: XXXXXXXX      XXX(no entry when completed)XX
 05
 06         LEVEL      QUESTION           DESCRIPTION         MAXIMUM PAGES REQUIRED
 07          NO.       NUMBER     (in order of logical importance)  TO PRINT THIS LEVEL
 08           1          99       XXXXXXXXXXXXXXXXXXXXXXXXXXX          999999
 09           2          99       XXXXXXXXXXXXXXXXXXXXXXXXXXX          999999
 10           3          99       XXXXXXXXXXXXXXXXXXXXXXXXXXX          999999
 11           4          99       XXXXXXXXXXXXXXXXXXXXXXXXXXX          999999
 12           5          99       XXXXXXXXXXXXXXXXXXXXXXXXXXX          999999
 13           6          99       XXXXXXXXXXXXXXXXXXXXXXXXXXX          999999
 14           7          99       XXXXXXXXXXXXXXXXXXXXXXXXXXX          999999
 15           8          99       XXXXXXXXXXXXXXXXXXXXXXXXXXX          999999
 16           9          99       XXXXXXXXXXXXXXXXXXXXXXXXXXX          999999
 17          10          99       XXXXXXXXXXXXXXXXXXXXXXXXXXX          999999
 18          11          99       XXXXXXXXXXXXXXXXXXXXXXXXXXX          999999
 19          12          99       XXXXXXXXXXXXXXXXXXXXXXXXXXX          999999
 20
 22        PROCESSING PAGE NUMBER:              AND LINE NUMBER:
 23                         READY FOR MORE ? [ ]
 23            DO YOU WISH TO DISPLAY THIS TABLE AGAIN ? [ ]
 23        PLEASE WAIT - NOW PROCESSING SITUATION 999 / QUESTION 99
 23                   READY TO PRINT THIS REPORT ? [ ]
 24       SELECT LEVEL NUMBER  [ ]     SELECT SITUATION NUMBER  [ ]
    12345678901234567890123456789012345678901234567890123456789012345678901234567890
             1         2         3         4         5         6         7         8

TREEPRNT REPORT HEADING

********************************************************************************

99/99/99           DECISION TREE REPRESENTATION         Page 999 of 999

PROBLEM CODE:   XXXXXXXX
                          PROBLEM NAME:   XXXXXXXXXXXXXXXXXXXXXXXXXXX
```

5. "Pruning" the Tree — Because the logical space of many problems is
  large, the full decision tree representation may be thousands of pages
  wide. Even though this representation is logically correct and insightful,
  the mechanics of assembling and reviewing the printed tree are too cumber-
  some to make the method generally useful. Since the questions are ordered
  in decending order of logical importance, the distinctions represented by the upper nodes of the tree are greater and, therefore, more obvious to the
knowledgeable user; the logical differecnes of the most interest to one
reviewing the decision tree are represented at or near the bottom of the
tree. The system will therefore allow the operator to "prune" a portion
of the tree in one of two ways. First, the operator is given the option to
enter 1 or more situation numbers for which the tree will be generated.
If this option is not selected, a list of the questions is displayed (as
shown above) and the operator selects the "level" below which the detail
of the tree should print. If this is other than level 1, the system will
ask for the situation number around which the tree will be constructed.
The only situations which will appear, therefore, are those which match
the listed situation for all data-points above the level listed.

```
                           TREEPRNT PROGRAM
                             FIRST SCREEN 1         2         3         4         5         6         7         8
    12345678901234567890123456789012345678901234567890123456789012345678901234567890
    01        P A R A D O C S    D E V E L O P M E N T    S Y S T E M
    02              **** DECISION TREE PRINTING ROUTINE ****
    03         YOUR USER CODE: XXXXXX        Sorry, this code is not valid
    03         YOUR USER NAME: XXXXXXXXXXXXXXXXXXXXXXXXXXXXXX
    04           PROBLEM CODE: XXXXXXXX      XXX(no entry when completed)XX
    05
    06 DO YOU WISH TO "BUILD" THE DECISION TREE FROM SPECIFIC SITUATION(S) ?    [ ]
    07
    08 LIST SITUATION NUMBERS TO BE REPRESENTED IN THE TREE  (1 TO 9999):     [    ]
    09       (Valid numbers are 1 to 9999 - no entry when completed)
    10
    11             SITUATION NUMBERS ALREADY SELECTED:
    12
    13      9999    9999    9999    9999    9999    9999    9999    9999    9999    9999
    14      9999    9999    9999    9999    9999    9999    9999    9999    9999    9999
    15      9999    9999    9999    9999    9999    9999    9999    9999    9999    9999
    16      9999    9999    9999    9999    9999    9999    9999    9999    9999    9999
    17
    22      PROCESSING PAGE NUMBER:              AND LINE NUMBER:
    23                     READY FOR MORE ?  [ ]
    23           DO YOU WISH TO DISPLAY THIS TABLE AGAIN ?  [ ]
    23      PLEASE WAIT   -   NOW PROCESSING SITUATION 999 / QUESTION 99
    23                READY TO PRINT THIS REPORT ?  [ ]
    24       SELECT LEVEL NUMBER   [ ]       SELECT SITUATION NUMBER   [ ]
    12345678901234567890123456789012345678901234567890123456789012345678901234567890
             1         2         3         4         5         6         7         8

LINKED PROBLEM FILE MAINTENANCE
                               FIRST SCREEN 1         2         3         4         5         6         7         8
    12345678901234567890123456789012345678901234567890123456789012345678901234567890
    01        P A R A D O C S    D E V E L O P M E N T    S Y S T E M
    02              *** LINKED PROBLEM FILE MAINTENANCE ***
    03    YOUR USER CODE:     [     ]          XXXXXXXXXXXXXXXXXXXXXXXXXXXXXX
    03    YOUR USER CODE:     [     ]          This user code is not valid
    03    YOUR USER CODE:     [     ]          Sorry, you may not use this program
    04LINKED PROBLEM CODE:  [        ]                        NEW ?   [ ]
    04LINKED PROBLEM CODE:  [XXXXXXXX]      This is a primary problem
    5PRIMARY PROBLEM CODE:  [        ]      XXXXXXXXXXXXXXXXXXXXXXXXXXXXXX
    5PRIMARY PROBLEM CODE:  [XXXXXXXX]      This is not a primary problem
    06    DO YOU WISH TO "COPY" A PROBLEM CURRENTLY IN THE SYSTEM ?   [ ]
    6PROBLEM CODE TO COPY: [        ]       IS THIS CORRECT ?   [ ]
    07    PROBLEM NAME:   [                                  ]   UPDATE DATABASE ? [ ]
    08      DO YOU WISH TO DELETE OR REINSTATE A QUESTION ?     [ ]         DELETE ? [ ]
    09
    10      QUESTION NUMBER:       [ ]       List "00" when completed
    11      DESCRIPTION:           [                              ]
    12      YES / NO QUESTION ?  [ ]             CALCULATED QUESTION ?      [ ]
    13      FOR REFERENCE ONLY ? [ ]             INTEGER VALUE ?            [ ]
    14      UNIT DESCRIPTION:      [              ]
    15        LOWER INT. LIMIT:  [         ]      UPPER INT. LIMIT: [           ]
    15        1ST LOWER BOUNDARY:[         ]      1ST UPPER BOUNDARY:[          ]
    16        2ND LOWER BOUNDARY:[         ]      2ND UPPER BOUNDARY:[          ]
```

```
17      REQUIRED ?           [ ]                         STATUS :   xxxxxxxx
18      PLEASE ENTER CALCULATION FORMULA (SEE OPERATING INSTURCTIONS):
19        ENTER CONSTANT, QUESTION NO. ("#nn"), OR PREVIOUS ("P"): [         ]
20        NUMBER OF PREVIOUS TIME PERIODS TO BE READ FROM DATA-BASE:   [     ]
20        OPERATION CHARACTER: [ ]      + add, - subtract, * multiply, / divide,
21          E exponent, R square root, C change sign, A absolute value, S store
22                       ANY MORE ENTRIES ?  [ ]     FORMULA TOO LARGE
23      REPRESENTATION OF THE FORMULA (MAXIMUM 80 CHARACTERS):
#1,S;#2,-;#3,/;#4,E;2,S;#5,*;#6,S;2,E;P,/;#7,E;P,/;
24            ARE YOU SURE YOU WISH TO DELETE THIS QUESTION ?   [ ]
24            ARE YOU SURE YOU WISH TO REINSTATE THIS QUESTION ?   [ ]
24                       THIS QUESTION IS DELETED
24                     THIS QUESTION IS NOT DELETED
12345678901234567890123456789012345678901234567890123456789012345678901234567890
```

The Linked Problem File Maintenance routine allows a teacher or a mentor to
establish or change problems on the system which may be "linked" to a specific
primary problem. Each situation for this primary problem may have up to four
linked problems associated with it. When each linked problem is initially
established, the operator is given the option of "copying" the questions and ex-
perience (situations and interpretations) from an existing primary or secondary
problem into this new problem.

Other than the first screen format shown above, this program is exactly like
that of the Problem File Maintenance routine (see PROBLEM specifications).

APPENDIX B

```
                DEVELOPMENT UTILITIES -- "SITFILE" ROUTINE 1         2         3         4         5         6         7         8
12345678901234567890123456789012345678901234567890123456789012345678901234567890
01        P A R A D O C S     D E V E L O P M E N T     S Y S T E M
02                      **** SITUATION FILE CHANGE ****
03
04   PROBLEM CODE:   [         ]            XXXXXXXXXXXXXXXXXXXXXXXXXXXXX
05
06   RECORD NUMBER: [  ]                  PRINT FILE ?   [ ]
07
08        SITUATION DESCRIPTION:
XXXXXXXXXXXXXXXXXXXXXXXXXXXXXXXXXXXXXXXXXXXXXXXXXXXXXXXXXXXXXXXXXXXXXXXXXXXXXX
10
11        NEXT SITUATION :  [     ]
12
13        PROBLEM LINK 1 :  [         ]        PROBLEM LINE 2 : [         ]
14
15        PROBLEM LINK 3 :  [         ]        PROBLEM LINE 4 : [         ]
16
17        AUTHOR CODE: XXXXXX    DATE ENTERED: XXXXXXXX   DATE LAST USED: XXXXXXX
18
19        QUESTION NUMBER: [  ]     No Entry When Completed
20
21           CODE VALUE: [         ]
22
12345678901234567890123456789012345678901234567890123456789012345678901234567890
```

The SITFILE routine allows an operator to change any existing situation record
or print the contents of all situations for a given problem code.

```
                DEVELOPMENT UTILITIES - "DATABASE" ROUTINE 1         2         3         4         5         6         7         8
12345678901234567890123456789012345678901234567890123456789012345678901234567890
01        P A R A D O C S     D E V E L O P M E N T     S Y S T E M
02                      **** DATA BASE FILE CHANGE ****
03
04   PROBLEM CODE:   [         ]
05   DATE OF ENTRY:  [         ]  MM/DD/YY
06   SEQUENCE NO. :  [    ]                   PRINT FILE ?   [ ]
07   RECORD NUMBER:  [    ]
08
09        SITUATION NUMBER: XXXX     USER CODE: XXXXXX    ID: XXXXXXXXXXXXXX
```

```
10
11       EXAMPLE NAME :  XXXXXXXXXXXXXXXXXXXXXXXXXXXX   NEXT SEQ. : [        ]
12
14
15       FIRST RESPONSE: [            ]         SECOND RESPONSE: [            ]
16
17       THIRD RESPONSE: [            ]         FOURTH RESPONSE: [            ]
18
   123456789012345678901234567890123456789012345678901234567890123456789012345678901234567890
```

The DATABASE routine allows an operator to add or change a database record for any existing problem code, or to print all the database entries for existing problem code / entry date.

IMPLEMENTATION ON THE TI PROFESSIONAL COMPUTER

The PARADOCS system is implemented on the Texas Instruments Professional Computer using MS-PASCAL and the MS-DOS operating system. The system is essentially the same as described in this manual; the primary differences involve the file naming scheme and the fact that there are currently no keyed index files supported in MS-PASCAL for the PC. File naming conventions are:

| FILE | TI BUSINESS SYSTEMS | TI PROFESSIONAL COMPUTER |
|---|---|---|
| Problem File | .PARADOCS.PROB.\<name\> | \<name\>.PRB |
| Situation File | .PARADOCS.SIT.\<name\> | \<name\>.SIT |
| Description File | .PARADOCS.DESC.\<name\> | \<name\>.DSC |
| Computation File | .PARADOCS.COMP.\<name\> | \<name\>.CMP |
| User File | .PARADOCS.USERFILE | USERFILE.PRD |
| User/Problem File | .PARADOCS.UPRBFILE | UPRBFILE.PRD |
| "Super" Mentor File | .PARADOCS.MENT.\<name\> | \<name\>.MNT |
| Data Base File | .PARADOCS.DATABASE | \<name\>.DBF |
| LI Update File | .PARADOCS.UPDTnn | UPDTFILE.WRK |
| Text Work File | .PARADOCS.TXTnn | TEXTFILE.WRK |
| Interp. Work File | .PARADOCS.INTRnn | INTERPRT.WRK |
| Major Match Work File | .PARADOCS.MTCHnn | MJRMATCH.WRK |
| Approx. Match Work File | .PARADOCS.APRXnn | APRMATCH.WRK |
| Response Work File | .PARADOCS.RESPnn | RESPONSE.WRK |
| Treeprnt Work Files | .PARADOCS.SITSnn | LISTSITS.WRK |
|  | .PARADOCS.INTGnn.Qnn | Qnn.WRK |
|  | .PARADOCS.KEYnn | KEYFILE.WRK |
|  | .PARADOCS.COLnn | COLFILE.WRK |
|  |  | SRTFILE.WRK |
|  |  | TREEREPT.WRK |

The Data Base file on the PC, being a relative access file, uses just a long integer as the sequence number (rather than a sequence number / record number combination). The records are grouped as sets depending how many questions are included in the problem; since up to 5 responses are stored per record, a problem with 16 questions uses a 3 record set. The system calculates an absolute record number to retrieve from the data base as required. Adding addtional questions to the problem will cause the data base to be reinitialized for that problem code. The record layout is as follows:

```
            Next Sequence Number        NEXT_SEQ          LONG INT
            First Response              RESP1              10 A
            Second Response             RESP2              10 A
            Third Response              RESP3              10 A
            Fourth Response             RESP4              10 A
            Fifth Response              RESP5              10 A
SOURCE  = .PARADOCS.SRC.PROBLEM
OBJECT  = .PARADOCS.OBJ.PROBLEM
LISTING = .PARADOCS.LST.PROBLEM
MESSAGE = .PARADOCS.L
MEM1 = 6,4
MEM2 = 13,4
MEM3 = 10,4
PRINT WIDTH = 80
NUMBER OF LINES/PAGE = 60
OPTIONS = (* NO OPTIONS SPECIFIED *)
SUPPRESS PREPROCESSOR LINES = YES LINE NUMBER                    COPY FILE PATHNAME
       52    .PARADOCS.SRC.LAYOUT
       84    .PARADOCS.SRC.VAR
      106    .PARADOCS.SRC.IO
(*+            PROBLEM_
     +            ACPT_YES
     ,            CHECK_CO
     ,            CLEAR_LI
     ,            NUMERIC_
     ,            PROB_DES
     +              CHANGE_D
                  QUESTION
     +              ASSUME_N
     ,              BOUNDARI
     ,              QST_CALC
                  REFERENC
     +              REF_SCRE
     ,              RESP_ACP
     +                CALC_RES
                *)
17      {$WIDELIST,MAP,PAGE,}
18
19      { ***************************************************************
20
21        The following is a flowchart of the procedures used (excluding
22        screen and other small misc. procedures):
23
24
25                        PROBLEM_MAINTENANCE
26                                !
27                                !
28        ----------------------------------------------------------------
29        !              !                       !                       !
30        !              !        CLEAR_LINE     !                       !
31    CHECK_CODE         !     NUMERIC_CHECK     !                       !
32                       !       ACPT_YES_NO     !                       !
33                       !                       !                       !
34     ######OVERLAY 1#####    #######OVERLAY 2#######   #####OVERLAY 3#####
35     #                  #    #                     #   #                  #
36     #    QUESTIONS     #    #      REFERENCE      #   #                  #
37     #        !         #    #          !          #   #    PROB_DESC     #
38     #   -----------    #    #      --------       #   #        !         #
39     #   !   !     !    #    #   !             !   #   #        !         #
40     # ASSUME !  QST    #    # REF    RESP_ACPT    #   #   CHANGE_DESC    #
41     #   NO  !  CALC    #    # SCREEN      !       #   #                  #
42     #     BOUNDARIES   #    #      CALC_RESPONSE# #   #                  #
43     ####################    #######################   ####################
44
45        ***************************************************************}
46
47
48      PROGRAM PROBLEM_MAINTENANCE;
49
50      TYPE
51
```

```
52          SET_OF_CHAR = SET OF CHAR ;
53          VDT_CONTROL = ARRAY[1..16] OF INTEGER;
54
55      { The following is the record layout for the relative PROBLEM file }
56
57      PROB_RECORD=RECORD         CASE BOOLEAN OF
58                          TRUE:
59
60      { This is the "O" record layout for this file }
61
62        (PROBLEM_CODE    : PACKED ARRAY[1..8] OF CHAR;
63         DESCRIPTION     : PACKED ARRAY[1..30] OF CHAR;
64         NEXT_QUESTION   : INTEGER ;
65         INT_QUESTIONS   : INTEGER ;
66         TIMES_USED      : INTEGER ;
67         TOPIC_CODE      : PACKED ARRAY[1..8] OF CHAR;
68         DATE_ENTERED    : PACKED ARRAY[1..8] OF CHAR;
69         DATE_LAST_USED  : PACKED ARRAY[1..8] OF CHAR;
70         MENTOR_CODE     : PACKED ARRAY[1..6] OF CHAR;
71         NUM_SITUATIONS  : INTEGER ;
72         MINIMUM LI      : INTEGER ;
73         CALC_LI_FLAG    : CHAR ;
74         FLAG1_FUTURE    : CHAR ;
75         FLAG2_FUTURE    : CHAR ;
76         FLAG3_FUTURE    : CHAR ;
77         DATA_BASE       : CHAR ;
78         PRIMARY_CODE    : PACKED ARRAY[1..8] OF CHAR);
79
80
81                   FALSE:
82
83      { This is the "1" through "Nth" record layout    }
84
85        (NUM_QUESTION    : PACKED ARRAY[1..2] OF CHAR;
86         DESC_QUESTION   : PACKED ARRAY[1..30] OF CHAR;
87         YES_NO          : CHAR;
88         CALCULATE       : CHAR;
89         INT_QUEST       : CHAR;
90         REFERENCE       : CHAR;
91         UNIT_DESC       : PACKED ARRAY[1..10] OF CHAR;
92         BOUNDARIES      : INTEGER ;
93         LOWER_1_LIMIT   : REAL ;
94         UPPER_1_LIMIT   : REAL ;
95         LOWER_2_LIMIT   : REAL ;
96         UPPER_2_LIMIT   : REAL ;
97         REQUIRED        : CHAR;
98         LGCL_IMPT       : INTEGER ;
99         EXPT_IMPT       : INTEGER ;
100        LGCL_INTR       : INTEGER ;
101        EXPT_INTR       : INTEGER ;
102        LGCL_CMPL       : INTEGER ;
103        EXPT_CMPL       : INTEGER ;
104        STATUS_CODE     : CHAR;
105        SORT_FLAG       : CHAR;
106        FLAG6_FUTURE    : CHAR;
107        FLAG7_FUTURE    : CHAR;
108        FLAG8_FUTURE    : CHAR)
109     END;
110
111
112     { The following is the record layout for the relative SITUATION file }
113
114     SIT_RECORD=RECORD
115
116        SIT_NUM          : PACKED ARRAY[1..4] OF CHAR;
117        SIT_DESCRIPTION: PACKED ARRAY[1..80] OF CHAR;
118        NEXT_SIT         : INTEGER ;
119        PROB1_LINK       : PACKED ARRAY[1..8] OF CHAR;
120        PROB2_LINK       : PACKED ARRAY[1..8] OF CHAR;
121        PROB3_LINK       : PACKED ARRAY[1..8] OF CHAR;
122        PROB4_LINK       : PACKED ARRAY[1..8] OF CHAR;
123        AUTHOR_CODE      : PACKED ARRAY[1..6] OF CHAR;
124        DATE_ENTERED     : PACKED ARRAY[1..8] OF CHAR;
125        DATE_LAST_USED   : PACKED ARRAY[1..8] OF CHAR;
126        NUM_ENCOUNTERS   : INTEGER ;
```

```
127        SINC_STRING       : PACKED ARRAY[1..50] OF INTEGER ;   { ########## }
128        FLAG1_FUTURE      : CHAR ;
129        FLAG2_FUTURE      : CHAR ;
130        FLAG3_FUTURE      : CHAR ;
131        FLAG4_FUTURE      : CHAR ;
132     END;
133
134
135     { The following is the record layout for the relative DESCRIPTION file }
136
137     DESC_RECORD=RECORD
138
139        NEXT_RECORD       : PACKED ARRAY[1..4] OF CHAR;
140        SIT_NUMBER        : PACKED ARRAY[1..4] OF CHAR;
141        TEXT_LINE         : PACKED ARRAY[1..80] OF CHAR;
142     END;
143
144
145     { The following is the record layout for the sequential USERFILE file;
146       later it will be changed to a KIF file, but initially it will be
147       established as a RELATIVE file                                      }
148
149     USER_RECORD=RECORD
150
151        NEXT_RECORD       : PACKED ARRAY[1..4] OF CHAR ;
152        USER_CODE         : PACKED ARRAY[1..6] OF CHAR ;
153        USER_NAME         : PACKED ARRAY[1..30] OF CHAR ;
154        USER_TITLE        : PACKED ARRAY[1..30] OF CHAR ;
155        ADDRESS1          : PACKED ARRAY[1..30] OF CHAR ;
156        ADDRESS2          : PACKED ARRAY[1..30] OF CHAR ;
157        ADDRESS3          : PACKED ARRAY[1..30] OF CHAR ;
158        PHONE             : PACKED ARRAY[1..12] OF CHAR ;
159        MAX_STATUS        : CHAR ;
160        PRINTER           : CHAR ;
161        NUM_PROBLEMS      : PACKED ARRAY[1..4] OF CHAR ;
162        DATE_ENTERED      : PACKED ARRAY[1..8] OF CHAR ;
163        DATE_LAST_USED    : PACKED ARRAY[1..8] OF CHAR ;
164        TOTAL_TIMES       : PACKED ARRAY[1..6] OF CHAR ;
165     END ;
166
167
168     { The following is the record layout for the sequential USERPROB file;
169       late it will be changed to a KIF file, but initially it will be
170       established as a RELATIVE file                                      }
171
172     USER_PROBLEM_RECORD=RECORD
173
174        NEXT_RECORD       : PACKED ARRAY[1..4] OF CHAR ;
175        USER_CODE         : PACKED ARRAY[1..6] OF CHAR ;
176        PROBLEM_CODE      : PACKED ARRAY[1..8] OF CHAR ;
177        STATUS_CODE       : CHAR ;
178        TIMES_USED        : PACKED ARRAY[1..4] OF CHAR ;
179     END ;
180
181     { The following is the record layout for the RELATIVE work file which
182       is used to store the actual responses to the questions as they are
183       being entered and then used for input to calculated questions       }
184
185     RESP_RECORD=RECORD
186        RESPONSE          : PACKED ARRAY[1..10] OF CHAR ;
187     END ;
188
189
190     { The following is the layout of the RELATIVE formula file used for
191       calculated questions                                                }
192
193     COMP_RECORD=RECORD
194        RCD_NUMBER        : PACKED ARRAY[1..2] OF CHAR ;
195        FORMULA           : PACKED ARRAY[1..80] OF CHAR ;
196     END ;
197
198     {$PAGE}
199     { ****************************************************************}
200
201     { PROGRAM }
```

```
202
203     VAR
204
205     CPY_PROB        : RANDOM FILE OF PROB_RECORD ;
206     WORKRESP        : RANDOM FILE OF RESP_RECORD ;
207     COMPFILE        : RANDOM FILE OF COMP_RECORD ;
208     RESP            : RESP_RECORD ;
209     COMP            : COMP_RECORD ;
210
211     PROBLEM         : RANDOM FILE OF PROB_RECORD;
212     SITUATION       : RANDOM FILE OF SIT_RECORD;
213     DESCRIPTION     : RANDOM FILE OF DESC_RECORD;
214     USERFILE        : RANDOM FILE OF USER_RECORD;
215     U_PROB_FILE     : RANDOM FILE OF USER_PROBLEM_RECORD;
216
217     USER            : USER_RECORD;
218     USER_PROB       : USER_PROBLEM_RECORD;
219     PROB            : PROB_RECORD;
220     SIT             : SIT_RECORD;
221     DESC            : DESC_RECORD;
222
223     USER_CODE       :   PACKED ARRAY[1..6] OF CHAR ;
224     USER_RECORDS , U_PROB_RECORDS : INTEGER ;
225     USER_NAME , U_PROB_NAME : PACKED ARRAY[1..8] OF CHAR ;
226     PROBLEM_FILE : PACKED ARRAY[1..8] OF CHAR;
227     DESC_NODE , PROB_NODE , SIT_NODE    : PACKED ARRAY[1..8] OF CHAR;
228     VDT_BLK : VDT_CONTROL;
229
230     RESPNAME        : PACKED ARRAY[1..8] OF CHAR ;
231     COMP_NODE       : PACKED ARRAY[1..8] OF CHAR ;
232     CALC_FLAG , T , DUMY : CHAR;
233     NUMBER , PROB_RCD_NUMBER , USER_RCD_NUMBER : INTEGER ;
234     RECORD_COUNTER , LINE_COUNTER , QUEST_NUMBER , NEXT_QUESTION : INTEGER;
235     INT_JUDGEMENT_CODE , TOTAL_QUESTIONS , INT_QUESTIONS : INTEGER ;
236     YES , CHANGE , OVAL , ERROR_STATUS , NEW_QUEST , NEW_PROB : BOOLEAN ;
237     INTGR , REFRNCE , CALCULATE , DONE : BOOLEAN ;
238     COMPARE_REQUIRED , ALL_SET , ENTRY_REQUIRED , YES_NO_RESP : BOOLEAN ;
239     EQUAL , QUESTIONS_ADDED : BOOLEAN ;
240     MINIMUM , SIT_NUMBER , BEGINNING_NUMBER , STAT : INTEGER;
241     NEW_SIT_NUMBER , TOTAL_SITUATIONS : INTEGER ;
242     ASCII_NUMBER : PACKED ARRAY[1..6] OF CHAR;
243     DUMMY : PACKED ARRAY[1..2] OF CHAR;
244     DATA_BSE , DELETE , REINSTATE , SKIP_ENTRY : BOOLEAN ;
245     TEST_STRING : PACKED ARRAY[1..50] OF INTEGER ;  { ########## }
246     RESP_STRING : PACKED ARRAY[1..10] OF CHAR ;
247
248     { ****************************************************************}
249
250
251     {     The following are screen and file handling procedures         }
252
253     PROCEDURE SETFILLER(VAR VDT$ : VDT_CONTROL ;
254         FILL_CHAR: CHAR);
255             EXTERNAL;
256
257     PROCEDURE CLEARSCREEN(VAR VDT$ : VDT_CONTROL);  EXTERNAL;
258
259     PROCEDURE INITSCREEN(VAR VDT$: VDT_CONTROL; LUNO: INTEGER); EXTERNAL;
260
261     PROCEDURE DISPLAY(VAR VDT$: VDT_CONTROL; LINE: INTEGER;
262         COLUMN : INTEGER; BUFFER: PACKED ARRAY[1..?] OF CHAR;
263         LENGTH : INTEGER); EXTERNAL;
264
265     PROCEDURE ACCEPT(VAR VDT$: VDT_CONTROL; LINE,COLUMN: INTEGER;
266         VAR BUFFER: PACKED ARRAY[1..?] OF CHAR; LENGTH: INTEGER;
267         VAR TERM_CHAR: CHAR); EXTERNAL;
268
269
270     { *************************************************************** }
271
272
273     PROCEDURE OVLY$(OVERLAY_NUMBER : INTEGER);  EXTERNAL ;
274
275     PROCEDURE CLEAR_LINE (LINE_NUMBER : INTEGER) ;    FORWARD ;
276
```

```
277      PROCEDURE NUMERIC_CHECK ( VAR FIELD : PACKED ARRAY[1..?] OF CHAR ;
278                                NUM_OF_POS : INTEGER ;
279                           VAR STATUS_FLAG : BOOLEAN );    FORWARD ;
280
281      PROCEDURE ACPT_YES_NO ( VAR YES_NO : CHAR ;
282                              X , Y : INTEGER ;
283                          VAR STATUS_FLAG : BOOLEAN );    FORWARD ;
284
285      PROCEDURE CHECK_CODE ( ROW , COLUMN : INTEGER ;
286                    VAR DONE , ERROR_STATUS : BOOLEAN ;
287                    VAR USER_RCD_NUMBER : INTEGER );    FORWARD ;
288
289      PROCEDURE QUESTIONS ;     FORWARD ;
290
291      PROCEDURE REFERENCE ;     FORWARD ;
292
293      PROCEDURE PROB_DESC ;     FORWARD ;
294
295
296      (*+                                                                    *)
297      { ****************************************************************}
298      {           The following checks for correct "Y/N" response        }
299
300      PROCEDURE ACPT_YES_NO ;
301
302          VAR    YES_NO_SET , YES_SET : SET_OF_CHAR;
303
304          BEGIN
305   2       STATUS_FLAG := FALSE ;
306   3       YES_NO_SET := ['Y','y','N','n'] ;
307   4       YES_SET := ['Y','y'] ;
308   5
309   6       REPEAT
310   7         ACCEPT(VDT_BLK,X,Y,DUMMY,1,T);
311   8         YES_NO := DUMMY[1] ;
312   9       UNTIL ( YES_NO IN YES_NO_SET ) ;
313  10       IF ( YES_NO IN YES_SET ) THEN
314  11           STATUS_FLAG := TRUE;
315  12       IF YES_NO = 'y' THEN
316  13           YES_NO := 'Y';
317  14       IF YES_NO = 'n' THEN
318  15           YES_NO := 'N';
319          END;   { ACPT_YES_NO }
```

MAP OF IDENTIFIERS FOR   ACPT_YES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
320
321
322      (*,                                                                    *)
323      { ****************************************************************}
324
325      PROCEDURE CHECK_CODE ;
326
327      { This procedure captures a user code for a given row and column
328        and if it is blank, it marks the DONE boolean as true; if it
329        cannot find the entered code, it marks the ERROR_STATUS boolean
330        as true; if user code is found, the relative USER_RCD_NUMBER
331        is returned and the user name is displayed on the screen         }
332
333      VAR     LOCATED         : BOOLEAN ;
334
335      BEGIN   { CHECK_CODE }
336
```

```
337  3      DONE := FALSE ;
338  4      ERROR_STATUS := FALSE ;
339  5
340  6      ACCEPT(VDT_BLK,ROW,COLUMN,USER_CODE,6,T);
341  7
342  8      IF USER_CODE = '      ' THEN DONE := TRUE ;
343  9
344 10      IF NOT DONE THEN
345 11      BEGIN
346 12         LOCATED := FALSE ;
347 13         USER_RCD_NUMBER := 0 ;
348 14         FOR T := 0 TO USER_RECORDS DO
349 15            IF NOT LOCATED THEN
350 16            BEGIN
351 17               READ(USERFILE,T,USER);
352 18               IF USER.USER_CODE = USER_CODE THEN
353 19                  LOCATED := TRUE ;
354 20               IF NOT LOCATED THEN USER_RCD_NUMBER := USER_RCD_NUMBER + 1 ;
355 21            END ;
356 22
357 23         IF NOT LOCATED THEN ERROR_STATUS := TRUE
358 24         ELSE BEGIN
359 25            DISPLAY(VDT_BLK,ROW,41,USER.USER_NAME,30);
360 26         END ;
361 27
362 28  { The operator must be a mentor to use this program                    }
363 29
364 30         IF LOCATED AND USER.MAX_STATUS <> 'M' THEN
365 31         BEGIN
366 32            DONE := TRUE ;
367 33            DISPLAY(VDT_BLK,ROW,41,'Sorry, you are not a mentor   ',99);
368 34         END ;
369 35
370 36      END ;
371 37
372     END ;   { CHECK_CODE }
```

MAP OF IDENTIFIERS FOR   CHECK_CO

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| ROW | PARAMETER | (2,0) | #0028 | DIRECT |
| COLUMN | PARAMETER | (2,0) | #002A | DIRECT |
| DONE | PARAMETER | (0,1) | #002C | INDIRECT |
| ERROR_STATUS | PARAMETER | (0,1) | #002E | INDIRECT |
| USER_RCD_NUMBER | PARAMETER | (2,0) | #0030 | INDIRECT |
| LOCATED | VARIABLE | (0,1) | #0032 | DIRECT |

```
373  (*,                                                                     *)
374  { ***********************************************************************}
375  { The following procedure clears a line on the display                   }
376
377  PROCEDURE CLEAR_LINE ;
378
379  VAR   LINE_DATA  :  PACKED ARRAY[1..80] OF CHAR ;
380         N          :  CHAR ;
381
382     BEGIN
383
384  3   FOR N := 1 TO 80 DO
385  4      LINE_DATA[N] := ' ';
386  5   DISPLAY(VDT_BLK,LINE_NUMBER,1,LINE_DATA,80);
387  6
388     END ;   { CLEAR_LINE }
```

MAP OF IDENTIFIERS FOR   CLEAR_LI

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| LINE_NUMBER | PARAMETER | (2,0) | #0028 | DIRECT |
| LINE_DATA | VARIABLE | (80,0) | #002A | DIRECT |
| N | VARIABLE | (0,8) | #007A | DIRECT |

```
389
390    (*,                                                                    *)
391    {*******************************************************************}
392    {           The following checks for a proper numeric entry         }
393
394    PROCEDURE NUMERIC_CHECK ;
395
396         VAR    CHAR_SET : SET_OF_CHAR ;
397                N        : INTEGER ;
398
399      BEGIN
400  2    STATUS_FLAG := FALSE ;
401  3    CHAR_SET := [' ','0','1','2','3','4','5','6','7','8','9','.',',',
402  4                                                              '-','+'];
403  5    FOR N := 1 TO NUM_OF_POS DO
404  6    BEGIN
405  7       DUMY := FIELD[N];
406  8       IF NOT ( DUMY IN CHAR_SET )
407  9          THEN STATUS_FLAG := TRUE ;
408 10    END;
409      END ;  { NUMERIC_CHECK }
```

MAP OF IDENTIFIERS FOR  NUMERIC_

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| FIELD | PARAMETER | 2(002A) | #002C | INDIRECT |
| NUM_OF_POS | PARAMETER | (2,0) | #002E | DIRECT |
| STATUS_FLAG | PARAMETER | (0,1) | #0030 | INDIRECT |
| CHAR_SET | VARIABLE | (32,0) | #0032 | DIRECT |
| N | VARIABLE | (2,0) | #0052 | DIRECT |

```
410
411    (*,                                                                    *)
412    {*******************************************************************}
413    { This procedure accepts the basic description line for the inter-  }
414    { pretation, and captures up to 12 additional description lines     }
415
416    PROCEDURE PROB_DESC ;
417
418    VAR   BASIC_DESC , ADD_DESC  :  PACKED ARRAY[1..80] OF CHAR ;
419          LINES    :  PACKED ARRAY[1..12,1..80] OF CHAR ;
420          LIMIT , NEXT_RECORD , LINE  :   INTEGER ;
421          LINK_PTR , LINK_CHAR , DSPL_PTR  :  INTEGER ;
422          VALID_LINKS , FOUND_LINK  :  BOOLEAN ;
423          PROB_LINK   :  PACKED ARRAY[1..4,1..8] OF CHAR ;
424          LINK_DISPLAY :  PACKED ARRAY[1..8] OF CHAR ;
425          R_ALL_SPACES :  BOOLEAN ;
426
427    PROCEDURE CHANGE_DESC ;    FORWARD ;
428
429
430    (*+                                                                    *)
431    {*******************************************************************}
432
433    { The following procedure changes the sit. number for extra description
434      records previously entered for the old "normal" situation when one
435        or more questions are added to the problem                       }
436
437    PROCEDURE CHANGE_DESC ;
438
439    VAR
440           NEXT_RECORD : INTEGER ;
441           LIMIT , NUMBER   : INTEGER ;
442
443      BEGIN   { CHANGE_DESC }
444
445  3    READ(DESCRIPTION,0,DESC);
446  4    DECODE(DESC.NEXT_RECORD,1,STAT,NEXT_RECORD);
447  5    IF NEXT_RECORD > 1 THEN
448  6    BEGIN
449  7       LIMIT := NEXT_RECORD - 1 ;
```

```
450   8          FOR RECORD_COUNTER := 1 TO LIMIT DO
451   9          BEGIN
452  10             READ(DESCRIPTION, RECORD_COUNTER, DESC);
453  11             DECODE(DESC.SIT_NUMBER, 1, STAT, NUMBER);
454  12             IF NUMBER = 0 THEN
455  13             BEGIN
456  14                ENCODE(DESC.SIT_NUMBER, 1, STAT, NEW_SIT_NUMBER:4);
457  15                WRITE(DESCRIPTION, RECORD_COUNTER, DESC);
458  16             END ;
459  17          END ;
460  18       END;
461  19
462       END ;   { CHANGE_DESC }
```

MAP OF IDENTIFIERS FOR  CHANGE_D

| IDENTIFIER NAME | KIND | SIZE (BYTES, BITS) LEVEL(DISPL) | STACK DISPLACEMENT (BYTE, BIT) | PICTURE (PACKED FIELDS ONLY) |
|---|---|---|---|---|
| NEXT_RECORD | VARIABLE | (2,0) | #0028 | DIRECT |
| LIMIT | VARIABLE | (2,0) | #002A | DIRECT |
| NUMBER | VARIABLE | (2,0) | #002C | DIRECT |

```
463      (*-                                                                    *)
464      BEGIN   { PROB_DESC }
465
466   3  CLEARSCREEN(VDT_BLK);
467   4
468   5  READ(PROBLEM, 0, PROB);
469   6  DISPLAY(VDT_BLK, 1, 12, 'P A R A D O C S     D E V E L O P M E N T',
470   7                                                                99);
471   8  DISPLAY(VDT_BLK, 1, 56, 'S Y S T E M', 99);
472   9  DISPLAY(VDT_BLK, 3, 22, '**** INTERPRETATION DESCRIPTION ****', 99);
473  10  DISPLAY(VDT_BLK, 4, 25, 'Please describe this situation', 99);
474  11  DISPLAY(VDT_BLK, 6, 06, 'PROBLEM CODE: ', 99);
475  12  DISPLAY(VDT_BLK, 6, 25, PROBLEM_FILE, 8);
476  13  DISPLAY(VDT_BLK, 6, 43, PROB.DESCRIPTION, 30);
477  14  DISPLAY(VDT_BLK, 8, 1, '----------------------', 99);
478  15  DISPLAY(VDT_BLK, 8, 24, 'B A S I C     D E S C R I P T I O N', 99);
479  16  DISPLAY(VDT_BLK, 8, 60, '----------------------', 99);
480  17  DISPLAY(VDT_BLK, 10, 1, '------------------', 99);
481  18  DISPLAY(VDT_BLK, 10, 19, 'A D D I T I O N A L     ', 99);
482  19  DISPLAY(VDT_BLK, 10, 41, 'D E S C R I P T I O N S', 99);
483  20  DISPLAY(VDT_BLK, 10, 66, '------------------', 99);
484  21  DISPLAY(VDT_BLK, 24, 30, 'CORRECT ?    [ ]', 99);
485  22
486  23  YES := FALSE ;
487  24
488  25  { Display old reference situation description if questions have been
489  26    added or deleted questions have been reinstated                    }
490  27
491  28  IF QUESTIONS_ADDED THEN
492  29  BEGIN
493  30     READ(SITUATION, 0, SIT);
494  31     DISPLAY(VDT_BLK, 9, 1, SIT.SIT_DESCRIPTION, 80);
495  32     READ(DESCRIPTION, 0, DESC);
496  33     DECODE(DESC.NEXT_RECORD, 1, STAT, NEXT_RECORD);
497  34     NEXT_RECORD := NEXT_RECORD - 1 ;
498  35     IF NEXT_RECORD > 0 THEN
499  36     BEGIN
500  37        LINE := 11 ;
501  38        FOR T := 1 TO NEXT_RECORD DO
502  39        BEGIN
503  40           READ(DESCRIPTION, T, DESC);
504  41           DECODE(DESC.SIT_NUMBER, 1, STAT, SIT_NUMBER);
505  42           IF SIT_NUMBER = 0 THEN
506  43           BEGIN
507  44              IF LINE < 23 THEN
508  45                 DISPLAY(VDT_BLK, LINE, 1, DESC.TEXT_LINE, 80);
509  46              LINE := LINE + 1 ;
510  47           END ;
511  48        END
512  49     END ;
513  50     CHANGE_DESC ;
```

```
514  51     END ;
515  52
516  53     REPEAT
517  54
518  55     { Accept basic description (cannot be all spaces)                    }
519  56
520  57        REPEAT
521  58           ACCEPT(VDT_BLK,9,1,BASIC_DESC,80,T);
522  59           R_ALL_SPACES := TRUE ;
523  60           FOR T := 1 TO 80 DO
524  61              IF BASIC_DESC[T] <> ' ' THEN
525  62                 R_ALL_SPACES := FALSE ;
526  63        UNTIL R_ALL_SPACES = FALSE ;
527  64
528  65     { Accept up to 12 additional lines of description which may include
529  66       up to 4 valid secondary linked problem codes in brackets            }
530  67
531  68        LINK_PTR := 0 ;
532  69        FOR T := 1 TO 4 DO
533  70           PROB_LINK[T] := '        ';
534  71        R_ALL_SPACES := FALSE ;
535  72        RECORD_COUNTER := 1 ;
536  73        FOR LINE_COUNTER := 11 TO 22 DO
537  74        BEGIN
538  75           IF NOT R_ALL_SPACES THEN
539  76           BEGIN
540  77              ACCEPT(VDT_BLK,LINE_COUNTER,1,ADD_DESC,80,T);
541  78              LINES[RECORD_COUNTER] := ADD_DESC ;
542  79              R_ALL_SPACES := TRUE ;
543  80              FOR T := 1 TO 80 DO
544  81                 IF ADD_DESC[T] <> ' ' THEN
545  82                    R_ALL_SPACES := FALSE ;
546  83
547  84              IF NOT R_ALL_SPACES THEN
548  85              BEGIN
549  86                 RECORD_COUNTER := RECORD_COUNTER + 1 ;
550  87
551  88     { Check for linked problem codes in brackets                          }
552  89
553  90                 FOUND_LINK := FALSE ;
554  91                 FOR T := 1 TO 80 DO
555  92                 BEGIN
556  93                    IF FOUND_LINK AND ADD_DESC[T] = ']' THEN
557  94                       FOUND_LINK := FALSE ;
558  95                    IF FOUND_LINK
559  96                       AND ADD_DESC[T] <> ' '
560  97                       AND LINK_CHAR < 9 THEN
561  98                    BEGIN
562  99                       PROB_LINK[LINK_PTR,LINK_CHAR] := ADD_DESC[T] ;
563 100                       LINK_CHAR := LINK_CHAR + 1 ;
564 101                    END ;
565 102                    IF NOT FOUND_LINK AND ADD_DESC[T] = '[' AND LINK_PTR <> 4
566 103                    THEN BEGIN
567 104                       LINK_CHAR := 1 ;
568 105                       FOUND_LINK := TRUE ;
569 106                       LINK_PTR := LINK_PTR + 1
570 107                    END ;
571 108                 END ;
572 109              END ;
573 110           END ;
574 111        END ;
575 112
576 113     { If linked problems have been entered, check for validity            }
577 114
578 115        DSPL_PTR := 42 ;
579 116        CLEAR_LINE(23) ;
580 117        VALID_LINKS := TRUE ;
581 118        IF LINK_PTR > 0 THEN FOR T := 1 TO LINK_PTR DO
582 119        BEGIN
583 120           IF VALID_LINKS THEN
584 121           BEGIN
585 122              DISPLAY(VDT_BLK,23,6,'Linked Problems for this situation:',99);
586 123              LINK_DISPLAY := PROB_LINK[T] ;
587 124              DISPLAY(VDT_BLK,23,DSPL_PTR,LINK_DISPLAY,8);
588 125              DSPL_PTR := DSPL_PTR + 9 ;
```

```
589126          CLOSE(CPY_PROB);
590127          SETMEMBER(CPY_PROB,PROB_NODE,LINK_DISPLAY);
591128          IOTERM(CPY_PROB,OVAL,FALSE);
592129          RESET(CPY_PROB);
593130          IF STATUS(CPY_PROB) <> 0 THEN
594131          BEGIN
595132             VALID_LINKS := FALSE ;
596133             CLEAR_LINE(23) ;
597134             DISPLAY(VDT_BLK,23,16,LINK_DISPLAY,8);
598135             DISPLAY(VDT_BLK,23,25,'is not a valid problem code',99);
599136          END ELSE BEGIN
600137             READ(CPY_PROB,0,PROB);
601138             IF PROB.PRIMARY_CODE <> PROBLEM_FILE THEN
602139             BEGIN
603140                VALID_LINKS := FALSE ;
604141                CLEAR_LINE(23);
605142                DISPLAY(VDT_BLK,23,16,LINK_DISPLAY,8);
606143                DISPLAY(VDT_BLK,23,25,'is not a secondary code ',99);
607144                DISPLAY(VDT_BLK,23,49,'for this problem',99);
608145             END ;
609146          END ;
610147        END ;
611148      END ;
612149
613150      IF RECORD_COUNTER < 12 THEN
614151      BEGIN
615152         LIMIT := RECORD_COUNTER + 11 ;
616153         FOR LINE := 22 DOWNTO LIMIT DO
617154         BEGIN
618155            FOR T := 1 TO 80 DO ADD_DESC[T] := ' ';
619156            DISPLAY(VDT_BLK,LINE,1,ADD_DESC,80);
620157         END ;
621158      END;
622159
623160      IF VALID_LINKS THEN ACPT_YES_NO(DUMY,24,43,YES);
624161
625162   UNTIL YES ;
626163
627164   READ(SITUATION,0,SIT);
628165   SIT.SIT_DESCRIPTION := BASIC_DESC ;
629166   SIT.PROB1_LINK := PROB_LINK[1] ;
630167   SIT.PROB2_LINK := PROB_LINK[2] ;
631168   SIT.PROB3_LINK := PROB_LINK[3] ;
632169   SIT.PROB4_LINK := PROB_LINK[4] ;
633170   WRITE(SITUATION,0,SIT);
634171
635172   RECORD_COUNTER := RECORD_COUNTER - 1 ;
636173
637174   IF RECORD_COUNTER > 0 THEN
638175   BEGIN
639176      READ(DESCRIPTION,0,DESC);
640177      DECODE(DESC.NEXT_RECORD,1,STAT,NEXT_RECORD);
641178      DESC.SIT_NUMBER := '   0';
642179      FOR LINE := 1 TO RECORD_COUNTER DO
643180      BEGIN
644181         DESC.TEXT_LINE := LINES[LINE] ;
645182         WRITE(DESCRIPTION,NEXT_RECORD,DESC);
646183         NEXT_RECORD := NEXT_RECORD + 1 ;
647184      END ;
648185      ENCODE(DESC.NEXT_RECORD,1,STAT,NEXT_RECORD:4);
649186      WRITE(DESCRIPTION,0,DESC);
650187   END ;
651188
652      END ;   { PROB_DESC }
```

MAP OF IDENTIFIERS FOR PROB_DES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| BASIC_DESC | VARIABLE | (80,0) | #0028 | DIRECT |
| ADD_DESC | VARIABLE | (80,0) | #0078 | DIRECT |
| LINES | VARIABLE | (960,0) | #00C8 | DIRECT |

| | | | | |
|---|---|---|---|---|
| LIMIT | VARIABLE | (2,0) | #0488 | DIRECT |
| NEXT_RECORD | VARIABLE | (2,0) | #048A | DIRECT |
| LINE | VARIABLE | (2,0) | #048C | DIRECT |
| LINK_PTR | VARIABLE | (2,0) | #048E | DIRECT |
| LINK_CHAR | VARIABLE | (2,0) | #0490 | DIRECT |
| DSPL_PTR | VARIABLE | (2,0) | #0492 | DIRECT |
| VALID_LINKS | VARIABLE | (0,1) | #0494 | DIRECT |
| FOUND_LINK | VARIABLE | (0,1) | #0496 | DIRECT |
| PROB_LINK | VARIABLE | (32,0) | #0498 | DIRECT |
| LINK_DISPLAY | VARIABLE | (8,0) | #04B8 | DIRECT |
| R_ALL_SPACES | VARIABLE | (0,1) | #04C0 | DIRECT |

```
653    (*,                                                             *)
654    { ******************************************************** }
655
656    PROCEDURE QUESTIONS ;
657
658    { This procedure will add, change, delete or reinstate questions for
659      this problem                                                  }
660
661    LABEL 300 ;
662
663
664    PROCEDURE ASSUME_NO ( VAR YES_NO : CHAR ;
665                              X , Y  : INTEGER ;
666                          VAR STATUS_FLAG : BOOLEAN ) ;   FORWARD ;
667
668
669    PROCEDURE QST_CALC ;    FORWARD ;
670
671    PROCEDURE BOUNDARIES ; FORWARD ;
672
673    { ******************************************************** }
674
675    (*+                                                              *)
676
677    PROCEDURE ASSUME_NO ;
678
679    { This procedure is the same as ACPT_YES_NO except that if a blank
680      entry is made, it will automatically be filled in with a "N"   }
681
682        VAR    YES_NO_SET , YES_SET : SET_OF_CHAR;
683
684    BEGIN   { ASSUME_NO }
685
686  3     STATUS_FLAG := FALSE ;
687  4     YES_NO_SET := ['Y','y','N','n'] ;
688  5     YES_SET := ['Y','y'] ;
689  6
690  7     REPEAT
691  8       ACCEPT(VDT_BLK,X,Y,DUMMY,1,T);
692  9       IF DUMMY[1] = ' ' THEN
693 10       BEGIN
694 11         DUMMY[1] := 'N' ;
695 12         DISPLAY(VDT_BLK,X,Y,'N]',2);
696 13       END ;
697 14       YES_NO := DUMMY[1] ;
698 15     UNTIL ( YES_NO IN YES_NO_SET ) ;
699 16     IF ( YES_NO IN YES_SET ) THEN
700 17         STATUS_FLAG := TRUE;
701 18     IF YES_NO = 'y' THEN
702 19         YES_NO := 'Y';
703 20     IF YES_NO = 'n' THEN
704 21         YES_NO := 'N';
705 22
706    END;   { ASSUME_NO }
```

MAP OF IDENTIFIERS FOR   ASSUME_N

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |

| | | | | |
|---|---|---|---|---|
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
707      (*,                                                                          *)
708      { ******************************************************************* }
709
710      PROCEDURE BOUNDARIES ;
711
712         { This routine checks for valid upper and lower limits IF the
713           question is NOT a Y/N type nor an INTEGER or REFERENCE type         }
714
715      BEGIN   { BOUNDARIES }
716
717  3              IF NOT INTGR AND NOT REFRNCE THEN
718  4              BEGIN
719  5                REPEAT
720  6                  ALL_SET := FALSE;
721  7
722  8    { If no entry on 1st lower boundary, there are no boundaries at all;
723  9      if an entry is made, the system will check to make sure the lower
724 10      is less than or equal to the upper                                  }
725 11
726 12                  ENTRY_REQUIRED := FALSE ;
727 13                  IF CHANGE AND PROB.BOUNDARIES > 0 THEN
728 14                     ENTRY_REQUIRED := TRUE ;
729 15                  RESP_STRING := '             ';
730 16                  IF NOT CHANGE OR PROB.BOUNDARIES > 0 THEN
731 17                     ACCEPT(VDT_BLK,15,30,RESP_STRING,10,T);
732 18                  IF RESP_STRING = '            ' AND NOT ENTRY_REQUIRED
733 19                  THEN BEGIN
734 20                     PROB.LOWER_1_LIMIT := 0 ;
735 21                     PROB.UPPER_1_LIMIT := 0 ;
736 22                     PROB.LOWER_2_LIMIT := 0 ;
737 23                     PROB.UPPER_2_LIMIT := 0 ;
738 24                     PROB.BOUNDARIES    := 0 ;
739 25                     ALL_SET := TRUE ;
740 26                     CLEAR_LINE(15);
741 27                  END ;
742 28                  IF RESP_STRING <> '            ' THEN
743 29                  BEGIN
744 30                     DECODE(RESP_STRING,1,STAT,PROB.LOWER_1_LIMIT);
745 31                     ENCODE(RESP_STRING,1,STAT,PROB.LOWER_1_LIMIT:10:2);
746 32                     DISPLAY(VDT_BLK,15,30,RESP_STRING,10);
747 33                     IF RESP_STRING[1] <> '*' THEN ALL_SET := TRUE ;
748 34                     IF PROB.BOUNDARIES <> 2 THEN PROB.BOUNDARIES := 1 ;
749 35                  END ;
750 36                UNTIL ALL_SET ;
751 37
752 38                IF PROB.BOUNDARIES > 0 THEN REPEAT
753 39                  ALL_SET := FALSE ;
754 40                  ACCEPT(VDT_BLK,15,67,RESP_STRING,10,T);
755 41                  DECODE(RESP_STRING,1,STAT,PROB.UPPER_1_LIMIT);
756 42                  ENCODE(RESP_STRING,1,STAT,PROB.UPPER_1_LIMIT:10:2);
757 43                  DISPLAY(VDT_BLK,15,67,RESP_STRING,10);
758 44                  IF RESP_STRING[1] <> '*' AND
759 45                     PROB.LOWER_1_LIMIT <= PROB.UPPER_1_LIMIT THEN
760 46                        ALL_SET := TRUE ;
761 47                UNTIL ALL_SET ;
762 48
763 49 { If first set of boundaries were entered, check for an optional
764 50   second set                                                           }
765 51
766 52                IF PROB.BOUNDARIES > 0 THEN
767 53                BEGIN
768 54                   DISPLAY(VDT_BLK,16,10,'2ND LOWER BOUNDARY: [         ]',
769 55                                                                       99);
770 56                   DISPLAY(VDT_BLK,16,47,'2ND UPPER BOUNDARY: [         ]',
771 57                                                                       99);
772 58                   IF PROB.BOUNDARIES = 2 THEN
773 59                   BEGIN
774 60                      ENCODE(RESP_STRING,1,STAT,PROB.LOWER_2_LIMIT:10:2);
775 61                      DISPLAY(VDT_BLK,16,30,RESP_STRING,30);
```

```
776  62                    ENCODE(RESP_STRING,1,STAT,PROB.UPPER_2_LIMIT:10:2);
777  63                    DISPLAY(VDT_BLK,16,67,RESP_STRING,30);
778  64                END ;
779  65
780  66                ALL_SET := FALSE;
781  67
782  68  { If no entry on 2nd lower boundary, no secondary boundaries will
783  69    be captured                                                      }
784  70
785  71                REPEAT
786  72                  ENTRY_REQUIRED := FALSE ;
787  73                  IF CHANGE AND PROB.BOUNDARIES > 1 THEN
788  74                     ENTRY_REQUIRED := TRUE ;
789  75                  RESP_STRING := '          ';
790  76                  IF NOT CHANGE OR PROB.BOUNDARIES > 1 THEN
791  77                     ACCEPT(VDT_BLK,16,30,RESP_STRING,10,T);
792  78                  IF RESP_STRING = '          ' AND NOT ENTRY_REQUIRED
793  79                    THEN BEGIN
794  80                       PROB.LOWER_2_LIMIT := 0 ;
795  81                       PROB.UPPER_2_LIMIT := 0 ;
796  82                       PROB.BOUNDARIES    := 1 ;
797  83                       ALL_SET := TRUE ;
798  84                       CLEAR_LINE(16);
799  85                    END ;
800  86                  IF RESP_STRING <> '          ' THEN
801  87                    BEGIN
802  88                       DECODE(RESP_STRING,1,STAT,PROB.LOWER_2_LIMIT);
803  89                       ENCODE(RESP_STRING,1,STAT,PROB.LOWER_2_LIMIT:10:2);
804  90                       DISPLAY(VDT_BLK,16,30,RESP_STRING,10);
805  91                       IF RESP_STRING[1] <> '*'
806  92                          AND PROB.LOWER_2_LIMIT < PROB.LOWER_1_LIMIT
807  93                             THEN ALL_SET := TRUE ;
808  94                       PROB.BOUNDARIES := 2 ;
809  95                    END ;
810  96                UNTIL ALL_SET ;
811  97
812  98                IF PROB.BOUNDARIES = 2 THEN REPEAT
813  99                   ALL_SET := FALSE ;
814 100                   ACCEPT(VDT_BLK,16,67,RESP_STRING,10,T);
815 101                   DECODE(RESP_STRING,1,STAT,PROB.UPPER_2_LIMIT);
816 102                   ENCODE(RESP_STRING,1,STAT,PROB.UPPER_2_LIMIT:10:2);
817 103                   DISPLAY(VDT_BLK,16,67,RESP_STRING,10);
818 104                   IF RESP_STRING[1] <> '*'
819 105                      AND PROB.LOWER_2_LIMIT <= PROB.UPPER_2_LIMIT
820 106                      AND PROB.UPPER_2_LIMIT >  PROB.UPPER_1_LIMIT
821 107                        THEN ALL_SET := TRUE ;
822 108                UNTIL ALL_SET ;
823 109              END ;
824 110            END ;
825 111
826 112  { Capture absolute limits for integer question                     }
827 113
828 114            IF INTGR THEN
829 115            BEGIN
830 116              REPEAT
831 117                ALL_SET := FALSE ;
832 118                ACCEPT(VDT_BLK,15,30,RESP_STRING,10,T);
833 119                DECODE(RESP_STRING,1,STAT,NUMBER);
834 120                ENCODE(RESP_STRING,1,STAT,NUMBER);
835 121                DISPLAY(VDT_BLK,15,30,RESP_STRING,10);
836 122                PROB.LOWER_1_LIMIT := NUMBER * 1 ;
837 123                ACCEPT(VDT_BLK,15,67,RESP_STRING,10,T);
838 124                DECODE(RESP_STRING,1,STAT,NUMBER);
839 125                ENCODE(RESP_STRING,1,STAT,NUMBER);
840 126                DISPLAY(VDT_BLK,15,67,RESP_STRING,10);
841 127                PROB.UPPER_1_LIMIT := NUMBER * 1 ;
842 128                IF PROB.UPPER_1_LIMIT > PROB.LOWER_1_LIMIT AND
843 129                   PROB.UPPER_1_LIMIT <= 32767 AND
844 130                   PROB.LOWER_1_LIMIT >= -32765 THEN
845 131                   ALL_SET := TRUE ;
846 132              UNTIL ALL_SET ;
847 133              PROB.BOUNDARIES := 1 ;
848 134            END ;
849 135
```

```
850      END ;   { BOUNDARIES }
851      (*,                                                                          *)
852      PROCEDURE QST_CALC ;
853
854      { This procedure will accept and check for valid formula entries for
855        a calculated question                                                       }
856
857      VAR     ENTRY        : PACKED ARRAY[1..12] OF CHAR ;
858              LEFT_JSTFD   : PACKED ARRAY[1..12] OF CHAR ;
859              BUFFER       : PACKED ARRAY[1..80] OF CHAR ;
860              TIME_ACPT    : PACKED ARRAY[1..6] OF CHAR ;
861              TIME_JSTFD   : PACKED ARRAY[1..6] OF CHAR ;
862              TIME_PER     : INTEGER ;
863              OP_CHAR      : CHAR ;
864              VALID        : BOOLEAN ;
865              DATA_BASE    : BOOLEAN ;
866              FIRST_ENTRY  : BOOLEAN ;
867              FINISHED     : BOOLEAN ;
868              SPACE_FOUND  : BOOLEAN ;
869              REPEAT_ENTRY : BOOLEAN ;
870              FOUND_DECIMAL: BOOLEAN ;
871              FOUND_MINUS  : BOOLEAN ;
872              DECIMAL_PLACES : INTEGER ;
873              PTR_FORMULA  : INTEGER ;
874              PTR_BUFFER   : INTEGER ;
875              PTR1         : INTEGER ;
876              PTR2         : INTEGER ;
877
878      BEGIN   { QST_CALC }
879
         { Open up computation formula file and display screen fields; write
880        blank formula records for any question number records not already
881        in the computation file                                                     }
882
883
884  7     SETMEMBER(COMPFILE,COMP_NODE,PROBLEM_FILE);
885  8     EXTEND(COMPFILE);
886  9     PTR1 := 1 ;
887 10     FOR N := 0 TO (NEXT_QUESTION - 1) DO
888 11     BEGIN
889 12        FOR T := 1 TO 80 DO
890 13           COMP.FORMULA[T] := ' ' ;
891 14        ENCODE(COMP.RCD_NUMBER,1,STAT,PTR1:2);
892 15        READ(COMPFILE,N,COMP);
893 16        IF COMP.FORMULA[1] = ' ' THEN
894 17           WRITE(COMPFILE,N,COMP);
895 18        PTR1 := PTR1 + 1 ;
896 19     END ;
897 20
898 21     FOR T := 1 TO 80 DO
899 22        BUFFER[T] := ' ';
900 23     PTR_FORMULA := 1 ;
901 24     PTR_BUFFER  := 1 ;
902 25     FIRST_ENTRY := TRUE ;
903 26     FINISHED := FALSE ;
904 27     READ(COMPFILE,QUEST_NUMBER,COMP);
905 28
906 29     DISPLAY(VDT_BLK,23,8,'REPRESENTATION OF THE FORMULA ',99);
907 30     DISPLAY(VDT_BLK,23,38,'(maximum 80 characters) :',99);
908 31     DISPLAY(VDT_BLK,18,8,'PLEASE ENTER CALCULATION FORMULA ',99);
909 32     DISPLAY(VDT_BLK,18,41,'(see operating instructions) :',99);
910 33     DISPLAY(VDT_BLK,19,10,'ENTER CONSTANT, QUESTION NO. ("##nn")',99);
911 34     DISPLAY(VDT_BLK,19,46,', OR PREVIOUS ("P"): [          ] ',99);
912 35     CLEAR_LINE(22);
913 36     DISPLAY(VDT_BLK,22,24,'ANY MORE ENTRIES ?  [ ]',99);'
914 37
915 38     REPEAT   { UNTIL FINISHED }
916 39
917 40 { If there is a previously entered formula, display the first field  }
918 41
919 42        ENTRY := '            ';
920 43        IF COMP.FORMULA[PTR_FORMULA] <> ' ' THEN
921 44        BEGIN
922 45           PTR1 := 1 ;
923 46           WHILE COMP.FORMULA[PTR_FORMULA] <> ',' DO
924 47           BEGIN
```

```
925  48              ENTRY[PTR1] := COMP.FORMULA[PTR_FORMULA] ;
926  49              PTR1 := PTR1 + 1 ;
927  50              PTR_FORMULA := PTR_FORMULA + 1 ;
928  51            END ;
929  52            PTR_FORMULA := PTR_FORMULA + 1 ;
930  53         END ;
931  54         DISPLAY(VDT_BLK, 19, 68, ENTRY, 11);
932  55         CLEAR_LINE(20);
933  56         CLEAR_LINE(21);

934  57         VALID := FALSE ;
935  58         DATA_BASE := FALSE ;
936  59
937  60  { Accept valid field entry or all spaces                              }
938  61
939  62         REPEAT  { UNTIL VALID OR ENTRY = '           ' }
940  63
941  64            REPEAT_ENTRY := FALSE ;
942  65            ACCEPT(VDT_BLK, 19, 68, ENTRY, 11, T);
943  66
944  67            IF ENTRY <> '           ' THEN
945  68            BEGIN
946  69
947  70  { Left-justify entry and remove intervening spaces                    }
948  71
949  72               LEFT_JSTFD := '           ';
950  73               PTR1 := 1 ;
951  74               FOR N := 1 TO 11 DO
952  75               BEGIN
953  76                  IF ENTRY[N] <> ' ' THEN
954  77                  BEGIN
955  78                     LEFT_JSTFD[PTR1] := ENTRY[N] ;
956  79                     PTR1 := PTR1 + 1 ;
957  80                  END ;
958  81               END ;
959  82               ENTRY := LEFT_JSTFD ;
960  83               DISPLAY(VDT_BLK, 19, 68, ENTRY, 11);
961  84            END ;
962  85
963  86  { Check for "Previous" entry (not allowed on first entry)             }
964  87
965  88            IF ENTRY[1] = 'P' THEN
966  89            BEGIN
967  90               REPEAT_ENTRY := TRUE ;
968  91               IF NOT FIRST_ENTRY THEN VALID := TRUE ;
969  92               FOR N := 2 TO 11 DO
970  93                  ENTRY[N] := ' ' ;
971  94               DISPLAY(VDT_BLK, 19, 68, ENTRY, 11);
972  95            END ;
973  96
974  97  { Check for valid question number entry for "#nn"                     }
975  98
976  99            IF NOT REPEAT_ENTRY AND ENTRY[1] = '##' THEN
977 100            BEGIN
978 101               REPEAT_ENTRY := TRUE ;
979 102               DUMMY[1] := ENTRY[2] ;
980 103               DUMMY[2] := ENTRY[3] ;
981 104               FOR N := 2 TO 11 DO
982 105                  ENTRY[N] := ' ' ;
983 106               DECODE(DUMMY, 1, STAT, PTR1);
984 107               ENCODE(DUMMY, 1, STAT, PTR1:2);
985 108               IF DUMMY[1] = ' ' THEN ENTRY[2] := DUMMY[2] ELSE
986 109               BEGIN
987 110                  ENTRY[2] := DUMMY[1] ;
988 111                  ENTRY[3] := DUMMY[2] ;
989 112               END ;
990 113               DISPLAY(VDT_BLK, 19, 68, ENTRY, 11);
991 114               IF PTR1 > 0 AND PTR1 < QUEST_NUMBER THEN
992 115               BEGIN
993 116                  READ(PROBLEM, PTR1, PROB);
994 117                  IF PROB.YES_NO = 'N'
995 118                     AND PROB.STATUS_CODE <> 'D' THEN VALID := TRUE ;
996 119                  READ(PROBLEM, QUEST_NUMBER, PROB);
997 120               END ;
998 121            END ;
```

```
999122
1000123   { Check for valid question number entry for "@nn"                                    }
1001124
1002125             DATA_BASE := FALSE ;
1003126             IF NOT REPEAT_ENTRY AND ENTRY[1] = '@'
1004127             THEN BEGIN
1005128                REPEAT_ENTRY := TRUE ;
1006129                DUMMY[1] := ENTRY[2] ;
1007130                DUMMY[2] := ENTRY[3] ;
1008131                FOR N := 2 TO 11 DO
1009132                   ENTRY[N] := ' ' ;
1010133                DECODE(DUMMY,1,STAT,PTR1);
1011134                ENCODE(DUMMY,1,STAT,PTR1:2);
1012135                IF DUMMY[1] = ' ' THEN ENTRY[2] := DUMMY[2] ELSE
1013136                BEGIN
1014137                   ENTRY[2] := DUMMY[1] ;
1015138                   ENTRY[3] := DUMMY[2] ;
1016139                END ;
1017140                DISPLAY(VDT_BLK,19,68,ENTRY,11);
1018141                IF PTR1 > 0 AND PTR1 < NEXT_QUESTION THEN
1019142                BEGIN
1020143                   READ(PROBLEM,PTR1,PROB);
1021144                   IF PROB.YES_NO = 'N'
1022145                      AND PROB.STATUS_CODE <> 'D' THEN VALID := TRUE ;
1023146                   IF VALID THEN DATA_BASE := TRUE ;
1024147                   READ(PROBLEM,QUEST_NUMBER,PROB);
1025148                END ;
1026149             END ;
1027150
1028151   { Check for valid numeric entry, maximum 2 decimal places; minus sign
1029152     (if any) must appear as first character                                             }
1030153
1031154             IF NOT REPEAT_ENTRY AND ENTRY <> '            ' THEN
1032155             BEGIN
1033156                LEFT_JSTFD := ENTRY ;
1034157                ENTRY := '            ';
1035158                SPACE_FOUND := FALSE ;
1036159                VALID := TRUE ;
1037160                FOUND_MINUS := FALSE ;
1038161                FOUND_DECIMAL := FALSE ;
1039162                DECIMAL_PLACES := 0 ;
1040163                FOR N := 1 TO 11 DO
1041164                BEGIN
1042165                   IF NOT SPACE_FOUND THEN
1043166                   BEGIN
1044167                      CASE LEFT_JSTFD[N] OF
1045168                         ' ' : SPACE_FOUND := TRUE ;
1046169                         '1' , '2' , '3' , '4' , '5' ,
1047170                         '6' , '7' , '8' , '9' , '0' ,
1048171                         '-' , '.' : ENTRY[N] := LEFT_JSTFD[N] ;
1049172                      OTHERWISE
1050173                         VALID := FALSE ;
1051174                         ENTRY[N] := LEFT_JSTFD[N] ;
1052175                      END ;
1053176
1054177                      IF FOUND_DECIMAL AND VALID THEN
1055178                      BEGIN
1056179                         IF LEFT_JSTFD[N] = '.' THEN
1057180                            VALID := FALSE ELSE
1058181                         BEGIN
1059182                            DECIMAL_PLACES := DECIMAL_PLACES + 1 ;
1060183                            IF DECIMAL_PLACES > 2 THEN ENTRY[N] := ' ';
1061184                         END ;
1062185                      END ;
1063186
1064187                      IF FOUND_MINUS AND LEFT_JSTFD[N] = '-'
1065188                         THEN VALID := FALSE ;
1066189                      IF LEFT_JSTFD[N] = '.' THEN FOUND_DECIMAL := TRUE ;
1067190                      IF LEFT_JSTFD[N] = '-' THEN FOUND_MINUS := TRUE ;
1068191
1069192                   END ;
1070193                END ;
1071194                IF FOUND_MINUS AND ENTRY[1] <> '-' THEN VALID := FALSE ;
1072195                DISPLAY(VDT_BLK,19,68,ENTRY,11);
1073196             END ;
```

```
1074197
1075198          UNTIL VALID OR ENTRY = '              ' ;
1076199
1077200  { Check to see if this is a "data-base" entry and accept time periods}
1078201
1079202     IF DATA_BASE AND ENTRY <> '              ' THEN
1080203     BEGIN
1081204        DISPLAY(VDT_BLK,20,10,'NUMBER OF PREVIOUS TIME PERIODS TO ',99);
1082205        DISPLAY(VDT_BLK,20,45,'BE READ FROM DATA-BASE:   [     ]   ',99);
1083206        VALID := FALSE ;
1084207
1085208  { Display previously entered data, if any                              }
1086209
1087210        TIME_ACPT := '      ';
1088211        IF COMP.FORMULA[PTR_FORMULA] <> ' ' THEN
1089212        BEGIN
1090213           PTR1 := 1 ;
1091214           WHILE COMP.FORMULA[PTR_FORMULA] <> ';' DO
1092215           BEGIN
1093216              TIME_ACPT[PTR1] := COMP.FORMULA[PTR_FORMULA] ;
1094217              PTR_FORMULA := PTR_FORMULA + 1 ;
1095218              PTR1 := PTR1 + 1 ;
1096219           END ;
1097220           PTR_FORMULA := PTR_FORMULA + 1 ;
1098221        END ;
1099222        DISPLAY(VDT_BLK,20,71,TIME_ACPT,5);
1100223
1101224        REPEAT    { UNTIL VALID }
1102225           VALID := FALSE ;
1103226           ACCEPT(VDT_BLK,20,71,TIME_ACPT,5,T);
1104227           DECODE(TIME_ACPT,1,STAT,TIME_PER);
1105228           ENCODE(TIME_ACPT,1,STAT,TIME_PER:5);
1106229           TIME_JSTFD := TIME_ACPT ;
1107230           TIME_ACPT := '      ';
1108231           PTR1 := 1 ;
1109232           FOR N := 1 TO 6 DO
1110233           BEGIN
1111234              IF TIME_JSTFD[N] <> ' ' THEN
1112235              BEGIN
1113236                 TIME_ACPT[PTR1] := TIME_JSTFD[N] ;
1114237                 PTR1 := PTR1 + 1 ;
1115238              END ;
1116239           END ;
1117240           DISPLAY(VDT_BLK,20,71,TIME_ACPT,5);
1118241           IF TIME_PER > 0 THEN VALID := TRUE ;
1119242        UNTIL VALID ;
1120243        FIRST_ENTRY := FALSE ;
1121244     END ;
1122245
1123246  { If not a "data-base" entry, accept the operation character           }
1124247
1125248     IF NOT DATA_BASE AND ENTRY <> '              ' THEN
1126249     BEGIN
1127250        DISPLAY(VDT_BLK,20,10,'OPERATION CHARACTER: [ ]    + add,',99);
1128251        DISPLAY(VDT_BLK,20,45,' - subtract, * multiply, / divide, ',99);
1129252        DISPLAY(VDT_BLK,21,12,'E exponent, R square root, C change',99);
1130253        DISPLAY(VDT_BLK,21,47,' sign, A absolute value, S store ',99);
1131254        VALID := FALSE ;
1132255
1133256  { Display previously entered data, if any                              }
1134257
1135258        TIME_ACPT := '      ';
1136259        IF COMP.FORMULA[PTR_FORMULA] <> ' ' THEN
1137260        BEGIN
1138261           PTR1 := 1 ;
1139262           WHILE COMP.FORMULA[PTR_FORMULA] <> ';' DO
1140263           BEGIN
1141264              TIME_ACPT[PTR1] := COMP.FORMULA[PTR_FORMULA] ;
1142265              PTR_FORMULA := PTR_FORMULA + 1 ;
1143266              PTR1 := PTR1 + 1 ;
1144267           END ;
1145268           PTR_FORMULA := PTR_FORMULA + 1 ;
1146269        END ;
1147270        DISPLAY(VDT_BLK,20,32,TIME_ACPT,1);
```

```
1148271
1149272        REPEAT      { UNTIL VALID }
1150273           IF FIRST_ENTRY THEN TIME_ACPT[1] := 'S' ELSE
1151274              ACCEPT(VDT_BLK,20,32,TIME_ACPT,1,T);
1152275           FIRST_ENTRY := FALSE ;
1153276           DISPLAY(VDT_BLK,20,32,TIME_ACPT,1);
1154277           CASE TIME_ACPT[1] OF
1155278              '+' , '-' , '*' , '/' ,
1156279              'E' , 'R' , 'C' , 'A' ,
1157280              'S' : VALID := TRUE ;
1158281           OTHERWISE VALID := FALSE ;   END ;
1159282        UNTIL VALID ;
1160283     END ;
1161284
1162285 { Update buffer and display with new formula entries                        }
1163286
1164287     IF ENTRY <> '                ' THEN
1165288     BEGIN
1166289        PTR1 := 1 ;
1167290        WHILE ENTRY[PTR1] <> ' ' DO
1168291        BEGIN
1169292           BUFFER[PTR_BUFFER] := ENTRY[PTR1] ;
1170293           PTR1 := PTR1 + 1 ;
1171294           IF PTR_BUFFER < 80 THEN
1172295              PTR_BUFFER := PTR_BUFFER + 1 ;
1173296        END ;
1174297        BUFFER[PTR_BUFFER] := ',' ;
1175298        IF PTR_BUFFER < 80 THEN PTR_BUFFER := PTR_BUFFER + 1 ;
1176299        PTR1 := 1 ;
1177300        WHILE TIME_ACPT[PTR1] <> ' ' DO
1178301        BEGIN
1179302           BUFFER[PTR_BUFFER] := TIME_ACPT[PTR1] ;
1180303           PTR1 := PTR1 + 1 ;
1181304           IF PTR_BUFFER < 80 THEN
1182305              PTR_BUFFER := PTR_BUFFER + 1 ;
1183306        END ;
1184307        BUFFER[PTR_BUFFER] := ';' ;
1185308        IF PTR_BUFFER < 80 THEN PTR_BUFFER := PTR_BUFFER + 1 ;
1186309        IF PTR_BUFFER = 80 THEN
1187310        BEGIN
1188311           ERROR_STATUS := TRUE ;
1189312           DISPLAY(VDT_BLK,22,50,'FORMULA IS TOO LARGE',99);
1190313           CLEAR_LINE(18);
1191314           CLEAR_LINE(19);
1192315           CLEAR_LINE(20);
1193316           CLEAR_LINE(21);
1194317        END ;
1195318        DISPLAY(VDT_BLK,24,1,BUFFER,80);
1196319     END ;
1197320
1198321     IF ERROR_STATUS THEN FINISHED := TRUE ;
1199322
1200323 { Check for any more entries                                                 }
1201324
1202325     IF NOT FINISHED THEN
1203326     BEGIN
1204327        ACPT_YES_NO(DUMY,22,45,YES);
1205328        IF NOT YES THEN FINISHED := TRUE ;
1206329     END ;
1207330
1208331 { If buffer is blank, set error status flag                                  }
1209332
1210333     IF FINISHED AND BUFFER[1] = ' ' THEN
1211334        ERROR_STATUS := TRUE ;
1212335
1213336 { Write out formula to file if done and valid                                }
1214337
1215338     IF FINISHED AND NOT ERROR_STATUS THEN
1216339     BEGIN
1217340        ENCODE(COMP.RCD_NUMBER,1,STAT,QUEST_NUMBER:2);
1218341        COMP.FORMULA := BUFFER ;
1219342        WRITE(COMPFILE,QUEST_NUMBER,COMP);
1220343     END ;
1221344
1222345 UNTIL FINISHED ;
```

```
1223346
1224347  CALCULATE := FALSE ;
1225348  READ(PROBLEM,QUEST_NUMBER,PROB);
1226349
1227     END ;    { QST_CALC }
```

MAP OF IDENTIFIERS FOR QST_CALC

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| ENTRY | VARIABLE | (12,0) | #0028 | DIRECT |
| LEFT_JSTFD | VARIABLE | (12,0) | #0034 | DIRECT |
| BUFFER | VARIABLE | (80,0) | #0040 | DIRECT |
| TIME_ACPT | VARIABLE | (6,0) | #0090 | DIRECT |
| TIME_JSTFD | VARIABLE | (6,0) | #0096 | DIRECT |
| TIME_PER | VARIABLE | (2,0) | #009C | DIRECT |
| OP_CHAR | VARIABLE | (0,8) | #009E | DIRECT |
| VALID | VARIABLE | (0,1) | #00A0 | DIRECT |
| DATA_BASE | VARIABLE | (0,1) | #00A2 | DIRECT |
| FIRST_ENTRY | VARIABLE | (0,1) | #00A4 | DIRECT |
| FINISHED | VARIABLE | (0,1) | #00A6 | DIRECT |
| SPACE_FOUND | VARIABLE | (0,1) | #00A8 | DIRECT |
| REPEAT_ENTRY | VARIABLE | (0,1) | #00AA | DIRECT |
| FOUND_DECIMAL | VARIABLE | (0,1) | #00AC | DIRECT |
| FOUND_MINUS | VARIABLE | (0,1) | #00AE | DIRECT |
| DECIMAL_PLACES | VARIABLE | (2,0) | #00B0 | DIRECT |
| PTR_FORMULA | VARIABLE | (2,0) | #00B2 | DIRECT |
| PTR_BUFFER | VARIABLE | (2,0) | #00B4 | DIRECT |
| PTR1 | VARIABLE | (2,0) | #00B6 | DIRECT |
| PTR2 | VARIABLE | (2,0) | #00B8 | DIRECT |

```
1228     (*-                                                                             *;
1229     BEGIN   { QUESTIONS }
1230
1231  3  REPEAT
1232  4     READ(PROBLEM,0,PROB);
1233  5     NEXT_QUESTION := PROB.NEXT_QUESTION ;
1234  6     TOTAL_QUESTIONS := NEXT_QUESTION - 1 ;
1235  7     TOTAL_SITUATIONS := PROB.NUM_SITUATIONS ;
1236  8     MINIMUM := PROB.MINIMUM_LI ;
1237  9     MINIMUM := MINIMUM + 0 ;
1238 10     IF MINIMUM = 0 THEN MINIMUM := 25 ;
1239 11     INT_QUESTIONS := PROB.INT_QUESTIONS ;
1240 12
1241 13     REPEAT
1242 14        ENCODE(DUMMY,1,STAT,NEXT_QUESTION:2);
1243 15        IF NEXT_QUESTION > 50 THEN DUMMY := '_ ';
1244 16        IF NOT DELETE AND NOT REINSTATE THEN
1245 17           DISPLAY(VDT_BLK,10,30,DUMMY,2);
1246 18
1247 19 { Check for question number greater than 1 but less than NEXT_QUEST }
1248 20
1249 21        ERROR_STATUS := FALSE;
1250 22        NEW_QUEST := FALSE;
1251 23        DONE := FALSE;
1252 24        SKIP_ENTRY := FALSE ;
1253 25
1254 26 { No entry or "00" means operator is done with the routien           }
1255 27
1256 28        ACCEPT(VDT_BLK,10,30,DUMMY,2,T);
1257 29        CLEAR_LINE(24);
1258 30        DECODE(DUMMY,1,STAT,QUEST_NUMBER);
1259 31        ENCODE(DUMMY,1,STAT,QUEST_NUMBER:2);
1260 32        DISPLAY(VDT_BLK,10,30,DUMMY,2);
1261 33
1262 34        IF QUEST_NUMBER < 0
1263 35           OR QUEST_NUMBER > NEXT_QUESTION
1264 36           OR QUEST_NUMBER > 50
1265 37              THEN ERROR_STATUS := TRUE;
1266 38
1267 39 { Check for a new question; no questions may be added if delete or   }
1268 40 {                      reinstate                                     }
1269 41
```

```
1270 42        NEW_QUEST := FALSE ;
1271 43        IF QUEST_NUMBER = NEXT_QUESTION THEN
1272 44        BEGIN
1273 45           IF DELETE OR REINSTATE THEN ERROR_STATUS := TRUE ELSE
1274 46           BEGIN
1275 47              QUESTIONS_ADDED := TRUE;
1276 48              NEW_QUEST := TRUE;
1277 49           END ;
1278 50        END;
1279 51
1280 52        IF QUEST_NUMBER = 0
1281 53           THEN DONE := TRUE;
1282 54
1283 55 { Enforce at least one question to be entered on a new problem         }
1284 56
1285 57        IF QUEST_NUMBER = 0 AND NEXT_QUESTION = 1
1286 58           THEN ERROR_STATUS := TRUE;
1287 59
1288 60    UNTIL ERROR_STATUS = FALSE;
1289 61
1290 62    CHANGE := FALSE ;
1291 63    IF NOT NEW_QUEST AND NOT NEW_PROB
1292 64        THEN CHANGE := TRUE;
1293 65
1294 66    IF QUEST_NUMBER <> 0 THEN
1295 67    BEGIN
1296 68       IF NOT NEW_QUEST THEN
1297 69       BEGIN
1298 70          READ(PROBLEM, QUEST_NUMBER, PROB);
1299 71          DISPLAY(VDT_BLK, 11, 30, PROB.DESC_QUESTION, 30);
1300 72          ENCODE(DUMMY, 1, STAT, PROB.YES_NO);
1301 73          DISPLAY(VDT_BLK, 12, 30, DUMMY, 1);
1302 74          DISPLAY(VDT_BLK, 14, 30, PROB.UNIT_DESC, 10);
1303 75          ENCODE(DUMMY, 1, STAT, PROB.REQUIRED);
1304 76          DISPLAY(VDT_BLK, 17, 30, DUMMY, 1);
1305 77          CASE PROB.STATUS_CODE OF
1306 78              'A' : RESP_STRING := 'Active     ';
1307 79              'R' : RESP_STRING := 'Reinstated';
1308 80              'D' : RESP_STRING := 'Deleted    ';
1309 81          OTHERWISE
1310 82                    RESP_STRING := '           ';
1311 83          END ;
1312 84          DISPLAY(VDT_BLK, 17, 60, RESP_STRING, 10);
1313 85       END
1314 86       ELSE BEGIN
1315 87          ENCODE(PROB.NUM_QUESTION, 1, STAT, QUEST_NUMBER:2);
1316 88          PROB.CALCULATE := ' ' ;
1317 89          PROB.INT_QUEST := ' ' ;
1318 90          PROB.REFERENCE := ' ' ;
1319 91          PROB.BOUNDARIES := 0 ;
1320 92          PROB.LOWER_1_LIMIT := 0 ;
1321 93          PROB.UPPER_1_LIMIT := 0 ;
1322 94          PROB.LOWER_2_LIMIT := 0 ;
1323 95          PROB.UPPER_2_LIMIT := 0 ;
1324 96          PROB.LGCL_IMPT    := 0 ;
1325 97          PROB.LGCL_INTR    := 0 ;
1326 98          PROB.LGCL_CMPL    := 0 ;
1327 99          PROB.EXPT_IMPT    := 0 ;
1328 100         PROB.EXPT_INTR    := 0 ;
1329 101         PROB.EXPT_CMPL    := 0 ;
1330 102         PROB.STATUS_CODE := 'A';
1331 103         DISPLAY(VDT_BLK, 17, 60, 'Active    ', 10);
1332 104         PROB.SORT_FLAG    := ' ';
1333 105         PROB.FLAG6_FUTURE := ' ';
1334 106         PROB.FLAG7_FUTURE := ' ';
1335 107         PROB.FLAG8_FUTURE := ' ';
1336 108      END;
1337 109
1338 110      IF NOT DELETE AND NOT REINSTATE THEN
1339 111      BEGIN
1340 112         IF PROB.STATUS_CODE = 'D' THEN
1341 113         BEGIN
1342 114            DISPLAY(VDT_BLK, 24, 24, 'THIS QUESTION IS DELETED', 99);
1343 115            SKIP_ENTRY := TRUE ;
1344 116         END ;
```

```
1345117        END ;
1346118
1347119        CALCULATE := FALSE ;
1348120        REFRNCE   := FALSE ;
1349121        INTGR     := FALSE ;
1350122
1351123        IF NOT DELETE AND NOT REINSTATE AND NOT SKIP_ENTRY THEN
1352124        BEGIN
1353125          ACCEPT(VDT_BLK,11,30,PROB.DESC_QUESTION,30,T);
1354126          IF NOT CHANGE THEN ACPT_YES_NO(PROB.YES_NO,12,30,YES);
1355127          IF PROB.YES_NO = 'Y' THEN
1356128          BEGIN
1357129            PROB.UNIT_DESC := 'Y / N       ';
1358130            DISPLAY(VDT_BLK,14,30,PROB.UNIT_DESC,10);
1359131            PROB.LOWER_1_LIMIT := 0 ;
1360132            PROB.UPPER_1_LIMIT := 0 ;
1361133            PROB.LOWER_2_LIMIT := 0 ;
1362134            PROB.UPPER_2_LIMIT := 0 ;
1363135            PROB.BOUNDARIES    := 0 ;
1364136          END
1365137          ELSE BEGIN
1366138            DISPLAY(VDT_BLK,15,10,'1ST LOWER BOUNDARY:[         ]',99);
1367139            DISPLAY(VDT_BLK,15,47,'1ST UPPER BOUNDARY:[         ]',99);
1368140            DISPLAY(VDT_BLK,12,47,'CALCULATED QUESTION ?   [ ]',99);
1369141            DISPLAY(VDT_BLK,13,8,'FOR REFERENCE ONLY ? [ ]',99);
1370142            DISPLAY(VDT_BLK,13,47,'INTEGER VALUE ?         [ ]',99);
1371143            IF PROB.BOUNDARIES > 0 THEN
1372144            BEGIN
1373145               ENCODE(RESP_STRING,1,STAT,PROB.LOWER_1_LIMIT:10:2);
1374146               DISPLAY(VDT_BLK,15,30,RESP_STRING,10);
1375147               ENCODE(RESP_STRING,1,STAT,PROB.UPPER_1_LIMIT:10:2);
1376148               DISPLAY(VDT_BLK,15,67,RESP_STRING,10);
1377149            END ;
1378150            DUMMY[1] := PROB.CALCULATE ;
1379151            DISPLAY(VDT_BLK,12,74,DUMMY,1);
1380152            DUMMY[1] := PROB.INT_QUEST ;
1381153            DISPLAY(VDT_BLK,13,74,DUMMY,1);
1382154            IF PROB.INT_QUEST = 'Y' THEN
1383155               INT_QUESTIONS := INT_QUESTIONS - 1 ;
1384156            DUMMY[1] := PROB.REFERENCE ;
1385157            DISPLAY(VDT_BLK,13,30,DUMMY,1);
1386158
1387159    300:  ASSUME_NO(PROB.CALCULATE,12,74,CALCULATE);
1388160          CLEAR_LINE(23);
1389161          CLEAR_LINE(24);
1390162
1391163          ASSUME_NO(PROB.REFERENCE,13,30,REFRNCE);
1392164          IF REFRNCE THEN CLEAR_LINE(15);
1393165
1394166 { Only allow "integer" questions if the number of these questions will
1395167   be less than 15% of the total number of questions and if the question
1396168   has not already been identified as a "reference"; also, once a
1397169   question has already been established on the system, it cannot be
1398170   changed from integer to non-integer or vice-versa                   }
1399171
1400172          NUMBER := INT_QUESTIONS + 1 ;
1401173          NUMBER := NUMBER * 100 ;
1402174          IF TOTAL_QUESTIONS > 0 THEN
1403175             NUMBER := NUMBER DIV TOTAL_QUESTIONS
1404176          ELSE NUMBER := 100 ;
1405177
1406178          IF CHANGE THEN
1407179          BEGIN
1408180            IF PROB.INT_QUEST = 'Y' THEN
1409181            BEGIN
1410182              DISPLAY(VDT_BLK,13,74,'Y]',2);
1411183              INTGR := TRUE ;
1412184            END ELSE BEGIN
1413185              DISPLAY(VDT_BLK,13,74,'N]',2);
1414186              INTGR := FALSE ;
1415187            END ;
1416188          END ELSE BEGIN
1417189            IF NUMBER <= 15 AND NOT REFRNCE THEN
1418190               ASSUME_NO(PROB.INT_QUEST,13,74,INTGR)
```

```
1419191            ELSE BEGIN
1420192               DISPLAY(VDT_BLK,13,74,'N]',2);
1421193               INTGR := FALSE ;
1422194               PROB.INT_QUEST := 'N' ;
1423195            END ;
1424196         END ;
1425197
1426198         IF PROB.INT_QUEST = 'Y' THEN
1427199         BEGIN
1428200
1429201 { If this is a new integer question for an existing problem, initialize
1430202   this poisition in the interpretation string of all existing situations
1431203   the "not entered" value for integer questions, -32767            }
1432204
1433205            IF NEW_QUEST AND NOT NEW_PROB THEN
1434206            BEGIN
1435207              FOR Q := 0 TO (TOTAL_SITUATIONS - 1) DO
1436208              BEGIN
1437209                READ(SITUATION,Q,SIT);
1438210                SIT.SINC_STRING[QUEST_NUMBER] := -32767 ;
1439211                WRITE(SITUATION,Q,SIT);
1440212              END ;
1441213            END ;
1442214
1443215            INT_QUESTIONS := INT_QUESTIONS + 1 ;
1444216            CLEAR_LINE(15);
1445217            DISPLAY(VDT_BLK,15,10,'LOWER INT. LIMIT:   [            ]',
1446218                                                                  99);
1447219            DISPLAY(VDT_BLK,15,47,'UPPER INT. LIMIT:   [            ]',
1448220                                                                  99);
1449221            IF PROB.BOUNDARIES > 0 THEN
1450222            BEGIN
1451223              NUMBER := TRUNC(PROB.LOWER_1_LIMIT);
1452224              ENCODE(RESP_STRING,1,STAT,NUMBER);
1453225              DISPLAY(VDT_BLK,15,30,RESP_STRING,10);
1454226              NUMBER := TRUNC(PROB.UPPER_1_LIMIT);
1455227              ENCODE(RESP_STRING,1,STAT,NUMBER);
1456228              DISPLAY(VDT_BLK,15,67,RESP_STRING,10);
1457229            END ;
1458230         END ;
1459231
1460232         ACCEPT(VDT_BLK,14,30,PROB.UNIT_DESC,30,T);
1461233
1462234         BOUNDARIES ;
1463235
1464236       END ;
1465237
1466238       ACPT_YES_NO(PROB.REQUIRED,17,30,YES);
1467239
1468240       IF YES AND CALC_FLAG = 'N' THEN
1469241          PROB.LGCL_IMPT := 50 ;
1470242
1471243 { Write detail problem record                                       }
1472244
1473245       ENCODE(PROB.NUM_QUESTION,1,STAT,QUEST_NUMBER:4);
1474246       WRITE(PROBLEM,QUEST_NUMBER,PROB);
1475247
1476248 { If this is a calculated question, accept a valid formula, but if
1477249   nothing is entered go back to "CALCULATE ?" question              }
1478250
1479251       IF CALCULATE THEN
1480252       BEGIN
1481253          CLEAR_LINE(23);
1482254          CLEAR_LINE(24);
1483255          ERROR_STATUS := FALSE ;
1484256          QST_CALC ;
1485257          IF ERROR_STATUS THEN GOTO 300 ;
1486258       END ;
1487259
1488260 { If a new question, update next question number                    }
1489261
1490262       IF NEW_QUEST THEN
1491263       BEGIN
1492264          NEXT_QUESTION := NEXT_QUESTION + 1 ;
1493265          TOTAL_QUESTIONS := TOTAL_QUESTIONS + 1 ;
```

```
1494266            END ;
1495267
1496268  { Update "O" record of problem file                                                    }
1497269
1498270            READ(PROBLEM, O, PROB);
1499271            PROB.NEXT_QUESTION := NEXT_QUESTION ;
1500272            PROB.INT_QUESTIONS := INT_QUESTIONS ;
1501273            WRITE(PROBLEM, O, PROB);
1502274
1503275  {  Clear out limit line and all variables for next question entry  }
1504276
1505277            CLEAR_LINE(12);
1506278            CLEAR_LINE(13);
1507279            CLEAR_LINE(15);
1508280            CLEAR_LINE(16);
1509281            CLEAR_LINE(18);
1510282            CLEAR_LINE(19);
1511283            CLEAR_LINE(20);
1512284            CLEAR_LINE(21);
1513285            CLEAR_LINE(22);
1514286            CLEAR_LINE(23);
1515287            CLEAR_LINE(24);
1516288            DISPLAY(VDT_BLK, 12, 8, 'YES / NO QUESTION ?    [ ]', 99);
1517289            DISPLAY(VDT_BLK, 11, 30, '                                    ', 30);
1518290            DISPLAY(VDT_BLK, 14, 30, '              ', 10);
1519291            DISPLAY(VDT_BLK, 17, 30, ' ]', 2);
1520292            DISPLAY(VDT_BLK, 17, 60, '              ', 10);
1521293
1522294       END;
1523295    END ;
1524296
1525297    IF DELETE AND QUEST_NUMBER <> O THEN
1526298    BEGIN
1527299       CLEAR_LINE(24);
1528300       IF PROB.STATUS_CODE = 'D' THEN
1529301          DISPLAY(VDT_BLK, 24, 20, 'THIS QUESTION IS ALREADY DELETED', 99)
1530302       ELSE BEGIN
1531303          DISPLAY(VDT_BLK, 24, 14, 'ARE YOU SURE YOU WISH TO DELETE', 99);
1532304          DISPLAY(VDT_BLK, 24, 45, ' THIS QUESTION ?    [ ]', 99);
1533305          ACPT_YES_NO(DUMY, 24, 65, YES);
1534306          IF YES THEN
1535307          BEGIN
1536308             PROB.STATUS_CODE := 'D' ;
1537309             DISPLAY(VDT_BLK, 17, 60, 'Deleted     ', 99);
1538310             WRITE(PROBLEM, QUEST_NUMBER, PROB);
1539311          END ;
1540312       END ;
1541313    END ;
1542314
1543315    IF REINSTATE AND QUEST_NUMBER <> O THEN
1544316    BEGIN
1545317       CLEAR_LINE(24);
1546318       IF PROB.STATUS_CODE <> 'D' THEN
1547319          DISPLAY(VDT_BLK, 24, 23, 'THIS QUESTION IS NOT DELETED', 99)
1548320       ELSE BEGIN
1549321          DISPLAY(VDT_BLK, 24, 12, 'ARE YOU SURE YOU WISH TO REIN', 99);
1550322          DISPLAY(VDT_BLK, 24, 41, 'STATE THIS QUESTION ?   [ ] ', 99);
1551323          ACPT_YES_NO(DUMY, 24, 65, YES);
1552324          IF YES THEN
1553325          BEGIN
1554326             PROB.STATUS_CODE := 'R' ;
1555327             DISPLAY(VDT_BLK, 17, 60, 'Reinstated', 99);
1556328             WRITE(PROBLEM, QUEST_NUMBER, PROB);
1557329
1558330  { If a question is reinstated, the system will follow the same logic
1559331    as if new questions were added to the problem, unless the reference
1560332    situation entered equals the present reference situation             }
1561333
1562334             QUESTIONS_ADDED := TRUE ;
1563335             READ(SITUATION, O, SIT);
1564336             TEST_STRING := SIT.SINC_STRING ;
1565337          END ;
1566338       END ;
1567339    END ;
```

```
1568340
1569341  UNTIL QUEST_NUMBER = 0;
1570342
1571     END ;    { QUESTIONS }

1572     (*,                                                                              *)
1573     { ******************************************************************** }
1574
1575     PROCEDURE REFERENCE ;
1576
1577     { This procedure accepts a reference situation                                   }
1578
1579     LABEL 100 ;
1580
1581     VAR    JUDGEMENT : PACKED ARRAY[1..20] OF CHAR ;
1582
1583
1584     PROCEDURE RESP_ACPT (VAR RESP_CHAR : INTEGER );    FORWARD ;
1585
1586     PROCEDURE REF_SCREEN ;     FORWARD ;
1587
1588
1589     (*+                                                                              *)
1590     { ********************************************************************}
1591
1592     PROCEDURE REF_SCREEN ;     { Second screen format }
1593
1594     BEGIN
1595  .2    READ(PROBLEM,O,PROB);
1596   3    DISPLAY(VDT_BLK,1,12,'P A R A D O C S      D E V E L O P M E N T',
1597   4                                                             99);
1598   5    DISPLAY(VDT_BLK,1,56,'S Y S T E M',99);
1599   6    DISPLAY(VDT_BLK,3,22,'**** SITUATION DATA CAPTURE ****',99);
1600   7    DISPLAY(VDT_BLK,4,13,
1601   8      'Please enter "REFERENCE" responses for all questions',99);
1602   9    DISPLAY(VDT_BLK,6,06,'PROBLEM CODE: ',99);
1603  10    DISPLAY(VDT_BLK,6,25,PROBLEM_FILE,8);
1604  11    DISPLAY(VDT_BLK,6,43,PROB.DESCRIPTION,30);
1605  12    DISPLAY(VDT_BLK,7,62,'INTERMEDIATE',99);
1606  13    DISPLAY(VDT_BLK,8,1,'QUESTION       ',99);
1607  14    DISPLAY(VDT_BLK,8,15,'DESCRIPTION ',99);
1608  15    DISPLAY(VDT_BLK,8,41,'UNIT         ',99);
1609  16    DISPLAY(VDT_BLK,8,49,'RESPONSE     ',99);
1610  17    DISPLAY(VDT_BLK,8,63,'JUDGEMENT    ',99);
1611  18    DISPLAY(VDT_BLK,24,30,'CORRECT ?   [ ]',99);
1612     END; { SCRN2_DISPLAY }
1613     (*,                                                                              *)
1614     PROCEDURE RESP_ACPT ;
1615
1616     { This section checks for a valid response and makes the intermediate
1617       judgement, resulting is a value of 1 to 12 as follows:
1618
1619           1 = Below Both Ranges - Numeric response which is lower than both
1620                  lower boundaries (when two sets of boundaries exist)
1621           2 = Below Primary Range - Numeric response which is higher than
1622                  (or equal to) the secondary lower boundary but lower than
1623                  the primary lower boundary (two boundary sets must exist)
1624           3 = Within Both Ranges - Numeric response which is within the
1625                  primary range and two boundary sets exist
1626           4 = Above Primary Range - Numeric response which is lower than (or
1627                  equal to) the secondary upper boundary but higher than th
1628                  primary upper boundary (two boundary sets must exist)
1629           5 = Above Both Ranges - Numeric response which is higher than both
1630                  upper boundaries (when two sets of boundaries exist)
1631           6 = Below Primary Range - Numeric response which is lower than the
1632                  primary lower boundary (and there are no secondary limits
1633           7 = Within Primary Range - Numeric response which is within the
1634                  primary boundaries (and there are no secondary limits)
1635           8 = Above Primary Range - Numeric response which is higher than th
1636                  primary upper boundary (and there are no secondary limits
1637           9 = No Judgement - Numeric response which has no specified limits
1638          10 = Not Entered - Blank response for a non-required question; OR
1639                  any response for a "for reference only" question
1640          11 = Absent - A "N" or "n" response to a Y/N question
1641          12 = Present - A "Y" or "y" response to a Y/N question
```

```
1642              13 = Deleted - This will only be put in by the system if a
1643                            question has been previously deleted and then only in
1644                            memory and not on disk                                  }
1645
1646       VAR    RESPONSE : PACKED ARRAY[1..10] OF CHAR;
1647              LIMIT    : PACKED ARRAY[1..5] OF CHAR;
1648              AMOUNT   : REAL;
1649              VALID    : BOOLEAN ;
1650              OUT_OF_RANGE : BOOLEAN ;
1651              LIMIT_INT : INTEGER ;
1652
1653     PROCEDURE CALC_RESPONSE ;     FORWARD ;
1654
1655
1656
1657     (**                                                                    *)
1658     PROCEDURE CALC_RESPONSE ;
1659
1660     { This procedure calculates the response based on a predefined formula}
1661
1662       VAR      ENTRY          : PACKED ARRAY[1..12] OF CHAR ;
1663                TIME_UNITS     : PACKED ARRAY[1..6] OF CHAR ;
1664                OP_CODE        : CHAR ;
1665                PTR_FORMULA    : INTEGER ;
1666                PTR_RESPONSE   : INTEGER ;
1667                PTR            : INTEGER ;
1668                DATA_BASE      : BOOLEAN ;
1669                PROCESSED      : BOOLEAN ;
1670                NO_ENTRY       : BOOLEAN ;
1671                FINISHED       : BOOLEAN ;
1672                ENABLE         : BOOLEAN ;
1673                F , R1 , R2 , R3 , R4  : REAL ;
1674
1675     BEGIN    { CALC_RESPONSE }
1676
1677     { Open computation file and initialize switches and regiters           }
1678
1679  5    NO_ENTRY := FALSE ;
1680  6    FINISHED := FALSE ;
1681  7    PTR_FORMULA := 1 ;
1682  8    SETMEMBER(COMPFILE,COMP_NODE,PROBLEM_FILE);
1683  9    RESET(COMPFILE);
1684 10    READ(COMPFILE,RECORD_COUNTER,COMP);
1685 11    F  := 0 ;
1686 12    R1 := 0 ;
1687 13    R2 := 0 ;
1688 14    R3 := 0 ;
1689 15    R4 := 0 ;
1690 16    ENABLE := FALSE ;
1691 17
1692 18    REPEAT   { UNTIL FINISHED }
1693 19
1694 20       IF COMP.FORMULA[PTR_FORMULA] = ' ' THEN FINISHED := TRUE ELSE
1695 21       BEGIN
1696 22          DATA_BASE := FALSE ;
1697 23          PROCESSED := FALSE ;
1698 24
1699 25 { For the PROBLEM routine, any formula with an "@" entry will return
1700 26   a response of "no entry" since no "data-base" file exists            }
1701 27
1702 28          IF COMP.FORMULA[PTR_FORMULA] = '@' THEN
1703 29          BEGIN
1704 30             PROCESSED := TRUE ;
1705 31             DATA_BASE := TRUE ;
1706 32             FINISHED := TRUE ;
1707 33             NO_ENTRY := TRUE ;
1708 34          END ;
1709 35
1710 36 { Check for a "P" entry which has no effect on the registers           }
1711 37
1712 38          IF NOT PROCESSED AND COMP.FORMULA[PTR_FORMULA] = 'P' THEN
1713 39          BEGIN
1714 40             PROCESSED := TRUE ;
1715 41             PTR_FORMULA := PTR_FORMULA + 2 ;
1716 42          END ;
```

```
1717  43
1718  44  { Check for a "#" entry for a previous response                              }
1719  45
1720  46          IF NOT PROCESSED AND COMP.FORMULA[PTR_FORMULA] = '##' THEN
1721  47          BEGIN
1722  48             PROCESSED := TRUE ;
1723  49             PTR_FORMULA := PTR_FORMULA + 1 ;
1724  50             DUMMY := '    ' ;
1725  51             PTR := 1 ;
1726  52             WHILE COMP.FORMULA[PTR_FORMULA] <> ',' DO
1727  53             BEGIN
1728  54                DUMMY[PTR] := COMP.FORMULA[PTR_FORMULA] ;
1729  55                PTR := PTR + 1 ;
1730  56                PTR_FORMULA := PTR_FORMULA + 1 ;
1731  57             END ;
1732  58             PTR_FORMULA := PTR_FORMULA + 1 ;
1733  59             DECODE(DUMMY,1,STAT,PTR_RESPONSE);
1734  60             READ(WORKRESP,PTR_RESPONSE,RESP);
1735  61             IF ENABLE THEN
1736  62             BEGIN
1737  63                R4 := R3; R3 := R2; R2 := R1; R1 := F;
1738  64             END ;
1739  65             ENABLE := TRUE ;
1740  66             IF RESP.RESPONSE = '          ' THEN
1741  67             BEGIN
1742  68                FINISHED := TRUE ;
1743  69                NO_ENTRY := TRUE ;
1744  70             END ELSE DECODE(RESP.RESPONSE,1,STAT,F);
1745  71          END ;
1746  72
1747  73  { Read constant value                                                        }
1748  74
1749  75          IF NOT PROCESSED THEN
1750  76          BEGIN
1751  77             PROCESSED := TRUE ;
1752  78             ENTRY := '          ' ;
1753  79             PTR := 1 ;
1754  80             WHILE COMP.FORMULA[PTR_FORMULA] <> ',' DO
1755  81             BEGIN
1756  82                ENTRY[PTR] := COMP.FORMULA[PTR_FORMULA] ;
1757  83                PTR := PTR + 1 ;
1758  84                PTR_FORMULA := PTR_FORMULA + 1 ;
1759  85             END ;
1760  86             PTR_FORMULA := PTR_FORMULA + 1 ;
1761  87             IF ENABLE THEN
1762  88             BEGIN
1763  89                R4 := R3; R3 := R2; R2 := R1; R1 := F;
1764  90             END ;
1765  91             ENABLE := TRUE ;
1766  92             DECODE(ENTRY,1,STAT,F);
1767  93          END ;
1768  94
1769  95          PROCESSED := FALSE ;
1770  96
1771  97  { For PROBLEM routine, skip data-base read (and its implied "store")
1772  98    and go directly to the op-code character                                  }
1773  99
1774 100          IF NOT DATA_BASE AND NOT FINISHED THEN
1775 101          BEGIN
1776 102
1777 103  { Check for "S" for store result in register                                  }
1778 104
1779 105             IF NOT PROCESSED AND COMP.FORMULA[PTR_FORMULA] = 'S' THEN
1780 106             BEGIN
1781 107                PROCESSED := TRUE ;
1782 108                PTR_FORMULA := PTR_FORMULA + 2 ;
1783 109                R4 := R3; R3 := R2; R2 := R1; R1 := F;
1784 110                ENABLE := FALSE ;
1785 111             END ;
1786 112
1787 113  { Check for "+" and add F to R1                                               }
1788 114
1789 115             IF NOT PROCESSED AND COMP.FORMULA[PTR_FORMULA] = '+' THEN
1790 116             BEGIN
1791 117                PROCESSED := TRUE ;
```

```
1792118              PTR_FORMULA := PTR_FORMULA + 2 ;
1793119              F := R1 + F ;
1794120              R1 := R2; R2 := R3; R3 := R4;
1795121              ENABLE := TRUE ;
1796122           END ;
1797123
1798124  { Check for "-" and subtract F from R1                                            }
1799125
1800126           IF NOT PROCESSED AND COMP.FORMULA[PTR_FORMULA] = '-' THEN
1801127           BEGIN
1802128              PROCESSED := TRUE ;
1803129              PTR_FORMULA := PTR_FORMULA + 2 ;
1804130              F := R1 - F ;
1805131              R1 := R2; R2 := R3; R3 := R4;
1806132              ENABLE := TRUE ;
1807133           END ;
1808134
1809135  { Check for "/" and divide R1 by F                                                }
1810136
1811137           IF NOT PROCESSED AND COMP.FORMULA[PTR_FORMULA] = '/' THEN
1812138           BEGIN
1813139              PROCESSED := TRUE ;
1814140              PTR_FORMULA := PTR_FORMULA + 2 ;
1815141              IF F = 0 THEN
1816142              BEGIN
1817143                 FINISHED := TRUE ;
1818144                 NO_ENTRY := TRUE ;
1819145              END ELSE F := R1 / F ;
1820146              R1 := R2; R2 := R3; R3 := R4;
1821147              ENABLE := TRUE ;
1822148           END ;
1823149
1824150  { Check for "*" and multiply R1 by F                                              }
1825151
1826152           IF NOT PROCESSED AND COMP.FORMULA[PTR_FORMULA] = '*' THEN
1827153           BEGIN
1828154              PROCESSED := TRUE ;
1829155              PTR_FORMULA := PTR_FORMULA + 2 ;
1830156              F := R1 * F ;
1831157              R1 := R2; R2 := R3; R3 := R4;
1832158              ENABLE := TRUE ;
1833159           END ;
1834160
1835161  { Check for "E" and raise R1 to the power of F (changed to an integer)}
1836162
1837163           IF NOT PROCESSED AND COMP.FORMULA[PTR_FORMULA] = 'E' THEN
1838164           BEGIN
1839165              PROCESSED := TRUE ;
1840166              PTR_FORMULA := PTR_FORMULA + 2 ;
1841167              PTR := TRUNC(F);
1842168              IF PTR < 1 THEN
1843169              BEGIN
1844170                 FINISHED := TRUE ;
1845171                 NO_ENTRY := TRUE ;
1846172              END ELSE BEGIN
1847173                 F := 1 ;
1848174                 FOR T := 1 TO PTR DO
1849175                    F := F * R1 ;
1850176              END ;
1851177              R1 := R2; R2 := R3; R3 := R4;
1852178              ENABLE := TRUE ;
1853179           END ;
1854180
1855181  { Check for "R" and take the square root of F                                     }
1856182
1857183           IF NOT PROCESSED AND COMP.FORMULA[PTR_FORMULA] = 'R' THEN
1858184           BEGIN
1859185              PROCESSED := TRUE ;
1860186              PTR_FORMULA := PTR_FORMULA + 2 ;
1861187              IF F < 0 THEN
1862188              BEGIN
1863189                 FINISHED := TRUE ;
1864190                 NO_ENTRY := TRUE ;
1865191              END ELSE F := SQRT(F);
```

```
1866192                ENABLE := TRUE ;
1867193              END ;
1868194
1869195   { Check for "C" and multiply F by -1                                    }
1870196
1871197              IF NOT PROCESSED AND COMP.FORMULA[PTR_FORMULA] = 'C' THEN
1872198              BEGIN
1873199                 PROCESSED := TRUE ;
1874200                 PTR_FORMULA := PTR_FORMULA + 2 ;
1875201                 PTR := -1 ;
1876202                 F := F * PTR ;
1877203              END ;
1878204
1879205   { Check for "A" and change F to its absolute value                      }
1880206
1881207              IF NOT PROCESSED AND COMP.FORMULA[PTR_FORMULA] = 'A' THEN
1882208              BEGIN
1883209                 PROCESSED := TRUE ;
1884210                 PTR_FORMULA := PTR_FORMULA + 2 ;
1885211                 F := ABS(F) ;
1886212              END ;
1887213
1888214              IF NOT PROCESSED THEN
1889215              BEGIN
1890216                 FINISHED := TRUE ;
1891217                 NO_ENTRY := TRUE ;
1892218              END ;
1893219           END ;
1894220        END ;
1895221
1896222   UNTIL FINISHED ;
1897223
1898224   ERROR_STATUS := FALSE ;
1899225   IF NO_ENTRY THEN
1900226      RESPONSE := '          '
1901227   ELSE BEGIN
1902228      ENCODE(RESPONSE,1,STAT,F:10:2);
1903229      NUMERIC_CHECK(RESPONSE,10,ERROR_STATUS);
1904230   END ;
1905231
1906232   IF ERROR_STATUS THEN RESPONSE := '          ';
1907233
1908234   DISPLAY(VDT_BLK,LINE_COUNTER,49,RESPONSE,10);
1909235
1910236   ENTRY_REQUIRED := FALSE ;
1911237
1912       END ;    { CALC_RESPONSE }
       MAP OF IDENTIFIERS FOR  CALC_RES
```

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| ENTRY | VARIABLE | (12,0) | #0028 | DIRECT |
| TIME_UNITS | VARIABLE | (6,0) | #0034 | DIRECT |
| OP_CODE | VARIABLE | (0,8) | #003A | DIRECT |
| PTR_FORMULA | VARIABLE | (2,0) | #003C | DIRECT |
| PTR_RESPONSE | VARIABLE | (2,0) | #003E | DIRECT |
| PTR | VARIABLE | (2,0) | #0040 | DIRECT |
| DATA_BASE | VARIABLE | (0,1) | #0042 | DIRECT |
| PROCESSED | VARIABLE | (0,1) | #0044 | DIRECT |
| NO_ENTRY | VARIABLE | (0,1) | #0046 | DIRECT |
| FINISHED | VARIABLE | (0,1) | #0048 | DIRECT |
| ENABLE | VARIABLE | (0,1) | #004A | DIRECT |
| F | VARIABLE | (4,0) | #004C | DIRECT |
| R1 | VARIABLE | (4,0) | #0050 | DIRECT |
| R2 | VARIABLE | (4,0) | #0054 | DIRECT |
| R3 | VARIABLE | (4,0) | #0058 | DIRECT |
| R4 | VARIABLE | (4,0) | #005C | DIRECT |

```
1913    (*-                                                                     *)
1914       BEGIN    { RESP_ACPT }
1915
1916   3 VALID := FALSE ;
1917   4 RESP_CHAR := 0 ;
```

```
1918  5 OUT_OF_RANGE := FALSE ;
1919  6 JUDGEMENT := '                      ' ;
1920  7
1921  8 REPEAT    { accept response }
1922  9
1923 10 { Check for calculated question, and if not, accept response from kbd}
1924 11
1925 12     IF PROB.CALCULATE = 'Y' AND NOT OUT_OF_RANGE THEN CALC_RESPONSE
1926 13        ELSE ACCEPT(VDT_BLK,LINE_COUNTER,49,RESPONSE,10,T);
1927 14
1928 15 { Check for reference only question                                   }
1929 16
1930 17     IF PROB.REFERENCE = 'Y' THEN
1931 18     BEGIN
1932 19        NUMERIC_CHECK(RESPONSE,10,ERROR_STATUS);
1933 20        IF ERROR_STATUS THEN
1934 21           DISPLAY(VDT_BLK,LINE_COUNTER,61,
1935 22                                  'ENTER NUMERIC       ',20)
1936 23        ELSE BEGIN
1937 24           DECODE(RESPONSE,1,STAT,AMOUNT);
1938 25           ENCODE(RESPONSE,1,STAT,AMOUNT:10:2);
1939 26           IF RESPONSE = '**********' THEN
1940 27              DISPLAY(VDT_BLK,LINE_COUNTER,61,
1941 28                                  'ENTRY TOO LARGE     ',20)
1942 29           ELSE BEGIN
1943 30              DISPLAY(VDT_BLK,LINE_COUNTER,49,RESPONSE,10);
1944 31              RESP_CHAR := 10 ;
1945 32              VALID := TRUE ;
1946 33              JUDGEMENT := 'For Reference Only   ' ;
1947 34           END ;
1948 35        END ;
1949 36     END ELSE
1950 37     BEGIN    { Non-reference question }
1951 38
1952 39 { All spaces entered                                                  }
1953 40
1954 41        IF RESPONSE = '           ' THEN
1955 42        BEGIN
1956 43           RESP_CHAR := 10 ;
1957 44           JUDGEMENT := 'Not Entered          ' ;
1958 45           VALID := TRUE ;
1959 46        END ;
1960 47
1961 48 { Something entered in response field, but not an integer question    }
1962 49
1963 50        IF RESPONSE <> '           ' AND PROB.INT_QUEST <> 'Y' THEN
1964 51        BEGIN   { non-space, non_integer response }
1965 52           RESP_CHAR := 9 ;
1966 53           JUDGEMENT := '                     ' ;
1967 54           VALID := TRUE ;
1968 55
1969 56 { YES / NO response                                                   }
1970 57
1971 58           IF YES_NO_RESP THEN
1972 59           BEGIN   { yes-no response }
1973 60              VALID := FALSE ;
1974 61              IF RESPONSE[1] = 'Y' OR RESPONSE[1] = 'y' THEN
1975 62              BEGIN
1976 63                 RESP_CHAR := 12 ;
1977 64                 JUDGEMENT := 'Present              ';
1978 65                 VALID := TRUE ;
1979 66              END ;
1980 67              IF RESPONSE[1] = 'N' OR RESPONSE[1] = 'n' THEN
1981 68              BEGIN
1982 69                 RESP_CHAR := 11 ;
1983 70                 JUDGEMENT := 'Absent               ';
1984 71                 VALID := TRUE ;
1985 72              END;
1986 73              IF NOT VALID THEN
1987 74                 DISPLAY(VDT_BLK,LINE_COUNTER,61,
1988 75                                  'Y / N REQUIRED      ',20);
1989 76           END;   { yes-no response }
1990 77
1991 78 { Numeric entry called for                                            }
1992 79
```

```
1993 80                   IF NOT YES_NO_RESP THEN
1994 81                   BEGIN  { numeric response }
1995 82                     NUMERIC_CHECK(RESPONSE,10,ERROR_STATUS);
1996 83                     IF ERROR_STATUS THEN
1997 84
1998 85 { Non numeric character found in response                                    }
1999 86
2000 87                       BEGIN
2001 88                         VALID := FALSE ;
2002 89                         DISPLAY(VDT_BLK,LINE_COUNTER,61,
2003 90                                  'ENTER NUMERIC         ',20);
2004 91                       END ELSE
2005 92
2006 93 { Good numeric entry (unless an overflow entry)                              }
2007 94
2008 95                       BEGIN  { good numeric response }
2009 96                         VALID := TRUE ;
2010 97                         DECODE(RESPONSE,1,STAT,AMOUNT);
2011 98                         ENCODE(RESPONSE,1,STAT,AMOUNT:10:2);
2012 99                         IF RESPONSE = '**********' THEN
2013 100                        BEGIN
2014 101                          DISPLAY(VDT_BLK,LINE_COUNTER,61,
2015 102                                   'ENTRY TOO LARGE     ',20);
2016 103                          VALID := FALSE ;
2017 104                        END ELSE BEGIN   { not an overflow }
2018 105                          DISPLAY(VDT_BLK,LINE_COUNTER,49,RESPONSE,10);
2019 106
2020 107 { Both primary and secondary boundries present                              }
2021 108
2022 109                         IF PROB.BOUNDARIES = 2 THEN
2023 110                         BEGIN
2024 111                           IF AMOUNT < PROB.LOWER_2_LIMIT THEN
2025 112                           BEGIN
2026 113                             RESP_CHAR := 1 ;
2027 114                             JUDGEMENT := 'Below Both Ranges  ' ;
2028 115                           END;
2029 116                           IF AMOUNT >= PROB.LOWER_2_LIMIT AND
2030 117                              AMOUNT <  PROB.LOWER_1_LIMIT THEN
2031 118                           BEGIN
2032 119                             RESP_CHAR := 2 ;
2033 120                             JUDGEMENT := 'Below Primary Range ';
2034 121                           END;
2035 122                           IF AMOUNT >= PROB.LOWER_1_LIMIT AND
2036 123                              AMOUNT <= PROB.UPPER_1_LIMIT THEN
2037 124                           BEGIN
2038 125                             RESP_CHAR := 3 ;
2039 126                             JUDGEMENT := 'Within Both Ranges  ';
2040 127                           END;
2041 128                           IF AMOUNT > PROB.UPPER_2_LIMIT THEN
2042 129                           BEGIN
2043 130                             RESP_CHAR := 5 ;
2044 131                             JUDGEMENT := 'Above Both Ranges   ';
2045 132                           END;
2046 133                           IF AMOUNT <= PROB.UPPER_2_LIMIT AND
2047 134                              AMOUNT >  PROB.UPPER_1_LIMIT THEN
2048 135                           BEGIN
2049 136                             RESP_CHAR := 4 ;
2050 137                             JUDGEMENT := 'Above Primary Range ';
2051 138                           END;
2052 139                         END;
2053 140
2054 141 { Just Primary Boundary present                                             }
2055 142
2056 143                         IF PROB.BOUNDARIES = 1 THEN
2057 144                         BEGIN
2058 145                           IF AMOUNT < PROB.LOWER_1_LIMIT THEN
2059 146                           BEGIN
2060 147                             RESP_CHAR := 6 ;
2061 148                             JUDGEMENT := 'Below Range         ';
2062 149                           END;
2063 150                           IF AMOUNT > PROB.UPPER_1_LIMIT THEN
2064 151                           BEGIN
2065 152                             RESP_CHAR := 8 ;
2066 153                             JUDGEMENT := 'Above Range         ';
2067 154                           END;
```

```
2068155                        IF AMOUNT >= PROB.LOWER_1_LIMIT AND
2069156                           AMOUNT <= PROB.UPPER_1_LIMIT THEN
2070157                        BEGIN
2071158                           RESP_CHAR := 7 ;
2072159                           JUDGEMENT := 'Within Range        ';
2073160                        END;
2074161                     END;
2075162
2076163 { No boundaries listed                                                          }
2077164
2078165                     IF PROB.BOUNDARIES = 0 THEN
2079166                     BEGIN
2080167                        RESP_CHAR := 9 ;
2081168                        JUDGEMENT := '                        ';
2082169                     END ;
2083170
2084171              END ; { not an overflow }
2085172           END; { good numeric entry }
2086173        END; { numeric entry }
2087174     END;    { non-space, non-integer response }
2088175
2089176 { For an integer question, check for "not entered" or "out of range" }
2090177
2091178     IF PROB.INT_QUEST = 'Y' THEN
2092179     BEGIN  { Integer Response }
2093180        VALID := FALSE ;
2094181        IF RESPONSE = '          ' THEN
2095182        BEGIN
2096183           RESP_CHAR := -32767 ;
2097184           VALID := TRUE ;
2098185        END ELSE BEGIN
2099186           DECODE(RESPONSE,1,STAT,RESP_CHAR);
2100187           ENCODE(RESPONSE,1,STAT,RESP_CHAR);
2101188           DISPLAY(VDT_BLK,LINE_COUNTER,49,RESPONSE,10);
2102189           IF RESP_CHAR >= PROB.LOWER_1_LIMIT AND
2103190              RESP_CHAR <= PROB.UPPER_1_LIMIT THEN VALID := TRUE
2104191           ELSE BEGIN
2105192              OUT_OF_RANGE := TRUE ;
2106193              DISPLAY(VDT_BLK,LINE_COUNTER,61,
2107194                     'OUT OF RANGE       ',20);
2108195              NUMBER := LINE_COUNTER + 1 ;
2109196              DISPLAY(VDT_BLK,NUMBER,61,'LIMITS:       TO      ',20);
2110197              LIMIT_INT := TRUNC(PROB.LOWER_1_LIMIT);
2111198              ENCODE(LIMIT,1,STAT,LIMIT_INT:5);
2112199              DISPLAY(VDT_BLK,NUMBER,68,LIMIT,5);
2113200              LIMIT_INT := TRUNC(PROB.UPPER_1_LIMIT);
2114201              ENCODE(LIMIT,1,STAT,LIMIT_INT:5);
2115202              DISPLAY(VDT_BLK,NUMBER,76,LIMIT,5);
2116203           END ;
2117204           IF VALID THEN
2118205           BEGIN
2119206              JUDGEMENT:= '                        ';
2120207              NUMBER := LINE_COUNTER + 1 ;
2121208              DISPLAY(VDT_BLK,NUMBER,61,
2122209                     '                      ',20);
2123210           END ;
2124211        END ;
2125212     END ; { Integer Response }
2126213
2127214  END;    { non-refernce response }
2128215
2129216  IF RESPONSE = '          ' AND ENTRY_REQUIRED THEN
2130217  BEGIN
2131218     VALID := FALSE ;
2132219     DISPLAY(VDT_BLK,LINE_COUNTER,61,'ENTRY REQUIRED       ',20);
2133220  END;
2134221
2135222  UNTIL VALID ;
2136223
2137224  DISPLAY(VDT_BLK,LINE_COUNTER,61,JUDGEMENT,20);
2138225
2139226 { Store response for response work file                                          }
2140227
2141228   RESP.RESPONSE := RESPONSE ;
2142229
```

```
2143    END;  { RESP_ACPT }

MAP OF IDENTIFIERS FOR   RESP_ACP

IDENTIFIER NAME    KIND         SIZE           STACK                 PICTURE
                                  (BYTES,BITS) DISPLACEMENT        (PACKED FIELDS ONLY)
                                  LEVEL(DISPL)  (BYTE,BIT)

RESP_CHAR          PARAMETER   (2,0)          #0028       INDIRECT
   RESPONSE           VARIABLE    (10,0)         #002A       DIRECT
   LIMIT              VARIABLE    (6,0)          #0034       DIRECT
   AMOUNT             VARIABLE    (4,0)          #003A       DIRECT
   VALID              VARIABLE    (0,1)          #003E       DIRECT
   OUT_OF_RANGE       VARIABLE    (0,1)          #0040       DIRECT
   LIMIT_INT          VARIABLE    (2,0)          #0042       DIRECT 2144      (*--                                                                              *
2145      BEGIN   { REFERENCE }
2146
2147   3  IF NEW_PROB THEN
2148   4  BEGIN
2149   5     SIT.SIT_NUM       := '   0';
2150   6     SIT.NEXT_SIT      := 1 ;
2151   7     SIT.PROB1_LINK    := '       ';
2152   8     SIT.PROB2_LINK    := '       ';
2153   9     SIT.PROB3_LINK    := '       ';
2154  10     SIT.PROB4_LINK    := '       ';
2155  11     SIT.NUM_ENCOUNTERS := 1 ;
2156  12     SIT.FLAG1_FUTURE  := ' ';
2157  13     SIT.FLAG2_FUTURE  := ' ';
2158  14     SIT.FLAG3_FUTURE  := ' ';
2159  15     SIT.FLAG4_FUTURE  := ' ';
2160  16     FOR T := 1 TO 80 DO
2161  17        SIT.SIT_DESCRIPTION[T] := ' ';
2162  18     SIT.AUTHOR_CODE := USER_CODE ;
2163  19     DATE(SIT.DATE_ENTERED);
2164  20     DATE(SIT.DATE_LAST_USED);
2165  21     FOR T := 1 TO 50 DO                    { ########## }
2166  22        SIT.SINC_STRING[T] := 10;
2167  23     WRITE(SITUATION,0,SIT);
2168  24     DESC.NEXT_RECORD := '   1';
2169  25     DESC.SIT_NUMBER := '    ';
2170  26     FOR T := 1 TO 80 DO
2171  27        DESC.TEXT_LINE[T] := ' ';
2172  28     WRITE(DESCRIPTION,0,DESC);
2173  29  END;
2174  30
2175  31
2176  32  IF QUESTIONS_ADDED THEN
2177  33  BEGIN
2178  34     SETNAME(WORKRESP,RESPNAME);
2179  35     CLOSE(WORKRESP);
2180  36     REWRITE(WORKRESP);
2181  37     RECORD_COUNTER := 1;
2182  38     BEGINNING_NUMBER := 1;
2183  39
2184  40  { The following sets up the screen for displaying and accepting }
2185  41  { each question (line item or data point), 15 lines at a time   }
2186  42
2187  43     READ(PROBLEM,0,PROB);
2188  44     CLEARSCREEN(VDT_BLK);
2189  45     REF_SCREEN ;
2190  46     READ(SITUATION,0,SIT);
2191  47     FOR T := 1 TO 50 DO                    { ########## }
2192  48        SIT.SINC_STRING[T] := 10;
2193  49
2194  50  {This is the loop to display and accept each question and response }
2195  51
2196  52     100 : LINE_COUNTER := 9 ;
2197  53     FOR Z := 9 TO 23 DO
2198  54     BEGIN  { line loop }
2199  55
2200  56  { The loop will end after 15 lines or unless last question is reached }
2201  57
```

```
2202  58        IF RECORD_COUNTER <> NEXT_QUESTION THEN BEGIN
2203  59
2204  60           READ(PROBLEM,RECORD_COUNTER,PROB);
2205  61           DISPLAY(VDT_BLK,LINE_COUNTER,47,' [ ',2);
2206  62           DISPLAY(VDT_BLK,LINE_COUNTER,59,'] ',2);
2207  63           DISPLAY(VDT_BLK,LINE_COUNTER,2,PROB.NUM_QUESTION,4);
2208  64           DISPLAY(VDT_BLK,LINE_COUNTER,7,PROB.DESC_QUESTION,30);
2209  65           DISPLAY(VDT_BLK,LINE_COUNTER,38,PROB.UNIT_DESC,10);
2210  66           IF PROB.YES_NO = 'Y' THEN YES_NO_RESP := TRUE
2211  67              ELSE YES_NO_RESP := FALSE;
2212  68           IF PROB.REQUIRED = 'Y' THEN ENTRY_REQUIRED := TRUE
2213  69              ELSE ENTRY_REQUIRED := FALSE;
2214  70           IF PROB.INT_QUEST = 'Y' THEN INTGR := TRUE
2215  71              ELSE INTGR := FALSE;
2216  72           IF PROB.REFERENCE = 'Y' THEN REFRNCE := TRUE
2217  73              ELSE REFRNCE := FALSE;
2218  74
2219  75           IF PROB.STATUS_CODE <> 'D' THEN
2220  76              RESP_ACPT (INT_JUDGEMENT_CODE)
2221  77           ELSE BEGIN
2222  78              INT_JUDGEMENT_CODE := 10 ;
2223  79              DISPLAY(VDT_BLK,LINE_COUNTER,61,'Deleted              ',20);
2224  80           END ;
2225  81
2226  82    { Store intermediate judgement character in appropriate position of
2227  83      situation string , increment record counter (for next question)
2228  84                  and go on to the next line                              }
2229  85
2230  86           SIT.SINC_STRING[RECORD_COUNTER] := INT_JUDGEMENT_CODE;
2231  87
2232  88    { Also write response to work response file for this question number }
2233  89
2234  90           WRITE(WORKRESP,RECORD_COUNTER,RESP);
2235  91           RECORD_COUNTER := RECORD_COUNTER + 1 ;
2236  92           LINE_COUNTER := LINE_COUNTER + 1 ;
2237  93
2238  94        END ;
2239  95     END; { This ends the line display and accept loop }
2240  96
2241  97  { Are the responses shown on the screen correct ?                       }
2242  98
2243  99     ACPT_YES_NO(DUMY,24,43,YES);
2244 100
2245 101  { If the data shown is not correct, return to "loop" for re-entry }
2246 102
2247 103     IF NOT YES THEN
2248 104     BEGIN
2249 105        RECORD_COUNTER := BEGINNING_NUMBER ;
2250 106        GOTO 100 ;
2251 107     END;
2252 108
2253 109  { If the data shown is correct and all questions are answered,         }
2254 110  {       write initial (i.e., "normal") situation record               }
2255 111
2256 112     IF NEW_PROB AND YES AND
2257 113        RECORD_COUNTER = NEXT_QUESTION THEN
2258 114          WRITE(SITUATION,O,SIT) ;
2259 115
2260 116     IF YES AND RECORD_COUNTER <> NEXT_QUESTION THEN
2261 117     BEGIN
2262 118
2263 119  { If more questions to be answered, clear screen for next 15 resp.}
2264 120
2265 121        CLEARSCREEN(VDT_BLK);
2266 122        REF_SCREEN ;
2267 123        BEGINNING_NUMBER := BEGINNING_NUMBER + 15 ;
2268 124        GOTO 100 ;
2269 125     END ;
2270 126
2271 127  { For reinstate or added questions, if reference situation entered is
2272 128    equal to any other situation currently on file, do not add it to the
2273 129    beginning of the file                                                }
2274 130
2275 131     IF REINSTATE OR QUESTIONS_ADDED THEN
2276 132     BEGIN
```

```
2277133          TEST_STRING := SIT.SINC_STRING ;
2278134          READ(SITUATION,0,SIT);
2279135          TOTAL_SITUATIONS := SIT.NEXT_SIT ;
2280136          TOTAL_SITUATIONS := TOTAL_SITUATIONS - 1 ;
2281137          EQUAL := FALSE ;
2282138          FOR T := 0 TO TOTAL_SITUATIONS DO IF NOT EQUAL THEN
2283139          BEGIN
2284140             READ(SITUATION,T,SIT);
2285141             EQUAL := TRUE ;
2286142             FOR Q := 1 TO NEXT_QUESTION DO
2287143             BEGIN
2288144                IF EQUAL AND TEST_STRING[Q] <> SIT.SINC_STRING[Q] THEN
2289145                   EQUAL := FALSE ;
2290146             END ;
2291147          END ;
2292148          IF EQUAL THEN QUESTIONS_ADDED := FALSE ;
2293149          SIT.SINC_STRING := TEST_STRING ;
2294150       END ;
2295151
2296152       IF QUESTIONS_ADDED AND NOT NEW_PROB THEN
2297153       BEGIN
2298154          TEST_STRING := SIT.SINC_STRING ;
2299155          READ(SITUATION,0,SIT);
2300156          SIT_NUMBER := SIT.NEXT_SIT ;
2301157          ENCODE(SIT.SIT_NUM,1,STAT,SIT_NUMBER:4);
2302158          WRITE(SITUATION,SIT_NUMBER,SIT);
2303159          NEW_SIT_NUMBER := SIT_NUMBER ;
2304160          SIT_NUMBER := SIT_NUMBER + 1 ;
2305161          READ(SITUATION,0,SIT);
2306162          SIT.NEXT_SIT := SIT_NUMBER ;
2307163          SIT.SINC_STRING := TEST_STRING ;
2308164          SIT.NUM_ENCOUNTERS := 1 ;
2309165          SIT.AUTHOR_CODE := USER_CODE ;
2310166          DATE(SIT.DATE_ENTERED);
2311167          WRITE(SITUATION,0,SIT);
2312168
2313169 { Re-write all "normal" extra description records for new sit. }
2314170
2315171          SIT_NUMBER := SIT_NUMBER - 1 ;
2316172
2317173       END;
2318174
2319175    END; { This ends the questions added routine }
2320176
2321      END ; { REFERENCE }
      MAP OF IDENTIFIERS FOR  REFERENC IDENTIFIER NAME    KIND         SIZE           STACK                 PICTURE
                                (BYTES,BITS)   DISPLACEMENT          (PACKED FIELDS ONLY)
                                LEVEL(DISPL)   (BYTE,BIT)

JUDGEMENT          VARIABLE     (20,0)         #0028     DIRECT 2322      (*-                                                                      *)
2323      BEGIN  { MAIN PROGRAM }
2324
2325
2326   4     INITSCREEN(VDT_BLK,0);
2327   5     CLEARSCREEN(VDT_BLK);
2328   6     OVLY$(0);
2329   7
2330   8     PROB_NODE := 'PROBLEMS';
2331   9     SIT_NODE := 'SITUATNS';
2332  10     DESC_NODE := 'DESCRIPT';
2333  11     RESPNAME  := 'RESPFILE';
2334  12     COMP_NODE := 'COMPFILE';
2335  13     USER_NAME := 'USERFILE';
2336  14     U_PROB_NAME := 'UPRBFILE';
2337  15
2338  16     DONE := FALSE;
2339  17     CHANGE := FALSE;
2340  18     NEW_PROB := FALSE;
2341  19     NEW_QUEST := FALSE;
2342  20     QUESTIONS_ADDED := FALSE ;
2343  21     DELETE := FALSE ;
```

```
2344 22     REINSTATE := FALSE ;
2345 23
2346 24  { Open user file and user/problem file and store number of records   }
2347 25
2348 26     SETNAME(USERFILE, USER_NAME);
2349 27     SETNAME(U_PROB_FILE, U_PROB_NAME);
2350 28     IOTERM(USERFILE, OVAL, TRUE);
2351 29     EXTEND(USERFILE);
2352 30     IOTERM(U_PROB_FILE, OVAL, TRUE);
2353 31     EXTEND(U_PROB_FILE);
2354 32     READ(USERFILE, 0, USER);
2355 33     DECODE(USER.NEXT_RECORD, 1, STAT, USER_RECORDS);
2356 34     USER_RECORDS := USER_RECORDS - 1 ;
2357 35     READ(U_PROB_FILE, 0, USER_PROB);
2358 36     DECODE(USER_PROB.NEXT_RECORD, 1, STAT, U_PROB_RECORDS);
2359 37
2360 38
2361 39     DISPLAY(VDT_BLK, 1, 12, 'P A R A D O C S    D E V E L O P M E N T',99);
2362 40     DISPLAY(VDT_BLK, 1, 56, 'S Y S T E M',99);
2363 41     DISPLAY(VDT_BLK, 2, 22, '**** PROBLEM    MAINTENANCE ****',99);
2364 42     DISPLAY(VDT_BLK, 3, 6, 'YOUR USER CODE : [         ]',99);
2365 43     DISPLAY(VDT_BLK, 4, 6, 'PROBLEM CODE : ',99);
2366 44     DISPLAY(VDT_BLK, 4, 58, 'NEW ?',99);
2367 45     DISPLAY(VDT_BLK, 6, 6, 'PROBLEM NAME : ',99);
2368 46     DISPLAY(VDT_BLK, 6, 59, 'UPDATE DATABASE ? [ ]',99);
2369 47     DISPLAY(VDT_BLK, 10, 8, 'QUESTION NO. : ',99);
2370 48     DISPLAY(VDT_BLK, 10, 39, 'List "00" when completed',99);
2371 49     DISPLAY(VDT_BLK, 11, 8, 'DESCRIPTION : ',99);
2372 50     DISPLAY(VDT_BLK, 12, 8, 'YES / NO QUESTION ? ',99);
2373 51     DISPLAY(VDT_BLK, 14, 8, 'UNIT DESCRIPTION : ',99);
2374 52     DISPLAY(VDT_BLK, 17, 8, 'REQUIRED ?',99);
2375 53     DISPLAY(VDT_BLK, 17, 50, 'STATUS : ',99);
2376 54
2377 55     DISPLAY(VDT_BLK, 4, 24, '[ ',2);
2378 56     DISPLAY(VDT_BLK, 6, 24, '[ ',2);
2379 57     DISPLAY(VDT_BLK, 10, 29, '[ ',2);
2380 58     DISPLAY(VDT_BLK, 11, 29, '[ ',2);
2381 59     DISPLAY(VDT_BLK, 12, 29, '[ ',2);
2382 60     DISPLAY(VDT_BLK, 14, 29, '[ ',2);
2383 61     DISPLAY(VDT_BLK, 17, 29, '[ ',2);
2384 62     DISPLAY(VDT_BLK, 4, 66, '[ ',2);
2385 63
2386 64     DISPLAY(VDT_BLK, 4, 33, '] ',2);
2387 65     DISPLAY(VDT_BLK, 6, 55, '] ',2);
2388 66     DISPLAY(VDT_BLK, 10, 32, '] ',2);
2389 67     DISPLAY(VDT_BLK, 11, 60, '] ',2);
2390 68     DISPLAY(VDT_BLK, 12, 31, '] ',2);
2391 69     DISPLAY(VDT_BLK, 14, 40, '] ',2);
2392 70     DISPLAY(VDT_BLK, 17, 31, '] ',2);
2393 71     DISPLAY(VDT_BLK, 4, 68, '] ',2);
2394 72
2395 73
2396 74     DONE := FALSE ;
2397 75     ERROR_STATUS := TRUE ;
2398 76
2399 77  { The following accepts a valid user code and checks to make sure
2400 78    the user is a mentor                                                 }
2401 79
2402 80   REPEAT
2403 81     CHECK_CODE(3, 25, DONE, ERROR_STATUS, USER_RCD_NUMBER);
2404 82     IF ERROR_STATUS THEN
2405 83       DISPLAY(VDT_BLK, 3, 41, 'This user code is not valid   ',99)
2406 84     ELSE DISPLAY(VDT_BLK, 3, 16, 'NAME:              ',99);
2407 85   UNTIL DONE OR NOT ERROR_STATUS;
2408 86
2409 87  { The following rouine accepts a problem file name, checks to see if
2410 88    it exists, and creates it if the operator says "Y" to "NEW?" and if
2411 89    the name is acceptable - cannot begin with space or number and
2412 90    cannot have special characters embedded; the system also checks
2413 91    to make sure that any problem which is to be modified "belongs"
2414 92    to this mentor and not to someone else                               }
2415 93
2416 94   IF NOT DONE THEN REPEAT
2417 95     DUMY := 'Y';
```

```
2418 96     ACCEPT(VDT_BLK,4,25,PROBLEM_FILE,8,T);
2419 97
2420 98     IF PROBLEM_FILE = '             ' THEN DONE := TRUE ;
2421 99
2422 100 { If all spaces entered, then terminate program                              }
2423 101
2424 102    IF NOT DONE THEN
2425 103    BEGIN
2426 104       SETMEMBER(PROBLEM,PROB_NODE,PROBLEM_FILE);
2427 105       IOTERM(PROBLEM,OVAL,FALSE);
2428 106       RESET(PROBLEM);
2429 107
2430 108 { Check match between this operator and the problem's mentor code
2431 109   and make sure this is a primary problem                                    }
2432 110
2433 111       IF STATUS(PROBLEM) = 0 THEN
2434 112       BEGIN
2435 113          READ(PROBLEM,0,PROB);
2436 114          IF PROB.MENTOR_CODE <> USER_CODE
2437 115            AND PROB.MENTOR_CODE <> '        ' THEN
2438 116          BEGIN
2439 117             DISPLAY(VDT_BLK,5,41,
2440 118                'Sorry, you are not this problem''s mentor',99);
2441 119             DUMY := 'N' ;
2442 120          END ELSE
2443 121             DISPLAY(VDT_BLK,5,41,
2444 122                '                                          ',99);
2445 123          IF PROB.PRIMARY_CODE <> '        ' THEN
2446 124          BEGIN
2447 125             DISPLAY(VDT_BLK,5,41,'This is not a primary problem',99);
2448 126             DUMY := 'N' ;
2449 127          END ;
2450 128       END ;
2451 129
2452 130 { If problem does not exist, find out if a new one should be created }
2453 131
2454 132       IF STATUS(PROBLEM) <> 0 THEN
2455 133       BEGIN
2456 134          ACPT_YES_NO(DUMY,4,67,YES);
2457 135          IF YES THEN DUMY := 'Y';
2458 136          IF DUMY = 'Y' THEN
2459 137          BEGIN
2460 138             EXTEND(PROBLEM);
2461 139             IF STATUS(PROBLEM) = 0 THEN
2462 140             BEGIN
2463 141                PROB.NEXT_QUESTION := 1 ;
2464 142                REPEAT
2465 143                   ACCEPT(VDT_BLK,6,25,PROB.DESCRIPTION,30,T);
2466 144                UNTIL PROB.DESCRIPTION[1] <> ' ';
2467 145                ACPT_YES_NO(PROB.DATA_BASE,6,78,DATA_BSE);
2468 146
2469 147                PROB.PROBLEM_CODE  := PROBLEM_FILE ;
2470 148                PROB.INT_QUESTIONS := 0 ;
2471 149                PROB.TIMES_USED    := 0 ;
2472 150                PROB.NUM_SITUATIONS := 1 ;
2473 151                PROB.PRIMARY_CODE  := '        ';
2474 152                DATE(PROB.DATE_ENTERED);
2475 153                DATE(PROB.DATE_LAST_USED);
2476 154                PROB.MENTOR_CODE   := USER_CODE ;
2477 155                PROB.MINIMUM_LI    := 25 ;
2478 156                PROB.TOPIC_CODE    := '       ';        {##########}
2479 157                PROB.CALC_LI_FLAG  := 'N' ;
2480 158                PROB.FLAG1_FUTURE  := ' ' ;
2481 159                PROB.FLAG2_FUTURE  := ' ' ;
2482 160                PROB.FLAG3_FUTURE  := ' ' ;
2483 161                WRITE(PROBLEM,0,PROB);
2484 162                NEW_PROB := TRUE;
2485 163
2486 164 { Also add a "mentor" record to the User/Problem file                         }
2487 165
2488 166                USER_PROB.USER_CODE    := USER_CODE ;
2489 167                USER_PROB.PROBLEM_CODE := PROBLEM_FILE ;
2490 168                USER_PROB.STATUS_CODE  := 'M' ;
2491 169                USER_PROB.TIMES_USED   := '   0';
2492 170                WRITE(U_PROB_FILE,U_PROB_RECORDS,USER_PROB);
```

```
2493171             READ(U_PROB_FILE,O,USER_PROB);
2494172             U_PROB_RECORDS := U_PROB_RECORDS + 1 ;
2495173             ENCODE(USER_PROB.NEXT_RECORD,1,STAT,U_PROB_RECORDS:4);
2496174             WRITE(U_PROB_FILE,O,USER_PROB);
2497175          END
2498176          ELSE DUMY := 'N';
2499177       END;
2500178    END;
2501179   END;
2502180 UNTIL DUMY = 'Y';
2503181
2504182 IF NOT DONE THEN
2505183 BEGIN
2506184
2507185 CLOSE(PROBLEM);
2508186 IOTERM(PROBLEM,OVAL,TRUE);
2509187 EXTEND(PROBLEM);
2510188
2511189 { Open up situation and description files                              }
2512190
2513191 SETMEMBER(SITUATION,SIT_NODE,PROBLEM_FILE);
2514192 IOTERM(SITUATION,OVAL,FALSE);
2515193 EXTEND(SITUATION);
2516194
2517195 SETMEMBER(DESCRIPTION,DESC_NODE,PROBLEM_FILE);
2518196 IOTERM(DESCRIPTION,OVAL,FALSE);
2519197 EXTEND(DESCRIPTION);
2520198
2521199 READ(PROBLEM,O,PROB);
2522200 DISPLAY(VDT_BLK,6,25,PROB.DESCRIPTION,30);
2523201 DUMMY[1] := PROB.DATA_BASE ;
2524202 DISPLAY(VDT_BLK,6,78,DUMMY,1);
2525203 CALC_FLAG := PROB.CALC_LI_FLAG ;
2526204
2527205 IF NOT NEW_PROB THEN
2528206 BEGIN
2529207    ACCEPT(VDT_BLK,6,25,PROB.DESCRIPTION,30,T);
2530208    ACPT_YES_NO(PROB.DATA_BASE,6,78,DATA_BSE);
2531209    WRITE(PROBLEM,O,PROB);
2532210 END ;
2533211
2534212 { Check for delete or reinstate if accessing an existing problem       }
2535213
2536214 IF NOT NEW_PROB THEN
2537215 BEGIN
2538216    DISPLAY(VDT_BLK,8,8,'DO YOU WISH TO DELETE OR REINSTATE A ',99);
2539217    DISPLAY(VDT_BLK,8,45,'QUESTION ?   [ ] ',99);
2540218    ACPT_YES_NO(DUMY,8,59,YES);
2541219    IF YES THEN
2542220    BEGIN
2543221       DISPLAY(VDT_BLK,8,67,'DELETE ?   [ ] ',99);
2544222       ACPT_YES_NO(DUMY,8,78,YES);
2545223       IF YES THEN DELETE := TRUE ELSE REINSTATE := TRUE ;
2546224    END ;
2547225 END ;
2548226
2549227 { Files are open; repeat question entry until "OO" response            }
2550228
2551229  OVLY$(1);
2552230  QUESTIONS ;
2553231
2554232 { The following section will only be used if this is a new problem,
2555233   if there has been additional questions added to an existing prob-
2556234   lem, or if one or more questions have been reinstated                }
2557235
2558236 DONE := FALSE;
2559237
2560238    { The relative SITUATION file is now open and the following
2561239      routine will initialize the data record for a new problem
2562240      plus capture the inital interpretation(s) in the sequential
2563241                 DESCRIPTION file                                        }
2564242
2565243 OVLY$(2) ;
2566244 REFERENCE ;
```

```
2567245
2568246    IF NEW_PROB OR QUESTIONS_ADDED THEN
2569247    BEGIN
2570248
2571249    { Capture description of "normal" interpretation and display old
2572250      reference description if this is a reinstate or added questions    }
2573251
2574252       OVLY$(3) ;
2575253       PROB_DESC ;
2576254
2577255    END ;
2578256
2579257    END ;   { IF NOT DONE THEN }
2580258
2581    END.
```

MAP OF IDENTIFIERS FOR   PROBLEM_

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| PROB_RECORD | RECORD | (96,0) | | |
| PROBLEM_CODE | FIELD | (8,0) | (0,0) | UNPACKED |
| DESCRIPTION | FIELD | (30,0) | (8,0) | UNPACKED |
| NEXT_QUESTION | FIELD | (2,0) | (38,0) | UNPACKED |
| INT_QUESTIONS | FIELD | (2,0) | (40,0) | UNPACKED |
| TIMES_USED | FIELD | (2,0) | (42,0) | UNPACKED |
| TOPIC_CODE | FIELD | (8,0) | (44,0) | UNPACKED |
| DATE_ENTERED | FIELD | (8,0) | (52,0) | UNPACKED |
| DATE_LAST_USED | | | | |
|  | FIELD | (8,0) | (60,0) | UNPACKED |
| MENTOR_CODE | FIELD | (6,0) | (68,0) | UNPACKED |
| NUM_SITUATIONS | | | | |
|  | FIELD | (2,0) | (74,0) | UNPACKED |
| MINIMUM_LI | FIELD | (2,0) | (76,0) | UNPACKED |
| CALC_LI_FLAG | FIELD | (0,8) | (78,0) | UNPACKED |
| FLAG1_FUTURE | FIELD | (0,8) | (80,0) | UNPACKED |
| FLAG2_FUTURE | FIELD | (0,8) | (82,0) | UNPACKED |
| FLAG3_FUTURE | FIELD | (0,8) | (84,0) | UNPACKED |
| DATA_BASE | FIELD | (0,8) | (86,0) | UNPACKED |
| PRIMARY_CODE | FIELD | (8,0) | (88,0) | UNPACKED |
| NUM_QUESTION | FIELD | (2,0) | (0,0) | UNPACKED |
| DESC_QUESTION | FIELD | (30,0) | (2,0) | UNPACKED |
| YES_NO | FIELD | (0,8) | (32,0) | UNPACKED |
| CALCULATE | FIELD | (0,8) | (34,0) | UNPACKED |
| INT_QUEST | FIELD | (0,8) | (36,0) | UNPACKED |
| REFERENCE | FIELD | (0,8) | (38,0) | UNPACKED |
| UNIT_DESC | FIELD | (10,0) | (40,0) | UNPACKED |
| BOUNDARIES | FIELD | (2,0) | (50,0) | UNPACKED |
| LOWER_1_LIMIT | FIELD | (4,0) | (52,0) | UNPACKED |
| UPPER_1_LIMIT | FIELD | (4,0) | (56,0) | UNPACKED |
| LOWER_2_LIMIT | FIELD | (4,0) | (60,0) | UNPACKED |
| UPPER_2_LIMIT | FIELD | (4,0) | (64,0) | UNPACKED |
| REQUIRED | FIELD | (0,8) | (68,0) | UNPACKED |
| LGCL_IMPT | FIELD | (2,0) | (70,0) | UNPACKED |
| EXPT_IMPT | FIELD | (2,0) | (72,0) | UNPACKED |
| LGCL_INTR | FIELD | (2,0) | (74,0) | UNPACKED |
| EXPT_INTR | FIELD | (2,0) | (76,0) | UNPACKED |
| LGCL_CMPL | FIELD | (2,0) | (78,0) | UNPACKED |
| EXPT_CMPL | FIELD | (2,0) | (80,0) | UNPACKED |
| STATUS_CODE | FIELD | (0,8) | (82,0) | UNPACKED |
| SORT_FLAG | FIELD | (0,8) | (84,0) | UNPACKED |
| FLAG6_FUTURE | FIELD | (0,8) | (86,0) | UNPACKED |
| FLAG7_FUTURE | FIELD | (0,8) | (88,0) | UNPACKED |
| FLAG8_FUTURE | FIELD | (0,8) | (90,0) | UNPACKED |
| SIT_RECORD | RECORD | (250,0) | | |
| SIT_NUM | FIELD | (4,0) | (0,0) | UNPACKED |
| SIT_DESCRIPTION | | | | |
|  | FIELD | (80,0) | (4,0) | UNPACKED |
| NEXT_SIT | FIELD | (2,0) | (84,0) | UNPACKED |
| PROB1_LINK | FIELD | (8,0) | (86,0) | UNPACKED |
| PROB2_LINK | FIELD | (8,0) | (94,0) | UNPACKED |
| PROB3_LINK | FIELD | (8,0) | (102,0) | UNPACKED |
| PROB4_LINK | FIELD | (8,0) | (110,0) | UNPACKED |

| | | | | |
|---|---|---|---|---|
| AUTHOR_CODE | FIELD | (6,0) | (118,0) | UNPACKED |
| DATE_ENTERED | FIELD | (8,0) | (124,0) | UNPACKED |
| DATE_LAST_USED | | | | |
| | FIELD | (8,0) | (132,0) | UNPACKED |
| NUM_ENCOUNTERS | | | | |
| | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |
| TEXT_LINE | FIELD | (80,0) | (8,0) | UNPACKED |
| USER_RECORD | RECORD | (202,0) | | |
| NEXT_RECORD | FIELD | (4,0) | (0,0) | UNPACKED |
| USER_CODE | FIELD | (6,0) | (4,0) | UNPACKED |
| USER_NAME | FIELD | (30,0) | (10,0) | UNPACKED |
| USER_TITLE | FIELD | (30,0) | (40,0) | UNPACKED |
| ADDRESS1 | FIELD | (30,0) | (70,0) | UNPACKED |
| ADDRESS2 | FIELD | (30,0) | (100,0) | UNPACKED |
| ADDRESS3 | FIELD | (30,0) | (130,0) | UNPACKED |
| PHONE | FIELD | (12,0) | (160,0) | UNPACKED |
| MAX_STATUS | FIELD | (0,8) | (172,0) | UNPACKED |
| PRINTER | FIELD | (0,8) | (174,0) | UNPACKED |
| NUM_PROBLEMS | FIELD | (4,0) | (176,0) | UNPACKED |
| DATE_ENTERED | FIELD | (8,0) | (180,0) | UNPACKED |
| DATE_LAST_USED | | | | |
| | FIELD | (8,0) | (188,0) | UNPACKED |
| TOTAL_TIMES | FIELD | (6,0) | (196,0) | UNPACKED |
| USER_PROBLEM_RECORD | | | | |
| | RECORD | (24,0) | | |
| NEXT_RECORD | FIELD | (4,0) | (0,0) | UNPACKED |
| USER_CODE | FIELD | (6,0) | (4,0) | UNPACKED |
| PROBLEM_CODE | FIELD | (8,0) | (10,0) | UNPACKED |
| STATUS_CODE | FIELD | (0,8) | (18,0) | UNPACKED |
| TIMES_USED | FIELD | (4,0) | (20,0) | UNPACKED |
| RESP_RECORD | RECORD | (10,0) | | |
| RESPONSE | FIELD | (10,0) | (0,0) | UNPACKED |
| COMP_RECORD | RECORD | (82,0) | | |
| RCD_NUMBER | FIELD | (2,0) | (0,0) | UNPACKED |
| FORMULA | FIELD | (80,0) | (2,0) | UNPACKED |
| CPY_PROB | VARIABLE | (32,0) | #0080 | DIRECT |
| WORKRESP | VARIABLE | (32,0) | #00A0 | DIRECT |
| COMPFILE | VARIABLE | (32,0) | #00C0 | DIRECT |
| RESP | VARIABLE | (10,0) | #00E0 | DIRECT |
| COMP | VARIABLE | (82,0) | #00EA | DIRECT |
| PROBLEM | VARIABLE | (32,0) | #013C | DIRECT |
| SITUATION | VARIABLE | (32,0) | #015C | DIRECT |
| DESCRIPTION | VARIABLE | (32,0) | #017C | DIRECT |
| USERFILE | VARIABLE | (32,0) | #019C | DIRECT |
| U_PROB_FILE | VARIABLE | (32,0) | #01BC | DIRECT |
| USER | VARIABLE | (202,0) | #01DC | DIRECT |
| USER_PROB | VARIABLE | (24,0) | #02A6 | DIRECT |
| PROB | VARIABLE | (96,0) | #02BE | DIRECT |
| SIT | VARIABLE | (250,0) | #031E | DIRECT |
| DESC | VARIABLE | (88,0) | #0418 | DIRECT |
| USER_CODE | VARIABLE | (6,0) | #0470 | DIRECT |
| USER_RECORDS | VARIABLE | (2,0) | #0476 | DIRECT |
| U_PROB_RECORDS | VARIABLE | (2,0) | #0478 | DIRECT |
| USER_NAME | VARIABLE | (8,0) | #047A | DIRECT |
| U_PROB_NAME | VARIABLE | (8,0) | #0482 | DIRECT |
| PROBLEM_FILE | VARIABLE | (8,0) | #048A | DIRECT |
| DESC_NODE | VARIABLE | (8,0) | #0492 | DIRECT |
| PROB_NODE | VARIABLE | (8,0) | #049A | DIRECT |
| SIT_NODE | VARIABLE | (8,0) | #04A2 | DIRECT |
| VDT_BLK | VARIABLE | (32,0) | #04AA | DIRECT |
| RESPNAME | VARIABLE | (8,0) | #04CA | DIRECT |
| COMP_NODE | VARIABLE | (8,0) | #04D2 | DIRECT |
| CALC_FLAG | VARIABLE | (0,8) | #04DA | DIRECT |
| T | VARIABLE | (0,8) | #04DC | DIRECT |
| DUMY | VARIABLE | (0,8) | #04DE | DIRECT |
| NUMBER | VARIABLE | (2,0) | #04E0 | DIRECT |
| PROB_RCD_NUMBER | VARIABLE | (2,0) | #04E2 | DIRECT |

```
USER_RCD_NUMBER VARIABLE    (2,0)       #04E4       DIRECT
RECORD_COUNTER  VARIABLE    (2,0)       #04E6       DIRECT
LINE_COUNTER    VARIABLE    (2,0)       #04E8       DIRECT
QUEST_NUMBER    VARIABLE    (2,0)       #04EA       DIRECT
NEXT_QUESTION   VARIABLE    (2,0)       #04EC       DIRECT
INT_JUDGEMENT_CODE
                VARIABLE    (2,0)       #04EE       DIRECT
TOTAL_QUESTIONS VARIABLE    (2,0)       #04F0       DIRECT
INT_QUESTIONS   VARIABLE    (2,0)       #04F2       DIRECT
YES             VARIABLE    (0,1)       #04F4       DIRECT
CHANGE          VARIABLE    (0,1)       #04F6       DIRECT
OVAL            VARIABLE    (0,1)       #04F8       DIRECT
ERROR_STATUS    VARIABLE    (0,1)       #04FA       DIRECT
NEW_QUEST       VARIABLE    (0,1)       #04FC       DIRECT
NEW_PROB        VARIABLE    (0,1)       #04FE       DIRECT
INTGR           VARIABLE    (0,1)       #0500       DIRECT
REFRNCE         VARIABLE    (0,1)       #0502       DIRECT
CALCULATE       VARIABLE    (0,1)       #0504       DIRECT
DONE            VARIABLE    (0,1)       #0506       DIRECT
COMPARE_REQUIRED
                VARIABLE    (0,1)       #0508       DIRECT
ALL_SET         VARIABLE    (0,1)       #050A       DIRECT
ENTRY_REQUIRED  VARIABLE    (0,1)       #050C       DIRECT
YES_NO_RESP     VARIABLE    (0,1)       #050E       DIRECT
EQUAL           VARIABLE    (0,1)       #0510       DIRECT
QUESTIONS_ADDED VARIABLE    (0,1)       #0512       DIRECT
MINIMUM         VARIABLE    (2,0)       #0514       DIRECT
SIT_NUMBER      VARIABLE    (2,0)       #0516       DIRECT
BEGINNING_NUMBER
                VARIABLE    (2,0)       #0518       DIRECT
STAT            VARIABLE    (2,0)       #051A       DIRECT
NEW_SIT_NUMBER  VARIABLE    (2,0)       #051C       DIRECT
TOTAL_SITUATIONS
                VARIABLE    (2,0)       #051E       DIRECT
ASCII_NUMBER    VARIABLE    (6,0)       #0520       DIRECT
DUMMY           VARIABLE    (2,0)       #0526       DIRECT
DATA_BSE        VARIABLE    (0,1)       #0528       DIRECT
DELETE          VARIABLE    (0,1)       #052A       DIRECT
REINSTATE       VARIABLE    (0,1)       #052C       DIRECT
SKIP_ENTRY      VARIABLE    (0,1)       #052E       DIRECT
TEST_STRING     VARIABLE    (100,0)     #0530       DIRECT
RESP_STRING     VARIABLE    (10,0)      #0594       DIRECT
MAXIMUM NUMBER OF IDENTIFIERS USED = 242
   DXPSCL   1.7.1   81.254    OPTIMIZATION SUMMARY

"ACPT_YES" -- 5500 HEAP BYTES REQUIRED TO OPTIMIZE AT LEVEL 1

"CHECK_CO" -- 6400 HEAP BYTES REQUIRED TO OPTIMIZE AT LEVEL 1

"CLEAR_LI" -- 5000 HEAP BYTES REQUIRED TO OPTIMIZE AT LEVEL 1

"NUMERIC_" -- 5200 HEAP BYTES REQUIRED TO OPTIMIZE AT LEVEL 1

"CHANGE_D" -- 5600 HEAP BYTES REQUIRED TO OPTIMIZE AT LEVEL 1

1 REDUNDANT COMMON SUBEXPRESSIONS ELIMINATED IN "PROB_DES"
    "PROB_DES" -- 12800 HEAP BYTES REQUIRED TO OPTIMIZE AT LEVEL 1

"ASSUME_N" -- 5700 HEAP BYTES REQUIRED TO OPTIMIZE AT LEVEL 1

4 REDUNDANT COMMON SUBEXPRESSIONS ELIMINATED IN "BOUNDARI"
    "BOUNDARI" -- 9000 HEAP BYTES REQUIRED TO OPTIMIZE AT LEVEL 1

6 REDUNDANT COMMON SUBEXPRESSIONS ELIMINATED IN "QST_CALC"
    "QST_CALC" -- 17700 HEAP BYTES REQUIRED TO OPTIMIZE AT LEVEL 1

6 REDUNDANT COMMON SUBEXPRESSIONS ELIMINATED IN "QUESTION"
    "QUESTION" -- 15600 HEAP BYTES REQUIRED TO OPTIMIZE AT LEVEL 1

"REF_SCRE" -- 6000 HEAP BYTES REQUIRED TO OPTIMIZE AT LEVEL 1

4 REDUNDANT COMMON SUBEXPRESSIONS ELIMINATED IN "CALC_RES"
    "CALC_RES" -- 11700 HEAP BYTES REQUIRED TO OPTIMIZE AT LEVEL 1

"RESP_ACP" -- 11100 HEAP BYTES REQUIRED TO OPTIMIZE AT LEVEL 1
```

1 REDUNDANT COMMON SUBEXPRESSIONS ELIMINATED IN "REFERENC"
"REFERENC" -- 10900 HEAP BYTES REQUIRED TO OPTIMIZE AT LEVEL 1

"PROBLEM_" -- 14600 HEAP BYTES REQUIRED TO OPTIMIZE AT LEVEL 1

```
               INSTRUCTIONS =     56
       ACPT_YES  LITERALS =       98   CODE =    214   DATA =     112

INSTRUCTIONS =     96
       CHECK_CO  LITERALS =       78   CODE =    394   DATA =      58

INSTRUCTIONS =     22
       CLEAR_LI  LITERALS =       24   CODE =     94   DATA =     124

INSTRUCTIONS =     29
       NUMERIC_  LITERALS =       50   CODE =    100   DATA =      86

INSTRUCTIONS =     81
       CHANGE_D  LITERALS =       32   CODE =    366   DATA =      52
               INSTRUCTIONS =    700
       PROB_DES  LITERALS =      578   CODE =   3054   DATA =    1224

INSTRUCTIONS =     71
       ASSUME_N  LITERALS =      104   CODE =    284   DATA =     112

INSTRUCTIONS =    586
       BOUNDARI  LITERALS =      146   CODE =   2622   DATA =      42

INSTRUCTIONS =   1025
       QST_CALC  LITERALS =      684   CODE =   4338   DATA =     192

INSTRUCTIONS =   1062
       QUESTION  LITERALS =      742   CODE =   4932   DATA =      46

INSTRUCTIONS =    141
       REF_SCRE  LITERALS =      334   CODE =    740   DATA =      44

INSTRUCTIONS =    497
       CALC_RES  LITERALS =       90   CODE =   2038   DATA =     102

INSTRUCTIONS =    652
       RESP_ACP  LITERALS =      508   CODE =   2686   DATA =      70

INSTRUCTIONS =    449
       REFERENC  LITERALS =      128   CODE =   1896   DATA =      70

INSTRUCTIONS =   1032
       PROBLEM_  LITERALS =      892   CODE =   4752   DATA =    1442
       SOURCE  = .PARADOCS.SRC.EXAMPLE
       OBJECT  = .PARADOCS.OBJ.EXAMPLE
       LISTING = .PARADOCS.LST.EXAMPLE
       MESSAGE = .PARADOCS.L
       MEM1 = 6,4
       MEM2 = 13,4
       MEM3 = 10,4
       PRINT WIDTH = 80
       NUMBER OF LINES/PAGE = 60
       OPTIONS = (* NO OPTIONS SPECIFIED *)
       SUPPRESS PREPROCESSOR LINES = YES

LINE NUMBER                  COPY FILE PATHNAME
            80    .PARADOCS.SRC.LAYOUT1
           114    .PARADOCS.SRC.VAR1
           161    .PARADOCS.SRC.IO
       (*+          EXAMPLE
          +           ACPT_YES
          ,           CLEAR_LI
          ,           DESC_ACC
          +           SCRN3_DI
          -           ENTER_RE
          +            LINE_ITE
          ,            RESPONSE
          +             CALCULAT
          -           SCRN_DIS
```

```
-            ID_USER
,            INTERPRE
,            NUMERIC_
,            RECALCUL
+               ANALYZE
,               COMP_TAB
,               INITIALI
,               SIT_TABL
-            RPT_INTE
+               DIFFEREN
-            SCRN1_DI
,            SCRN2_DI
--        *)
24       {$WIDELIST,MAP,PAGE,}
25
26
27       { *********************************************************}
28
29       { The following is a flowchart of the procedures used (excluding
30         screen and other small misc. procedures):
31
32
33                          EXAMPLE_INTERPRETATION
34                                   !
35       -----------------------------------------------------------------
36       !          !         !         !             !     !          !     !
37       ##OVLY 1## !         !         !             !     !          !     !
38       #        # !         !    CLEAR_LINE         !     !          !     !
39       #   ID   # ! SCRN1   !   NUMERIC_CHECK       !     !  SCRN2   !     !
40       #  USER  # ! DISPLAY !    ACPT_YES_NO        !     ! DISPLAY  !     !
41       #        # !         !                       !     !          !     !
42       ########## !         !                       !     !          !     !
43                             !         !             !     !          !     !
44       ###########OVERLAY 2############ ##OVERLAY 3## !    ##OVERLAY 5## !
45       #                              # #           # !    #          #  !
46       #        ENTER_RESPONSES       # # INTERPRET # !    #DESC_ACCEPT# !
47       #               !              # #  EXAMPLE  # !    #     !    #  !
48       #    --------------------      # ############# !    #          #  !
49       #     !       !       !        #               !    #     !    #  !
50       # RESPONSE  SCRN    LINE       # #####OVERLAY 4##### #  SCRN3   #  !
51       #   ACPT  DISPLAY  ITEMS       # #                 # # DISPLAY  #  !
52       #     !                        # #       RPT       # #          #  !
53       # CALCULATE                    # # INTERPRETATION  # #          #  !
54       #   RESP                       # #       !         # #          #  !
55       #                              # #   DIFFERENT     # #          #  !
56       ################################ ################### ############ !
57                                                                          !
58                             ---------------------------------------------
59                              !
60           #####################OVERLAY 6#########################
61           #                                                    #
62           #               RECALCULATE_PROBLEM                  #
63           #                        !                           #
64           #      --------------------------------------        #
65           #      !          !          !           !           #
66           # INITIALIZE  SIT_TABLE  COMP_TABLE  ANALYZE         #
67           #                                                    #
68           ######################################################
69
70
71       **********************************************************}
72
73
74       PROGRAM EXAMPLE_INTERPRETATION ;
75
76       TYPE
77
78         SET_OF_CHAR = SET OF CHAR ;
79         VDT_CONTROL = ARRAY[1..16] OF INTEGER;
80
81       { The following is the record layout for the relative PROBLEM file }
82
83       PROB_RECORD=RECORD         CASE BOOLEAN OF
84                         TRUE:
85
```

```
 86      { This is the "O" record layout for this file }
 87
 88       (PROBLEM_CODE     : PACKED ARRAY[1..8] OF CHAR;
 89        DESCRIPTION      : PACKED ARRAY[1..30] OF CHAR;
 90        NEXT_QUESTION    : INTEGER ;
 91        INT_QUESTIONS    : INTEGER ;
 92        TIMES_USED       : INTEGER ;
 93        TOPIC_CODE       : PACKED ARRAY[1..8] OF CHAR;
 94        DATE_ENTERED     : PACKED ARRAY[1..8] OF CHAR;
 95        DATE_LAST_USED   : PACKED ARRAY[1..8] OF CHAR;
 96        MENTOR_CODE      : PACKED ARRAY[1..6] OF CHAR;
 97        NUM_SITUATIONS   : INTEGER ;
 98        MINIMUM_LI       : INTEGER ;
 99        CALC_LI_FLAG     : CHAR ;
100        FLAG1_FUTURE     : CHAR ;
101        FLAG2_FUTURE     : CHAR ;
102        FLAG3_FUTURE     : CHAR ;
103        DATA_BASE        : CHAR ;
104        PRIMARY_CODE     : PACKED ARRAY[1..8] OF CHAR);
105
106
107                FALSE:
108
109     { This is the "1" through "Nth" record layout   }
110
111       (NUM_QUESTION     : PACKED ARRAY[1..2] OF CHAR;
112        DESC_QUESTION    : PACKED ARRAY[1..30] OF CHAR;
113        YES_NO           : CHAR;
114        CALCULATE        : CHAR;
115        INT_QUEST        : CHAR;
116        REFERENCE        : CHAR;
117        UNIT_DESC        : PACKED ARRAY[1..10] OF CHAR;
118        BOUNDARIES       : INTEGER ;
119        LOWER_1_LIMIT    : REAL ;
120        UPPER_1_LIMIT    : REAL ;
121        LOWER_2_LIMIT    : REAL ;
122        UPPER_2_LIMIT    : REAL ;
123        REQUIRED         : CHAR;
124        LGCL_IMPT        : INTEGER ;
125        EXPT_IMPT        : INTEGER ;
126        LGCL_INTR        : INTEGER ;
127        EXPT_INTR        : INTEGER ;
128        LGCL_CMPL        : INTEGER ;
129        EXPT_CMPL        : INTEGER ;
130        STATUS_CODE      : CHAR;
131        SORT_FLAG        : CHAR;
132        FLAG6_FUTURE     : CHAR;
133        FLAG7_FUTURE     : CHAR;
134        FLAG8_FUTURE     : CHAR)
135     END;
136
137
138     { The following is the record layout for the relative SITUATION file }
139
140     SIT_RECORD=RECORD
141
142        SIT_NUM          : PACKED ARRAY[1..4] OF CHAR;
143        SIT_DESCRIPTION  : PACKED ARRAY[1..80] OF CHAR;
144        NEXT_SIT         : INTEGER ;
145        PROB1_LINK       : PACKED ARRAY[1..8] OF CHAR;
146        PROB2_LINK       : PACKED ARRAY[1..8] OF CHAR;
147        PROB3_LINK       : PACKED ARRAY[1..8] OF CHAR;
148        PROB4_LINK       : PACKED ARRAY[1..8] OF CHAR;
149        AUTHOR_CODE      : PACKED ARRAY[1..6] OF CHAR;
150        DATE_ENTERED     : PACKED ARRAY[1..8] OF CHAR;
151        DATE_LAST_USED   : PACKED ARRAY[1..8] OF CHAR;
152        NUM_ENCOUNTERS   : INTEGER ;
153        SINC_STRING      : PACKED ARRAY[1..50] OF INTEGER ; { ########## }
154        FLAG1_FUTURE     : CHAR ;
155        FLAG2_FUTURE     : CHAR ;
156        FLAG3_FUTURE     : CHAR ;
157        FLAG4_FUTURE     : CHAR ;
158     END;
159
160
```

```
161     { The following is the record layout for the relative DESCRIPTION file }
162
163     DESC_RECORD=RECORD
164
165        NEXT_RECORD       : PACKED ARRAY[1..4] OF CHAR;
166        SIT_NUMBER        : PACKED ARRAY[1..4] OF CHAR;
167        TEXT_LINE         : PACKED ARRAY[1..80] OF CHAR;
168     END;
169
170
171     { The following is the record layout for the sequential USERPROB file;
172       late it will be changed to a KIF file, but initially it will be
173       established as a RELATIVE file                                      }
174
175     USER_PROBLEM_RECORD=RECORD
176
177        NEXT_RECORD       : PACKED ARRAY[1..4] OF CHAR ;
178        USER_CODE         : PACKED ARRAY[1..6] OF CHAR ;
179        PROBLEM_CODE      : PACKED ARRAY[1..8] OF CHAR ;
180        STATUS_CODE       : CHAR ;
181        TIMES_USED        : PACKED ARRAY[1..4] OF CHAR ;
182     END ;
183
184     { The following is the record layout for the RELATIVE work file which
185       is used to store the actual responses to the questions as they are
186       being entered and then used for input to calculated questions and
187       for writing to the KIF RESPONSE file when the example has been
188       completed                                                           }
189
190     RESP_RECORD=RECORD
191        RESPONSE          : PACKED ARRAY[1..10] OF CHAR ;
192     END;
193
194
195     { The following is the layout of the RELATIVE formula file used for
196       calculated questions                                                }
197
198     COMP_RECORD=RECORD
199        RCD_NUMBER        : PACKED ARRAY[1..2] OF CHAR ;
200        FORMULA           : PACKED ARRAY[1..80] OF CHAR ;
201     END ;
202
203
204     {$PAGE}
205     { *******************************************************************}
206
207     { PROGRAM }
208
209     VAR
210
211     LNKPROB       : RANDOM FILE OF PROB_RECORD ;
212     WORKRESP      : RANDOM FILE OF RESP_RECORD ;
213     COMPFILE      : RANDOM FILE OF COMP_RECORD ;
214     RESP          : RESP_RECORD ;
215     COMP          : COMP_RECORD ;
216     PROBLEM       : RANDOM FILE OF PROB_RECORD;
217     SITUATION     : RANDOM FILE OF SIT_RECORD;
218     DESCRIPTION   : RANDOM FILE OF DESC_RECORD;
219     U_PROB_FILE   : RANDOM FILE OF USER_PROBLEM_RECORD;
220
221     USER_PROB     : USER_PROBLEM_RECORD;
222     PROB          : PROB_RECORD;
223     SIT           : SIT_RECORD;
224     DESC          : DESC_RECORD;
225
226     USER_CODE     :   PACKED ARRAY[1..6] OF CHAR ;
227     USER_NAME     :   PACKED ARRAY[1..30] OF CHAR ;
228     U_PROB_RECORDS : INTEGER ;
229     U_PROB_NAME   :   PACKED ARRAY[1..8] OF CHAR ;
230     PROBLEM_FILE  : PACKED ARRAY[1..8] OF CHAR;
231     DESC_NODE , PROB_NODE , SIT_NODE     : PACKED ARRAY[1..8] OF CHAR;
232     VDT_BLK : VDT_CONTROL;
233
234     REPORT        : TEXT ;
235     PRINTER       : TEXT ;
```

```
236     INTERPRET      : TEXT ;
237     MATCHES        : TEXT ;
238     APPROX         : TEXT ;
239     UPDATE_FILE    : TEXT ;
240     MATCHNME       : PACKED ARRAY[1..8] OF CHAR ;
241     APPRXNME       : PACKED ARRAY[1..8] OF CHAR ;
242     LINK_CODES     : PACKED ARRAY[1..5,1..8] OF CHAR ;
243     BUFFER         : PACKED ARRAY[1..80] OF CHAR ;
244     REPTNAME       : PACKED ARRAY[1..8] OF CHAR ;
245     PRNTNAME       : PACKED ARRAY[1..8] OF CHAR ;
246     INTRNAME       : PACKED ARRAY[1..8] OF CHAR ;
247     RESPNAME       : PACKED ARRAY[1..8] OF CHAR ;
248     DATEPRNT       : PACKED ARRAY[1..8] OF CHAR ;
249     COMP_NODE      : PACKED ARRAY[1..8] OF CHAR ;
250     UPDTNAME       : PACKED ARRAY[1..8] OF CHAR ;
251
252     ORIGINAL_PROBLEM : PACKED ARRAY[1..8] OF CHAR;
253     RESPONSE : PACKED ARRAY[1..10] OF CHAR;
254     NUMBER , INT_JUDGEMENT_CODE : INTEGER ;
255     T , DUMY : CHAR;
256     COUNTER , NEXT_QUESTION , RECORD_COUNTER , LINE_COUNTER : INTEGER ;
257     UPPER , LOWER : REAL ;
258     VALID , OPEN , YES , MAJOR , OVAL , ERROR_STATUS : BOOLEAN ;
259     R_ALL_SPACES , DONE : BOOLEAN ;
260     COMPARE_REQUIRED , ALL_SET , ENTRY_REQUIRED , YES_NO_RESP : BOOLEAN ;
261     MINIMUM , LGCL_IMPT , SIT_NUMBER , BEGINNING_NUMBER , STAT : INTEGER;
262     DUMMY : PACKED ARRAY[1..2] OF CHAR;
263     TOTAL_QUESTIONS , LINK_NUMBER : INTEGER ;
264
265     SIT_ADDED , LINK_MODE : BOOLEAN ;
266     FULL_INTERPRETATION , MAJOR_MATCH , DESCRIP_INT , IGNORANCE : BOOLEAN ;
267
268     EXAMPLE_NAME : PACKED ARRAY[1..30] OF CHAR;
269     ID_EXAMPLE   : PACKED ARRAY[1..15] OF CHAR;
270
271     INC_STRING   : PACKED ARRAY[1..50] OF INTEGER ;   { ########## }
272     MINC_STRING  : PACKED ARRAY[1..50] OF INTEGER ;   { ########## }
273     LINC_STRING  : PACKED ARRAY[1..50] OF INTEGER ;   { ########## }
274     QUEST_MASK   : PACKED ARRAY[1..50] OF CHAR ;      { ########## }
275
276     {$PAGE}
277     { ******************************************************************}
278
279
280     {     The following are screen and file handling procedures        }
281
282     PROCEDURE SETFILLER(VAR VDT$ : VDT_CONTROL ;
283        FILL_CHAR: CHAR);
284          EXTERNAL;
285
286     PROCEDURE CLEARSCREEN(VAR VDT$ : VDT_CONTROL);   EXTERNAL;
287
288     PROCEDURE INITSCREEN(VAR VDT$: VDT_CONTROL; LUNO: INTEGER); EXTERNAL;
289
290     PROCEDURE DISPLAY(VAR VDT$: VDT_CONTROL; LINE: INTEGER;
291        COLUMN : INTEGER; BUFFER: PACKED ARRAY[1..?] OF CHAR;
292        LENGTH : INTEGER); EXTERNAL;
293
294     PROCEDURE ACCEPT(VAR VDT$: VDT_CONTROL; LINE,COLUMN: INTEGER;
295        VAR BUFFER: PACKED ARRAY[1..?] OF CHAR; LENGTH: INTEGER;
296        VAR TERM_CHAR: CHAR); EXTERNAL;
297
298
299     { ****************************************************************** }
300
301
302     PROCEDURE OVLY$(OVERLAY_NUMBER : INTEGER);   EXTERNAL ;
303
304     PROCEDURE ID_USER ;  FORWARD ;
305
306     PROCEDURE INTERPRET_EXAMPLE ;  FORWARD ;
307
308     PROCEDURE RPT_INTERPRETATION ;  FORWARD ;
309
310     PROCEDURE DESC_ACCEPT ;  FORWARD ;
```

```
311
312      PROCEDURE RECALCULATE_PROBLEM ;     FORWARD ;
313
314      PROCEDURE ENTER_RESPONSES ;   FORWARD ;
315
316      PROCEDURE CLEAR_LINE (LINE_NUMBER : INTEGER );      FORWARD ;
317
318      PROCEDURE NUMERIC_CHECK ( VAR FIELD : PACKED ARRAY[1..?] OF CHAR ;
319                                NUM_OF_POS : INTEGER ;
320                          VAR STATUS_FLAG : BOOLEAN );    FORWARD ;
321
322      PROCEDURE ACPT_YES_NO ( VAR YES_NO : CHAR ;
323                                  X , Y  : INTEGER ;
324                        VAR STATUS_FLAG  : BOOLEAN );     FORWARD ;
325
326      PROCEDURE SCRN1_DISPLAY ;    FORWARD ;
327
328      PROCEDURE SCRN2_DISPLAY ;    FORWARD ;
329
330      { ****************************************************************}
331      {$PAGE}
332      (*+                                                               *)
333      { ****************************************************************}
334      {             The following checks for correct "Y/N" response     }
335
336      PROCEDURE ACPT_YES_NO ;
337
338          VAR   YES_NO_SET , YES_SET : SET_OF_CHAR;
339
340          BEGIN
341   2       STATUS_FLAG := FALSE ;
342   3       YES_NO_SET := ['Y','y','N','n'] ;
343   4       YES_SET := ['Y','y'] ;
344   5
345   6       REPEAT
346   7         ACCEPT(VDT_BLK,X,Y,DUMMY,1,T);
347   8         YES_NO := DUMMY[1] ;
348   9       UNTIL ( YES_NO IN YES_NO_SET ) ;
349  10       IF ( YES_NO IN YES_SET ) THEN
350  11           STATUS_FLAG := TRUE;
351  12       IF YES_NO = 'y' THEN
352  13           YES_NO := 'Y';
353  14       IF YES_NO = 'n' THEN
354  15           YES_NO := 'N';
355          END;    { ACPT_YES_NO }
```

MAP OF IDENTIFIERS FOR ACPT_YES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
356
357
358      (*,                                                               *)
359      { ****************************************************************}
360      { The following procedure clears a line on the display            }
361
362      PROCEDURE CLEAR_LINE ;
363
364      VAR    LINE_DATA  :    PACKED ARRAY[1..80] OF CHAR ;
365                  N      :    CHAR ;
366
367        BEGIN
368
369   3     FOR N := 1 TO 80 DO
370   4         LINE_DATA[N] := ' ';
371   5     DISPLAY(VDT_BLK,LINE_NUMBER,1,LINE_DATA,80);
372   6
```

```
373     END ;  { CLEAR_LINE }

MAP OF IDENTIFIERS FOR   CLEAR_LI

IDENTIFIER NAME    KIND          SIZE           STACK                 PICTURE
                                 (BYTES,BITS)   DISPLACEMENT          (PACKED FIELDS ONLY)
                                 LEVEL(DISPL)   (BYTE,BIT)

LINE_NUMBER        PARAMETER     (2,0)          #0028    DIRECT
LINE_DATA          VARIABLE      (80,0)         #002A    DIRECT
N                  VARIABLE      (0,8)          #007A    DIRECT 374
375     (*,                                                                              *)
376     {*******************************************************************}
377     { This procedure accepts the basic description line for the inter-   }
378     { pretation, and captures up to 12 additional description lines      }
379
380     PROCEDURE DESC_ACCEPT ;
381
382     VAR   BASIC_DESC , ADD_DESC : PACKED ARRAY[1..80] OF CHAR ;
383           LINES  :  PACKED ARRAY[1..12,1..80] OF CHAR ;
384           NUMBER , BEG_LINES , LIMIT , NEXT_RECORD , LINE : INTEGER ;
385           TOTAL_DESC_RECORDS , POINTER  :   INTEGER ;
386           LINK_PTR , LINK_CHAR , DSPL_PTR : INTEGER ;
387           DSPL_DESC , VALID_LINKS , FOUND_LINK  :  BOOLEAN ;
388           PROB_LINK       : PACKED ARRAY[1..4,1..8] OF CHAR ;
389           LINK_DISPLAY    : PACKED ARRAY[1..8] OF CHAR ;
390           PREV_SIT        : PACKED ARRAY[1..4] OF CHAR ;
391
392     PROCEDURE SCRN3_DISPLAY ;  FORWARD ;
393
394
395     (*+                                                                               *)
396     PROCEDURE SCRN3_DISPLAY ;    { Third screen format }
397
398       BEGIN  { SCRN3_DISPLAY }
399
400   3   READ(PROBLEM,0,PROB);
401   4   CLEARSCREEN(VDT_BLK);
402   5   DISPLAY(VDT_BLK,1,12,'P A R A D O C S    D E V E L O P M E N T',
403   6                                                              99);
404   7   DISPLAY(VDT_BLK,1,56,'S Y S T E M',99);
405   8   DISPLAY(VDT_BLK,2,22,'**** INTERPRETATION DESCRIPTION ****',99);
406   9   DISPLAY(VDT_BLK,3,25,'Please describe this situation',99);
407  10   DISPLAY(VDT_BLK,4,06,'EXAMPLE NAME: ',99);
408  11   DISPLAY(VDT_BLK,4,53,'ID NUMBER:  ',99);
409  12   DISPLAY(VDT_BLK,4,20,EXAMPLE_NAME,30);
410  13   DISPLAY(VDT_BLK,4,64,ID_EXAMPLE,15);
411  14   DISPLAY(VDT_BLK,6,06,'PROBLEM CODE:',99);
412  15   DISPLAY(VDT_BLK,6,25,PROBLEM_FILE,8);
413  16   DISPLAY(VDT_BLK,6,43,PROB.DESCRIPTION,30);
414  17   DISPLAY(VDT_BLK,8,1, '--------------------',99);
415  18   DISPLAY(VDT_BLK,8,24,'B A S I C    D E S C R I P T I O N',99);
416  19   DISPLAY(VDT_BLK,8,60,'--------------------',99);
417  20   DISPLAY(VDT_BLK,10,1, '---------------',99);
418  21   DISPLAY(VDT_BLK,10,19,'A D D I T I O N A L   ',99);
419  22   DISPLAY(VDT_BLK,10,41,'D E S C R I P T I O N S',99);
420  23   DISPLAY(VDT_BLK,10,66,'---------------',99);
421  24   DISPLAY(VDT_BLK,24,30,'CORRECT ?  ',99);
422  25   DISPLAY(VDT_BLK,24,42,'[ ',2);
423  26   DISPLAY(VDT_BLK,24,44,'] ',2);
424     END;  { SCRN3_DISPLAY }
425
426     (*-                                                                               *)
427     BEGIN  { DESC_ACCEPT }
428
429   3   CLEARSCREEN(VDT_BLK);
430   4
431   5   SCRN3_DISPLAY ;
432   6
433   7 { Check whether a previous interpretation should be used as the basis
434   8   for the description of the new situation                           }
435   9
436  10   DSPL_DESC := FALSE ;
```

```
437 11      POINTER := SIT_NUMBER ;
438 12      IF MAJOR_MATCH OR DESCRIP_INT THEN
439 13      BEGIN
440 14         READ(SITUATION,0,SIT);
441 15         SIT_NUMBER := SIT.NEXT_SIT ;
442 16         DISPLAY(VDT_BLK,24,1,
443 17            'USE A PREVIOUS INTERPRETATION AS A BASIS FOR DESCRIBING',99);
444 18         DISPLAY(VDT_BLK,24,56,' THIS NEW SITUATION? .[ ]',99);
445 19         ACPT_YES_NO(DUMY,24,79,YES);
446 20         IF YES THEN
447 21         BEGIN
448 22            CLEAR_LINE(24);
449 23            DISPLAY(VDT_BLK,24,9,'LIST THE SITUATION NUMBER OF THE ',99);
450 24            DISPLAY(VDT_BLK,24,42,'PREVIOUS INTERPRETATION:   [   ]',99);
451 25            REPEAT
452 26               VALID := TRUE ;
453 27               PREV_SIT := '    ';
454 28               ACCEPT(VDT_BLK,24,69,PREV_SIT,3,T);
455 29               IF PREV_SIT <> '    ' THEN
456 30               BEGIN
457 31                  DECODE(PREV_SIT,1,STAT,POINTER);
458 32                  POINTER := POINTER - 1 ;
459 33                  IF POINTER < 0 OR POINTER >= SIT_NUMBER THEN
460 34                     VALID := FALSE
461 35                  ELSE
462 36                     DSPL_DESC := TRUE ;
463 37               END ;
464 38            UNTIL VALID ;
465 39         END ;
466 40         CLEAR_LINE(24);
467 41         DISPLAY(VDT_BLK,24,30,'CORRECT ?    [ ]',99);
468 42      END ;
469 43
470 44 { Display existing description for a full interpretation of if the
471 45   operator has chosen a previous description to be displayed           }
472 46
473 47      IF FULL_INTERPRETATION OR DSPL_DESC THEN
474 48      BEGIN
475 49         READ(SITUATION,POINTER,SIT);
476 50         DISPLAY(VDT_BLK,9,1,SIT.SIT_DESCRIPTION,80);
477 51         READ(DESCRIPTION,0,DESC);
478 52         DECODE(DESC.NEXT_RECORD,1,STAT,TOTAL_DESC_RECORDS);
479 53         TOTAL_DESC_RECORDS := TOTAL_DESC_RECORDS - 1 ;
480 54         LINE := 11 ;
481 55         IF TOTAL_DESC_RECORDS > 0 THEN
482 56.        BEGIN
483 57            FOR T := 1 TO TOTAL_DESC_RECORDS DO
484 58            BEGIN
485 59               READ(DESCRIPTION,T,DESC);
486 60               DECODE(DESC.SIT_NUMBER,1,STAT,NUMBER);
487 61               IF NUMBER = POINTER THEN
488 62               BEGIN
489 63                  DISPLAY(VDT_BLK,LINE,1,DESC.TEXT_LINE,80);
490 64                  LINE := LINE + 1 ;
491 65               END ;
492 66            END ;
493 67         END ;
494 68         BEG_LINES := LINE - 11 ;
495 69      END ;
496 70
497 71
498 72      YES := FALSE ;
499 73      REPEAT
500 74
501 75 { Accept basic description (cannot be all spaces)                       }
502 76
503 77      REPEAT
504 78         ACCEPT(VDT_BLK,9,1,BASIC_DESC,80,T);
505 79         R_ALL_SPACES := TRUE ;
506 80         FOR T := 1 TO 80 DO
507 81            IF BASIC_DESC[T] <> ' ' THEN
508 82               R_ALL_SPACES := FALSE ;
509 83      UNTIL R_ALL_SPACES = FALSE ;
510 84
511 85 { Accept up to 12 additional lines of description which may include
```

```
512  86      up to 4 valid secondary linked problem codes in brackets if this
513  87      is a primary problem; if this is a secondary problem, no brackets
514  88      may be included int the additional description area              }
515  89
516  90      READ(PROBLEM,O,PROB);
517  91      LINK_PTR := 0 ;
518  92      FOR T := 1 TO 4 DO
519  93         PROB_LINK[T] := '         ';
520  94      R_ALL_SPACES := FALSE ;
521  95      RECORD_COUNTER := 1 ;
522  96      FOR LINE_COUNTER := 11 TO 22 DO
523  97      BEGIN
524  98          IF NOT R_ALL_SPACES THEN
525  99          BEGIN
526 100            ACCEPT(VDT_BLK,LINE_COUNTER,1,ADD_DESC,80,T);
527 101            LINES[RECORD_COUNTER] := ADD_DESC ;
528 102            R_ALL_SPACES := TRUE ;
529 103            FOR T := 1 TO 80 DO
530 104              IF ADD_DESC[T] <> ' ' THEN
531 105                R_ALL_SPACES := FALSE ;
532 106
533 107            IF NOT R_ALL_SPACES THEN
534 108            BEGIN
535 109              RECORD_COUNTER := RECORD_COUNTER + 1 ;
536 110
537 111  { Check for linked problem codes in brackets                        }
538 112
539 113              FOUND_LINK := FALSE ;
540 114              FOR T := 1 TO 80 DO
541 115              BEGIN
542 116                IF FOUND_LINK AND ADD_DESC[T] = ']' THEN
543 117                  FOUND_LINK := FALSE ;
544 118                IF FOUND_LINK
545 119                  AND ADD_DESC[T] <> ' '
546 120                  AND LINK_CHAR < 9 THEN
547 121                BEGIN
548 122                  PROB_LINK[LINK_PTR,LINK_CHAR] := ADD_DESC[T] ;
549 123                  LINK_CHAR := LINK_CHAR + 1 ;
550 124                END ;
551 125                IF NOT FOUND_LINK AND ADD_DESC[T] = '[' AND LINK_PTR <> 4
552 126                THEN BEGIN
553 127                  LINK_CHAR := 1 ;
554 128                  FOUND_LINK := TRUE ;
555 129                  LINK_PTR := LINK_PTR + 1
556 130                END ;
557 131              END ;
558 132            END ;
559 133          END ;
560 134      END ;
561 135
562 136  { If brackets are found for a secondary problem show message and
563 137    clear out the codes                                               }
564 138
565 139      IF LINK_PTR > 0 AND PROB.PRIMARY_CODE <> '        ' THEN
566 140      BEGIN
567 141         LINK_PTR := 0 ;
568 142         FOR T := 1 TO 4 DO
569 143           PROB_LINK[T] := '         ' ;
570 144         DISPLAY(VDT_BLK,23,26,'No Linked Problem Codes Allowed',99);
571 145      END ;
572 146
573 147  { If linked problems have been entered, check for validity           }
574 148
575 149      DSPL_PTR := 42 ;
576 150      CLEAR_LINE(23) ;
577 151      VALID_LINKS := TRUE ;
578 152      IF LINK_PTR > 0 THEN FOR T := 1 TO LINK_PTR DO
579 153      BEGIN
580 154        IF VALID_LINKS THEN
581 155        BEGIN
582 156          DISPLAY(VDT_BLK,23,6,'Linked Problems for this situation:',99);
583 157          LINK_DISPLAY := PROB_LINK[T] ;
584 158          DISPLAY(VDT_BLK,23,DSPL_PTR,LINK_DISPLAY,8);
585 159          DSPL_PTR := DSPL_PTR + 9 ;
```

```
586160          CLOSE(LNKPROB);
587161          SETMEMBER(LNKPROB,PROB_NODE,LINK_DISPLAY);
588162          IOTERM(LNKPROB,OVAL,FALSE);
589163          RESET(LNKPROB);
590164          IF STATUS(LNKPROB) <> 0 THEN
591165          BEGIN
592166             VALID_LINKS := FALSE ;
593167             CLEAR_LINE(23) ;
594168             DISPLAY(VDT_BLK,23,16,LINK_DISPLAY,8);
595169             DISPLAY(VDT_BLK,23,25,'is not a valid problem code',99);
596170          END ELSE BEGIN
597171             READ(LNKPROB,0,PROB);
598172             IF PROB.PRIMARY_CODE <> PROBLEM_FILE THEN
599173             BEGIN
600174                VALID_LINKS := FALSE ;
601175                CLEAR_LINE(23);
602176                DISPLAY(VDT_BLK,23,16,LINK_DISPLAY,8);
603177                DISPLAY(VDT_BLK,23,25,'is not a secondary code ',99);
604178                DISPLAY(VDT_BLK,23,49,'for this problem',99);
605179             END ;
606180          END ;
607181       END ;
608182    END ;
609183
610184    IF RECORD_COUNTER < 12 THEN
611185    BEGIN
612186       LIMIT := RECORD_COUNTER + 11 ;
613187       FOR LINE := 22 DOWNTO LIMIT DO
614188       BEGIN
615189          FOR T := 1 TO 80 DO ADD_DESC[T] := ' ';
616190          DISPLAY(VDT_BLK,LINE,1,ADD_DESC,80);
617191       END ;
618192    END;
619193
620194    IF VALID_LINKS THEN ACPT_YES_NO(DUMY,24,43,YES);
621195
622196 UNTIL YES ;
623197
624198 { If situation to be added to the file, write new situation record,
625199    write new description records (if any) and update problem file    }
626200
627201    IF NOT FULL_INTERPRETATION THEN
628202    BEGIN
629203
630204    READ(SITUATION,0,SIT);
631205    SIT.NEXT_SIT := SIT.NEXT_SIT + 1 ;
632206    SIT_NUMBER := SIT.NEXT_SIT ;
633207    WRITE(SITUATION,0,SIT);
634208
635209    SIT_NUMBER := SIT_NUMBER - 1 ;
636210    SIT.SINC_STRING := INC_STRING ;
637211    FOR T := 1 TO TOTAL_QUESTIONS DO
638212       IF SIT.SINC_STRING[T] = 13 THEN
639213       BEGIN
640214          READ(PROBLEM,T,PROB);
641215          IF PROB.INT_QUEST = 'Y' THEN
642216             SIT.SINC_STRING[T] := -32767
643217          ELSE
644218             SIT SINC_STRING[T] := 10 ;
645219       END ;
646220    SIT.SIT_DESCRIPTION := BASIC_DESC ;
647221    ENCODE(DESC.SIT_NUMBER,1,STAT,SIT_NUMBER:4);
648222    ENCODE(SIT.SIT_NUM,1,STAT,SIT_NUMBER:4);
649223    SIT.NUM_ENCOUNTERS := 0 ;
650224    SIT.AUTHOR_CODE := USER_CODE ;
651225    SIT.PROB1_LINK  := PROB_LINK[1] ;
652226    SIT.PROB2_LINK  := PROB_LINK[2] ;
653227    SIT.PROB3_LINK  := PROB_LINK[3] ;
654228    SIT.PROB4_LINK  := PROB_LINK[4] ;
655229    DATE(SIT.DATE_ENTERED);
656230    DATE(SIT.DATE_LAST_USED);
657231    WRITE(SITUATION,SIT_NUMBER,SIT);
658232    COUNTER := SIT_NUMBER + 1 ;
659233    WRITELN(INTERPRET,'Situation Number ',COUNTER:4,
660234                                           ' added to file:');
```

```
661235     WRITELN(INTERPRET);
662236     WRITELN(INTERPRET,BASIC_DESC);
663237
664238     READ(PROBLEM,O,PROB);
665239     PROB.NUM_SITUATIONS := PROB.NUM_SITUATIONS + 1 ;
666240     WRITE(PROBLEM,O,PROB);
667241
668242     RECORD_COUNTER := RECORD_COUNTER - 1 ;
669243     READ(DESCRIPTION,O,DESC);
670244     DECODE(DESC.NEXT_RECORD,1,STAT,NEXT_RECORD);
671245     ENCODE(DESC.SIT_NUMBER,1,STAT,SIT_NUMBER:4);
672246
673247     IF RECORD_COUNTER > O THEN
674248     BEGIN
675249        FOR LINE := 1 TO RECORD_COUNTER DO
676250        BEGIN
677251           DESC.TEXT_LINE := LINES[LINE] ;
678252           WRITE(DESCRIPTION,NEXT_RECORD,DESC);
679253           WRITELN(INTERPRET,DESC.TEXT_LINE);
680254           NEXT_RECORD := NEXT_RECORD + 1 ;
681255        END ;
682256        ENCODE(DESC.NEXT_RECORD,1,STAT,NEXT_RECORD:4);
683257        WRITE(DESCRIPTION,O,DESC);
684258     END ;
685259     END ;
686260
687261   { If full interpretation, update existing description records and  }
688262   {                   write new ones (if any)                        }
689263
690264     IF FULL_INTERPRETATION THEN
691265     BEGIN
692266
693267     READ(SITUATION,SIT_NUMBER,SIT);
694268     SIT.SIT_DESCRIPTION := BASIC_DESC ;
695269     SIT.AUTHOR_CODE := USER_CODE ;
696270     SIT.PROB1_LINK  := PROB_LINK[1] ;
697271     SIT.PROB2_LINK  := PROB_LINK[2] ;
698272     SIT.PROB3_LINK  := PROB_LINK[3] ;
699273     SIT.PROB4_LINK  := PROB_LINK[4] ;
700274     WRITE(SITUATION,SIT_NUMBER,SIT);
701275     COUNTER := SIT_NUMBER + 1 ;
702276     WRITELN(INTERPRET,'Situation Number ',COUNTER:4,
703277                       ' changed in file to:');
704278     WRITELN(INTERPRET);
705279     WRITELN(INTERPRET,BASIC_DESC);
706280
707281     RECORD_COUNTER := RECORD_COUNTER - 1 ;
708282     IF RECORD_COUNTER < BEG_LINES THEN
709283        RECORD_COUNTER := BEG_LINES ;
710284
711285     IF RECORD_COUNTER > O THEN
712286     BEGIN
713287        READ(DESCRIPTION,O,DESC);
714288        DECODE(DESC.NEXT_RECORD,1,STAT,NEXT_RECORD);
715289        POINTER := 1 ;
716290        LINE := 1 ;
717291        FOR T := 1 TO RECORD_COUNTER DO
718292        BEGIN
719293           IF LINE <= BEG_LINES THEN
720294           BEGIN
721295              REPEAT
722296                 READ(DESCRIPTION,POINTER,DESC);
723297                 DECODE(DESC.SIT_NUMBER,1,STAT,NUMBER);
724298                 IF NUMBER = SIT_NUMBER THEN
725299                 BEGIN
726300                    DESC.TEXT_LINE := LINES[LINE] ;
727301                    WRITE(DESCRIPTION,POINTER,DESC);
728302                    WRITELN(INTERPRET,DESC.TEXT_LINE);
729303                 END ;
730304                 POINTER := POINTER + 1 ;
731305              UNTIL NUMBER = SIT_NUMBER ;
732306           END
733307           ELSE
734308           BEGIN
735309              ENCODE(DESC.SIT_NUMBER,1,STAT,SIT_NUMBER);
```

```
736310                DESC.NEXT_RECORD := '    ';
737311                DESC.TEXT_LINE := LINES[LINE] ;
738312                ENCODE(DESC.SIT_NUMBER,1,STAT.SIT_NUMBER:4);
739313                WRITE(DESCRIPTION,NEXT_RECORD,DESC);
740314                WRITELN(INTERPRET,DESC.TEXT_LINE);
741315                NEXT_RECORD := NEXT_RECORD + 1 ;
742316              END ;
743317              LINE := LINE + 1 ;
744318         END ;
745319         ENCODE(DESC.NEXT_RECORD,1,STAT.NEXT_RECORD:4);
746320         WRITE(DESCRIPTION,0,DESC);
747321      END ;
748322
749323      END ;
750324
751325  { Once a new situation has been added through this routine,
752326    consider that the situation is now a "full interpretation"       }
753327
754328    FULL_INTERPRETATION := TRUE ;
755329
756      END ;   { DESC_ACCEPT }
```

MAP OF IDENTIFIERS FOR   DESC_ACC

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| BASIC_DESC | VARIABLE | (80,0) | #0028 | DIRECT |
| ADD_DESC | VARIABLE | (80,0) | #0078 | DIRECT |
| LINES | VARIABLE | (960,0) | #00C8 | DIRECT |
| NUMBER | VARIABLE | (2,0) | #0488 | DIRECT |
| BEG_LINES | VARIABLE | (2,0) | #048A | DIRECT |
| LIMIT | VARIABLE | (2,0) | #048C | DIRECT |
| NEXT_RECORD | VARIABLE | (2,0) | #048E | DIRECT |
| LINE | VARIABLE | (2,0) | #0490 | DIRECT |
| TOTAL_DESC_RECORDS | VARIABLE | (2,0) | #0492 | DIRECT |
| POINTER | VARIABLE | (2,0) | #0494 | DIRECT |
| LINK_PTR | VARIABLE | (2,0) | #0496 | DIRECT |
| LINK_CHAR | VARIABLE | (2,0) | #0498 | DIRECT |
| DSPL_PTR | VARIABLE | (2,0) | #049A | DIRECT |
| DSPL_DESC | VARIABLE | (0,1) | #049C | DIRECT |
| VALID_LINKS | VARIABLE | (0,1) | #049E | DIRECT |
| FOUND_LINK | VARIABLE | (0,1) | #04A0 | DIRECT |
| PROB_LINK | VARIABLE | (32,0) | #04A2 | DIRECT |
| LINK_DISPLAY | VARIABLE | (8,0) | #04C2 | DIRECT |
| PREV_SIT | VARIABLE | (4,0) | #04CA | DIRECT |

```
757     (*,                                                                  *)
758     {********************************************************************}
759
760     PROCEDURE ENTER_RESPONSES ;
761
762     { This procedure captures all of the data for an example and gener- }
763     { ates the string of intermediate response judgements                }
764
765     LABEL 200 ;
766
767
768     VAR     DATA_ENTERED : PACKED ARRAY[1..15,1..10] OF CHAR ;
769             DATA_RESPONSE: PACKED ARRAY[1..15,1..20] OF CHAR ;
770             JUDGEMENT    : PACKED ARRAY[1..20] OF CHAR ;
771             RESPONSE     : PACKED ARRAY[1..10] OF CHAR ;
772
773     PROCEDURE SCRN_DISPLAY ;   FORWARD ;
774
775     PROCEDURE RESPONSE_ACPT (VAR RESP_CHAR : INTEGER );   FORWARD ;
776
777     PROCEDURE LINE_ITEMS ;   FORWARD ;
778
779
780
781     (*+                                                                   *)
```

```
782        { This procedure writes up to 15 line items (data entries) to the    }
783        {                              report file                           }
784
785        PROCEDURE LINE_ITEMS ;
786
787        VAR ENDING_NUMBER , N , M : INTEGER ;
788
789        BEGIN  { LINE_ITEMS }
790
791   3      IF RECORD_COUNTER = NEXT_QUESTION THEN
792   4         ENDING_NUMBER := RECORD_COUNTER - 1
793   5      ELSE
794   6         ENDING_NUMBER := BEGINNING_NUMBER + 14 ;
795   7
796   8      N := 1 ;
797   9      M := BEGINNING_NUMBER ;
798  10      FOR T := BEGINNING_NUMBER TO ENDING_NUMBER DO
799  11      BEGIN
800  12
801  13         READ(PROBLEM, T, PROB);
802  14         WRITELN(REPORT,' ',M:3,' ',PROB.DESC_QUESTION,' ',
803  15                         PROB.UNIT_DESC,' ',DATA_ENTERED[N],
804  16                         ' ',DATA_RESPONSE[N]);
805  17         WRITELN(REPORT);
806  18         N := N + 1 ;
807  19         M := M + 1 ;
808  20      END ;
809  21
810       END ;  { LINE_ITEMS }
```

MAP OF IDENTIFIERS FOR   LINE_ITE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| ENDING_NUMBER | VARIABLE | (2,0) | #0028 | DIRECT |
| N | VARIABLE | (2,0) | #002A | DIRECT |
| M | VARIABLE | (2,0) | #002C | DIRECT |

```
811     (*,                                                                    *)
812     PROCEDURE RESPONSE_ACPT ;
813
814     { This section checks for a valid response and makes the intermediate
815       judgement, resulting is a value of 1 to 12 as follows:
816
817          1 = Below Both Ranges - Numeric response which is lower than both
818                  lower boundaries (when two sets of boundaries exist)
819          2 = Below Primary Range - Numeric response which is higher than
820                  (or equal to) the secondary lower boundary but lower than
821                  the primary lower boundary (two boundary sets must exist)
822          3 = Within Both Ranges - Numeric response which is within the
823                  primary range and two boundary sets exist
824          4 = Above Primary Range - Numeric response which is lower than (or
825                  equal to) the secondary upper boundary but higher than th
826                  primary upper boundary (two boundary sets must exist)
827          5 = Above Both Ranges - Numeric response which is higher than both
828                  upper boundaries (when two sets of boundaries exist)
829          6 = Below Primary Range - Numeric response which is lower than the
830                  primary lower boundary (and there are no secondary limits
831          7 = Within Primary Range - Numeric response which is within the
832                  primary boundaries (and there are no secondary limits)
833          8 = Above Primary Range - Numeric response which is higher than th
834                  primary upper boundary (and there are no secondary limits
835          9 = No Judgement - Numeric response which has no specified limits
836         10 = Not Entered - Blank response for a non-required question; OR
837                  any response for a "for reference only" question
838         11 = Absent - A "N" or "n" response to a Y/N question
839         12 = Present - A "Y" or "y" response to a Y/N question
840         13 = Deleted - This will only be put in by the system if a
841                  question has been previously deleted and then only in
842                  memory and not on disk                                      }
843
844     VAR   LIMIT     : PACKED ARRAY[1..5] OF CHAR;
845           AMOUNT    : REAL;
```

```
846             VALID       : BOOLEAN ;
847             OUT_OF_RANGE : BOOLEAN ;
848             LIMIT_INT : INTEGER ;
849
850       PROCEDURE CALCULATE_RESP ;      FORWARD ;
851
852
853
854       (*+                                                                    *)
855       PROCEDURE CALCULATE_RESP ;
856
857       { This procedure calculates the response based on a predefined formula}
858
859       CONST KIF_INIT =1;      KEY_NOT_FOUND = #B5;
860             KIF_TERM =2;      KIF_OPEN =3;        KIF_CLOSE =4;
861             KIF_READ_BY_KEY =9;                   KIF_INSERT_RECORD =19;
862             KIF_READ_NEXT =17;  KIF_REWRITE_RECORD=20;
863             KIF_DELETE_BY_KEY =24;                KIF_READ_BY_KEY_LOCKED=10;
864             CANNOT_FIND = #BD;  NO_MORE_RECORDS = #B3;
865
866       TYPE
867           T_KIF_STATUS_BLOCK=PACKED RECORD              { KIF STATUS BLOCK }
868               KIF_STATUS_CODE: 0..255;
869               KIF_KEY_NUMBER : 0..255;
870               KIF_ACCESS : 0..255;
871               KIF_RESERVED : 0..255;
872               KIF_RECORD_LEN : INTEGER;
873               KIF_PATHNAME : PACKED ARRAY[1..30] OF
874                   CHAR                                          { FILE NAME }
875               END;                                    { END KIF STATUS BLOCK }
876
877
878
879       { The following is the record layout for the KIF RESPONSE file }
880
881       KEYED_RESPONSE=RECORD         CASE BOOLEAN OF
882                           TRUE:
883
884       { This is the "0" record layout for this file }
885
886        (PROBLEM_CODE    : PACKED ARRAY[1..8] OF CHAR;
887         ENTRY_DATE      : PACKED ARRAY[1..8] OF CHAR;
888         SEQUENCE        : INTEGER ;
889         RCD_NUMBER      : INTEGER ;
890         SECOND_CODE     : PACKED ARRAY[1..8] OF CHAR;
891         THIRD_CODE      : PACKED ARRAY[1..8] OF CHAR;
892         SIT_NUMBER      : INTEGER ;
893         USER_CODE       : PACKED ARRAY[1..6] OF CHAR;
894         ID_EXAMPLE      : PACKED ARRAY[1..15] OF CHAR;
895         EXAMPLE_NAME    : PACKED ARRAY[1..30] OF CHAR;
896         NEXT_SEG        : PACKED ARRAY[1..10] OF CHAR);
897
898
899                     FALSE:
900
901       { This is the "1" through "Nth" record layout    }
902
903        (DTL_PROBLEM    : PACKED ARRAY[1..8] OF CHAR;
904         DTL_ENTRY      : PACKED ARRAY[1..8] OF CHAR;
905         DTL_SEG        : INTEGER ;
906         DTL_RCD        : INTEGER ;
907         FILLER1        : PACKED ARRAY[1..8] OF CHAR;
908         FILLER2        : PACKED ARRAY[1..8] OF CHAR;
909         FILLER3        : INTEGER ;
910         FILLER4        : PACKED ARRAY[1..6] OF CHAR;
911         FILLER5        : PACKED ARRAY[1..15] OF CHAR;
912         RESP1          : PACKED ARRAY[1..10] OF CHAR;
913         RESP2          : PACKED ARRAY[1..10] OF CHAR;
914         RESP3          : PACKED ARRAY[1..10] OF CHAR;
915         RESP4          : PACKED ARRAY[1..10] OF CHAR)
916       END;
917
918       { This record is used for establishing the primary key for the
919         preceeding KIF file record                                           }
920
```

```
921     PRIMARY_KEY=RECORD
922        PROBLEM_CODE    : PACKED ARRAY[1..8] OF CHAR;
923        ENTRY_DATE      : PACKED ARRAY[1..8] OF CHAR;
924        SEQUENCE        : INTEGER ;
925        RCD_NUMBER      : INTEGER ;
926        END;
927
928     VAR      ENTRY          : PACKED ARRAY[1..12] OF CHAR ;
929              TIME_UNITS     : PACKED ARRAY[1..6] OF CHAR ;
930              OP_CODE        : CHAR ;
931              PTR_FORMULA    : INTEGER ;
932              PTR_RESPONSE   : INTEGER ;
933              PTR            : INTEGER ;
934              SEQ_NUMBER     : INTEGER ;
935              DATA_BASE      : BOOLEAN ;
936              PROCESSED      : BOOLEAN ;
937              NO_ENTRY       : BOOLEAN ;
938              FINISHED       : BOOLEAN ;
939              ENABLE         : BOOLEAN ;
940              F , R1 , R2 , R3 , R4  : REAL ;
941              KIF_STATUS_BLOCK : T_KIF_STATUS_BLOCK ;
942              KEY_FILE : KEYED_RESPONSE ;
943              PRIMARY  : PRIMARY_KEY ;
944
945
946     PROCEDURE KEY$FILE ( KIF_COMMAND : INTEGER;                       (UNIV)
947         UNIV KIF_KEYNAME : PACKED ARRAY[1..?] OF CHAR;
948         UNIV KIF_BUFFER_NAME: PACKED ARRAY[1..?] OF CHAR;
949         VAR KIF_STATUS_BLOCK: T_KIF_STATUS_BLOCK); EXTERNAL;
950
951
952     BEGIN   { CALCULATE_RESP }
953
954     { Open computation file and initialize switches and regiters         }
955
956   5 NO_ENTRY := FALSE ;
957   6 ENTRY_REQUIRED := FALSE ;
958   7 FINISHED := FALSE ;
959   8 PTR_FORMULA := 1 ;
960   9 SETMEMBER(COMPFILE, COMP_NODE, PROBLEM_FILE);
961  10 RESET(COMPFILE);
962  11 READ(COMPFILE, RECORD_COUNTER, COMP);
963  12 F  := 0 ;
964  13 R1 := 0 ;
965  14 R2 := 0 ;
966  15 R3 := 0 ;
967  16 R4 := 0 ;
968  17 ENABLE := FALSE ;
969  18
970  19 REPEAT    { UNTIL FINISHED }
971  20
972  21    IF COMP.FORMULA[PTR_FORMULA] = ' ' THEN FINISHED := TRUE ELSE
973  22    BEGIN
974  23        DATA_BASE := FALSE ;
975  24        PROCESSED := FALSE ;
976  25
977  26 { For the EXAMPLE routine, any formula with an "@" entry will return
978  27   a response of "no entry" if its sequence number cannot be found in
979  28   the data-base file or if there is "no entry" in its response        }
980  29
981  30        IF COMP.FORMULA[PTR_FORMULA] = '@' THEN
982  31        BEGIN
983  32
984  33 { Open and initialize the data base key file                          }
985  34
986  35           KEY$FILE(KIF_INIT, DUMMY, DUMMY, KIF_STATUS_BLOCK);
987  36           KIF_STATUS_BLOCK.KIF_PATHNAME :=
988  37                      'KEYFILE                          ';
989  38           KEY$FILE(KIF_OPEN, DUMMY, DUMMY, KIF_STATUS_BLOCK);
990  39           KIF_STATUS_BLOCK.KIF_KEY_NUMBER := 1 ;
991  40
992  41           DATA_BASE := TRUE ;
993  42           PROCESSED := TRUE ;
994  43           PTR_FORMULA := PTR_FORMULA + 1 ;
```

```
 995  44
 996  45   { Establish the question number to be read                                              }
 997  46
 998  47             DUMMY := '      ' ;
 999  48             PTR := 1 ;
1000  49             WHILE COMP.FORMULA[PTR_FORMULA] <> ',' DO
1001  50             BEGIN
1002  51                DUMMY[PTR] := COMP.FORMULA[PTR_FORMULA] ;
1003  52                PTR := PTR + 1 ;
1004  53                PTR_FORMULA := PTR_FORMULA + 1 ;
1005  54             END. ;
1006  55             PTR_FORMULA := PTR_FORMULA + 1 ;
1007  56             DECODE(DUMMY, 1, STAT, PTR_RESPONSE);
1008  57             PTR_RESPONSE := PTR_RESPONSE - 1 ;
1009  58
1010  59   { Find the number of sequence numbers prior to the "current" number      }
1011  60
1012  61             PTR := 1 ;
1013  62             TIME_UNITS := '        ' ;
1014  63             WHILE COMP.FORMULA[PTR_FORMULA] <> ';' DO
1015  64             BEGIN
1016  65                TIME_UNITS[PTR] := COMP.FORMULA[PTR_FORMULA];
1017  66                PTR := PTR + 1 ;
1018  67                PTR_FORMULA := PTR_FORMULA + 1 ;
1019  68             END ;
1020  69             PTR_FORMULA := PTR_FORMULA + 1 ;
1021  70             DECODE(TIME_UNITS, 1, STAT, SEQ_NUMBER);
1022  71
1023  72   { Read the "current" sequence number from the "O" record of the first
1024  73     sequence record then try to read the appropriate record                  }
1025  74
1026  75             PRIMARY.PROBLEM_CODE := PROBLEM_FILE ;
1027  76             DATE(PRIMARY.ENTRY_DATE);
1028  77             PRIMARY.SEQUENCE := 1 ;
1029  78             PRIMARY.RCD_NUMBER := O ;
1030  79             KEY$FILE(KIF_READ_BY_KEY, PRIMARY, KEY_FILE, KIF_STATUS_BLOCK);
1031  80             IF KIF_STATUS_BLOCK.KIF_STATUS_CODE = KEY_NOT_FOUND THEN
1032  81             BEGIN
1033  82                FINISHED := TRUE ;
1034  83                NO_ENTRY := TRUE ;
1035  84             END ELSE BEGIN
1036  85                DECODE(KEY_FILE.NEXT_SEQ, 1, STAT, PTR);
1037  86                PRIMARY.SEQUENCE := PTR - SEQ_NUMBER ;
1038  87                PTR := PTR_RESPONSE DIV 4 ;
1039  88                PRIMARY.RCD_NUMBER := PTR + 1 ;
1040  89                KEY$FILE(KIF_READ_BY_KEY, PRIMARY, KEY_FILE,
1041  90                                              KIF_STATUS_BLOCK);
1042  91                IF KIF_STATUS_BLOCK.KIF_STATUS_CODE = KEY_NOT_FOUND THEN
1043  92                BEGIN
1044  93                   FINISHED := TRUE ;
1045  94                   NO_ENTRY := TRUE ;
1046  95                END ELSE BEGIN
1047  96                   PTR := PTR * 4 ;
1048  97                   PTR_RESPONSE := PTR_RESPONSE - PTR ;
1049  98                   CASE PTR_RESPONSE OF
1050  99                       O : RESPONSE := KEY_FILE.RESP1 ;
1051 100                       1 : RESPONSE := KEY_FILE.RESP2 ;
1052 101                       2 : RESPONSE := KEY_FILE.RESP3 ;
1053 102                       3 : RESPONSE := KEY_FILE.RESP4 ;
1054 103                   OTHERWISE RESPONSE := '            ' END ;
1055 104                END ;
1056 105             END ;
1057 106
1058 107             IF NOT FINISHED THEN
1059 108             BEGIN
1060 109               IF ENABLE THEN
1061 110               BEGIN
1062 111                  R4 := R3; R3 := R2; R2 := R1; R1 := F;
1063 112               END ;
1064 113               ENABLE := TRUE ;
1065 114               IF RESPONSE = '            ' THEN
1066 115               BEGIN
1067 116                  FINISHED := TRUE ;
1068 117                  NO_ENTRY := TRUE ;
1069 118               END ELSE DECODE(RESPONSE, 1, STAT, F);
```

```
1070119          END ;
1071120          KEY$FILE(KIF_CLOSE,DUMMY,DUMMY,KIF_STATUS_BLOCK);
1072121       END ;
1073122
1074123  { Check for a "P" entry which has no effect on the registers          }
1075124
1076125       IF NOT PROCESSED AND COMP.FORMULA[PTR_FORMULA] = 'P' THEN
1077126       BEGIN
1078127          PROCESSED := TRUE ;
1079128          PTR_FORMULA := PTR_FORMULA + 2 ;
1080129       END ;
1081130
1082131  { Check for a "#" entry for a previous response                       }
1083132
1084133       IF NOT PROCESSED AND COMP.FORMULA[PTR_FORMULA] = '##' THEN
1085134       BEGIN
1086135          PROCESSED := TRUE ;
1087136          PTR_FORMULA := PTR_FORMULA + 1 ;
1088137          DUMMY := '     ' ;
1089138          PTR := 1 ;
1090139          WHILE COMP.FORMULA[PTR_FORMULA] <> ',' DO
1091140          BEGIN
1092141             DUMMY[PTR] := COMP.FORMULA[PTR_FORMULA] ;
1093142             PTR := PTR + 1 ;
1094143             PTR_FORMULA := PTR_FORMULA + 1 ;
1095144          END ;
1096145          PTR_FORMULA := PTR_FORMULA + 1 ;
1097146          DECODE(DUMMY,1,STAT,PTR_RESPONSE);
1098147          READ(WORKRESP,PTR_RESPONSE,RESP);
1099148          IF ENABLE THEN
1100149          BEGIN
1101150             R4 := R3; R3 := R2; R2 := R1; R1 := F;
1102151          END ;
1103152          ENABLE := TRUE ;
1104153          IF RESP.RESPONSE = '         ' THEN
1105154          BEGIN
1106155             FINISHED := TRUE ;
1107156             NO_ENTRY := TRUE ;
1108157          END ELSE DECODE(RESP.RESPONSE,1,STAT,F);
1109158       END ;
1110159
1111160  { Read constant value                                                  }
1112161
1113162       IF NOT PROCESSED THEN
1114163       BEGIN
1115164          PROCESSED := TRUE ;
1116165          ENTRY := '         ' ;
1117166          PTR := 1 ;
1118167          WHILE COMP.FORMULA[PTR_FORMULA] <> ',' DO
1119168          BEGIN
1120169             ENTRY[PTR] := COMP.FORMULA[PTR_FORMULA] ;
1121170             PTR := PTR + 1 ;
1122171             PTR_FORMULA := PTR_FORMULA + 1 ;
1123172          END ;
1124173          PTR_FORMULA := PTR_FORMULA + 1 ;
1125174          IF ENABLE THEN
1126175          BEGIN
1127176             R4 := R3; R3 := R2; R2 := R1; R1 := F;
1128177          END ;
1129178          ENABLE := TRUE ;
1130179          DECODE(ENTRY,1,STAT,F);
1131180       END ;
1132181
1133182       PROCESSED := FALSE ;
1134183
1135184  { For PROBLEM routine, skip data-base read (and its implied "store")
1136185    and go directly to the op-code character                             }
1137186
1138187       IF NOT DATA_BASE AND NOT FINISHED THEN
1139188       BEGIN
1140189
1141190  { Check for "S" for store result in register                            }
1142191
1143192          IF NOT PROCESSED AND COMP.FORMULA[PTR_FORMULA] = 'S' THEN
1144193          BEGIN
```

```
1145194              PROCESSED := TRUE ;
1146195              PTR_FORMULA := PTR_FORMULA + 2 ;
1147196              R4 := R3; R3 := R2; R2 := R1; R1 := F;
1148197              ENABLE := FALSE ;
1149198           END ;
1150199
1151200 { Check for "+" and add F to R1                                                    }
1152201
1153202           IF NOT PROCESSED AND COMP.FORMULA[PTR_FORMULA] = '+' THEN
1154203           BEGIN
1155204              PROCESSED := TRUE ;
1156205              PTR_FORMULA := PTR_FORMULA + 2 ;
1157206              F := R1 + F ;
1158207              R1 := R2; R2 := R3; R3 := R4;
1159208              ENABLE := TRUE ;
1160209           END ;
1161210
1162211 { Check for "-" and subtract F from R1                                              }
1163212
1164213           IF NOT PROCESSED AND COMP.FORMULA[PTR_FORMULA] = '-' THEN
1165214           BEGIN
1166215              PROCESSED := TRUE ;
1167216              PTR_FORMULA := PTR_FORMULA + 2 ;
1168217              F := R1 - F ;
1169218              R1 := R2; R2 := R3; R3 := R4;
1170219              ENABLE := TRUE ;
1171220           END ;
1172221
1173222 { Check for "/" and divide R1 by F                                                  }
1174223
1175224           IF NOT PROCESSED AND COMP.FORMULA[PTR_FORMULA] = '/' THEN
1176225           BEGIN
1177226              PROCESSED := TRUE ;
1178227              PTR_FORMULA := PTR_FORMULA + 2 ;
1179228              IF F = 0 THEN
1180229              BEGIN
1181230                 FINISHED := TRUE ;
1182231                 NO_ENTRY := TRUE ;
1183232              END ELSE F := R1 / F ;
1184233              R1 := R2; R2 := R3; R3 := R4;
1185234              ENABLE := TRUE ;
1186235           END ;
1187236
1188237 { Check for "*" and multiply R1 by F                                                }
1189238
1190239           IF NOT PROCESSED AND COMP.FORMULA[PTR_FORMULA] = '*' THEN
1191240           BEGIN
1192241              PROCESSED := TRUE ;
1193242              PTR_FORMULA := PTR_FORMULA + 2 ;
1194243              F := R1 * F ;
1195244              R1 := R2; R2 := R3; R3 := R4;
1196245              ENABLE := TRUE ;
1197246           END ;
1198247
1199248 { Check for "E" and raise R1 to the power of F (changed to an integer)}
1200249
1201250           IF NOT PROCESSED AND COMP.FORMULA[PTR_FORMULA] = 'E' THEN
1202251           BEGIN
1203252              PROCESSED := TRUE ;
1204253              PTR_FORMULA := PTR_FORMULA + 2 ;
1205254              PTR := TRUNC(F);
1206255              IF PTR < 1 THEN
1207256              BEGIN
1208257                 FINISHED := TRUE ;
1209258                 NO_ENTRY := TRUE ;
1210259              END ELSE BEGIN
1211260                 F := 1 ;
1212261                 FOR T := 1 TO PTR DO
1213262                    F := F * R1 ;
1214263              END ;
1215264              R1 := R2; R2 := R3; R3 := R4;
1216265              ENABLE := TRUE ;
1217266           END ;
1218267
```

```
1219268 { Check for "R" and take the square root of F
1220269
1221270           IF NOT PROCESSED AND COMP.FORMULA[PTR_FORMULA] = 'R' THEN
1222271           BEGIN
1223272              PROCESSED := TRUE ;
1224273              PTR_FORMULA := PTR_FORMULA + 2 ;
1225274              IF F < 0 THEN
1226275              BEGIN
1227276                 FINISHED := TRUE ;
1228277                 NO_ENTRY := TRUE ;
1229278              END ELSE F := SQRT(F);
1230279              ENABLE := TRUE ;
1231280           END ;
1232281
1233282 { Check for "C" and multiply F by -1
1234283
1235284           IF NOT PROCESSED AND COMP.FORMULA[PTR_FORMULA] = 'C' THEN
1236285           BEGIN
1237286              PROCESSED := TRUE ;
1238287              PTR_FORMULA := PTR_FORMULA + 2 ;
1239288              PTR := -1 ;
1240289              F := F * PTR ;
1241290           END ;
1242291
1243292 { Check for "A" and change F to its absolute value                      }
1244293
1245294           IF NOT PROCESSED AND COMP.FORMULA[PTR_FORMULA] = 'A' THEN
1246295           BEGIN
1247296              PROCESSED := TRUE ;
1248297              PTR_FORMULA := PTR_FORMULA + 2 ;
1249298              F := ABS(F) ;
1250299           END ;
1251300
1252301           IF NOT PROCESSED THEN
1253302           BEGIN
1254303              FINISHED := TRUE ;
1255304              NO_ENTRY := TRUE ;
1256305           END ;
1257306        END ;
1258307     END ;
1259308
1260309
1261310 UNTIL FINISHED ;
1262311
1263312   IF NO_ENTRY THEN
1264313     RESPONSE := '          '
1265314   ELSE BEGIN
1266315     ENCODE(RESPONSE, 1, STAT, F:10:2);
1267316     NUMERIC_CHECK(RESPONSE, 10, ERROR_STATUS);
1268317   END ;
1269318
1270319   IF ERROR_STATUS THEN RESPONSE := '          ';
1271320
1272321
1273322   DISPLAY(VDT_BLK, LINE_COUNTER, 49, RESPONSE, 10);
1274323   ENTRY_REQUIRED := FALSE ;
1275     END ;    { CALCULATE_RESP }
```

MAP OF IDENTIFIERS FOR CALCULAT

| IDENTIFIER NAME | KIND | SIZE (BYTES, BITS) | STACK DISPLACEMENT | PICTURE (PACKED FIELDS ONLY) |
|---|---|---|---|---|
| | | LEVEL(DISPL) | (BYTE, BIT) | |
| T_KIF_STATUS_BLOCK | RECORD | (36, 0) | | |
| KIF_STATUS_CODE | +FIELD | (0, 8) | (0, 0) | PACKED (XXXX XXXX .... ....) |
| KIF_KEY_NUMBER | +FIELD | (0, 8) | (0, 8) | PACKED (.... .... XXXX XXXX) |
| KIF_ACCESS | +FIELD | (0, 8) | (2, 0) | PACKED (XXXX XXXX .... ....) |
| KIF_RESERVED | +FIELD | (0, 8) | (2, 8) | PACKED (.... .... XXXX XXXX) |
| KIF_RECORD_LEN | FIELD | (2, 0) | (4, 0) | UNPACKED |
| KIF_PATHNAME | FIELD | (30, 0) | (6, 0) | UNPACKED |

```
KEYED_RESPONSE    RECORD      (100,0)
  PROBLEM_CODE    FIELD       (8,0)       (0,0)       UNPACKED
  ENTRY_DATE      FIELD       (8,0)       (8,0)       UNPACKED
  SEQUENCE        FIELD       (2,0)       (16,0)      UNPACKED
  RCD_NUMBER      FIELD       (2,0)       (18,0)      UNPACKED
  SECOND_CODE     FIELD       (8,0)       (20,0)      UNPACKED
  THIRD_CODE      FIELD       (8,0)       (28,0)      UNPACKED
  SIT_NUMBER      FIELD       (2,0)       (36,0)      UNPACKED
  USER_CODE       FIELD       (6,0)       (38,0)      UNPACKED
  ID_EXAMPLE      FIELD       (16,0)      (44,0)      UNPACKED
  EXAMPLE_NAME    FIELD       (30,0)      (60,0)      UNPACKED
  NEXT_SEQ        FIELD       (10,0)      (90,0)      UNPACKED
  DTL_PROBLEM     FIELD       (8,0)       (0,0)       UNPACKED
  DTL_ENTRY       FIELD       (8,0)       (8,0)       UNPACKED
  DTL_SEQ         FIELD       (2,0)       (16,0)      UNPACKED
  DTL_RCD         FIELD       (2,0)       (18,0)      UNPACKED
  FILLER1         FIELD       (8,0)       (20,0)      UNPACKED
  FILLER2         FIELD       (8,0)       (28,0)      UNPACKED
  FILLER3         FIELD       (2,0)       (36,0)      UNPACKED
  FILLER4         FIELD       (6,0)       (38,0)      UNPACKED
  FILLER5         FIELD       (16,0)      (44,0)      UNPACKED
  RESP1           FIELD       (10,0)      (60,0)      UNPACKED
  RESP2           FIELD       (10,0)      (70,0)      UNPACKED
  RESP3           FIELD       (10,0)      (80,0)      UNPACKED
  RESP4           FIELD       (10,0)      (90,0)      UNPACKED
PRIMARY_KEY       RECORD      (20,0)
  PROBLEM_CODE    FIELD       (8,0)       (0,0)       UNPACKED
  ENTRY_DATE      FIELD       (8,0)       (8,0)       UNPACKED
  SEQUENCE        FIELD       (2,0)       (16,0)      UNPACKED
  RCD_NUMBER      FIELD       (2,0)       (18,0)      UNPACKED
ENTRY             VARIABLE    (12,0)      #0028       DIRECT
TIME_UNITS        VARIABLE    (6,0)       #0034       DIRECT
OP_CODE           VARIABLE    (0,8)       #003A       DIRECT
PTR_FORMULA       VARIABLE    (2,0)       #003C       DIRECT
PTR_RESPONSE      VARIABLE    (2,0)       #003E       DIRECT
PTR               VARIABLE    (2,0)       #0040       DIRECT
SEQ_NUMBER        VARIABLE    (2,0)       #0042       DIRECT
DATA_BASE         VARIABLE    (0,1)       #0044       DIRECT
PROCESSED         VARIABLE    (0,1)       #0046       DIRECT
NO_ENTRY          VARIABLE    (0,1)       #0048       DIRECT
FINISHED          VARIABLE    (0,1)       #004A       DIRECT
ENABLE            VARIABLE    (0,1)       #004C       DIRECT
F                 VARIABLE    (4,0)       #004E       DIRECT
R1                VARIABLE    (4,0)       #0052       DIRECT
R2                VARIABLE    (4,0)       #0056       DIRECT
R3                VARIABLE    (4,0)       #005A       DIRECT
R4                VARIABLE    (4,0)       #005E       DIRECT
KIF_STATUS_BLOCK
                  VARIABLE    (36,0)      #0062       DIRECT
KEY_FILE          VARIABLE    (100,0)     #0086       DIRECT
PRIMARY           VARIABLE    (20,0)      #00EA       DIRECT 1276      (*-                                                                  *)
1277      BEGIN   { RESPONSE_ACPT }
1278
1279   3  VALID := FALSE ;
1280   4  RESP_CHAR := 0 ;
1281   5  OUT_OF_RANGE := FALSE ;
1282   6  JUDGEMENT := '                    ' ;
1283   7
1284   8  REPEAT    { accept response }
1285   9
1286  10  { Check for calculated question, and if not, accept response from kbd}
1287  11
1288  12      IF PROB.CALCULATE = 'Y' AND NOT OUT_OF_RANGE THEN CALCULATE_RESP
1289  13         ELSE ACCEPT(VDT_BLK,LINE_COUNTER,49,RESPONSE,10,T);
1290  14
1291  15  { Check for reference only question                                   }
1292  16
1293  17      IF PROB.REFERENCE = 'Y' THEN
1294  18      BEGIN
1295  19         NUMERIC_CHECK(RESPONSE,10,ERROR_STATUS);
1296  20         IF ERROR_STATUS THEN
1297  21            DISPLAY(VDT_BLK,LINE_COUNTER,61,
1298  22                           'ENTER NUMERIC       ',20)
```

```
1299 23        ELSE BEGIN
1300 24           DECODE(RESPONSE,1,STAT,AMOUNT);
1301 25           ENCODE(RESPONSE,1,STAT,AMOUNT:10:2);
1302 26           IF RESPONSE = '**********' THEN
1303 27              DISPLAY(VDT_BLK,LINE_COUNTER,61,
1304 28                                    'ENTRY TOO LARGE        ',20)
1305 29           ELSE BEGIN
1306 30              DISPLAY(VDT_BLK,LINE_COUNTER,49,RESPONSE,10);
1307 31              RESP_CHAR := 10 ;
1308 32              VALID := TRUE ;
1309 33              JUDGEMENT := 'For Reference Only   ' ;
1310 34           END ;
1311 35        END ;
1312 36     END ELSE
1313 37     BEGIN   { Non-reference question }
1314 38
1315 39 { All spaces entered                                                     }
1316 40
1317 41        IF RESPONSE = '          ' THEN
1318 42        BEGIN
1319 43           RESP_CHAR := 10 ;
1320 44           JUDGEMENT := 'Not Entered          ' ;
1321 45           VALID := TRUE ;
1322 46        END ;
1323 47
1324 48 { Something entered in response field, but not an integer question       }
1325 49
1326 50        IF RESPONSE <> '          ' AND PROB.INT_QUEST <> 'Y' THEN
1327 51        BEGIN   { non-space, non_integer response }
1328 52           RESP_CHAR := 9 ;
1329 53           JUDGEMENT := '                     ' ;
1330 54           VALID := TRUE ;
1331 55
1332 56 { YES / NO response                                                      }
1333 57
1334 58        IF YES_NO_RESP THEN
1335 59        BEGIN   { yes-no response }
1336 60           VALID := FALSE ;
1337 61           IF RESPONSE[1] = 'Y' OR RESPONSE[1] = 'y' THEN
1338 62           BEGIN
1339 63              RESP_CHAR := 12 ;
1340 64              JUDGEMENT := 'Present              ';
1341 65              VALID := TRUE ;
1342 66           END ;
1343 67           IF RESPONSE[1] = 'N' OR RESPONSE[1] = 'n' THEN
1344 68           BEGIN
1345 69              RESP_CHAR := 11 ;
1346 70              JUDGEMENT := 'Absent               ';
1347 71              VALID := TRUE ;
1348 72           END;
1349 73           IF NOT VALID THEN
1350 74              DISPLAY(VDT_BLK,LINE_COUNTER,61,
1351 75                            'Y / N REQUIRED      ',20);
1352 76        END;   { yes-no response }
1353 77
1354 78 { Numeric entry called for                                               }
1355 79
1356 80        IF NOT YES_NO_RESP THEN
1357 81        BEGIN   { numeric response }
1358 82           NUMERIC_CHECK(RESPONSE,10,ERROR_STATUS);
1359 83           IF ERROR_STATUS THEN
1360 84
1361 85 { Non numeric character found in response                                }
1362 86
1363 87           BEGIN
1364 88              VALID := FALSE ;
1365 89              DISPLAY(VDT_BLK,LINE_COUNTER,61,
1366 90                            'ENTER NUMERIC       ',20);
1367 91           END ELSE
1368 92
1369 93 { Good numeric entry (unless an overflow entry)                          }
1370 94
1371 95           BEGIN   { good numeric response }
1372 96              VALID := TRUE ;
```

```
1373  97                    DECODE(RESPONSE,1,STAT,AMOUNT);
1374  98                    ENCODE(RESPONSE,1,STAT,AMOUNT:10:2);
1375  99                    IF RESPONSE = '**********' THEN
1376 100                    BEGIN
1377 101                       DISPLAY(VDT_BLK,LINE_COUNTER,61,
1378 102                               'ENTRY TOO LARGE       ',20);
1379 103                       VALID := FALSE ;
1380 104                    END ELSE BEGIN    { not an overflow }
1381 105                       DISPLAY(VDT_BLK,LINE_COUNTER,49,RESPONSE,10);
1382 106
1383 107 { Both primary and secondary boundries present                      }
1384 108
1385 109                    IF PROB.BOUNDARIES = 2 THEN
1386 110                    BEGIN
1387 111                      IF AMOUNT < PROB.LOWER_2_LIMIT THEN
1388 112                      BEGIN
1389 113                         RESP_CHAR := 1 ;
1390 114                         JUDGEMENT := 'Below Both Ranges   ' ;
1391 115                      END;
1392 116                      IF AMOUNT >= PROB.LOWER_2_LIMIT AND
1393 117                         AMOUNT <  PROB.LOWER_1_LIMIT THEN
1394 118                      BEGIN
1395 119                         RESP_CHAR := 2 ;
1396 120                         JUDGEMENT := 'Below Primary Range ';
1397 121                      END;
1398 122                      IF AMOUNT >= PROB.LOWER_1_LIMIT AND
1399 123                         AMOUNT <= PROB.UPPER_1_LIMIT THEN
1400 124                      BEGIN
1401 125                         RESP_CHAR := 3 ;
1402 126                         JUDGEMENT := 'Within Both Ranges  ';
1403 127                      END;
1404 128                      IF AMOUNT > PROB.UPPER_2_LIMIT THEN
1405 129                      BEGIN
1406 130                         RESP_CHAR := 5 ;
1407 131                         JUDGEMENT := 'Above Both Ranges   ';
1408 132                      END;
1409 133                      IF AMOUNT <= PROB.UPPER_2_LIMIT AND
1410 134                         AMOUNT >  PROB.UPPER_1_LIMIT THEN
1411 135                      BEGIN
1412 136                         RESP_CHAR := 4 ;
1413 137                         JUDGEMENT := 'Above Primary Range ';
1414 138                      END;
1415 139                    END;
1416 140
1417 141 { Just Primary Boundary present                                      }
1418 142
1419 143                    IF PROB.BOUNDARIES = 1 THEN
1420 144                    BEGIN
1421 145                      IF AMOUNT < PROB.LOWER_1_LIMIT THEN
1422 146                      BEGIN
1423 147                         RESP_CHAR := 6 ;
1424 148                         JUDGEMENT := 'Below Range         ';
1425 149                      END;
1426 150                      IF AMOUNT > PROB.UPPER_1_LIMIT THEN
1427 151                      BEGIN
1428 152                         RESP_CHAR := 8 ;
1429 153                         JUDGEMENT := 'Above Range         ';
1430 154                      END;
1431 155                      IF AMOUNT >= PROB.LOWER_1_LIMIT AND
1432 156                         AMOUNT <= PROB.UPPER_1_LIMIT THEN
1433 157                      BEGIN
1434 158                         RESP_CHAR := 7 ;
1435 159                         JUDGEMENT := 'Within Range        ';
1436 160                      END;
1437 161                    END;
1438 162
1439 163 { No boundaries listed                                               }
1440 164
1441 165                    IF PROB.BOUNDARIES = 0 THEN
1442 166                    BEGIN
1443 167                         RESP_CHAR := 9 ;
1444 168                         JUDGEMENT := '                    ';
1445 169                    END ;
1446 170
1447 171                 END ;   { not an overflow }
```

```
1448  172                END;  { good numeric entry }
1449  173              END;   { numeric entry }
1450  174           END;    { non-space, non-integer response }
1451  175
1452  176  { For an integer question, check for "not entered" or "out of range" }
1453  177
1454  178           IF PROB.INT_QUEST = 'Y' THEN
1455  179           BEGIN  { Integer Response }
1456  180              VALID := FALSE ;
1457  181              IF RESPONSE = '            ' THEN
1458  182              BEGIN
1459  183                 RESP_CHAR := -32767 ;
1460  184                 VALID := TRUE ;
1461  185              END ELSE BEGIN
1462  186                 DECODE(RESPONSE,1,STAT,RESP_CHAR);
1463  187                 ENCODE(RESPONSE,1,STAT,RESP_CHAR);
1464  188                 DISPLAY(VDT_BLK,LINE_COUNTER,49,RESPONSE,10);
1465  189                 IF RESP_CHAR >= PROB.LOWER_1_LIMIT AND
1466  190                    RESP_CHAR <= PROB.UPPER_1_LIMIT THEN VALID := TRUE
1467  191                 ELSE BEGIN
1468  192                    OUT_OF_RANGE := TRUE ;
1469  193                    DISPLAY(VDT_BLK,LINE_COUNTER,61,
1470  194                            'OUT OF RANGE        ',20);
1471  195                    NUMBER := LINE_COUNTER + 1 ;
1472  196                    DISPLAY(VDT_BLK,NUMBER,61,'LIMITS:       TO      ',20);
1473  197                    LIMIT_INT := TRUNC(PROB.LOWER_1_LIMIT);
1474  198                    ENCODE(LIMIT,1,STAT,LIMIT_INT:5);
1475  199                    DISPLAY(VDT_BLK,NUMBER,68,LIMIT,5);
1476  200                    LIMIT_INT := TRUNC(PROB.UPPER_1_LIMIT);
1477  201                    ENCODE(LIMIT,1,STAT,LIMIT_INT:5);
1478  202                    DISPLAY(VDT_BLK,NUMBER,76,LIMIT,5);
1479  203                 END ;
1480  204                 IF VALID THEN
1481  205                 BEGIN
1482  206                    JUDGEMENT:= '               ';
1483  207                    NUMBER := LINE_COUNTER + 1 ;
1484  208                    DISPLAY(VDT_BLK,NUMBER,61,
1485  209                            '                    ',20);
1486  210                 END ;
1487  211              END ;
1488  212           END ; { Integer Response }
1489  213
1490  214     END;    { non-refernce response }
1491  215
1492  216     IF RESPONSE = '            ' AND ENTRY_REQUIRED THEN
1493  217     BEGIN
1494  218        VALID := FALSE ;
1495  219        DISPLAY(VDT_BLK,LINE_COUNTER,61,'ENTRY REQUIRED      ',20);
1496  220     END;
1497  221
1498  222     UNTIL VALID ;
1499  223
1500  224     DISPLAY(VDT_BLK,LINE_COUNTER,61,JUDGEMENT,20);
1501  225
1502  226  { Store response for response work file                                     }
1503  227
1504  228     RESP.RESPONSE := RESPONSE ;
1505  229
1506     END; { RESP_ACPT }
```

MAP OF IDENTIFIERS FOR   RESPONSE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| RESP_CHAR | PARAMETER | (2,0) | #0028 | INDIRECT |
| LIMIT | VARIABLE | (6,0) | #002A | DIRECT |
| AMOUNT | VARIABLE | (4,0) | #0030 | DIRECT |
| VALID | VARIABLE | (0,1) | #0034 | DIRECT |
| OUT_OF_RANGE | VARIABLE | (0,1) | #0036 | DIRECT |
| LIMIT_INT | VARIABLE | (2,0) | #0038 | DIRECT |

```
1507    (*,                                                                     *)
```

```
1508        PROCEDURE SCRN_DISPLAY ;      { First screen format }
1509
1510          BEGIN
1511   2      DISPLAY(VDT_BLK,1,12,'P A R A D O C S    D E V E L O P M E N T',
1512   3                                                              99);
1513   4      DISPLAY(VDT_BLK,1,56,'S Y S T E M',99);
1514   5      DISPLAY(VDT_BLK,2,22,'**** EXAMPLE INTERPRETATION ****',99);
1515   6      DISPLAY(VDT_BLK,3,04,'YOUR USER NAME: ',99);
1516   7      DISPLAY(VDT_BLK,3,20,USER_NAME,30);
1517   8      DISPLAY(VDT_BLK,5,06,'EXAMPLE NAME:  ',99);
1518   9      DISPLAY(VDT_BLK,5,53,'ID NUMBER: ',99);
1519  10      DISPLAY(VDT_BLK,4,06,'PROBLEM CODE: ',99);
1520  11      DISPLAY(VDT_BLK,4,36,'(no entry when completed)',99);
1521  12      DISPLAY(VDT_BLK,6,62,'INTERMEDIATE',99);
1522  13      DISPLAY(VDT_BLK,7,1,'QUESTION       ',99);
1523  14      DISPLAY(VDT_BLK,7,16,'DESCRIPTION ',99);
1524  15      DISPLAY(VDT_BLK,7,40,'UNIT          ',99);
1525  16      DISPLAY(VDT_BLK,7,50,'RESPONSE    ',99);
1526  17      DISPLAY(VDT_BLK,7,63,'JUDGEMENT     ',99);
1527  18      DISPLAY(VDT_BLK,23,30,'CORRECT ?   [ ] ',99);
1528  19
1529          END;   { SCRN_DISPLAY }
1530         (*-                                                              *)
1531         BEGIN  { ENTER_RESPONSES }
1532
1533   3      SETNAME(REPORT,REPTNAME);
1534   4      CLOSE(REPORT);
1535   5      REWRITE(REPORT);
1536   6      SETNAME(WORKRESP,RESPNAME);
1537   7      CLOSE(WORKRESP);
1538   8      REWRITE(WORKRESP);
1539   9      RESP.RESPONSE := '          ';
1540  10      WRITE(WORKRESP,0,RESP);
1541  11
1542  12    { The files are all open at this point; accept data for each    }
1543  13    { question in the problem and build up a judgement string       }
1544  14
1545  15
1546  16  { The following sets up the screen for displaying and accepting }
1547  17  { each question (line item or data point), 15 lines at a time   }
1548  18
1549  19      READ(PROBLEM,0,PROB);
1550  20      DISPLAY(VDT_BLK,4,33,PROB.DESCRIPTION,30);
1551  21
1552  22      IF LINK_MODE THEN DISPLAY(VDT_BLK,5,20,EXAMPLE_NAME,30) ELSE
1553  23         ACCEPT(VDT_BLK,5,20,EXAMPLE_NAME,30,T);
1554  24      IF LINK_MODE THEN DISPLAY(VDT_BLK,5,64,ID_EXAMPLE,15) ELSE
1555  25         ACCEPT(VDT_BLK,5,64,ID_EXAMPLE,15,T);
1556  26
1557  27      NEXT_QUESTION := PROB.NEXT_QUESTION ;
1558  28      MINIMUM := PROB.MINIMUM_LI ;
1559  29      MINIMUM := MINIMUM + 0 ;
1560  30      IF MINIMUM = 0 THEN MINIMUM := 25 ;
1561  31
1562  32
1563  33      RECORD_COUNTER := 1 ;
1564  34      BEGINNING_NUMBER := 1 ;
1565  35      FOR T := 1 TO 50 DO                { ########## }
1566  36         INC_STRING[T] := 10 ;
1567  37      MINC_STRING := INC_STRING ;
1568  38      LINC_STRING := INC_STRING ;
1569  39      FOR T := 1 TO 50 DO                { ########## }
1570  40         QUEST_MASK[T] := ' ' ;
1571  41
1572  42      DATE(DATEPRNT);
1573  43      WRITELN(REPORT,'USER NAME:      ',USER_NAME,'         ',
1574  44                   'DATE: ',DATEPRNT);
1575  45      WRITELN(REPORT);
1576  46      WRITELN(REPORT,'PROBLEM CODE:   ',PROBLEM_FILE,'       ',
1577  47                       PROB.DESCRIPTION);
1578  48      WRITELN(REPORT);
1579  49      WRITELN(REPORT,'EXAMPLE NAME:   ',EXAMPLE_NAME,'       ',
1580  50                       ID_EXAMPLE);
1581  51      WRITELN(REPORT);
1582  52      WRITELN(REPORT,'QUESTION            DESCRIPTION               ',
```

```
1583 53                         'UNITS         RESPONSE        JUDGEMENT        ');
1584 54       WRITELN(REPORT, '-------  -------------------  ------------------ --',
1585 55                       '--------  -----------------  -----------------------');
1586 56       WRITELN(REPORT);
1587 57
1588 58       FOR T := 1 TO 15 DO
1589 59       BEGIN
1590 60          DATA_ENTERED[T] := '             ';
1591 61          DATA_RESPONSE[T] := '                    ';
1592 62       END;
1593 63
1594 64  {This is the loop to display and accept each question and response }
1595 65
1596 66       COUNTER := 1;
1597 67
1598 68       200 : LINE_COUNTER := 8;
1599 69       FOR Z := 8 TO 22 DO
1600 70       BEGIN  { line loop }
1601 71
1602 72  { The loop will end after 15 lines or unless last question is reached }
1603 73
1604 74         IF RECORD_COUNTER <> NEXT_QUESTION THEN
1605 75         BEGIN
1606 76           READ(PROBLEM, RECORD_COUNTER, PROB);
1607 77           DISPLAY(VDT_BLK, LINE_COUNTER, 47, ' [',2);
1608 78           DISPLAY(VDT_BLK, LINE_COUNTER, 59, '] ',2);
1609 79           DISPLAY(VDT_BLK, LINE_COUNTER, 2, PROB.NUM_QUESTION, 2);
1610 80           DISPLAY(VDT_BLK, LINE_COUNTER, 7, PROB.DESC_QUESTION, 30);
1611 81           DISPLAY(VDT_BLK, LINE_COUNTER, 38, PROB.UNIT_DESC, 10);
1612 82           IF PROB.YES_NO = 'Y' THEN YES_NO_RESP := TRUE
1613 83              ELSE YES_NO_RESP := FALSE;
1614 84           IF PROB.REQUIRED = 'Y' THEN ENTRY_REQUIRED := TRUE
1615 85              ELSE ENTRY_REQUIRED := FALSE;
1616 86           LGCL_IMPT := PROB.LGCL_IMPT;
1617 87           IF LGCL_IMPT >= MINIMUM THEN MAJOR := TRUE
1618 88              ELSE MAJOR := FALSE;
1619 89
1620 90  { Check for deleted status of question                                }
1621 91
1622 92           IF PROB.STATUS_CODE = 'D' THEN
1623 93           BEGIN
1624 94              JUDGEMENT := 'Deleted              ';
1625 95              DISPLAY(VDT_BLK, LINE_COUNTER, 61, JUDGEMENT, 20);
1626 96              RESPONSE := '           ';
1627 97              INT_JUDGEMENT_CODE := 13;
1628 98           END ELSE
1629 99              RESPONSE_ACPT (INT_JUDGEMENT_CODE);
1630 100
1631 101 { Store intermediate judgement character in appropriate position of
1632 102   situation strings, increment record counter (for next question)
1633 103             and go on to the next line                                }
1634 104
1635 105          INC_STRING[RECORD_COUNTER] := INT_JUDGEMENT_CODE;
1636 106
1637 107 { Also store data entered and judgement description for report         }
1638 108
1639 109          DATA_ENTERED[COUNTER] := RESPONSE;
1640 110          DATA_RESPONSE[COUNTER] := JUDGEMENT;
1641 111
1642 112 { Write response out to work response file for this question number }
1643 113
1644 114          RESP.RESPONSE := RESPONSE;
1645 115          WRITE(WORKRESP, RECORD_COUNTER, RESP);
1646 116
1647 117 { This sets up the major and minor entry strings and the question
1648 118   "mask" file for later set-up of the situation strings                }
1649 119
1650 120          IF MAJOR THEN
1651 121          BEGIN
1652 122             MINC_STRING[RECORD_COUNTER] := INT_JUDGEMENT_CODE;
1653 123             LINC_STRING[RECORD_COUNTER] := 0;
1654 124             QUEST_MASK[RECORD_COUNTER] := 'M';
1655 125          END
1656 126          ELSE
```

```
1657127        BEGIN
1658128           LINC_STRING[RECORD_COUNTER] := INT_JUDGEMENT_CODE ;
1659129           MINC_STRING[RECORD_COUNTER] := 0 ;
1660130           QUEST_MASK[RECORD_COUNTER] := 'L';
1661131        END;
1662132
1663133        IF PROB.REFERENCE = 'Y' THEN
1664134        BEGIN
1665135           QUEST_MASK[RECORD_COUNTER] := 'R' ;
1666136            INC_STRING[RECORD_COUNTER] := 13 ;
1667137           LINC_STRING[RECORD_COUNTER] := 13 ;
1668138           MINC_STRING[RECORD_COUNTER] := 13 ;
1669139        END ;
1670140
1671141        IF PROB.STATUS_CODE = 'D' THEN
1672142        BEGIN
1673143           QUEST_MASK[RECORD_COUNTER] := 'D' ;
1674144            INC_STRING[RECORD_COUNTER] := 13 ;
1675145           LINC_STRING[RECORD_COUNTER] := 13 ;
1676146           MINC_STRING[RECORD_COUNTER] := 13 ;
1677147        END ;
1678148
1679149        RECORD_COUNTER := RECORD_COUNTER + 1 ;
1680150        COUNTER := COUNTER + 1 ;
1681151        LINE_COUNTER := LINE_COUNTER + 1 ;
1682152
1683153      END; { "IF RECORD_COUNTER <> NEXT_QUESTION" }
1684154
1685155    END; { This ends the line display and accept loop }
1686156
1687157 { Are the responses shown on the screen correct ?                                    }
1688158
1689159    ACPT_YES_NO(DUMY,23,43,YES);
1690160
1691161 { If the data shown is not correct, return to "loop" for re-entry }
1692162
1693163    IF NOT YES THEN
1694164    BEGIN
1695165       RECORD_COUNTER := BEGINNING_NUMBER ;
1696166       COUNTER := 1 ;
1697167       GOTO 200 ;
1698168    END ;
1699169
1700170    IF YES THEN
1701171    BEGIN
1702172       LINE_ITEMS ;
1703173       IF RECORD_COUNTER <> NEXT_QUESTION THEN
1704174       BEGIN
1705175
1706176 { If more questions to be answered, clear screen for next 15 resp.}
1707177
1708178          CLEARSCREEN(VDT_BLK);
1709179          SCRN_DISPLAY ;
1710180          BEGINNING_NUMBER := BEGINNING_NUMBER + 15 ;
1711181          DISPLAY(VDT_BLK,5,20,EXAMPLE_NAME,30);
1712182          DISPLAY(VDT_BLK,5,64,ID_EXAMPLE,15);
1713183          READ(PROBLEM,0,PROB);
1714184          DISPLAY(VDT_BLK,4,20,PROBLEM_FILE,8);
1715185          DISPLAY(VDT_BLK,4,33,PROB.DESCRIPTION,30);
1716186          COUNTER := 1 ;
1717187          GOTO 200 ;
1718188
1719189       END ;
1720190    END ;
1721191
1722     END ;   { ENTER_RESPONSES }
```

MAP OF IDENTIFIERS FOR  ENTER_RE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| DATA_ENTERED | VARIABLE | (150,0) | #0028 | DIRECT |
| DATA_RESPONSE | VARIABLE | (300,0) | #00BE | DIRECT |

| | | | | |
|---|---|---|---|---|
| JUDGEMENT | VARIABLE | (20,0) | #01EA | DIRECT |
| RESPONSE | VARIABLE | (10,0) | #01FE | DIRECT |

```
1723      (*,                                                                    *)
1724      PROCEDURE ID_USER ;
1725
1726      { This procedure opens up the user file, accepts a user code and
1727         checks for validity                                                  }
1728
1729      TYPE
1730
1731      { The following is the record layout for the sequential USERFILE file;
1732         later it will be changed to a KIF file, but initially it will be
1733         established as a RELATIVE file                                        }
1734
1735      USER_RECORD=RECORD
1736
1737         NEXT_RECORD     : PACKED ARRAY[1..4] OF CHAR ;
1738         USER_CODE       : PACKED ARRAY[1..6] OF CHAR ;
1739         USER_NAME       : PACKED ARRAY[1..30] OF CHAR ;
1740         USER_TITLE      : PACKED ARRAY[1..30] OF CHAR ;
1741         ADDRESS1        : PACKED ARRAY[1..30] OF CHAR ;
1742         ADDRESS2        : PACKED ARRAY[1..30] OF CHAR ;
1743         ADDRESS3        : PACKED ARRAY[1..30] OF CHAR ;
1744         PHONE           : PACKED ARRAY[1..12] OF CHAR ;
1745         MAX_STATUS      : CHAR ;
1746         PRINTER         : CHAR ;
1747         NUM_PROBLEMS    : PACKED ARRAY[1..4] OF CHAR ;
1748         DATE_ENTERED    : PACKED ARRAY[1..8] OF CHAR ;
1749         DATE_LAST_USED  : PACKED ARRAY[1..8] OF CHAR ;
1750         TOTAL_TIMES     : PACKED ARRAY[1..6] OF CHAR ;
1751      END ;
1752
1753
1754      VAR    USERFILE      : RANDOM FILE OF USER_RECORD ;
1755             USER          : USER_RECORD ;
1756             USER_RECORDS  : INTEGER ;
1757             USERNAME      : PACKED ARRAY[1..8] OF CHAR ;
1758
1759      BEGIN   { ID_USER }
1760
1761   3  USERNAME := 'USERFILE';
1762   4  SETNAME(USERFILE,USERNAME);
1763   5  IOTERM(USERFILE,OVAL,TRUE);
1764   6  EXTEND(USERFILE);
1765   7  READ(USERFILE,0,USER);
1766   8  DECODE(USER.NEXT_RECORD,1,STAT,USER_RECORDS);
1767   9  USER_RECORDS := USER_RECORDS - 1 ;
1768  10
1769  11  { The following accepts a valid user code and terminates if no etnry }
1770  12
1771  13  REPEAT
1772  14     ACCEPT(VDT_BLK,3,20,USER_CODE,6,T);
1773  15     IF USER_CODE = '      ' THEN DONE := TRUE.;
1774  16     IF NOT DONE THEN FOR T := 0 TO USER_RECORDS DO
1775  17     IF ERROR_STATUS THEN
1776  18     BEGIN
1777  19        READ(USERFILE,T,USER);
1778  20        IF USER.USER_CODE = USER_CODE THEN
1779  21        BEGIN
1780  22           ERROR_STATUS := FALSE ;
1781  23           DECODE(USER.TOTAL_TIMES,1,STAT,NUMBER);
1782  24           NUMBER := NUMBER + 1 ;
1783  25           ENCODE(USER.TOTAL_TIMES,1,STAT,NUMBER:6);
1784  26           WRITE(USERFILE,T,USER);
1785  27        END ;
1786  28     END ;
1787  29
1788  30     IF NOT ERROR_STATUS THEN
1789  31     BEGIN
1790  32        DISPLAY(VDT_BLK,3,14,'NAME',99);
1791  33        DISPLAY(VDT_BLK,3,33,'                              ',99);
1792  34        USER_NAME := USER.USER_NAME ;
1793  35        DISPLAY(VDT_BLK,3,20,USER_NAME,30);
1794  36     END ELSE
```

```
1795 37     BEGIN
1796 38        DISPLAY(VDT_BLK,3,33,'Sorry, this code is not valid',99);
1797 39     END ;
1798 40
1799 41 UNTIL DONE OR NOT ERROR_STATUS ;
1800 42
1801     END ;   { ID_USER }
```

MAP OF IDENTIFIERS FOR ID_USER

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| USER_RECORD | RECORD | (202,0) | | |
|   NEXT_RECORD | FIELD | (4,0) | (0,0) | UNPACKED |
|   USER_CODE | FIELD | (6,0) | (4,0) | UNPACKED |
|   USER_NAME | FIELD | (30,0) | (10,0) | UNPACKED |
|   USER_TITLE | FIELD | (30,0) | (40,0) | UNPACKED |
|   ADDRESS1 | FIELD | (30,0) | (70,0) | UNPACKED |
|   ADDRESS2 | FIELD | (30,0) | (100,0) | UNPACKED |
|   ADDRESS3 | FIELD | (30,0) | (130,0) | UNPACKED |
|   PHONE | FIELD | (12,0) | (160,0) | UNPACKED |
|   MAX_STATUS | FIELD | (0,8) | (172,0) | UNPACKED |
|   PRINTER | FIELD | (0,8) | (174,0) | UNPACKED |
|   NUM_PROBLEMS | FIELD | (4,0) | (176,0) | UNPACKED |
|   DATE_ENTERED | FIELD | (8,0) | (180,0) | UNPACKED |
|   DATE_LAST_USED | FIELD | (8,0) | (188,0) | UNPACKED |
|   TOTAL_TIMES | FIELD | (6,0) | (196,0) | UNPACKED |
| USERFILE | VARIABLE | (32,0) | #0028 | DIRECT |
| USER | VARIABLE | (202,0) | #0048 | DIRECT |
| USER_RECORDS | VARIABLE | (2,0) | #0112 | DIRECT |
| USERNAME | VARIABLE | (8,0) | #0114 | DIRECT |

```
1802    (*,                                                                         *)
1803    PROCEDURE INTERPRET_EXAMPLE ;
1804
1805    { The following is the interpretation procedure to find either a
1806      complete match with an existing situation string (full), a match
1807      in just major data points with one or more situations (major match),
1808      a match with at least 85% of major data points for one or more
1809      situations (descriptive interpretation), or ignorance.            }
1810
1811
1812    CONST    ACCEPTABLE = 85 ;
1813
1814
1815    VAR      SIT_STRING    : PACKED ARRAY[1..3] OF CHAR ;
1816
1817             PERCENTAGE       : INTEGER ;
1818             NUMBER_MATCHES   : INTEGER ;
1819             TOTAL_SITUATIONS : INTEGER ;
1820             TOTAL_MAJOR      : INTEGER ;
1821             SIT_POINTER      : INTEGER ;
1822
1823             SKIP_COMPARE     : BOOLEAN ;
1824             MATCH            : BOOLEAN ;
1825
1826    BEGIN  { INTERPRET_EXAMPLE }
1827
1828    { Open and empty two work files used to store major matches and
1829      descriptive intpretation matches (i.e., approximate matches).     }
1830
1831  6   MATCHNME := 'MJRMATCH';
1832  7   APPRXNME := 'MJRAPPRX';
1833  8   CLOSE(MATCHES);
1834  9   CLOSE(APPROX);
1835 10   SETNAME(MATCHES,MATCHNME);
1836 11   SETNAME(APPROX,APPRXNME);
1837 12   REWRITE(MATCHES);
1838 13   REWRITE(APPROX);
1839 14
1840 15 { Store totals from Problem record                                  }
1841 16
```

```
1842 17        READ(PROBLEM,0,PROB);
1843 18        TOTAL_QUESTIONS := PROB.NEXT_QUESTION - 1 ;
1844 19        TOTAL_SITUATIONS := PROB.NUM_SITUATIONS - 1 ;
1845 20
1846 21        TOTAL_MAJOR := 0 ;
1847 22        FOR T := 1 TO TOTAL_QUESTIONS DO
1848 23          IF QUEST_MASK[T] = 'M' THEN
1849 24            TOTAL_MAJOR := TOTAL_MAJOR + 1 ;
1850 25
1851 26 { Test for a complete match for both major and minor data points, and
1852 27   if not found, check for major criteria match or count number of major
1853 28   data points which do match                                          }
1854 29
1855 30        SIT_POINTER := 1 ;
1856 31        FOR T := 0 TO TOTAL_SITUATIONS DO
1857 32          IF NOT FULL_INTERPRETATION THEN
1858 33          BEGIN
1859 34            READ(SITUATION,T,SIT);
1860 35            FOR Z := 1 TO TOTAL_QUESTIONS DO
1861 36              IF QUEST_MASK[Z] = 'D' OR QUEST_MASK[Z] = 'R' THEN
1862 37                SIT.SINC_STRING[Z] := 13 ;
1863 38            MATCH := TRUE ;
1864 39            FOR Z := 1 TO TOTAL_QUESTIONS DO
1865 40              IF SIT.SINC_STRING[Z] <> INC_STRING[Z] THEN MATCH := FALSE ;
1866 41            IF MATCH THEN
1867 42            BEGIN
1868 43              FULL_INTERPRETATION := TRUE ;
1869 44              SIT_NUMBER := SIT_POINTER ;
1870 45            END ;
1871 46
1872 47            IF NOT FULL_INTERPRETATION THEN
1873 48            BEGIN
1874 49              MATCH := TRUE ;
1875 50              FOR Z := 1 TO TOTAL_QUESTIONS DO
1876 51                IF QUEST_MASK[Z] = 'L' THEN
1877 52                  SIT.SINC_STRING[Z] := 0 ;
1878 53              FOR Z := 1 TO TOTAL_QUESTIONS DO
1879 54                IF SIT.SINC_STRING[Z] <> MINC_STRING[Z] THEN MATCH := FALSE;
1880 55              IF MATCH THEN
1881 56              BEGIN
1882 57                MAJOR_MATCH := TRUE;
1883 58                ENCODE(SIT_STRING,1,STAT,SIT_POINTER:3);
1884 59                WRITELN(MATCHES,SIT_STRING);
1885 60              END ELSE
1886 61              BEGIN
1887 62                NUMBER_MATCHES := 0 ;
1888 63                FOR N := 1 TO TOTAL_QUESTIONS DO
1889 64                BEGIN
1890 65                  SKIP_COMPARE := FALSE ;
1891 66
1892 67 { Skip comparison of data point if minor (0) or deleted (13)            }
1893 68
1894 69                  IF PROB.INT_QUEST <> 'Y' AND
1895 70                    MINC_STRING[N] = 0 THEN SKIP_COMPARE := TRUE ;
1896 71                  IF PROB.INT_QUEST <> 'Y' AND
1897 72                    MINC_STRING[N] = 13 THEN SKIP_COMPARE := TRUE ;
1898 73                  IF NOT SKIP_COMPARE THEN
1899 74                  BEGIN
1900 75                    IF SIT.SINC_STRING[N] = MINC_STRING[N] THEN
1901 76                      NUMBER_MATCHES := NUMBER_MATCHES + 1 ;
1902 77                  END ;
1903 78                END;
1904 79
1905 80 { Calcualte percentage of matches compared with total major questions
1906 81   (since PERCENTAGE is an integer, multiply numerator by 100 to end
1907 82   up with a "whole" number"                                            }
1908 83
1909 84                NUMBER_MATCHES := NUMBER_MATCHES * 100 ;
1910 85                IF TOTAL_MAJOR = 0 THEN PERCENTAGE := 0 ELSE
1911 86                  PERCENTAGE := NUMBER_MATCHES DIV TOTAL_MAJOR ;
1912 87                IF PERCENTAGE >= ACCEPTABLE THEN
1913 88                BEGIN
1914 89                  DESCRIP_INT := TRUE ;
1915 90                  ENCODE(SIT_STRING,1,STAT,SIT_POINTER:3);
1916 91                  WRITELN(APPROX,SIT_STRING);
```

```
1917  92                END;
1918  93              END;
1919  94              SIT_POINTER := SIT_POINTER + 1 ;
1920  95            END;
1921  96          END;
1922  97
1923  98        WRITEEOF(MATCHES);
1924  99        WRITEEOF(APPROX);
1925 100
1926 101        IF FULL_INTERPRETATION THEN
1927 102        BEGIN
1928 103          MAJOR_MATCH := FALSE ;
1929 104          DESCRIP_INT := FALSE ;
1930 105        END ;
1931 106
1932 107        IF NOT FULL_INTERPRETATION AND NOT MAJOR_MATCH AND NOT DESCRIP_INT
1933 108           THEN IGNORANCE := TRUE ;
1934 109
1935 110        IF MAJOR_MATCH THEN DESCRIP_INT := FALSE ;
1936 111
1937 112
1938      END ; {INTERPRET_EXAMPLE}
```

MAP OF IDENTIFIERS FOR   INTERPRE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| SIT_STRING | VARIABLE | (4,0) | #0028 | DIRECT |
| PERCENTAGE | VARIABLE | (2,0) | #002C | DIRECT |
| NUMBER_MATCHES | VARIABLE | (2,0) | #002E | DIRECT |
| TOTAL_SITUATIONS | VARIABLE | (2,0) | #0030 | DIRECT |
| TOTAL_MAJOR | VARIABLE | (2,0) | #0032 | DIRECT |
| SIT_POINTER | VARIABLE | (2,0) | #0034 | DIRECT |
| SKIP_COMPARE | VARIABLE | (0,1) | #0036 | DIRECT |
| MATCH | VARIABLE | (0,1) | #0038 | DIRECT |

```
1939    (*,                                                                    *)
1940    { ******************************************************************}
1941    {           The following checks for a proper numeric entry         }
1942
1943    PROCEDURE NUMERIC_CHECK ;
1944
1945        VAR    CHAR_SET : SET_OF_CHAR ;
1946               N        : INTEGER ;
1947
1948    BEGIN
1949  2   STATUS_FLAG := FALSE ;
1950  3   CHAR_SET := [' ','0','1','2','3','4','5','6','7','8','9','.',',',
1951  4                                                            '-','+'];
1952  5   FOR N := 1 TO NUM_OF_POS DO
1953  6   BEGIN
1954  7     DUMY := FIELD[N];
1955  8     IF NOT ( DUMY IN CHAR_SET )
1956  9        THEN STATUS_FLAG := TRUE ;
1957 10   END;
1958      END ; { NUMERIC_CHECK }
```

MAP OF IDENTIFIERS FOR   NUMERIC_

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| FIELD | PARAMETER | 2(002A) | #002C | INDIRECT |
| NUM_OF_POS | PARAMETER | (2,0) | #002E | DIRECT |
| STATUS_FLAG | PARAMETER | (0,1) | #0030 | INDIRECT |
| CHAR_SET | VARIABLE | (32,0) | #0032 | DIRECT |
| N | VARIABLE | (2,0) | #0052 | DIRECT |

```
1959
1960    (*,                                                                    *)
```

```
1961   {***************************************************************
1962     This procedure updates the number of situations in the "0" record
1963     of the problem file and the number of encounters in the situaton
1964     file if it was a full interpretation; also the logical importance
1965     is recalculated for all situations and a new minimum LI
1966     value is estblished in the problem record                       }
1967
1968   PROCEDURE RECALCULATE_PROBLEM ;
1969
1970   CONST KIF_INIT =1;        KEY_NOT_FOUND = #B5;
1971         KIF_TERM =2;        KIF_OPEN =3;           KIF_CLOSE =4;
1972         KIF_READ_BY_KEY =9;                        KIF_INSERT_RECORD =19;
1973         KIF_READ_NEXT =17;  KIF_REWRITE_RECORD=20;
1974         KIF_DELETE_BY_KEY =24;                     KIF_READ_BY_KEY_LOCKED=10;
1975         CANNOT_FIND = #BD;  NO_MORE_RECORDS = #B3;
1976
1977   TYPE      SITUATIONS        =   RECORD  { Situations / Questions }
1978             NEXT              :   @SITUATIONS ;
1979             SINC_STRING       :   PACKED ARRAY[1..50] OF INTEGER ;
1980             END ;                         { ########## }
1981
1982             SIT_PTR           =   @SITUATIONS ;
1983
1984             TEST_TABLE        =   RECORD  { Situations / Questions }
1985             NEXT              :   @TEST_TABLE ;
1986             SINC_STRING       :   PACKED ARRAY[1..50] OF INTEGER ;
1987             END ;                         { ########## }
1988
1989             TEST_PTR          =   @TEST_TABLE ;
1990
1991             COMPUTATION_TABLE =   RECORD  { Situations / Questions }
1992             NEXT              :   @COMPUTATION_TABLE ;
1993             VALUES            :   PACKED ARRAY[1..50] OF INTEGER ;
1994             END ;                         { ########## }
1995
1996             COMP_PTR          =   @COMPUTATION_TABLE ;
1997
1998       T_KIF_STATUS_BLOCK=PACKED RECORD              { KIF STATUS BLOCK }
1999            KIF_STATUS_CODE: 0..255;
2000            KIF_KEY_NUMBER : 0..255;
2001            KIF_ACCESS : 0..255;
2002            KIF_RESERVED : 0..255;
2003            KIF_RECORD_LEN : INTEGER;
2004            KIF_PATHNAME : PACKED ARRAY[1..30] OF
2005               CHAR                                  { FILE NAME }
2006            END;                          { END KIF STATUS BLOCK }
2007
2008
2009
2010   { The following is the record layout for the KIF RESPONSE file }
2011
2012   KEYED_RESPONSE=RECORD         CASE BOOLEAN OF
2013                     TRUE:
2014
2015   { This is the "0" record layout for this file }
2016
2017      (PROBLEM_CODE    : PACKED ARRAY[1..8] OF CHAR;
2018       ENTRY_DATE      : PACKED ARRAY[1..8] OF CHAR;
2019       SEQUENCE        : INTEGER ;
2020       RCD_NUMBER      : INTEGER ;
2021       SECOND_CODE     : PACKED ARRAY[1..8] OF CHAR;
2022       THIRD_CODE      : PACKED ARRAY[1..8] OF CHAR;
2023       SIT_NUMBER      : INTEGER ;
2024       USER_CODE       : PACKED ARRAY[1..6] OF CHAR;
2025       ID_EXAMPLE      : PACKED ARRAY[1..15] OF CHAR;
2026       EXAMPLE_NAME    : PACKED ARRAY[1..30] OF CHAR;
2027       NEXT_SEG        : PACKED ARRAY[1..6] OF CHAR;
2028       FILLER          : PACKED ARRAY[1..4] OF CHAR);
2029
2030                  FALSE:
2031
2032   { This is the "1" through "Nth" record layout    }
2033
2034      (DTL_PROBLEM     : PACKED ARRAY[1..8] OF CHAR;
2035       DTL_ENTRY       : PACKED ARRAY[1..8] OF CHAR;
```

```
2036        DTL_SEQ           : INTEGER ;
2037        DTL_RCD           : INTEGER ;
2038        FILLER1           : PACKED ARRAY[1..8] OF CHAR;
2039        FILLER2           : PACKED ARRAY[1..8] OF CHAR;
2040        FILLER3           : INTEGER ;
2041        FILLER4           : PACKED ARRAY[1..6] OF CHAR;
2042        FILLER5           : PACKED ARRAY[1..15] OF CHAR;
2043        RESP1             : PACKED ARRAY[1..10] OF CHAR;
2044        RESP2             : PACKED ARRAY[1..10] OF CHAR;
2045        RESP3             : PACKED ARRAY[1..10] OF CHAR;
2046        RESP4             : PACKED ARRAY[1..10] OF CHAR)
2047     END;
2048
2049     { This record is used for establishing the primary key for the
2050       preceeding KIF file record                                      }
2051
2052     PRIMARY_KEY=RECORD
2053        PROBLEM_CODE      : PACKED ARRAY[1..8] OF CHAR;
2054        ENTRY_DATE        : PACKED ARRAY[1..8] OF CHAR;
2055        SEQUENCE          : INTEGER ;
2056        RCD_NUMBER        : INTEGER ;
2057     END;
2058
2059
2060     VAR    SIT_ROW , SIT_TEMP , SIT_BEG , SIT_GET   :  SIT_PTR ;
2061            COMP_ROW , COMP_TEMP , COMP_BEG , COMP_GET :  COMP_PTR ;
2062            TEST_ROW , TEST_TEMP , TEST_BEG , TEST_GET :  TEST_PTR ;
2063
2064            TEST_STRING       : PACKED ARRAY[1..50] OF INTEGER ;
2065            TOTAL_DUPLICATES  : PACKED ARRAY[1..50] OF INTEGER ;
2066                                   { ########## }
2067            NUMBER            : INTEGER ;
2068            TOTAL_QUESTIONS   : INTEGER ;
2069            TOTAL_SITUATIONS  : INTEGER ;
2070            NON_ZERO_LGCL_IMPT: INTEGER ;
2071            COUNTER           : INTEGER ;
2072            LIMIT             : INTEGER ;
2073            TEST_NUMBER       : INTEGER ;
2074            SIT_LIMIT         : INTEGER ;
2075            SIT_POINTER       : INTEGER ;
2076            ROW               : INTEGER ;
2077            NUM_SITUATIONS    : INTEGER ;
2078            LARGEST_LGCL_IMPT : INTEGER ;
2079            SMALLEST_LGCL_IMPT: INTEGER ;
2080            DELETED_QUESTIONS : INTEGER ;
2081            OUT_OF_RANGE      : BOOLEAN ;
2082            DUPLICATES        : BOOLEAN ;
2083
2084     KIF_STATUS_BLOCK : T_KIF_STATUS_BLOCK ;
2085     KEY_FILE : KEYED_RESPONSE ;
2086     PRIMARY  : PRIMARY_KEY ;
2087
2088        PROCEDURE INITIALIZE ;   FORWARD ;
2089        PROCEDURE SIT_TABLE  ;   FORWARD ;
2090        PROCEDURE COMP_TABLE ;   FORWARD ;
2091        PROCEDURE ANALYZE    ;   FORWARD ;
2092
2093     PROCEDURE KEY$FILE ( KIF_COMMAND : INTEGER;                    {UNIV}
***                   !164
2094        UNIV KIF_KEYNAME : PACKED ARRAY[1..?] OF CHAR;
2095        UNIV KIF_BUFFER_NAME: PACKED ARRAY[1..?] OF CHAR;
2096        VAR KIF_STATUS_BLOCK: T_KIF_STATUS_BLOCK); EXTERNAL;
2097
2098
2099     (*+                                                              *)
2100     PROCEDURE ANALYZE ;
2101
2102     BEGIN { ANALYZE }
2103
2104     { Calculate and store on disk values of the logical importance for
2105       each situation                                                  }
2106
2107  6     LARGEST_LGCL_IMPT := 0 ;
2108  7     SMALLEST_LGCL_IMPT := 99 ;
2109  8     NON_ZERO_LGCL_IMPT := 0 ;
```

```
2110  9        MINIMUM := 0 ;
2111 10        LIMIT := 1 ;
2112 11        FOR T := 1 TO TOTAL_QUESTIONS DO
2113 12        BEGIN
2114 13           READ(PROBLEM,T,PROB);
2115 14           IF QUEST_MASK[T] <> 'D' THEN
2116 15           BEGIN
2117 16              NUMBER := TOTAL_DUPLICATES[T] ;
2118 17              MINIMUM := MINIMUM + NUMBER ;
2119 18              NUMBER := NUMBER * 100 ;
2120 19              LGCL_IMPT := NUMBER DIV TOTAL_SITUATIONS ;
2121 20              IF LGCL_IMPT > LARGEST_LGCL_IMPT THEN
2122 21                 LARGEST_LGCL_IMPT := LGCL_IMPT ;
2123 22              IF LGCL_IMPT < SMALLEST_LGCL_IMPT THEN
2124 23                 SMALLEST_LGCL_IMPT := LGCL_IMPT ;
2125 24              PROB.LGCL_IMPT := LGCL_IMPT ;
2126 25              IF LGCL_IMPT > 0 THEN
2127 26                 NON_ZERO_LGCL_IMPT := NON_ZERO_LGCL_IMPT + 1 ;
2128 27              WRITE(PROBLEM,T,PROB);
2129 28           END ;
2130 29           LIMIT := LIMIT + 1 ;
2131 30        END ;
2132 31
2133 32        NUMBER := TOTAL_QUESTIONS - DELETED_QUESTIONS ;
2134 33        MINIMUM := MINIMUM * 100 ;
2135 34        MINIMUM := MINIMUM DIV ( NUMBER * TOTAL_SITUATIONS ) ;
2136 35        NUMBER := LARGEST_LGCL_IMPT - SMALLEST_LGCL_IMPT ;
2137 36        NUMBER := NUMBER * 100 ;
2138 37        IF LARGEST_LGCL_IMPT = 0 THEN MINIMUM := 0
2139 38           ELSE MINIMUM := MINIMUM * ( NUMBER DIV LARGEST_LGCL_IMPT ) ;
2140 39        MINIMUM := MINIMUM DIV 100 ;
2141 40
2142 41        IF MINIMUM = 0 THEN MINIMUM := 25 ;
2143 42
2144 43  { Check to see if 40% or more of the questions have LI values
2145 44    greater than the minimum value (the average of all LI values).
2146 45    This will only be done, however, if the problem has NEVER had
2147 46    calculated LIs over this 40% figure, in which case the CALC_LI_FLAG
2148 47    will have been changed from "N" to "Y".                           }
2149 48
2150 49        READ(PROBLEM,0,PROB);
2151 50        NUMBER := 0 ;
2152 51        IF PROB.CALC_LI_FLAG <> 'Y' THEN
2153 52        BEGIN
2154 53           FOR T := 1 TO TOTAL_QUESTIONS DO
2155 54           BEGIN
2156 55              IF QUEST_MASK[T] <> 'D' THEN
2157 56              BEGIN
2158 57                 READ(PROBLEM,T,PROB);
2159 58                 LGCL_IMPT := PROB.LGCL_IMPT ;
2160 59                 IF LGCL_IMPT >= MINIMUM THEN NUMBER := NUMBER + 1 ;
2161 60              END ;
2162 61        END ;
2163 62
2164 63  { If there is less than 40% major questions based on the above
2165 64    calculation, then revert to REQUIRED? as the determining factor
2166 65    for whether the data point is major or minor                     }
2167 66
2168 67        NUMBER  := NUMBER * 100 ;
2169 68        NUMBER  := NUMBER DIV ( TOTAL_QUESTIONS - DELETED_QUESTIONS ) ;
2170 69        IF NUMBER >= 40 THEN
2171 70        BEGIN
2172 71           READ(PROBLEM,0,PROB);
2173 72           PROB.CALC_LI_FLAG := 'Y' ;
2174 73           WRITE(PROBLEM,0,PROB);
2175 74        END ;
2176 75        IF NUMBER < 40 THEN
2177 76        BEGIN
2178 77           NON_ZERO_LGCL_IMPT := 0 ;
2179 78           MINIMUM := 25 ;
2180 79           FOR T := 1 TO TOTAL_QUESTIONS DO
2181 80           BEGIN
2182 81              READ(PROBLEM,T,PROB);
2183 82              IF PROB.REQUIRED = 'Y' AND QUEST_MASK[T] <> 'D' THEN
2184 83              BEGIN
```

```
2185 84                NON_ZERO_LGCL_IMPT := NON_ZERO_LGCL_IMPT + 1 ;
2186 85                PROB.LGCL_IMPT := 50 ;
2187 86             END ELSE
2188 87                PROB.LGCL_IMPT := 0 ;
2189 88             WRITE(PROBLEM,T,PROB);
2190 89          END ;
2191 90        END ;
2192 91     END ;
2193 92
2194 93     READ(PROBLEM,0,PROB);
2195 94     PROB.MINIMUM_LI := MINIMUM ;
2196 95     WRITE(PROBLEM,0,PROB);
2197 96
2198 97  { Free up pointer variable memory                                          }
2199 98
2200 99     FOR I := 1 TO TOTAL_SITUATIONS DO
2201 100    BEGIN
2202 101       COMP_TEMP := COMP_BEG@.NEXT ;
2203 102       TEST_TEMP := TEST_BEG@.NEXT ;
2204 103       DISPOSE(COMP_BEG);
2205 104       DISPOSE(TEST_BEG);
2206 105       COMP_BEG := COMP_TEMP ;
2207 106       TEST_BEG := TEST_TEMP ;
2208 107    END ;
2209 108
2210     END ;   { ANALYZE }

2211     (*,                                                                       *)
2212     PROCEDURE COMP_TABLE ;
2213
2214     { Calculate computation table                                              }
2215
2216       VAR   MATCH : BOOLEAN ;
2217
2218     BEGIN  { COMP_TABLE }
2219
2220     { T is the column (i.e., data point) which is set to spaces                }
2221
2222   5   COUNTER := 1 ;
2223   6   FOR T := 1 TO TOTAL_QUESTIONS DO
2224   7   BEGIN
2225   8
2226   9 { TEST_TABLE is the modified SITUATIONS table                              }
2227  10
2228  11      SIT_ROW := SIT_BEG ;
2229  12      TEST_ROW := TEST_BEG ;
2230  13      FOR N := 1 TO TOTAL_SITUATIONS DO
2231  14      BEGIN
2232  15         TEST_ROW@.SINC_STRING := SIT_ROW@.SINC_STRING ;
2233  16         TEST_ROW@.SINC_STRING[T] := 0 ;
2234  17         TEST_TEMP := TEST_ROW ;
2235  18         TEST_ROW  := TEST_TEMP@.NEXT ;
2236  19         SIT_TEMP  := SIT_ROW ;
2237  20         SIT_ROW   := SIT_TEMP@.NEXT ;
2238  21      END ;
2239  22
2240  23 { Compare each situation (except the last) with all situations which
2241  24   have a higher number than the one being tested (TEST_NUMBER). If
2242  25   this TEST_STRING is equal to one of these higher numbered strings,
2243  26   set the value of the COMPUTATION_TABLE for that data point (T) and
2244  27   that higher numbered string (M) to the value of TEST_NUMBER. Only
2245  28   do this, however, if the entry in the table for this test string
2246  29   has itself not previously been changed.                                  }
2247  30
2248  31      TEST_ROW := TEST_BEG ;
2249  32      COMP_ROW := COMP_BEG ;
2250  33      SIT_LIMIT := TOTAL_SITUATIONS - 1 ;
2251  34      TEST_NUMBER := 1 ;
2252  35      FOR N := 1 TO SIT_LIMIT DO
2253  36      BEGIN
2254  37         TEST_STRING := TEST_ROW@.SINC_STRING ;
2255  38         LIMIT := TEST_NUMBER + 1 ;
2256  39         NUMBER := LIMIT ;
2257  40         IF COMP_ROW@.VALUES[T] = TEST_NUMBER THEN
```

```
2258 41          BEGIN
2259 42            TEST_GET := TEST_ROW@.NEXT ;
2260 43            COMP_GET := COMP_ROW@.NEXT ;
2261 44            FOR M := LIMIT TO TOTAL_SITUATIONS DO
2262 45            BEGIN
2263 46              MATCH := TRUE ;
2264 47              FOR Z := 1 TO TOTAL_QUESTIONS DO
2265 48                IF TEST_STRING[Z] <> TEST_GET@.SINC_STRING[Z] THEN
2266 49                  MATCH := FALSE ;
2267 50              IF MATCH THEN
2268 51                COMP_GET@.VALUES[T] := TEST_NUMBER ;
2269 52              TEST_TEMP := TEST_GET ;
2270 53              COMP_TEMP := COMP_GET ;
2271 54              TEST_GET  := TEST_TEMP@.NEXT ;
2272 55              COMP_GET  := COMP_TEMP@.NEXT ;
2273 56            END ;
2274 57          END ;
2275 58          TEST_NUMBER := TEST_NUMBER + 1 ;
2276 59          TEST_TEMP := TEST_ROW ;
2277 60          TEST_ROW  := TEST_TEMP@.NEXT ;
2278 61          COMP_TEMP := COMP_ROW ;
2279 62          COMP_ROW  := COMP_TEMP@.NEXT ;
2280 63        END ;
2281 64        COUNTER := COUNTER + 1 ;
2282 65        LIMIT := LIMIT + 1 ;
2283 66      END ;
2284 67
2285 68
2286 69  { Count the number of duplicate numbers in each column                  }
2287 70
2288 71      FOR T := 1 TO TOTAL_QUESTIONS DO
2289 72      BEGIN
2290 73        TEST_NUMBER := 1 ;
2291 74        IF QUEST_MASK[T] <> 'D' THEN FOR M := 1 TO TOTAL_SITUATIONS DO
2292 75        BEGIN
2293 76          COUNTER := 0 ;
2294 77          COMP_ROW := COMP_BEG ;
2295 78          SIT_ROW  := SIT_BEG ;
2296 79          FOR N := 1 TO TOTAL_SITUATIONS DO
2297 80          BEGIN
2298 81            NUMBER := COMP_ROW@.VALUES[T] ;
2299 82            IF TEST_NUMBER = NUMBER THEN
2300 83              COUNTER := COUNTER + 1 ;
2301 84            COMP_TEMP := COMP_ROW ;
2302 85            SIT_TEMP  := SIT_ROW ;
2303 86            COMP_ROW  := COMP_TEMP@.NEXT ;
2304 87            SIT_ROW   := SIT_TEMP@.NEXT ;
2305 88          END ;
2306 89
2307 90  { If duplicates exist in this collumn (i.e., COUNTER is greater than
2308 91    1), add to TOTAL_DUPLICATES                                            }
2309 92
2310 93          IF COUNTER > 1 THEN
2311 94            TOTAL_DUPLICATES[T] := TOTAL_DUPLICATES[T] + COUNTER ;
2312 95          TEST_NUMBER := TEST_NUMBER + 1 ;
2313 96
2314 97        END ;
2315 98
2316 99      END ;
2317 100
2318 101
2319    END ;   { COMP_TABLE }
```

MAP OF IDENTIFIERS FOR  COMP_TAB

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| MATCH | VARIABLE | (0,1) | #0028 | DIRECT |

```
2320    (*,                                                                      *)
2321    PROCEDURE INITIALIZE ;
2322
2323    { Initialize the total different table with zeors                        }
```

```
2324
2325      BEGIN  { INITIALIZE }
2326
2327  3     NUMBER := 0 ;
2328  4     FOR T := 1 TO 50 DO                        { ########## }
2329  5        TOTAL_DUPLICATES[T] := NUMBER ;
2330  6
2331  7   { Store totals from Problem record                                  }
2332  8
2333  9     READ(PROBLEM, 0, PROB);
2334 10     TOTAL_QUESTIONS  := PROB.NEXT_QUESTION - 1 ;
2335 11     TOTAL_SITUATIONS := PROB.NUM_SITUATIONS ;
2336 12
2337 13   { Establish QUEST_MASK with a "D" for deleted or reference quest.   }
2338 14
2339 15     DELETED_QUESTIONS := 0 ;
2340 16     FOR T := 1 TO TOTAL_QUESTIONS DO
2341 17     BEGIN
2342 18        READ(PROBLEM, T, PROB) ;
2343 19        QUEST_MASK[T] := PROB.STATUS_CODE ;
2344 20        IF PROB.STATUS_CODE = 'D' OR PROB.REFERENCE = 'Y' THEN
2345 21        BEGIN
2346 22           DELETED_QUESTIONS := DELETED_QUESTIONS + 1 ;
2347 23           QUEST_MASK[T] := 'D' ;
2348 24        END ;
2349 25     END ;
2350 26
2351 27     COMP_TEMP := NIL ;
2352 28     NUMBER := TOTAL_SITUATIONS ;
2353 29     FOR T := TOTAL_SITUATIONS DOWNTO 1 DO
2354 30     BEGIN
2355 31        NEW(COMP_ROW);
2356 32        COMP_ROW@.NEXT := COMP_TEMP ;
2357 33        FOR N := 1 TO 50 DO                     { ########## }
2358 34           COMP_ROW@.VALUES[N] := NUMBER ;
2359 35        NUMBER := NUMBER - 1 ;
2360 36        COMP_TEMP := COMP_ROW ;
2361 37     END ;
2362 38     COMP_BEG := COMP_ROW ;
2363 39
2364      END ;   { INITIALIZE }

2365      (*,                                                                 *)
2366      PROCEDURE SIT_TABLE ;
2367
2368      { Read in all situations entered to-date and store each as modified
2369        for deleted questions; also store number of encounters in table   }
2370
2371      BEGIN  { SIT_TABLE }
2372  2     SIT_POINTER := 1 ;
2373  3
2374  4
2375  5     SIT_TEMP := NIL ;
2376  6     TEST_TEMP := NIL ;
2377  7     SIT_LIMIT := TOTAL_SITUATIONS - 1 ;
2378  8     FOR T := SIT_LIMIT DOWNTO 0 DO
2379  9     BEGIN
2380 10        READ(SITUATION, T, SIT);
2381 11        FOR N := 1 TO TOTAL_QUESTIONS DO
2382 12           IF QUEST_MASK[N] = 'D' THEN
2383 13              SIT.SINC_STRING[N] := 13 ;
2384 14
2385 15        NEW(SIT_ROW);
2386 16        NEW(TEST_ROW);
2387 17        SIT_ROW@.NEXT := SIT_TEMP ;
2388 18        TEST_ROW@.NEXT := TEST_TEMP ;
2389 19        SIT_ROW@.SINC_STRING   := SIT.SINC_STRING ;
2390 20        TEST_ROW@.SINC_STRING  := SIT.SINC_STRING ;
2391 21        SIT_TEMP := SIT_ROW ;
2392 22        TEST_TEMP := TEST_ROW ;
2393 23
2394 24        NUMBER := SIT.NUM_ENCOUNTERS ;
2395 25     END ;
2396 26     SIT_BEG := SIT_ROW ;
2397 27     TEST_BEG := TEST_ROW ;
```

```
2398 28
2399      END ;    { SIT_TABLE }

2400      (*-                                                                              *)
2401      BEGIN    { RECALCULATE_PROBLEM }
2402
2403  3   CLEAR_LINE(24) ;
2404  4   DISPLAY(VDT_BLK,24,15,'PLEASE WAIT - THIS PROBLEM IS NOW BEING ',99);
2405  5   DISPLAY(VDT_BLK,24,55,'RE-ANALYZED',99);
2406  6
2407  7   READ(SITUATION,0,SIT);
2408  8   NUM_SITUATIONS := SIT.NEXT_SIT ;
2409  9
2410 10   READ(PROBLEM,0,PROB);
2411 11   PROB.NUM_SITUATIONS := NUM_SITUATIONS ;
2412 12   TOTAL_QUESTIONS := PROB.NEXT_QUESTION - 1 ;
2413 13   DATE(PROB.DATE_LAST_USED);
2414 14   WRITE(PROBLEM,0,PROB);
2415 15
2416 16   IF FULL_INTERPRETATION THEN
2417 17   BEGIN
2418 18     READ(SITUATION,SIT_NUMBER,SIT);
2419 19     SIT.NUM_ENCOUNTERS := SIT.NUM_ENCOUNTERS + 1 ;
2420 20     DATE(SIT.DATE_LAST_USED);
2421 21     WRITE(SITUATION,SIT_NUMBER,SIT);
2422 22   END ;
2423 23
2424 24   { While memory is a constraint, only update logical importance values
2425 25     "on the fly" when the number of situations will not cause a "heap
2426 26     overflow"; otherwise update these problem codes in batch after the
2427 27     example routine has terminated                                     }
2428 28
2429 29   IF SIT_ADDED AND NUM_SITUATIONS < 12 THEN
2430 30   BEGIN
2431 31     INITIALIZE ;
2432 32     SIT_TABLE  ;
2433 33     COMP_TABLE ;
2434 34     ANALYZE    ;
2435 35   END ;
2436 36
2437 37   IF SIT_ADDED AND NUM_SITUATIONS >= 12 THEN
2438 38     WRITELN(UPDATE_FILE,PROBLEM_FILE);
2439 39
2440 40   { Update data base with responses for this example; first find the
2441 41     lowest sequence number which will assign a unique primary key to
2442 42     this new set of records to be added to the file - this will be
2443 43     stored in the "0" record of the "1" sequence number (if present)   }
2444 44
2445 45   IF PROB.DATA_BASE = 'Y' THEN
2446 46   BEGIN
2447 47     KEY$FILE(KIF_INIT,DUMMY,DUMMY,KIF_STATUS_BLOCK);
2448 48     KIF_STATUS_BLOCK.KIF_PATHNAME := 'KEYFILE                  ';
2449 49     KEY$FILE(KIF_OPEN,DUMMY,DUMMY,KIF_STATUS_BLOCK);
2450 50     KIF_STATUS_BLOCK.KIF_KEY_NUMBER := 1 ;
2451 51
2452 52     PRIMARY.PROBLEM_CODE := PROBLEM_FILE ;
2453 53     DATE(PRIMARY.ENTRY_DATE);
2454 54     PRIMARY.SEQUENCE := 1 ;
2455 55     PRIMARY.RCD_NUMBER := 0 ;
2456 56     KEY$FILE(KIF_READ_BY_KEY_LOCKED,PRIMARY,KEY_FILE,KIF_STATUS_BLOCK);
2457 57
2458 58   { Update next sequence number in initial record if it exists         }
2459 59
2460 60     IF KIF_STATUS_BLOCK.KIF_STATUS_CODE = 0 THEN
2461 61     BEGIN
2462 62       DECODE(KEY_FILE.NEXT_SEQ,1,STAT,COUNTER);
2463 63       COUNTER := COUNTER + 1 ;
2464 64       ENCODE(KEY_FILE.NEXT_SEQ,1,STAT,COUNTER:6);
2465 65       KEY$FILE(KIF_REWRITE_RECORD,DUMMY,KEY_FILE,KIF_STATUS_BLOCK);
2466 66       PRIMARY.SEQUENCE := COUNTER - 1 ;
2467 67     END ;
2468 68
2469 69     KEY_FILE.PROBLEM_CODE := PROBLEM_FILE ;
2470 70     DATE(KEY_FILE.ENTRY_DATE);
2471 71     KEY_FILE.SEQUENCE := PRIMARY.SEQUENCE ;
```

```
2472  72       KEY_FILE.RCD_NUMBER := PRIMARY.RCD_NUMBER ;
2473  73       COUNTER := PRIMARY.SEQUENCE + 1 ;
2474  74       ENCODE(KEY_FILE.NEXT_SEQ, 1, STAT, COUNTER:6);
2475  75       KEY_FILE.SECOND_CODE := PROBLEM_FILE ;
2476  76       KEY_FILE.THIRD_CODE  := PROBLEM_FILE ;
2477  77
2478  78   { The situation number will be the situation record number (0 to n)
2479  79     if it was a full interpretation or a new situation record was added
2480  80     to the file, or a -1 if no specific situation could be identified }
2481  81
2482  82       IF FULL_INTERPRETATION THEN
2483  83         KEY_FILE.SIT_NUMBER := SIT_NUMBER
2484  84       ELSE
2485  85         KEY_FILE.SIT_NUMBER := -1 ;
2486  86
2487  87       KEY_FILE.USER_CODE := USER_CODE ;
2488  88       KEY_FILE.ID_EXAMPLE := ID_EXAMPLE ;
2489  89       KEY_FILE.EXAMPLE_NAME := EXAMPLE_NAME ;
2490  90       KEY_FILE.FILLER := '     ';
2491  91
2492  92       KEY$FILE(KIF_INSERT_RECORD, DUMMY, KEY_FILE, KIF_STATUS_BLOCK);
2493  93
2494  94   { Write response records, four responses per records                    }
2495  95
2496  96       RESET(WORKRESP);
2497  97       KEY_FILE.FILLER1 := '         ';
2498  98       KEY_FILE.FILLER2 := '         ';
2499  99       KEY_FILE.FILLER3 := 0 ;
2500 100       KEY_FILE.FILLER4 := '         ';
2501 101       KEY_FILE.FILLER5 := '            ';
2502 102       KEY_FILE.RESP1 := '         ';
2503 103       KEY_FILE.RESP2 := '         ';
2504 104       KEY_FILE.RESP3 := '         ';
2505 105       KEY_FILE.RESP4 := '         ';
2506 106       COUNTER := 1 ;
2507 107       RECORD_COUNTER := 1 ;
2508 108       FOR Q := 1 TO TOTAL_QUESTIONS DO
2509 109       BEGIN
2510 110         READ(WORKRESP, Q, RESP);
2511 111         CASE COUNTER OF
2512 112           1 : KEY_FILE.RESP1 := RESP.RESPONSE ;
2513 113           2 : KEY_FILE.RESP2 := RESP.RESPONSE ;
2514 114           3 : KEY_FILE.RESP3 := RESP.RESPONSE ;
2515 115           4 : KEY_FILE.RESP4 := RESP.RESPONSE ;
2516 116         OTHERWISE END ;
2517 117         COUNTER := COUNTER + 1 ;
2518 118         IF COUNTER = 5 THEN
2519 119         BEGIN
2520 120           COUNTER := 1 ;
2521 121           KEY_FILE.RCD_NUMBER := RECORD_COUNTER ;
2522 122           RECORD_COUNTER := RECORD_COUNTER + 1 ;
2523 123           KEY$FILE(KIF_INSERT_RECORD, DUMMY, KEY_FILE, KIF_STATUS_BLOCK);
2524 124           KEY_FILE.RESP1 := '         ';
2525 125           KEY_FILE.RESP2 := '         ';
2526 126           KEY_FILE.RESP3 := '         ';
2527 127           KEY_FILE.RESP4 := '         ';
2528 128         END ;
2529 129       END ;
2530 130       IF COUNTER <> 1 THEN
2531 131       BEGIN
2532 132         KEY_FILE.RCD_NUMBER := RECORD_COUNTER ;
2533 133         KEY$FILE(KIF_INSERT_RECORD, DUMMY, KEY_FILE, KIF_STATUS_BLOCK);
2534 134       END ;
2535 135
2536 136       KEY$FILE(KIF_CLOSE, DUMMY, DUMMY, KIF_STATUS_BLOCK);
2537 137     END ;
2538 138
2539       END ; { RECALCULATE_PROBLEM }

MAP OF IDENTIFIERS FOR  RECALCUL

IDENTIFIER NAME      KIND         SIZE           STACK              PICTURE
                                   (BYTES, BITS)  DISPLACEMENT     (PACKED FIELDS ONLY)
                                   LEVEL(DISPL)    (BYTE, BIT)
```

```
SITUATIONS       RECORD      (102,0)
  NEXT           FIELD       (2,0)      (0,0)      UNPACKED
  SINC_STRING    FIELD       (100,0)    (2,0)      UNPACKED
TEST_TABLE       RECORD      (102,0)
  NEXT           FIELD       (2,0)      (0,0)      UNPACKED
  SINC_STRING    FIELD       (100,0)    (2,0)      UNPACKED
COMPUTATION_TABLE
                 RECORD      (102,0)
  NEXT           FIELD       (2,0)      (0,0)      UNPACKED
  VALUES         FIELD       (100,0)    (2,0)      UNPACKED
T_KIF_STATUS_BLOCK
                 RECORD      (36,0)
  KIF_STATUS_CODE
                 +FIELD      (0,8)      (0,0)      PACKED    (XXXX XXXX .... ....)
  KIF_KEY_NUMBER
                 +FIELD      (0,8)      (0,8)      PACKED    (.... .... XXXX XXXX)
  KIF_ACCESS     +FIELD      (0,8)      (2,0)      PACKED    (XXXX XXXX .... ....)
  KIF_RESERVED   +FIELD      (0,8)      (2,8)      PACKED    (.... .... XXXX XXXX)
  KIF_RECORD_LEN
                 FIELD       (2,0)      (4,0)      UNPACKED
  KIF_PATHNAME   FIELD       (30,0)     (6,0)      UNPACKED
KEYED_RESPONSE   RECORD      (100,0)
  PROBLEM_CODE   FIELD       (8,0)      (0,0)      UNPACKED
  ENTRY_DATE     FIELD       (8,0)      (8,0)      UNPACKED
  SEQUENCE       FIELD       (2,0)      (16,0)     UNPACKED
  RCD_NUMBER     FIELD       (2,0)      (18,0)     UNPACKED
  SECOND_CODE    FIELD       (8,0)      (20,0)     UNPACKED
  THIRD_CODE     FIELD       (8,0)      (28,0)     UNPACKED
  SIT_NUMBER     FIELD       (2,0)      (36,0)     UNPACKED
  USER_CODE      FIELD       (6,0)      (38,0)     UNPACKED
  ID_EXAMPLE     FIELD       (16,0)     (44,0)     UNPACKED
  EXAMPLE_NAME   FIELD       (30,0)     (60,0)     UNPACKED
  NEXT_SEG       FIELD       (6,0)      (90,0)     UNPACKED
  FILLER         FIELD       (4,0)      (96,0)     UNPACKED
  DTL_PROBLEM    FIELD       (8,0)      (0,0)      UNPACKED
  DTL_ENTRY      FIELD       (8,0)      (8,0)      UNPACKED
  DTL_SEG        FIELD       (2,0)      (16,0)     UNPACKED
  DTL_RCD        FIELD       (2,0)      (18,0)     UNPACKED
  FILLER1        FIELD       (8,0)      (20,0)     UNPACKED
  FILLER2        FIELD       (8,0)      (28,0)     UNPACKED
  FILLER3        FIELD       (2,0)      (36,0)     UNPACKED
  FILLER4        FIELD       (6,0)      (38,0)     UNPACKED
  FILLER5        FIELD       (16,0)     (44,0)     UNPACKED
  RESP1          FIELD       (10,0)     (60,0)     UNPACKED
  RESP2          FIELD       (10,0)     (70,0)     UNPACKED
  RESP3          FIELD       (10,0)     (80,0)     UNPACKED
  RESP4          FIELD       (10,0)     (90,0)     UNPACKED
PRIMARY_KEY      RECORD      (20,0)
  PROBLEM_CODE   FIELD       (8,0)      (0,0)      UNPACKED
  ENTRY_DATE     FIELD       (8,0)      (8,0)      UNPACKED
  SEQUENCE       FIELD       (2,0)      (16,0)     UNPACKED
  RCD_NUMBER     FIELD       (2,0)      (18,0)     UNPACKED
SIT_ROW          VARIABLE    (2,0)      #0028      DIRECT
SIT_TEMP         VARIABLE    (2,0)      #002A      DIRECT
SIT_BEG          VARIABLE    (2,0)      #002C      DIRECT
SIT_GET          VARIABLE    (2,0)      #002E      DIRECT
COMP_ROW         VARIABLE    (2,0)      #0030      DIRECT
COMP_TEMP        VARIABLE    (2,0)      #0032      DIRECT
COMP_BEG         VARIABLE    (2,0)      #0034      DIRECT
COMP_GET         VARIABLE    (2,0)      #0036      DIRECT
TEST_ROW         VARIABLE    (2,0)      #0038      DIRECT
TEST_TEMP        VARIABLE    (2,0)      #003A      DIRECT
TEST_BEG         VARIABLE    (2,0)      #003C      DIRECT
TEST_GET         VARIABLE    (2,0)      #003E      DIRECT
TEST_STRING      VARIABLE    (100,0)    #0040      DIRECT
TOTAL_DUPLICATES
                 VARIABLE    (100,0)    #00A4      DIRECT
NUMBER           VARIABLE    (2,0)      #0108      DIRECT
TOTAL_QUESTIONS  VARIABLE    (2,0)      #010A      DIRECT
TOTAL_SITUATIONS
                 VARIABLE    (2,0)      #010C      DIRECT
NON_ZERO_LGCL_IMPT
                 VARIABLE    (2,0)      #010E      DIRECT
COUNTER          VARIABLE    (2,0)      #0110      DIRECT
```

```
LIMIT              VARIABLE     (2,0)      #0112    DIRECT
TEST_NUMBER        VARIABLE     (2,0)      #0114    DIRECT
SIT_LIMIT          VARIABLE     (2,0)      #0116    DIRECT
SIT_POINTER        VARIABLE     (2,0)      #0118    DIRECT
ROW                VARIABLE     (2,0)      #011A    DIRECT
NUM_SITUATIONS     VARIABLE     (2,0)      #011C    DIRECT
LARGEST_LGCL_IMPT
                   VARIABLE     (2,0)      #011E    DIRECT
SMALLEST_LGCL_IMPT
                   VARIABLE     (2,0)      #0120    DIRECT
DELETED_QUESTIONS
                   VARIABLE     (2,0)      #0122    DIRECT
OUT_OF_RANGE       VARIABLE     (0,1)      #0124    DIRECT
DUPLICATES         VARIABLE     (0,1)      #0126    DIRECT
KIF_STATUS_BLOCK
                   VARIABLE     (36,0)     #0128    DIRECT
KEY_FILE           VARIABLE     (100,0)    #014C    DIRECT
PRIMARY            VARIABLE     (20,0)     #01B0    DIRECT 2540      (*,                                                                    *)
2541      PROCEDURE RPT_INTERPRETATION ;
2542
2543      { The following is the procedure to store the descriptive results   }
2544      {          of the interpretation in the report file                 }
2545
2546      VAR      DESC_LIMIT       : INTEGER ;
2547               DESC_SIT         : INTEGER ;
2548               SIT_POINTER      : INTEGER ;
2549               DIFFER           : INTEGER ;
2550               END_OF_DATA      : BOOLEAN ;
2551               LINK_PROB        : PACKED ARRAY[1..8] OF CHAR ;
2552               TEST_STRING      : PACKED ARRAY[1..50] OF INTEGER ;
2553               JUDGEMENT        : PACKED ARRAY[1..20] OF CHAR ;
2554
2555      PROCEDURE DIFFERENT ;    FORWARD ;
2556
2557      (*+                                                                    *)
2558      PROCEDURE DIFFERENT ;
2559
2560      { This procedure generates the judgement difference for a given data
2561        point and writes it to the report file                             }
2562
2563      BEGIN    { DIFFERENT }
2564
2565  3             IF PROB.INT_QUEST <> 'Y' THEN
2566  4             BEGIN
2567  5                CASE DIFFER OF
2568  6                   1 : JUDGEMENT := 'below both ranges   ';
2569  7                   2 : JUDGEMENT := 'below primary range ';
2570  8                   3 : JUDGEMENT := 'within both ranges  ';
2571  9                   4 : JUDGEMENT := 'above primary range ';
2572 10                   5 : JUDGEMENT := 'above both ranges   ';
2573 11                   6 : JUDGEMENT := 'below range         ';
2574 12                   7 : JUDGEMENT := 'within range        ';
2575 13                   8 : JUDGEMENT := 'above range         ';
2576 14                   9 : JUDGEMENT := 'no judgement        ';
2577 15                  10 : JUDGEMENT := 'not entered         ';
2578 16                  11 : JUDGEMENT := 'absent              ';
2579 17                  12 : JUDGEMENT := 'present             ';
2580 18                OTHERWISE
2581 19                     JUDGEMENT := '****** ERROR ****** ';
2582 20                     WRITELN(REPORT,'***ERROR: ',DIFFER:5);
2583 21                END ;
2584 22                WRITELN(REPORT,'                    ',PROB.DESC_QUESTION,
2585 23                        ' is ',JUDGEMENT);
2586 24             END ;
2587 25
2588 26   { For integer questions, show value of integer as difference         }
2589 27
2590 28             IF PROB.INT_QUEST = 'Y' THEN
2591 29                WRITELN(REPORT,'                    ',PROB.DESC_QUESTION,
2592 30                        ' is ',DIFFER:5);
2593 31
2594 32
2595      END ;    { DIFFERENT }
```

```
2596       (*-                                                                              *)
2597       BEGIN   { RPT_INTERPRETATION }
2598
2599  3       WRITELN(REPORT);
2600  4       WRITELN(REPORT);
2601  5       WRITELN(REPORT,'                     INTERPRETATION');
2602  6       WRITELN(REPORT);
2603  7       CLEAR_LINE(23);
2604  8
2605  9  { For ignorance, just write this to the report file                      }
2606 10
2607 11       IF IGNORANCE THEN
2608 12       BEGIN
2609 13          WRITELN(REPORT,' Not possible to make an interpretation ',
2610 14                         'on the basis of the present experience. ');
2611 15          IF USER_PROB.STATUS_CODE <> 'U' THEN
2612 16             WRITELN(REPORT,'                    Please enter your descri',
2613 17                         'ption of this situation.                 ');
2614 18          WRITELN(REPORT);
2615 19       END ;
2616 20
2617 21  { For a full interpretation, write the appropriate description to the
2618 22    report file and check for linked secondary problem codes                }
2619 23
2620 24       IF FULL_INTERPRETATION THEN
2621 25       BEGIN
2622 26          WRITELN(REPORT,'This combination of data suggests:       ');
2623 27          READ(SITUATION,SIT_NUMBER,SIT);
2624 28          WRITELN(REPORT,SIT.SIT_DESCRIPTION);
2625 29          READ(DESCRIPTION,0,DESC);
2626 30          DECODE(DESC.NEXT_RECORD,1,STAT,DESC_LIMIT);
2627 31          DESC_LIMIT := DESC_LIMIT - 1 ;
2628 32          IF DESC_LIMIT > 0 THEN
2629 33          BEGIN
2630 34             FOR N := 1 TO DESC_LIMIT DO
2631 35             BEGIN
2632 36                READ(DESCRIPTION,N,DESC);
2633 37                DECODE(DESC.SIT_NUMBER,1,STAT,DESC_SIT);
2634 38                IF DESC_SIT = SIT_NUMBER THEN
2635 39                   WRITELN(REPORT,DESC.TEXT_LINE);
2636 40             END;
2637 41          END;
2638 42
2639 43  { If linked problem codes exist in this situation, open the link
2640 44    code file, write the codes to it and to the report                      }
2641 45
2642 46          IF SIT.PROB1_LINK <> '          ' THEN
2643 47          BEGIN
2644 48             LINK_CODES[5] := '          ' ;
2645 49             WRITELN(REPORT);
2646 50             WRITELN(REPORT,'  NOTE: The following problem code(s) are ',
2647 51                         'linked to this situation:    ');
2648 52             LINK_NUMBER := 1 ;
2649 53             FOR Q := 1 TO 4 DO
2650 54             BEGIN
2651 55                CASE LINK_NUMBER OF
2652 56                      1  :  LINK_PROB := SIT.PROB1_LINK ;
2653 57                      2  :  LINK_PROB := SIT.PROB2_LINK ;
2654 58                      3  :  LINK_PROB := SIT.PROB3_LINK ;
2655 59                      4  :  LINK_PROB := SIT.PROB4_LINK ;
2656 60                OTHERWISE END ;
2657 61                IF LINK_PROB <> '          ' THEN
2658 62                   WRITELN(REPORT,'                             ',LINK_PROB);
2659 63                LINK_CODES[LINK_NUMBER] := LINK_PROB ;
2660 64                LINK_NUMBER := LINK_NUMBER + 1 ;
2661 65             END ;
2662 66             LINK_NUMBER := 1 ;
2663 67             LINK_MODE := TRUE ;
2664 68             WRITELN(REPORT);
2665 69             ORIGINAL_PROBLEM := PROBLEM_FILE ;
2666 70          END ;
2667 71
2668 72       END ;    { "IF FULL_INTERPRETATION" }
2669 73
2670 74  { For a major match, for each situation matched, write the description
```

```
2671  75       plus the differences in any minor data point which do not match    }
2672  76
2673  77       IF MAJOR MATCH THEN
2674  78       BEGIN
2675  79          RESET(MATCHES);
2676  80          READ(MATCHES, BUFFER);
2677  81          COUNTER := 1 ;
2678  82          WHILE NOT EOF(MATCHES) DO
2679  83          BEGIN
2680  84             DECODE(BUFFER, 1, STAT, SIT_NUMBER);
2681  85
2682  86  { Change relative sit-number pointer to an absolute record address      }
2683  87
2684  88             SIT_POINTER := SIT_NUMBER ;
2685  89             SIT_NUMBER := SIT_NUMBER - 1 ;
2686  90             READ(SITUATION, SIT_NUMBER, SIT);
2687  91             WRITELN(REPORT, 'The major criteria in this example are ',
2688  92                'those of (situation ##', SIT_POINTER:3, '):');
2689  93             WRITELN(REPORT, SIT.SIT_DESCRIPTION);
2690  94             READ(DESCRIPTION, 0, DESC);
2691  95             DECODE(DESC.NEXT_RECORD, 1, STAT, DESC_LIMIT);
2692  96             DESC_LIMIT := DESC_LIMIT - 1 ;
2693  97             IF DESC_LIMIT > 0 THEN
2694  98             BEGIN
2695  99                FOR N := 1 TO DESC_LIMIT DO
2696 100                BEGIN
2697 101                   READ(DESCRIPTION, N, DESC);
2698 102                   DECODE(DESC.SIT_NUMBER, 1, STAT, DESC_SIT);
2699 103                   IF DESC_SIT = SIT_NUMBER THEN
2700 104                      WRITELN(REPORT, DESC.TEXT_LINE);
2701 105                END;
2702 106             END;
2703 107             WRITELN(REPORT, 'Minor differences are: ');
2704 108
2705 109  { Adjust situation string for major, deleted and ref. questions          }
2706 110
2707 111             FOR T := 1 TO TOTAL_QUESTIONS DO
2708 112             BEGIN
2709 113                IF QUEST_MASK[T] = 'M' THEN
2710 114                   SIT.SINC_STRING[T] := 0 ;
2711 115                IF QUEST_MASK[T] = 'D' OR QUEST_MASK[T] = 'R' THEN
2712 116                   SIT.SINC_STRING[T] := 13 ;
2713 117             END ;
2714 118             TEST_STRING := SIT.SINC_STRING ;
2715 119
2716 120             FOR T := 1 TO TOTAL_QUESTIONS DO
2717 121                IF LINC_STRING[T] <> TEST_STRING[T] THEN
2718 122                BEGIN
2719 123                   READ(PROBLEM, T, PROB);
2720 124                   DIFFER := LINC_STRING[T] ;
2721 125                   DIFFERENT ;
2722 126                END;
2723 127
2724 128             COUNTER := COUNTER + 1 ;
2725 129             WRITELN(REPORT);
2726 130             READ(MATCHES, BUFFER);
2727 131          END ;
2728 132          WRITELN(REPORT);
2729 133       END ;
2730 134
2731 135  { For a descriptive interpretation, write descriptions for all matches
2732 136    where 85% of the major data points match, and show the differences
2733 137    in the major data points that don't match, and then also describe
2734 138    the minor differences                                                  }
2735 139
2736 140       IF DESCRIP_INT THEN
2737 141       BEGIN
2738 142          RESET(APPROX);
2739 143          READ(APPROX, BUFFER);
2740 144          COUNTER := 1 ;
2741 145          WHILE NOT EOF(APPROX) DO
2742 146          BEGIN
2743 147             DECODE(BUFFER, 1, STAT, SIT_NUMBER);
2744 148
2745 149  { Change relative sit-number to an absolute record address                }
```

```
2746150
2747151            SIT_POINTER := SIT_NUMBER ;
2748152            SIT_NUMBER := SIT_NUMBER - 1 ;
2749153            READ(SITUATION, SIT_NUMBER, SIT);
2750154            WRITELN(REPORT, 'This example resembles the pattern ',
2751155               'seen in (situation ##',SIT_POINTER:3,'):');
2752156            WRITELN(REPORT, SIT. SIT_DESCRIPTION);
2753157            READ(DESCRIPTION, O, DESC);
2754158            DECODE(DESC. NEXT_RECORD, 1, STAT, DESC_LIMIT);
2755159            DESC_LIMIT := DESC_LIMIT - 1 ;
2756160            IF DESC_LIMIT > 0 THEN
2757161            BEGIN
2758162               FOR N := 1 TO DESC_LIMIT DO
2759163               BEGIN
2760164                  READ(DESCRIPTION, N, DESC);
2761165                  DECODE(DESC. SIT_NUMBER, 1, STAT, DESC_SIT);
2762166                  IF DESC_SIT = SIT_NUMBER THEN
2763167                     WRITELN(REPORT, DESC. TEXT_LINE);
2764168               END;
2765169            END;
2766170            WRITELN(REPORT, 'Except that in this case:');
2767171
2768172 { Adjust situation string for minor, deleted and ref. questions    }
2769173
2770174            FOR T := 1 TO TOTAL_QUESTIONS DO
2771175            BEGIN
2772176               IF QUEST_MASK[T] = 'L' THEN
2773177                  SIT. SINC_STRING[T] := 0 ;
2774178               IF QUEST_MASK[T] = 'D' OR QUEST_MASK[T] = 'R' THEN
2775179                  SIT. SINC_STRING[T] := 13 ;
2776180            END ;
2777181            TEST_STRING := SIT. SINC_STRING ;
2778182
2779183            FOR T := 1 TO TOTAL_QUESTIONS DO
2780184               IF MINC_STRING[T] <> TEST_STRING[T] THEN
2781185               BEGIN
2782186                  READ(PROBLEM, T, PROB);
2783187                  DIFFER := MINC_STRING[T] ;
2784188                  DIFFERENT ;
2785189               END;
2786190
2787191 { Describe the minor differences for this situation                 }
2788192
2789193            WRITELN(REPORT, 'And the minor differences include:');
2790194            READ(SITUATION, SIT_NUMBER, SIT);
2791195
2792196 { Adjust situation string for major, deleted and ref. questions    }
2793197
2794198            FOR T := 1 TO TOTAL_QUESTIONS DO
2795199            BEGIN
2796200               IF QUEST_MASK[T] = 'M' THEN
2797201                  SIT. SINC_STRING[T] := 0 ;
2798202               IF QUEST_MASK[T] = 'D' OR QUEST_MASK[T] = 'R' THEN
2799203                  SIT. SINC_STRING[T] := 13 ;
2800204            END ;
2801205            TEST_STRING := SIT. SINC_STRING ;
2802206
2803207            FOR T := 1 TO TOTAL_QUESTIONS DO
2804208               IF LINC_STRING[T] <> TEST_STRING[T] THEN
2805209               BEGIN
2806210                  READ(PROBLEM, T, PROB);
2807211                  DIFFER := LINC_STRING[T] ;
2808212                  DIFFERENT ;
2809213               END;
2810214
2811215            COUNTER := COUNTER + 1 ;
2812216            WRITELN(REPORT);
2813217            READ(APPROX, BUFFER);
2814218         END ;
2815219      WRITELN(REPORT);
2816220   END ;
2817221
2818222
2819    END ;   { RPT_INTERPRETATION }
```

MAP OF IDENTIFIERS FOR RPT_INTE

| IDENTIFIER NAME | KIND | SIZE (BYTES, BITS) | STACK DISPLACEMENT LEVEL(DISPL) (BYTE, BIT) | PICTURE (PACKED FIELDS ONLY) |
|---|---|---|---|---|
| DESC_LIMIT | VARIABLE | (2, 0) | #0028 | DIRECT |
| DESC_SIT | VARIABLE | (2, 0) | #002A | DIRECT |
| SIT_POINTER | VARIABLE | (2, 0) | #002C | DIRECT |
| DIFFER | VARIABLE | (2, 0) | #002E | DIRECT |
| END_OF_DATA | VARIABLE | (0, 1) | #0030 | DIRECT |
| LINK_PROB | VARIABLE | (8, 0) | #0032 | DIRECT |
| TEST_STRING | VARIABLE | (100, 0) | #003A | DIRECT |
| JUDGEMENT | VARIABLE | (20, 0) | #009E | DIRECT |

```
2820        (*,                                                                      *)
2821        { *********************************************************************}
2822
2823        PROCEDURE SCRN1_DISPLAY ;    { First screen format }
2824
2825          BEGIN
2826   2       DISPLAY(VDT_BLK,1,12,'P A R A D O C S    D E V E L O P M E N T',
2827   3                                                                    99);
2828   4       DISPLAY(VDT_BLK,1,56,'S Y S T E M',99);
2829   5       DISPLAY(VDT_BLK,2,22,'**** EXAMPLE INTERPRETATION ****',99);
2830   6       DISPLAY(VDT_BLK,3,04,'YOUR USER CODE: ',99);
2831   7       DISPLAY(VDT_BLK,5,06,'EXAMPLE NAME: ',99);
2832   8       DISPLAY(VDT_BLK,5,53,'ID NUMBER: ',99);
2833   9       DISPLAY(VDT_BLK,4,06,'PROBLEM CODE: ',99);
2834  10       DISPLAY(VDT_BLK,4,36,'(no entry when completed)',99);
2835  11       DISPLAY(VDT_BLK,6,62,'INTERMEDIATE',99);
2836  12       DISPLAY(VDT_BLK,7,1,'QUESTION      ',99);
2837  13       DISPLAY(VDT_BLK,7,16,'DESCRIPTION ',99);
2838  14       DISPLAY(VDT_BLK,7,40,'UNIT         ',99);
2839  15       DISPLAY(VDT_BLK,7,50,'RESPONSE    ',99);
2840  16       DISPLAY(VDT_BLK,7,63,'JUDGEMENT   ',99);
2841  17       DISPLAY(VDT_BLK,23,30,'CORRECT ?    [ ] ',99);
2842          END;  { SCRN1_DISPLAY }
2843        (*,                                                                      *)
2844        { *********************************************************************}
2845
2846        PROCEDURE SCRN2_DISPLAY ;    { Second screen format }
2847
2848        VAR     LINE  ,  COUNTER  :  INTEGER ;
2849
2850          BEGIN
2851   2       CLEARSCREEN(VDT_BLK);
2852   3       READ(PROBLEM,0,PROB);
2853   4       DISPLAY(VDT_BLK,1,12,'P A R A D O C S    D E V E L O P M E N T',
2854   5                                                                    99);
2855   6       DISPLAY(VDT_BLK,1,56,'S Y S T E M',99);
2856   7       DISPLAY(VDT_BLK,2,22,'**** INTERPRETATION DESCRIPTION ****',99);
2857   8       DISPLAY(VDT_BLK,4,06,'EXAMPLE NAME: ',99);
2858   9       DISPLAY(VDT_BLK,4,53,'ID NUMBER: ',99);
2859  10       DISPLAY(VDT_BLK,4,20,EXAMPLE_NAME,30);
2860  11       DISPLAY(VDT_BLK,4,64,ID_EXAMPLE,15);
2861  12       DISPLAY(VDT_BLK,6,06,'PROBLEM CODE: ',99);
2862  13       DISPLAY(VDT_BLK,6,25,PROBLEM_FILE,8);
2863  14       DISPLAY(VDT_BLK,6,43,PROB.DESCRIPTION,30);
2864  15
2865  16 { This allows the operator to display the report (questions and   }
2866  17 { interpretation) 15 lines at a time; when completed, the operator }
2867  18 { may re-display the entire report or go on to optionally print it }
2868  19
2869  20       REPEAT
2870  21
2871  22         LINE := 8 ;
2872  23         FOR COUNTER := 1 TO 15 DO
2873  24         BEGIN
2874  25           IF NOT EOF(REPORT) THEN
2875  26             READ(REPORT,BUFFER);
2876  27           IF EOF(REPORT) THEN
2877  28             FOR T := 1 TO 80 DO
```

```
2878 29              BUFFER[T] := ' ';
2879 30              DISPLAY(VDT_BLK,LINE,1,BUFFER,80);
2880 31              LINE := LINE + 1 ;
2881 32          END ;
2882 33
2883 34          IF EOF(REPORT) THEN
2884 35          BEGIN
2885 36             RESET(REPORT);
2886 37             CLEAR_LINE(24);
2887 38             DISPLAY(VDT_BLK,24,11,'DO YOU WISH TO DISPLAY THIS INTER',99);
2888 39             DISPLAY(VDT_BLK,24,44,'PRETATION AGAIN ?  [ ] ',99);
2889 40             ACPT_YES_NO(DUMY,24,64,YES);
2890 41          END
2891 42          ELSE
2892 43          BEGIN
2893 44             CLEAR_LINE(24);
2894 45             DISPLAY(VDT_BLK,24,27,'READY FOR MORE ?  [ ]',99);
2895 46             ACPT_YES_NO(DUMY,24,46,YES);
2896 47          END;
2897 48
2898 49      UNTIL NOT YES ;
2899 50
2900 51
2901     END;   { SCRN2_DISPLAY }

MAP OF IDENTIFIERS FOR   SCRN2_DI

IDENTIFIER NAME    KIND       SIZE          STACK                PICTURE
                                 (BYTES,BITS)  DISPLACEMENT         (PACKED FIELDS ONLY)
                                 LEVEL(DISPL)  (BYTE,BIT)

LINE               VARIABLE   (2,0)         #0028   DIRECT
   COUNTER            VARIABLE   (2,0)         #002A   DIRECT 2902
2903    (*-                                                                        *)
2904    BEGIN   { MAIN PROGRAM }
2905
2906  3 OVLY$(0);
2907  4
2908  5 INITSCREEN(VDT_BLK,0);
2909  6 CLEARSCREEN(VDT_BLK);
2910  7
2911  8 { Establish file names as synonyms set up in the program proc            }
2912  9
2913 10 PROB_NODE := 'PROBLEMS';
2914 11 SIT_NODE  := 'SITUATNS';
2915 12 DESC_NODE := 'DESCRIPT';
2916 13 COMP_NODE := 'COMPFILE';
2917 14 REPTNAME  := 'TEXTFILE';
2918 15 PRNTNAME  := 'PRNTFILE';
2919 16 INTRNAME  := 'INTRFILE';
2920 17 RESPNAME  := 'RESPFILE';
2921 18
2922 19 { Initialize file used for later update of logical importance for
2923 20   problem codes accessed during this program                             }
2924 21
2925 22 UPDTNAME  := 'UPDTFILE';
2926 23 SETNAME(UPDATE_FILE,UPDTNAME);
2927 24 REWRITE(UPDATE_FILE);
2928 25
2929 26 LINK_MODE := FALSE ;
2930 27 LINK_NUMBER := 1 ;
2931 28 FOR Q := 1 TO 5 DO
2932 29    LINK_CODES[Q] := '      ';
2933 30 U_PROB_NAME := 'UPRBFILE';
2934 31
2935 32 { Open the user/problem file                                              }
2936 33
2937 34 SETNAME(U_PROB_FILE,U_PROB_NAME);
2938 35 EXTEND(U_PROB_FILE);
2939 36 READ(U_PROB_FILE,0,USER_PROB);
2940 37 DECODE(USER_PROB.NEXT_RECORD,1,STAT,U_PROB_RECORDS);
2941 38 U_PROB_RECORDS := U_PROB_RECORDS - 1 ;
2942 39
```

```
2943  40 SCRN1_DISPLAY ;
2944  41 DONE := FALSE ;
2945  42 ERROR_STATUS := TRUE ;
2946  43
2947  44 OVLY$(1);
2948  45 ID_USER ;
2949  46
2950  47 { The following rouine accepts a problem file name, checks to see if
2951  48   this user is entitled to use the program, checks to see if it still
2952  49   exists, and opens up the problem, situation and description files;
2953  50   if nothing is enterd, the program will terminate                    }
2954  51
2955  52 WHILE NOT DONE DO
2956  53 BEGIN
2957  54
2958  55   REPEAT
2959  56
2960  57 { If in "link-mode", automatically fill in the next linked problem
2961  58   name; if at the end of the link file, then close the file and
2962  59   go back into normal mode                                             }
2963  60
2964  61     IF LINK_MODE THEN
2965  62     BEGIN
2966  63       IF LINK_CODES[LINK_NUMBER] = '            ' THEN
2967  64       BEGIN
2968  65         FOR Q := 1 TO 5 DO
2969  66           LINK_CODES[Q] := '          ';
2970  67         LINK_MODE := FALSE ;
2971  68         DISPLAY(VDT_BLK,4,20,ORIGINAL_PROBLEM,8);
2972  69       END ELSE
2973  70       BEGIN
2974  71         PROBLEM_FILE := LINK_CODES[LINK_NUMBER] ;
2975  72         DISPLAY(VDT_BLK,4,20,PROBLEM_FILE,8);
2976  73         LINK_NUMBER := LINK_NUMBER + 1 ;
2977  74       END;
2978  75     END ;
2979  76
2980  77     IF NOT LINK_MODE THEN ACCEPT(VDT_BLK,4,20,PROBLEM_FILE,8,T);
2981  78     OPEN := TRUE ;
2982  79     VALID := FALSE ;
2983  80     IF PROBLEM_FILE = '          ' THEN DONE := TRUE ;
2984  81
2985  82     IF NOT DONE AND NOT LINK_MODE THEN FOR T := 0 TO U_PROB_RECORDS DO
2986  83     IF NOT VALID THEN
2987  84     BEGIN
2988  85       READ(U_PROB_FILE,T,USER_PROB);
2989  86       IF USER_PROB.USER_CODE = USER_CODE
2990  87         AND USER_PROB.PROBLEM_CODE = PROBLEM_FILE
2991  88         AND USER_PROB.STATUS_CODE <> 'D' THEN
2992  89         BEGIN
2993  90
2994  91 { If valid user/problem record found, update number times used         }
2995  92
2996  93           VALID := TRUE ;
2997  94           DECODE(USER_PROB.TIMES_USED,1,STAT,NUMBER);
2998  95           NUMBER := NUMBER + 1 ;
2999  96           ENCODE(USER_PROB.TIMES_USED,1,STAT,NUMBER:4);
3000  97           WRITE(U_PROB_FILE,T,USER_PROB);
3001  98         END ;
3002  99     END ;
3003 100
3004 101     IF LINK_MODE THEN VALID := TRUE ;
3005 102
3006 103     IF NOT VALID THEN OPEN := FALSE ;
3007 104
3008 105     IF NOT DONE AND VALID THEN
3009 106     BEGIN
3010 107
3011 108 { Open up problem file                                                  }
3012 109
3013 110       CLOSE(PROBLEM);
3014 111       SETMEMBER(PROBLEM,PROB_NODE,PROBLEM_FILE);
3015 112       IOTERM(PROBLEM,OVAL,FALSE);
3016 113       RESET(PROBLEM);
3017 114       IF STATUS(PROBLEM) <> 0 THEN
```

```
3018115            OPEN := FALSE ;
3019116
3020117       IF OPEN THEN
3021118       BEGIN
3022119          CLOSE(PROBLEM);
3023120          IOTERM(PROBLEM,OVAL,TRUE);
3024121          EXTEND(PROBLEM);
3025122
3026123 { Open up description file                                                      }
3027124
3028125          CLOSE(DESCRIPTION);
3029126          SETMEMBER(DESCRIPTION,DESC_NODE,PROBLEM_FILE);
3030127          EXTEND(DESCRIPTION);
3031128
3032129 { Open up situation file                                                         }
3033130
3034131          CLOSE(SITUATION);
3035132          SETMEMBER(SITUATION,SIT_NODE,PROBLEM_FILE);
3036133          EXTEND(SITUATION);
3037134        END ;
3038135     END ;
3039136
3040137   UNTIL DONE OR OPEN ;
3041138
3042139
3043140   IF NOT DONE THEN
3044141   BEGIN
3045142
3046143     OVLY$(2);
3047144
3048145     ENTER_RESPONSES ;
3049146
3050147     FULL_INTERPRETATION := FALSE ;
3051148     MAJOR_MATCH         := FALSE ;
3052149     DESCRIP_INT         := FALSE ;
3053150     IGNORANCE           := FALSE ;
3054151
3055152     OVLY$(3);
3056153
3057154     INTERPRET_EXAMPLE ;
3058155
3059156     OVLY$(4);
3060157
3061158     RPT_INTERPRETATION ;
3062159
3063160     WRITELN(REPORT,'   ');
3064161     WRITEEOF(REPORT);
3065162     RESET(REPORT);
3066163
3067164 { Skip the questions and display the interpretation                              }
3068165
3069166     COUNTER := NEXT_QUESTION - 1;
3070167     COUNTER := COUNTER * 2 ;
3071168     COUNTER := COUNTER + 9 ;
3072169     FOR T := 1 TO COUNTER DO
3073170        READ(REPORT,BUFFER);
3074171
3075172     SCRN2_DISPLAY ;
3076173
3077174     YES := FALSE ;
3078175
3079176 { Allow the mentor to change full interpretation description                     }
3080177
3081178     IF FULL_INTERPRETATION AND USER_PROB.STATUS_CODE = 'M' THEN
3082179     BEGIN
3083180        CLEAR_LINE(24);
3084181        DISPLAY(VDT_BLK,24,11,'DO YOU WISH TO CHANGE THE INTERPRETA',99);
3085182        DISPLAY(VDT_BLK,24,47,'TION DESCRIPTION ? [ ]',99);
3086183        ACPT_YES_NO(DUMY,24,67,YES);
3087184     END ;
3088185
3089186 { Accept description for new situation or change to existing full
3090187   interpretation and then print the results (teacher or mentor only) }
3091188
```

```
3092189      CLOSE(INTERPRET);
3093190      SETNAME(INTERPRET, INTRNAME);
3094191      REWRITE(INTERPRET);
3095192
3096193      SIT_ADDED := FALSE ;
3097194      IF USER_PROB.STATUS_CODE <> 'U' THEN
3098195      IF NOT FULL_INTERPRETATION OR YES THEN
3099196      BEGIN
3100197         IF NOT FULL_INTERPRETATION THEN SIT_ADDED := TRUE ;
3101198         OVLY$(5);
3102199         DESC_ACCEPT;
3103200      END ;
3104201
3105202      WRITELN(INTERPRET);
3106203      WRITEEOF(INTERPRET);
3107204      RESET(INTERPRET);
3108205
3109206 { This will allow the report to be printed if printer available   }
3110207
3111208      REPEAT
3112209
3113210         CLEAR_LINE(24);
3114211         DISPLAY(VDT_BLK,24,15,'DO YOU WISH TO PRINT THIS ',99);
3115212         DISPLAY(VDT_BLK,24,41,'INTERPRETATION ?    [ ]',99);
3116213         ACPT_YES_NO(DUMY,24,61,YES);
3117214         CLEAR_LINE(23);
3118215         IF YES THEN
3119216         BEGIN
3120217
3121218            CLOSE(PRINTER);
3122219            SETNAME(PRINTER,PRNTNAME);
3123220            IOTERM(PRINTER,OVAL,FALSE);
3124221            EXTEND(PRINTER);
3125222
3126223            OPEN := TRUE ;
3127224            IF STATUS(PRINTER) <> 0 THEN
3128225               OPEN := FALSE ;
3129226
3130227            IF NOT OPEN THEN
3131228               DISPLAY(VDT_BLK,23,20,'PRINTER NOT AVAILABLE AT THE MOMENT',
3132229                                                                        99);
3133230            IF OPEN THEN
3134231            BEGIN
3135232
3136233 { Print first part of report - questions and initial interpretation }
3137234
3138235               RESET(REPORT);
3139236               WHILE NOT EOF(REPORT) DO
3140237               BEGIN
3141238                  READ(REPORT,BUFFER);
3142239                  WRITELN(PRINTER,BUFFER);
3143240               END;
3144241
3145242 { Print added or chaanged interpretation, if any                   }
3146243
3147244               RESET(INTERPRET);
3148245               WHILE NOT EOF(INTERPRET) DO
3149246               BEGIN
3150247                  READ(INTERPRET,BUFFER);
3151248                  WRITELN(PRINTER,BUFFER);
3152249               END;
3153250
3154251               PAGE(PRINTER);
3155252               CLOSE(PRINTER);
3156253               YES := FALSE
3157254
3158255            END ;
3159256
3160257         END ;
3161258
3162259      UNTIL NOT YES ;
3163260
3164261      OVLY$(6);
3165262
3166263      RECALCULATE_PROBLEM ;
```

```
3167264
3168265 { Go back for another problem entry until spaces are entered        }
3169266
3170267    CLEARSCREEN(VDT_BLK);
3171268    SCRN1_DISPLAY;
3172269    DISPLAY(VDT_BLK,4,20,PROBLEM_FILE,8);
3173270    DISPLAY(VDT_BLK,3,14,'NAME ',99);
3174271    DISPLAY(VDT_BLK,3,20,USER_NAME,30);
3175272
3176273 END ;   { "IF NOT DONE THEN " }
3177274
3178275 END ;   { "WHILE NOT DONE DO" }
3179276
3180277 WRITEEOF(UPDATE_FILE);
3181278
3182    END.
```

MAP OF IDENTIFIERS FOR EXAMPLE_

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| PROB_RECORD | RECORD | (96,0) | | |
| PROBLEM_CODE | FIELD | (8,0) | (0,0) | UNPACKED |
| DESCRIPTION | FIELD | (30,0) | (8,0) | UNPACKED |
| NEXT_QUESTION | FIELD | (2,0) | (38,0) | UNPACKED |
| INT_QUESTIONS | FIELD | (2,0) | (40,0) | UNPACKED |
| TIMES_USED | FIELD | (2,0) | (42,0) | UNPACKED |
| TOPIC_CODE | FIELD | (8,0) | (44,0) | UNPACKED |
| DATE_ENTERED | FIELD | (8,0) | (52,0) | UNPACKED |
| DATE_LAST_USED | FIELD | (8,0) | (60,0) | UNPACKED |
| MENTOR_CODE | FIELD | (6,0) | (68,0) | UNPACKED |
| NUM_SITUATIONS | FIELD | (2,0) | (74,0) | UNPACKED |
| MINIMUM_LI | FIELD | (2,0) | (76,0) | UNPACKED |
| CALC_LI_FLAG | FIELD | (0,8) | (78,0) | UNPACKED |
| FLAG1_FUTURE | FIELD | (0,8) | (80,0) | UNPACKED |
| FLAG2_FUTURE | FIELD | (0,8) | (82,0) | UNPACKED |
| FLAG3_FUTURE | FIELD | (0,8) | (84,0) | UNPACKED |
| DATA_BASE | FIELD | (0,8) | (86,0) | UNPACKED |
| PRIMARY_CODE | FIELD | (8,0) | (88,0) | UNPACKED |
| NUM_QUESTION | FIELD | (2,0) | (0,0) | UNPACKED |
| DESC_QUESTION | FIELD | (30,0) | (2,0) | UNPACKED |
| YES_NO | FIELD | (0,8) | (32,0) | UNPACKED |
| CALCULATE | FIELD | (0,8) | (34,0) | UNPACKED |
| INT_QUEST | FIELD | (0,8) | (36,0) | UNPACKED |
| REFERENCE | FIELD | (0,8) | (38,0) | UNPACKED |
| UNIT_DESC | FIELD | (10,0) | (40,0) | UNPACKED |
| BOUNDARIES | FIELD | (2,0) | (50,0) | UNPACKED |
| LOWER_1_LIMIT | FIELD | (4,0) | (52,0) | UNPACKED |
| UPPER_1_LIMIT | FIELD | (4,0) | (56,0) | UNPACKED |
| LOWER_2_LIMIT | FIELD | (4,0) | (60,0) | UNPACKED |
| UPPER_2_LIMIT | FIELD | (4,0) | (64,0) | UNPACKED |
| REQUIRED | FIELD | (0,8) | (68,0) | UNPACKED |
| LGCL_IMPT | FIELD | (2,0) | (70,0) | UNPACKED |
| EXPT_IMPT | FIELD | (2,0) | (72,0) | UNPACKED |
| LGCL_INTR | FIELD | (2,0) | (74,0) | UNPACKED |
| EXPT_INTR | FIELD | (2,0) | (76,0) | UNPACKED |
| LGCL_CMPL | FIELD | (2,0) | (78,0) | UNPACKED |
| EXPT_CMPL | FIELD | (2,0) | (80,0) | UNPACKED |
| STATUS_CODE | FIELD | (0,8) | (82,0) | UNPACKED |
| SORT_FLAG | FIELD | (0,8) | (84,0) | UNPACKED |
| FLAG6_FUTURE | FIELD | (0,8) | (86,0) | UNPACKED |
| FLAG7_FUTURE | FIELD | (0,8) | (88,0) | UNPACKED |
| FLAG8_FUTURE | FIELD | (0,8) | (90,0) | UNPACKED |
| SIT_RECORD | RECORD | (250,0) | | |
| SIT_NUM | FIELD | (4,0) | (0,0) | UNPACKED |
| SIT_DESCRIPTION | FIELD | (80,0) | (4,0) | UNPACKED |
| NEXT_SIT | FIELD | (2,0) | (84,0) | UNPACKED |
| PROB1_LINK | FIELD | (8,0) | (86,0) | UNPACKED |
| PROB2_LINK | FIELD | (8,0) | (94,0) | UNPACKED |
| PROB3_LINK | FIELD | (8,0) | (102,0) | UNPACKED |

| | | | | |
|---|---|---|---|---|
| PROB4_LINK | FIELD | (8,0) | (110,0) | UNPACKED |
| AUTHOR_CODE | FIELD | (6,0) | (118,0) | UNPACKED |
| DATE_ENTERED | FIELD | (8,0) | (124,0) | UNPACKED |
| DATE_LAST_USED | | | | |
| | FIELD | (8,0) | (132,0) | UNPACKED |
| NUM_ENCOUNTERS | | | | |
| | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |
| TEXT_LINE | FIELD | (80,0) | (8,0) | UNPACKED |
| USER_PROBLEM_RECORD | | | | |
| | RECORD | (24,0) | | |
| NEXT_RECORD | FIELD | (4,0) | (0,0) | UNPACKED |
| USER_CODE | FIELD | (6,0) | (4,0) | UNPACKED |
| PROBLEM_CODE | FIELD | (8,0) | (10,0) | UNPACKED |
| STATUS_CODE | FIELD | (0,8) | (18,0) | UNPACKED |
| TIMES_USED | FIELD | (4,0) | (20,0) | UNPACKED |
| RESP_RECORD | RECORD | (10,0) | | |
| RESPONSE | FIELD | (10,0) | (0,0) | UNPACKED |
| COMP_RECORD | RECORD | (82,0) | | |
| RCD_NUMBER | FIELD | (2,0) | (0,0) | UNPACKED |
| FORMULA | FIELD | (80,0) | (2,0) | UNPACKED |
| LNKPROB | VARIABLE | (32,0) | #0080 | DIRECT |
| WORKRESP | VARIABLE | (32,0) | #00A0 | DIRECT |
| COMPFILE | VARIABLE | (32,0) | #00C0 | DIRECT |
| RESP | VARIABLE | (10,0) | #00E0 | DIRECT |
| COMP | VARIABLE | (82,0) | #00EA | DIRECT |
| PROBLEM | VARIABLE | (32,0) | #013C | DIRECT |
| SITUATION | VARIABLE | (32,0) | #015C | DIRECT |
| DESCRIPTION | VARIABLE | (32,0) | #017C | DIRECT |
| U_PROB_FILE | VARIABLE | (32,0) | #019C | DIRECT |
| USER_PROB | VARIABLE | (24,0) | #01BC | DIRECT |
| PROB | VARIABLE | (96,0) | #01D4 | DIRECT |
| SIT | VARIABLE | (250,0) | #0234 | DIRECT |
| DESC | VARIABLE | (88,0) | #032E | DIRECT |
| USER_CODE | VARIABLE | (6,0) | #0386 | DIRECT |
| USER_NAME | VARIABLE | (30,0) | #038C | DIRECT |
| U_PROB_RECORDS | VARIABLE | (2,0) | #03AA | DIRECT |
| U_PROB_NAME | VARIABLE | (8,0) | #03AC | DIRECT |
| PROBLEM_FILE | VARIABLE | (8,0) | #03B4 | DIRECT |
| DESC_NODE | VARIABLE | (8,0) | #03BC | DIRECT |
| PROB_NODE | VARIABLE | (8,0) | #03C4 | DIRECT |
| SIT_NODE | VARIABLE | (8,0) | #03CC | DIRECT |
| VDT_BLK | VARIABLE | (32,0) | #03D4 | DIRECT |
| REPORT | VARIABLE | (32,0) | #03F4 | DIRECT |
| PRINTER | VARIABLE | (32,0) | #0414 | DIRECT |
| INTERPRET | VARIABLE | (32,0) | #0434 | DIRECT |
| MATCHES | VARIABLE | (32,0) | #0454 | DIRECT |
| APPROX | VARIABLE | (32,0) | #0474 | DIRECT |
| UPDATE_FILE | VARIABLE | (32,0) | #0494 | DIRECT |
| MATCHNME | VARIABLE | (8,0) | #04B4 | DIRECT |
| APPRXNME | VARIABLE | (8,0) | #04BC | DIRECT |
| LINK_CODES | VARIABLE | (40,0) | #04C4 | DIRECT |
| BUFFER | VARIABLE | (80,0) | #04EC | DIRECT |
| REPTNAME | VARIABLE | (8,0) | #053C | DIRECT |
| PRNTNAME | VARIABLE | (8,0) | #0544 | DIRECT |
| INTRNAME | VARIABLE | (8,0) | #054C | DIRECT |
| RESPNAME | VARIABLE | (8,0) | #0554 | DIRECT |
| DATEPRNT | VARIABLE | (8,0) | #055C | DIRECT |
| COMP_NODE | VARIABLE | (8,0) | #0564 | DIRECT |
| UPDTNAME | VARIABLE | (8,0) | #056C | DIRECT |
| ORIGINAL_PROBLEM | | | | |
| | VARIABLE | (8,0) | #0574 | DIRECT |
| RESPONSE | VARIABLE | (10,0) | #057C | DIRECT |
| NUMBER | VARIABLE | (2,0) | #0586 | DIRECT |
| INT_JUDGEMENT_CODE | | | | |
| | VARIABLE | (2,0) | #0588 | DIRECT |
| T | VARIABLE | (0,8) | #058A | DIRECT |
| DUMY | VARIABLE | (0,8) | #058C | DIRECT |

| | | | | |
|---|---|---|---|---|
| COUNTER | VARIABLE | (2,0) | #058E | DIRECT |
| NEXT_QUESTION | VARIABLE | (2,0) | #0590 | DIRECT |
| RECORD_COUNTER | VARIABLE | (2,0) | #0592 | DIRECT |
| LINE_COUNTER | VARIABLE | (2,0) | #0594 | DIRECT |
| UPPER | VARIABLE | (4,0) | #0596 | DIRECT |
| LOWER | VARIABLE | (4,0) | #059A | DIRECT |
| VALID | VARIABLE | (0,1) | #059E | DIRECT |
| OPEN | VARIABLE | (0,1) | #05A0 | DIRECT |
| YES | VARIABLE | (0,1) | #05A2 | DIRECT |
| MAJOR | VARIABLE | (0,1) | #05A4 | DIRECT |
| OVAL | VARIABLE | (0,1) | #05A6 | DIRECT |
| ERROR_STATUS | VARIABLE | (0,1) | #05A8 | DIRECT |
| R_ALL_SPACES | VARIABLE | (0,1) | #05AA | DIRECT |
| DONE | VARIABLE | (0,1) | #05AC | DIRECT |
| COMPARE_REQUIRED | | | | |
| | VARIABLE | (0,1) | #05AE | DIRECT |
| ALL_SET | VARIABLE | (0,1) | #05B0 | DIRECT |
| ENTRY_REQUIRED | VARIABLE | (0,1) | #05B2 | DIRECT |
| YES_NO_RESP | VARIABLE | (0,1) | #05B4 | DIRECT |
| MINIMUM | VARIABLE | (2,0) | #05B6 | DIRECT |
| LGCL_IMPT | VARIABLE | (2,0) | #05B8 | DIRECT |
| SIT_NUMBER | VARIABLE | (2,0) | #05BA | DIRECT |
| BEGINNING_NUMBER | | | | |
| | VARIABLE | (2,0) | #05BC | DIRECT |
| STAT | VARIABLE | (2,0) | #05BE | DIRECT |
| DUMMY | VARIABLE | (2,0) | #05C0 | DIRECT |
| TOTAL_QUESTIONS | VARIABLE | (2,0) | #05C2 | DIRECT |
| LINK_NUMBER | VARIABLE | (2,0) | #05C4 | DIRECT |
| SIT_ADDED | VARIABLE | (0,1) | #05C6 | DIRECT |
| LINK_MODE | VARIABLE | (0,1) | #05C8 | DIRECT |
| FULL_INTERPRETATION | | | | |
| | VARIABLE | (0,1) | #05CA | DIRECT |
| MAJOR_MATCH | VARIABLE | (0,1) | #05CC | DIRECT |
| DESCRIP_INT | VARIABLE | (0,1) | #05CE | DIRECT |
| IGNORANCE | VARIABLE | (0,1) | #05D0 | DIRECT |
| EXAMPLE_NAME | VARIABLE | (30,0) | #05D2 | DIRECT |
| ID_EXAMPLE | VARIABLE | (16,0) | #05F0 | DIRECT |
| INC_STRING | VARIABLE | (100,0) | #0600 | DIRECT |
| MINC_STRING | VARIABLE | (100,0) | #0664 | DIRECT |
| LINC_STRING | VARIABLE | (100,0) | #06C8 | DIRECT |
| QUEST_MASK | VARIABLE | (50,0) | #072C | DIRECT |

MAXIMUM NUMBER OF IDENTIFIERS USED = 304

NUMBER OF ERRORS = 1
LAST ERROR AT LINE 2093 ON PAGE 44

164 W ROUTINE OR COMMON NAME HAS THE SAME FIRST 6 CHARACTERS AS ONE PREVIOUSLY DECLARED; LINK EDITOR CAN'T DISTINGUISH THEM
DXPSCL 1.7.1 81.254  OPTIMIZATION SUMMARY

"ACPT_YES" -- 5500 HEAP BYTES REQUIRED TO OPTIMIZE AT LEVEL 1

"CLEAR_LI" -- 5000 HEAP BYTES REQUIRED TO OPTIMIZE AT LEVEL 1

"SCRN3_DI" -- 6400 HEAP BYTES REQUIRED TO OPTIMIZE AT LEVEL 1

1 REDUNDANT COMMON SUBEXPRESSIONS ELIMINATED IN "DESC_ACC"
"DESC_ACC" -- 17100 HEAP BYTES REQUIRED TO OPTIMIZE AT LEVEL 1

"LINE_ITE" -- 5900 HEAP BYTES REQUIRED TO OPTIMIZE AT LEVEL 1

4 REDUNDANT COMMON SUBEXPRESSIONS ELIMINATED IN "CALCULAT"
"CALCULAT" -- 14400 HEAP BYTES REQUIRED TO OPTIMIZE AT LEVEL 1

"RESPONSE" -- 11100 HEAP BYTES REQUIRED TO OPTIMIZE AT LEVEL 1

"SCRN_DIS" -- 6000 HEAP BYTES REQUIRED TO OPTIMIZE AT LEVEL 1

"ENTER_RE" -- 12500 HEAP BYTES REQUIRED TO OPTIMIZE AT LEVEL 1

"ID_USER " -- 6800 HEAP BYTES REQUIRED TO OPTIMIZE AT LEVEL 1

3 REDUNDANT COMMON SUBEXPRESSIONS ELIMINATED IN "INTERPRE"
"INTERPRE" -- 9600 HEAP BYTES REQUIRED TO OPTIMIZE AT LEVEL 1

"NUMERIC_" -- 5200 HEAP BYTES REQUIRED TO OPTIMIZE AT LEVEL 1

"ANALYZE " -- 8200 HEAP BYTES REQUIRED TO OPTIMIZE AT LEVEL 1

2 REDUNDANT COMMON SUBEXPRESSIONS ELIMINATED IN "COMP_TAB"
"COMP_TAB" -- 8100 HEAP BYTES REQUIRED TO OPTIMIZE AT LEVEL 1

"INITIALI" -- 6200 HEAP BYTES REQUIRED TO OPTIMIZE AT LEVEL 1

"SIT_TABL" -- 6100 HEAP BYTES REQUIRED TO OPTIMIZE AT LEVEL 1

"RECALCUL" -- 9500 HEAP BYTES REQUIRED TO OPTIMIZE AT LEVEL 1

"DIFFEREN" -- 6500 HEAP BYTES REQUIRED TO OPTIMIZE AT LEVEL 1

3 REDUNDANT COMMON SUBEXPRESSIONS ELIMINATED IN "RPT_INTE"
"RPT_INTE" -- 14500 HEAP BYTES REQUIRED TO OPTIMIZE AT LEVEL 1

"SCRN1_DI" -- 5900 HEAP BYTES REQUIRED TO OPTIMIZE AT LEVEL 1

"SCRN2_DI" -- 7100 HEAP BYTES REQUIRED TO OPTIMIZE AT LEVEL 1

"EXAMPLE_" -- 15000 HEAP BYTES REQUIRED TO OPTIMIZE AT LEVEL 1

```
                 INSTRUCTIONS =     56
    ACPT_YES     LITERALS =         98    CODE =     214    DATA =      112
                 INSTRUCTIONS =     22
    CLEAR_LI     LITERALS =         24    CODE =      94    DATA =      124

INSTRUCTIONS =    210
    SCRN3_DI     LITERALS =        456    CODE =    1100    DATA =       44

INSTRUCTIONS =   1160
    DESC_ACC     LITERALS =        550    CODE =    4952    DATA =     1236

INSTRUCTIONS =    100
    LINE_ITE     LITERALS =         38    CODE =     432    DATA =       52

INSTRUCTIONS =    754
    CALCULAT     LITERALS =        160    CODE =    3136    DATA =      260

INSTRUCTIONS =    652
    RESPONSE     LITERALS =        510    CODE =    2686    DATA =       60

INSTRUCTIONS =    149
    SCRN_DIS     LITERALS =        356    CODE =     790    DATA =       40

INSTRUCTIONS =    591
    ENTER_RE     LITERALS =        412    CODE =    2584    DATA =      524

INSTRUCTIONS =    198
    ID_USER      LITERALS =        148    CODE =     876    DATA =      290

INSTRUCTIONS =    278
    INTERPRE     LITERALS =         54    CODE =    1026    DATA =       66

INSTRUCTIONS =     29
    NUMERIC_     LITERALS =         50    CODE =     100    DATA =       86

INSTRUCTIONS =    245
    ANALYZE      LITERALS =         34    CODE =     998    DATA =       46

INSTRUCTIONS =    161
    COMP_TAB     LITERALS =         18    CODE =     590    DATA =       50

INSTRUCTIONS =     81
    INITIALI     LITERALS =         24    CODE =     308    DATA =       46

INSTRUCTIONS =     74
    SIT_TABL     LITERALS =         26    CODE =     276    DATA =       46

INSTRUCTIONS =    437
    RECALCUL     LITERALS =        232    CODE =    1888    DATA =      458
```

```
                    INSTRUCTIONS =    159
                    DIFFEREN  LITERALS =      394   CODE =      644  DATA =       40

INSTRUCTIONS =    814
                    RPT_INTE  LITERALS =      674   CODE =     3314  DATA =      184
                    SOURCE  = .PARADOCS.SRC.ANALYSIS
                    OBJECT  = .PARADOCS.OBJ.ANALYSIS
                    LISTING = .PARADOCS.LST.ANALYSIS
                    MESSAGE = .PARADOCS.L
                    MEM1 = 6,4
                    MEM2 = 13,4
                    MEM3 = 10,4
                    PRINT WIDTH = 80
                    NUMBER OF LINES/PAGE = 60
                    OPTIONS = (* NO OPTIONS SPECIFIED *)
                    SUPPRESS PREPROCESSOR LINES = YES

LINE NUMBER                 COPY FILE PATHNAME
                           34    .PARADOCS.SRC.LAYOUT
                           44    .PARADOCS.SRC.VAR
                           70    .PARADOCS.SRC.IO
                    INSTRUCTIONS =    139
                    SCRN1_DI  LITERALS =      352   CODE =      738  DATA =       40

INSTRUCTIONS =    211
                    SCRN2_DI  LITERALS =      320   CODE =     1014  DATA =       48

INSTRUCTIONS =    877
                    EXAMPLE_  LITERALS =      526   CODE =     3578  DATA =     1892

ANALYSIS_OF_PROBLEM

1    {$WIDELIST,MAP,PAGE,CKINDEX}
     2
     3    { ************************************************************
     4
     5      The following is a flowchart of the procedures used (excluding
     6      screen and other small misc. procedures):
     7
     8
     9                          ANALYSIS_OF_PROBLEM
    10                                   !
    11                                   !
    12        ----------------------------------------------------------
    13        !            !              !                      !
    14        !            !              !                      !
    15        !            !              !                      !
    16      SET_UP    SCRN1_DISPLAY  TABLE_GENERATION      SCRN2_DISPLAY
    17                                   !
    18                                   !
    19        ----------------------------------------------------------
    20        !           !           !            !           !           !
    21        !           !           !            !           !           !
    22     INITIALIZE  SIT_TABLE  EXP_TABLE   COMP_TABLE   ANALYZE    COMPUTE
    23
    24
    25      ************************************************************}
    26
    27
    28
    29    PROGRAM ANALYSIS_OF_PROBLEM ;
    30
    31    TYPE
    32
    33       SET_OF_CHAR = SET OF CHAR ;
    34       VDT_CONTROL = ARRAY[1..16] OF INTEGER;
    35
    36    { The following is the record layout for the relative PROBLEM file }
    37
    38    PROB_RECORD=RECORD          CASE BOOLEAN OF
    39                         TRUE:
    40
    41    { This is the "0" record layout for this file }
    42
    43      (PROBLEM_CODE    : PACKED ARRAY[1..8] OF CHAR;
```

```
44        DESCRIPTION     : PACKED ARRAY[1..30] OF CHAR;
45        NEXT_QUESTION   : INTEGER ;
46        INT_QUESTIONS   : INTEGER ;
47        TIMES_USED      : INTEGER ;
48        TOPIC_CODE      : PACKED ARRAY[1..8] OF CHAR;
49        DATE_ENTERED    : PACKED ARRAY[1..8] OF CHAR;
50        DATE_LAST_USED  : PACKED ARRAY[1..8] OF CHAR;
51        MENTOR_CODE     : PACKED ARRAY[1..6] OF CHAR;
52        NUM_SITUATIONS  : INTEGER ;
53        MINIMUM_LI      : INTEGER ;
54        CALC_LI_FLAG    : CHAR ;
55        FLAG1_FUTURE    : CHAR ;
56        FLAG2_FUTURE    : CHAR ;
57        FLAG3_FUTURE    : CHAR ;
58        DATA_BASE       : CHAR ;
59        PRIMARY_CODE    : PACKED ARRAY[1..8] OF CHAR);
60
61
62                FALSE:
63
64  { This is the "1" through "Nth" record layout   }
65
66       (NUM_QUESTION    : PACKED ARRAY[1..2] OF CHAR;
67        DESC_QUESTION   : PACKED ARRAY[1..30] OF CHAR;
68        YES_NO          : CHAR;
69        CALCULATE       : CHAR;
70        INT_QUEST       : CHAR;
71        REFERENCE       : CHAR;
72        UNIT_DESC       : PACKED ARRAY[1..10] OF CHAR;
73        BOUNDARIES      : INTEGER ;
74        LOWER_1_LIMIT   : REAL ;
75        UPPER_1_LIMIT   : REAL ;
76        LOWER_2_LIMIT   : REAL ;
77        UPPER_2_LIMIT   : REAL ;
78        REQUIRED        : CHAR;
79        LGCL_IMPT       : INTEGER ;
80        EXPT_IMPT       : INTEGER ;
81        LGCL_INTR       : INTEGER ;
82        EXPT_INTR       : INTEGER ;
83        LGCL_CMPL       : INTEGER ;
84        EXPT_CMPL       : INTEGER ;
85        STATUS_CODE     : CHAR;
86        SORT_FLAG       : CHAR;
87        FLAG6_FUTURE    : CHAR;
88        FLAG7_FUTURE    : CHAR;
89        FLAG8_FUTURE    : CHAR)
90   END;
91
92
93   { The following is the record layout for the relative SITUATION file }
94
95   SIT_RECORD=RECORD
96
97        SIT_NUM         : PACKED ARRAY[1..4] OF CHAR;
98        SIT_DESCRIPTION : PACKED ARRAY[1..80] OF CHAR;
99        NEXT_SIT        : INTEGER ;
100       PROB1_LINK      : PACKED ARRAY[1..8] OF CHAR;
101       PROB2_LINK      : PACKED ARRAY[1..8] OF CHAR;
102       PROB3_LINK      : PACKED ARRAY[1..8] OF CHAR;
103       PROB4_LINK      : PACKED ARRAY[1..8] OF CHAR;
104       AUTHOR_CODE     : PACKED ARRAY[1..6] OF CHAR;
105       DATE_ENTERED    : PACKED ARRAY[1..8] OF CHAR;
106       DATE_LAST_USED  : PACKED ARRAY[1..8] OF CHAR;
107       NUM_ENCOUNTERS  : INTEGER ;
108       SINC_STRING     : PACKED ARRAY[1..50] OF INTEGER ;   { ######### }
109       FLAG1_FUTURE    : CHAR ;
110       FLAG2_FUTURE    : CHAR ;
111       FLAG3_FUTURE    : CHAR ;
112       FLAG4_FUTURE    : CHAR ;
113   END;
114
115
116   { The following is the record layout for the relative DESCRIPTION file }
117
118   DESC_RECORD=RECORD
```

```
119
120        NEXT_RECORD      : PACKED ARRAY[1..4] OF CHAR;
121        SIT_NUMBER       : PACKED ARRAY[1..4] OF CHAR;
122        TEXT_LINE        : PACKED ARRAY[1..80] OF CHAR;
123      END;
124
125
126    { The following is the record layout for the sequential USERFILE file;
127      later it will be changed to a KIF file, but initially it will be
128      established as a RELATIVE file                                        }
129
130    USER_RECORD=RECORD
131
132        NEXT_RECORD      : PACKED ARRAY[1..4] OF CHAR ;
133        USER_CODE        : PACKED ARRAY[1..6] OF CHAR ;
134        USER_NAME        : PACKED ARRAY[1..30] OF CHAR ;
135        USER_TITLE       : PACKED ARRAY[1..30] OF CHAR ;
136        ADDRESS1         : PACKED ARRAY[1..30] OF CHAR ;
137        ADDRESS2         : PACKED ARRAY[1..30] OF CHAR ;
138        ADDRESS3         : PACKED ARRAY[1..30] OF CHAR ;
139        PHONE            : PACKED ARRAY[1..12] OF CHAR ;
140        MAX_STATUS       : CHAR ;
141        PRINTER          : CHAR ;
142        NUM_PROBLEMS     : PACKED ARRAY[1..4] OF CHAR ;
143        DATE_ENTERED     : PACKED ARRAY[1..8] OF CHAR ;
144        DATE_LAST_USED   : PACKED ARRAY[1..8] OF CHAR ;
145        TOTAL_TIMES      : PACKED ARRAY[1..6] OF CHAR ;
146    END ;
147
148
149    { The following is the record layout for the sequential USERPROB file;
150      late it will be changed to a KIF file, but initially it will be
151      established as a RELATIVE file                                        }
152
153    USER_PROBLEM_RECORD=RECORD
154
155        NEXT_RECORD      : PACKED ARRAY[1..4] OF CHAR ;
156        USER_CODE        : PACKED ARRAY[1..6] OF CHAR ;
157        PROBLEM_CODE     : PACKED ARRAY[1..8] OF CHAR ;
158        STATUS_CODE      : CHAR ;
159        TIMES_USED       : PACKED ARRAY[1..4] OF CHAR ;
160    END ;
161
162
163    {$PAGE}
164    { ****************************************************************}
165                                       /
166    { PROGRAM }
167
168    VAR
169
170    PROBLEM     : RANDOM FILE OF PROB_RECORD;
171    SITUATION   : RANDOM FILE OF SIT_RECORD;
172    DESCRIPTION : RANDOM FILE OF DESC_RECORD;
173    USERFILE    : RANDOM FILE OF USER_RECORD;
174    U_PROB_FILE : RANDOM FILE OF USER_PROBLEM_RECORD;
175
176    USER        : USER_RECORD;
177    USER_PROB   : USER_PROBLEM_RECORD;
178    PROB        : PROB_RECORD;
179    SIT         : SIT_RECORD;
180    DESC        : DESC_RECORD;
181
182    USER_CODE   :   PACKED ARRAY[1..6] OF CHAR ;
183    USER_RECORDS , U_PROB_RECORDS : INTEGER ;
184    USER_NAME , U_PROB_NAME :   PACKED ARRAY[1..8] OF CHAR ;
185    PROBLEM_FILE : PACKED ARRAY[1..8] OF CHAR;
186    DESC_NODE , PROB_NODE , SIT_NODE   : PACKED ARRAY[1..8] OF CHAR;
187    VDT_BLK : VDT_CONTROL;
188
189    REPORT      : TEXT ;
190    PRINTER     : TEXT ;
191    PRNTNAME    : PACKED ARRAY[1..8] OF CHAR ;
192    BUFFER      : PACKED ARRAY[1..80] OF CHAR ;
193    REPTNAME    : PACKED ARRAY[1..8] OF CHAR ;
194    DATEPRNT    : PACKED ARRAY[1..8] OF CHAR ;
```

```
195              ,
196       T , DUMY : CHAR;
197       COUNTER , NEXT_QUESTION , RECORD_COUNTER , LINE_COUNTER  : INTEGER ;
198       DONE , OPEN  , YES  ,   MAJOR  ,   OVAL  ,  ERROR_STATUS  :  BOOLEAN ;
199       COMPARE_REQUIRED , ALL_SET , ENTRY_REQUIRED , YES_NO_RESP : BOOLEAN ;
200       EXPT_IMPT , LGCL_IMPT , SIT_NUMBER , BEGINNING_NUMBER , STAT : INTEGER;
201       DUMMY : PACKED ARRAY[1..2] OF CHAR;
202       MAJ_MIN : PACKED ARRAY[1..3] OF CHAR;
203       COMMENT : PACKED ARRAY[1..32] OF CHAR;
204       LARGEST_LGCL_IMPT , SMALLEST_LGCL_IMPT : INTEGER ;
205       MINIMUM , DELETED_QUESTIONS , REF_QUESTIONS : INTEGER ;
206       QUEST_MASK   : PACKED ARRAY[1..50] OF CHAR;       { ########## }
207       VALID : BOOLEAN ;
208
209
210       {$PAGE}
211       { ****************************************************************}
212
213
214       {       The following are screen and file handling procedures         }
215
216       PROCEDURE SETFILLER(VAR VDT$ : VDT_CONTROL ;
217         FILL_CHAR: CHAR);
218            EXTERNAL;
219
220       PROCEDURE CLEARSCREEN(VAR VDT$ : VDT_CONTROL);   EXTERNAL;
221
222       PROCEDURE INITSCREEN(VAR VDT$: VDT_CONTROL; LUNO: INTEGER); EXTERNAL;
223
224       PROCEDURE DISPLAY(VAR VDT$: VDT_CONTROL; LINE: INTEGER;
225          COLUMN : INTEGER; BUFFER: PACKED ARRAY[1..?] OF CHAR;
226          LENGTH : INTEGER); EXTERNAL;
227
228       PROCEDURE ACCEPT(VAR VDT$: VDT_CONTROL; LINE,COLUMN: INTEGER;
229          VAR BUFFER: PACKED ARRAY[1..?] OF CHAR; LENGTH: INTEGER;
230          VAR TERM_CHAR: CHAR); EXTERNAL;
231
232
233       { ***************************************************************** }
234
235
236
237       PROCEDURE SET_UP;
238       BEGIN
239           { SET SCREEN ID }
240   3       INITSCREEN(VDT_BLK,0);
241   4       CLEARSCREEN(VDT_BLK);
242   5       { END SCREEN SET UP }
243   6
244   7       PROB_NODE := 'PROBLEMS';
245   8       SIT_NODE  := 'SITUATNS';
246   9       DESC_NODE := 'DESCRIPT';
247  10       REPTNAME  := 'TEXTFILE';
248  11       PRNTNAME  := 'PRNTFILE';
249  12       DONE := FALSE;
250  13
251       END; {SET_UP }
252
253       { ****************************************************************}
254       { The following procedure clears a line on the display            }
255
256       PROCEDURE CLEAR_LINE (LINE_NUMBER : INTEGER);
257
258       VAR    LINE_DATA    :    PACKED ARRAY[1..80] OF CHAR ;
259                      N    :    CHAR ;
260
261       BEGIN
262
263   3     FOR N := 1 TO 80 DO
264   4        LINE_DATA[N] := ' ';
265   5     DISPLAY(VDT_BLK,LINE_NUMBER,1,LINE_DATA,80);
266   6
267       END ;  { CLEAR_LINE }
```

MAP OF IDENTIFIERS FOR CLEAR_LI

| IDENTIFIER NAME | KIND | SIZE (BYTES,BITS) LEVEL(DISPL) | STACK DISPLACEMENT (BYTE,BIT) | | PICTURE (PACKED FIELDS ONLY) |
|---|---|---|---|---|---|
| LINE_NUMBER | PARAMETER | (2,0) | #0028 | DIRECT | |
| LINE_DATA | VARIABLE | (80,0) | #002A | DIRECT | |
| N | VARIABLE | (0,8) | #007A | DIRECT | |

```
268
269   { ****************************************************************}
270   {            The following checks for a proper numeric entry      }
271
272   PROCEDURE CHECK_NUMERIC ( VAR FIELD : PACKED ARRAY[1..?] OF CHAR ;
273                             NUM_OF_POS : INTEGER ;
274                             VAR STATUS_FLAG : BOOLEAN );
275
276        VAR   CHAR_SET : SET_OF_CHAR ;
277              N        : INTEGER ;
278
279     BEGIN
280  2     STATUS_FLAG := FALSE ;
281  3     CHAR_SET := [' ','0','1','2','3','4','5','6','7','8','9','.',',',',',
282  4                   '-','+'];
283  5     FOR N := 1 TO NUM_OF_POS DO
284  6     BEGIN
285  7       DUMY := FIELD[N];
286  8       IF NOT ( DUMY IN CHAR_SET )
287  9           THEN STATUS_FLAG := TRUE ;
288 10     END;
289     END ;  { CHECK_NUMERIC }
```

MAP OF IDENTIFIERS FOR CHECK_NU

| IDENTIFIER NAME | KIND | SIZE (BYTES,BITS) LEVEL(DISPL) | STACK DISPLACEMENT (BYTE,BIT) | | PICTURE (PACKED FIELDS ONLY) |
|---|---|---|---|---|---|
| FIELD | PARAMETER | 2(002A) | #002C | INDIRECT | |
| NUM_OF_POS | PARAMETER | (2,0) | #002E | DIRECT | |
| STATUS_FLAG | PARAMETER | (0,1) | #0030 | INDIRECT | |
| CHAR_SET | VARIABLE | (32,0) | #0032 | DIRECT | |
| N | VARIABLE | (2,0) | #0052 | DIRECT | |

```
290
291   { ****************************************************************}
292   {            The following checks for correct "Y/N" response      }
293
294   PROCEDURE ACPT_YES_NO ( VAR YES_NO : CHAR;
295                           X , Y : INTEGER ;       { y/n also allowed }
296                           VAR STATUS_FLAG : BOOLEAN );
297
298        VAR   YES_NO_SET , YES_SET : SET_OF_CHAR;
299
300     BEGIN
301  2     STATUS_FLAG := FALSE ;
302  3     YES_NO_SET := ['Y','y','N','n'] ;
303  4     YES_SET := ['Y','y'] ;
304  5
305  6     REPEAT
306  7       ACCEPT(VDT_BLK,X,Y,DUMMY,1,T);
307  8       DECODE(DUMMY,1,STAT,YES_NO);
308  9     UNTIL ( YES_NO IN YES_NO_SET ) ;
309 10     IF ( YES_NO IN YES_SET ) THEN
310 11         STATUS_FLAG := TRUE;
311 12     IF YES_NO = 'y' THEN
312 13         YES_NO := 'Y';
313 14     IF YES_NO = 'n' THEN
314 15         YES_NO := 'N';
315     END;   { ACPT_YES_NO }
```

MAP OF IDENTIFIERS FOR ACPT_YES

| IDENTIFIER NAME | KIND | SIZE (BYTES, BITS) LEVEL(DISPL) | STACK DISPLACEMENT (BYTE, BIT) | PICTURE (PACKED FIELDS ONLY) |
|---|---|---|---|---|
| YES_NO | PARAMETER | (0, 8) | #0028 | INDIRECT |
| X | PARAMETER | (2, 0) | #002A | DIRECT |
| Y | PARAMETER | (2, 0) | #002C | DIRECT |
| STATUS_FLAG | PARAMETER | (0, 1) | #002E | INDIRECT |
| YES_NO_SET | VARIABLE | (32, 0) | #0030 | DIRECT |
| YES_SET | VARIABLE | (32, 0) | #0050 | DIRECT |

```
316
317
318      {*****************************************************************
319        The following is the routine which generates the experience and
320        computation tables.  These are then used to calcualte the logical
321        and experiential importance values                                }
322
323      PROCEDURE TABLE_GENERATION ;
324
325      TYPE      SITUATIONS         =   RECORD  { Situations / Questions }
326                  NEXT             : @SITUATIONS ;
327                  NUM_ENCOUNTERS   : INTEGER ;
328                  SINC_STRING      : PACKED ARRAY[1..50] OF INTEGER ;
329                END ;                        { ########### }
330
331                SIT_PTR            = @SITUATIONS ;
332
333                TEST_TABLE         =   RECORD  { Situations / Questions }
334                  NEXT             : @TEST_TABLE ;
335                  SINC_STRING      : PACKED ARRAY[1..50] OF INTEGER ;
336                END ;                        { ########### }
337
338                TEST_PTR           = @TEST_TABLE ;
339
340                COMPUTATION_TABLE  =   RECORD  { Situations / Questions }
341                  NEXT             : @COMPUTATION_TABLE ;
342                  VALUES           : PACKED ARRAY[1..50] OF INTEGER ;
343                END ;                        { ########### }
344
345                COMP_PTR           = @COMPUTATION_TABLE ;
346
347                SET_OF_INTEGER     =   SET OF CHAR ;
348
349      VAR       SIT_ROW , SIT_TEMP , SIT_BEG , SIT_GET    :   SIT_PTR ;
350                COMP_ROW , COMP_TEMP , COMP_BEG , COMP_GET :   COMP_PTR ;
351                TEST_ROW , TEST_TEMP , TEST_BEG , TEST_GET :   TEST_PTR ;
352                                             { ########### }
353                EXPERIENCE_TABLE   : PACKED ARRAY[1..50, 1..14] OF INTEGER ;
354                                             { Questions / Judgement Values }
355
356                TEST_STRING        : PACKED ARRAY[1..50] OF INTEGER ;
357                TOTAL_DUPLICATES   : PACKED ARRAY[1..50] OF INTEGER ;
358                NUMBER_LOST        : PACKED ARRAY[1..50] OF INTEGER ;
359                                             { ########### }
360                TOTAL_ENCOUNTERS   : INTEGER ;
361                LOST               : INTEGER ;
362                NUMBER             : INTEGER ;
363                TOTAL_QUESTIONS    : INTEGER ;
364                TOTAL_SITUATIONS   : INTEGER ;
365                NON_ZERO_LGCL_IMPT : INTEGER ;
366                COUNTER            : INTEGER ;
367                LIMIT              : INTEGER ;
368                TEST_NUMBER        : INTEGER ;
369                SIT_LIMIT          : INTEGER ;
370                SIT_POINTER        : INTEGER ;
371                REALIZED           : INTEGER ;
372                DIFFERENCE         : REAL ;
373                INT_SET            : SET_OF_INTEGER ;
374                MATCH              : BOOLEAN ;
375                OUT_OF_RANGE       : BOOLEAN ;
376                LOWER_ALL_SPACES   : BOOLEAN ;
377                UPPER_ALL_SPACES   : BOOLEAN ;
378                LIMITS_ALL_SPACES  : BOOLEAN ;
379
```

```
380      PROCEDURE INITIALIZE ;
381
382      { Initialize experience table at zeros and computation table at the
383        value of the row number; also initialize the total duplicates and
384        number lost table                                                    }
385
386      BEGIN  { INITIALIZE }
387
388   3    FOR T := 1 TO 14 DO
389   4      FOR N := 1 TO 50 DO                              { ########## }
390   5        EXPERIENCE_TABLE[N,T] := 0 ;
391   6
392   7    FOR T := 1 TO 50 DO                                { ########## }
393   8    BEGIN
394   9       TOTAL_DUPLICATES[T] := 0 ;
395  10       NUMBER_LOST[T]      := 0 ;
396  11    END ;
397  12
398  13  { Store totals from Problem record                                    }
399  14
400  15    READ(PROBLEM,0,PROB);
401  16    TOTAL_QUESTIONS := PROB.NEXT_QUESTION ;
402  17    TOTAL_QUESTIONS := TOTAL_QUESTIONS - 1 ;
403  18    TOTAL_SITUATIONS := PROB.NUM_SITUATIONS ;
404  19
405  20  { Establish QUEST_MASK with a "D" for deleted, "R" for reference
406  21    questions, and "I" for integer questions; load "factor" into
407  22    Experience Table (i.e., the maximum number of responses for question
408  23    is stored in column 14 of the table)                                 }
409  24
410  25    DELETED_QUESTIONS := 0 ;
411  26    REF_QUESTIONS := 0 ;
412  27    FOR T := 1 TO TOTAL_QUESTIONS DO
413  28    BEGIN
414  29       READ(PROBLEM,T,PROB) ;
415  30       QUEST_MASK[T] := PROB.STATUS_CODE ;
416  31       IF QUEST_MASK[T] = 'R' THEN QUEST_MASK[T] := 'A' ;
417  32       IF QUEST_MASK[T] = 'D' THEN
418  33          DELETED_QUESTIONS := DELETED_QUESTIONS + 1
419  34       ELSE BEGIN
420  35          IF PROB.REFERENCE = 'Y' THEN
421  36          BEGIN
422  37             REF_QUESTIONS := REF_QUESTIONS + 1 ;
423  38             QUEST_MASK[T] := 'R' ;
424  39          END ;
425  40          IF PROB.INT_QUEST = 'Y' THEN QUEST_MASK[T] := 'I' ;
426  41       END ;
427  42
428  43       IF PROB.YES_NO = 'Y' THEN
429  44       BEGIN
430  45          IF PROB.REQUIRED = 'Y' THEN NUMBER := 2
431  46             ELSE NUMBER := 3 ;
432  47       END ELSE
433  48       BEGIN
434  49          NUMBER := 0 ;
435  50          IF PROB.INT_QUEST = 'Y' THEN
436  51          BEGIN
437  52             DIFFERENCE := PROB.UPPER_1_LIMIT - PROB.LOWER_1_LIMIT ;
438  53             NUMBER := TRUNC(DIFFERENCE);
439  54             NUMBER := ABS(NUMBER) + 1 ;
440  55             IF PROB.REQUIRED <> 'Y' THEN NUMBER := NUMBER + 1 ;
441  56          END ELSE BEGIN
442  57             CASE PROB.BOUNDARIES OF
443  58                0 : NUMBER := 1 ;
444  59                1 : NUMBER := 3 ;
445  60                2 : NUMBER := 5 ;
446  61                OTHERWISE NUMBER := 0 ; END ;
447  62             IF PROB.REQUIRED <> 'Y' THEN NUMBER := NUMBER + 1 ;
448  63          END ;
449  64       END ;
450  65       EXPERIENCE_TABLE[T,14] := NUMBER ;
451  66
452  67    END ;
453  68
```

```
454 69       COMP_TEMP := NIL ;
455 70       NUMBER := TOTAL_SITUATIONS ;
456 71       FOR T := TOTAL_SITUATIONS DOWNTO 1 DO
457 72       BEGIN
458 73          NEW(COMP_ROW);
459 74          COMP_ROW@.NEXT := COMP_TEMP ;
460 75          FOR N := 1 TO 50 DO                         { ######### }
461 76             COMP_ROW@.VALUES[N] := NUMBER ;
462 77          NUMBER := NUMBER - 1 ;
463 78          COMP_TEMP := COMP_ROW ;
464 79       END ;
465 80       COMP_BEG := COMP_ROW ;
466 81
467      END ;   { INITIALIZE }

468
469      PROCEDURE SIT_TABLE ;
470
471      { Read in all situations entered to-date and store each as modified
472        for deleted questions; also store number of encounters in table   }
473
474      BEGIN  { SIT_TABLE }
475  2     SIT_POINTER := 1 ;
476  3
477  4
478  5     SIT_TEMP := NIL ;
479  6     TEST_TEMP := NIL ;
480  7     TOTAL_ENCOUNTERS := 0 ;
481  8     SIT_LIMIT := TOTAL_SITUATIONS - 1 ;
482  9     FOR T := SIT_LIMIT DOWNTO 0 DO
483 10     BEGIN
484 11        READ(SITUATION,T,SIT);
485 12        FOR N := 1 TO TOTAL_QUESTIONS DO
486 13           IF QUEST_MASK[N] = 'D' OR QUEST_MASK[N] = 'R' THEN
487 14              SIT.SINC_STRING[N] := 13 ;
488 15
489 16        NEW(SIT_ROW);
490 17        NEW(TEST_ROW);
491 18        SIT_ROW@.NEXT := SIT_TEMP ;
492 19        TEST_ROW@.NEXT := TEST_TEMP ;
493 20        SIT_ROW@.NUM_ENCOUNTERS := SIT.NUM_ENCOUNTERS ;
494 21        SIT_ROW@.SINC_STRING    := SIT.SINC_STRING ;
495 22        TEST_ROW@.SINC_STRING   := SIT.SINC_STRING ;
496 23        SIT_TEMP := SIT_ROW ;
497 24        TEST_TEMP := TEST_ROW ;
498 25
499 26        TOTAL_ENCOUNTERS := TOTAL_ENCOUNTERS + SIT.NUM_ENCOUNTERS ;
500 27     END ;
501 28     SIT_BEG := SIT_ROW ;
502 29     TEST_BEG := TEST_ROW ;
503 30
504      END ;   { SIT_TABLE }

505
506      PROCEDURE EXP_TABLE ;
507
508      { Calculate Experience Table                                         }
509
510      BEGIN  { EXP_TABLE }
511  2     NUMBER := 1 ;
512  3     FOR T := 1 TO 12 DO
513  4     BEGIN
514  5        FOR N := 1 TO TOTAL_QUESTIONS DO
515  6        BEGIN
516  7           IF QUEST_MASK[N] <> 'I' THEN
517  8           BEGIN
518  9              COUNTER := EXPERIENCE_TABLE[N,T];
519 10              SIT_ROW := SIT_BEG ;
520 11              FOR M := 1 TO TOTAL_SITUATIONS DO
521 12              BEGIN
522 13                 IF NUMBER = SIT_ROW@.SINC_STRING[N] THEN
523 14                    COUNTER := COUNTER + 1 ;
524 15                 SIT_TEMP := SIT_ROW ;
525 16                 SIT_ROW  := SIT_TEMP@.NEXT ;
526 17              END;
```

```
527 18                EXPERIENCE_TABLE[N,T] := COUNTER ;
528 19             END ;
529 20
530 21  { For integer questions, count number of different responses           }
531 22
532 23             IF QUEST_MASK[N] = 'I' AND NUMBER = 1 THEN
533 24             BEGIN
534 25                INT_SET := [] ;
535 26                SIT_ROW := SIT_BEG ;
536 27                COUNTER := 0 ;
537 28                FOR M := 1 TO TOTAL_SITUATIONS DO
538 29                BEGIN
539 30                   IF NOT (CHR(SIT_ROW@.SINC_STRING[N]) IN INT_SET) THEN
540 31                   BEGIN
541 32                      COUNTER := COUNTER + 1 ;
542 33                      INT_SET := INT_SET + [CHR(SIT_ROW@.SINC_STRING[N])];
543 34                   END ;
544 35                   SIT_TEMP := SIT_ROW ;
545 36                   SIT_ROW  := SIT_TEMP@.NEXT ;
546 37                END;
547 38                EXPERIENCE_TABLE[N,13] := COUNTER ;
548 39             END ;
549 40          END;
550 41          NUMBER := NUMBER + 1 ;
551 42       END;
552 43
553 44       FOR N := 1 TO TOTAL_QUESTIONS DO
554 45       BEGIN
555 46          COUNTER := 0 ;
556 47          FOR M := 1 TO 12 DO
557 48             IF EXPERIENCE_TABLE[N,M] <> 0 THEN
558 49                COUNTER := COUNTER + 1 ;
559 50          IF QUEST_MASK[N] = 'I' THEN COUNTER := EXPERIENCE_TABLE[N,13];
560 51          IF EXPERIENCE_TABLE[N,14] < COUNTER THEN
561 52             EXPERIENCE_TABLE[N,14] := COUNTER ;
562 53          EXPERIENCE_TABLE[N,13] := COUNTER ;
563 54       END ;
564 55
565 56
566     END ;   { EXP_TABLE }

567
568     PROCEDURE COMP_TABLE ;
569
570     { Calculate computation table                                            }
571
572     BEGIN  { COMP_TABLE }
573
574     { T is the column (i.e., data point) which is set to zero                }
575
576  5     COUNTER := 1 ;
577  6     FOR T := 1 TO TOTAL_QUESTIONS DO
578  7     BEGIN
579  8
580  9  { TEST_TABLE is the modified SITUATIONS table                            }
581 10
582 11        SIT_ROW  := SIT_BEG ;
583 12        TEST_ROW := TEST_BEG ;
584 13        FOR N := 1 TO TOTAL_SITUATIONS DO
585 14        BEGIN
586 15           TEST_ROW@.SINC_STRING := SIT_ROW@.SINC_STRING ;
587 16           TEST_ROW@.SINC_STRING[T] := 0 ;
588 17           TEST_TEMP := TEST_ROW ;
589 18           TEST_ROW  := TEST_TEMP@.NEXT ;
590 19           SIT_TEMP  := SIT_ROW ;
591 20           SIT_ROW   := SIT_TEMP@.NEXT ;
592 21        END ;
593 22
594 23  { Compare each situation (except the last) with all situations which
595 24    have a higher number than the one being tested (TEST_NUNBER). If
596 25    this TEST_STRING is equal to one of these higher numbered strings,
597 26    set the value of the COMPUTATION_TABLE for that data point (T) and
598 27    that higher numbered string (M) to the value of TEST_NUMBER. Only
599 28    do this, however, if the entry in the table for this test string
600 29    has itself not previously been changed.                                }
```

```
601  30
602  31        TEST_ROW := TEST_BEG ;
603  32        COMP_ROW := COMP_BEG ;
604  33        SIT_LIMIT := TOTAL_SITUATIONS - 1 ;
605  34        TEST_NUMBER := 1 ;
606  35        FOR N := 1 TO SIT_LIMIT DO
607  36        BEGIN
608  37           TEST_STRING := TEST_ROW@.SINC_STRING ;
609  38           LIMIT := TEST_NUMBER + 1 ;
610  39           NUMBER := LIMIT ;
611  40           IF COMP_ROW@.VALUES[T] = TEST_NUMBER THEN
612  41           BEGIN
613  42              TEST_GET := TEST_ROW@.NEXT ;
614  43              COMP_GET := COMP_ROW@.NEXT ;
615  44              FOR M := LIMIT TO TOTAL_SITUATIONS DO
616  45              BEGIN
617  46                 MATCH := TRUE ;
618  47                 FOR Z := 1 TO TOTAL_QUESTIONS DO
619  48                    IF TEST_STRING[Z] <> TEST_GET@.SINC_STRING[Z] THEN
620  49                       MATCH := FALSE ;
621  50                 IF MATCH THEN
622  51                    COMP_GET@.VALUES[T] := TEST_NUMBER ;
623  52                 TEST_TEMP := TEST_GET ;
624  53                 COMP_TEMP := COMP_GET ;
625  54                 TEST_GET  := TEST_TEMP@.NEXT ;
626  55                 COMP_GET  := COMP_TEMP@.NEXT ;
627  56              END ;
628  57           END ;
629  58           TEST_NUMBER := TEST_NUMBER + 1 ;
630  59           TEST_TEMP := TEST_ROW ;
631  60           TEST_ROW := TEST_TEMP@.NEXT ;
632  61           COMP_TEMP := COMP_ROW ;
633  62           COMP_ROW := COMP_TEMP@.NEXT ;
634  63        END ;
635  64        COUNTER := COUNTER + 1 ;
636  65        LIMIT := LIMIT + 1 ;
637  66     END ;
638  67
639  68
640  69  { Count the number of duplicate numbers in each column and accumulate
641  70    the number of encounters "lost" for each duplicate found             }
642  71
643  72     FOR T := 1 TO TOTAL_QUESTIONS DO
644  73     BEGIN
645  74        TEST_NUMBER := 1 ;
646  75        IF QUEST_MASK[T] <> 'D' AND QUEST_MASK[T] <> 'R' THEN
647  76        FOR M := 1 TO TOTAL_SITUATIONS DO
648  77        BEGIN
649  78           COUNTER := 0 ;
650  79           LOST := 0 ;
651  80           COMP_ROW := COMP_BEG ;
652  81           SIT_ROW  := SIT_BEG ;
653  82           FOR N := 1 TO TOTAL_SITUATIONS DO
654  83           BEGIN
655  84              NUMBER := COMP_ROW@.VALUES[T] ;
656  85              IF TEST_NUMBER = NUMBER THEN
657  86              BEGIN
658  87                 LOST := LOST + SIT_ROW@.NUM_ENCOUNTERS ;
659  88                 COUNTER := COUNTER + 1 ;
660  89              END ;
661  90              COMP_TEMP := COMP_ROW ;
662  91              SIT_TEMP  := SIT_ROW ;
663  92              COMP_ROW  := COMP_TEMP@.NEXT ;
664  93              SIT_ROW   := SIT_TEMP@.NEXT ;
665  94           END ;
666  95
667  96  { If duplicates exist in this collumn (i.e., COUNTER is greater than
668  97    1), add to TOTAL_DUPLICATES and to NUMBER_LOST                      }
669  98
670  99           IF COUNTER > 1 THEN
671 100           BEGIN
672 101              NUMBER_LOST[T] := NUMBER_LOST[T] + LOST ;
673 102              TOTAL_DUPLICATES[T] := TOTAL_DUPLICATES[T] + COUNTER ;
674 103           END ;
```

```
675 104            TEST_NUMBER := TEST_NUMBER + 1 ;
676 105
677 106         END ;
678 107
679 108      END ;
680 109
681 110
682       END ;    { COMP_TABLE }

683
684
685      PROCEDURE ANALYZE ;
686
687      TYPE  SET_OF_VAL = SET OF 1..12 ;
688
689      VAR   LOWER_SET : SET_OF_VAL ;
690            UPPER_SET : SET_OF_VAL ;
691            LOWER_CMT : BOOLEAN ;
692            UPPER_CMT : BOOLEAN ;
693
694      BEGIN { ANALYZE }
695
696   3     WRITELN(REPORT,'                           D A T A    A N A L Y S I S');
697   4     WRITELN(REPORT);
698   5     WRITELN(REPORT,'                                                             ',
699   6                    'IMPORTANCE    COMPLETENESS   PERCENT');
700   7     WRITELN(REPORT,'QUEST    DESCRIPTION / COMMENT         REQ TYPE ',
701   8                    'LOGIC EXPER   LOGIC EXPER   REALIZED');
702   9     WRITELN(REPORT,'-----    -----------------------------------    ---  ---- ',
703  10                    '-----  -----   -----  -----   ---------');
704  11
705  12  { Calculate and store on disk values of LI and EI for each situation }
706  13
707  14     LARGEST_LGCL_IMPT  := 0 ;
708  15     SMALLEST_LGCL_IMPT := 99 ;
709  16     NON_ZERO_LGCL_IMPT := 0 ;
710  17     MINIMUM := 0 ;
711  18     LIMIT := 1 ;
712  19     FOR T := 1 TO TOTAL_QUESTIONS DO
713  20     BEGIN
714  21        READ(PROBLEM,T,PROB);
715  22        IF QUEST_MASK[T] <> 'D' AND QUEST_MASK[T] <> 'R' THEN
716  23        BEGIN
717  24           NUMBER := TOTAL_DUPLICATES[T] ;
718  25           MINIMUM := MINIMUM + NUMBER ;
719  26           NUMBER := NUMBER * 100 ;
720  27           LGCL_IMPT  := NUMBER DIV TOTAL_SITUATIONS ;
721  28           IF LGCL_IMPT > LARGEST_LGCL_IMPT THEN
722  29              LARGEST_LGCL_IMPT := LGCL_IMPT ;
723  30           IF LGCL_IMPT < SMALLEST_LGCL_IMPT THEN
724  31              SMALLEST_LGCL_IMPT := LGCL_IMPT ;
725  32           PROB.LGCL_IMPT := LGCL_IMPT ;
726  33           IF LGCL_IMPT > 0 THEN
727  34              NON_ZERO_LGCL_IMPT := NON_ZERO_LGCL_IMPT + 1 ;
728  35
729  36           NUMBER := NUMBER_LOST[T] ;
730  37           NUMBER := NUMBER * 100 ;
731  38           IF TOTAL_ENCOUNTERS <> 0 THEN
732  39              EXPT_IMPT  := NUMBER DIV TOTAL_ENCOUNTERS
733  40           ELSE EXPT_IMPT := 0 ;
734  41           PROB.EXPT_IMPT := EXPT_IMPT ;
735  42           WRITE(PROBLEM,T,PROB);
736  43        END ;
737  44        LIMIT := LIMIT + 1 ;
738  45     END ;
739  46
740  47     NUMBER := TOTAL_QUESTIONS - DELETED_QUESTIONS ;
741  48     MINIMUM := MINIMUM * 100 ;
742  49     MINIMUM := MINIMUM DIV ( NUMBER * TOTAL_SITUATIONS ) ;
743  50     NUMBER := LARGEST_LGCL_IMPT - SMALLEST_LGCL_IMPT ;
744  51     NUMBER := NUMBER * 100 ;
745  52     IF LARGEST_LGCL_IMPT = 0 THEN MINIMUM := 0
746  53        ELSE MINIMUM := MINIMUM * ( NUMBER DIV LARGEST_LGCL_IMPT ) ;
747  54     MINIMUM := MINIMUM DIV 100 ;
748  55
```

```
749 56     IF MINIMUM = 0 THEN MINIMUM := 25 ;
750 57
751 58  { Check to see if 40% or more of the questions have LI values
752 59    greater than the minimum value (the average of all LI values).
753 60    This will only be done, however, if the problem has NEVER had
754 61    calculated LIs over this 40% figure, in which case the CALC_LI_FLAG
755 62    will have been changed from "N" to "Y".                          }
756 63
757 64     READ(PROBLEM, O, PROB);
758 65     NUMBER := 0 ;
759 66     IF PROB.CALC_LI_FLAG <> 'Y' THEN
760 67     BEGIN
761 68       FOR T := 1 TO TOTAL_QUESTIONS DO
762 69       BEGIN
763 70         IF QUEST_MASK[T] <> 'D' THEN
764 71         BEGIN
765 72           READ(PROBLEM, T, PROB);
766 73           LGCL_IMPT := PROB.LGCL_IMPT ;
767 74           IF LGCL_IMPT >= MINIMUM THEN NUMBER := NUMBER + 1 ;
768 75         END ;
769 76       END ;
770 77
771 78  { If there is less than 40% major questions based on the above
772 79    calculation, then revert to REQUIRED? as the determining factor
773 80    for whether the data point is major or minor                     }
774 81
775 82       NUMBER  := NUMBER * 100 ;
776 83       NUMBER  := NUMBER DIV
777 84         ( TOTAL_QUESTIONS - DELETED_QUESTIONS - REF_QUESTIONS ) ;
778 85       IF NUMBER >= 40 THEN
779 86       BEGIN
780 87         READ(PROBLEM, O, PROB);
781 88         PROB.CALC_LI_FLAG := 'Y' ;
782 89         WRITE(PROBLEM, O, PROB);
783 90       END ;
784 91       IF NUMBER < 40 THEN
785 92       BEGIN
786 93         NON_ZERO_LGCL_IMPT := 0 ;
787 94         MINIMUM := 25 ;
788 95         FOR T := 1 TO TOTAL_QUESTIONS DO
789 96         BEGIN
790 97           READ(PROBLEM, T, PROB);
791 98           IF PROB.REQUIRED = 'Y'
792 99             AND QUEST_MASK[T] <> 'D'
793 100            AND QUEST_MASK[T] <> 'R' THEN
794 101          BEGIN
795 102            NON_ZERO_LGCL_IMPT := NON_ZERO_LGCL_IMPT + 1 ;
796 103            PROB.LGCL_IMPT := 50 ;
797 104          END ELSE
798 105            PROB.LGCL_IMPT := 0 ;
799 106          WRITE(PROBLEM, T, PROB);
800 107        END ;
801 108      END ;
802 109    END ;
803 110
804 111    READ(PROBLEM, O, PROB);
805 112    PROB.MINIMUM_LI := MINIMUM ;
806 113    WRITE(PROBLEM, O, PROB);
807 114
808 115 { Write report lines, one line for each question                    }
809 116
810 117    LIMIT := 1 ;
811 118    FOR T := 1 TO TOTAL_QUESTIONS DO
812 119    BEGIN
813 120      READ(PROBLEM, T, PROB);
814 121      LGCL_IMPT := PROB.LGCL_IMPT ;
815 122      EXPT_IMPT := PROB.EXPT_IMPT ;
816 123
817 124      COMMENT := '                                                ';
818 125      MAJ_MIN := 'MIN' ;
819 126      IF LGCL_IMPT >= MINIMUM THEN
820 127        MAJ_MIN := 'MAJ';
821 128
822 129 { In the situation file, look for any comment which can be generated;
823 130   a YES indicates the value of the intermediate judgement code
824 131   occurs in all situations where an entry has been made (not a "10") }
```

```
825 132
826 133        TEST_NUMBER := 1 ;
827 134        OUT_OF_RANGE := TRUE ;
828 135        LOWER_SET := [1,2,10] ;
829 136        UPPER_SET := [4,5,10] ;
830 137        LOWER_CMT := TRUE ;
831 138        UPPER_CMT := TRUE ;
832 139        FOR N := 1 TO 12 DO
833 140        BEGIN
834 141           YES := TRUE ;
835 142           SIT_ROW := SIT_BEG ;
836 143           FOR M := 1 TO TOTAL_SITUATIONS DO
837 144           BEGIN
838 145              IF NOT (SIT_ROW@.SINC_STRING[T] IN LOWER_SET) THEN
839 146                 LOWER_CMT := FALSE ;
840 147              IF NOT (SIT_ROW@.SINC_STRING[T] IN UPPER_SET) THEN
841 148                 UPPER_CMT := FALSE ;
842 149              IF SIT_ROW@.SINC_STRING[T] <> TEST_NUMBER
843 150                 AND SIT_ROW@.SINC_STRING[T] <> 10 THEN YES := FALSE ;
844 151              IF SIT_ROW@.SINC_STRING[T] = 7 AND PROB.BOUNDARIES = 1 THEN
845 152                 OUT_OF_RANGE := FALSE ;
846 153              IF SIT_ROW@.SINC_STRING[T] = 3 AND PROB.BOUNDARIES = 2 THEN
847 154                 OUT_OF_RANGE := FALSE ;
848 155
849 156              SIT_TEMP := SIT_ROW ;
850 157              SIT_ROW  := SIT_TEMP@.NEXT ;
851 158
852 159           END ;
853 160
854 161           IF YES THEN
855 162           BEGIN
856 163              CASE TEST_NUMBER OF
857 164                  1 : COMMENT := 'Always Below Both Ranges         ';
858 165                  2 : COMMENT := 'Always Below Primary Range       ';
859 166                  3 : COMMENT := 'Always Within Both Ranges        ';
860 167                  4 : COMMENT := 'Always Above Primary Range       ';
861 168                  5 : COMMENT := 'Always Above Both Ranges         ';
862 169                  6 : COMMENT := 'Always Below Range               ';
863 170                  7 : COMMENT := 'Always Within Range              ';
864 171                  8 : COMMENT := 'Always Above Range               ';
865 172                 11 : COMMENT := 'Never Present                    ';
866 173                 12 : COMMENT := 'Always Present                   ';
867 174              OTHERWISE END ;
868 175           END ;
869 176
870 177           TEST_NUMBER := TEST_NUMBER + 1 ;
871 178        END ;
872 179
873 180 { Check for all not entered, since above logic will not find it        }
874 181
875 182        YES := TRUE ;
876 183        SIT_ROW := SIT_BEG ;
877 184        FOR M := 1 TO TOTAL_SITUATIONS DO
878 185        BEGIN
879 186           IF SIT_ROW@.SINC_STRING[T] <> 10 THEN
880 187              YES := FALSE ;
881 188           SIT_TEMP := SIT_ROW ;
882 189           SIT_ROW  := SIT_TEMP@.NEXT ;
883 190        END ;
884 191        IF YES THEN
885 192           COMMENT := 'Never Entered                    ';
886 193
887 194 { If question is numeric and always has values of 1 or 2 and there is
888 195   not already a comment generated then comment becomes "Always Between
889 196   Both Lower Limits"                                                   }
890 197
891 198        IF PROB.YES_NO = 'N'
892 199           AND COMMENT = '                                 '
893 200           AND LOWER_CMT = TRUE THEN
894 201              COMMENT := 'Always Between Both Lower Limits';
895 202
896 203 { If question is numeric and always has values of 4 or 5 and there is
897 204   not already a comment generated then comment becomes "Always Between
898 205   Both Upper Limits"                                                   }
899 206
```

```
900207          IF PROB.YES_NO = 'N'
901208             AND COMMENT = '
902209               AND UPPER_CMT = TRUE THEN
903210                 COMMENT := 'Always Between Both Upper Limits';
904211
905212  { If question is numeric with one or two sets of limits, and never
906213    within range (value of 3 or 7) and not already something else, then
907214    comment becomes "always out of range"                             }
908215
909216          IF PROB.YES_NO = 'N'
910217             AND PROB.BOUNDARIES > 0
911218               AND COMMENT = '                                '
912219                 AND OUT_OF_RANGE THEN
913220                   COMMENT := 'Always Out of Range              ';
914221
915222          IF QUEST_MASK[T] = 'I' THEN
916223              COMMENT := 'An Integer Value Question       ';
917224
918225          IF QUEST_MASK[T] = 'R' THEN
919226              COMMENT := 'For Reference Only              ';
920227
921228          IF QUEST_MASK[T] = 'D' THEN
922229              COMMENT := 'Deleted Question                ';
923230
924231  { Calculate realized value                                          }
925232
926233          REALIZED := EXPERIENCE_TABLE[T,13] * 100 ;
927234          IF EXPERIENCE_TABLE[T,14] = 0 THEN REALIZED := 0 ELSE
928235             REALIZED := REALIZED DIV EXPERIENCE_TABLE[T,14];
929236
930237          WRITE(REPORT,' ',LIMIT:2,' ',PROB.DESC_QUESTION,' ');
931238          IF QUEST_MASK[T] = 'D' OR QUEST_MASK[T] = 'R' THEN
932239          BEGIN
933240             WRITELN(REPORT,'          ',COMMENT);
934241             WRITELN(REPORT);
935242          END ELSE
936243          BEGIN
937244             WRITELN(REPORT,PROB.REQUIRED,'   ',MAJ_MIN,'    ',LGCL_IMPT:2,
938245                     '  ',EXPT_IMPT:3,'               ',REALIZED:3);
939246             WRITELN(REPORT,'                         ',COMMENT);
940247          END ;
941248
942249          LIMIT := LIMIT + 1 ;
943250
944251     END ;
945252     WRITELN(REPORT);
946253     WRITELN(REPORT);
947254
948255  { Free up pointer variable memory                                    }
949256
950257     FOR I := 1 TO TOTAL_SITUATIONS DO
951258     BEGIN
952259        SIT_TEMP := SIT_BEG@.NEXT ;
953260        COMP_TEMP := COMP_BEG@.NEXT ;
954261        TEST_TEMP := TEST_BEG@.NEXT ;
955262        DISPOSE(SIT_BEG);
956263        DISPOSE(COMP_BEG);
957264        DISPOSE(TEST_BEG);
958265        SIT_BEG := SIT_TEMP ;
959266        COMP_BEG := COMP_TEMP ;
960267        TEST_BEG := TEST_TEMP ;
961268     END ;
962269
963     END ;  { ANALYZE }
```

MAP OF IDENTIFIERS FOR  ANALYZE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| LOWER_SET | VARIABLE | (0,13) | #0028 | DIRECT |
| UPPER_SET | VARIABLE | (0,13) | #002A | DIRECT |
| LOWER_CMT | VARIABLE | (0,1) | #002C | DIRECT |
| UPPER_CMT | VARIABLE | (0,1) | #002E | DIRECT |

```
964
965      PROCEDURE COMPUTE ;
966
967      VAR    POSSIBLE_SITUATIONS : LONGINT ;
968             DISCRIMINANT : LONGINT ;
969             INDEPENDENCE : LONGINT ;
970
971      BEGIN  { COMPUTE }
972
973      { The following computes the number of possible situations and number
974        of situations required for the program to be "independent"           }
975
976   6    POSSIBLE_SITUATIONS := 1 ;
977   7    INDEPENDENCE := 1 ;
978   8    FOR T := 1 TO TOTAL_QUESTIONS DO
979   9    BEGIN
980  10       READ(PROBLEM,T,PROB);
981  11       IF QUEST_MASK[T] <> 'D' AND QUEST_MASK[T] <> 'R' THEN
982  12       BEGIN
983  13          POSSIBLE_SITUATIONS := POSSIBLE_SITUATIONS *
984  14              EXPERIENCE_TABLE[T,14];
985  15          LGCL_IMPT := PROB.LGCL_IMPT ;
986  16          IF LGCL_IMPT >= MINIMUM THEN
987  17             INDEPENDENCE := INDEPENDENCE * EXPERIENCE_TABLE[T,14];
988  18       END ;
989  19    END ;
990  20    INDEPENDENCE := INDEPENDENCE * 85 ;
991  21    INDEPENDENCE := INDEPENDENCE DIV 100 ;
992  22
993  23    WRITELN(REPORT,'The maximum number of unique situations for this',
994  24              ' problem is ',POSSIBLE_SITUATIONS:10,'.');
995  25    WRITELN(REPORT);
996  26
997  27 { Calcualte the experience ratio for this problem                        }
998  28
999  29    NUMBER := TOTAL_SITUATIONS * 1000 ;
1000 30    NUMBER := NUMBER DIV POSSIBLE_SITUATIONS ;
1001 31    WRITELN(REPORT,'The experience ratio in dealing with this ',
1002 32                             'problem is', NUMBER:4,'.');
1003 33    WRITELN(REPORT);
1004 34
1005 35 { If there are some data points with non-zero LI values calculate
1006 36   the number of situations to discrimination                             }
1007 37
1008 38    DISCRIMINANT := 0 ;
1009 39    IF NON_ZERO_LGCL_IMPT <> 0 THEN
1010 40    BEGIN
1011 41       NUMBER := TOTAL_QUESTIONS - DELETED_QUESTIONS ;
1012 42       NUMBER := NUMBER - REF_QUESTIONS ;
1013 43       DISCRIMINANT := NUMBER * TOTAL_SITUATIONS ;
1014 44       DISCRIMINANT := DISCRIMINANT DIV NON_ZERO_LGCL_IMPT ;
1015 45    END ;
1016 46
1017 47 { Report how many situations have been observed and if CALC_LI flag
1018 48   has been set, also report status of discrimination and independence}
1019 49
1020 50    READ(PROBLEM,0,PROB);
1021 51    WRITE(REPORT,'The program so far has learned',TOTAL_SITUATIONS:5,
1022 52                 ' unique situations');
1023 53    IF PROB.CALC_LI_FLAG <> 'Y' THEN WRITELN(REPORT,'. ') ELSE
1024 54    BEGIN
1025 55       IF TOTAL_SITUATIONS < INDEPENDENCE AND
1026 56          TOTAL_SITUATIONS < DISCRIMINANT THEN WRITELN(REPORT,'.');
1027 57       IF TOTAL_SITUATIONS >= INDEPENDENCE THEN
1028 58          WRITELN(REPORT,' and is "independent".') ELSE
1029 59          IF TOTAL_SITUATIONS >= DISCRIMINANT THEN
1030 60             WRITELN(REPORT,' and is "discriminant".');
1031 61       WRITELN(REPORT);
1032 62       IF TOTAL_SITUATIONS < DISCRIMINANT THEN
1033 63       BEGIN
1034 64          WRITELN(REPORT,'The program will be "discriminant" when it ',
1035 65                 'has learned',DISCRIMINANT:7,' unique situations.');
1036 66          WRITELN(REPORT);
1037 67       END ;
```

```
1038 68      IF TOTAL_SITUATIONS < INDEPENDENCE THEN
1039 69         WRITELN(REPORT,'The program will run independently when it ',
1040 70                 'has learned',INDEPENDENCE:7,' unique situations.');
1041 71      END ;
1042 72
1043 73      WRITELN(REPORT);
1044 74
1045      END ;   { COMPUTE }
```

MAP OF IDENTIFIERS FOR   COMPUTE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| POSSIBLE_SITUATIONS | VARIABLE | (4,0) | #0028 | DIRECT |
| DISCRIMINANT | VARIABLE | (4,0) | #002C | DIRECT |
| INDEPENDENCE | VARIABLE | (4,0) | #0030 | DIRECT |

```
1046
1047
1048   BEGIN  { TABLE_GENERATION - MAIN PROGRAM }
1049
1050 3   INITIALIZE ;
1051 4   SIT_TABLE ;
1052 5   EXP_TABLE ;
1053 6   COMP_TABLE ;
1054 7   ANALYZE ;
1055 8   COMPUTE ;
1056 9
1057   END ;   { TABLE_GENERATION }
```

MAP OF IDENTIFIERS FOR   TABLE_GE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| SITUATIONS | RECORD | (104,0) | | |
|   NEXT | FIELD | (2,0) | (0,0) | UNPACKED |
|   NUM_ENCOUNTERS | FIELD | (2,0) | (2,0) | UNPACKED |
|   SINC_STRING | FIELD | (100,0) | (4,0) | UNPACKED |
| TEST_TABLE | RECORD | (102,0) | | |
|   NEXT | FIELD | (2,0) | (0,0) | UNPACKED |
|   SINC_STRING | FIELD | (100,0) | (2,0) | UNPACKED |
| COMPUTATION_TABLE | RECORD | (102,0) | | |
|   NEXT | FIELD | (2,0) | (0,0) | UNPACKED |
|   VALUES | FIELD | (100,0) | (2,0) | UNPACKED |
| SIT_ROW | VARIABLE | (2,0) | #0028 | DIRECT |
| SIT_TEMP | VARIABLE | (2,0) | #002A | DIRECT |
| SIT_BEG | VARIABLE | (2,0) | #002C | DIRECT |
| SIT_GET | VARIABLE | (2,0) | #002E | DIRECT |
| COMP_ROW | VARIABLE | (2,0) | #0030 | DIRECT |
| COMP_TEMP | VARIABLE | (2,0) | #0032 | DIRECT |
| COMP_BEG | VARIABLE | (2,0) | #0034 | DIRECT |
| COMP_GET | VARIABLE | (2,0) | #0036 | DIRECT |
| TEST_ROW | VARIABLE | (2,0) | #0038 | DIRECT |
| TEST_TEMP | VARIABLE | (2,0) | #003A | DIRECT |
| TEST_BEG | VARIABLE | (2,0) | #003C | DIRECT |
| TEST_GET | VARIABLE | (2,0) | #003E | DIRECT |
| EXPERIENCE_TABLE | VARIABLE | (1400,0) | #0040 | DIRECT |
| TEST_STRING | VARIABLE | (100,0) | #05B8 | DIRECT |
| TOTAL_DUPLICATES | VARIABLE | (100,0) | #061C | DIRECT |
| NUMBER_LOST | VARIABLE | (100,0) | #0680 | DIRECT |
| TOTAL_ENCOUNTERS | VARIABLE | (2,0) | #06E4 | DIRECT |
| LOST | VARIABLE | (2,0) | #06E6 | DIRECT |
| NUMBER | VARIABLE | (2,0) | #06E8 | DIRECT |
| TOTAL_QUESTIONS | VARIABLE | (2,0) | #06EA | DIRECT |
| TOTAL_SITUATIONS | VARIABLE | (2,0) | #06EC | DIRECT |

```
NON_ZERO_LGCL_IMPT
                    VARIABLE    (2,0)       #06EE       DIRECT
COUNTER             VARIABLE    (2,0)       #06F0       DIRECT
LIMIT               VARIABLE    (2,0)       #06F2       DIRECT
TEST_NUMBER         VARIABLE    (2,0)       #06F4       DIRECT
SIT_LIMIT           VARIABLE    (2,0)       #06F6       DIRECT
SIT_POINTER         VARIABLE    (2,0)       #06F8       DIRECT
REALIZED            VARIABLE    (2,0)       #06FA       DIRECT
DIFFERENCE          VARIABLE    (4,0)       #06FC       DIRECT
INT_SET             VARIABLE    (32,0)      #0700       DIRECT
MATCH               VARIABLE    (0,1)       #0720       DIRECT
OUT_OF_RANGE        VARIABLE    (0,1)       #0722       DIRECT
LOWER_ALL_SPACES
                    VARIABLE    (0,1)       #0724       DIRECT
UPPER_ALL_SPACES
                    VARIABLE    (0,1)       #0726       DIRECT
LIMITS_ALL_SPACES
                    VARIABLE    (0,1)       #0728       DIRECT 1058
1059     { ****************************************************************}
1060
1061     PROCEDURE SCRN1_DISPLAY ;     { First screen format }
1062
1063     BEGIN
1064  2    DISPLAY(VDT_BLK,1,12,'P A R A D O C S    D E V E L O P M E N T',
1065  3                                                                99);
1066  4    DISPLAY(VDT_BLK,1,56,'S Y S T E M',99);
1067  5    DISPLAY(VDT_BLK,2,24,'**** PROBLEM ANALYSIS ****',99);
1068  6    DISPLAY(VDT_BLK,3,06,'       YOUR USER CODE:  ',99);
1069  7    DISPLAY(VDT_BLK,4,06,'        PROBLEM CODE:  ',99);
1070  8    DISPLAY(VDT_BLK,4,45,'(no entry when completed)',99);
1071     END;  { SCRN1_DISPLAY }
1072
1073     { ****************************************************************}
1074
1075     PROCEDURE SCRN2_DISPLAY ;     { Second screen format }
1076
1077     VAR    LINE , COUNTER  :  INTEGER ;
1078
1079     BEGIN
1080
1081     { This allows the operator to display the report (values and      }
1082     { initially tables) 15 lines at a time; when completed, the operator }
1083     { may re-display the entire report or go on to optionally print it }
1084
1085  7    REPEAT
1086  8
1087  9       LINE := 6 ;
1088 10       FOR COUNTER := 1 TO 18 DO
1089 11       BEGIN
1090 12          IF NOT EOF(REPORT) THEN
1091 13             READ(REPORT,BUFFER);
1092 14          IF EOF(REPORT) THEN
1093 15             FOR T := 1 TO 80 DO
1094 16                BUFFER[T] := ' ';
1095 17          DISPLAY(VDT_BLK,LINE,1,BUFFER,80);
1096 18          LINE := LINE + 1 ;
1097 19       END ;
1098 20
1099 21       IF EOF(REPORT) THEN
1100 22       BEGIN
1101 23          RESET(REPORT);
1102 24          READ(REPORT,BUFFER);
1103 25          CLEAR_LINE(24);
1104 26          DISPLAY(VDT_BLK,24,11,'DO YOU WISH TO DISPLAY THIS ANALY',99);
1105 27          DISPLAY(VDT_BLK,24,44,'SIS REPORT AGAIN ? [ ] ',99);
1106 28          ACPT_YES_NO(DUMY,24,64,YES);
1107 29       END
1108 30       ELSE
1109 31       BEGIN
1110 32          CLEAR_LINE(24);
1111 33          DISPLAY(VDT_BLK,24,27,'READY FOR MORE ?    [ ]',99);
1112 34          ACPT_YES_NO(DUMY,24,46,YES);
1113 35       END;
```

```
1114 36
1115 37     UNTIL NOT YES ;
1116 38
1117 39
1118     END;  { SCRN2_DISPLAY }

MAP OF IDENTIFIERS FOR   SCRN2_DI

IDENTIFIER NAME     KIND       SIZE            STACK                      PICTURE
                                  (BYTES,BITS)  DISPLACEMENT          (PACKED FIELDS ONLY)
                                  LEVEL(DISPL)   (BYTE,BIT)

LINE               VARIABLE    (2,0)          #0028      DIRECT
   COUNTER            VARIABLE    (2,0)          #002A      DIRECT 1119
1120    { ****************************************************************}
1121    {$PAGE}
1122    { ****************************************************************}
1123
1124    BEGIN   { MAIN PROGRAM }
1125
1126  3 SET_UP ;
1127  4
1128  5 USER_NAME := 'USERFILE';
1129  6 U_PROB_NAME := 'UPRBFILE';
1130  7
1131  8 { Open the user and user/problem files                             }
1132  9
1133 10 SETNAME(USERFILE,USER_NAME);
1134 11 IOTERM(USERFILE,OVAL,TRUE);
1135 12 EXTEND(USERFILE);
1136 13 READ(USERFILE,0,USER);
1137 14 DECODE(USER.NEXT_RECORD,1,STAT,USER_RECORDS);
1138 15 USER_RECORDS := USER_RECORDS - 1 ;
1139 16
1140 17 SETNAME(U_PROB_FILE,U_PROB_NAME);
1141 18 IOTERM(U_PROB_FILE,OVAL,TRUE);
1142 19 EXTEND(U_PROB_FILE);
1143 20 READ(U_PROB_FILE,0,USER_PROB);
1144 21 DECODE(USER_PROB.NEXT_RECORD,1,STAT,U_PROB_RECORDS);
1145 22 U_PROB_RECORDS := U_PROB_RECORDS - 1 ;
1146 23
1147 24 SCRN1_DISPLAY ;
1148 25 DONE := FALSE ;
1149 26 ERROR_STATUS := TRUE ;
1150 27
1151 28 { The following accepts a valid user code and terminates if no etnry }
1152 29
1153 30 REPEAT
1154 31    ACCEPT(VDT_BLK,3,29,USER_CODE,6,T);
1155 32    IF USER_CODE = '      ' THEN DONE := TRUE ;
1156 33    IF NOT DONE THEN FOR T := 0 TO USER_RECORDS DO
1157 34    IF ERROR_STATUS THEN
1158 35    BEGIN
1159 36       READ(USERFILE,T,USER);
1160 37       IF USER.USER_CODE = USER_CODE THEN
1161 38         ERROR_STATUS := FALSE ;
1162 39    END ;
1163 40
1164 41    IF NOT ERROR_STATUS THEN
1165 42    BEGIN
1166 43       DISPLAY(VDT_BLK,3,23,'NAME',99);
1167 44       DISPLAY(VDT_BLK,3,42,'                              ',99);
1168 45       DISPLAY(VDT_BLK,3,29,USER.USER_NAME,30);
1169 46    END ELSE
1170 47    BEGIN
1171 48       DISPLAY(VDT_BLK,3,42,'Sorry, this code is not valid',99);
1172 49    END ;
1173 50
1174 51 UNTIL DONE OR NOT ERROR_STATUS ;
1175 52
1176 53 WHILE NOT DONE DO
```

```
1177 54 BEGIN
1178 55
1179 56 { The following rouine accepts a problem file name, checks to see if
1180 57   this user is entitled to use the program, checks to see if it still
1181 58   exists, and opens up the problem, situation and description files;
1182 59   if nothing is enterd, the program will terminate                    }
1183 60
1184 61 IF NOT DONE THEN REPEAT
1185 62
1186 63    ACCEPT(VDT_BLK,4,29,PROBLEM_FILE,8,T);
1187 64    OPEN := TRUE ;
1188 65    VALID := FALSE ;
1189 66    IF PROBLEM_FILE = '        ' THEN DONE := TRUE ;
1190 67
1191 68    IF NOT DONE THEN FOR T := 0 TO U_PROB_RECORDS DO
1192 69    IF NOT VALID THEN
1193 70    BEGIN
1194 71       READ(U_PROB_FILE,T,USER_PROB);
1195 72       IF USER_PROB.USER_CODE = USER_CODE
1196 73          AND USER_PROB.PROBLEM_CODE = PROBLEM_FILE
1197 74             AND USER_PROB.STATUS_CODE <> 'D' THEN
1198 75                VALID := TRUE ;
1199 76    END ;
1200 77
1201 78    IF NOT VALID THEN OPEN := FALSE ;
1202 79
1203 80    IF NOT DONE AND VALID THEN
1204 81    BEGIN
1205 82
1206 83 { Open up problem file                                                 }
1207 84
1208 85       CLOSE(PROBLEM);
1209 86       SETMEMBER(PROBLEM,PROB_NODF,PROBLEM_FILE);
1210 87       IOTERM(PROBLEM,OVAL,FALSE);
1211 88       RESET(PROBLEM);
1212 89       IF STATUS(PROBLEM) <> 0 THEN
1213 90          OPEN := FALSE ;
1214 91
1215 92       IF OPEN THEN
1216 93       BEGIN
1217 94          CLOSE(PROBLEM);
1218 95          IOTERM(PROBLEM,OVAL,TRUE);
1219 96          EXTEND(PROBLEM);
1220 97       END ;
1221 98
1222 99 { Open up description file                                             }
1223 100
1224 101      IF OPEN THEN
1225 102      BEGIN
1226 103         CLOSE(DESCRIPTION);
1227 104         SETMEMBER(DESCRIPTION,DESC_NODE,PROBLEM_FILE);
1228 105         IOTERM(DESCRIPTION,OVAL,TRUE);
1229 106         EXTEND(DESCRIPTION);
1230 107      END ;
1231 108
1232 109 { Open up situation file                                               }
1233 110
1234 111      IF OPEN THEN
1235 112      BEGIN
1236 113         CLOSE(SITUATION);
1237 114         SETMEMBER(SITUATION,SIT_NODE,PROBLEM_FILE);
1238 115         IOTERM(SITUATION,OVAL,TRUE);
1239 116         EXTEND(SITUATION);
1240 117      END ;
1241 118
1242 119   END ;
1243 120
1244 121 UNTIL OPEN OR DONE ;
1245 122
1246 123 IF NOT DONE THEN
1247 124 BEGIN
1248 125
1249 126    READ(PROBLEM,0,PROB);
1250 127    DISPLAY(VDT_BLK,4,42,PROB.DESCRIPTION,30);
1251 128
```

```
1252129
1253130      CLOSE(REPORT);
1254131      SETNAME(REPORT,REPTNAME);
1255132      REWRITE(REPORT);
1256133      DATE(DATEPRNT);
1257134      WRITELN(REPORT,'     USER NAME:        ',USER.USER_NAME,
1258135                       '           DATE: ',DATEPRNT);
1259136      WRITELN(REPORT);
1260137      WRITELN(REPORT,'     PROBLEM CODE:   ',PROBLEM_FILE,
1261138                       '     PROBLEM NAME:   ',PROB.DESCRIPTION);
1262139      WRITELN(REPORT);
1263140
1264141      TABLE_GENERATION ;
1265142
1266143      RESET(REPORT);
1267144      READ(REPORT,BUFFER);
1268145      SCRN2_DISPLAY ;
1269146
1270147 { This will allow the report to be printed if printer available      }
1271148
1272149      REPEAT
1273150
1274151        CLEAR_LINE(24);
1275152        DISPLAY(VDT_BLK,24,15,'DO YOU WISH TO PRINT THIS ',99);
1276153        DISPLAY(VDT_BLK,24,41,'REPORT ?    [ ]  ',99);
1277154        ACPT_YES_NO(DUMY,24,53,YES);
1278155        CLEAR_LINE(23);
1279156        IF YES THEN
1280157        BEGIN
1281158
1282159          CLOSE(PRINTER);
1283160          SETNAME(PRINTER,PRNTNAME);
1284161          IOTERM(PRINTER,OVAL,FALSE);
1285162          EXTEND(PRINTER);
1286163
1287164          OPEN := TRUE ;
1288165          IF STATUS(PRINTER) <> 0 THEN
1289166             OPEN := FALSE ;
1290167
1291168          IF NOT OPEN THEN
1292169             DISPLAY(VDT_BLK,23,20,'PRINTER NOT AVAILABLE AT THE MOMENT',
1293170                                                                     99);
1294171          IF OPEN THEN
1295172          BEGIN
1296173
1297174 { Print complete report                                              }
1298175
1299176             RESET(REPORT);
1300177             WHILE NOT EOF(REPORT) DO
1301178             BEGIN
1302179                READ(REPORT,BUFFER);
1303180                WRITELN(PRINTER,BUFFER);
1304181             END;
1305182
1306183             PAGE(PRINTER);
1307184             CLOSE(PRINTER);
1308185             YES := FALSE
1309186
1310187          END ;
1311188
1312189        END ;
1313190
1314191      UNTIL NOT YES ;
1315192
1316193 { Go back for another problem entry until spaces are entered          }
1317194
1318195      CLEARSCREEN(VDT_BLK);
1319196      SCRN1_DISPLAY;
1320197
1321198      DISPLAY(VDT_BLK,3,23,'NAME ',99);
1322199      DISPLAY(VDT_BLK,3,42,'                              ',99);
1323200      DISPLAY(VDT_BLK,3,29,USER.USER_NAME,30);
1324201
1325202 END ;    { "IF NOT DONE THEN " }
1326203
1327204 END ;    { "WHILE NOT DONE DO" }
```

1328205
1329    END.

MAP OF IDENTIFIERS FOR   ANALYSIS

| IDENTIFIER NAME | KIND | SIZE (BYTES, BITS) LEVEL(DISPL) | STACK DISPLACEMENT (BYTE, BIT) | PICTURE (PACKED FIELDS ONLY) |
|---|---|---|---|---|
| PROB_RECORD | RECORD | (96, 0) | | |
| PROBLEM_CODE | FIELD | (8, 0) | (0, 0) | UNPACKED |
| DESCRIPTION | FIELD | (30, 0) | (8, 0) | UNPACKED |
| NEXT_QUESTION | FIELD | (2, 0) | (38, 0) | UNPACKED |
| INT_QUESTIONS | FIELD | (2, 0) | (40, 0) | UNPACKED |
| TIMES_USED | FIELD | (2, 0) | (42, 0) | UNPACKED |
| TOPIC_CODE | FIELD | (8, 0) | (44, 0) | UNPACKED |
| DATE_ENTERED | FIELD | (8, 0) | (52, 0) | UNPACKED |
| DATE_LAST_USED | FIELD | (8, 0) | (60, 0) | UNPACKED |
| MENTOR_CODE | FIELD | (6, 0) | (68, 0) | UNPACKED |
| NUM_SITUATIONS | FIELD | (2, 0) | (74, 0) | UNPACKED |
| MINIMUM_LI | FIELD | (2, 0) | (76, 0) | UNPACKED |
| CALC_LI_FLAG | FIELD | (0, 8) | (78, 0) | UNPACKED |
| FLAG1_FUTURE | FIELD | (0, 8) | (80, 0) | UNPACKED |
| FLAG2_FUTURE | FIELD | (0, 8) | (82, 0) | UNPACKED |
| FLAG3_FUTURE | FIELD | (0, 8) | (84, 0) | UNPACKED |
| DATA_BASE | FIELD | (0, 8) | (86, 0) | UNPACKED |
| PRIMARY_CODE | FIELD | (8, 0) | (88, 0) | UNPACKED |
| NUM_QUESTION | FIELD | (2, 0) | (0, 0) | UNPACKED |
| DESC_QUESTION | FIELD | (30, 0) | (2, 0) | UNPACKED |
| YES_NO | FIELD | (0, 8) | (32, 0) | UNPACKED |
| CALCULATE | FIELD | (0, 8) | (34, 0) | UNPACKED |
| INT_QUEST | FIELD | (0, 8) | (36, 0) | UNPACKED |
| REFERENCE | FIELD | (0, 8) | (38, 0) | UNPACKED |
| UNIT_DESC | FIELD | (10, 0) | (40, 0) | UNPACKED |
| BOUNDARIES | FIELD | (2, 0) | (50, 0) | UNPACKED |
| LOWER_1_LIMIT | FIELD | (4, 0) | (52, 0) | UNPACKED |
| UPPER_1_LIMIT | FIELD | (4, 0) | (56, 0) | UNPACKED |
| LOWER_2_LIMIT | FIELD | (4, 0) | (60, 0) | UNPACKED |
| UPPER_2_LIMIT | FIELD | (4, 0) | (64, 0) | UNPACKED |
| REQUIRED | FIELD | (0, 8) | (68, 0) | UNPACKED |
| LGCL_IMPT | FIELD | (2, 0) | (70, 0) | UNPACKED |
| EXPT_IMPT | FIELD | (2, 0) | (72, 0) | UNPACKED |
| LGCL_INTR | FIELD | (2, 0) | (74, 0) | UNPACKED |
| EXPT_INTR | FIELD | (2, 0) | (76, 0) | UNPACKED |
| LGCL_CMPL | FIELD | (2, 0) | (78, 0) | UNPACKED |
| EXPT_CMPL | FIELD | (2, 0) | (80, 0) | UNPACKED |
| STATUS_CODE | FIELD | (0, 8) | (82, 0) | UNPACKED |
| SORT_FLAG | FIELD | (0, 8) | (84, 0) | UNPACKED |
| FLAG6_FUTURE | FIELD | (0, 8) | (86, 0) | UNPACKED |
| FLAG7_FUTURE | FIELD | (0, 8) | (88, 0) | UNPACKED |
| FLAG8_FUTURE | FIELD | (0, 8) | (90, 0) | UNPACKED |
| SIT_RECORD | RECORD | (250, 0) | | |
| SIT_NUM | FIELD | (4, 0) | (0, 0) | UNPACKED |
| SIT_DESCRIPTION | FIELD | (80, 0) | (4, 0) | UNPACKED |
| NEXT_SIT | FIELD | (2, 0) | (84, 0) | UNPACKED |
| PROB1_LINK | FIELD | (8, 0) | (86, 0) | UNPACKED |
| PROB2_LINK | FIELD | (8, 0) | (94, 0) | UNPACKED |
| PROB3_LINK | FIELD | (8, 0) | (102, 0) | UNPACKED |
| PROB4_LINK | FIELD | (8, 0) | (110, 0) | UNPACKED |
| AUTHOR_CODE | FIELD | (6, 0) | (118, 0) | UNPACKED |
| DATE_ENTERED | FIELD | (8, 0) | (124, 0) | UNPACKED |
| DATE_LAST_USED | FIELD | (8, 0) | (132, 0) | UNPACKED |
| NUM_ENCOUNTERS | FIELD | (2, 0) | (140, 0) | UNPACKED |
| SINC_STRING | FIELD | (100, 0) | (142, 0) | UNPACKED |
| FLAG1_FUTURE | FIELD | (0, 8) | (242, 0) | UNPACKED |
| FLAG2_FUTURE | FIELD | (0, 8) | (244, 0) | UNPACKED |
| FLAG3_FUTURE | FIELD | (0, 8) | (246, 0) | UNPACKED |
| FLAG4_FUTURE | FIELD | (0, 8) | (248, 0) | UNPACKED |
| DESC_RECORD | RECORD | (88, 0) | | |
| NEXT_RECORD | FIELD | (4, 0) | (0, 0) | UNPACKED |
| SIT_NUMBER | FIELD | (4, 0) | (4, 0) | UNPACKED |
| TEXT_LINE | FIELD | (80, 0) | (8, 0) | UNPACKED |

| | | | | |
|---|---|---|---|---|
| USER_RECORD | RECORD | (202,0) | | |
| NEXT_RECORD | FIELD | (4,0) | (0,0) | UNPACKED |
| USER_CODE | FIELD | (6,0) | (4,0) | UNPACKED |
| USER_NAME | FIELD | (30,0) | (10,0) | UNPACKED |
| USER_TITLE | FIELD | (30,0) | (40,0) | UNPACKED |
| ADDRESS1 | FIELD | (30,0) | (70,0) | UNPACKED |
| ADDRESS2 | FIELD | (30,0) | (100,0) | UNPACKED |
| ADDRESS3 | FIELD | (30,0) | (130,0) | UNPACKED |
| PHONE | FIELD | (12,0) | (160,0) | UNPACKED |
| MAX_STATUS | FIELD | (0,8) | (172,0) | UNPACKED |
| PRINTER | FIELD | (0,8) | (174,0) | UNPACKED |
| NUM_PROBLEMS | FIELD | (4,0) | (176,0) | UNPACKED |
| DATE_ENTERED | FIELD | (8,0) | (180,0) | UNPACKED |
| DATE_LAST_USED | FIELD | (8,0) | (188,0) | UNPACKED |
| TOTAL_TIMES | FIELD | (6,0) | (196,0) | UNPACKED |
| USER_PROBLEM_RECORD | RECORD | (24,0) | | |
| NEXT_RECORD | FIELD | (4,0) | (0,0) | UNPACKED |
| USER_CODE | FIELD | (6,0) | (4,0) | UNPACKED |
| PROBLEM_CODE | FIELD | (8,0) | (10,0) | UNPACKED |
| STATUS_CODE | FIELD | (0,8) | (18,0) | UNPACKED |
| TIMES_USED | FIELD | (4,0) | (20,0) | UNPACKED |
| PROBLEM | VARIABLE | (32,0) | #0080 | DIRECT |
| SITUATION | VARIABLE | (32,0) | #00A0 | DIRECT |
| DESCRIPTION | VARIABLE | (32,0) | #00C0 | DIRECT |
| USERFILE | VARIABLE | (32,0) | #00E0 | DIRECT |
| U_PROB_FILE | VARIABLE | (32,0) | #0100 | DIRECT |
| USER | VARIABLE | (202,0) | #0120 | DIRECT |
| USER_PROB | VARIABLE | (24,0) | #01EA | DIRECT |
| PROB | VARIABLE | (96,0) | #0202 | DIRECT |
| SIT | VARIABLE | (250,0) | #0262 | DIRECT |
| DESC | VARIABLE | (88,0) | #035C | DIRECT |
| USER_CODE | VARIABLE | (6,0) | #03B4 | DIRECT |
| USER_RECORDS | VARIABLE | (2,0) | #03BA | DIRECT |
| U_PROB_RECORDS | VARIABLE | (2,0) | #03BC | DIRECT |
| USER_NAME | VARIABLE | (8,0) | #03BE | DIRECT |
| U_PROB_NAME | VARIABLE | (8,0) | #03C6 | DIRECT |
| PROBLEM_FILE | VARIABLE | (8,0) | #03CE | DIRECT |
| DESC_NODE | VARIABLE | (8,0) | #03D6 | DIRECT |
| PROB_NODE | VARIABLE | (8,0) | #03DE | DIRECT |
| SIT_NODE | VARIABLE | (8,0) | #03E6 | DIRECT |
| VDT_BLK | VARIABLE | (32,0) | #03EE | DIRECT |
| REPORT | VARIABLE | (32,0) | #040E | DIRECT |
| PRINTER | VARIABLE | (32,0) | #042E | DIRECT |
| PRNTNAME | VARIABLE | (8,0) | #044E | DIRECT |
| BUFFER | VARIABLE | (80,0) | #0456 | DIRECT |
| REPTNAME | VARIABLE | (8,0) | #04A6 | DIRECT |
| DATEPRNT | VARIABLE | (8,0) | #04AE | DIRECT |
| T | VARIABLE | (0,8) | #04B6 | DIRECT |
| DUMY | VARIABLE | (0,8) | #04B8 | DIRECT |
| COUNTER | VARIABLE | (2,0) | #04BA | DIRECT |
| NEXT_QUESTION | VARIABLE | (2,0) | #04BC | DIRECT |
| RECORD_COUNTER | VARIABLE | (2,0) | #04BE | DIRECT |
| LINE_COUNTER | VARIABLE | (2,0) | #04C0 | DIRECT |
| DONE | VARIABLE | (0,1) | #04C2 | DIRECT |
| OPEN | VARIABLE | (0,1) | #04C4 | DIRECT |
| YES | VARIABLE | (0,1) | #04C6 | DIRECT |
| MAJOR | VARIABLE | (0,1) | #04C8 | DIRECT |
| OVAL | VARIABLE | (0,1) | #04CA | DIRECT |
| ERROR_STATUS | VARIABLE | (0,1) | #04CC | DIRECT |
| COMPARE_REQUIRED | VARIABLE | (0,1) | #04CE | DIRECT |
| ALL_SET | VARIABLE | (0,1) | #04D0 | DIRECT |
| ENTRY_REQUIRED | VARIABLE | (0,1) | #04D2 | DIRECT |
| YES_NO_RESP | VARIABLE | (0,1) | #04D4 | DIRECT |
| EXPT_IMPT | VARIABLE | (2,0) | #04D6 | DIRECT |
| LGCL_IMPT | VARIABLE | (2,0) | #04D8 | DIRECT |
| SIT_NUMBER | VARIABLE | (2,0) | #04DA | DIRECT |
| BEGINNING_NUMBER | VARIABLE | (2,0) | #04DC | DIRECT |
| STAT | VARIABLE | (2,0) | #04DE | DIRECT |
| DUMMY | VARIABLE | (2,0) | #04E0 | DIRECT |
| MAJ_MIN | VARIABLE | (4,0) | #04E2 | DIRECT |
| COMMENT | VARIABLE | (32,0) | #04E6 | DIRECT |

```
LARGEST_LGCL_IMPT
                VARIABLE    (2,0)       #0506    DIRECT
SMALLEST_LGCL_IMPT
                VARIABLE    (2,0)       #0508    DIRECT
MINIMUM         VARIABLE    (2,0)       #050A    DIRECT
DELETED_QUESTIONS
                VARIABLE    (2,0)       #050C    DIRECT
REF_QUESTIONS   VARIABLE    (2,0)       #050E    DIRECT
QUEST_MASK      VARIABLE    (50,0)      #0510    DIRECT
VALID           VARIABLE    (0,1)       #0542    DIRECT

MAXIMUM NUMBER OF IDENTIFIERS USED = 246
DXPSCL  1.7.1  81.254   OPTIMIZATION SUMMARY

"SET_UP " -- 5100 HEAP BYTES REQUIRED TO OPTIMIZE AT LEVEL 1

"CLEAR_LI" -- 5000 HEAP BYTES REQUIRED TO OPTIMIZE AT LEVEL 1

"CHECK_NU" -- 5300 HEAP BYTES REQUIRED TO OPTIMIZE AT LEVEL 1

"ACPT_YES" -- 5500 HEAP BYTES REQUIRED TO OPTIMIZE AT LEVEL 1

1 REDUNDANT COMMON SUBEXPRESSIONS ELIMINATED IN "INITIALI"
   "INITIALI" -- 8200 HEAP BYTES REQUIRED TO OPTIMIZE AT LEVEL 1

"SIT_TABL" -- 6300 HEAP BYTES REQUIRED TO OPTIMIZE AT LEVEL 1

2 REDUNDANT COMMON SUBEXPRESSIONS ELIMINATED IN "EXP_TABL"
   "EXP_TABL" -- 7600 HEAP BYTES REQUIRED TO OPTIMIZE AT LEVEL 1

4 REDUNDANT COMMON SUBEXPRESSIONS ELIMINATED IN "COMP_TAB"
   "COMP_TAB" -- 8800 HEAP BYTES REQUIRED TO OPTIMIZE AT LEVEL 1

1 REDUNDANT COMMON SUBEXPRESSIONS ELIMINATED IN "ANALYZE "
   "ANALYZE " -- 15700 HEAP BYTES REQUIRED TO OPTIMIZE AT LEVEL 1

1 REDUNDANT COMMON SUBEXPRESSIONS ELIMINATED IN "COMPUTE "
   "COMPUTE " -- 8600 HEAP BYTES REQUIRED TO OPTIMIZE AT LEVEL 1

"TABLE_GE" -- 4700 HEAP BYTES REQUIRED TO OPTIMIZE AT LEVEL 1

"SCRN1_DI" -- 5200 HEAP BYTES REQUIRED TO OPTIMIZE AT LEVEL 1

"SCRN2_DI" -- 6100 HEAP BYTES REQUIRED TO OPTIMIZE AT LEVEL 1

"ANALYSIS" -- 12800 HEAP BYTES REQUIRED TO OPTIMIZE AT LEVEL 1

INSTRUCTIONS =   33
   SET_UP    LITERALS =    66   CODE =   124   DATA =    40

INSTRUCTIONS =   27
   CLEAR_LI  LITERALS =    24   CODE =   112   DATA =   124

INSTRUCTIONS =   34
   CHECK_NU  LITERALS =    50   CODE =   118   DATA =    86

INSTRUCTIONS =   66
   ACPT_YES  LITERALS =   102   CODE =   268   DATA =   114

INSTRUCTIONS =  225
   INITIALI  LITERALS =    40   CODE =   792   DATA =    46

INSTRUCTIONS =   99
   SIT_TABL  LITERALS =    28   CODE =   366   DATA =    46

INSTRUCTIONS =  240
   EXP_TABL  LITERALS =    50   CODE =   822   DATA =    76

INSTRUCTIONS =  238
   COMP_TAB  LITERALS =    18   CODE =   862   DATA =    48

INSTRUCTIONS =  859
   ANALYZE   LITERALS =  1086   CODE =  3358   DATA =    56
```

```
                      INSTRUCTIONS =    365
                      COMPUTE    LITERALS =    412   CODE =   1436   DATA =     60

INSTRUCTIONS =     14
                      TABLE_GE   LITERALS =     14   CODE =     46   DATA =   1834

INSTRUCTIONS =     58
                      SCRN1_DI   LITERALS =    208   CODE =    306   DATA =     40

INSTRUCTIONS =    115
                      SCRN2_DI   LITERALS =    140   CODE =    506   DATA =     44

INSTRUCTIONS =    728
                      ANALYSIS   LITERALS =    498   CODE =   3100   DATA =   1354

SOURCE  = .PARADOCS.SRC.REPORT
OBJECT  = .PARADOCS.OBJ.REPORT
LISTING = .PARADOCS.LST.REPORT
MESSAGE = .PARADOCS.L
MEM1 = 6,4
MEM2 = 13,4
MEM3 = 10,4
PRINT WIDTH = 80
NUMBER OF LINES/PAGE = 60
OPTIONS = (* NO OPTIONS SPECIFIED *)
SUPPRESS PREPROCESSOR LINES = YES

LINE NUMBER                COPY FILE PATHNAME
       34    .PARADOCS.SRC.LAYOUT
       52    .PARADOCS.SRC.VAR
       77    .PARADOCS.SRC.IO

REPORT_OF_PROBLEM_SUMMARY

1    {$WIDELIST,MAP,PAGE,CKINDEX}
    2
    3    { **************************************************************
    4
    5      The following is a flowchart of the procedures used (excluding
    6      screen and other small misc. procedures):
    7
    8
    9                       REPORT_OF_PROBLEM_SUMMARY
   10                                  !
   11         ---------------------------------------------------
   12         !              !                !                  !
   13       SET_UP     SCRN1_DISPLAY   SUMMARY_GENERATION    SCRN2_DISPLAY
   14                                  !
   15                       ---------------------------
   16                       !                         !
   17                  PROB_SUMMARY            DESCRIBE_SITUATION
   18                                                 !
   19                       ---------------------------
   20                       !                         !
   21              DATA_POINT_DESCRIPTION     CHECK_FOR_MAJOR_MATCHES
   22                                                 !
   23                                         DATA_POINT_DESCRIPTION
   24
   25
   26      **************************************************************}
   27
   28
   29    PROGRAM REPORT_OF_PROBLEM_SUMMARY ;
   30
   31    TYPE
   32
   33       SET_OF_CHAR = SET OF CHAR ;
   34       VDT_CONTROL = ARRAY[1..16] OF INTEGER;
   35
   36    { The following is the record layout for the relative PROBLEM file }
   37
   38    PROB_RECORD=RECORD         CASE BOOLEAN OF
   39                        TRUE:
   40
   41    { This is the "O" record layout for this file }
   42
```

```
 43      (PROBLEM_CODE    : PACKED ARRAY[1..8] OF CHAR;
 44       DESCRIPTION     : PACKED ARRAY[1..30] OF CHAR;
 45       NEXT_QUESTION   : INTEGER ;
 46       INT_QUESTIONS   : INTEGER ;
 47       TIMES_USED      : INTEGER ;
 48       TOPIC_CODE      : PACKED ARRAY[1..8] OF CHAR;
 49       DATE_ENTERED    : PACKED ARRAY[1..8] OF CHAR;
 50       DATE_LAST_USED  : PACKED ARRAY[1..8] OF CHAR;
 51       MENTOR_CODE     : PACKED ARRAY[1..6] OF CHAR;
 52       NUM_SITUATIONS  : INTEGER ;
 53       MINIMUM_LI      : INTEGER ;
 54       CALC_LI_FLAG    : CHAR ;
 55       FLAG1_FUTURE    : CHAR ;
 56       FLAG2_FUTURE    : CHAR ;
 57       FLAG3_FUTURE    : CHAR ;
 58       DATA_BASE       : CHAR ;
 59       PRIMARY_CODE    : PACKED ARRAY[1..8] OF CHAR);
 60
 61
 62                FALSE:
 63
 64   { This is the "1" through "Nth" record layout    }
 65
 66      (NUM_QUESTION    : PACKED ARRAY[1..2] OF CHAR;
 67       DESC_QUESTION   : PACKED ARRAY[1..30] OF CHAR;
 68       YES_NO          : CHAR;
 69       CALCULATE       : CHAR;
 70       INT_QUEST       : CHAR;
 71       REFERENCE       : CHAR;
 72       UNIT_DESC       : PACKED ARRAY[1..10] OF CHAR;
 73       BOUNDARIES      : INTEGER ;
 74       LOWER_1_LIMIT   : REAL ;
 75       UPPER_1_LIMIT   : REAL ;
 76       LOWER_2_LIMIT   : REAL ;
 77       UPPER_2_LIMIT   : REAL ;
 78       REQUIRED        : CHAR;
 79       LGCL_IMPT       : INTEGER ;
 80       EXPT_IMPT       : INTEGER ;
 81       LGCL_INTR       : INTEGER ;
 82       EXPT_INTR       : INTEGER ;
 83       LGCL_CMPL       : INTEGER ;
 84       EXPT_CMPL       : INTEGER ;
 85       STATUS_CODE     : CHAR;
 86       SORT_FLAG       : CHAR;
 87       FLAG6_FUTURE    : CHAR;
 88       FLAG7_FUTURE    : CHAR;
 89       FLAG8_FUTURE    : CHAR)
 90   END;
 91
 92
 93   { The following is the record layout for the relative SITUATION file }
 94
 95   SIT_RECORD=RECORD
 96
 97       SIT_NUM         : PACKED ARRAY[1..4] OF CHAR;
 98       SIT_DESCRIPTION : PACKED ARRAY[1..80] OF CHAR;
 99       NEXT_SIT        : INTEGER ;
100       PROB1_LINK      : PACKED ARRAY[1..8] OF CHAR;
101       PROB2_LINK      : PACKED ARRAY[1..8] OF CHAR;
102       PROB3_LINK      : PACKED ARRAY[1..8] OF CHAR;
103       PROB4_LINK      : PACKED ARRAY[1..8] OF CHAR;
104       AUTHOR_CODE     : PACKED ARRAY[1..6] OF CHAR;
105       DATE_ENTERED    : PACKED ARRAY[1..8] OF CHAR;
106       DATE_LAST_USED  : PACKED ARRAY[1..8] OF CHAR;
107       NUM_ENCOUNTERS  : INTEGER ;
108       SINC_STRING     : PACKED ARRAY[1..50] OF INTEGER ; { ######### }
109       FLAG1_FUTURE    : CHAR ;
110       FLAG2_FUTURE    : CHAR ;
111       FLAG3_FUTURE    : CHAR ;
112       FLAG4_FUTURE    : CHAR ;
113   END;
114
115
```

```
116     { The following is the record layout for the relative DESCRIPTION file }
117
118     DESC_RECORD=RECORD
119
120        NEXT_RECORD      : PACKED ARRAY[1..4] OF CHAR;
121        SIT_NUMBER       : PACKED ARRAY[1..4] OF CHAR;
122        TEXT_LINE        : PACKED ARRAY[1..80] OF CHAR;
123     END;
124
125
126     { The following is the record layout for the sequential USERFILE file;
127       later it will be changed to a KIF file, but initially it will be
128       established as a RELATIVE file                                       }
129
130     USER_RECORD=RECORD
131
132        NEXT_RECORD       : PACKED ARRAY[1..4] OF CHAR ;
133        USER_CODE         : PACKED ARRAY[1..6] OF CHAR ;
134        USER_NAME         : PACKED ARRAY[1..30] OF CHAR ;
135        USER_TITLE        : PACKED ARRAY[1..30] OF CHAR ;
136        ADDRESS1          : PACKED ARRAY[1..30] OF CHAR ;
137        ADDRESS2          : PACKED ARRAY[1..30] OF CHAR ;
138        ADDRESS3          : PACKED ARRAY[1..30] OF CHAR ;
139        PHONE             : PACKED ARRAY[1..12] OF CHAR ;
140        MAX_STATUS        : CHAR ;
141        PRINTER           : CHAR ;
142        NUM_PROBLEMS      : PACKED ARRAY[1..4] OF CHAR ;
143        DATE_ENTERED      : PACKED ARRAY[1..8] OF CHAR ;
144        DATE_LAST_USED    : PACKED ARRAY[1..8] OF CHAR ;
145        TOTAL_TIMES       : PACKED ARRAY[1..6] OF CHAR ;
146     END ;
147
148
149     { The following is the record layout for the sequential USERPROB file;
150       late it will be changed to a KIF file, but initially it will be
151       established as a RELATIVE file                                       }
152
153     USER_PROBLEM_RECORD=RECORD
154
155        NEXT_RECORD       : PACKED ARRAY[1..4] OF CHAR ;
156        USER_CODE         : PACKED ARRAY[1..6] OF CHAR ;
157        PROBLEM_CODE      : PACKED ARRAY[1..8] OF CHAR ;
158        STATUS_CODE       : CHAR ;
159        TIMES_USED        : PACKED ARRAY[1..4] OF CHAR ;
160     END ;
161
162     { The following is the layout of the RELATIVE formula file used for
163       calculated questions                                                 }
164
165     COMP_RECORD=RECORD
166        RCD_NUMBER        : PACKED ARRAY[1..2] OF CHAR ;
167        FORMULA           : PACKED ARRAY[1..80] OF CHAR ;
168     END ;
169
170
171     {$PAGE}
172     { ******************************************************************** }
173
174     { PROGRAM }
175
176     VAR
177
178     PROBLEM      : RANDOM FILE OF PROB_RECORD;
179     SITUATION    : RANDOM FILE OF SIT_RECORD;
180     DESCRIPTION  : RANDOM FILE OF DESC_RECORD;
181     USERFILE     : RANDOM FILE OF USER_RECORD;
182     U_PROB_FILE  : RANDOM FILE OF USER_PROBLEM_RECORD;
183
184     USER         : USER_RECORD;
185     USER_PROB    : USER_PROBLEM_RECORD;
186     PROB         : PROB_RECORD;
187     SIT          : SIT_RECORD;
188     DESC         : DESC_RECORD;
189
```

```
190     USER_CODE    :   PACKED ARRAY[1..6] OF CHAR ;
191     USER_RECORDS , U_PROB_RECORDS : INTEGER ;
192     USER_NAME , U_PROB_NAME :  PACKED ARRAY[1..8] OF CHAR ;
193     PROBLEM_FILE : PACKED ARRAY[1..8] OF CHAR;
194     DESC_NODE , PROB_NODE , SIT_NODE    : PACKED ARRAY[1..8] OF CHAR;
195     VDT_BLK : VDT_CONTROL;
196
197     COMPFILE     :  RANDOM FILE OF COMP_RECORD ;
198     COMP         :  COMP_RECORD ;
199     REPORT       :  TEXT ;
200     PRINTER      :  TEXT ;
201     PRNTNAME     :  PACKED ARRAY[1..8] OF CHAR ;
202     BUFFER       :  PACKED ARRAY[1..80] OF CHAR ;
203     REPTNAME     :  PACKED ARRAY[1..8] OF CHAR ;
204     DATE_PRNT    :  PACKED ARRAY[1..8] OF CHAR ;
205     COMP_NODE    :  PACKED ARRAY[1..8] OF CHAR ;
206
207     T , DUMY : CHAR;
208     MAJOR , MINOR , DELETED , REINSTATED , LINE_COUNTER  : INTEGER ;
209     VALID , DONE , OPEN , YES , OVAL , ERROR_STATUS  : BOOLEAN ;
210     LGCL_IMPT , SIT_NUMBER , STAT : INTEGER;
211     DUMMY : PACKED ARRAY[1..2] OF CHAR;
212     MAJ_MIN : PACKED ARRAY[1..3] OF CHAR;
213     SIT_REFERENCE , NUMBER , MINIMUM : INTEGER ;
214     QUEST_MASK : PACKED ARRAY[1..50] OF CHAR;        { ########## }
215     OPERATOR   : PACKED ARRAY[1..30] OF CHAR;
216
217     {$PAGE}
218     { ****************************************************************}
219
220
221     {     The following are screen and file handling procedures        }
222
223     PROCEDURE SETFILLER(VAR VDT$ : VDT_CONTROL ;
224        FILL_CHAR: CHAR);
225           EXTERNAL;
226
227     PROCEDURE CLEARSCREEN(VAR VDT$ : VDT_CONTROL);   EXTERNAL;
228
229     PROCEDURE INITSCREEN(VAR VDT$: VDT_CONTROL; LUNO: INTEGER); EXTERNAL;
230
231     PROCEDURE DISPLAY(VAR VDT$: VDT_CONTROL; LINE: INTEGER;
232        COLUMN : INTEGER; BUFFER: PACKED ARRAY[1..?] OF CHAR;
233        LENGTH : INTEGER); EXTERNAL;
234
235     PROCEDURE ACCEPT(VAR VDT$: VDT_CONTROL; LINE,COLUMN: INTEGER;
236        VAR BUFFER: PACKED ARRAY[1..?] OF CHAR; LENGTH: INTEGER;
237        VAR TERM_CHAR: CHAR); EXTERNAL;
238
239
240     { *************************************************************** }
241
242
243     PROCEDURE SET_UP;
244     BEGIN
245
246  3    INITSCREEN(VDT_BLK,0);
247  4    CLEARSCREEN(VDT_BLK);
248  5
249  6    PROB_NODE := 'PROBLEMS';
250  7    SIT_NODE  := 'SITUATNS';
251  8    DESC_NODE := 'DESCRIPT';
252  9    REPTNAME  := 'TEXTFILE';
253 10    PRNTNAME  := 'PRNTFILE';
254 11    COMP_NODE := 'COMPFILE';
255 12    DONE := FALSE;
256 13
257     END; {SET_UP }
258
259     { ****************************************************************}
260     { The following procedure clears a line on the display            }
261
262     PROCEDURE CLEAR_LINE (LINE_NUMBER : INTEGER);
263
264     VAR    LINE_DATA    :   PACKED ARRAY[1..80] OF CHAR ;
265                   N     :   CHAR ;
266
```

```
267      BEGIN
268
269  3     FOR N := 1 TO 80 DO
270  4       LINE_DATA[N] := ' ';
271  5     DISPLAY(VDT_BLK,LINE_NUMBER,1,LINE_DATA,80);
272  6
273      END ;   { CLEAR_LINE }
```

MAP OF IDENTIFIERS FOR  CLEAR_LI

| IDENTIFIER NAME | KIND | SIZE (BYTES,BITS) | STACK DISPLACEMENT LEVEL(DISPL) (BYTE,BIT) | PICTURE (PACKED FIELDS ONLY) |
|---|---|---|---|---|
| LINE_NUMBER | PARAMETER | (2,0) | #0028 | DIRECT |
| LINE_DATA | VARIABLE | (80,0) | #002A | DIRECT |
| N | VARIABLE | (0,8) | #007A | DIRECT |

```
274
275    { *******************************************************************}
276    {           The following checks for correct "Y/N" response          }
277
278    PROCEDURE ACPT_YES_NO ( VAR YES_NO : CHAR;
279                            X , Y : INTEGER ;     { y/n also allowed }
280                       VAR STATUS_FLAG : BOOLEAN );
281
282       VAR   YES_NO_SET , YES_SET : SET_OF_CHAR;
283
284       BEGIN
285  2     STATUS_FLAG := FALSE ;
286  3     YES_NO_SET := ['Y','y','N','n'] ;
287  4     YES_SET := ['Y','y'] ;
288  5
289  6     REPEAT
290  7       ACCEPT(VDT_BLK,X,Y,DUMMY,1,T);
291  8       DECODE(DUMMY,1,STAT,YES_NO);
292  9     UNTIL ( YES_NO IN YES_NO_SET ) ;
293 10     IF ( YES_NO IN YES_SET ) THEN
294 11        STATUS_FLAG := TRUE;
295 12     IF YES_NO = 'y' THEN
296 13        YES_NO := 'Y';
297 14     IF YES_NO = 'n' THEN
298 15        YES_NO := 'N';
299      END;   { ACPT_YES_NO }
```

MAP OF IDENTIFIERS FOR  ACPT_YES

| IDENTIFIER NAME | KIND | SIZE (BYTES,BITS) | STACK DISPLACEMENT LEVEL(DISPL) (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
300
301
302    { *******************************************************************}
303
304    PROCEDURE SUMMARY_GENERATION ;
305
306    TYPE    SITUATIONS      =   RECORD  { Situations with deletes }
307              NEXT          : @SITUATIONS ;
308              SINC_STRING   : PACKED ARRAY[1..50] OF INTEGER ;
309            END ;                       { ########## }
310
311            SIT_PTR         = @SITUATIONS ;
312
313            MAJORS          =   RECORD  { Just major data points }
314              NEXT          : @MAJORS ;
315              SINC_MAJOR    : PACKED ARRAY[1..50] OF INTEGER ;
316            END ;                       { ########## }
317
```

```
318              MAJ_PTR              = @MAJORS ;
319
320              MINORS               =   RECORD  { Just minor data points }
321                NEXT               : @MINORS ;
322                SINC_MINOR         : PACKED ARRAY[1..50] OF INTEGER ;
323              END ;                              { ########## }
324
325              MIN_PTR              = @MINORS ;
326
327
328    VAR       SIT_ROW , SIT_TEMP , SIT_BEG , SIT_REF    :  SIT_PTR ;
329              MAJ_ROW , MAJ_TEMP , MAJ_BEG , MAJ_REF    :  MAJ_PTR ;
330              MIN_ROW , MIN_TEMP , MIN_BEG , MIN_REF    :  MIN_PTR ;
331
332              TEST_STRING          : PACKED ARRAY[1..50] OF INTEGER ;
333              REF_STRING           : PACKED ARRAY[1..50] OF INTEGER ;
334
335              SIT_STRING           : PACKED ARRAY[1..3] OF CHAR ;
336
337              MATCHES_POINTER      : INTEGER ;
338              DESC_LIMIT           : INTEGER ;
339              PERCENTAGE           : INTEGER ;
340              NUMBER_MATCHES       : INTEGER ;
341              TOTAL_SITUATIONS     : INTEGER ;
342              TOTAL_QUESTIONS      : INTEGER ;
343              NUM_DELETED          : INTEGER ;
344              NUM_REINSTATED       : INTEGER ;
345              NUM_MAJOR            : INTEGER ;
346              NUM_MINOR            : INTEGER ;
347              TOTAL_ENCOUNTERS     : INTEGER ;
348              SIT_POINTER          : INTEGER ;
349              NUMBER               : INTEGER ;
350              COUNTER              : INTEGER ;
351
352              REFERENCE_SITUATION  : BOOLEAN ;
353
354    PROCEDURE PROB_SUMMARY ;
355
356    BEGIN   { PROB_SUMMARY }
357
358  3   WRITELN(REPORT,'                      P R O B L E M       ',
359  4                  'S U M M A R Y ');
360  5   WRITELN(REPORT);
361  6   WRITELN(REPORT,'                                                     ',
362  7                  '            INTEGER ENTRY   ');
363  8   WRITELN(REPORT,'                                                     ',
364  9                  '         !    CALCULATED    ');
365 10   WRITELN(REPORT,'                                                     ',
366 11                  '   BOUNDARIES    !   !   REQUIRED');
367 12   WRITELN(REPORT,'NO.           DESCRIPTION               UNITS   ',
368 13                  '  LOWER    UPPER   !   !   !  TYPE ');
369 14   WRITELN(REPORT,'--  ------------------------------  -----------  ',
370 15                  '-------  -------  ---  ---  ---  ----  ');
371 16
372 17 { Store totals from Problem record                                    }
373 18
374 19    READ(PROBLEM,0,PROB);
375 20    TOTAL_QUESTIONS  := PROB.NEXT_QUESTION - 1 ;
376 21    TOTAL_SITUATIONS := PROB.NUM_SITUATIONS ;
377 22    MINIMUM := PROB.MINIMUM_LI ;
378 23
379 24 { Read in all questions and write out to report format; also estab-
380 25   lish question mask and count up totals for summary of experience   }
381 26
382 27    COUNTER := 1 ;
383 28    NUM_MAJOR     := 0 ;
384 29    NUM_MINOR     := 0 ;
385 30    NUM_DELETED    := 0 ;
386 31    NUM_REINSTATED := 0 ;
387 32
388 33    FOR T := 1 TO TOTAL_QUESTIONS DO
389 34    BEGIN
390 35       READ(PROBLEM,T,PROB);
391 36       LGCL_IMPT := PROB.LGCL_IMPT ;
392 37
```

```
393 38        IF PROB.STATUS_CODE <> 'D' AND PROB.REFERENCE <> 'Y' THEN
394 39           IF LGCL_IMPT.>= MINIMUM THEN
395 40           BEGIN
396 41              MAJ_MIN := 'MAJ' ;
397 42              NUM_MAJOR := NUM_MAJOR + 1 ;
398 43              QUEST_MASK[T] := 'M' ;
399 44           END ELSE
400 45           BEGIN
401 46              MAJ_MIN := 'MIN' ;
402 47              NUM_MINOR := NUM_MINOR + 1 ;
403 48              QUEST_MASK[T] := 'L' ;
404 49           END ;
405 50
406 51        IF PROB.REFERENCE = 'Y' THEN
407 52        BEGIN
408 53           MAJ_MIN := 'REF';
409 54           QUEST_MASK[T] := 'R' ;
410 55        END ;
411 56
412 57        IF PROB.STATUS_CODE = 'D' THEN
413 58        BEGIN
414 59           QUEST_MASK[T] := 'D' ;
415 60           NUM_DELETED := NUM_DELETED + 1 ;
416 61        END ;
417 62
418 63        IF PROB.STATUS_CODE = 'D' THEN
419 64           WRITELN(REPORT,COUNTER:2,' ',PROB.DESC_QUESTION,' ',
420 65              '       * * * * * D E L E T E D * * * * * ')
421 66        ELSE BEGIN
422 67           WRITE(REPORT,COUNTER:2,' ',PROB.DESC_QUESTION,' ',
423 68                 PROB.UNIT_DESC,' ');
424 69           IF PROB.BOUNDARIES > 0 OR PROB.INT_QUEST = 'Y' THEN
425 70              WRITE(REPORT,PROB.LOWER_1_LIMIT:8:2,
426 71                        PROB.UPPER_1_LIMIT:8:2,' ')
427 72           ELSE WRITE(REPORT,'                         ');
428 73           IF PROB.INT_QUEST = 'Y' THEN
429 74              WRITE(REPORT,'INT ') ELSE WRITE(REPORT,'    ');
430 75           IF PROB.CALCULATE = 'Y' THEN
431 76              WRITE(REPORT,'CAL ') ELSE WRITE(REPORT,'    ');
432 77           IF PROB.REQUIRED = 'Y' THEN
433 78              WRITE(REPORT,'REQ ') ELSE WRITE(REPORT,'    ');
434 79           WRITELN(REPORT,MAJ_MIN);
435 80
436 81 { Write second line if calculated question or second boundaries      }
437 82
438 83        IF PROB.CALCULATE = 'Y' OR PROB.BOUNDARIES = 2 THEN
439 84        BEGIN
440 85           IF PROB.CALCULATE = 'Y' THEN
441 86              WRITE(REPORT,'            FORMULA:            ',
442 87                        '                 ')
443 88           ELSE
444 89              WRITE(REPORT,'                                ',
445 90                        '                 ');
446 91           IF PROB.BOUNDARIES = 2 THEN
447 92              WRITELN(REPORT,PROB.LOWER_2_LIMIT:8:2,
448 93                        PROB.UPPER_2_LIMIT:8:2)
449 94           ELSE
450 95              WRITELN(REPORT);
451 96
452 97 { Open up computation file and print formula (indent up to 8 spaces
453 98   if possible)                                                      }
454 99
455 100          IF PROB.CALCULATE = 'Y' THEN
456 101          BEGIN
457 102             CLOSE(COMPFILE);
458 103             SETMEMBER(COMPFILE,COMP_NODE,PROBLEM_FILE);
459 104             EXTEND(COMPFILE);
460 105             READ(COMPFILE,T,COMP);
461 106             NUMBER := 0 ;
462 107             FOR S := 80 DOWNTO 73 DO
463 108                IF COMP.FORMULA[S] = ' ' THEN
464 109                   NUMBER := NUMBER + 1 ;
465 110             IF NUMBER > 0 THEN
466 111                FOR S := 1 TO NUMBER DO
467 112                   BUFFER[S] := ' ' ;
```

```
468113                STAT := NUMBER + 1 ;
469114                NUMBER := 80 - NUMBER ;
470115                FOR S := 1 TO NUMBER DO
471116                BEGIN
472117                   BUFFER[STAT] := COMP.FORMULA[S] ;
473118                   STAT := STAT + 1 ;
474119                END;
475120                WRITELN(REPORT, BUFFER);
476121             END ;
477122         END ;
478123      END ;
479124
480125      IF PROB.STATUS_CODE = 'R' THEN
481126         NUM_REINSTATED := NUM_REINSTATED + 1 ;
482127
483128      COUNTER := COUNTER + 1 ;
484129
485130   END ;
486131
487132   WRITELN(REPORT);
488133   WRITELN(REPORT);
489134
490135 { Read in all situations entered to-date and store each as modified
491136   for deleted questions; QUEST_MASK has been established with "D"
492137   for deleted, "M" for major and "L" for minor for each data point   }
493138
494139   COUNTER := TOTAL_SITUATIONS - 1 ;
495140   TOTAL_ENCOUNTERS := 0 ;
496141   SIT_TEMP := NIL ;
497142   MAJ_TEMP := NIL ;
498143   MIN_TEMP := NIL ;
499144   SIT_POINTER := TOTAL_SITUATIONS ;
500145   FOR T := COUNTER DOWNTO 0 DO
501146   BEGIN
502147      READ(SITUATION, T, SIT);
503148      TOTAL_ENCOUNTERS := TOTAL_ENCOUNTERS + SIT.NUM_ENCOUNTERS ;
504149      FOR N := 1 TO TOTAL_QUESTIONS DO
505150      BEGIN
506151         IF QUEST_MASK[N] = 'R' THEN
507152            SIT.SINC_STRING[N] := 14 ;
508153         IF QUEST_MASK[N] = 'D' THEN
509154            SIT.SINC_STRING[N] := 13 ;
510155      END ;
511156      NEW(SIT_ROW);
512157      NEW(MAJ_ROW);
513158      NEW(MIN_ROW);
514159      SIT_ROW@.NEXT := SIT_TEMP ;
515160      MAJ_ROW@.NEXT := MAJ_TEMP ;
516161      MIN_ROW@.NEXT := MIN_TEMP ;
517162      SIT_ROW@.SINC_STRING := SIT.SINC_STRING ;
518163      MAJ_ROW@.SINC_MAJOR  := SIT.SINC_STRING ;
519164      MIN_ROW@.SINC_MINOR  := SIT.SINC_STRING ;
520165
521166 { Now establish a major point string and a minor point string in
522167   memory for each situation; -32766 replaces judgement integer    }
523168
524169      FOR N := 1 TO TOTAL_QUESTIONS DO
525170      BEGIN
526171         IF QUEST_MASK[N] = 'L' OR QUEST_MASK[N] = 'R' THEN
527172            MAJ_ROW@.SINC_MAJOR[N] := -32766 ;
528173         IF QUEST_MASK[N] = 'M' THEN
529174            MIN_ROW@.SINC_MINOR[N] := -32766 ;
530175      END ;
531176
532177
533178      SIT_POINTER := SIT_POINTER - 1 ;
534179      SIT_TEMP := SIT_ROW ;
535180      MAJ_TEMP := MAJ_ROW ;
536181      MIN_TEMP := MIN_ROW ;
537182
538183   END ;
539184
540185   SIT_BEG := SIT_ROW ;
541186   MAJ_BEG := MAJ_ROW ;
542187   MIN_BEG := MIN_ROW ;
543188
```

```
544 189   { Look up mentor name in user file                                        }
545 190
546 191      READ(PROBLEM,0,PROB);
547 192      VALID := FALSE ;
548 193      FOR T := 0 TO USER_RECORDS DO
549 194        IF NOT VALID THEN
550 195        BEGIN
551 196          READ(USERFILE,T,USER);
552 197          IF USER.USER_CODE = PROB.MENTOR_CODE THEN VALID := TRUE ;
553 198        END ;
554 199      IF NOT VALID THEN
555 200        USER.USER_NAME := '                              ';
556 201
557 202   { Write statistics to begin the "SUMMARY OF EXPERIENCE"                    }
558 203
559 204      WRITELN(REPORT,'             S U M M A R Y    O F   ',
560 205                    'E X P E R I E N C E ');
561 206      WRITELN(REPORT);
562 207
563 208      NUMBER := TOTAL_QUESTIONS - NUM_DELETED ;
564 209
565 210      WRITELN(REPORT,NUMBER:3,' types of data are used by the system ',
566 211              'to evaluate this problem, including');
567 212      WRITELN(REPORT,NUM_MAJOR:3,' major and ',NUM_MINOR:3,' minor ',
568 213              'data types.  ',NUM_DELETED:2,' of the questions are ',
569 214              'now deleted and');
570 215      WRITELN(REPORT,NUM_REINSTATED:2,' of the questions have been ',
571 216              'reinstated. ',TOTAL_SITUATIONS:4,' unique situations ',
572 217              'have been');
573 218      WRITELN(REPORT,'identified in the ',TOTAL_ENCOUNTERS:5,
574 219              ' examples encountered.  This problem was last used on');
575 220      WRITELN(REPORT,PROB.DATE_LAST_USED,' and was established on ',
576 221              PROB.DATE_ENTERED,' by ',USER.USER_NAME);
577 222      WRITELN(REPORT);
578 223      WRITELN(REPORT);
579 224
580      END ;   { PROB_SUMMARY }

581
582      { ****************************************************************** }
583
584      PROCEDURE DATA_POINT_DESCRIPTION ;
585
586      VAR    JUDGEMENT : PACKED ARRAY[1..20] OF CHAR ;
587
588      BEGIN  { DATA_POINT_DESCRIPTION }
589
590      { Write question description and judgement description for any
591        non-zero entry in the TEST_STRING                                    }
592
593  6     FOR I := 1 TO TOTAL_QUESTIONS DO
594  7     BEGIN
595  8        READ(PROBLEM,I,PROB);
596  9        IF PROB.INT_QUEST <> 'Y' AND TEST_STRING[I] <> -32766 THEN
597 10        BEGIN
598 11           CASE TEST_STRING[I] OF
599 12                 1 : JUDGEMENT := 'below both ranges   ';
600 13                 2 : JUDGEMENT := 'below primary range ';
601 14                 3 : JUDGEMENT := 'within both ranges  ';
602 15                 4 : JUDGEMENT := 'above primary range ';
603 16                 5 : JUDGEMENT := 'above both ranges   ';
604 17                 6 : JUDGEMENT := 'below range         ';
605 18                 7 : JUDGEMENT := 'within range        ';
606 19                 8 : JUDGEMENT := 'above range         ';
607 20                 9 : JUDGEMENT := 'no judgement        ';
608 21                10 : JUDGEMENT := 'not entered         ';
609 22                11 : JUDGEMENT := 'absent              ';
610 23                12 : JUDGEMENT := 'present             ';
611 24                13 : JUDGEMENT := 'deleted             ';
612 25                14 : JUDGEMENT := 'for reference only  ';
613 26           OTHERWISE
614 27                JUDGEMENT := '   *** ERROR ***    ';
615 28                WRITELN(REPORT,'*** BAD NUMBER IS: ',TEST_STRING[I]:3);
616 29           END ;
```

```
617 30              WRITELN(REPORT,'                          ',PROB.DESC_QUESTION,
618 31                                 ' is ',JUDGEMENT)
619 32          END ;
620 33
621 34  { If this is an integer question, -32767 represents "not entered",
622 35    otherwise write integer value as the description                          }
623 36
624 37          IF PROB.INT_QUEST = 'Y' AND TEST_STRING[I] <> -32766 THEN
625 38          BEGIN
626 39             IF TEST_STRING[I] = -32767 THEN
627 40                WRITELN(REPORT,'                          ',PROB.DESC_QUESTION,
628 41                                 ' is not entered')
629 42             ELSE
630 43                WRITELN(REPORT,'                          ',PROB.DESC_QUESTION,
631 44                                 ' is ',TEST_STRING[I]:6);
632 45          END ;
633 46       END ;
634 47
635      END ;  { DATA_POINT_DESCRIPTION }

MAP OF IDENTIFIERS FOR   DATA_POI

IDENTIFIER NAME    KIND         SIZE          STACK                   PICTURE
                                (BYTES,BITS)  DISPLACEMENT            (PACKED FIELDS ONLY)
                                LEVEL(DISPL)  (BYTE,BIT)

JUDGEMENT          VARIABLE     (20,0)        #0028        DIRECT 636
637      { ****************************************************************** }
638
639      PROCEDURE CHECK_FOR_MAJOR_MATCHES ;
640
641      VAR    SIT_COMPARE  : INTEGER ;
642             MATCH        : BOOLEAN ;
643
644      BEGIN  { CHECK_FOR_MAJOR_MATCHES }
645
646      { Starting with the situation number 2, compare this major string
647        with all other major strings (except the reference situation)
648        and if a match is found, write the minor differences to the
649        report file                                                           }
650
651  8    MAJ_TEMP := MAJ_BEG ;
652  9    MIN_TEMP := MIN_BEG ;
653 10    MAJ_ROW  := MAJ_TEMP@.NEXT ;
654 11    MIN_ROW  := MIN_TEMP@.NEXT ;
655 12    SIT_COMPARE := 2 ;
656 13    FOR I := 2 TO TOTAL_SITUATIONS DO
657 14    BEGIN
658 15       REF_STRING := MAJ_REF@.SINC_MAJOR ;
659 16       IF SIT_COMPARE <> COUNTER THEN
660 17       BEGIN
661 18          MATCH := TRUE ;
662 19          FOR Q := 1 TO TOTAL_QUESTIONS DO
663 20             IF REF_STRING[Q] <> MAJ_ROW@.SINC_MAJOR[Q] THEN
664 21                MATCH := FALSE ;
665 22          IF MATCH THEN
666 23          BEGIN
667 24
668 25  { If match is found, identify the other situation by just the base
669 26    description and detail the minor differences                          }
670 27
671 28             WRITELN(REPORT,'In terms of major criteria, this ',
672 29                     'situation is the same as Situation No. ',
673 30                     SIT_COMPARE:3);
674 31             NUMBER := SIT_COMPARE - 1 ;
675 32             READ(SITUATION,NUMBER,SIT);
676 33             WRITELN(REPORT,SIT.SIT_DESCRIPTION);
677 34             WRITELN(REPORT,'In this case, however: ');
678 35
679 36             REF_STRING  := MIN_ROW@.SINC_MINOR ;
680 37             TEST_STRING := MIN_REF@.SINC_MINOR ;
681 38             FOR N := 1 TO TOTAL_QUESTIONS DO
682 39                IF TEST_STRING[N] = REF_STRING[N] THEN
```

```
683 40                TEST_STRING[N] := -32766 ;
684 41                DATA_POINT_DESCRIPTION ;
685 42              END ;
686 43            END ;
687 44            SIT_COMPARE := SIT_COMPARE + 1 ;
688 45            MAJ_TEMP := MAJ_ROW ;
689 46            MIN_TEMP := MIN_ROW ;
690 47            MAJ_ROW  := MAJ_TEMP@.NEXT ;
691 48            MIN_ROW  := MIN_TEMP@.NEXT ;
692 49
693 50        END ;
694 51
695     END ;    { CHECK_FOR_MAJOR_MATCHES }

MAP OF IDENTIFIERS FOR   CHECK_FO

IDENTIFIER NAME    KIND        SIZE         STACK                 PICTURE
                               (BYTES,BITS) DISPLACEMENT          (PACKED FIELDS ONLY)
                               LEVEL(DISPL) (BYTE,BIT)

SIT_COMPARE        VARIABLE    (2,0)        #0028      DIRECT
MATCH              VARIABLE    (0,1)        #002A      DIRECT 696
697    { ***************************************************************** }
698
699    PROCEDURE DESCRIBE_SITUATION ;
700
701    BEGIN    { DESCRIBE_SITUATION }
702
703    { Write base description and any additional description lines to     }
704    { report file                                                        }
705
706  6    WRITELN(REPORT,SIT.SIT_DESCRIPTION);
707  7    RESET(DESCRIPTION);
708  8    IF DESC_LIMIT > 0 THEN
709  9      FOR N := 1 TO DESC_LIMIT DO
710 10      BEGIN
711 11         READ(DESCRIPTION,N,DESC);
712 12         DECODE(DESC.SIT_NUMBER,1,STAT,NUMBER);
713 13         IF NUMBER = SIT_POINTER THEN
714 14            WRITELN(REPORT,DESC.TEXT_LINE);
715 15      END;
716 16
717 17    IF NOT REFERENCE_SITUATION THEN
718 18       WRITELN(REPORT,'This situation differs from the reference ',
719 19                      'situation as follows:');
720 20
721 21 { Write description of major and minor data points                   }
722 22
723 23    WRITELN(REPORT,'     MAJOR DATA :');
724 24
725 25    REF_STRING := MAJ_BEG@.SINC_MAJOR ;
726 26
727 27 { If this is the reference situation, print ALL major / minor points }
728 28
729 29    IF REFERENCE_SITUATION THEN
730 30    BEGIN
731 31       TEST_STRING := REF_STRING ;
732 32       DATA_POINT_DESCRIPTION ;
733 33    END ;
734 34
735 35 { For all other situations, print only the differences between it    }
736 36 { and the reference situation                                        }
737 37
738 38    IF NOT REFERENCE_SITUATION THEN
739 39    BEGIN
740 40       TEST_STRING := MAJ_REF@.SINC_MAJOR ;
741 41       FOR I := 1 TO TOTAL_QUESTIONS DO
742 42          IF TEST_STRING[I] = REF_STRING[I] THEN
743 43             TEST_STRING[I] := -32766 ;
744 44       DATA_POINT_DESCRIPTION ;
745 45    END ;
746 46
```

```
747 47 { Repeat the same logic as above for minor data points                           }
748 48
749 49     WRITELN(REPORT,'       MINOR DATA :');
750 50     REF_STRING := MIN_BEG@.SINC_MINOR ;
751 51
752 52     IF REFERENCE_SITUATION THEN
753 53     BEGIN
754 54        TEST_STRING := REF_STRING ;
755 55        DATA_POINT_DESCRIPTION ;
756 56     END ;
757 57
758 58     IF NOT REFERENCE_SITUATION THEN
759 59     BEGIN
760 60        TEST_STRING := MIN_REF@.SINC_MINOR ;
761 61        FOR I := 1 TO TOTAL_QUESTIONS DO
762 62           IF TEST_STRING[I] = REF_STRING[I] THEN
763 63              TEST_STRING[I] := -32766 ;
764 64        DATA_POINT_DESCRIPTION ;
765 65 { Also, if not reference situation, describe any major matches found }
766 66
767 67 { in terms of the differences in the minor data points               }
768 68
769 69        CHECK_FOR_MAJOR_MATCHES ;
770 70
771 71     END ;
772 72
773    END ;   { DESCRIBE_SITUATION }

774
775    { ****************************************************************** }
776
777    BEGIN   { SUMMARY_GENERATION }
778
779    { Load all situation  strings into memory and write Problem Summary }
780    { into report file                                                   }
781
782  6    PROB_SUMMARY ;
783  7
784  8 { Write description of reference situation into report file           }
785  9
786 10     READ(DESCRIPTION,0,DESC);
787 11     DECODE(DESC.NEXT_RECORD,1,STAT,DESC_LIMIT);
788 12     DESC_LIMIT := DESC_LIMIT - 1 ;
789 13
790 14     DISPLAY(VDT_BLK,9,33,'PLEASE WAIT',99);
791 15     DISPLAY(VDT_BLK,11,16,'THE SYSTEM IS NOW ANALYZING ',99);
792 16     DISPLAY(VDT_BLK,11,44,'SITUATION NUMBER   1',99);
793 17
794 18     REFERENCE_SITUATION := TRUE ;
795 19     SIT_POINTER := 0 ;
796 20     SIT_REF := SIT_BEG ;
797 21     MAJ_REF := MAJ_BEG ;
798 22     MIN_REF := MIN_BEG ;
799 23     READ(SITUATION,0,SIT);
800 24
801 25     WRITELN(REPORT,'The reference situation (encountered ',
802 26         SIT.NUM_ENCOUNTERS:3,' times) has these characteristics:');
803 27     DESCRIBE_SITUATION ;
804 28     WRITELN(REPORT);
805 29     WRITELN(REPORT,'        *       *       *       *       *',
806 30         '       *       *       *');
807 31     WRITELN(REPORT);
808 32
809 33     REFERENCE_SITUATION := FALSE ;
810 34     COUNTER := 2 ;
811 35     SIT_TEMP := SIT_BEG ;
812 36     MAJ_TEMP := MAJ_BEG ;
813 37     MIN_TEMP := MIN_BEG ;
814 38     SIT_REF := SIT_TEMP@.NEXT ;
815 39     MAJ_REF := MAJ_TEMP@.NEXT ;
816 40     MIN_REF := MIN_TEMP@.NEXT ;
817 41     SIT_POINTER := 1 ;
818 42     FOR I := 2 TO TOTAL_SITUATIONS DO
819 43     BEGIN
```

```
820 44        ENCODE(SIT_STRING,1,STAT,COUNTER:3);
821 45        DISPLAY(VDT_BLK,11,62,SIT_STRING,3);
822 46        READ(SITUATION,SIT_POINTER,SIT);
823 47        NUMBER := SIT.NUM_ENCOUNTERS ;
824 48
825 49        VALID := FALSE ;
826 50        FOR T := 0 TO USER_RECORDS DO
827 51          IF NOT VALID THEN
828 52          BEGIN
829 53            READ(USERFILE,T,USER);
830 54            IF USER.USER_CODE = SIT.AUTHOR_CODE THEN VALID := TRUE ;
831 55          END ;
832 56        IF NOT VALID THEN
833 57          USER.USER_NAME := '                                        ';
834 58
835 59        WRITELN(REPORT,'Situation Number ',COUNTER+5,'  (encountered ',
836 60            NUMBER:3,' times) was described on ',SIT.DATE_ENTERED,' by');
837 61        WRITELN(REPORT,'                                                 ',
838 62                USER.USER_NAME);
839 63        DESCRIBE_SITUATION ;
840 64        WRITELN(REPORT) ;
841 65        WRITELN(REPORT,'                *       *       *       *       *',
842 66                      '        *       *       *');
843 67        WRITELN(REPORT) ;
844 68        COUNTER := COUNTER + 1 ;
845 69        SIT_POINTER := SIT_POINTER + 1 ;
846 70        SIT_TEMP := SIT_REF ;
847 71        MAJ_TEMP := MAJ_REF ;
848 72        MIN_TEMP := MIN_REF ;
849 73        SIT_REF := SIT_TEMP@.NEXT ;
850 74        MAJ_REF := MAJ_TEMP@.NEXT ;
851 75        MIN_REF := MIN_TEMP@.NEXT ;
852 76      END ;
853 77
854 78 { Free up pointer variable memory                                              }
855 79
856 80      FOR T := 1 TO TOTAL_SITUATIONS DO
857 81      BEGIN
858 82        SIT_TEMP := SIT_BEG@.NEXT ;
859 83        MAJ_TEMP := MAJ_BEG@.NEXT ;
860 84        MIN_TEMP := MIN_BEG@.NEXT ;
861 85        DISPOSE(SIT_BEG);
862 86        DISPOSE(MAJ_BEG);
863 87        DISPOSE(MIN_BEG);
864 88        SIT_BEG := SIT_TEMP ;
865 89        MAJ_BEG := MAJ_TEMP ;
866 90        MIN_BEG := MIN_TEMP ;
867 91      END ;
868 92
869    END ;  { SUMMARY_GENERATION }
```

MAP OF IDENTIFIERS FOR  SUMMARY_

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| SITUATIONS | RECORD | (102,0) | | |
|   NEXT | FIELD | (2,0) | (0,0) | UNPACKED |
|   SINC_STRING | FIELD | (100,0) | (2,0) | UNPACKED |
| MAJORS | RECORD | (102,0) | | |
|   NEXT | FIELD | (2,0) | (0,0) | UNPACKED |
|   SINC_MAJOR | FIELD | (100,0) | (2,0) | UNPACKED |
| MINORS | RECORD | (102,0) | | |
|   NEXT | FIELD | (2,0) | (0,0) | UNPACKED |
|   SINC_MINOR | FIELD | (100,0) | (2,0) | UNPACKED |
| SIT_ROW | VARIABLE | (2,0) | #0028 | DIRECT |
| SIT_TEMP | VARIABLE | (2,0) | #002A | DIRECT |
| SIT_BEG | VARIABLE | (2,0) | #002C | DIRECT |
| SIT_REF | VARIABLE | (2,0) | #002E | DIRECT |
| MAJ_ROW | VARIABLE | (2,0) | #0030 | DIRECT |
| MAJ_TEMP | VARIABLE | (2,0) | #0032 | DIRECT |
| MAJ_BEG | VARIABLE | (2,0) | #0034 | DIRECT |
| MAJ_REF | VARIABLE | (2,0) | #0036 | DIRECT |
| MIN_ROW | VARIABLE | (2,0) | #0038 | DIRECT |
| MIN_TEMP | VARIABLE | (2,0) | #003A | DIRECT |

| | | | | |
|---|---|---|---|---|
| MIN_BEG | VARIABLE | (2,0) | #003C | DIRECT |
| MIN_REF | VARIABLE | (2,0) | #003E | DIRECT |
| TEST_STRING | VARIABLE | (100,0) | #0040 | DIRECT |
| REF_STRING | VARIABLE | (100,0) | #00A4 | DIRECT |
| SIT_STRING | VARIABLE | (4,0) | #0108 | DIRECT |
| MATCHES_POINTER | VARIABLE | (2,0) | #010C | DIRECT |
| DESC_LIMIT | VARIABLE | (2,0) | #010E | DIRECT |
| PERCENTAGE | VARIABLE | (2,0) | #0110 | DIRECT |
| NUMBER_MATCHES | VARIABLE | (2,0) | #0112 | DIRECT |
| TOTAL_SITUATIONS | | | | |
| | VARIABLE | (2,0) | #0114 | DIRECT |
| TOTAL_QUESTIONS | VARIABLE | (2,0) | #0116 | DIRECT |
| NUM_DELETED | VARIABLE | (2,0) | #0118 | DIRECT |
| NUM_REINSTATED | VARIABLE | (2,0) | #011A | DIRECT |
| NUM_MAJOR | VARIABLE | (2,0) | #011C | DIRECT |
| NUM_MINOR | VARIABLE | (2,0) | #011E | DIRECT |
| TOTAL_ENCOUNTERS | | | | |
| | VARIABLE | (2,0) | #0120 | DIRECT |
| SIT_POINTER | VARIABLE | (2,0) | #0122 | DIRECT |
| NUMBER | VARIABLE | (2,0) | #0124 | DIRECT |
| COUNTER | VARIABLE | (2,0) | #0126 | DIRECT |
| REFERENCE_SITUATION | | | | |
| | VARIABLE | (0,1) | #0128 | DIRECT |

```
870
871
872     { ****************************************************************}
873
874     PROCEDURE SCRN1_DISPLAY ;    { First screen format }
875
876     BEGIN
877  2    DISPLAY(VDT_BLK,1,12,'P A R A D O C S      D E V E L O P M E N T',
878  3                                                                 99);
879  4    DISPLAY(VDT_BLK,1,56,'S Y S T E M',99);
880  5    DISPLAY(VDT_BLK,2,24,'**** PROBLEM SUMMARY REPORT ****',99);
881  6    DISPLAY(VDT_BLK,3,13,'YOUR USER CODE: ',99);
882  7    DISPLAY(VDT_BLK,4,13,'  PROBLEM CODE: ',99);
883  8    DISPLAY(VDT_BLK,4,45,'(no entry when completed)',99);
884     END;   { SCRN1_DISPLAY }
885
886     { ****************************************************************}
887
888     PROCEDURE SCRN2_DISPLAY ;     { Second screen format }
889
890     VAR     LINE , COUNTER  :  INTEGER ;
891
892     BEGIN
893
894     { This allows the operator to display the report (questions & exper- }
895     { ience summary) 15 lines at a time; when completed, the operator    }
896     { may re-display the entire report or go on to optionally print it   }
897
898  7    REPEAT
899  8
900  9      LINE := 6 ;
901 10      FOR COUNTER := 1 TO 18 DO
902 11      BEGIN
903 12         IF NOT EOF(REPORT) THEN
904 13            READ(REPORT,BUFFER);
905 14         IF EOF(REPORT) THEN
906 15            FOR T := 1 TO 80 DO
907 16               BUFFER[T] := ' ';
908 17         DISPLAY(VDT_BLK,LINE,1,BUFFER,80);
909 18         LINE := LINE + 1 ;
910 19      END ;
911 20
912 21      IF EOF(REPORT) THEN
913 22      BEGIN
914 23         RESET(REPORT);
915 24         READ(REPORT,BUFFER);
916 25         STAT := 24 ;
917 26         CLEAR_LINE(STAT);
918 27         DISPLAY(VDT_BLK,24,11,'DO YOU WISH TO DISPLAY THIS SUMMA',99);
919 28         DISPLAY(VDT_BLK,24,44,'RY REPORT AGAIN ? [ ] ',99);
920 29         ACPT_YES_NO(DUMY,24,64,YES);
921 30      END
```

```
922 31        ELSE
923 32        BEGIN
924 33           CLEAR_LINE(24);
925 34           DISPLAY(VDT_BLK,24,27,'READY FOR MORE ?  [ ]',99);
926 35           ACPT_YES_NO(DUMY,24,46,YES);
927 36        END;
928 37
929 38     UNTIL NOT YES ;
930 39
931 40
932     END;   { SCRN2_DISPLAY }
```

MAP OF IDENTIFIERS FOR   SCRN2_DI

| IDENTIFIER NAME | KIND | SIZE (BYTES,BITS) | STACK DISPLACEMENT LEVEL(DISPL) (BYTE,BIT) | PICTURE (PACKED FIELDS ONLY) |
|---|---|---|---|---|
| LINE | VARIABLE | (2,0) | #0028  DIRECT | |
| COUNTER | VARIABLE | (2,0) | #002A  DIRECT | |

```
933
934    { *******************************************************************}
935    {$PAGE}
936    { *******************************************************************}
937
938    BEGIN   { MAIN PROGRAM }
939
940  3 SET_UP ;
941  4
942  5 USER_NAME := 'USERFILE';
943  6 U_PROB_NAME := 'UPRBFILE';
944  7
945  8 { Open the user and user/problem files                                }
946  9
947 10 SETNAME(USERFILE,USER_NAME);
948 11 IOTERM(USERFILE,OVAL,TRUE);
949 12 EXTEND(USERFILE);
950 13 READ(USERFILE,0,USER);
951 14 DECODE(USER.NEXT_RECORD,1,STAT,USER_RECORDS);
952 15 USER_RECORDS := USER_RECORDS - 1 ;
953 16
954 17 SETNAME(U_PROB_FILE,U_PROB_NAME);
955 18 IOTERM(U_PROB_FILE,OVAL,TRUE);
956 19 EXTEND(U_PROB_FILE);
957 20 READ(U_PROB_FILE,0,USER_PROB);
958 21 DECODE(USER_PROB.NEXT_RECORD,1,STAT,U_PROB_RECORDS);
959 22 U_PROB_RECORDS := U_PROB_RECORDS - 1 ;
960 23
961 24 SCRN1_DISPLAY ;
962 25 DONE := FALSE ;
963 26 ERROR_STATUS := TRUE ;
964 27
965 28 { The following accepts a valid user code and terminates if no etnry }
966 29
967 30 REPEAT
968 31    ACCEPT(VDT_BLK,3,29,USER_CODE,6,T);
969 32    IF USER_CODE = '        ' THEN DONE := TRUE ;
970 33    IF NOT DONE THEN FOR T := 0 TO USER_RECORDS DO
971 34    IF ERROR_STATUS THEN
972 35    BEGIN
973 36       READ(USERFILE,T,USER);
974 37       IF USER.USER_CODE = USER_CODE THEN
975 38          ERROR_STATUS := FALSE ;
976 39    END ;
977 40
978 41    IF NOT ERROR_STATUS THEN
979 42    BEGIN
980 43       OPERATOR := USER.USER_NAME ;
981 44       DISPLAY(VDT_BLK,3,23,'NAME',99);
982 45       DISPLAY(VDT_BLK,3,42,'                              ',99);
983 46       DISPLAY(VDT_BLK,3,29,OPERATOR,30);
984 47    END ELSE
```

```
985  48    BEGIN
986  49        DISPLAY(VDT_BLK,3,42,'Sorry, this code is not valid',99);
987  50    END ;
988  51
989  52 UNTIL DONE OR NOT ERROR_STATUS ;
990  53
991  54 WHILE NOT DONE DO
992  55 BEGIN
993  56
994  57 { The following rouine accepts a problem file name, checks to see if
995  58   this user is entitled to use the program, checks to see if it still
996  59   exists, and opens up the problem, situation and description files;
997  60   if nothing is enterd, the program will terminate                    }
998  61
999  62 IF NOT DONE THEN REPEAT
1000 63
1001 64    ACCEPT(VDT_BLK,4,29,PROBLEM_FILE,8,T);
1002 65    OPEN := TRUE ;
1003 66    VALID := FALSE ;
1004 67    IF PROBLEM_FILE = '        ' THEN DONE := TRUE ;
1005 68
1006 69    IF NOT DONE THEN FOR T := 0 TO U_PROB_RECORDS DO
1007 70    IF NOT VALID THEN
1008 71    BEGIN
1009 72       READ(U_PROB_FILE,T,USER_PROB);
1010 73       IF USER_PROB.USER_CODE = USER_CODE
1011 74         AND USER_PROB.PROBLEM_CODE = PROBLEM_FILE
1012 75           AND USER_PROB.STATUS_CODE <> 'D' THEN
1013 76             VALID := TRUE ;
1014 77    END ;
1015 78
1016 79    IF NOT VALID THEN OPEN := FALSE ;
1017 80
1018 81    IF NOT DONE AND VALID THEN
1019 82    BEGIN
1020 83
1021 84 { Open up problem file                                                }
1022 85
1023 86       CLOSE(PROBLEM);
1024 87       SETMEMBER(PROBLEM,PROB_NODE,PROBLEM_FILE);
1025 88       IOTERM(PROBLEM,OVAL,FALSE);
1026 89       RESET(PROBLEM);
1027 90       IF STATUS(PROBLEM) <> 0 THEN
1028 91          OPEN := FALSE ;
1029 92
1030 93       IF OPEN THEN
1031 94       BEGIN
1032 95          CLOSE(PROBLEM);
1033 96          IOTERM(PROBLEM,OVAL,TRUE);
1034 97          EXTEND(PROBLEM);
1035 98       END ;
1036 99
1037 100 { Open up description file                                           }
1038 101
1039 102      IF OPEN THEN
1040 103      BEGIN
1041 104         CLOSE(DESCRIPTION);
1042 105         SETMEMBER(DESCRIPTION,DESC_NODE,PROBLEM_FILE);
1043 106         IOTERM(DESCRIPTION,OVAL,TRUE);
1044 107         EXTEND(DESCRIPTION);
1045 108      END ;
1046 109
1047 110 { Open up situation file                                             }
1048 111
1049 112      IF OPEN THEN
1050 113      BEGIN
1051 114         CLOSE(SITUATION);
1052 115         SETMEMBER(SITUATION,SIT_NODE,PROBLEM_FILE);
1053 116         IOTERM(SITUATION,OVAL,TRUE);
1054 117         EXTEND(SITUATION);
1055 118      END ;
1056 119
1057 120   END ;
1058 121
```

```
1059122 UNTIL OPEN OR DONE ;
1060123
1061124 IF NOT DONE THEN
1062125 BEGIN
1063126
1064127    READ(PROBLEM,0,PROB);
1065128    DISPLAY(VDT_BLK,4,42,PROB.DESCRIPTION,30);
1066129
1067130
1068131    CLOSE(REPORT);
1069132    SETNAME(REPORT,REPTNAME);
1070133    REWRITE(REPORT);
1071134    DATE(DATE_PRNT);
1072135    WRITELN(REPORT,'      USER NAME:          ',OPERATOR,
1073136                   '          DATE:  ',DATE_PRNT);
1074137    WRITELN(REPORT);
1075138    WRITELN(REPORT,'      PROBLEM CODE:    ',PROBLEM_FILE,
1076139                   '        PROBLEM NAME:   ',PROB.DESCRIPTION);
1077140    WRITELN(REPORT);
1078141
1079142    SUMMARY_GENERATION ;
1080143
1081144    RESET(REPORT);
1082145    READ(REPORT,BUFFER);
1083146    SCRN2_DISPLAY ;
1084147    CLEAR_LINE(23);
1085148
1086149 { This will allow the report to be printed if printer available    }
1087150
1088151    REPEAT
1089152       CLEAR_LINE(24);
1090153       DISPLAY(VDT_BLK,24,15,'DO YOU WISH TO PRINT THIS ',99);
1091154       DISPLAY(VDT_BLK,24,41,'REPORT ?   [ ]  ',99);
1092155       ACPT_YES_NO(DUMY,24,53,YES);
1093156       CLEAR_LINE(23);
1094157       IF YES THEN
1095158       BEGIN
1096159
1097160          CLOSE(PRINTER);
1098161          SETNAME(PRINTER,PRNTNAME);
1099162          IOTERM(PRINTER,OVAL,FALSE);
1100163          EXTEND(PRINTER);
1101164
1102165          OPEN := TRUE ;
1103166          IF STATUS(PRINTER) <> 0 THEN
1104167             OPEN := FALSE ;
1105168
1106169          IF NOT OPEN THEN
1107170             DISPLAY(VDT_BLK,23,20,'PRINTER NOT AVAILABLE AT THE MOMENT',
1108171                                                                         99);
1109172          IF OPEN THEN
1110173          BEGIN
1111174
1112175 { Print complete report                                               }
1113176
1114177             RESET(REPORT);
1115178             WHILE NOT EOF(REPORT) DO
1116179             BEGIN
1117180                READ(REPORT,BUFFER);
1118181                WRITELN(PRINTER,BUFFER);
1119182             END;
1120183
1121184             PAGE(PRINTER);
1122185             CLOSE(PRINTER);
1123186             YES := FALSE
1124187
1125188          END ;
1126189
1127190       END ;
1128191
1129192    UNTIL NOT YES ;
1130193
1131194 { Go back for another problem entry until spaces are entered          }
1132195
```

```
1133196      CLEARSCREEN(VDT_BLK);
1134197      SCRN1_DISPLAY;
1135198          DISPLAY(VDT_BLK,3,23,'NAME',99);
1136199          DISPLAY(VDT_BLK,3,29,OPERATOR,30);
1137200
1138201 END ;   { "IF NOT DONE THEN " }
1139202
1140203 END ;   { "WHILE NOT DONE DO" }
1141204
1142    END.
```

MAP OF IDENTIFIERS FOR REPORT_O

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| PROB_RECORD | RECORD | (96,0) | | |
|   PROBLEM_CODE | FIELD | (8,0) | (0,0) | UNPACKED |
|   DESCRIPTION | FIELD | (30,0) | (8,0) | UNPACKED |
|   NEXT_QUESTION | FIELD | (2,0) | (38,0) | UNPACKED |
|   INT_QUESTIONS | FIELD | (2,0) | (40,0) | UNPACKED |
|   TIMES_USED | FIELD | (2,0) | (42,0) | UNPACKED |
|   TOPIC_CODE | FIELD | (8,0) | (44,0) | UNPACKED |
|   DATE_ENTERED | FIELD | (8,0) | (52,0) | UNPACKED |
|   DATE_LAST_USED | FIELD | (8,0) | (60,0) | UNPACKED |
|   MENTOR_CODE | FIELD | (6,0) | (68,0) | UNPACKED |
|   NUM_SITUATIONS | FIELD | (2,0) | (74,0) | UNPACKED |
|   MINIMUM_LI | FIELD | (2,0) | (76,0) | UNPACKED |
|   CALC_LI_FLAG | FIELD | (0,8) | (78,0) | UNPACKED |
|   FLAG1_FUTURE | FIELD | (0,8) | (80,0) | UNPACKED |
|   FLAG2_FUTURE | FIELD | (0,8) | (82,0) | UNPACKED |
|   FLAG3_FUTURE | FIELD | (0,8) | (84,0) | UNPACKED |
|   DATA_BASE | FIELD | (0,8) | (86,0) | UNPACKED |
|   PRIMARY_CODE | FIELD | (8,0) | (88,0) | UNPACKED |
|   NUM_QUESTION | FIELD | (2,0) | (0,0) | UNPACKED |
|   DESC_QUESTION | FIELD | (30,0) | (2,0) | UNPACKED |
|   YES_NO | FIELD | (0,8) | (32,0) | UNPACKED |
|   CALCULATE | FIELD | (0,8) | (34,0) | UNPACKED |
|   INT_QUEST | FIELD | (0,8) | (36,0) | UNPACKED |
|   REFERENCE | FIELD | (0,8) | (38,0) | UNPACKED |
|   UNIT_DESC | FIELD | (10,0) | (40,0) | UNPACKED |
|   BOUNDARIES | FIELD | (2,0) | (50,0) | UNPACKED |
|   LOWER_1_LIMIT | FIELD | (4,0) | (52,0) | UNPACKED |
|   UPPER_1_LIMIT | FIELD | (4,0) | (56,0) | UNPACKED |
|   LOWER_2_LIMIT | FIELD | (4,0) | (60,0) | UNPACKED |
|   UPPER_2_LIMIT | FIELD | (4,0) | (64,0) | UNPACKED |
|   REQUIRED | FIELD | (0,8) | (68,0) | UNPACKED |
|   LGCL_IMPT | FIELD | (2,0) | (70,0) | UNPACKED |
|   EXPT_IMPT | FIELD | (2,0) | (72,0) | UNPACKED |
|   LGCL_INTR | FIELD | (2,0) | (74,0) | UNPACKED |
|   EXPT_INTR | FIELD | (2,0) | (76,0) | UNPACKED |
|   LGCL_CMPL | FIELD | (2,0) | (78,0) | UNPACKED |
|   EXPT_CMPL | FIELD | (2,0) | (80,0) | UNPACKED |
|   STATUS_CODE | FIELD | (0,8) | (82,0) | UNPACKED |
|   SORT_FLAG | FIELD | (0,8) | (84,0) | UNPACKED |
|   FLAG6_FUTURE | FIELD | (0,8) | (86,0) | UNPACKED |
|   FLAG7_FUTURE | FIELD | (0,8) | (88,0) | UNPACKED |
|   FLAG8_FUTURE | FIELD | (0,8) | (90,0) | UNPACKED |
| SIT_RECORD | RECORD | (250,0) | | |
|   SIT_NUM | FIELD | (4,0) | (0,0) | UNPACKED |
|   SIT_DESCRIPTION | FIELD | (80,0) | (4,0) | UNPACKED |
|   NEXT_SIT | FIELD | (2,0) | (84,0) | UNPACKED |
|   PROB1_LINK | FIELD | (8,0) | (86,0) | UNPACKED |
|   PROB2_LINK | FIELD | (8,0) | (94,0) | UNPACKED |
|   PROB3_LINK | FIELD | (8,0) | (102,0) | UNPACKED |
|   PROB4_LINK | FIELD | (8,0) | (110,0) | UNPACKED |
|   AUTHOR_CODE | FIELD | (6,0) | (118,0) | UNPACKED |
|   DATE_ENTERED | FIELD | (8,0) | (124,0) | UNPACKED |
|   DATE_LAST_USED | FIELD | (8,0) | (132,0) | UNPACKED |

| | | | | |
|---|---|---|---|---|
| NUM_ENCOUNTERS | | | | |
| | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |
| TEXT_LINE | FIELD | (80,0) | (8,0) | UNPACKED |
| USER_RECORD | RECORD | (202,0) | | |
| NEXT_RECORD | FIELD | (4,0) | (0,0) | UNPACKED |
| USER_CODE | FIELD | (6,0) | (4,0) | UNPACKED |
| USER_NAME | FIELD | (30,0) | (10,0) | UNPACKED |
| USER_TITLE | FIELD | (30,0) | (40,0) | UNPACKED |
| ADDRESS1 | FIELD | (30,0) | (70,0) | UNPACKED |
| ADDRESS2 | FIELD | (30,0) | (100,0) | UNPACKED |
| ADDRESS3 | FIELD | (30,0) | (130,0) | UNPACKED |
| PHONE | FIELD | (12,0) | (160,0) | UNPACKED |
| MAX_STATUS | FIELD | (0,8) | (172,0) | UNPACKED |
| PRINTER | FIELD | (0,8) | (174,0) | UNPACKED |
| NUM_PROBLEMS | FIELD | (4,0) | (176,0) | UNPACKED |
| DATE_ENTERED | FIELD | (8,0) | (180,0) | UNPACKED |
| DATE_LAST_USED | | | | |
| | FIELD | (8,0) | (188,0) | UNPACKED |
| TOTAL_TIMES | FIELD | (6,0) | (196,0) | UNPACKED |
| USER_PROBLEM_RECORD | | | | |
| | RECORD | (24,0) | | |
| NEXT_RECORD | FIELD | (4,0) | (0,0) | UNPACKED |
| USER_CODE | FIELD | (6,0) | (4,0) | UNPACKED |
| PROBLEM_CODE | FIELD | (8,0) | (10,0) | UNPACKED |
| STATUS_CODE | FIELD | (0,8) | (18,0) | UNPACKED |
| TIMES_USED | FIELD | (4,0) | (20,0) | UNPACKED |
| COMP_RECORD | RECORD | (82,0) | | |
| RCD_NUMBER | FIELD | (2,0) | (0,0) | UNPACKED |
| FORMULA | FIELD | (80,0) | (2,0) | UNPACKED |
| PROBLEM | VARIABLE | (32,0) | #0080 | DIRECT |
| SITUATION | VARIABLE | (32,0) | #00A0 | DIRECT |
| DESCRIPTION | VARIABLE | (32,0) | #00C0 | DIRECT |
| USERFILE | VARIABLE | (32,0) | #00E0 | DIRECT |
| U_PROB_FILE | VARIABLE | (32,0) | #0100 | DIRECT |
| USER | VARIABLE | (202,0) | #0120 | DIRECT |
| USER_PROB | VARIABLE | (24,0) | #01EA | DIRECT |
| PROB | VARIABLE | (96,0) | #0202 | DIRECT |
| SIT | VARIABLE | (250,0) | #0262 | DIRECT |
| DESC | VARIABLE | (88,0) | #035C | DIRECT |
| USER_CODE | VARIABLE | (6,0) | #03B4 | DIRECT |
| USER_RECORDS | VARIABLE | (2,0) | #03BA | DIRECT |
| U_PROB_RECORDS | VARIABLE | (2,0) | #03BC | DIRECT |
| USER_NAME | VARIABLE | (8,0) | #03BE | DIRECT |
| U_PROB_NAME | VARIABLE | (8,0) | #03C6 | DIRECT |
| PROBLEM_FILE | VARIABLE | (8,0) | #03CE | DIRECT |
| DESC_NODE | VARIABLE | (8,0) | #03D6 | DIRECT |
| PROB_NODE | VARIABLE | (8,0) | #03DE | DIRECT |
| SIT_NODE | VARIABLE | (8,0) | #03E6 | DIRECT |
| VDT_BLK | VARIABLE | (32,0) | #03EE | DIRECT |
| COMPFILE | VARIABLE | (32,0) | #040E | DIRECT |
| COMP | VARIABLE | (82,0) | #042E | DIRECT |
| REPORT | VARIABLE | (32,0) | #0480 | DIRECT |
| PRINTER | VARIABLE | (32,0) | #04A0 | DIRECT |
| PRNTNAME | VARIABLE | (8,0) | #04C0 | DIRECT |
| BUFFER | VARIABLE | (80,0) | #04C8 | DIRECT |
| REPTNAME | VARIABLE | (8,0) | #0518 | DIRECT |
| DATE_PRNT | VARIABLE | (8,0) | #0520 | DIRECT |
| COMP_NODE | VARIABLE | (8,0) | #0528 | DIRECT |
| T | VARIABLE | (0,8) | #0530 | DIRECT |
| DUMY | VARIABLE | (0,8) | #0532 | DIRECT |
| MAJOR | VARIABLE | (2,0) | #0534 | DIRECT |
| MINOR | VARIABLE | (2,0) | #0536 | DIRECT |
| DELETED | VARIABLE | (2,0) | #0538 | DIRECT |
| REINSTATED | VARIABLE | (2,0) | #053A | DIRECT |
| LINE_COUNTER | VARIABLE | (2,0) | #053C | DIRECT |
| VALID | VARIABLE | (0,1) | #053E | DIRECT |

| | | | | |
|---|---|---|---|---|
| DONE | VARIABLE | (0,1) | #0540 | DIRECT |
| OPEN | VARIABLE | (0,1) | #0542 | DIRECT |
| YES | VARIABLE | (0,1) | #0544 | DIRECT |
| OVAL | VARIABLE | (0,1) | #0546 | DIRECT |
| ERROR_STATUS | VARIABLE | (0,1) | #0548 | DIRECT |
| LGCL_IMPT | VARIABLE | (2,0) | #054A | DIRECT |
| SIT_NUMBER | VARIABLE | (2,0) | #054C | DIRECT |
| STAT | VARIABLE | (2,0) | #054E | DIRECT |
| DUMMY | VARIABLE | (2,0) | #0550 | DIRECT |
| MAJ_MIN | VARIABLE | (4,0) | #0552 | DIRECT |
| SIT_REFERENCE | VARIABLE | (2,0) | #0556 | DIRECT |
| NUMBER | VARIABLE | (2,0) | #0558 | DIRECT |
| MINIMUM | VARIABLE | (2,0) | #055A | DIRECT |
| QUEST_MASK | VARIABLE | (50,0) | #055C | DIRECT |
| OPERATOR | VARIABLE | (30,0) | #058E | DIRECT |

MAXIMUM NUMBER OF IDENTIFIERS USED = 224

OPTIMIZATION SUMMARY

DXPSCL  1.7.1  81.254   OPTIMIZATION SUMMARY

"SET_UP  "  -- 5200 HEAP BYTES REQUIRED TO OPTIMIZE AT LEVEL 1

"CLEAR_LI"  -- 5000 HEAP BYTES REQUIRED TO OPTIMIZE AT LEVEL 1

"ACPT_YES"  -- 5500 HEAP BYTES REQUIRED TO OPTIMIZE AT LEVEL 1

"PROB_SUM"  -- 15700 HEAP BYTES REQUIRED TO OPTIMIZE AT LEVEL 1

"DATA_POI"  -- 7800 HEAP BYTES REQUIRED TO OPTIMIZE AT LEVEL 1

3 REDUNDANT COMMON SUBEXPRESSIONS ELIMINATED IN "CHECK_FO"
  "CHECK_FO"  -- 7100 HEAP BYTES REQUIRED TO OPTIMIZE AT LEVEL 1

4 REDUNDANT COMMON SUBEXPRESSIONS ELIMINATED IN "DESCRIBE"
  "DESCRIBE"  -- 7800 HEAP BYTES REQUIRED TO OPTIMIZE AT LEVEL 1

"SUMMARY_"  -- 8900 HEAP BYTES REQUIRED TO OPTIMIZE AT LEVEL 1

"SCRN1_DI"  -- 5200 HEAP BYTES REQUIRED TO OPTIMIZE AT LEVEL 1

"SCRN2_DI"  -- 6100 HEAP BYTES REQUIRED TO OPTIMIZE AT LEVEL 1

"REPORT_O"  -- 12900 HEAP BYTES REQUIRED TO OPTIMIZE AT LEVEL 1

```
    INSTRUCTIONS =    37
    SET_UP   LITERALS =      76   CODE =    138   DATA =       40

INSTRUCTIONS =    27
    CLEAR_LI LITERALS =      24   CODE =    112   DATA =      124

INSTRUCTIONS =    66
    ACPT_YES LITERALS =     102   CODE =    268   DATA =      114

INSTRUCTIONS =   880
    PROB_SUM LITERALS =    1132   CODE =   3748   DATA =       48

INSTRUCTIONS =   271
    DATA_POI LITERALS =     466   CODE =   1064   DATA =       68

INSTRUCTIONS =   159
    CHECK_FO LITERALS =     134   CODE =    614   DATA =       52

INSTRUCTIONS =   210
    DESCRIBE LITERALS =     150   CODE =    790   DATA =       46

INSTRUCTIONS =   313
    SUMMARY_ LITERALS =     462   CODE =   1438   DATA =      306
```

```
INSTRUCTIONS =     58
SCRN1_DI  LITERALS =     200  CODE =     306  DATA =       40

INSTRUCTIONS =    116
SCRN2_DI  LITERALS =     140  CODE =     512  DATA =       44

INSTRUCTIONS =    741
REPORT_O  LITERALS =     480  CODE =    3138  DATA =     1458
```

PREPROC

```
SOURCE  = .PARADOCS.SRC.LISTING
OBJECT  = .PARADOCS.OBJ.LISTING
LISTING = .PARADOCS.LST.LISTING
MESSAGE = .PARADOCS.L
MEM1 = 6,4
MEM2 = 13,4
MEM3 = 10,4
PRINT WIDTH = 80
NUMBER OF LINES/PAGE = 60
OPTIONS = (* NO OPTIONS SPECIFIED *)
SUPPRESS PREPROCESSOR LINES = YES

LINE NUMBER                  COPY FILE PATHNAME
       24    .PARADOCS.SRC.LAYOUT
       34    .PARADOCS.SRC.VAR
       52    .PARADOCS.SRC.IO
```

LISTING_OF_QUESTIONNAIRE

```
  1     {$WIDELIST,MAP,PAGE,CKINDEX}
  2
  3     { ******************************************************************
  4
  5       The following is a flowchart of the procedures used (excluding
  6       screen and other small misc. procedures):
  7
  8
  9                       LISTING_OF_QUESTIONNAIRE
 10                                 !
 11       _____
 12              !              !                !
 13            SET_UP      SCRN1_DISPLAY    QUESTIONNAIRE_PRINT
 14
 15
 16     ******************************************************************}
 17
 18
 19     PROGRAM LISTING_OF_QUESTIONNAIRE ;
 20
 21     TYPE
 22
 23       SET_OF_CHAR = SET OF CHAR ;
 24       VDT_CONTROL = ARRAY[1..16] OF INTEGER;
 25
 26     { The following is the record layout for the relative PROBLEM file }
 27
 28     PROB_RECORD=RECORD        CASE BOOLEAN OF
 29                       TRUE:
 30
 31     { This is the "O" record layout for this file }
 32
 33       (PROBLEM_CODE    : PACKED ARRAY[1..8] OF CHAR;
 34        DESCRIPTION     : PACKED ARRAY[1..30] OF CHAR;
 35        NEXT_QUESTION   : INTEGER ;
 36        INT_QUESTIONS   : INTEGER ;
 37        TIMES_USED      : INTEGER ;
```

```
38         TOPIC_CODE      : PACKED ARRAY[1..8] OF CHAR;
39         DATE_ENTERED    : PACKED ARRAY[1..8] OF CHAR;
40         DATE_LAST_USED  : PACKED ARRAY[1..8] OF CHAR;
41         MENTOR_CODE     : PACKED ARRAY[1..6] OF CHAR;
42         NUM_SITUATIONS  : INTEGER ;
43         MINIMUM_LI      : INTEGER ;
44         CALC_LI_FLAG    : CHAR ;
45         FLAG1_FUTURE    : CHAR ;
46         FLAG2_FUTURE    : CHAR ;
47         FLAG3_FUTURE    : CHAR ;
48         DATA_BASE       : CHAR ;
49         PRIMARY_CODE    : PACKED ARRAY[1..8] OF CHAR);
50
51
52                FALSE:
53
54    { This is the "1" through "Nth" record layout  }
55
56        (NUM_QUESTION    : PACKED ARRAY[1..2] OF CHAR;
57         DESC_QUESTION   : PACKED ARRAY[1..30] OF CHAR;
58         YES_NO          : CHAR;
59         CALCULATE       : CHAR;
60         INT_QUEST       : CHAR;
61         REFERENCE       : CHAR;
62         UNIT_DESC       : PACKED ARRAY[1..10] OF CHAR;
63         BOUNDARIES      : INTEGER ;
64         LOWER_1_LIMIT   : REAL ;
65         UPPER_1_LIMIT   : REAL ;
66         LOWER_2_LIMIT   : REAL ;
67         UPPER_2_LIMIT   : REAL ;
68         REQUIRED        : CHAR;
69         LGCL_IMPT       : INTEGER ;
70         EXPT_IMPT       : INTEGER ;
71         LGCL_INTR       : INTEGER ;
72         EXPT_INTR       : INTEGER ;
73         LGCL_CMPL       : INTEGER ;
74         EXPT_CMPL       : INTEGER ;
75         STATUS_CODE     : CHAR;
76         SORT_FLAG       : CHAR;
77         FLAG6_FUTURE    : CHAR;
78         FLAG7_FUTURE    : CHAR;
79         FLAG8_FUTURE    : CHAR)
80    END;
81
82
83    { The following is the record layout for the relative SITUATION file }
84
85    SIT_RECORD=RECORD
86
87         SIT_NUM         : PACKED ARRAY[1..4] OF CHAR;
88         SIT_DESCRIPTION : PACKED ARRAY[1..80] OF CHAR;
89         NEXT_SIT        : INTEGER ;
90         PROB1_LINK      : PACKED ARRAY[1..8] OF CHAR;
91         PROB2_LINK      : PACKED ARRAY[1..8] OF CHAR;
92         PROB3_LINK      : PACKED ARRAY[1..8] OF CHAR;
93         PROB4_LINK      : PACKED ARRAY[1..8] OF CHAR;
94         AUTHOR_CODE     : PACKED ARRAY[1..6] OF CHAR;
95         DATE_ENTERED    : PACKED ARRAY[1..8] OF CHAR;
96         DATE_LAST_USED  : PACKED ARRAY[1..8] OF CHAR;
97         NUM_ENCOUNTERS  : INTEGER ;
98         SINC_STRING     : PACKED ARRAY[1..50] OF INTEGER ;   { ######### }
99         FLAG1_FUTURE    : CHAR ;
100        FLAG2_FUTURE    : CHAR ;
101        FLAG3_FUTURE    : CHAR ;
102        FLAG4_FUTURE    : CHAR ;
103   END;
104
105
106   { The following is the record layout for the relative DESCRIPTION file }
107
108   DESC_RECORD=RECORD
109
110        NEXT_RECORD     : PACKED ARRAY[1..4] OF CHAR;
111        SIT_NUMBER      : PACKED ARRAY[1..4] OF CHAR;
112        TEXT_LINE       : PACKED ARRAY[1..80] OF CHAR;
```

```
113     END;
114
115
116     { The following is the record layout for the sequential USERFILE file;
117       later it will be changed to a KIF file, but initially it will be
118       established as a RELATIVE file                                       }
119
120     USER_RECORD=RECORD
121
122       NEXT_RECORD       : PACKED ARRAY[1..4] OF CHAR ;
123       USER_CODE         : PACKED ARRAY[1..6] OF CHAR ;
124       USER_NAME         : PACKED ARRAY[1..30] OF CHAR ;
125       USER_TITLE        : PACKED ARRAY[1..30] OF CHAR ;
126       ADDRESS1          : PACKED ARRAY[1..30] OF CHAR ;
127       ADDRESS2          : PACKED ARRAY[1..30] OF CHAR ;
128       ADDRESS3          : PACKED ARRAY[1..30] OF CHAR ;
129       PHONE             : PACKED ARRAY[1..12] OF CHAR ;
130       MAX_STATUS        : CHAR ;
131       PRINTER           : CHAR ;
132       NUM_PROBLEMS      : PACKED ARRAY[1..4] OF CHAR ;
133       DATE_ENTERED      : PACKED ARRAY[1..8] OF CHAR ;
134       DATE_LAST_USED    : PACKED ARRAY[1..8] OF CHAR ;
135       TOTAL_TIMES       : PACKED ARRAY[1..6] OF CHAR ;
136     END ;
137
138
139     { The following is the record layout for the sequential USERPROB file;
140       late it will be changed to a KIF file, but initially it will be
141       established as a RELATIVE file                                       }
142
143     USER_PROBLEM_RECORD=RECORD
144
145       NEXT_RECORD       : PACKED ARRAY[1..4] OF CHAR ;
146       USER_CODE         : PACKED ARRAY[1..6] OF CHAR ;
147       PROBLEM_CODE      : PACKED ARRAY[1..8] OF CHAR ;
148       STATUS_CODE       : CHAR ;
149       TIMES_USED        : PACKED ARRAY[1..4] OF CHAR ;
150     END ;
151
152
153     {$PAGE}
154     { ******************************************************************}
155
156     { PROGRAM }
157
158     VAR
159
160     PROBLEM       : RANDOM FILE OF PROB_RECORD;
161     SITUATION     : RANDOM FILE OF SIT_RECORD;
162     DESCRIPTION   : RANDOM FILE OF DESC_RECORD;
163     USERFILE      : RANDOM FILE OF USER_RECORD;
164     U_PROB_FILE   : RANDOM FILE OF USER_PROBLEM_RECORD;
165
166     USER          : USER_RECORD;
167     USER_PROB     : USER_PROBLEM_RECORD;
168     PROB          : PROB_RECORD;
169     SIT           : SIT_RECORD;
170     DESC          : DESC_RECORD;
171
172     USER_CODE     :    PACKED ARRAY[1..6] OF CHAR ;
173     USER_RECORDS , U_PROB_RECORDS : INTEGER ;
174     USER_NAME , U_PROB_NAME  :  PACKED ARRAY[1..8] OF CHAR ;
175     PROBLEM_FILE : PACKED ARRAY[1..8] OF CHAR;
176     DESC_NODE , PROB_NODE , SIT_NODE   : PACKED ARRAY[1..8] OF CHAR;
177     VDT_BLK : VDT_CONTROL;
178
179     REPORT        : TEXT ;
180     PRINTER       : TEXT ;
181     PRNTNAME      : PACKED ARRAY[1..8] OF CHAR ;
182     BUFFER        : PACKED ARRAY[1..80] OF CHAR ;
183     REPTNAME      : PACKED ARRAY[1..8] OF CHAR ;
184     DATEPRNT      : PACKED ARRAY[1..8] OF CHAR ;
185
186     T , DUMY : CHAR;
```

```
187     VALID , DONE , OPEN , YES , OVAL , ERROR_STATUS :   BOOLEAN ;
188     STAT : INTEGER;
189     DUMMY : PACKED ARRAY[1..2] OF CHAR;
190
191
192     {$PAGE}
193     { ****************************************************************}
194
195
196     {      The following are screen and file handling procedures        }
197
198     PROCEDURE SETFILLER(VAR VDT$ : VDT_CONTROL ;
199        FILL_CHAR: CHAR);
200          EXTERNAL;
201
202     PROCEDURE CLEARSCREEN(VAR VDT$ : VDT_CONTROL);  EXTERNAL;
203
204     PROCEDURE INITSCREEN(VAR VDT$: VDT_CONTROL; LUNO: INTEGER); EXTERNAL;
205
206     PROCEDURE DISPLAY(VAR VDT$: VDT_CONTROL; LINE: INTEGER;
207        COLUMN : INTEGER; BUFFER: PACKED ARRAY[1..?] OF CHAR;
208        LENGTH : INTEGER); EXTERNAL;
209
210     PROCEDURE ACCEPT(VAR VDT$: VDT_CONTROL; LINE,COLUMN: INTEGER;
211        VAR BUFFER: PACKED ARRAY[1..?] OF CHAR; LENGTH: INTEGER;
212        VAR TERM_CHAR: CHAR); EXTERNAL;
213
214
215     { **************************************************************** }
216
217
218
219     PROCEDURE SET_UP;
220     BEGIN
221
222   3    INITSCREEN(VDT_BLK,0);
223   4    CLEARSCREEN(VDT_BLK);
224   5
225   6    PROB_NODE := 'PROBLEMS';
226   7    SIT_NODE  := 'SITUATNS';
227   8    DESC_NODE := 'DESCRIPT';
228   9    REPTNAME  := 'TEXTFILE';
229  10    PRNTNAME  := 'PRNTFILE';
230  11    DONE := FALSE;
231  12
232     END; {SET_UP }
233
234     { ****************************************************************}
235     { The following procedure clears a line on the display             }
236
237     PROCEDURE CLEAR_LINE (LINE_NUMBER : INTEGER);
238
239     VAR    LINE_DATA  :    PACKED ARRAY[1..80] OF CHAR ;
240                    N   :   CHAR ;
241
242     BEGIN
243
244   3    FOR N := 1 TO 80 DO
245   4       LINE_DATA[N] := ' ';
246   5    DISPLAY(VDT_BLK,LINE_NUMBER,1,LINE_DATA,80);
247   6
248     END ;  { CLEAR_LINE }
```

MAP OF IDENTIFIERS FOR CLEAR_LI

| IDENTIFIER NAME | KIND | SIZE (BYTES,BITS) | STACK DISPLACEMENT LEVEL(DISPL) | (BYTE,BIT) | PICTURE (PACKED FIELDS ONLY) |
|---|---|---|---|---|---|
| LINE_NUMBER | PARAMETER | (2,0) | #0028 | DIRECT | |
| LINE_DATA | VARIABLE | (80,0) | #002A | DIRECT | |
| N | VARIABLE | (0,8) | #007A | DIRECT | |

```
250      { ********************************************************** }
251      {          The following checks for correct "Y/N" response           }
252
253      PROCEDURE ACPT_YES_NO ( VAR YES_NO : CHAR;
254                                X , Y : INTEGER ;      { y/n also allowed }
255                              VAR STATUS_FLAG : BOOLEAN );
256
257         VAR    YES_NO_SET , YES_SET : SET_OF_CHAR;
258
259         BEGIN
260   2       STATUS_FLAG := FALSE ;
261   3       YES_NO_SET := ['Y','y','N','n'] ;
262   4       YES_SET := ['Y','y'] ;
263   5
264   6       REPEAT
265   7         ACCEPT(VDT_BLK,X,Y,DUMMY,1,T);
266   8         DECODE(DUMMY,1,STAT,YES_NO);
267   9       UNTIL ( YES_NO IN YES_NO_SET ) ;
268  10       IF ( YES_NO IN YES_SET ) THEN
269  11            STATUS_FLAG := TRUE;
270  12       IF YES_NO = 'y' THEN
271  13            YES_NO := 'Y';
272  14       IF YES_NO = 'n' THEN
273  15            YES_NO := 'N';
274         END;   { ACPT_YES_NO }
```

MAP OF IDENTIFIERS FOR  ACPT_YES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
275
276
277      { ********************************************************** }
278
279      PROCEDURE QUESTIONAIRE_PRINT ;
280
281      VAR    TOTAL_QUESTIONS    : INTEGER ;
282             COUNTER            : INTEGER ;
283             YES_NO             : PACKED ARRAY[1..3] OF CHAR ;
284
285      BEGIN  { QUESTIONAIRE_PRINT }
286
287   3    WRITELN(REPORT);
288   4    WRITELN(REPORT,'     EXAMPLE NAME: _____',
289   5                   '  ID NUMBER: _____');
290   6    WRITELN(REPORT);
291   7    WRITELN(REPORT);
292   8    WRITELN(REPORT,'                    Q U E S T I O N N A I R E   ',
293   9                   ' L I S T I N G');
294  10    WRITELN(REPORT);
295  11    WRITELN(REPORT);
296  12    WRITELN(REPORT,'QUEST.        DESCRIPTION                    UNITS',
297  13                   '   REQUIRED?      RESPONSE ');
298  14    WRITELN(REPORT,'-----  --------------------------------  --------',
299  15                   '   ---  ----------   ---------------- ');
300  16    WRITELN(REPORT);
301  17
302  18    READ(PROBLEM,0,PROB);
303  19    TOTAL_QUESTIONS := PROB.NEXT_QUESTION - 1 ;
304  20
305  21    COUNTER := 1 ;
306  22    FOR N := 1 TO TOTAL_QUESTIONS DO
307  23    BEGIN
308  24
309  25      READ(PROBLEM,N,PROB);
```

```
310 26
311 27        IF PROB.REQUIRED = 'Y' THEN YES_NO := 'YES
312 28           ELSE YES_NO := 'NO ' ;
313 29
314 30        IF PROB.STATUS_CODE = 'D' THEN
315 31           WRITELN(REPORT,COUNTER:3,'    ',PROB.DESC_QUESTION,'  ',
316 32                 '     * * * * * D E L E T E D * * * * ')
317 33        ELSE BEGIN
318 34           IF PROB.CALCULATE = 'Y' THEN
319 35              WRITELN(REPORT,COUNTER:3,'    ',PROB.DESC_QUESTION,'  ',
320 36                    '    * * * CALCULATED BY SYSTEM * * *    ')
321 37           ELSE
322 38              WRITELN(REPORT,COUNTER:3,'    ',PROB.DESC_QUESTION,'  ',
323 39                 PROB.UNIT_DESC,'       ',YES_NO,'         ',
324 40                 '_____');
325 41        END ;
326 42        WRITELN(REPORT);
327 43
328 44        COUNTER := COUNTER + 1 ;
329 45
330 46     END ;
331 47
332     END ;   { QUESTIONAIRE_PRINT }

MAP OF IDENTIFIERS FOR   QUESTION

IDENTIFIER NAME    KIND        SIZE           STACK               PICTURE
                            (BYTES,BITS)  DISPLACEMENT       (PACKED FIELDS ONLY)
                            LEVEL(DISPL)   (BYTE,BIT)

TOTAL_QUESTIONS  VARIABLE    (2,0)         #0028       DIRECT
COUNTER          VARIABLE    (2,0)         #002A       DIRECT
YES_NO           VARIABLE    (4,0)         #002C       DIRECT 333
334
335    { ******************************************************************}
336
337    PROCEDURE SCRN1_DISPLAY ;     { First screen format }
338
339    BEGIN
340  2   DISPLAY(VDT_BLK,1,12,'P A R A D O C S    D E V E L O P M E N T',
341  3                                                            99);
342  4   DISPLAY(VDT_BLK,1,56,'S Y S T E M',99);
343  5   DISPLAY(VDT_BLK,2,21,'**** PROBLEM QUESTIONNAIRE LISTING ****',
344  6                                                            99);
345  7   DISPLAY(VDT_BLK,4,13,'YOUR USER CODE: ',99);
346  8   DISPLAY(VDT_BLK,6,06,'         PROBLEM CODE: ',99);
347  9   DISPLAY(VDT_BLK,6,45,'(no entry when completed)',99);
348    END; { SCRN1_DISPLAY }
349
350    { ******************************************************************}
351    {$PAGE}
352    { ******************************************************************}
353
354    BEGIN   { MAIN PROGRAM }
355
356  3 SET_UP ;
357  4
358  5 USER_NAME := 'USERFILE';
359  6 U_PROB_NAME := 'UPRBFILE';
360  7
361  8 { Open the user and user/problem files                                }
362  9
363 10 SETNAME(USERFILE,USER_NAME);
364 11 IOTERM(USERFILE,OVAL,TRUE);
365 12 EXTEND(USERFILE);
366 13 READ(USERFILE,0,USER);
367 14 DECODE(USER.NEXT_RECORD,1,STAT,USER_RECORDS);
368 15 USER_RECORDS := USER_RECORDS - 1 ;
369 16
370 17 SETNAME(U_PROB_FILE,U_PROB_NAME);
371 18 IOTERM(U_PROB_FILE,OVAL,TRUE);
```

```
372 19 EXTEND(U_PROB_FILE);
373 20 READ(U_PROB_FILE,0,USER_PROB);
374 21 DECODE(USER_PROB.NEXT_RECORD,1,STAT,U_PROB_RECORDS);
375 22 U_PROB_RECORDS := U_PROB_RECORDS - 1 ;
376 23
377 24 SCRN1_DISPLAY ;
378 25 DONE := FALSE ;
379 26 ERROR_STATUS := TRUE ;
380 27
381 28 { The following accepts a valid user code and terminates if no etnry }
382 29
383 30 REPEAT
384 31    ACCEPT(VDT_BLK,4,29,USER_CODE,6,T);
385 32    IF USER_CODE = '        ' THEN DONE := TRUE ;
386 33    IF NOT DONE THEN FOR T := 0 TO USER_RECORDS DO
387 34    IF ERROR_STATUS THEN
388 35    BEGIN
389 36       READ(USERFILE,T,USER);
390 37       IF USER.USER_CODE = USER_CODE THEN
391 38          ERROR_STATUS := FALSE ;
392 39    END ;
393 40
394 41    IF NOT ERROR_STATUS THEN
395 42    BEGIN
396 43       DISPLAY(VDT_BLK,4,23,'NAME',99);
397 44       DISPLAY(VDT_BLK,4,42,'                        ',99);
398 45       DISPLAY(VDT_BLK,4,29,USER.USER_NAME,30);
399 46    END ELSE
400 47    BEGIN
401 48       DISPLAY(VDT_BLK,4,42,'Sorry, this code is not valid',99);
402 49    END ;
403 50
404 51 UNTIL DONE OR NOT ERROR_STATUS ;
405 52
406 53 WHILE NOT DONE DO
407 54 BEGIN
408 55
409 56 { The following rouine accepts a problem file name, checks to see if
410 57   this user is entitled to use the program, checks to see if it still
411 58   exists, and opens up the problem, situation and description files;
412 59   if nothing is enterd, the program will terminate                    }
413 60
414 61 IF NOT DONE THEN REPEAT
415 62
416 63    ACCEPT(VDT_BLK,6,29,PROBLEM_FILE,8,T);
417 64    OPEN := TRUE ;
418 65    VALID := FALSE ;
419 66    IF PROBLEM_FILE = '        ' THEN DONE := TRUE ;
420 67
421 68    IF NOT DONE THEN FOR T := 0 TO U_PROB_RECORDS DO
422 69    IF NOT VALID THEN
423 70    BEGIN
424 71       READ(U_PROB_FILE,T,USER_PROB);
425 72       IF USER_PROB.USER_CODE = USER_CODE
426 73          AND USER_PROB.PROBLEM_CODE = PROBLEM_FILE
427 74             AND USER_PROB.STATUS_CODE <> 'D' THEN
428 75                VALID := TRUE ;
429 76    END ;
430 77
431 78    IF NOT VALID THEN OPEN := FALSE ;
432 79
433 80    IF NOT DONE AND VALID THEN
434 81    BEGIN
435 82
436 83 { Open up problem file                                                 }
437 84
438 85       CLOSE(PROBLEM);
439 86       SETMEMBER(PROBLEM,PROB_NODE,PROBLEM_FILE);
440 87       IOTERM(PROBLEM,OVAL,FALSE);
441 88       RESET(PROBLEM);
442 89       IF STATUS(PROBLEM) <> 0 THEN
443 90          OPEN := FALSE ;
444 91
445 92       IF OPEN THEN
```

```
446 93     BEGIN
447 94        CLOSE(PROBLEM);
448 95        IOTERM(PROBLEM,OVAL,TRUE);
449 96        EXTEND(PROBLEM);
450 97     END ;
451 98
452 99 { Open up description file                                              }
453100
454101     IF OPEN THEN
455102     BEGIN
456103        CLOSE(DESCRIPTION);
457104        SETMEMBER(DESCRIPTION,DESC_NODE,PROBLEM_FILE);
458105        IOTERM(DESCRIPTION,OVAL,TRUE);
459106        EXTEND(DESCRIPTION);
460107     END ;
461108
462109 { Open up situation file                                                }
463110
464111     IF OPEN THEN
465112     BEGIN
466113        CLOSE(SITUATION);
467114        SETMEMBER(SITUATION,SIT_NODE,PROBLEM_FILE);
468115        IOTERM(SITUATION,OVAL,TRUE);
469116        EXTEND(SITUATION);
470117     END ;
471118
472119     END ;
473120
474121 UNTIL OPEN OR DONE ;
475122
476123 IF NOT DONE THEN
477124 BEGIN
478125
479126     READ(PROBLEM,0,PROB);
480127     DISPLAY(VDT_BLK,6,42,PROB.DESCRIPTION,30);
481128
482129
483130     CLOSE(REPORT);
484131     SETNAME(REPORT,REPTNAME);
485132     REWRITE(REPORT);
486133     DATE(DATEPRNT);
487134     WRITELN(REPORT,'    USER NAME:        ',USER.USER_NAME,
488135                    '          DATE: ',DATEPRNT);
489136     WRITELN(REPORT);
490137     WRITELN(REPORT,'    PROBLEM CODE:    ',PROBLEM_FILE,
491138                    '         PROBLEM NAME:   ',PROB.DESCRIPTION);
492139     WRITELN(REPORT);
493140
494141     QUESTIONAIRE_PRINT ;
495142
496143     RESET(REPORT);
497144
498145 { This will allow the report to be printed if printer available         }
499146
500147     REPEAT
501148        CLEAR_LINE(14);
502149        DISPLAY(VDT_BLK,14,21,'READY TO PRINT THIS QUEST',99);
503150        DISPLAY(VDT_BLK,14,46,'IONAIRE ?   [ ]    ',99);
504151        ACPT_YES_NO(DUMY,14,58,YES);
505152        CLEAR_LINE(10);
506153        IF YES THEN
507154        BEGIN
508155
509156           CLOSE(PRINTER);
510157           SETNAME(PRINTER,PRNTNAME);
511158           IOTERM(PRINTER,OVAL,FALSE);
512159           EXTEND(PRINTER);
513160
514161           OPEN := TRUE ;
515162           IF STATUS(PRINTER) <> 0 THEN
516163              OPEN := FALSE ;
517164
518165           IF NOT OPEN THEN
```

```
519166             DISPLAY(VDT_BLK,10,20,'PRINTER NOT AVAILABLE AT THE MOMENT
520167                                                                    99);
521168        IF OPEN THEN
522169        BEGIN
523170
524171 { Print complete report
525172
526173             RESET(REPORT);
527174             WHILE NOT EOF(REPORT) DO
528175             BEGIN
529176                READ(REPORT,BUFFER);
530177                WRITELN(PRINTER,BUFFER);
531178             END;
532179
533180             PAGE(PRINTER);
534181             CLOSE(PRINTER);
535182             YES := FALSE
536183
537184        END ;
538185
539186     END ;
540187
541188     UNTIL NOT YES ;
542189
543190 { Go back for another problem entry until spaces are entered
544191
545192     CLEARSCREEN(VDT_BLK);
546193     SCRN1_DISPLAY;
547194     DISPLAY(VDT_BLK,4,23,'NAME',99);
548195     DISPLAY(VDT_BLK,4,29,USER.USER_NAME,30);
549196
550197 END ;   { "IF NOT DONE THEN " }
551198
552199 END ;   { "WHILE NOT DONE DO" }
553200
554    END.
```

MAP OF IDENTIFIERS FOR   LISTING_

| IDENTIFIER NAME | KIND | SIZE (BYTES,BITS) LEVEL(DISPL) | STACK DISPLACEMENT (BYTE,BIT) | PICTURE (PACKED FIELDS ONLY |
|---|---|---|---|---|
| PROB_RECORD | RECORD | (96,0) | | |
| PROBLEM_CODE | FIELD | (8,0) | (0,0) | UNPACKED |
| DESCRIPTION | FIELD | (30,0) | (8,0) | UNPACKED |
| NEXT_QUESTION | FIELD | (2,0) | (38,0) | UNPACKED |
| INT_QUESTIONS | FIELD | (2,0) | (40,0) | UNPACKED |
| TIMES_USED | FIELD | (2,0) | (42,0) | UNPACKED |
| TOPIC_CODE | FIELD | (8,0) | (44,0) | UNPACKED |
| DATE_ENTERED | FIELD | (8,0) | (52,0) | UNPACKED |
| DATE_LAST_USED | FIELD | (8,0) | (60,0) | UNPACKED |
| MENTOR_CODE | FIELD | (6,0) | (68,0) | UNPACKED |
| NUM_SITUATIONS | FIELD | (2,0) | (74,0) | UNPACKED |
| MINIMUM_LI | FIELD | (2,0) | (76,0) | UNPACKED |
| CALC_LI_FLAG | FIELD | (0,8) | (78,0) | UNPACKED |
| FLAG1_FUTURE | FIELD | (0,8) | (80,0) | UNPACKED |
| FLAG2_FUTURE | FIELD | (0,8) | (82,0) | UNPACKED |
| FLAG3_FUTURE | FIELD | (0,8) | (84,0) | UNPACKED |
| DATA_BASE | FIELD | (0,8) | (86,0) | UNPACKED |
| PRIMARY_CODE | FIELD | (8,0) | (88,0) | UNPACKED |
| NUM_QUESTION | FIELD | (2,0) | (0,0) | UNPACKED |
| DESC_QUESTION | FIELD | (30,0) | (2,0) | UNPACKED |
| YES_NO | FIELD | (0,8) | (32,0) | UNPACKED |
| CALCULATE | FIELD | (0,8) | (34,0) | UNPACKED |
| INT_QUEST | FIELD | (0,8) | (36,0) | UNPACKED |
| REFERENCE | FIELD | (0,8) | (38,0) | UNPACKED |
| UNIT_DESC | FIELD | (10,0) | (40,0) | UNPACKED |
| BOUNDARIES | FIELD | (2,0) | (50,0) | UNPACKED |
| LOWER_1_LIMIT | FIELD | (4,0) | (52,0) | UNPACKED |
| UPPER_1_LIMIT | FIELD | (4,0) | (56,0) | UNPACKED |
| LOWER_2_LIMIT | FIELD | (4,0) | (60,0) | UNPACKED |

| | | | | |
|---|---|---|---|---|
| UPPER_2_LIMIT | FIELD | (4,0) | (64,0) | UNPACKED |
| REQUIRED | FIELD | (0,8) | (68,0) | UNPACKED |
| LGCL_IMPT | FIELD | (2,0) | (70,0) | UNPACKED |
| EXPT_IMPT | FIELD | (2,0) | (72,0) | UNPACKED |
| LGCL_INTR | FIELD | (2,0) | (74,0) | UNPACKED |
| EXPT_INTR | FIELD | (2,0) | (76,0) | UNPACKED |
| LGCL_CMPL | FIELD | (2,0) | (78,0) | UNPACKED |
| EXPT_CMPL | FIELD | (2,0) | (80,0) | UNPACKED |
| STATUS_CODE | FIELD | (0,8) | (82,0) | UNPACKED |
| SORT_FLAG | FIELD | (0,8) | (84,0) | UNPACKED |
| FLAG6_FUTURE | FIELD | (0,8) | (86,0) | UNPACKED |
| FLAG7_FUTURE | FIELD | (0,8) | (88,0) | UNPACKED |
| FLAG8_FUTURE | FIELD | (0,8) | (90,0) | UNPACKED |
| SIT_RECORD | RECORD | (250,0) | | |
| SIT_NUM | FIELD | (4,0) | (0,0) | UNPACKED |
| SIT_DESCRIPTION | FIELD | (80,0) | (4,0) | UNPACKED |
| NEXT_SIT | FIELD | (2,0) | (84,0) | UNPACKED |
| PROB1_LINK | FIELD | (8,0) | (86,0) | UNPACKED |
| PROB2_LINK | FIELD | (8,0) | (94,0) | UNPACKED |
| PROB3_LINK | FIELD | (8,0) | (102,0) | UNPACKED |
| PROB4_LINK | FIELD | (8,0) | (110,0) | UNPACKED |
| AUTHOR_CODE | FIELD | (6,0) | (118,0) | UNPACKED |
| DATE_ENTERED | FIELD | (8,0) | (124,0) | UNPACKED |
| DATE_LAST_USED | FIELD | (8,0) | (132,0) | UNPACKED |
| NUM_ENCOUNTERS | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |
| TEXT_LINE | FIELD | (80,0) | (8,0) | UNPACKED |
| USER_RECORD | RECORD | (202,0) | | |
| NEXT_RECORD | FIELD | (4,0) | (0,0) | UNPACKED |
| USER_CODE | FIELD | (6,0) | (4,0) | UNPACKED |
| USER_NAME | FIELD | (30,0) | (10,0) | UNPACKED |
| USER_TITLE | FIELD | (30,0) | (40,0) | UNPACKED |
| ADDRESS1 | FIELD | (30,0) | (70,0) | UNPACKED |
| ADDRESS2 | FIELD | (30,0) | (100,0) | UNPACKED |
| ADDRESS3 | FIELD | (30,0) | (130,0) | UNPACKED |
| PHONE | FIELD | (12,0) | (160,0) | UNPACKED |
| MAX_STATUS | FIELD | (0,8) | (172,0) | UNPACKED |
| PRINTER | FIELD | (0,8) | (174,0) | UNPACKED |
| NUM_PROBLEMS | FIELD | (4,0) | (176,0) | UNPACKED |
| DATE_ENTERED | FIELD | (8,0) | (180,0) | UNPACKED |
| DATE_LAST_USED | FIELD | (8,0) | (188,0) | UNPACKED |
| TOTAL_TIMES | FIELD | (6,0) | (196,0) | UNPACKED |
| USER_PROBLEM_RECORD | RECORD | (24,0) | | |
| NEXT_RECORD | FIELD | (4,0) | (0,0) | UNPACKED |
| USER_CODE | FIELD | (6,0) | (4,0) | UNPACKED |
| PROBLEM_CODE | FIELD | (8,0) | (10,0) | UNPACKED |
| STATUS_CODE | FIELD | (0,8) | (18,0) | UNPACKED |
| TIMES_USED | FIELD | (4,0) | (20,0) | UNPACKED |
| PROBLEM | VARIABLE | (32,0) | #0080 | DIRECT |
| SITUATION | VARIABLE | (32,0) | #00A0 | DIRECT |
| DESCRIPTION | VARIABLE | (32,0) | #00C0 | DIRECT |
| USERFILE | VARIABLE | (32,0) | #00E0 | DIRECT |
| U_PROB_FILE | VARIABLE | (32,0) | #0100 | DIRECT |
| USER | VARIABLE | (202,0) | #0120 | DIRECT |
| USER_PROB | VARIABLE | (24,0) | #01EA | DIRECT |
| PROB | VARIABLE | (96,0) | #0202 | DIRECT |
| SIT | VARIABLE | (250,0) | #0262 | DIRECT |
| DESC | VARIABLE | (88,0) | #035C | DIRECT |
| USER_CODE | VARIABLE | (6,0) | #03B4 | DIRECT |
| USER_RECORDS | VARIABLE | (2,0) | #03BA | DIRECT |
| U_PROB_RECORDS | VARIABLE | (2,0) | #03BC | DIRECT |
| USER_NAME | VARIABLE | (8,0) | #03BE | DIRECT |

```
U_PROB_NAME     VARIABLE    (8,0)       #03C6   DIRECT
PROBLEM_FILE    VARIABLE    (8,0)       #03CE   DIRECT
DESC_NODE       VARIABLE    (8,0)       #03D6   DIRECT
PROB_NODE       VARIABLE    (8,0)       #03DE   DIRECT
SIT_NODE        VARIABLE    (8,0)       #03E6   DIRECT
VDT_BLK         VARIABLE    (32,0)      #03EE   DIRECT
REPORT          VARIABLE    (32,0)      #040E   DIRECT
PRINTER         VARIABLE    (32,0)      #042E   DIRECT
PRNTNAME        VARIABLE    (8,0)       #044E   DIRECT
BUFFER          VARIABLE    (80,0)      #0456   DIRECT
REPTNAME        VARIABLE    (8,0)       #04A6   DIRECT
DATEPRNT        VARIABLE    (8,0)       #04AE   DIRECT
T               VARIABLE    (0,8)       #04B6   DIRECT
DUMY            VARIABLE    (0,8)       #04B8   DIRECT
VALID           VARIABLE    (0,1)       #04BA   DIRECT
DONE            VARIABLE    (0,1)       #04BC   DIRECT
OPEN            VARIABLE    (0,1)       #04BE   DIRECT
YES             VARIABLE    (0,1)       #04C0   DIRECT
OVAL            VARIABLE    (0,1)       #04C2   DIRECT
ERROR_STATUS    VARIABLE    (0,1)       #04C4   DIRECT
STAT            VARIABLE    (2,0)       #04C6   DIRECT
DUMMY           VARIABLE    (2,0)       #04C8   DIRECT
```

MAXIMUM NUMBER OF IDENTIFIERS USED = 159

DXPSCL  1.7.1  81.254   OPTIMIZATION SUMMARY

"SET_UP  " -- 5100 HEAP BYTES REQUIRED TO OPTIMIZE AT LEVEL 1

"CLEAR_LI" -- 5000 HEAP BYTES REQUIRED TO OPTIMIZE AT LEVEL 1

"ACPT_YES" -- 5500 HEAP BYTES REQUIRED TO OPTIMIZE AT LEVEL 1

"QUESTION" -- 7300 HEAP BYTES REQUIRED TO OPTIMIZE AT LEVEL 1

"SCRN1_DI" -- 5200 HEAP BYTES REQUIRED TO OPTIMIZE AT LEVEL 1

"LISTING_" -- 12600 HEAP BYTES REQUIRED TO OPTIMIZE AT LEVEL 1

```
            INSTRUCTIONS =    33
            SET_UP    LITERALS =    66   CODE =    124   DATA =    40

INSTRUCTIONS =    27
            CLEAR_LI  LITERALS =    24   CODE =    112   DATA =   124

INSTRUCTIONS =    66
            ACPT_YES  LITERALS =   102   CODE =    268   DATA =   114

INSTRUCTIONS =   231
            QUESTION  LITERALS =   494   CODE =   1096   DATA =    54

INSTRUCTIONS =    58
            SCRN1_DI  LITERALS =   222   CODE =    306   DATA =    40

INSTRUCTIONS =   710
            LISTING_  LITERALS =   466   CODE =   3014   DATA =  1232
```

SOURCE  = .PARADOCS.SRC USERFILE
    OBJECT  = .PARADOCS.OBJ USERFILE
    LISTING = .PARADOCS.LSI.USERFILE
    MESSAGE = .PARADOCS.L
    MEM1 = 6,4
    MEM2 = 13,4
    MEM3 = 10,4
    PRINT WIDTH = 80
    NUMBER OF LINES/PAGE = 60
    OPTIONS = (* NO OPTIONS SPECIFIED *)
    SUPPRESS PREPROCESSOR LINES = YES

LINE NUMBER                 COPY FILE PATHNAME
        26      .PARADOCS.SRC.LAYOUT
        46      .PARADOCS.SRC.VAR
        76      .PARADOCS.SRC.IO

```
1   ($WIDELIST,MAP,PAGE,CKINDEX}
2
3   { ***********************************************************
4
5     The following is a flowchart of the procedures used (excluding
6     screen and other small misc. procedures):
7
8                        USER_FILE_MAINTENANCE
9                                 !
10                                !
11    ----------------------------------------------------------
12         !            !            !            !           !
13         !            !            !            !           !
14      SET_UP     SCRN1 DISPLAY  CHECK_CODE  CAPTURE_DATA  PROBLEMS
15
16
17     ***********************************************************}
18
19
20
21  PROGRAM USER_FILE_MAINTENANCE ;
22
23  TYPE
24
25      SET_OF_CHAR = SET OF CHAR ;
26      VDT_CONTROL = ARRAY[1..16] OF INTEGER;
27
28  { The following is the record layout for the relative PROBLEM file }
29
30  PROB_RECORD=RECORD        CASE BOOLEAN OF
31                     TRUE:
32
33  { This is the "0" record layout for this file }
34
35      (PROBLEM_CODE     : PACKED ARRAY[1..8] OF CHAR;
36       DESCRIPTION      : PACKED ARRAY[1..30] OF CHAR;
37       NEXT_QUESTION    : INTEGER ;
38       INT_QUESTIONS    : INTEGER ;
39       TIMES_USED       : INTEGER ;
40       TOPIC_CODE       : PACKED ARRAY[1..8] OF CHAR;
41       DATE_ENTERED     : PACKED ARRAY[1..8] OF CHAR;
42       DATE_LAST_USED   : PACKED ARRAY[1..8] OF CHAR;
43       MENTOR_CODE      : PACKED ARRAY[1..6] OF CHAR;
44       NUM_SITUATIONS   : INTEGER ;
45       MINIMUM_LI       : INTEGER ;
46       CALC_LI_FLAG     : CHAR ;
47       FLAG1_FUTURE     : CHAR ;
48       FLAG2_FUTURE     : CHAR ;
49       FLAG3_FUTURE     : CHAR ;
50       DATA_BASE        : CHAR ;
51       PRIMARY_CODE     : PACKED ARRAY[1..8] OF CHAR);
52
53
54                     FALSE:
55
56  { This is the "1" through "Nth" record layout    }
57
58      (NUM_QUESTION     : PACKED ARRAY[1..2] OF CHAR;
59       DESC_QUESTION    : PACKED ARRAY[1..30] OF CHAR;
60       YES_NO           : CHAR;
61       CALCULATE        : CHAR;
62       INT_QUEST        : CHAR;
63       REFERENCE        : CHAR;
64       UNIT_DESC        : PACKED ARRAY[1..10] OF CHAR;
65       BOUNDARIES       : INTEGER ;
66       LOWER_1_LIMIT    : REAL ;
67       UPPER_1_LIMIT    : REAL ;
68       LOWER_2_LIMIT    : REAL ;
69       UPPER_2_LIMIT    : REAL ;
70       REQUIRED         : CHAR;
71       LGCL_IMPT        : INTEGER ;
72       EXPT_IMPT        : INTEGER ;
73       LGCL_INTR        : INTEGER ;
74       EXPT_INTR        : INTEGER ;
```

```
 75        LGCL_CMPL         : INTEGER ;
 76        EXPT_CMPL         : INTEGER ;
 77        STATUS_CODE       : CHAR;
 78        SORT_FLAG         : CHAR;
 79        FLAG6_FUTURE      : CHAR;
 80        FLAG7_FUTURE      : CHAR;
 81        FLAG8_FUTURE      : CHAR)
 82     END;
 83
 84
 85     { The following is the record layout for the relative SITUATION file }
 86
 87     SIT_RECORD=RECORD
 88
 89        SIT_NUM           : PACKED ARRAY[1..4] OF CHAR;
 90        SIT_DESCRIPTION   : PACKED ARRAY[1..80] OF CHAR;
 91        NEXT_SIT          : INTEGER ;
 92        PROB1_LINK        : PACKED ARRAY[1..8] OF CHAR;
 93        PROB2_LINK        : PACKED ARRAY[1..8] OF CHAR;
 94        PROB3_LINK        : PACKED ARRAY[1..8] OF CHAR;
 95        PROB4_LINK        : PACKED ARRAY[1..8] OF CHAR;
 96        AUTHOR_CODE       : PACKED ARRAY[1..6] OF CHAR;
 97        DATE_ENTERED      : PACKED ARRAY[1..8] OF CHAR;
 98        DATE_LAST_USED    : PACKED ARRAY[1..8] OF CHAR;
 99        NUM_ENCOUNTERS    : INTEGER ;
100        SINC_STRING       : PACKED ARRAY[1..50] OF INTEGER ;   { ########## }
101        FLAG1_FUTURE      : CHAR ,
102        FLAG2_FUTURE      : CHAR ,
103        FLAG3_FUTURE      : CHAR ;
104        FLAG4_FUTURE      : CHAR ;
105     END;
106
107
108     { The following is the record layout for the relative DESCRIPTION file }
109
110     DESC_RECORD=RECORD
111
112        NEXT_RECORD       : PACKED ARRAY[1..4] OF CHAR;
113        SIT_NUMBER        : PACKED ARRAY[1..4] OF CHAR;
114        TEXT_LINE         : PACKED ARRAY[1..80] OF CHAR;
115     END;
116
117
118     { The following is the record layout for the sequential USERFILE file;
119       later it will be changed to a KIF file, but initially it will be
120       established as a RELATIVE file                                      }
121
122     USER_RECORD=RECORD
123
124        NEXT_RECORD       : PACKED ARRAY[1..4] OF CHAR ;
125        USER_CODE         : PACKED ARRAY[1..6] OF CHAR ;
126        USER_NAME         : PACKED ARRAY[1..30] OF CHAR ;
127        USER_TITLE        : PACKED ARRAY[1..30] OF CHAR ;
128        ADDRESS1          : PACKED ARRAY[1..30] OF CHAR ;
129        ADDRESS2          : PACKED ARRAY[1..30] OF CHAR ;
130        ADDRESS3          : PACKED ARRAY[1..30] OF CHAR ;
131        PHONE             : PACKED ARRAY[1..12] OF CHAR ;
132        MAX_STATUS        : CHAR ;
133        PRINTER           : CHAR ;
134        NUM_PROBLEMS      : PACKED ARRAY[1..4] OF CHAR ;
135        DATE_ENTERED      : PACKED ARRAY[1..8] OF CHAR ;
136        DATE_LAST_USED    : PACKED ARRAY[1..8] OF CHAR ;
137        TOTAL_TIMES       : PACKED ARRAY[1..6] OF CHAR ;
138     END ;
139
140
141     { The following is the record layout for the sequential USERPROB file;
142       late it will be changed to a KIF file, but initially it will be
143       established as a RELATIVE file                                      }
144
145     USER_PROBLEM_RECORD=RECORD
146
147        NEXT_RECORD       : PACKED ARRAY[1..4] OF CHAR ;
148        USER_CODE         : PACKED ARRAY[1..6] OF CHAR ;
```

```
149      PROBLEM_CODE      : PACKED ARRAY[1..8] OF CHAR ;
150      STATUS_CODE       : CHAR ;
151      TIMES_USED        : PACKED ARRAY[1..4] OF CHAR ;
152    END ;
153
154    { The following is the layout for the file which keeps track of each
155      mentor's contribution to the Super-Paradocs program so that a special
156      (future) version of EXAMPLE can replicate how he/she would respond
157      to a given set of data independent of other mentor's questions     }
158
159    MENTOR_RECORD = RECORD
160      NEXT_RCD    : INTEGER ;
161      MENTOR      : PACKED ARRAY[1..6] OF CHAR ;
162      QUESTIONS   : PACKED ARRAY[1..50] OF INTEGER ;    { ########## }
163    END ;
164
165    {$PAGE}
166    { *******************************************************************}
167
168    { PROGRAM }
169
170    VAR
171
172    PROBLEM       : RANDOM FILE OF PROB_RECORD;
173    SITUATION     : RANDOM FILE OF SIT_RECORD;
174    DESCRIPTION   : RANDOM FILE OF DESC_RECORD;
175    USERFILE      : RANDOM FILE OF USER_RECORD;
176    U_PROB_FILE   : RANDOM FILE OF USER_PROBLEM_RECORD;
177
178    USER          : USER_RECORD;
179    USER_PROB     : USER_PROBLEM_RECORD;
180    PROB          : PROB_RECORD;
181    SIT           : SIT_RECORD;
182    DESC          : DESC_RECORD;
183
184    USER_CODE     : PACKED ARRAY[1..6] OF CHAR ;
185    USER_RECORDS , U_PROB_RECORDS : INTEGER ;
186    USER_NAME , U_PROB_NAME : PACKED ARRAY[1..8] OF CHAR ;
187    PROBLEM_FILE  : PACKED ARRAY[1..8] OF CHAR;
188    DESC_NODE , PROB_NODE , SIT_NODE : PACKED ARRAY[1..8] OF CHAR;
189    VDT_BLK : VDT_CONTROL;
190
191    MENTOR_FILE   : RANDOM FILE OF MENTOR_RECORD ;
192    MENTOR_RCD    : MENTOR_RECORD ;
193    MENTNAME      : PACKED ARRAY[1..8] OF CHAR ;
194    MENTRCDS      : INTEGER ;
195
196    REPORT        : TEXT ;
197    PRINTER       : TEXT ;
198
199    OLD_CODE      : PACKED ARRAY[1..6] OF CHAR ;
200    OPR_CODE      : PACKED ARRAY[1..6] OF CHAR ;
201    USER_STATUS   : CHAR ;
202    NUMBER_OF_PROBLEMS , IOSTAT : INTEGER ;
203    USERNAME      : PACKED ARRAY[1..30] OF CHAR ;
204    OPR_NAME      : PACKED ARRAY[1..30] OF CHAR ;
205
206    PRNTNAME      : PACKED ARRAY[1..8] OF CHAR ;
207    BUFFER        : PACKED ARRAY[1..80] OF CHAR ;
208    REPTNAME      : PACKED ARRAY[1..8] OF CHAR ;
209    T , DUMY : CHAR;
210    DONE , FOUND , YES , OVAL , ERROR_STATUS , CHANGE : BOOLEAN ;
211    NO_ENTRY, CODE_CHANGE , NEW_USER , DUPLICATE : BOOLEAN ;
212    LIMIT , PROB_RCD_NUMBER , COUNTER , USER_RCD_NUMBER , STAT : INTEGER;
213    DUMMY : PACKED ARRAY[1..2] OF CHAR;
214
215
216    {$PAGE}
217    { *******************************************************************}
218
219
```

```
220     {      The following are screen and file handling procedures        }
221
222     PROCEDURE SETFILLER(VAR VDT$ : VDT_CONTROL ;
223       FILL_CHAR: CHAR);
224         EXTERNAL;
225
226     PROCEDURE CLEARSCREEN(VAR VDT$ : VDT_CONTROL);   EXTERNAL;
227
228     PROCEDURE INITSCREEN(VAR VDT$: VDT_CONTROL; LUNO: INTEGER); EXTERNAL;
229
230     PROCEDURE DISPLAY(VAR VDT$: VDT_CONTROL; LINE: INTEGER;
231        COLUMN : INTEGER; BUFFER: PACKED ARRAY[1..?] OF CHAR;
232        LENGTH : INTEGER); EXTERNAL;
233
234     PROCEDURE ACCEPT(VAR VDT$: VDT_CONTROL; LINE,COLUMN: INTEGER;
235        VAR BUFFER: PACKED ARRAY[1..?] OF CHAR; LENGTH: INTEGER;
236        VAR TERM_CHAR: CHAR); EXTERNAL;
237
238
239     { ****************************************************************** }
240
241
242
243     { ****************************************************************** }
244
245     PROCEDURE SET_UP;
246     BEGIN
247
248  3    INITSCREEN(VDT_BLK,0);
249  4    CLEARSCREEN(VDT_BLK);
250  5
251  6    PROB_NODE  := 'PROBLEMS';
252  7    SIT_NODE   := 'SITUATNS';
253  8    USER_NAME  := 'USERFILE';
254  9    U_PROB_NAME := 'UPRBFILE';
255 10    REPTNAME   := 'TEXTFILE';
256 11    PRNTNAME   := 'PRNTFILE';
257 12    MENTNAME   := 'MENTFILE';
258 13    DONE := FALSE;
259 14
260 15 { Check to see if user file exists; if not, establish it on disk and
261 16   write an initial record into it as a "mentor" under code "EKS".    }
262 17
263 18    SETNAME(USERFILE,USER_NAME);
264 19    IOTERM(USERFILE,OVAL,FALSE);
265 20    RESET(USERFILE);
266 21
267 22    IF STATUS(USERFILE) <> 0 THEN
268 23    BEGIN
269 24       EXTEND(USERFILE);
270 25       USER.NEXT_RECORD    := '    1';
271 26       USER.USER_CODE      := 'EKS     ';
272 27       USER.USER_NAME      := 'Ewald Kluge, III              ';
273 28       USER.USER_TITLE     := 'Programmer Extrordinaire      ';
274 29       USER.ADDRESS1       := 'syntelligence                 ';
275 30       USER.ADDRESS2       := '31390 Northwestern Hwy Suite A';
276 31       USER.ADDRESS3       := 'Farmington Hills,  MI  48018  ';
277 32       USER.PHONE          := '313-851-6645';
278 33       USER.MAX_STATUS     := 'M';
279 34       USER.PRINTER        := ' ';         {##########}
280 35       USER.NUM_PROBLEMS   := '    ';      {##########}
281 36       DATE(USER.DATE_LAST_USED);
282 37       USER.TOTAL_TIMES    := '    ';      {##########}
283 38       IF STATUS(USERFILE) = 0 THEN
284 39       BEGIN
285 40          WRITE(USERFILE,0,USER);
286 41       END ;
287 42    END ;
288 43
289 44    SETNAME(U_PROB_FILE,U_PROB_NAME);
290 45    IOTERM(U_PROB_FILE,OVAL,FALSE);
291 46    RESET(U_PROB_FILE);
292 47    IF STATUS(U_PROB_FILE) <> 0 THEN
```

```
293 48     BEGIN
294 49        EXTEND(U_PROB_FILE);
295 50        USER_PROB.NEXT_RECORD   := '    1';
296 51        USER_PROB.USER_CODE     := '       ';
297 52        USER_PROB.PROBLEM_CODE  := '         ';
298 53        USER_PROB.STATUS_CODE   := ' ';
299 54        USER_PROB.TIMES_USED    := '   ';
300 55        IF STATUS(U_PROB_FILE) = 0 THEN
301 56        BEGIN
302 57           WRITE(U_PROB_FILE,0,USER_PROB);
303 58        END ;
304 59     END ;
305 60
306 61     CLOSE(USERFILE);
307 62     IOTERM(USERFILE,OVAL,TRUE);
308 63     EXTEND(USERFILE);
309 64
310 65     CLOSE(U_PROB_FILE);
311 66     IOTERM(U_PROB_FILE,OVAL,TRUE);
312 67     EXTEND(U_PROB_FILE);
313 68
314 69     READ(USERFILE,0,USER);
315 70     DECODE(USER.NEXT_RECORD,1,STAT,USER_RECORDS);
316 71     READ(U_PROB_FILE,0,USER_PROB);
317 72     DECODE(USER_PROB.NEXT_RECORD,1,STAT,U_PROB_RECORDS);
318 73     USER_RECORDS := USER_RECORDS - 1 ;
319 74
320     END; {SET_UP }
321
322     { ***********************************************************}
323     { The following procedure clears a line on the display       }
324
325     PROCEDURE CLEAR_LINE (LINE_NUMBER : INTEGER);
326
327     VAR    LINE_DATA   :  PACKED ARRAY[1..80] OF CHAR ;
328
329     BEGIN
330
331 3    FOR N := 1 TO 80 DO
332 4       LINE_DATA[N] := ' ';
333 5    DISPLAY(VDT_BLK,LINE_NUMBER,1,LINE_DATA,80);
334 6
335     END ;   { CLEAR_LINE }
```

MAP OF IDENTIFIERS FOR  CLEAR_LI

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| LINE_NUMBER | PARAMETER | (2,0) | #0028 | DIRECT |
| LINE_DATA | VARIABLE | (80,0) | #002A | DIRECT |

```
336
337     { ***********************************************************}
338     {          The following checks for correct "Y/N" response    }
339
340     PROCEDURE ACPT_YES_NO ( VAR YES_NO : CHAR;
341                             X , Y : INTEGER ;    { y/n also allowed }
342                             VAR STATUS_FLAG : BOOLEAN );
343
344        VAR   YES_NO_SET , YES_SET : SET_OF_CHAR;
345
346        BEGIN
347 2       STATUS_FLAG := FALSE ;
348 3       YES_NO_SET := ['Y','y','N','n'] ;
349 4       YES_SET := ['Y','y'] ;
350 5
351 6       REPEAT
352 7          ACCEPT(VDT_BLK,X,Y,DUMMY,1,T);
353 8          DECODE(DUMMY,1,STAT,YES_NO);
354 9       UNTIL ( YES_NO IN YES_NO_SET ) ;
355 10      IF ( YES_NO IN YES_SET ) THEN
356 11         STATUS_FLAG := TRUE;
357 12      IF YES_NO = 'y' THEN
358 13         YES_NO := 'Y';
359 14      IF YES_NO = 'n' THEN
360 15         YES_NO := 'N';
```

MAP OF IDENTIFIERS FOR ACPT_YES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
362
363
364     { ********************************************************** }
365
366     PROCEDURE CHECK_CODE ( ROW , COLUMN : INTEGER ;
367                     VAR   DONE , ERROR_STATUS : BOOLEAN ;
368                     VAR   USER_RCD_NUMBER : INTEGER );
369
370     { This procedure captures a user code for a given row and column
371       and if it is blank, it marks the DONE boolean as true; if it
372       cannot find the entered code, it marks the ERROR_STATUS boolean
373       as true; if user code is found, the relative USER_RCD_NUMBER
374       is returned and the user name is displayed on the screen        }
375
376     VAR     NAME_POSITION  : INTEGER ;
377             LOCATED        : BOOLEAN ;
378
379     BEGIN   { CHECK_CODE }
380
381  3    DONE := FALSE ;
382  4    ERROR_STATUS := FALSE ;
383  5    NAME_POSITION := COLUMN + 10 ;
384  6
385  7    ACCEPT(VDT_BLK,ROW,COLUMN,USER_CODE,6,T);
386  8
387  9    IF USER_CODE = '      ' THEN DONE := TRUE ;
388 10
389 11    IF NOT DONE THEN
390 12    BEGIN
391 13       LOCATED := FALSE ;
392 14       USER_RCD_NUMBER := 0 ;
393 15       FOR T := 0 TO USER_RECORDS DO
394 16          IF NOT LOCATED THEN
395 17          BEGIN
396 18             READ(USERFILE,T,USER);
397 19             IF USER.USER_CODE = USER_CODE THEN
398 20                LOCATED := TRUE ;
399 21             IF NOT LOCATED THEN USER_RCD_NUMBER := USER_RCD_NUMBER + 1 ;
400 22          END ;
401 23
402 24       IF NOT LOCATED THEN ERROR_STATUS := TRUE
403 25       ELSE BEGIN
404 26          DISPLAY(VDT_BLK,ROW,NAME_POSITION,USER.USER_NAME,30);
405 27          USERNAME := USER.USER_NAME ;
406 28       END ;
407 29    END ;
408 30
409     END ;   { CHECK_CODE }
```

MAP OF IDENTIFIERS FOR CHECK_CO

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| ROW | PARAMETER | (2,0) | #0028 | DIRECT |
| COLUMN | PARAMETER | (2,0) | #002A | DIRECT |
| DONE | PARAMETER | (0,1) | #002C | INDIRECT |
| ERROR_STATUS | PARAMETER | (0,1) | #002E | INDIRECT |
| USER_RCD_NUMBER | PARAMETER | (2,0) | #0030 | INDIRECT |
| NAME_POSITION | VARIABLE | (2,0) | #0032 | DIRECT |
| LOCATED | VARIABLE | (0,1) | #0034 | DIRECT |

```
410
411    { *****************************************************************}
412
413    PROCEDURE SCRN1_DISPLAY ;       { First screen format }
414
415    BEGIN
416  2    CLEARSCREEN(VDT_BLK);
417  3    DISPLAY(VDT_BLK,1,12,'P A R A D O C S     D E V E L O P M E N T',
418  4                                                                99);
419  5    DISPLAY(VDT_BLK,1,56,'S Y S T E M',99);
420  6    DISPLAY(VDT_BLK,2,22,'**** USER FILE MAINTENANCE ****',99);
421  7    DISPLAY(VDT_BLK,4,05,'ENTER YOUR USER CODE :    [        ] ',99);
422  8    DISPLAY(VDT_BLK,6,05,'CODE TO ADD OR CHANGE :   [        ] ',99);
423  9    DISPLAY(VDT_BLK,6,41,'( no entry when completed )',99);
424 10    DISPLAY(VDT_BLK,08,10,'USER CODE :         [        ]',99);
425 11    DISPLAY(VDT_BLK,09,10,'USER NAME :         [',99);
426 12    DISPLAY(VDT_BLK,10,10,'TITLE :             [',99);
427 13    DISPLAY(VDT_BLK,11,10,'ADDRESS LINE 1 :    [',99);
428 14    DISPLAY(VDT_BLK,12,10,'ADDRESS LINE 2 :    [',99);
429 15    DISPLAY(VDT_BLK,13,10,'ADDRESS LINE 3 :    [',99);
430 16    DISPLAY(VDT_BLK,14,10,'PHONE NUMBER :      [',99);
431 17    DISPLAY(VDT_BLK,16,10,'MAXIMUM STATUS CODE :  [ ]',99);
432 18    DISPLAY(VDT_BLK,16,38,'M = Mentor      T = Teacher',99);
433 19    DISPLAY(VDT_BLK,16,70,'U = User',99);
434 20    DISPLAY(VDT_BLK,19,5,'PROBLEM CODES TO WHICH THIS USER ',99);
435 21    DISPLAY(VDT_BLK,19,38,'HAS ACCESS: ',99);
436 22    DISPLAY(VDT_BLK,21,10,'PROBLEM CODE :   [        ]',99);
437 23    DISPLAY(VDT_BLK,21,41,'( no entry when completed )',99);
438 24    DISPLAY(VDT_BLK,23,10,'STATUS CODE :    [ ]   T = Teacher',99);
439 25    DISPLAY(VDT_BLK,23,47,'U = User      D = Deny Access',99);
440 26    DISPLAY(VDT_BLK,09,58,']  ',99);
441 27    DISPLAY(VDT_BLK,10,58,']  ',99);
442 28    DISPLAY(VDT_BLK,11,58,']  ',99);
443 29    DISPLAY(VDT_BLK,12,58,']  ',99);
444 30    DISPLAY(VDT_BLK,13,58,']  ',99);
445 31    DISPLAY(VDT_BLK,14,40,']  ',99);
446 32
447    END;  { SCRN1_DISPLAY }
448
449    { *****************************************************************}
450    PROCEDURE CAPTURE_DATA ;
451
452    { Allow change to user code, but make sure it is not all spaces or not
453      the same as any other code on the system                          }
454
455    BEGIN
456  2    IF CHANGE AND NOT NEW_USER THEN
457  3    REPEAT
458  4      YES := FALSE ;
459  5      DUPLICATE := FALSE ;
460  6      CODE_CHANGE := FALSE ;
461  7      ACCEPT(VDT_BLK,08,28,USER_CODE,6,T);
462  8      DISPLAY(VDT_BLK,8,41,
463  9                                                    ',99);
464 10      IF USER_CODE = USER.USER_CODE THEN YES := TRUE ;
465 11      IF NOT YES AND USER_CODE <> '        ' THEN
466 12      BEGIN
467 13        COUNTER := 0 ;
468 14        OLD_CODE := USER.USER_CODE ;
469 15        FOR T := 0 TO USER_RECORDS DO
470 16          IF NOT DUPLICATE THEN
471 17          BEGIN
472 18            READ(USERFILE,T,USER);
473 19            IF COUNTER <> USER_RCD_NUMBER
474 20              AND USER.USER_CODE = USER_CODE THEN
475 21              BEGIN
476 22                DISPLAY(VDT_BLK,8,41,'THIS CODE IS ALREADY USED',99);
477 23                DUPLICATE := TRUE ;
478 24              END ;
479 25            COUNTER := COUNTER + 1 ;
480 26          END ;
481 27        IF NOT DUPLICATE THEN
482 28        BEGIN
483 29          DISPLAY(VDT_BLK,8,41,
484 30                        'SURE YOU WANT TO CHANGE CODE ?  [ ]',99);
```

```
485  31                  ACPT_YES_NO(DUMY,8,74,YES);
486  32                  IF YES THEN CODE_CHANGE := TRUE ;
487  33               END ;
488  34               READ(USERFILE,USER_RCD_NUMBER,USER);
489  35            END ;
490  36         UNTIL YES ;
491  37
492  38  { If the code has been changed, change all entries for this user in
493  39    the user-problem file; if a mentor, change the problem and
494  40    situation files and check Super-Paradocs mentor file                }
495  41
496  42         IF CODE_CHANGE AND U_PROB_RECORDS > 1 THEN
497  43         BEGIN
498  44            LIMIT := U_PROB_RECORDS - 1 ;
499  45            DISPLAY(VDT_BLK,8,41,'PLEASE WAIT - FILES ARE BEING CHANGED',99);
500  46            FOR T := 1 TO LIMIT DO
501  47            BEGIN
502  48               READ(U_PROB_FILE,T,USER_PROB);
503  49               IF USER_PROB.USER_CODE = OLD_CODE THEN
504  50               BEGIN
505  51                  USER_PROB.USER_CODE := USER_CODE ;
506  52                  WRITE(U_PROB_FILE,T,USER_PROB);
507  53                  IF USER_PROB.STATUS_CODE = 'M' THEN
508  54                  BEGIN
509  55                     CLOSE(PROBLEM);
510  56                     SETMEMBER(PROBLEM,PROB_NODE,USER_PROB.PROBLEM_CODE);
511  57                     IOTERM(PROBLEM,OVAL,FALSE);
512  58                     EXTEND(PROBLEM);
513  59                     IF STATUS(PROBLEM) = 0 THEN
514  60                     BEGIN
515  61                        READ(PROBLEM,0,PROB);
516  62                        IF PROB.MENTOR_CODE <> '        ' THEN
517  63                           PROB.MENTOR_CODE := USER_CODE ;
518  64                        WRITE(PROBLEM,0,PROB);
519  65                     END ;
520  66
521  67                     CLOSE(SITUATION);
522  68                     SETMEMBER(SITUATION,SIT_NODE,USER_PROB.PROBLEM_CODE);
523  69                     IOTERM(SITUATION,OVAL,FALSE);
524  70                     EXTEND(SITUATION);
525  71                     IF STATUS(SITUATION) = 0 THEN
526  72                     BEGIN
527  73                        READ(SITUATION,0,SIT);
528  74                        SIT.AUTHOR_CODE := USER_CODE ;
529  75                        WRITE(SITUATION,0,SIT);
530  76                     END ;
531  77
532  78                     SETMEMBER(MENTOR_FILE,MENTNAME,
533  79                                          USER_PROB.PROBLEM_CODE);
534  80                     IOTERM(MENTOR_FILE,OVAL,FALSE);
535  81                     EXTEND(MENTOR_FILE);
536  82                     IF STATUS(MENTOR_FILE) = 0 THEN
537  83                     BEGIN
538  84                        READ(MENTOR_FILE,0,MENTOR_RCD);
539  85                        MENTRCDS := MENTOR_RCD.NEXT_RCD - 1 ;
540  86                        FOR I := 0 TO MENTRCDS DO
541  87                        BEGIN
542  88                           READ(MENTOR_FILE,I,MENTOR_RCD);
543  89                           IF MENTOR_RCD.MENTOR = OLD_CODE THEN
544  90                              MENTOR_RCD.MENTOR := USER_CODE ;
545  91                           WRITE(MENTOR_FILE,I,MENTOR_RCD);
546  92                        END ;
547  93                     END ;
548  94
549  95                  END ;
550  96               END ;
551  97            END ;
552  98            DISPLAY(VDT_BLK,8,41,'                                      ',99);
553  99         END ;
554 100
555 101  { If a change, then capture all the data for this user code           }
556 102
557 103         IF CHANGE THEN
558 104         BEGIN
```

```
559105          USER.USER_CODE := USER_CODE ;
560106          ACCEPT(VDT_BLK,09,28,USER.USER_NAME,30,T);
561107          ACCEPT(VDT_BLK,10,28,USER.USER_TITLE,30,T);
562108          ACCEPT(VDT_BLK,11,28,USER.ADDRESS1,30,T);
563109          ACCEPT(VDT_BLK,12,28,USER.ADDRESS2,30,T);
564110          ACCEPT(VDT_BLK,13,28,USER.ADDRESS3,30,T);
565111          ACCEPT(VDT_BLK,14,28,USER.PHONE,12,T);
566112
567113          ERROR_STATUS := TRUE ;
568114          REPEAT
569115             ACCEPT(VDT_BLK,16,34,DUMMY,1,T);
570116             DECODE(DUMMY,1,STAT,DUMY);
571117             IF DUMY = 'M' OR DUMY = 'T' OR DUMY = 'U' THEN
572118                ERROR_STATUS := FALSE ;
573119             USER.MAX_STATUS := DUMY ;
574120          UNTIL ERROR_STATUS = FALSE ;
575121
576122          WRITE(USERFILE,USER_RCD_NUMBER,USER);
577123
578124       END ;
579125
580       END ;   { CAPTURE_DATA }

581
582
583       { ***************************************************************** }
584
585       PROCEDURE PROBLEMS ;
586
587       { Capture all problem codes which are allowed for this user         }
588
589       BEGIN
590  2       REPEAT
591  3          NO_ENTRY := FALSE ;
592  4          ERROR_STATUS := FALSE ;
593  5          DISPLAY(VDT_BLK,21,27,'             ',99);
594  6          DISPLAY(VDT_BLK,21,41,'( no entry when completed )   ',99);
595  7          DISPLAY(VDT_BLK,23,26,'[ ]',99);
596  8          ACCEPT(VDT_BLK,21,27,PROBLEM_FILE,8,T);
597  9          IF PROBLEM_FILE = '             ' THEN NO_ENTRY := TRUE ;
598 10
599 11          IF NOT NO_ENTRY THEN
600 12          BEGIN
601 13
602 14 { Make sure that this is a valid problem code and display name        }
603 15
604 16             CLOSE(PROBLEM);
605 17             SETMEMBER(PROBLEM,PROB_NODE,PROBLEM_FILE);
606 18             IOTERM(PROBLEM,OVAL,FALSE);
607 19             RESET(PROBLEM);
608 20             IF STATUS(PROBLEM) <> 0 THEN
609 21             BEGIN
610 22                ERROR_STATUS := TRUE ;
611 23             END ;
612 24
613 25             IF NOT ERROR_STATUS THEN
614 26             BEGIN
615 27                READ(PROBLEM,0,PROB);
616 28                DISPLAY(VDT_BLK,21,41,PROB.DESCRIPTION,30);
617 29             END ;
618 30
619 31 { See if this record already exists on the file and if not add it
620 32   to the end of the file and update the number of problems accessed
621 33   by this user code                                                   }
622 34
623 35             FOUND := FALSE ;
624 36             LIMIT := U_PROB_RECORDS - 1 ;
625 37             IF NOT ERROR_STATUS AND LIMIT > 0 THEN
626 38             BEGIN
627 39                PROB_RCD_NUMBER := 1 ;
628 40                FOR T := 1 TO LIMIT DO    IF NOT FOUND THEN
629 41                BEGIN
630 42                   READ(U_PROB_FILE,T,USER_PROB);
631 43                   IF USER_PROB.USER_CODE = USER_CODE AND
```

```
632  44                    USER_PROB.PROBLEM_CODE = PROBLEM_FILE THEN
633  45                    BEGIN
634  46                       FOUND := TRUE ;
635  47                       ENCODE(DUMMY,1,STAT,USER_PROB.STATUS_CODE);
636  48                       DISPLAY(VDT_BLK,23,27,DUMMY,1);
637  49                    END
638  50                    ELSE PROB_RCD_NUMBER := PROB_RCD_NUMBER + 1 ;
639  51             END ;
640  52          END ;
641  53
642  54          IF NOT ERROR_STATUS AND NOT FOUND THEN
643  55          BEGIN
644  56             PROB_RCD_NUMBER := U_PROB_RECORDS ;
645  57             U_PROB_RECORDS := U_PROB_RECORDS + 1 ;
646  58             READ(U_PROB_FILE,0,USER_PROB);
647  59             ENCODE(USER_PROB.NEXT_RECORD,1,STAT,U_PROB_RECORDS:4);
648  60             WRITE(U_PROB_FILE,0,USER_PROB);
649  61             WRITE(U_PROB_FILE,PROB_RCD_NUMBER,USER_PROB);
650  62             NUMBER_OF_PROBLEMS := NUMBER_OF_PROBLEMS + 1 ;
651  63          END ;
652  64
653  65 { Accept valid status code for this user/problem combination and
654  66   make sure it does not "exceed" the maximum status code            }
655  67
656  68          IF NOT ERROR_STATUS AND USER_PROB.STATUS_CODE <> 'M' THEN
657  69          REPEAT
658  70             DUMMY := ' ';
659  71             ACCEPT(VDT_BLK,23,27,DUMMY,1,T);
660  72             CLEAR_LINE(24);
661  73             DECODE(DUMMY,1,STAT,USER_PROB.STATUS_CODE);
662  74             IF USER.MAX_STATUS = 'U' AND DUMMY = 'T ' THEN
663  75             BEGIN
664  76                DUMMY := ' ' ;
665  77                DISPLAY(VDT_BLK,24,26,
666  78                   'This code exceeds the maximum status',99);
667  79             END ;
668  80          UNTIL DUMMY = 'D ' OR DUMMY = 'T ' OR DUMMY = 'U ';
669  81
670  82 { Write record to user-problem file                                  }
671  83
672  84          IF NOT ERROR_STATUS THEN
673  85          BEGIN
674  86             ENCODE(USER_PROB.NEXT_RECORD,1,STAT,PROB_RCD_NUMBER:4);
675  87             USER_PROB.USER_CODE := USER_CODE ;
676  88             USER_PROB.PROBLEM_CODE := PROBLEM_FILE ;
677  89             WRITE(U_PROB_FILE,PROB_RCD_NUMBER,USER_PROB);
678  90          END ;
679  91
680  92       END ;    { "IF NOT NO_ENTRY" }
681  93
682  94    UNTIL NO_ENTRY ;
683  95
684    END ;   { PROBLEMS }

685
686
687  { ******************************************************************}
688  {$PAGE}
689  { ******************************************************************}
690
691    BEGIN   { MAIN PROGRAM }
692
693  3 SET_UP ;
694  4
695  5 SCRN1_DISPLAY ;
696  6
697  7 { The following routine accepts a user code, checks to see if it
698  8   exists and makes sure that this is a mentor                       }
699  9
700 10 { If no code is is entered, the program terminates                  }
701 11
702 12 NEW_USER := FALSE ;
703 13 CODE_CHANGE := FALSE ;
704 14 REPEAT
```

```
705 15      CHECK_CODE(4,31,DONE,ERROR_STATUS,USER_RCD_NUMBER);
706 16      IF ERROR_STATUS THEN
707 17        DISPLAY(VDT_BLK,4,41,'This user code is not valid    ',99);
708 18      IF NOT ERROR_STATUS AND USER.MAX_STATUS <> 'M' THEN
709 19      BEGIN
710 20        DISPLAY(VDT_BLK,4,41,'Sorry, you are not a mentor    ',99);
711 21        DONE := TRUE ;
712 22      END ;
713 23 UNTIL DONE OR NOT ERROR_STATUS ;
714 24
715 25 IF NOT DONE THEN
716 26 BEGIN
717 27    OPR_NAME := USER.USER_NAME ;
718 28    OPR_CODE := USER.USER_CODE ;
719 29 END ;
720 30
721 31 WHILE NOT DONE DO
722 32 BEGIN
723 33
724 34 { Accept the code to be added or changed; terminate program if no code
725 35   is entered                                                         }
726 36
727 37    REPEAT
728 38
729 39        CHECK_CODE(6,31,DONE,ERROR_STATUS,USER_RCD_NUMBER);
730 40        CHANGE := FALSE ;
731 41        NEW_USER := FALSE ;
732 42
733 43        IF NOT DONE AND NOT ERROR_STATUS THEN
734 44        BEGIN
735 45
736 46 { Display data on screen from record read                              }
737 47
738 48           DISPLAY(VDT_BLK,6,41,'CHANGE DATA SHOWN BELOW ?  [ ]',99);
739 49           DISPLAY(VDT_BLK,8,28,USER.USER_CODE,6);
740 50           DISPLAY(VDT_BLK,9,28,USER.USER_NAME,30);
741 51           DISPLAY(VDT_BLK,10,28,USER.USER_TITLE,30);
742 52           DISPLAY(VDT_BLK,11,28,USER.ADDRESS1,30);
743 53           DISPLAY(VDT_BLK,12,28,USER.ADDRESS2,30);
744 54           DISPLAY(VDT_BLK,13,28,USER.ADDRESS3,30);
745 55           DISPLAY(VDT_BLK,14,28,USER.PHONE,12);
746 56           ENCODE(DUMMY,1,STAT,USER.MAX_STATUS);
747 57           DISPLAY(VDT_BLK,16,34,DUMMY,1);
748 58
749 59           ACPT_YES_NO(DUMY,6,69,YES);
750 60
751 61           IF YES THEN CHANGE := TRUE ELSE CHANGE := FALSE ;
752 62
753 63        END ;
754 64
755 65        IF NOT DONE AND ERROR_STATUS THEN
756 66        BEGIN
757 67           DISPLAY(VDT_BLK,6,41,'IS THIS A NEW USER ?       [ ]',99);
758 68           ACPT_YES_NO(DUMY,6,69,YES);
759 69           IF YES THEN
760 70           BEGIN
761 71              USER_RECORDS := USER_RECORDS + 2 ;
762 72              READ(USERFILE,0,USER);
763 73              ENCODE(USER.NEXT_RECORD,1,STAT,USER_RECORDS:4);
764 74              WRITE(USERFILE,0,USER);
765 75              USER_RECORDS := USER_RECORDS - 1 ;
766 76              USER_RCD_NUMBER := USER_RECORDS ;
767 77              DISPLAY(VDT_BLK,8,28,USER_CODE,6);
768 78
769 79              ENCODE(USER.NEXT_RECORD,1,STAT,USER_RCD_NUMBER:4);
770 80              USER.USER_CODE    := '      ';
771 81              USER.USER_NAME    := '                              ';
772 82              USER.USER_TITLE   := '                              ';
773 83              USER.ADDRESS1     := '                              ';
774 84              USER.ADDRESS2     := '                              ';
775 85              USER.ADDRESS3     := '                              ';
776 86              USER.PHONE        := '            ';
777 87              USER.MAX_STATUS   := ' ';
778 88              USER.PRINTER      := '  ';        {##########}
```

```
779  89                    USER.NUM_PROBLEMS    := '    0';
780  90                    DATE(USER.DATE_LAST_USED);
781  91                    USER.TOTAL_TIMES     := '            '; {###########}
782  92                    WRITE(USERFILE,USER_RCD_NUMBER,USER);
783  93
784  94                    ERROR_STATUS := FALSE ;
785  95                    CHANGE   := TRUE ;
786  96                    NEW_USER := TRUE ;
787  97
788  98                END ;
789  99            END ;
790 100
791 101     UNTIL NOT ERROR_STATUS ;
792 102
793 103     IF NOT DONE THEN
794 104     BEGIN
795 105
796 106         CAPTURE_DATA ;
797 107
798 108         READ(USERFILE,USER_RCD_NUMBER,USER);
799 109         DECODE(USER.NUM_PROBLEMS,1,STAT,NUMBER_OF_PROBLEMS);
800 110         PROBLEMS ;
801 111         ENCODE(USER.NUM_PROBLEMS,1,STAT,NUMBER_OF_PROBLEMS:4);
802 112         WRITE(USERFILE,USER_RCD_NUMBER,USER);
803 113
804 114         SCRN1_DISPLAY ;
805 115         DISPLAY(VDT_BLK,4,31,OPR_CODE,6);
806 116         DISPLAY(VDT_BLK,4,41,OPR_NAME,30);
807 117
808 118     END ;
809 119
810 120 END ;   { "WHILE NOT DONE DO" }
811 121
812     END.
```

MAP OF IDENTIFIERS FOR   USER_FIL

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| PROB_RECORD | RECORD | (96,0) | | |
| PROBLEM_CODE | FIELD | (8,0) | (0,0) | UNPACKED |
| DESCRIPTION | FIELD | (30,0) | (8,0) | UNPACKED |
| NEXT_QUESTION | FIELD | (2,0) | (38,0) | UNPACKED |
| INT_QUESTIONS | FIELD | (2,0) | (40,0) | UNPACKED |
| TIMES_USED | FIELD | (2,0) | (42,0) | UNPACKED |
| TOPIC_CODE | FIELD | (8,0) | (44,0) | UNPACKED |
| DATE_ENTERED | FIELD | (8,0) | (52,0) | UNPACKED |
| DATE_LAST_USED | FIELD | (8,0) | (60,0) | UNPACKED |
| MENTOR_CODE | FIELD | (6,0) | (68,0) | UNPACKED |
| NUM_SITUATIONS | FIELD | (2,0) | (74,0) | UNPACKED |
| MINIMUM_LI | FIELD | (2,0) | (76,0) | UNPACKED |
| CALC_LI_FLAG | FIELD | (0,8) | (78,0) | UNPACKED |
| FLAG1_FUTURE | FIELD | (0,8) | (80,0) | UNPACKED |
| FLAG2_FUTURE | FIELD | (0,8) | (82,0) | UNPACKED |
| FLAG3_FUTURE | FIELD | (0,8) | (84,0) | UNPACKED |
| DATA_BASE | FIELD | (0,8) | (86,0) | UNPACKED |
| PRIMARY_CODE | FIELD | (8,0) | (88,0) | UNPACKED |
| NUM_QUESTION | FIELD | (2,0) | (0,0) | UNPACKED |
| DESC_QUESTION | FIELD | (30,0) | (2,0) | UNPACKED |
| YES_NO | FIELD | (0,8) | (32,0) | UNPACKED |
| CALCULATE | FIELD | (0,8) | (34,0) | UNPACKED |
| INT_QUEST | FIELD | (0,8) | (36,0) | UNPACKED |
| REFERENCE | FIELD | (0,8) | (38,0) | UNPACKED |
| UNIT_DESC | FIELD | (10,0) | (40,0) | UNPACKED |
| BOUNDARIES | FIELD | (2,0) | (50,0) | UNPACKED |
| LOWER_1_LIMIT | FIELD | (4,0) | (52,0) | UNPACKED |
| UPPER_1_LIMIT | FIELD | (4,0) | (56,0) | UNPACKED |
| LOWER_2_LIMIT | FIELD | (4,0) | (60,0) | UNPACKED |
| UPPER_2_LIMIT | FIELD | (4,0) | (64,0) | UNPACKED |
| REQUIRED | FIELD | (0,8) | (68,0) | UNPACKED |

| | | | | |
|---|---|---|---|---|
| LGCL_IMPT | FIELD | (2,0) | (70,0) | UNPACKED |
| EXPT_IMPT | FIELD | (2,0) | (72,0) | UNPACKED |
| LGCL_INTR | FIELD | (2,0) | (74,0) | UNPACKED |
| EXPT_INTR | FIELD | (2,0) | (76,0) | UNPACKED |
| LGCL_CMPL | FIELD | (2,0) | (78,0) | UNPACKED |
| EXPT_CMPL | FIELD | (2,0) | (80,0) | UNPACKED |
| STATUS_CODE | FIELD | (0,8) | (82,0) | UNPACKED |
| SORT_FLAG | FIELD | (0,8) | (84,0) | UNPACKED |
| FLAG6_FUTURE | FIELD | (0,8) | (86,0) | UNPACKED |
| FLAG7_FUTURE | FIELD | (0,8) | (88,0) | UNPACKED |
| FLAG8_FUTURE | FIELD | (0,8) | (90,0) | UNPACKED |
| SIT_RECORD | RECORD | (250,0) | | |
| SIT_NUM | FIELD | (4,0) | (0,0) | UNPACKED |
| SIT_DESCRIPTION | FIELD | (80,0) | (4,0) | UNPACKED |
| NEXT_SIT | FIELD | (2,0) | (84,0) | UNPACKED |
| PROB1_LINK | FIELD | (8,0) | (86,0) | UNPACKED |
| PROB2_LINK | FIELD | (8,0) | (94,0) | UNPACKED |
| PROB3_LINK | FIELD | (8,0) | (102,0) | UNPACKED |
| PROB4_LINK | FIELD | (8,0) | (110,0) | UNPACKED |
| AUTHOR_CODE | FIELD | (6,0) | (118,0) | UNPACKED |
| DATE_ENTERED | FIELD | (8,0) | (124,0) | UNPACKED |
| DATE_LAST_USED | FIELD | (8,0) | (132,0) | UNPACKED |
| NUM_ENCOUNTERS | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |
| TEXT_LINE | FIELD | (80,0) | (8,0) | UNPACKED |
| USER_RECORD | RECORD | (202,0) | | |
| NEXT_RECORD | FIELD | (4,0) | (0,0) | UNPACKED |
| USER_CODE | FIELD | (6,0) | (4,0) | UNPACKED |
| USER_NAME | FIELD | (30,0) | (10,0) | UNPACKED |
| USER_TITLE | FIELD | (30,0) | (40,0) | UNPACKED |
| ADDRESS1 | FIELD | (30,0) | (70,0) | UNPACKED |
| ADDRESS2 | FIELD | (30,0) | (100,0) | UNPACKED |
| ADDRESS3 | FIELD | (30,0) | (130,0) | UNPACKED |
| PHONE | FIELD | (12,0) | (160,0) | UNPACKED |
| MAX_STATUS | FIELD | (0,8) | (172,0) | UNPACKED |
| PRINTER | FIELD | (0,8) | (174,0) | UNPACKED |
| NUM_PROBLEMS | FIELD | (4,0) | (176,0) | UNPACKED |
| DATE_ENTERED | FIELD | (8,0) | (180,0) | UNPACKED |
| DATE_LAST_USED | FIELD | (8,0) | (188,0) | UNPACKED |
| TOTAL_TIMES | FIELD | (6,0) | (196,0) | UNPACKED |
| USER_PROBLEM_RECORD | RECORD | (24,0) | | |
| NEXT_RECORD | FIELD | (4,0) | (0,0) | UNPACKED |
| USER_CODE | FIELD | (6,0) | (4,0) | UNPACKED |
| PROBLEM_CODE | FIELD | (8,0) | (10,0) | UNPACKED |
| STATUS_CODE | FIELD | (0,8) | (18,0) | UNPACKED |
| TIMES_USED | FIELD | (4,0) | (20,0) | UNPACKED |
| MENTOR_RECORD | RECORD | (108,0) | | |
| NEXT_RCD | FIELD | (2,0) | (0,0) | UNPACKED |
| MENTOR | FIELD | (6,0) | (2,0) | UNPACKED |
| QUESTIONS | FIELD | (100,0) | (8,0) | UNPACKED |
| PROBLEM | VARIABLE | (32,0) | #0080 | DIRECT |
| SITUATION | VARIABLE | (32,0) | #00A0 | DIRECT |
| DESCRIPTION | VARIABLE | (32,0) | #00C0 | DIRECT |
| USERFILE | VARIABLE | (32,0) | #00E0 | DIRECT |
| U_PROB_FILE | VARIABLE | (32,0) | #0100 | DIRECT |
| USER | VARIABLE | (202,0) | #0120 | DIRECT |
| USER_PROB | VARIABLE | (24,0) | #01EA | DIRECT |
| PROB | VARIABLE | (96,0) | #0202 | DIRECT |
| SIT | VARIABLE | (250,0) | #0262 | DIRECT |
| DESC | VARIABLE | (88,0) | #035C | DIRECT |
| USER_CODE | VARIABLE | (6,0) | #03B4 | DIRECT |
| USER_RECORDS | VARIABLE | (2,0) | #03BA | DIRECT |

| | | | | |
|---|---|---|---|---|
| U_PROB_RECORDS | VARIABLE | (2,0) | #03BC | DIRECT |
| USER_NAME | VARIABLE | (8,0) | #03BE | DIRECT |
| U_PROB_NAME | VARIABLE | (8,0) | #03C6 | DIRECT |
| PROBLEM_FILE | VARIABLE | (8,0) | #03CE | DIRECT |
| DESC_NODE | VARIABLE | (8,0) | #03D6 | DIRECT |
| PROB_NODE | VARIABLE | (8,0) | #03DE | DIRECT |
| SIT_NODE | VARIABLE | (8,0) | #03E6 | DIRECT |
| VDT_BLK | VARIABLE | (32,0) | #03EE | DIRECT |
| MENTOR_FILE | VARIABLE | (32,0) | #040E | DIRECT |
| MENTOR_RCD | VARIABLE | (108,0) | #042E | DIRECT |
| MENTNAME | VARIABLE | (8,0) | #049A | DIRECT |
| MENTRCDS | VARIABLE | (2,0) | #04A2 | DIRECT |
| REPORT | VARIABLE | (32,0) | #04A4 | DIRECT |
| PRINTER | VARIABLE | (32,0) | #04C4 | DIRECT |
| OLD_CODE | VARIABLE | (6,0) | #04E4 | DIRECT |
| OPR_CODE | VARIABLE | (6,0) | #04EA | DIRECT |
| USER_STATUS | VARIABLE | (0,8) | #04F0 | DIRECT |
| NUMBER_OF_PROBLEMS | VARIABLE | (2,0) | #04F2 | DIRECT |
| IOSTAT | VARIABLE | (2,0) | #04F4 | DIRECT |
| USERNAME | VARIABLE | (30,0) | #04F6 | DIRECT |
| OPR_NAME | VARIABLE | (30,0) | #0514 | DIRECT |
| PRNTNAME | VARIABLE | (8,0) | #0532 | DIRECT |
| BUFFER | VARIABLE | (80,0) | #053A | DIRECT |
| REPTNAME | VARIABLE | (8,0) | #058A | DIRECT |
| T | VARIABLE | (0,8) | #0592 | DIRECT |
| DUMY | VARIABLE | (0,8) | #0594 | DIRECT |
| DONE | VARIABLE | (0,1) | #0596 | DIRECT |
| FOUND | VARIABLE | (0,1) | #0598 | DIRECT |
| YES | VARIABLE | (0,1) | #059A | DIRECT |
| OVAL | VARIABLE | (0,1) | #059C | DIRECT |
| ERROR_STATUS | VARIABLE | (0,1) | #059E | DIRECT |
| CHANGE | VARIABLE | (0,1) | #05A0 | DIRECT |
| NO_ENTRY | VARIABLE | (0,1) | #05A2 | DIRECT |
| CODE_CHANGE | VARIABLE | (0,1) | #05A4 | DIRECT |
| NEW_USER | VARIABLE | (0,1) | #05A6 | DIRECT |
| DUPLICATE | VARIABLE | (0,1) | #05A8 | DIRECT |
| LIMIT | VARIABLE | (2,0) | #05AA | DIRECT |
| PROB_RCD_NUMBER | VARIABLE | (2,0) | #05AC | DIRECT |
| COUNTER | VARIABLE | (2,0) | #05AE | DIRECT |
| USER_RCD_NUMBER | VARIABLE | (2,0) | #05B0 | DIRECT |
| STAT | VARIABLE | (2,0) | #05B2 | DIRECT |
| DUMMY | VARIABLE | (2,0) | #05B4 | DIRECT |

MAXIMUM NUMBER OF IDENTIFIERS USED = 189

DXPSCL  1.7.1  81.254   OPTIMIZATION SUMMARY

"SET_UP  " --- 7900 HEAP BYTES REQUIRED TO OPTIMIZE AT LEVEL 1

"CLEAR_LI" -- 5000 HEAP BYTES REQUIRED TO OPTIMIZE AT LEVEL 1

"ACPT_YES" -- 5500 HEAP BYTES REQUIRED TO OPTIMIZE AT LEVEL 1

"CHECK_CO" ---- 6200 HEAP BYTES REQUIRED TO OPTIMIZE AT LEVEL 1

"SCRN1_DI" -- 6800 HEAP BYTES REQUIRED TO OPTIMIZE AT LEVEL 1

"CAPTURE_" --- 9800 HEAP BYTES REQUIRED TO OPTIMIZE AT LEVEL 1

"PROBLEMS" -- 8100 HEAP BYTES REQUIRED TO OPTIMIZE AT LEVEL 1

"USER_FIL" -- 9800 HEAP BYTES REQUIRED TO OPTIMIZE AT LEVEL 1

```
           INSTRUCTIONS =   246
SET_UP     LITERALS =    314   CODE =   1038   DATA =     44

INSTRUCTIONS =    27
CLEAR_LI   LITERALS =     24   CODE =    112   DATA =    122

INSTRUCTIONS =    66
ACPT_YES   LITERALS =    102   CODE =    268   DATA =    114
```

```
INSTRUCTIONS =    88
CHECK_CO  LITERALS =     38   CODE =    348   DATA =     60

INSTRUCTIONS =   260
SCRN1_DI  LITERALS =    638   CODE =   1378   DATA =     40

INSTRUCTIONS =   510
CAPTURE_  LITERALS =    304   CODE =   2244   DATA =     48

INSTRUCTIONS =   314
PROBLEMS  LITERALS =    162   CODE =   1396   DATA =     46

INSTRUCTIONS =   536
USER_FIL  LITERALS =    402   CODE =   2434   DATA =   1466

SOURCE  = .PARADOCS.SRC.TREEPRNT
OBJECT  = .PARADOCS.OBJ.TREEPRNT
LISTING = .PARADOCS.LST.TREEPRNT
MESSAGE = .PARADOCS.L
MEM1 = 6,4
MEM2 = 13,4
MEM3 = 10,4
PRINT WIDTH = 80
NUMBER OF LINES/PAGE = 60
OPTIONS = (* NO OPTIONS SPECIFIED *)
SUPPRESS PREPROCESSOR LINES = YES

LINE NUMBER             COPY FILE PATHNAME
     116     .PARADOCS.SRC.LAYOUT
     125     .PARADOCS.SRC.VAR
     166     .PARADOCS.SRC.IO 3      ($WIDELIST,MAP,PAGE}
  4
  5      { ****************************************************************
  6
  7         The following is a flowchart of the procedures used (excluding
  8         screen and other small misc. procedures):
  9
 10
 11                         DECISION_TREE_PRINTING
 12                                    !
 13      ---------------------------------------------------------------
 14      !              !              !              !              !              !
 15      !              !              !          WORK_TABLE          !              !
 16      !        SCRN1_DISPLAY        !              !              !           RPT_PRINT
 17      !              !              !         -------------         !
 18      !              !              !              !              !
 19      !              !              !         WORK_DSPL    CAPTURE    !
 20      !              !              !                       LIST      !
 21      !              !              !              !              !
 22      SET_UP                  SEQUENCE_TABLE              PRINT_RECORDS
 23                                                                !
 24                              ---------------------------------------------
 25                              !              !              !              !
 26                         WRITE_VERTICAL   CENTER        KIF_WRITE    COL_WRITE
 27
 28      ****************************************************************}
 29
 30
 31      PROGRAM DECISION_TREE_PRINTING ;
 32
 33
 34      CONST KIF_INIT =1;         KEY_NOT_FOUND = #B5;
 35            KIF_TERM =2;         KIF_OPEN =3;          KIF_CLOSE =4;
 36            KIF_READ_BY_KEY =9;                        KIF_INSERT_RECORD =19;
 37            KIF_READ_NEXT =17;   KIF_REWRITE_RECORD=20;
 38            KIF_DELETE_BY_KEY =24;                     KIF_READ_BY_KEY_LOCKED=10;
 39            CANNOT_FIND = #BD;   NO_MORE_RECORDS = #B3;
 40
 41      TYPE
 42
 43          INT_SET = SET OF CHAR ;
 44
```

```
45      INT_RCD = RECORD
46          INT_VALUE    INTEGER ;
47          INTERP     : PACKED ARRAY[1..15] OF CHAR ;
48      END ;
49
50      LST_SIT = RECORD
51          SIT_NUMBER : INTEGER ;
52      END ;
53
54      T_KIF_STATUS_BLOCK=PACKED RECORD
55          KIF_STATUS_CODE: 0..255;
56          KIF_KEY_NUMBER : 0..255;
57          KIF_ACCESS : 0..255;
58          KIF_RESERVED : 0..255;
59          KIF_RECORD_LEN : INTEGER;
60          KIF_PATHNAME : PACKED ARRAY[1..30] OF
61              CHAR                                          { FILE NAME }
62          END;                                    { END KIF STATUS BLOCK }
63
64   { The following is the layout of the printer record in a KIF file
65     whose primary key is the first 4 fields and only secondary key is
66     the first field; this file will be deleted and re-created in the
67     program proc and assigned a synonym of "KEY_FILE"                  }
68
69      KEY_RECORD=RECORD
70          LINE_NUMBER   : INTEGER ;
71          BEG_POSITION  : LONGINT ;
72          END_POSITION  : LONGINT ;
73          ALT_KEY       : INTEGER ;
74          TYPE_CODE     : INTEGER ;
75          NUM_CHAR      : LONGINT ;
76          TEXT_DATA     : PACKED ARRAY[1..30] OF CHAR ;
77          END;                                    { END KEY FILE RECORD }
78
79   { The following is the layout of the KIF file which keeps track of
80     which collums need to be printed; be reading them back in order
81     the logical sphere of the decision tree will be compressed to just
82     the collumns where descriptive information appears                 }
83
84      KEY_COLUMN=RECORD
85          COLUMN        : LONGINT ;
86          POSITION      : INTEGER ;
87          END ;
88
89   { The following is the record for the work table; it will be used in
90     a RELATIVE file with one record for each question, written out in
91     decending order of relative logical importance                     }
92
93      WORK_RECORD = RECORD
94          RECORD_NUMBER    : INTEGER ;
95          QUESTION_NUMBER  : INTEGER ;
96          LGCL_IMPT_VALUE  : INTEGER ;
97          NUMBER_ANSWERS   : INTEGER ;
98          NUMBER_ENTRIES   : LONGINT ;
99          INC_RESPONSES    : LONGINT ;
100         START_POINT      : LONGINT ;
101         PAGES            : LONGINT ;
102         END ;
103
104     SET_OF_CHAR = SET OF CHAR ;
105     VDT_CONTROL = ARRAY[1..16] OF INTEGER;
106
107  { The following is the record layout for the relative PROBLEM file }
108
109     PROB_RECORD=RECORD        CASE BOOLEAN OF
110                      TRUE:
111
112  { This is the "0" record layout for this file }
113
114     (PROBLEM_CODE    : PACKED ARRAY[1..8] OF CHAR;
115      DESCRIPTION     : PACKED ARRAY[1..30] OF CHAR;
116      NEXT_QUESTION   : INTEGER ;
117      INT_QUESTIONS   : INTEGER ;
118      TIMES_USED      : INTEGER ;
```

```
119         TOPIC_CODE       : PACKED ARRAY[1..8] OF CHAR;
120         DATE_ENTERED     : PACKED ARRAY[1..8] OF CHAR;
121         DATE_LAST_USED   : PACKED ARRAY[1..8] OF CHAR;
122         MENTOR_CODE      : PACKED ARRAY[1..6] OF CHAR;
123         NUM_SITUATIONS   : INTEGER ;
124         MINIMUM_LI       : INTEGER ;
125         CALC_LI_FLAG     : CHAR ;
126         FLAG1_FUTURE     : CHAR ;
127         FLAG2_FUTURE     : CHAR ;
128         FLAG3_FUTURE     : CHAR ;
129         DATA_BASE        : CHAR ;
130         PRIMARY_CODE     : PACKED ARRAY[1..8] OF CHAR);
131
132
133               FALSE:
134
135     { This is the "1" through "Nth" record layout   }
136
137        (NUM_QUESTION     : PACKED ARRAY[1..2] OF CHAR;
138         DESC_QUESTION    : PACKED ARRAY[1..30] OF CHAR;
139         YES_NO           : CHAR;
140         CALCULATE        : CHAR;
141         INT_QUEST        : CHAR;
142         REFERENCE        : CHAR;
143         UNIT_DESC        : PACKED ARRAY[1..10] OF CHAR;
144         BOUNDARIES       : INTEGER ;
145         LOWER_1_LIMIT    : REAL ;
146         UPPER_1_LIMIT    : REAL ;
147         LOWER_2_LIMIT    : REAL ;
148         UPPER_2_LIMIT    : REAL ;
149         REQUIRED         : CHAR;
150         LGCL_IMPT        : INTEGER ;
151         EXPT_IMPT        : INTEGER ;
152         LGCL_INTR        : INTEGER ;
153         EXPT_INTR        : INTEGER ;
154         LGCL_CMPL        : INTEGER ;
155         EXPT_CMPL        : INTEGER ;
156         STATUS_CODE      : CHAR,
157         SORT_FLAG        : CHAR;
158         FLAG6_FUTURE     : CHAR;
159         FLAG7_FUTURE     : CHAR;
160         FLAG8_FUTURE     : CHAR)
161     END;
162
163
164     { The following is the record layout for the relative SITUATION file }
165
166     SIT_RECORD=RECORD
167
168        SIT_NUM           : PACKED ARRAY[1..4] OF CHAR;
169        SIT_DESCRIPTION   : PACKED ARRAY[1..80] OF CHAR;
170        NEXT_SIT          : INTEGER ;
171        PROB1_LINK        : PACKED ARRAY[1..8] OF CHAR;
172        PROB2_LINK        : PACKED ARRAY[1..8] OF CHAR;
173        PROB3_LINK        : PACKED ARRAY[1..8] OF CHAR;
174        PROB4_LINK        : PACKED ARRAY[1..8] OF CHAR;
175        AUTHOR_CODE       : PACKED ARRAY[1..6] OF CHAR;
176        DATE_ENTERED      : PACKED ARRAY[1..8] OF CHAR;
177        DATE_LAST_USED    : PACKED ARRAY[1..8] OF CHAR;
178        NUM_ENCOUNTERS    : INTEGER ;
179        SINC_STRING       : PACKED ARRAY[1..50] OF INTEGER ;  { ########## }
180        FLAG1_FUTURE      : CHAR ;
181        FLAG2_FUTURE      : CHAR ;
182        FLAG3_FUTURE      : CHAR ;
183        FLAG4_FUTURE      : CHAR ;
184     END;
185
186
187     { The following is the record layout for the relative DESCRIPTION file }
188
189     DESC_RECORD=RECORD
190
191        NEXT_RECORD       : PACKED ARRAY[1..4] OF CHAR;
192        SIT_NUMBER        : PACKED ARRAY[1..4] OF CHAR;
193        TEXT_LINE         : PACKED ARRAY[1..80] OF CHAR;
194     END;
```

```
195
196
197     { The following is the record layout for the sequential USERFILE file;
198       later it will be changed to a KIF file, but initially it will be
199       established as a RELATIVE file                                       }
200
201     USER_RECORD=RECORD
202
203       NEXT_RECORD         : PACKED ARRAY[1..4] OF CHAR ;
204       USER_CODE           : PACKED ARRAY[1..6] OF CHAR ;
205       USER_NAME           : PACKED ARRAY[1..30] OF CHAR ;
206       USER_TITLE          : PACKED ARRAY[1..30] OF CHAR ;
207       ADDRESS1            : PACKED ARRAY[1..30] OF CHAR ;
208       ADDRESS2            : PACKED ARRAY[1..30] OF CHAR ;
209       ADDRESS3            : PACKED ARRAY[1..30] OF CHAR ;
210       PHONE               : PACKED ARRAY[1..12] OF CHAR ;
211       MAX_STATUS          : CHAR ;
212       PRINTER             : CHAR ;
213       NUM_PROBLEMS        : PACKED ARRAY[1..4] OF CHAR ;
214       DATE_ENTERED        : PACKED ARRAY[1..8] OF CHAR ;
215       DATE_LAST_USED      : PACKED ARRAY[1..8] OF CHAR ;
216       TOTAL_TIMES         : PACKED ARRAY[1..6] OF CHAR ;
217     END ;
218
219
220     { The following is the record layout for the sequential USERPROB file;
221       late it will be changed to a KIF file, but initially it will be
222       established as a RELATIVE file                                       }
223
224     USER_PROBLEM_RECORD=RECORD
225
226       NEXT_RECORD         : PACKED ARRAY[1..4] OF CHAR ;
227       USER_CODE           : PACKED ARRAY[1..6] OF CHAR ;
228       PROBLEM_CODE        : PACKED ARRAY[1..8] OF CHAR ;
229       STATUS_CODE         : CHAR ;
230       TIMES_USED          : PACKED ARRAY[1..4] OF CHAR ;
231     END ;
232
233     {$PAGE}
234     { ************************************************************** }
235
236     { PROGRAM }
237
238     VAR
239
240     PROBLEM     : RANDOM FILE OF PROB_RECORD;
241     SITUATION   : RANDOM FILE OF SIT_RECORD;
242     DESCRIPTION : RANDOM FILE OF DESC_RECORD;
243     USERFILE    : RANDOM FILE OF USER_RECORD;
244     U_PROB_FILE : RANDOM FILE OF USER_PROBLEM_RECORD;
245
246     USER        : USER_RECORD;
247     USER_PROB   : USER_PROBLEM_RECORD;
248     PROB        : PROB_RECORD;
249     SIT         : SIT_RECORD;
250     DESC        : DESC_RECORD;
251
252     USER_CODE   :    PACKED ARRAY[1..6] OF CHAR ;
253     USER_RECORDS , U_PROB_RECORDS : INTEGER ;
254     USER_NAME , U_PROB_NAME   : PACKED ARRAY[1..8] OF CHAR ;
255     PROBLEM_FILE : PACKED ARRAY[1..8] OF CHAR;
256     DESC_NODE , PROB_NODE , SIT_NODE    : PACKED ARRAY[1..8] OF CHAR;
257     VDT_BLK : VDT_CONTROL;
258
259     PRINTER     : TEXT ;
260     REPORT      : TEXT ;
261     WORKFILE    : RANDOM FILE OF WORK_RECORD ;
262     WORK        : WORK_RECORD ;
263     INT_FILE    : RANDOM FILE OF INT_RCD ;
264     INTGR       : INT_RCD ;
265     WORK_SET    : INT_SET ;
266     SIT_LST_FILE : RANDOM FILE OF LST_SIT ;
267     SIT_LST     : LST_SIT ;
268     SIT_SET     : INT_SET ;
```

```
269     LISTNAME      : PACKED ARRAY[1..8] OF CHAR ;
270     INTGNAME      : PACKED ARRAY[1..8] OF CHAR ;
271     INTGQUST      : PACKED ARRAY[1..8] OF CHAR ;
272     PRNTNAME      : PACKED ARRAY[1..8] OF CHAR ;
273     REPTNAME      : PACKED ARRAY[1..8] OF CHAR ;
274     BUFFER        : PACKED ARRAY[1..80] OF CHAR ;
275     WORKNAME      : PACKED ARRAY[1..8] OF CHAR ;
276     DATEPRNT      : PACKED ARRAY[1..8] OF CHAR ;
277     SEQ_TABLE     : PACKED ARRAY[1..50,1..13] OF INTEGER ;    { ########## }
278
279     LONG_NUMBER , WIDTH_OF_PAPER : LONGINT ;
280     T , DUMY : CHAR;
281     VALID , DONE , OPEN , YES , OVAL , ERROR_STATUS   : BOOLEAN ;
282     LEVEL , NEXT_INTG , NEXT_LIST , STAT : INTEGER;
283     DUMMY : PACKED ARRAY[1..2] OF CHAR;
284
285     TOTAL_QUESTIONS , TOTAL_SITUATIONS , LGCL_IMPT , NUMBER : INTEGER ;
286     REF_SITUATION : INTEGER ;
287     REF_SINC_STRING : PACKED ARRAY[1..50] OF INTEGER ;    { ########## }
288     SPECIFIC , REF_MATCH : BOOLEAN ;
289
290     KIF_STATUS_BLOCK : T_KIF_STATUS_BLOCK ;
291     COL_STATUS_BLOCK : T_KIF_STATUS_BLOCK ;
292     KEY_FILE : KEY_RECORD ;
293     COL_FILE : KEY_COLUMN ;
294
295     ($PAGE)
296     { ****************************************************************** }
297
298
299     {     The following are screen and file handling procedures        }
300
301     PROCEDURE SETFILLER(VAR VDT$ : VDT_CONTROL ;
302         FILL_CHAR: CHAR);
303           EXTERNAL;
304
305     PROCEDURE CLEARSCREEN(VAR VDT$ : VDT_CONTROL);  EXTERNAL;
306
307     PROCEDURE INITSCREEN(VAR VDT$: VDT_CONTROL; LUNO: INTEGER); EXTERNAL;
308
309     PROCEDURE DISPLAY(VAR VDT$: VDT_CONTROL; LINE: INTEGER;
310         COLUMN : INTEGER; BUFFER: PACKED ARRAY[1..?] OF CHAR;
311         LENGTH : INTEGER); EXTERNAL;
312
313     PROCEDURE ACCEPT(VAR VDT$: VDT_CONTROL; LINE,COLUMN: INTEGER;
314         VAR BUFFER: PACKED ARRAY[1..?] OF CHAR; LENGTH: INTEGER;
315         VAR TERM_CHAR: CHAR); EXTERNAL;
316
317
318     { ****************************************************************** }
319
320
321     PROCEDURE KEY$FILE ( KIF_COMMAND : INTEGER;                     {UNIV}
322         UNIV KIF_KEYNAME : PACKED ARRAY[1..?] OF CHAR;
323         UNIV KIF_BUFFER_NAME: PACKED ARRAY[1..?] OF CHAR;
324         VAR KIF_STATUS_BLOCK: T_KIF_STATUS_BLOCK); EXTERNAL;
325
326     PROCEDURE SET_UP;
327     BEGIN
328
329  3    INITSCREEN(VDT_BLK,0);
330  4    CLEARSCREEN(VDT_BLK);
331  5
332  6    KEY$FILE(KIF_INIT, DUMMY, DUMMY, KIF_STATUS_BLOCK);
333  7    KIF_STATUS_BLOCK.KIF_PATHNAME := 'KEYFILE         ';
334  8    KEY$FILE(KIF_OPEN, DUMMY, DUMMY, KIF_STATUS_BLOCK);
335  9    COL_STATUS_BLOCK.KIF_PATHNAME := 'COLFILE         ';
336 10    KEY$FILE(KIF_OPEN, DUMMY, DUMMY, COL_STATUS_BLOCK);
337 11    KIF_STATUS_BLOCK.KIF_KEY_NUMBER := 1 ;
338 12    COL_STATUS_BLOCK.KIF_KEY_NUMBER := 1 ;
339 13    COL_FILE.COLUMN := 0 ;
340 14    COL_FILE.POSITION := 0 ;
341 15    KEY$FILE(KIF_INSERT_RECORD, DUMMY, COL_FILE, COL_STATUS_BLOCK);
342 16
```

```
343  17      PROB_NODE  := 'PROBLEMS';
344  18      SIT_NODE   := 'SITUATNS';
345  19      DESC_NODE  := 'DESCRIPT';
346  20      PRNTNAME   := 'PRNTFILE';
347  21      REPTNAME   := 'PAGEFILE';
348  22      WORKNAME   := 'TEXTFILE';
349  23      INTGNAME   := 'INTGRDIR';
350  24      LISTNAME   := 'LISTSITS';
351  25      DONE := FALSE;
352  26
353       END; {SET_UP }
354
355       { ****************************************************************}
356       { The following procedure clears a line on the display            }
357
358       PROCEDURE CLEAR_LINE (LINE_NUMBER : INTEGER);
359
360       VAR    LINE_DATA  :   PACKED ARRAY[1..80] OF CHAR ;
361                     N    :   CHAR ;
362
363       BEGIN
364
365  3     FOR N := 1 TO 80 DO
366  4        LINE_DATA[N] := ' ';
367  5     DISPLAY(VDT_BLK,LINE_NUMBER,1,LINE_DATA,80);
368  6
369       END ; { CLEAR_LINE }
```

MAP OF IDENTIFIERS FOR   CLEAR_LI

| IDENTIFIER NAME | KIND | SIZE (BYTES,BITS) | STACK DISPLACEMENT LEVEL(DISPL) (BYTE,BIT) | PICTURE (PACKED FIELDS ONLY) |
|---|---|---|---|---|
| LINE_NUMBER | PARAMETER | (2,0) | #0028 | DIRECT |
| LINE_DATA | VARIABLE | (80,0) | #002A | DIRECT |
| N | VARIABLE | (0,8) | #007A | DIRECT |

```
370
371       { ****************************************************************}
372       {           The following checks for correct "Y/N" response       }
373
374       PROCEDURE ACPT_YES_NO ( VAR YES_NO : CHAR;
375                               X , Y : INTEGER ;    { y/n also allowed }
376                       VAR STATUS_FLAG : BOOLEAN );
377
378          VAR   YES_NO_SET , YES_SET : SET_OF_CHAR;
379
380          BEGIN
381  2         STATUS_FLAG := FALSE ;
382  3         YES_NO_SET := ['Y','y','N','n'] ;
383  4         YES_SET := ['Y','y'] ;
384  5
385  6         REPEAT
386  7            ACCEPT(VDT_BLK,X,Y,DUMMY,1,T);
387  8            DECODE(DUMMY,1,STAT,YES_NO);
388  9         UNTIL ( YES_NO IN YES_NO_SET ) ;
389 10         IF ( YES_NO IN YES_SET ) THEN
390 11               STATUS_FLAG := TRUE;
391 12         IF YES_NO = 'y' THEN
392 13            YES_NO := 'Y';
393 14         IF YES_NO = 'n' THEN
394 15            YES_NO := 'N';
395          END;   { ACPT_YES_NO }
```

ACPT_YES_NO

MAP OF IDENTIFIERS FOR   ACPT_YES

| IDENTIFIER NAME | KIND | SIZE (BYTES,BITS) | STACK DISPLACEMENT LEVEL(DISPL) (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |

| | | | | |
|---|---|---|---|---|
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
396
397
398
399     { ***************************************************************}
400
401     PROCEDURE SEQUENCE_TABLE ;
402
403     { Calculate Sequence Table by first establishing an Experience Table }
404
405     VAR    COUNTER , ROW , COLUMN  :   INTEGER ;
406
407     BEGIN  { SEQUENCE_TABLE }
408
409
410        { Initialize table to all zeros                                    }
411
412  6     FOR M := 1 TO 50 DO                 { ########## }
413  7       FOR N := 1 TO 13 DO
414  8         SEQ_TABLE[M,N] := 0 ;
415  9
416 10     ROW := 1 ;
417 11     FOR N := 1 TO TOTAL_QUESTIONS DO
418 12     BEGIN
419 13        READ(PROBLEM,N,PROB);
420 14   .
421 15 { For non-integer questions, store observed responses in Sequence
422 16   Table                                                                }
423 17
424 18        IF PROB.INT_QUEST <> 'Y' THEN
425 19        BEGIN
426 20           FOR T := 0 TO TOTAL_SITUATIONS DO
427 21           BEGIN
428 22              READ(SITUATION,T,SIT);
429 23              IF SIT.SINC_STRING[N] > 0 AND SIT.SINC_STRING[N] < 13 THEN
430 24                 COLUMN := SIT.SINC_STRING[N] ELSE COLUMN := 10 ;
431 25              SEQ_TABLE[ROW,COLUMN] := SEQ_TABLE[ROW,COLUMN] + 1 ;
432 26           END;
433 27           COUNTER := 0 ;
434 28           NUMBER  := 1 ;
435 29           FOR N := 1 TO 12 DO
436 30             IF SEQ_TABLE[ROW,N] <> 0 THEN
437 31             BEGIN
438 32                COUNTER := COUNTER + 1 ;
439 33                SEQ_TABLE[ROW,N] := NUMBER ;
440 34                NUMBER := NUMBER + 1 ;
441 35             END ;
442 36           SEQ_TABLE[ROW,13] := COUNTER ;
443 37        END ;
444 38
445 39 { For integer questions, store observed responses in workfiles named
446 40   by the terminal number / question number                             }
447 41
448 42        IF PROB.INT_QUEST = 'Y' THEN
449 43        BEGIN
450 44           COUNTER := 0 ;
451 45           CLOSE(INT_FILE);
452 46           INTGQUST := 'Q        ';
453 47           IF PROB.NUM_QUESTION[1] = ' ' THEN
454 48              INTGQUST[2] := PROB.NUM_QUESTION[2]
455 49           ELSE BEGIN
456 50              INTGQUST[2] := PROB.NUM_QUESTION[1] ;
457 51              INTGQUST[3] := PROB.NUM_QUESTION[2] ;
458 52           END ;
459 53           SETMEMBER(INT_FILE,INTGNAME,INTGQUST);
460 54           IOTERM(INT_FILE,OVAL,FALSE);
461 55           REWRITE(INT_FILE);
462 56           IF STATUS(INT_FILE) <> 0 THEN
463 57              EXTEND(INT_FILE);
464 58           INTGR.INT_VALUE := 1 ;
465 59           INTGR.INTERP    := '                    ';
466 60           WRITE(INT_FILE,0,INTGR);
```

```
467 61              NEXT_INTG := 1 ;
468 62              WORK_SET := [] ;
469 63
470 64              FOR T := 0 TO TOTAL_SITUATIONS DO
471 65              BEGIN
472 66                 READ(SITUATION,T,SIT);
473 67                 IF NOT (CHR(SIT.SINC_STRING[N]) IN WORK_SET) THEN
474 68                 BEGIN
475 69                    WORK_SET := WORK_SET + [CHR(SIT.SINC_STRING[N])];
476 70                    COUNTER := COUNTER + 1 ;
477 71                    INTGR.INT_VALUE := SIT.SINC_STRING[N] ;
478 72                    INTGR.INTERP := '              ';
479 73                    IF SIT.SINC_STRING[N] = -32767 THEN
480 74                       INTGR.INTERP := ' Not Entered   '
481 75                    ELSE
482 76                       ENCODE(INTGR.INTERP,2,STAT,SIT.SINC_STRING[N]:6);
483 77                    WRITE(INT_FILE,NEXT_INTG,INTGR);
484 78                    NEXT_INTG := NEXT_INTG + 1 ;
485 79                 END ;
486 80              END;
487 81              READ(INT_FILE,0,INTGR);
488 82              INTGR.INT_VALUE := NEXT_INTG - 1 ;
489 83              ENCODE(INTGR.INTERP,2,STAT,INTGR.INT_VALUE:6);
490 84              WRITE(INT_FILE,0,INTGR);
491 85              SEQ_TABLE[ROW,13] := COUNTER ;
492 86           END ;
493 87           ROW := ROW + 1 ;
494 88        END;
495 89
496 90
497     END ;  { SEQUENCE_TABLE }
```

MAP OF IDENTIFIERS FOR  SEQUENCE

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| COUNTER | VARIABLE | (2,0) | #0028 | DIRECT |
| ROW | VARIABLE | (2,0) | #002A | DIRECT |
| COLUMN | VARIABLE | (2,0) | #002C | DIRECT |

```
498
499
500    { ************************************************************ }
501
502    { The following procedure establishes a work table on disk as a
503      relative access file, one record for each question, and captures
504      either a list of specific situations to be printed, or the level
505      at which the tree should be printed                              }
506
507    PROCEDURE WORK_TABLE ;
508
509    VAR     TEST_LGCL_IMPT: INTEGER ;
510            RECORD_NUMBER : INTEGER ;
511            TEST_RCD      : INTEGER ;
512            WORK_RCD      : INTEGER ;
513            NUMBER        : LONGINT ;
514            PAGES         : LONGINT ;
515            PAGE_DIVISOR  : INTEGER ;
516            SINGLE_SCREEN : BOOLEAN ;
517
518
519    PROCEDURE WORK_DSPL ;
520
521    BEGIN   { WORK_DSPL }
522
523    { Display number of pages per level until operator is ready to list
524      the level desired                                                 }
525
526   6    CLEAR_LINE(6);
527   7    DISPLAY(VDT_BLK,6,07,'LEVEL     QUESTION             DESCRIPTION',99);
528   8    DISPLAY(VDT_BLK,6,58,'MAXIMUM PAGES REQUIRED',99);
529   9    DISPLAY(VDT_BLK,7,08,'NO.       NUMBER    (in order of logical ',99);
```

```
530 10      DISPLAY(VDT_BLK,7,46,'importance)   TO PRINT THIS LEVEL',99);
531 11      DISPLAY(VDT_BLK,24,11,'SELECT LEVEL NUMBER    [  ]',99);
532 12      DISPLAY(VDT_BLK,24,41,'SELECT SITUATION NUMBER [  ]',99);
533 13
534 14      CLEAR_LINE(13);
535 15      CLEAR_LINE(14);
536 16      SINGLE_SCREEN := TRUE ;
537 17      REPEAT  { UNTIL NOT YES }
538 18        RESET(REPORT);
539 19        REPEAT  { UNTIL NOT YES }
540 20          FOR T := 8 TO 22 DO
541 21          BEGIN
542 22             IF NOT EOF(REPORT) THEN
543 23               READLN(REPORT,BUFFER)
544 24             ELSE FOR N := 1 TO 80 DO
545 25               BUFFER[N] := ' ';
546 26             DISPLAY(VDT_BLK,T,1,BUFFER,80);
547 27          END ;
548 28          IF NOT EOF(REPORT) THEN
549 29          BEGIN
550 30             CLEAR_LINE(23);
551 31             DISPLAY(VDT_BLK,23,30,'READY FOR MORE ?  [ ]',99);
552 32             ACPT_YES_NO(DUMY,23,49,YES);
553 33             SINGLE_SCREEN := FALSE ;
554 34          END ELSE YES := FALSE ;
555 35        UNTIL NOT YES ;
556 36        CLEAR_LINE(23);
557 37        IF SINGLE_SCREEN THEN YES := FALSE ELSE
558 38        BEGIN
559 39          DISPLAY(VDT_BLK,23,18,
560 40            'DO YOU WISH TO DISPLAY THIS TABLE AGAIN ?  [ ]',99);
561 41          ACPT_YES_NO(DUMY,23,62,YES);
562 42        END ;
563 43      UNTIL NOT YES ;
564 44
565 45      REPEAT { UNTIL LEVEL >= 1 AND LEVEL <= TOTAL_QUESTIONS }
566 46         ACCEPT(VDT_BLK,24,33,DUMMY,2,T);
567 47         DECODE(DUMMY,1,STAT,LEVEL);
568 48         ENCODE(DUMMY,1,STAT,LEVEL:2);
569 49         DISPLAY(VDT_BLK,24,33,DUMMY,2);
570 50      UNTIL LEVEL >= 1 AND LEVEL <= TOTAL_QUESTIONS ;
571 51
572 52   { If part of the tree has been "pruned" by the operator, enforce entry
573 53     of a reference situation number and recalculate the work table      }
574 54
575 55      WORK_RCD := TOTAL_SITUATIONS + 1 ;
576 56      IF LEVEL > 1 THEN
577 57      BEGIN
578 58         REPEAT
579 59            ACCEPT(VDT_BLK,24,67,DUMMY,2,T);
580 60            DECODE(DUMMY,1,STAT,REF_SITUATION);
581 61            ENCODE(DUMMY,1,STAT,REF_SITUATION:2);
582 62            DISPLAY(VDT_BLK,24,67,DUMMY,2);
583 63         UNTIL REF_SITUATION >= 1 AND REF_SITUATION <= WORK_RCD ;
584 64         REF_SITUATION := REF_SITUATION - 1 ;
585 65         READ(SITUATION,REF_SITUATION,SIT);
586 66         REF_SINC_STRING := SIT.SINC_STRING ;
587 67
588 68         WORK_RCD := LEVEL - 1 ;
589 69         READ(WORKFILE,WORK_RCD,WORK);
590 70         WIDTH_OF_PAPER := WIDTH_OF_PAPER DIV WORK.NUMBER_ENTRIES ;
591 71         PAGES := (WIDTH_OF_PAPER DIV 80) + 1 ;
592 72         PAGE_DIVISOR := WORK.NUMBER_ENTRIES ;
593 73
594 74   { Re-calcuate and store the increment between responses and the starting
595 75     point of the first response for each question                        }
596 76
597 77         FOR T := 1 TO WORK_RCD DO
598 78         BEGIN
599 79            READ(WORKFILE,T,WORK);
600 80            WORK.NUMBER_ANSWERS := 1 ;
601 81            WORK.NUMBER_ENTRIES := 1 ;
602 82            WORK.INC_RESPONSES := WIDTH_OF_PAPER DIV 2 ;
603 83            WORK.START_POINT := 0 ;
```

```
604 84              WRITE(WORKFILE,T,WORK);
605 85          END ;
606 86
607 87          FOR T := LEVEL TO TOTAL_QUESTIONS DO
608 88          BEGIN
609 89              READ(WORKFILE,T,WORK);
610 90              WORK.NUMBER_ENTRIES := WORK.NUMBER_ENTRIES DIV PAGE_DIVISOR ;
611 91              WORK.INC_RESPONSES := WIDTH_OF_PAPER DIV WORK.NUMBER_ENTRIES ;
612 92              NUMBER := WORK.NUMBER_ANSWERS - 1 ;
613 93              LONG_NUMBER := NUMBER * WORK.INC_RESPONSES ;
614 94              WORK.START_POINT := LONG_NUMBER DIV 2 ;
615 95              WRITE(WORKFILE,T,WORK);
616 96          END ;
617 97
618 98
619 99      END ;   { IF LEVEL > 1 }
620 100
621     END ;   { WORK_DSPL }

622
623     PROCEDURE CAPTURE_LIST ;
624
625     { This procedure captures the specific situations to be printed     }
626
627     VAR     SIT_NUM         : INTEGER ;
628             SIT_POS         : INTEGER ;
629             SIT_LINE        : INTEGER ;
630             SIT_DSPL        : PACKED ARRAY [1..4] OF CHAR ;
631             GOOD_ENTRY      : BOOLEAN ;
632
633     BEGIN   { CAPTURE_LIST }
634
635  3    NEXT_LIST := 0 ;
636  4    SIT_SET := [] ;
637  5    DISPLAY(VDT_BLK,08,04,'LIST SITUATION NUMBERS TO BE REPRESENTED',99)
638  6    DISPLAY(VDT_BLK,08,44,' IN THE TREE  (1 TO      ):  [     ]',99);
639  7    DISPLAY(VDT_BLK,09,11,'(Valid numbers are 1 to      - ',99);
640  8    DISPLAY(VDT_BLK,09,42,'no entry when completed)',99);
641  9    DISPLAY(VDT_BLK,11,20,'SITUATION NUMBERS ALREADY SELECTED',99);
642 10
643 11 { Open and empty work file                                            }
644 12
645 13    CLOSE(SIT_LST_FILE);
646 14    SETNAME(SIT_LST_FILE,LISTNAME);
647 15    REWRITE(SIT_LST_FILE);
648 16
649 17 { Display the limits of the situation numbers which may be selected   }
650 18
651 19    NUMBER := TOTAL_SITUATIONS + 1 ;
652 20    SIT_DSPL := '    ';
653 21    ENCODE(SIT_DSPL,1,STAT,NUMBER:4);
654 22    DISPLAY(VDT_BLK,08,64,SIT_DSPL,4);
655 23    DISPLAY(VDT_BLK,09,35,SIT_DSPL,4);
656 24    GOOD_ENTRY := TRUE ;
657 25
658 26    REPEAT
659 27
660 28        IF GOOD_ENTRY THEN
661 29        BEGIN
662 30           SIT_DSPL := '    ';
663 31           DISPLAY(VDT_BLK,8,74,SIT_DSPL,4);
664 32        END ;
665 33
666 34        GOOD_ENTRY := TRUE ;
667 35        ACCEPT(VDT_BLK,8,74,SIT_DSPL,4,T);
668 36        CLEAR_LINE(7);
669 37        IF SIT_DSPL <> '    ' THEN
670 38        BEGIN
671 39
672 40 { Check for valid situation number and for a duplicate entry          }
673 41
674 42           DECODE(SIT_DSPL,1,STAT,SIT_NUM);
675 43           ENCODE(SIT_DSPL,1,STAT,SIT_NUM:4);
676 44           DISPLAY(VDT_BLK,8,74,SIT_DSPL,4);
```

```
677 45             SIT_NUM := SIT_NUM - 1 ;
678 46             IF SIT_NUM < 0 OR SIT_NUM > TOTAL_SITUATIONS THEN
679 47             BEGIN
680 48                DISPLAY(VDT_BLK,7,70,'Not Valid',99);
681 49                GOOD_ENTRY := FALSE ;
682 50             END ;
683 51             IF GOOD_ENTRY AND CHR(SIT_NUM) IN SIT_SET THEN
684 52             BEGIN
685 53                DISPLAY(VDT_BLK,7,65,'Already Entered',99);
686 54                GOOD_ENTRY := FALSE ;
687 55             END ;
688 56             IF GOOD_ENTRY THEN
689 57             BEGIN
690 58                SIT_SET := SIT_SET + [CHR(SIT_NUM)] ;
691 59                SIT_LST.SIT_NUMBER := SIT_NUM ;
692 60                WRITE(SIT_LST_FILE,NEXT_LIST,SIT_LST);
693 61
694 62 { Calculate next postition and display number added to list         }
695 63
696 64                SIT_LINE := NEXT_LIST DIV 10 ;
697 65                SIT_LINE := SIT_LINE + 13 ;
698 66                SIT_POS  := NEXT_LIST MOD 10 ;
699 67                SIT_POS  := (SIT_POS * 7) + 9 ;
700 68                DISPLAY(VDT_BLK,SIT_LINE,SIT_POS,SIT_DSPL,4);
701 69                NEXT_LIST := NEXT_LIST + 1 ;
702 70             END ;
703 71          END ;
704 72
705 73    UNTIL SIT_DSPL = '    ' AND NEXT_LIST > 0 ;
706 74
707 75    NEXT_LIST := NEXT_LIST - 1 ;
708 76    LEVEL := 1 ;
709 77
710    END ;   { CAPTURE_LIST }

MAP OF IDENTIFIERS FOR  CAPTURE_

IDENTIFIER NAME   KIND          SIZE          STACK              PICTURE
                                (BYTES,BITS)  DISPLACEMENT       (PACKED FIELDS ONLY)
                                LEVEL(DISPL)  (BYTE,BIT)

SIT_NUM           VARIABLE      (2,0)         #0028      DIRECT
SIT_POS           VARIABLE      (2,0)         #002A      DIRECT
SIT_LINE          VARIABLE      (2,0)         #002C      DIRECT
SIT_DSPL          VARIABLE      (4,0)         #002E      DIRECT
GOOD_ENTRY        VARIABLE      (0,1)         #0032      DIRECT 711
712
713    BEGIN   { WORK_TABLE }
714
715
716   { Open and empty work file and write a dummy "0" record            }
717
718  6    CLOSE(WORKFILE);
719  7    SETNAME(WORKFILE,WORKNAME);
720  8    REWRITE(WORKFILE);
721  9    WORK.RECORD_NUMBER    := 0 ;
722 10    WORK.QUESTION_NUMBER  := 0 ;
723 11    WORK.LGCL_IMPT_VALUE  := 0 ;
724 12    WORK.NUMBER_ANSWERS   := 0 ;
725 13    WORK.NUMBER_ENTRIES   := 0 ;
726 14    WORK.INC_RESPONSES    := 0 ;
727 15    WORK.START_POINT      := 0 ;
728 16    WORK.PAGES            := 0 ;
729 17    WRITE(WORKFILE,0,WORK);
730 18
731 19    CLOSE(REPORT);
732 20    SETNAME(REPORT,REPTNAME);
733 21    REWRITE(REPORT);
734 22
735 23 { Sort the problem records into the work file based on descending
736 24   LI values - use the PROB.SORT_FLAG to determine if the record
737 25   has already been written into the work file                      }
```

```
738  26
739  27      FOR T := 1 TO TOTAL_QUESTIONS DO
740  28      BEGIN
741  29         READ(PROBLEM, T, PROB);
742  30         PROB.SORT_FLAG := 'N' ;
743  31         WRITE(PROBLEM, T, PROB);
744  32      END ;
745  33
746  34      WORK_RCD := 1 ,
747  35      FOR M := 1 TO TOTAL_QUESTIONS DO
748  36      BEGIN
749  37         TEST_LGCL_IMPT := -1 ;
750  38         TEST_RCD := 1 ;
751  39         FOR N := 1 TO TOTAL_QUESTIONS DO
752  40         BEGIN
753  41            READ(PROBLEM, N, PROB);
754  42            LGCL_IMPT := PROB.LGCL_IMPT ;
755  43            IF PROB.SORT_FLAG <> 'Y' AND LGCL_IMPT > TEST_LGCL_IMPT THEN
756  44            BEGIN
757  45               TEST_LGCL_IMPT := LGCL_IMPT ;
758  46               RECORD_NUMBER := TEST_RCD ;
759  47            END ;
760  48            TEST_RCD := TEST_RCD + 1 ;
761  49         END ;
762  50
763  51         READ(PROBLEM, RECORD_NUMBER, PROB);
764  52         PROB.SORT_FLAG := 'Y' ;
765  53         WRITE(PROBLEM, RECORD_NUMBER, PROB);
766  54
767  55         WORK.RECORD_NUMBER := WORK_RCD ;
768  56         WORK.QUESTION_NUMBER := RECORD_NUMBER ;
769  57         WORK.LGCL_IMPT_VALUE := TEST_LGCL_IMPT ;
770  58         WORK.NUMBER_ANSWERS := SEQ_TABLE[RECORD_NUMBER, 13] ;
771  59
772  60   { If this is the first record, then the number of entries is the number
773  61     of answers, otherwise it is the number of answers times the last
774  62     number of entries; for deleted or reference questions, NA and NE
775  63     are not changed                                                      }
776  64
777  65         IF PROB.STATUS_CODE = 'D' OR PROB.REFERENCE = 'Y' THEN
778  66            WORK.NUMBER_ANSWERS := 1 ;
779  67
780  68         IF WORK_RCD = 1 THEN
781  69            WORK.NUMBER_ENTRIES := WORK.NUMBER_ANSWERS
782  70         ELSE
783  71            WORK.NUMBER_ENTRIES := WORK.NUMBER_ENTRIES
784  72                                   * WORK.NUMBER_ANSWERS ;
785  73         WORK.INC_RESPONSES := 0 ;
786  74         WORK.START_POINT   := 0 ;
787  75         WRITE(WORKFILE, WORK_RCD, WORK);
788  76         WORK_RCD := WORK_RCD + 1 ;
789  77
790  78      END ;
791  79
792  80      WIDTH_OF_PAPER := WORK.NUMBER_ENTRIES * 16 ;
793  81      PAGES := (WIDTH_OF_PAPER DIV 80) + 1 ;
794  82      PAGE_DIVISOR := 1 ;
795  83
796  84   { Calcuate and store the increment between responses and the starting
797  85     point of the first response for each question; write out the text
798  86     file to display each level and how many pages to print tree          }
799  87
800  88      LEVEL := 1 ;
801  89      FOR T := 1 TO TOTAL_QUESTIONS DO
802  90      BEGIN
803  91         READ(WORKFILE, T, WORK);
804  92         WORK.INC_RESPONSES := WIDTH_OF_PAPER DIV WORK.NUMBER_ENTRIES ;
805  93         NUMBER := WORK.NUMBER_ANSWERS - 1 ;
806  94         LONG_NUMBER := NUMBER * WORK.INC_RESPONSES ;
807  95         WORK.START_POINT := LONG_NUMBER DIV 2 ;
808  96         WORK.PAGES := ( PAGES DIV PAGE_DIVISOR ) + 1 ;
809  97         WRITE(WORKFILE, T, WORK);
810  98         PAGE_DIVISOR := WORK.NUMBER_ENTRIES ;
811  99         READ(PROBLEM, WORK.QUESTION_NUMBER, PROB);
812 100         WRITELN(REPORT, '        ', LEVEL:3, '        ',
```

```
813101                 . WORK.QUESTION_NUMBER:3,'        ',PROB.DESC_QUESTION,
814102                 '                ',WORK.PAGES:6);
815103          LEVEL := LEVEL + 1 ;
816104      END ;
817105      WRITEEOF(REPORT);
818106
819107
820108    { Allow operator to select specific situation numbers to be printed,
821109      or display a list of "levels" from which the full or a "pruned"
822110      tree may be generated and printed                                  }
823111
824112      SPECIFIC := FALSE ;
825113      CLEAR_LINE(13);
826114      DISPLAY(VDT_BLK,06,04,'DO YOU WISH TO "BUILD" THE DECISION ',99);
827115      DISPLAY(VDT_BLK,06,40,'TREE FROM SPECIFIC SITUATION(S) ?   [ ]',99);
828116      DUMY := ' ';
829117      ACPT_YES_NO(DUMY,6,77,SPECIFIC);
830118
831119      IF SPECIFIC THEN CAPTURE_LIST ELSE WORK_DSPL ;
832120
833     END ;    { WORK_TABLE }
```

MAP OF IDENTIFIERS FOR  WORK_TAB

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| TEST_LGCL_IMPT | VARIABLE | (2,0) | #0028 | DIRECT |
| RECORD_NUMBER | VARIABLE | (2,0) | #002A | DIRECT |
| TEST_RCD | VARIABLE | (2,0) | #002C | DIRECT |
| WORK_RCD | VARIABLE | (2,0) | #002E | DIRECT |
| NUMBER | VARIABLE | (4,0) | #0030 | DIRECT |
| PAGES | VARIABLE | (4,0) | #0034 | DIRECT |
| PAGE_DIVISOR | VARIABLE | (2,0) | #0038 | DIRECT |
| SINGLE_SCREEN | VARIABLE | (0,1) | #003A | DIRECT |

```
834
835     { ******************************************************************}
836
837     { The following procedure creates indexed print records on disk from
838       which the RPT_PRINT procedure will print them out; this procedure
839       "traces" each situation in order of questions in the Work Table   }
840
841     PROCEDURE PRINT_RECORDS ;
842
843     VAR    SIT_NUMBER : INTEGER ;
844            LINE       : INTEGER ;
845            POSITION   : LONGINT ;
846            RESPONSE   : INTEGER ;
847            LAST_SINGLE : INTEGER ;
848            QUEST_NUMBER : INTEGER ;
849            TEMP_POS   : LONGINT ;
850            SIT_DISPLAY : PACKED ARRAY [1..4] OF CHAR ;
851            INTERPRETATION : PACKED ARRAY [1..15] OF CHAR ;
852            SINGLE_RESPONSE : BOOLEAN ;
853            ALL_DONE   : BOOLEAN ;
854            FOUND_SPACE : BOOLEAN ;
855            FOUND_LAST : BOOLEAN ;
856            LOCATED : BOOLEAN ;
857            LOCATION : INTEGER ;
858            LIMIT    : INTEGER ;
859            HORIZONTAL_LINE : BOOLEAN ;
860
861
862     PROCEDURE CENTER ;
863
864     { This procedure centers the text of the question                    }
865
866     VAR   SPACES : INTEGER ;
867           CHAR_POS : INTEGER ;
868           CHARACTERS : INTEGER ;
869           CENTERED_TEXT : PACKED ARRAY [1..30] OF CHAR ;
870           FOUND_CHAR : BOOLEAN ;
```

```
871
872       BEGIN   { CENTER }
873   2     SPACES := 0 ;
874   3     CHARACTERS := 30 ;
875   4     FOUND_CHAR := FALSE ;
876   5     FOR M := 30 DOWNTO 2 DO
877   6       IF NOT FOUND_CHAR THEN
878   7       BEGIN
879   8         IF PROB.DESC_QUESTION[M] <> ' ' THEN
880   9           FOUND_CHAR := TRUE
881  10         ELSE BEGIN
882  11           SPACES := SPACES + 1 ;
883  12           CHARACTERS := CHARACTERS - 1 ;
884  13         END ;
885  14       END ;
886  15
887  16     SPACES := SPACES DIV 2 ;
888  17     IF SPACES > 0 THEN
889  18     BEGIN
890  19       CENTERED_TEXT := '                              ';
891  20       CHAR_POS := SPACES + 1 ;
892  21       FOR M := 1 TO CHARACTERS DO
893  22       BEGIN
894  23         CENTERED_TEXT[CHAR_POS] := PROB.DESC_QUESTION[M] ;
895  24         CHAR_POS := CHAR_POS + 1 ;
896  25       END ;
897  26       PROB.DESC_QUESTION := CENTERED_TEXT ;
898  27     END ;
899  28
900       END ;   { CENTER }
CENTER

MAP OF IDENTIFIERS FOR   CENTER

IDENTIFIER NAME    KIND         SIZE           STACK              PICTURE
                                (BYTES,BITS)   DISPLACEMENT       (PACKED FIELDS ONLY)
                                LEVEL(DISPL)   (BYTE,BIT)

SPACES             VARIABLE     (2,0)          #0028    DIRECT
CHAR_POS           VARIABLE     (2,0)          #002A    DIRECT
CHARACTERS         VARIABLE     (2,0)          #002C    DIRECT
CENTERED_TEXT      VARIABLE     (30,0)         #002E    DIRECT
FOUND_CHAR         VARIABLE     (0,1)          #004C    DIRECT 901
902
903
904     PROCEDURE WRITE_VERTICAL ;
905
906     { This procedure writes a vertical line record to the KIF file          }
907
908     BEGIN   { WRITE_VERTICAL }
909   2   KEY_FILE.LINE_NUMBER  := LINE ;
910   3   KEY_FILE.ALT_KEY      := LINE ;
911   4   KEY_FILE.TYPE_CODE    := 1 ;
912   5   KEY_FILE.BEG_POSITION := POSITION ;
913   6   KEY_FILE.END_POSITION := POSITION ;
914   7   KEY_FILE.NUM_CHAR     := 1 ;
915   8   KEY_FILE.TEXT_DATA    := '                              ';
916   9   KEY$FILE(KIF_INSERT_RECORD,DUMMY,KEY_FILE,KIF_STATUS_BLOCK);
917  10   LINE := LINE + 1 ;
918     END ;   { WRITE_VERTICAL }
919
920
921     PROCEDURE KIF_WRITE ;
922
923     { This procedure writes a KIF record into the keyfile                   }
924
925     BEGIN   { KIF_WRITE }
926
927   3   KEY$FILE(KIF_INSERT_RECORD,DUMMY,KEY_FILE,KIF_STATUS_BLOCK);
928   4   LINE := LINE + 1 ;
929   5
930     END ;   { KIF_WRITE }
```

```
931
932      PROCEDURE COL_WRITE ;
933
934      { This procedure writes all required column positions into a KIF file}
935
936      BEGIN    { COL_WRITE }
937
938  3     LONG_NUMBER := KEY_FILE.BEG_POSITION ;
939  4     FOR T := KEY_FILE.BEG_POSITION TO (KEY_FILE.END_POSITION + 1) DO
940  5     BEGIN
941  6        COL_FILE.COLUMN := LONG_NUMBER ;
942  7        KEY$FILE(KIF_INSERT_RECORD, DUMMY, COL_FILE, COL_STATUS_BLOCK);
943  8        LONG_NUMBER := LONG_NUMBER + 1 ;
944  9     END ;
945 10
946      END ;   { COL_WRITE }

947
948
949      BEGIN    { PRINT_RECORDS }
950
951  3     CLEAR_LINE(23);
952  4     DISPLAY(VDT_BLK, 23, 11, 'PLEASE WAIT   -  NOW PROCESSING ', 99);
953  5     DISPLAY(VDT_BLK, 23, 42, 'SITUATION      / QUESTION        ', 99);
954  6
955  7  { Find last contiguous "single response" entry, if any, from the end
956  8    of the work table, so that the program can know whether it has to
957  9    "split" single response question texts into two 15-character parts }
958 10
959 11    FOUND_LAST := FALSE ;
960 12    LAST_SINGLE := TOTAL_QUESTIONS ;
961 13    NUMBER := TOTAL_QUESTIONS ;
962 14    FOR T := TOTAL_QUESTIONS DOWNTO 1 DO
963 15    BEGIN
964 16       IF NOT FOUND_LAST THEN
965 17       BEGIN
966 18          READ(WORKFILE, T, WORK);
967 19          IF WORK.NUMBER_ANSWERS = 1 THEN
968 20             LAST_SINGLE := NUMBER
969 21          ELSE
970 22             FOUND_LAST := TRUE ;
971 23          NUMBER := NUMBER - 1 ;
972 24       END ;
973 25    END ;
974 26
975 27    IF SPECIFIC THEN LIMIT := NEXT_LIST ELSE LIMIT := TOTAL_SITUATIONS ;
976 28
977 29    SIT_NUMBER := 1 ;
978 30    FOR T := 0 TO LIMIT DO
979 31    BEGIN
980 32
981 33  { If specific situations were listed, get situation number from that
982 34    work file and read appropriate sit record; otherwise, read all
983 35    situations and, if "pruned", use just the situations which match
984 36    the reference situation                                           }
985 37
986 38       IF SPECIFIC THEN
987 39       BEGIN
988 40          READ(SIT_LST_FILE, T, SIT_LST);
989 41          SIT_NUMBER := SIT_LST.SIT_NUMBER ;
990 42          READ(SITUATION, SIT_NUMBER, SIT);
991 43          SIT_NUMBER := SIT_NUMBER + 1 ;
992 44       END ELSE READ(SITUATION, T, SIT);
993 45
994 46       ENCODE(SIT_DISPLAY, 1, STAT, SIT_NUMBER:3);
995 47       DISPLAY(VDT_BLK, 23, 52, SIT_DISPLAY, 3);
996 48       DISPLAY(VDT_BLK, 23, 67, '    ', 3);
997 49
998 50  { If "pruning" has occured, check for match to reference situation  }
999 51
1000 52      IF LEVEL = 1 THEN REF_MATCH := TRUE
1001 53      ELSE BEGIN
1002 54         REF_MATCH := TRUE ;
1003 55         FOR N := 1 TO LEVEL DO
1004 56         BEGIN
```

```
1005 57              READ(WORKFILE,N,WORK);
1006 58              READ(PROBLEM,WORK.QUESTION_NUMBER,PROB);
1007 59              IF PROB.STATUS_CODE <> 'D' AND PROB.REFERENCE <> 'Y' THEN
1008 60                IF REF_SINC_STRING[WORK.QUESTION_NUMBER] <>
1009 61                   SIT_SINC_STRING[WORK.QUESTION_NUMBER] THEN
1010 62                      REF_MATCH := FALSE ;
1011 63          END ;
1012 64       END ;
1013 65
1014 66       IF REF_MATCH THEN
1015 67       BEGIN
1016 68
1017 69
1018 70 { Starting at the "middle" of the decision tree, look at each response
1019 71   in the situation string (except for deleted questions) in the order
1020 72   of the Work Table                                                   }
1021 73
1022 74           LINE := 1 ;
1023 75           POSITION := WIDTH_OF_PAPER DIV 2 ;
1024 76           HORIZONTAL_LINE := TRUE ;
1025 77           QUEST_NUMBER := 1 ;
1026 78           FOR N := 1 TO TOTAL_QUESTIONS DO
1027 79           BEGIN
1028 80              READ(WORKFILE,N,WORK);
1029 81              READ(PROBLEM,WORK.QUESTION_NUMBER,PROB);
1030 82              ENCODE(SIT_DISPLAY,1,STAT,QUEST_NUMBER:3);
1031 83              DISPLAY(VDT_BLK,23,67,SIT_DISPLAY,3);
1032 84
1033 85              IF PROB.STATUS_CODE <> 'D' AND PROB.REFERENCE <> 'Y' THEN
1034 86              BEGIN
1035 87                IF WORK.NUMBER_ANSWERS = 1 THEN SINGLE_RESPONSE := TRUE
1036 88                   ELSE SINGLE_RESPONSE := FALSE ;
1037 89
1038 90 { Write text of question                                                }
1039 91
1040 92                KEY_FILE.TYPE_CODE   := 3 ;
1041 93                KEY_FILE.LINE_NUMBER := LINE ;
1042 94                KEY_FILE.ALT_KEY     := LINE ;
1043 95
1044 96 { If one of the last contiguous single responses, break question text
1045 97   into two equal parts                                                 }
1046 98
1047 99                IF QUEST_NUMBER <= LAST_SINGLE THEN
1048 100                  SINGLE_RESPONSE := FALSE ;
1049 101
1050 102               IF SINGLE_RESPONSE THEN
1051 103               BEGIN
1052 104                 KEY_FILE.BEG_POSITION := POSITION - 7 ;
1053 105                 KEY_FILE.END_POSITION := POSITION + 7 ;
1054 106                 KEY_FILE.NUM_CHAR     := 15 ;
1055 107                 FOR Q := 1 TO 15 DO
1056 108                    KEY_FILE.TEXT_DATA[Q] := PROB.DESC_QUESTION[Q] ;
1057 109               END ELSE
1058 110               BEGIN
1059 111                 KEY_FILE.BEG_POSITION := POSITION - 14;
1060 112                 KEY_FILE.END_POSITION := POSITION + 15 ;
1061 113                 KEY_FILE.NUM_CHAR     := 30 ;
1062 114                 CENTER ;
1063 115                 KEY_FILE.TEXT_DATA := PROB.DESC_QUESTION ;
1064 116               END ;
1065 117               KIF_WRITE ;
1066 118               IF HORIZONTAL_LINE THEN COL_WRITE ;
1067 119
1068 120               IF SINGLE_RESPONSE THEN
1069 121               BEGIN
1070 122                 KEY_FILE.LINE_NUMBER := LINE ;
1071 123                 KEY_FILE.ALT_KEY     := LINE ;
1072 124                 TEMP_POS := 16 ;
1073 125                 FOR Q := 1 TO 15 DO
1074 126                 BEGIN
1075 127                    KEY_FILE.TEXT_DATA[Q] := PROB.DESC_QUESTION[TEMP_POS] ;
1076 128                    TEMP_POS := TEMP_POS + 1 ;
1077 129                 END ;
1078 130                 KIF_WRITE ;
1079 131               END ;
```

```
1080132
1081133
1082134  { Write vertical line                                                              }
1083135
1084136            WRITE_VERTICAL ;
1085137
1086138  { Calculate position of response; for a non-integer question, this will
1087139    be based on the number found in the sequence table, and for an integer
1088140    question, it will be the relative position in the interger work file }
1089141
1090142            TEMP_POS := POSITION ;
1091143            POSITION := POSITION - WORK.START_POINT ;
1092144            IF PROB.INT_QUEST <> 'Y' THEN
1093145            BEGIN
1094146               RESPONSE := SIT.SINC_STRING[WORK.QUESTION_NUMBER] ;
1095147               IF RESPONSE < 1 OR RESPONSE > 12 THEN RESPONSE := 10 ;
1096148               IF QUEST_NUMBER < LEVEL THEN NUMBER := 1 ELSE
1097149                  NUMBER := SEQ_TABLE[WORK.QUESTION_NUMBER,RESPONSE];
1098150            END ELSE BEGIN
1099151               CLOSE(INT_FILE);
1100152               INTGQUST := 'Q      ';
1101153               IF PROB.NUM_QUESTION[1] = ' ' THEN
1102154                  INTGQUST[2] := PROB.NUM_QUESTION[2]
1103155               ELSE BEGIN
1104156                  INTGQUST[2] := PROB.NUM_QUESTION[1] ;
1105157                  INTGQUST[3] := PROB.NUM_QUESTION[2] ;
1106158               END ;
1107159               SETMEMBER(INT_FILE,INTGNAME,INTGQUST);
1108160               IOTERM(INT_FILE,OVAL,TRUE);
1109161               RESET(INT_FILE);
1110162               READ(INT_FILE,0,INTGR);
1111163               LOCATION := INTGR.INT_VALUE ;
1112164               LOCATED  := FALSE ;
1113165               NUMBER := 0 ;
1114166               FOR Z := 1 TO LOCATION DO IF NOT LOCATED THEN
1115167               BEGIN
1116168                  READ(INT_FILE,Z,INTGR);
1117169                  NUMBER := NUMBER + 1 ;
1118170                  IF INTGR.INT_VALUE =
1119171                     SIT.SINC_STRING[WORK.QUESTION_NUMBER] THEN
1120172                        LOCATED := TRUE ;
1121173               END;
1122174            END ;
1123175            NUMBER := NUMBER - 1 ;
1124176            LONG_NUMBER := NUMBER * WORK.INC_RESPONSES ;
1125177            POSITION := POSITION + LONG_NUMBER ;
1126178            IF POSITION < TEMP_POS THEN
1127179            BEGIN
1128180              KEY_FILE.BEG_POSITION := POSITION ;
1129181              KEY_FILE.END_POSITION := TEMP_POS ;
1130182              KEY_FILE.NUM_CHAR     := TEMP_POS - POSITION ;
1131183            END ELSE
1132184            BEGIN
1133185              KEY_FILE.BEG_POSITION := TEMP_POS ;
1134186              KEY_FILE.END_POSITION := POSITION ;
1135187              KEY_FILE.NUM_CHAR     := POSITION - TEMP_POS ;
1136188            END ;
1137189
1138190  { Write horizontal line record                                                       }
1139191
1140192            IF NOT SINGLE_RESPONSE THEN
1141193            BEGIN
1142194             IF TEMP_POS = POSITION THEN
1143195             BEGIN
1144196              HORIZONTAL_LINE := FALSE ;
1145197              WRITE_VERTICAL ;
1146198             END ELSE BEGIN
1147199              KEY_FILE.LINE_NUMBER := LINE ;
1148200              KEY_FILE.ALT_KEY     := LINE ;
1149201              KEY_FILE.TYPE_CODE   := 2 ;
1150202              KIF_WRITE ;
1151203              HORIZONTAL_LINE := TRUE ;
1152204             END ;
1153205            END ;
```

```
1154206
1155207  { Write second vertical line                                                    }
1156208
1157209          IF NOT SINGLE_RESPONSE THEN WRITE_VERTICAL ;
1158210
1159211  { Write text of response                                                        }
1160212
1161213          KEY_FILE.TYPE_CODE    := 3 ;
1162214          KEY_FILE.LINE_NUMBER  := LINE ;
1163215          KEY_FILE.ALT_KEY      := LINE ;
1164216          KEY_FILE.BEG_POSITION := POSITION - 7 ;
1165217          KEY_FILE.END_POSITION := POSITION + 7 ;
1166218          KEY_FILE.NUM_CHAR     := 15 ;
1167219          IF PROB.INT_QUEST = 'Y' THEN
1168220              INTERPRETATION := INTGR.INTERP
1169221          ELSE BEGIN
1170222            CASE SIT.SINC_STRING[WORK.QUESTION_NUMBER] OF
1171223              1 : INTERPRETATION := '< Both Ranges   ';
1172224              2 : INTERPRETATION := '< Primary Range';
1173225              3 : INTERPRETATION := 'Within Both Rng';
1174226              4 : INTERPRETATION := '> Primary Range';
1175227              5 : INTERPRETATION := '> Both Ranges   ';
1176228              6 : INTERPRETATION := '   Below Range  ';
1177229              7 : INTERPRETATION := '  Within Range  ';
1178230              8 : INTERPRETATION := '  Above Range   ';
1179231              9 : INTERPRETATION := '  No Judgement  ';
1180232             10 : INTERPRETATION := '   Not Entered  ';
1181233             11 : INTERPRETATION := '      Absent    ';
1182234             12 : INTERPRETATION := '      Present   ';
1183235            OTHERWISE INTERPRETATION := '**** ERROR ****';   END ;
1184236          END ;
1185237          FOR Q := 1 TO 15 DO
1186238             KEY_FILE.TEXT_DATA[Q] := INTERPRETATION[Q] ;
1187239          KIF_WRITE ;
1188240
1189241  { Write third vertical line and the "arrow"                                     }
1190242
1191243          WRITE_VERTICAL ;
1192244          KEY_FILE.LINE_NUMBER  := LINE ;
1193245          KEY_FILE.ALT_KEY      := LINE ;
1194246          KEY_FILE.TYPE_CODE    := 4 ;
1195247          KEY_FILE.BEG_POSITION := POSITION ;
1196248          KEY_FILE.END_POSITION := POSITION ;
1197249          KEY_FILE.NUM_CHAR     := 1 ;
1198250          KEY_FILE.TEXT_DATA    := '                                            ';
1199251          KIF_WRITE ;
1200252
1201253        END ;   { "IF PROB.STATUS_CODE <> 'D'" }
1202254
1203255        QUEST_NUMBER := QUEST_NUMBER + 1 ;
1204256
1205257      END ,   { "FOR N := 1 TO TOTAL_QUESTIONS" }
1206258
1207259  { Write interpretation of situation (just base 80 characters) in up
1208260    to 15 character lines, but less if last character is not a space              }
1209261
1210262        WRITE_VERTICAL ;
1211263        KEY_FILE.LINE_NUMBER := LINE ;
1212264        KEY_FILE.ALT_KEY     := LINE ;
1213265        KEY_FILE.TYPE_CODE   := 3 ;
1214266        KEY_FILE.BEG_POSITION := POSITION - 7 ;
1215267        KEY_FILE.END_POSITION := POSITION + 7 ;
1216268        KEY_FILE.NUM_CHAR    := 15 ;
1217269        KEY_FILE.TEXT_DATA   := 'Situation ## 999                      ';
1218270        ENCODE(KEY_FILE.TEXT_DATA,13,STAT,SIT_NUMBER:3);
1219271
1220272  { "Left Justify" the situation number                                           }
1221273
1222274        IF KEY_FILE.TEXT_DATA[13] = ' ' THEN
1223275        BEGIN
1224276           KEY_FILE.TEXT_DATA[13] := KEY_FILE.TEXT_DATA[14] ;
1225277           KEY_FILE.TEXT_DATA[14] := KEY_FILE.TEXT_DATA[15] ;
1226278           KEY_FILE.TEXT_DATA[15] := ' ' ;
1227279        END ;
```

```
1228280            IF KEY_FILE.TEXT_DATA[13] = ' ' THEN
1229281            BEGIN
1230282               KEY_FILE.TEXT_DATA[13] := KEY_FILE.TEXT_DATA[14] ;
1231283               KEY_FILE.TEXT_DATA[14] := KEY_FILE.TEXT_DATA[15] ;
1232284               KEY_FILE.TEXT_DATA[15] := ' ' ;
1233285            END ;
1234286            KIF_WRITE ;
1235287            COL_WRITE ;
1236288
1237289            ALL_DONE := FALSE ;
1238290            POSITION := 15 ;
1239291            TEMP_POS := 1 ;
1240292            REPEAT
1241293               FOUND_SPACE := FALSE ;
1242294               NUMBER := 0 ;
1243295               FOR M := POSITION DOWNTO (POSITION - 13) DO
1244296                 IF NOT FOUND_SPACE THEN
1245297                 BEGIN
1246298                    IF SIT.SIT_DESCRIPTION[POSITION] = ' ' THEN
1247299                       FOUND_SPACE := TRUE
1248300                    ELSE BEGIN
1249301                       POSITION := POSITION - 1 ;
1250302                       NUMBER := NUMBER + 1 ;
1251303                    END ;
1252304                 END ;
1253305
1254306               IF NOT FOUND_SPACE THEN POSITION := POSITION + NUMBER
1255307                  ELSE POSITION := POSITION + 1 ;
1256308               KEY_FILE.TEXT_DATA := '                ';
1257309               NUMBER := 1 ;
1258310               FOR M := TEMP_POS TO (POSITION - 1) DO
1259311               BEGIN
1260312                  KEY_FILE.TEXT_DATA[NUMBER] := SIT.SIT_DESCRIPTION[M] ;
1261313                  NUMBER := NUMBER + 1 ;
1262314               END ;
1263315               KEY_FILE.LINE_NUMBER := LINE ;
1264316               KEY_FILE.ALT_KEY     := LINE ;
1265317               KIF_WRITE ;
1266318
1267319               TEMP_POS := POSITION ;
1268320               POSITION := POSITION + 15 ;
1269321               IF POSITION > 80 THEN
1270322               BEGIN
1271323                  POSITION := 80 ;
1272324                  ALL_DONE := TRUE ;
1273325                  KEY_FILE.TEXT_DATA := '                ';
1274326                  KEY_FILE.LINE_NUMBER := LINE ;
1275327                  KEY_FILE.ALT_KEY     := LINE ;
1276328                  NUMBER := 1 ;
1277329                  FOR M := TEMP_POS TO POSITION DO
1278330                  BEGIN
1279331                     KEY_FILE.TEXT_DATA[NUMBER] := SIT.SIT_DESCRIPTION[M] ;
1280332                     NUMBER := NUMBER + 1 ;
1281333                  END ;
1282334                  KIF_WRITE ;
1283335               END ;
1284336
1285337            UNTIL ALL_DONE ;
1286338         END ; { "IF REF_MATCH" }
1287339
1288340         SIT_NUMBER := SIT_NUMBER + 1 ;
1289341
1290342      END ;  { "FOR T := 0 TO TOTAL_SITUATIONS" }
1291343
1292344 { Write "end of file" to column file                                          }
1293345
1294346      COL_FILE.COLUMN := 999999999 ;
1295347      KEY$FILE(KIF_INSERT_RECORD, DUMMY, COL_FILE, COL_STATUS_BLOCK);
1296348
1297    END ;  { PRINT_RECORDS }

MAP OF IDENTIFIERS FOR  PRINT_RE
```

| IDENTIFIER NAME | KIND | SIZE (BYTES, BITS) | STACK DISPLACEMENT LEVEL(DISPL) (BYTE, BIT) | | PICTURE (PACKED FIELDS ONLY) |
|---|---|---|---|---|---|
| SIT_NUMBER | VARIABLE | (2,0) | #0028 | DIRECT | |
| LINE | VARIABLE | (2,0) | #002A | DIRECT | |
| POSITION | VARIABLE | (4,0) | #002C | DIRECT | |
| RESPONSE | VARIABLE | (2,0) | #0030 | DIRECT | |
| LAST_SINGLE | VARIABLE | (2,0) | #0032 | DIRECT | |
| QUEST_NUMBER | VARIABLE | (2,0) | #0034 | DIRECT | |
| TEMP_POS | VARIABLE | (4,0) | #0036 | DIRECT | |
| SIT_DISPLAY | VARIABLE | (4,0) | #003A | DIRECT | |
| INTERPRETATION | VARIABLE | (16,0) | #003E | DIRECT | |
| SINGLE_RESPONSE | VARIABLE | (0,1) | #004E | DIRECT | |
| ALL_DONE | VARIABLE | (0,1) | #0050 | DIRECT | |
| FOUND_SPACE | VARIABLE | (0,1) | #0052 | DIRECT | |
| FOUND_LAST | VARIABLE | (0,1) | #0054 | DIRECT | |
| LOCATED | VARIABLE | (0,1) | #0056 | DIRECT | |
| LOCATION | VARIABLE | (2,0) | #0058 | DIRECT | |
| LIMIT | VARIABLE | (2,0) | #005A | DIRECT | |
| HORIZONTAL_LINE | VARIABLE | (0,1) | #005C | DIRECT | |

```
1298
1299
1300     { ********************************************************** }
1301
1302     PROCEDURE RPT_PRINT ;
1303
1304     ( This procedure prints the decision tree in logical pages 80 char-
1305        acters in width by using the secondary key (line number) of the
1306        KIF file created in the PRINT_RECORDS procedure; by using the KIF
1307        column file as the means to determine which columns have descriptive
1308        data to print, the tree will be compressed in it printing        }
1309
1310     VAR  PAGE_NUMBER   INTEGER ;
1311          BEG_POS : LONGINT ;
1312          END_POS : LONGINT ;
1313          LINE  : INTEGER ;
1314          TOTAL_PAGES : INTEGER ;
1315          CHECK_PAGE   LONGINT ;
1316          PROBLEM_NAME   PACKED ARRAY [1..30] OF CHAR ;
1317          DATE_PRNT : PACKED ARRAY [1..8] OF CHAR ;
1318          LINE_KEY : PACKED ARRAY [1..6] OF CHAR ;
1319          LINE_COMPLETE : BOOLEAN ;
1320          PAGE_COMPLETE   BOOLEAN ;
1321          REPORT_COMPLETE : BOOLEAN ;
1322          IN_RANGE : BOOLEAN ;
1323          FIRST : BOOLEAN ;
1324
1325     BEGIN  { RPT_PRINT }
1326  2    DATE(DATE_PRNT);
1327  3    PAGE_NUMBER := 0 ;
1328  4    LINE := 1 ;
1329  5    REPORT_COMPLETE := FALSE ;
1330  6    TOTAL_PAGES := WIDTH_OF_PAPER DIV 80 ;
1331  7    CHECK_PAGE := TOTAL_PAGES * 80 ;
1332  8    IF CHECK_PAGE < WIDTH_OF_PAPER THEN
1333  9       TOTAL_PAGES := TOTAL_PAGES + 1 ;
1334 10    READ(PROBLEM, 0, PROB);
1335 11    PROBLEM_NAME := PROB.DESCRIPTION ;
1336 12    END_POS := 0 ;
1337 13    CLEAR_LINE(22);
1338 14    DISPLAY(VDT_BLK, 22, 10, 'PROCESSING PAGE NUMBER:   ',99);
1339 15    DISPLAY(VDT_BLK, 22, 45, 'AND LINE NUMBER: ',99);
1340 16
1341 17    REPEAT     { "UNTIL REPORT_COMPLETE" }
1342 18
1343 19 ( Calculate the positions which should be printed and update relative
1344 20    position number in each record                                    }
1345 21
1346 22       KEY$FILE(KIF_READ_BY_KEY, END_POS, COL_FILE, COL_STATUS_BLOCK);
1347 23       FIRST := TRUE ;
1348 24       NUMBER := 1 ;
1349 25       FOR T := 1 TO 80 DO
1350 26         BEGIN
```

```
1351  27            IF NOT REPORT_COMPLETE THEN
1352  28            BEGIN
1353  29              KEY$FILE(KIF_READ_NEXT,DUMMY,COL_FILE,COL_STATUS_BLOCK);
1354  30              LONG_NUMBER := COL_FILE.COLUMN ;
1355  31              KEY$FILE(KIF_READ_BY_KEY_LOCKED,LONG_NUMBER,
1356  32                COL_FILE,COL_STATUS_BLOCK);
1357  33              COL_FILE.POSITION := NUMBER ;
1358  34              KEY$FILE(KIF_REWRITE_RECORD,LONG_NUMBER,
1359  35                COL_FILE,COL_STATUS_BLOCK);
1360  36              IF COL_FILE.COLUMN = 999999999
1361  37                THEN REPORT_COMPLETE := TRUE ;
1362  38              IF FIRST THEN
1363  39              BEGIN
1364  40                FIRST := FALSE ;
1365  41                BEG_POS := COL_FILE.COLUMN ;
1366  42              END ;
1367  43              IF NOT REPORT_COMPLETE THEN END_POS := COL_FILE.COLUMN ;
1368  44            END ;
1369  45            NUMBER := NUMBER + 1 ;
1370  46          END ;
1371  47          PAGE_NUMBER := (BEG_POS DIV 80) + 1 ;
1372  48          LINE := 1 ;
1373  49
1374  50  { Print heading of page and read first KIF record                     }
1375  51
1376  52          PAGE(PRINTER);
1377  53          WRITELN(PRINTER,'***********************************',
1378  54                          '***********************************');
1379  55          WRITELN(PRINTER);
1380  56          WRITELN(PRINTER,'       ',DATE_PRNT,'            DECISION TREE ',
1381  57                          'REPRESENTATION       Page ',PAGE_NUMBER:4,
1382  58                          ' of ',TOTAL_PAGES:4);
1383  59          WRITELN(PRINTER);
1384  60          WRITELN(PRINTER,'                          PROBLEM CODE:   ',
1385  61                                                    PROBLEM_FILE);
1386  62          WRITELN(PRINTER,'                          PROBLEM NAME:   ',
1387  63                                                    PROBLEM_NAME);
1388  64          WRITELN(PRINTER);
1389  65          WRITELN(PRINTER);
1390  66          KIF_STATUS_BLOCK.KIF_KEY_NUMBER := 2 ;
1391  67          KEY$FILE(KIF_READ_BY_KEY,LINE,KEY_FILE,KIF_STATUS_BLOCK);
1392  68
1393  69          ENCODE(LINE_KEY,1,STAT,PAGE_NUMBER:6);
1394  70          DISPLAY(VDT_BLK,22,34,LINE_KEY,6);
1395  71          PAGE_COMPLETE := FALSE ;
1396  72
1397  73          REPEAT   { "UNTIL PAGE_COMPLETE" }
1398  74
1399  75  { Clear buffer and check all KIF records with this line number         }
1400  76
1401  77            FOR T := 1 TO 80 DO
1402  78              BUFFER[T] := ' ';
1403  79            LINE_COMPLETE := FALSE ;
1404  80            ENCODE(LINE_KEY,1,STAT,LINE:6);
1405  81            DISPLAY(VDT_BLK,22,65,LINE_KEY,6);
1406  82
1407  83            REPEAT { "UNTIL LINE_COMPLETE" }
1408  84
1409  85  { Check all KIF records to see if thier beginning and/or ending
1410  86    positions fall into the 80 characters now being printed and if
1411  87    they are "in range", change their absolute beginnning and ending
1412  88    positions to relative values in the 80 character buffer              }
1413  89
1414  90              IN_RANGE := TRUE ;
1415  91
1416  92              IF BEG_POS > KEY_FILE.END_POSITION OR
1417  93                 END_POS < KEY_FILE.BEG_POSITION THEN IN_RANGE := FALSE;
1418  94
1419  95              IF IN_RANGE THEN
1420  96              BEGIN
1421  97                IF KEY_FILE.END_POSITION > END_POS THEN
1422  98                  KEY_FILE.END_POSITION := END_POS ;
1423  99
1424 100  { For text records, use KEY_FILE.NUM_CHAR as the beginning position
1425 101    of the text that should be printed                                  }
```

```
1426102
1427103              IF KEY_FILE.BEG_POSITION < BEG_POS THEN
1428104              BEGIN
1429105                KEY_FILE.NUM_CHAR := BEG_POS - KEY_FILE.BEG_POSITION;
1430106                KEY_FILE.NUM_CHAR := KEY_FILE.NUM_CHAR + 1 ;
1431107                KEY_FILE.BEG_POSITION := BEG_POS ;
1432108              END ELSE
1433109                KEY_FILE.NUM_CHAR := 1 ;
1434110
1435111 { Transform the beginning and ending positions to relative values for
1436112   all records except horizontal lines                                  }
1437113
1438114              IF KEY_FILE.TYPE_CODE <> 2 THEN
1439115              BEGIN
1440116                KEY$FILE(KIF_READ_BY_KEY,KEY_FILE.BEG_POSITION,
1441117                   COL_FILE,COL_STATUS_BLOCK);
1442118                KEY_FILE.BEG_POSITION := COL_FILE.POSITION ;
1443119
1444120                KEY$FILE(KIF_READ_BY_KEY,KEY_FILE.END_POSITION,
1445121                   COL_FILE,COL_STATUS_BLOCK);
1446122                KEY_FILE.END_POSITION := COL_FILE.POSITION ;
1447123              END ;
1448124
1449125 { For vertical line records, just print a single ":" character         }
1450126
1451127              IF KEY_FILE.TYPE_CODE = 1 THEN
1452128                BUFFER[KEY_FILE.BEG_POSITION] := CHR(124);
1453129
1454130 { For "arrow" records, leave a blank space                             }
1455131
1456132              IF KEY_FILE.TYPE_CODE = 4 THEN
1457133                BUFFER[KEY_FILE.BEG_POSITION] := ' ' ;
1458134
1459135 { For horizontal line records, "draw" a line from the beginning to
1460136   the ending position after changing these two from absolute to
1461137   relative position numbers                                            }
1462138
1463139              IF KEY_FILE.TYPE_CODE = 2 THEN
1464140              BEGIN
1465141                LONG_NUMBER := KEY_FILE.BEG_POSITION ;
1466142                LOOP : FOR T := KEY_FILE.BEG_POSITION
1467143                               TO KEY_FILE.END_POSITION DO
1468144                BEGIN
1469145                  KEY$FILE(KIF_READ_BY_KEY,LONG_NUMBER,
1470146                     COL_FILE,COL_STATUS_BLOCK);
1471147                  IF COL_STATUS_BLOCK.KIF_STATUS_CODE <> 181 THEN
1472148                  BEGIN
1473149                    KEY_FILE.BEG_POSITION := COL_FILE.POSITION ;
1474150                    ESCAPE LOOP ;
1475151                  END ;
1476152                  LONG_NUMBER := LONG_NUMBER + 1 ;
1477153                END ;
1478154
1479155                LONG_NUMBER := KEY_FILE.END_POSITION ;
1480156                LOOP : FOR T := KEY_FILE.END_POSITION
1481157                               DOWNTO KEY_FILE.BEG_POSITION DO
1482158                BEGIN
1483159                  KEY$FILE(KIF_READ_BY_KEY,LONG_NUMBER,
1484160                     COL_FILE,COL_STATUS_BLOCK);
1485161                  IF COL_STATUS_BLOCK.KIF_STATUS_CODE <> 181 THEN
1486162                  BEGIN
1487163                    KEY_FILE.END_POSITION := COL_FILE.POSITION ;
1488164                    ESCAPE LOOP ;
1489165                  END ;
1490166                  LONG_NUMBER := LONG_NUMBER - 1 ;
1491167                END ;
1492168
1493169                FOR T := KEY_FILE.BEG_POSITION
1494170                  TO KEY_FILE.END_POSITION DO
1495171                    BUFFER[T] := '-' ;
1496172
1497173              END ;
1498174
1499175 { For text records, store the text in the buffer                       }
```

```
1500176
1501177                   IF KEY_FILE.TYPE_CODE = 3 THEN
1502178                   BEGIN
1503179                     FOR T := KEY_FILE.BEG_POSITION
1504180                                           TO KEY_FILE.END_POSITION DO
1505181                     BEGIN
1506182                       BUFFER[T] := KEY_FILE.TEXT_DATA[KEY_FILE.NUM_CHAR];
1507183                       KEY_FILE.NUM_CHAR := KEY_FILE.NUM_CHAR + 1 ;
1508184                     END ;
1509185                   END ;
1510186                 END ;
1511187
1512188                 KEY$FILE(KIF_READ_NEXT,DUMMY,KEY_FILE,KIF_STATUS_BLOCK);
1513189
1514190                 IF KEY_FILE.ALT_KEY <> LINE THEN
1515191                 BEGIN
1516192                   WRITELN(PRINTER,BUFFER);
1517193                   LINE_COMPLETE := TRUE ;
1518194                   LINE := KEY_FILE.ALT_KEY ;
1519195                 END ;
1520196
1521197                 IF KIF_STATUS_BLOCK.KIF_STATUS_CODE <> 0 THEN
1522198                 BEGIN
1523199                   WRITELN(PRINTER,BUFFER);
1524200                   LINE_COMPLETE := TRUE ;
1525201                   PAGE_COMPLETE := TRUE ;
1526202                   LINE := 1 ;
1527203                 END ;
1528204
1529205             UNTIL LINE_COMPLETE ;
1530206
1531207           UNTIL PAGE_COMPLETE ;
1532208
1533209       UNTIL REPORT_COMPLETE ;
1534210
1535     END ;   { RPT_PRINT }

MAP OF IDENTIFIERS FOR   RPT_PRIN

IDENTIFIER NAME     KIND         SIZE          STACK                PICTURE
                                 (BYTES,BITS)  DISPLACEMENT         (PACKED FIELDS ONLY)
                                 LEVEL(DISPL)  (BYTE,BIT)

PAGE_NUMBER         VARIABLE     (2,0)         #0028       DIRECT
BEG_POS             VARIABLE     (4,0)         #002A       DIRECT
END_POS             VARIABLE     (4,0)         #002E       DIRECT
LINE                VARIABLE     (2,0)         #0032       DIRECT
TOTAL_PAGES         VARIABLE     (2,0)         #0034       DIRECT
CHECK_PAGE          VARIABLE     (4,0)         #0036       DIRECT
PROBLEM_NAME        VARIABLE     (30,0)        #003A       DIRECT
DATE_PRNT           VARIABLE     (8,0)         #0058       DIRECT
LINE_KEY            VARIABLE     (6,0)         #0060       DIRECT
LINE_COMPLETE       VARIABLE     (0,1)         #0066       DIRECT
PAGE_COMPLETE       VARIABLE     (0,1)         #0068       DIRECT
REPORT_COMPLETE     VARIABLE     (0,1)         #006A       DIRECT
IN_RANGE            VARIABLE     (0,1)         #006C       DIRECT
FIRST               VARIABLE     (0,1)         #006E       DIRECT 1536
1537
1538      { ******************************************************** }
1539
1540      PROCEDURE SCRN1_DISPLAY ;    { First screen format }
1541
1542      BEGIN
1543  2     DISPLAY(VDT_BLK,1,12,'P A R A D O C S    D E V E L O P M E N T',
1544  3                                                               99);
1545  4     DISPLAY(VDT_BLK,1,56,'S Y S T E M',99);
1546  5     DISPLAY(VDT_BLK,2,19,'**** DECISION TREE PRINTING ROUTINE ****',
1547  6                                                               99);
1548  7     DISPLAY(VDT_BLK,3,13,'YOUR USER CODE: ',99);
1549  8     DISPLAY(VDT_BLK,4,06,'         PROBLEM CODE:  ',99);
1550  9     DISPLAY(VDT_BLK,4,45,'(no entry when completed)',99);
1551      END;   { SCRN1_DISPLAY }
1552
1553      { ********************************************************}
```

```
1554       {$PAGE}
1555       { ****************************************************************}
1556
1557       BEGIN   { MAIN PROGRAM }
1558
1559    3  SET_UP ;
1560    4
1561    5  USER_NAME := 'USERFILE';
1562    6  U_PROB_NAME := 'UPRBFILE';
1563    7
1564    8  { Open the user and user/problem files                              }
1565    9
1566   10  SETNAME(USERFILE,USER_NAME);
1567   11  IOTERM(USERFILE,OVAL,TRUE);
1568   12  EXTEND(USERFILE);
1569   13  READ(USERFILE,0,USER);
1570   14  DECODE(USER.NEXT_RECORD,1,STAT,USER_RECORDS);
1571   15  USER_RECORDS := USER_RECORDS - 1 ;
1572   16
1573   17  SETNAME(U_PROB_FILE,U_PROB_NAME);
1574   18  IOTERM(U_PROB_FILE,OVAL,TRUE);
1575   19  EXTEND(U_PROB_FILE);
1576   20  READ(U_PROB_FILE,0,USER_PROB);
1577   21  DECODE(USER_PROB.NEXT_RECORD,1,STAT,U_PROB_RECORDS);
1578   22  U_PROB_RECORDS := U_PROB_RECORDS - 1 ;
1579   23
1580   24  SCRN1_DISPLAY ;
1581   25  DONE := FALSE ;
1582   26  ERROR_STATUS := TRUE ;
1583   27
1584   28  { The following accepts a valid user code and terminates if no etnry }
1585   29
1586   30  REPEAT
1587   31     ACCEPT(VDT_BLK,3,29,USER_CODE,6,T);
1588   32     IF USER_CODE = '      ' THEN DONE := TRUE ;
1589   33     IF NOT DONE THEN FOR T := 0 TO USER_RECORDS DO
1590   34        IF ERROR_STATUS THEN
1591   35        BEGIN
1592   36           READ(USERFILE,T,USER);
1593   37           IF USER.USER_CODE = USER_CODE THEN
1594   38              ERROR_STATUS := FALSE ;
1595   39        END ;
1596   40
1597   41     IF NOT ERROR_STATUS THEN
1598   42     BEGIN
1599   43        DISPLAY(VDT_BLK,3,23,'NAME',99);
1600   44        DISPLAY(VDT_BLK,3,42,'                    ',99);
1601   45        DISPLAY(VDT_BLK,3,29,USER.USER_NAME,30);
1602   46     END ELSE
1603   47     BEGIN
1604   48        DISPLAY(VDT_BLK,3,42,'Sorry, this code is not valid',99);
1605   49     END ;
1606   50
1607   51  UNTIL DONE OR NOT ERROR_STATUS ;
1608   52
1609   53  { The following rouine accepts a problem file name, checks to see if
1610   54    this user is entitled to use the program, checks to see if it still
1611   55    exists, and opens up the problem, situation and description files;
1612   56    if nothing is enterd, the program will terminate                   }
1613   57
1614   58  IF NOT DONE THEN REPEAT
1615   59
1616   60     ACCEPT(VDT_BLK,4,29,PROBLEM_FILE,8,T);
1617   61     OPEN := TRUE ;
1618   62     VALID := FALSE ;
1619   63     IF PROBLEM_FILE = '        ' THEN DONE := TRUE ;
1620   64
1621   65     IF NOT DONE THEN FOR T := 0 TO U_PROB_RECORDS DO
1622   66        IF NOT VALID THEN
1623   67        BEGIN
1624   68           READ(U_PROB_FILE,T,USER_PROB);
1625   69           IF USER_PROB.USER_CODE = USER_CODE
1626   70              AND USER_PROB.PROBLEM_CODE = PROBLEM_FILE
1627   71              AND USER_PROB.STATUS_CODE <> 'D' THEN
1628   72                 VALID := TRUE ;
1629   73        END ;
```

```
1630 74
1631 75      IF NOT VALID THEN OPEN := FALSE ;
1632 76
1633 77      IF NOT DONE AND VALID THEN
1634 78      BEGIN
1635 79
1636 80 { Open up problem file                                                      }
1637 81
1638 82          CLOSE(PROBLEM);
1639 83          SETMEMBER(PROBLEM, PROB_NODE, PROBLEM_FILE);
1640 84          IOTERM(PROBLEM, OVAL, FALSE);
1641 85          RESET(PROBLEM);
1642 86          IF STATUS(PROBLEM) <> 0 THEN
1643 87             OPEN := FALSE ;
1644 88
1645 89          IF OPEN THEN
1646 90          BEGIN
1647 91             CLOSE(PROBLEM);
1648 92             IOTERM(PROBLEM, OVAL, TRUE);
1649 93             EXTEND(PROBLEM);
1650 94          END ;
1651 95
1652 96 { Open up description file                                                  }
1653 97
1654 98          IF OPEN THEN
1655 99          BEGIN
1656100             CLOSE(DESCRIPTION);
1657101             SETMEMBER(DESCRIPTION, DESC_NODE, PROBLEM_FILE);
1658102             IOTERM(DESCRIPTION, OVAL, TRUE);
1659103             EXTEND(DESCRIPTION);
1660104          END ;
1661105
1662106 { Open up situation file                                                    }
1663107
1664108          IF OPEN THEN
1665109          BEGIN
1666110             CLOSE(SITUATION);
1667111             SETMEMBER(SITUATION, SIT_NODE, PROBLEM_FILE);
1668112             IOTERM(SITUATION, OVAL, TRUE);
1669113             EXTEND(SITUATION);
1670114          END ;
1671115
1672116      END ;
1673117
1674118 UNTIL OPEN OR DONE ;
1675119
1676120 IF NOT DONE THEN
1677121 BEGIN
1678122
1679123      READ(PROBLEM, 0, PROB);
1680124      DISPLAY(VDT_BLK, 4, 42, PROB.DESCRIPTION, 30);
1681125      TOTAL_QUESTIONS := PROB.NEXT_QUESTION - 1 ;
1682126      TOTAL_SITUATIONS := PROB.NUM_SITUATIONS - 1 ;
1683127
1684128      DISPLAY(VDT_BLK, 13, 34, 'PLEASE WAIT', 99);
1685129
1686130      SEQUENCE_TABLE ;
1687131
1688132      WORK_TABLE ;
1689133
1690134      PRINT_RECORDS ;
1691135
1692136 { This will allow the report to be printed if printer available              }
1693137
1694138      REPEAT
1695139         CLEAR_LINE(23);
1696140         DISPLAY(VDT_BLK, 23, 21, 'READY TO PRINT THIS REPOR', 99);
1697141         DISPLAY(VDT_BLK, 23, 46, 'T NOW ?    [ ] ', 99);
1698142         ACPT_YES_NO(DUMY, 23, 58, YES);
1699143         CLEAR_LINE(22);
1700144         IF YES THEN
1701145         BEGIN
1702146
1703147            CLOSE(PRINTER)
```

```
1704148          SETNAME(PRINTER, PRNTNAME);
1705149          IOTERM(PRINTER, OVAL, FALSE);
1706150          EXTEND(PRINTER);
1707151
1708152          OPEN := TRUE ;
1709153          IF STATUS(PRINTER) <> 0 THEN
1710154            OPEN := FALSE ;
1711155
1712156          IF NOT OPEN THEN
1713157            DISPLAY(VDT_BLK,22,20,'PRINTER NOT AVAILABLE AT THE MOMENT',
1714158                                                                     99);
1715159          IF OPEN THEN
1716160          BEGIN
1717161            CLEAR_LINE(22);
1718162
1719163 { Print complete report                                                }
1720164
1721165            RPT_PRINT ;
1722166
1723167            PAGE(PRINTER);
1724168            CLOSE(PRINTER);
1725169            YES := FALSE
1726170
1727171          END ;
1728172
1729173       END ;
1730174
1731175    UNTIL NOT YES ;
1732176
1733177 END ;   { "IF NOT DONE THEN " }
1734178
1735    END.
```

MAP OF IDENTIFIERS FOR   DECISION

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| INT_RCD | RECORD | (18,0) | | |
| INT_VALUE | FIELD | (2,0) | (0,0) | UNPACKED |
| INTERP | FIELD | (16,0) | (2,0) | UNPACKED |
| LST_SIT | RECORD | (2,0) | | |
| SIT_NUMBER | FIELD | (2,0) | (0,0) | UNPACKED |
| T_KIF_STATUS_BLOCK | RECORD | (36,0) | | |
| KIF_STATUS_CODE | +FIELD | (0,8) | (0,0) | PACKED (XXXX XXXX .... ....) |
| KIF_KEY_NUMBER | +FIELD | (0,8) | (0,8) | PACKED (.... .... XXXX XXXX) |
| KIF_ACCESS | +FIELD | (0,8) | (2,0) | PACKED (XXXX XXXX .... ....) |
| KIF_RESERVED | +FIELD | (0,8) | (2,8) | PACKED (.... .... XXXX XXXX) |
| KIF_RECORD_LEN | FIELD | (2,0) | (4,0) | UNPACKED |
| KIF_PATHNAME | FIELD | (30,0) | (6,0) | UNPACKED |
| KEY_RECORD | RECORD | (48,0) | | |
| LINE_NUMBER | FIELD | (2,0) | (0,0) | UNPACKED |
| BEG_POSITION | FIELD | (4,0) | (2,0) | UNPACKED |
| END_POSITION | FIELD | (4,0) | (6,0) | UNPACKED |
| ALT_KEY | FIELD | (2,0) | (10,0) | UNPACKED |
| TYPE_CODE | FIELD | (2,0) | (12,0) | UNPACKED |
| NUM_CHAR | FIELD | (4,0) | (14,0) | UNPACKED |
| TEXT_DATA | FIELD | (30,0) | (18,0) | UNPACKED |
| KEY_COLUMN | RECORD | (6,0) | | |
| COLUMN | FIELD | (4,0) | (0,0) | UNPACKED |
| POSITION | FIELD | (2,0) | (4,0) | UNPACKED |
| WORK_RECORD | RECORD | (24,0) | | |
| RECORD_NUMBER | FIELD | (2,0) | (0,0) | UNPACKED |
| QUESTION_NUMBER | FIELD | (2,0) | (2,0) | UNPACKED |
| LGCL_IMPT_VALUE | FIELD | (2,0) | (4,0) | UNPACKED |
| NUMBER_ANSWERS | FIELD | (2,0) | (6,0) | UNPACKED |

DECISION_TREE_PRINTING

NUMBER_ENTRIES

| | | | | |
|---|---|---|---|---|
| | FIELD | (4,0) | (8,0) | UNPACKED |
| INC_RESPONSES | FIELD | (4,0) | (12,0) | UNPACKED |
| START_POINT | FIELD | (4,0) | (16,0) | UNPACKED |
| PAGES | FIELD | (4,0) | (20,0) | UNPACKED |
| PROB_RECORD | RECORD | (96,0) | | |
| PROBLEM_CODE | FIELD | (8,0) | (0,0) | UNPACKED |
| DESCRIPTION | FIELD | (30,0) | (8,0) | UNPACKED |
| NEXT_QUESTION | FIELD | (2,0) | (38,0) | UNPACKED |
| INT_QUESTIONS | FIELD | (2,0) | (40,0) | UNPACKED |
| TIMES_USED | FIELD | (2,0) | (42,0) | UNPACKED |
| TOPIC_CODE | FIELD | (8,0) | (44,0) | UNPACKED |
| DATE_ENTERED | FIELD | (8,0) | (52,0) | UNPACKED |
| DATE_LAST_USED | | | | |
| | FIELD | (8,0) | (60,0) | UNPACKED |
| MENTOR_CODE | FIELD | (6,0) | (68,0) | UNPACKED |
| NUM_SITUATIONS | | | | |
| | FIELD | (2,0) | (74,0) | UNPACKED |
| MINIMUM_LI | FIELD | (2,0) | (76,0) | UNPACKED |
| CALC_LI_FLAG | FIELD | (0,8) | (78,0) | UNPACKED |
| FLAG1_FUTURE | FIELD | (0,8) | (80,0) | UNPACKED |
| FLAG2_FUTURE | FIELD | (0,8) | (82,0) | UNPACKED |
| FLAG3_FUTURE | FIELD | (0,8) | (84,0) | UNPACKED |
| DATA_BASE | FIELD | (0,8) | (86,0) | UNPACKED |
| PRIMARY_CODE | FIELD | (8,0) | (88,0) | UNPACKED |
| NUM_QUESTION | FIELD | (2,0) | (0,0) | UNPACKED |
| DESC_QUESTION | FIELD | (30,0) | (2,0) | UNPACKED |
| YES_NO | FIELD | (0,8) | (32,0) | UNPACKED |
| CALCULATE | FIELD | (0,8) | (34,0) | UNPACKED |
| INT_QUEST | FIELD | (0,8) | (36,0) | UNPACKED |
| REFERENCE | FIELD | (0,8) | (38,0) | UNPACKED |
| UNIT_DESC | FIELD | (10,0) | (40,0) | UNPACKED |
| BOUNDARIES | FIELD | (2,0) | (50,0) | UNPACKED |
| LOWER_1_LIMIT | FIELD | (4,0) | (52,0) | UNPACKED |
| UPPER_1_LIMIT | FIELD | (4,0) | (56,0) | UNPACKED |
| LOWER_2_LIMIT | FIELD | (4,0) | (60,0) | UNPACKED |
| UPPER_2_LIMIT | FIELD | (4,0) | (64,0) | UNPACKED |
| REQUIRED | FIELD | (0,8) | (68,0) | UNPACKED |
| LGCL_IMPT | FIELD | (2,0) | (70,0) | UNPACKED |
| EXPT_IMPT | FIELD | (2,0) | (72,0) | UNPACKED |
| LGCL_INTR | FIELD | (2,0) | (74,0) | UNPACKED |
| EXPT_INTR | FIELD | (2,0) | (76,0) | UNPACKED |
| LGCL_CMPL | FIELD | (2,0) | (78,0) | UNPACKED |
| EXPT_CMPL | FIELD | (2,0) | (80,0) | UNPACKED |
| STATUS_CODE | FIELD | (0,8) | (82,0) | UNPACKED |
| SORT_FLAG | FIELD | (0,8) | (84,0) | UNPACKED |
| FLAG6_FUTURE | FIELD | (0,8) | (86,0) | UNPACKED |
| FLAG7_FUTURE | FIELD | (0,8) | (88,0) | UNPACKED |
| FLAG8_FUTURE | FIELD | (0,8) | (90,0) | UNPACKED |
| SIT_RECORD | RECORD | (250,0) | | |
| SIT_NUM | FIELD | (4,0) | (0,0) | UNPACKED |
| SIT_DESCRIPTION | | | | |
| | FIELD | (80,0) | (4,0) | UNPACKED |
| NEXT_SIT | FIELD | (2,0) | (84,0) | UNPACKED |
| PROB1_LINK | FIELD | (8,0) | (86,0) | UNPACKED |
| PROB2_LINK | FIELD | (8,0) | (94,0) | UNPACKED |
| PROB3_LINK | FIELD | (8,0) | (102,0) | UNPACKED |
| PROB4_LINK | FIELD | (8,0) | (110,0) | UNPACKED |
| AUTHOR_CODE | FIELD | (6,0) | (118,0) | UNPACKED |
| DATE_ENTERED | FIELD | (8,0) | (124,0) | UNPACKED |
| DATE_LAST_USED | | | | |
| | FIELD | (8,0) | (132,0) | UNPACKED |
| NUM_ENCOUNTERS | | | | |
| | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |

| Name | Type | Size | Offset/Addr | Mode |
|---|---|---|---|---|
| TEXT_LINE | FIELD | (80,0) | (8,0) | UNPACKED |
| USER_RECORD | RECORD | (202,0) | | |
|   NEXT_RECORD | FIELD | (4,0) | (0,0) | UNPACKED |
|   USER_CODE | FIELD | (6,0) | (4,0) | UNPACKED |
|   USER_NAME | FIELD | (30,0) | (10,0) | UNPACKED |
|   USER_TITLE | FIELD | (30,0) | (40,0) | UNPACKED |
|   ADDRESS1 | FIELD | (30,0) | (70,0) | UNPACKED |
|   ADDRESS2 | FIELD | (30,0) | (100,0) | UNPACKED |
|   ADDRESS3 | FIELD | (30,0) | (130,0) | UNPACKED |
|   PHONE | FIELD | (12,0) | (160,0) | UNPACKED |
|   MAX_STATUS | FIELD | (0,8) | (172,0) | UNPACKED |
|   PRINTER | FIELD | (0,8) | (174,0) | UNPACKED |
|   NUM_PROBLEMS | FIELD | (4,0) | (176,0) | UNPACKED |
|   DATE_ENTERED | FIELD | (8,0) | (180,0) | UNPACKED |
|   DATE_LAST_USED | | | | |
| | FIELD | (8,0) | (188,0) | UNPACKED |
|   TOTAL_TIMES | FIELD | (6,0) | (196,0) | UNPACKED |
| USER_PROBLEM_RECORD | | | | |
| | RECORD | (24,0) | | |
|   NEXT_RECORD | FIELD | (4,0) | (0,0) | UNPACKED |
|   USER_CODE | FIELD | (6,0) | (4,0) | UNPACKED |
|   PROBLEM_CODE | FIELD | (8,0) | (10,0) | UNPACKED |
|   STATUS_CODE | FIELD | (0,8) | (18,0) | UNPACKED |
|   TIMES_USED | FIELD | (4,0) | (20,0) | UNPACKED |
| PROBLEM | VARIABLE | (32,0) | #0080 | DIRECT |
| SITUATION | VARIABLE | (32,0) | #00A0 | DIRECT |
| DESCRIPTION | VARIABLE | (32,0) | #00C0 | DIRECT |
| USERFILE | VARIABLE | (32,0) | #00E0 | DIRECT |
| U_PROB_FILE | VARIABLE | (32,0) | #0100 | DIRECT |
| USER | VARIABLE | (202,0) | #0120 | DIRECT |
| USER_PROB | VARIABLE | (24,0) | #01EA | DIRECT |
| PROB | VARIABLE | (96,0) | #0202 | DIRECT |
| SIT | VARIABLE | (250,0) | #0262 | DIRECT |
| DESC | VARIABLE | (88,0) | #035C | DIRECT |
| USER_CODE | VARIABLE | (6,0) | #03B4 | DIRECT |
| USER_RECORDS | VARIABLE | (2,0) | #03BA | DIRECT |
| U_PROB_RECORDS | VARIABLE | (2,0) | #03BC | DIRECT |
| USER_NAME | VARIABLE | (8,0) | #03BE | DIRECT |
| U_PROB_NAME | VARIABLE | (8,0) | #03C6 | DIRECT |
| PROBLEM_FILE | VARIABLE | (8,0) | #03CE | DIRECT |
| DESC_NODE | VARIABLE | (8,0) | #03D6 | DIRECT |
| PROB_NODE | VARIABLE | (8,0) | #03DE | DIRECT |
| SIT_NODE | VARIABLE | (8,0) | #03E6 | DIRECT |
| VDT_BLK | VARIABLE | (32,0) | #03EE | DIRECT |
| PRINTER | VARIABLE | (32,0) | #040E | DIRECT |
| REPORT | VARIABLE | (32,0) | #042E | DIRECT |
| WORKFILE | VARIABLE | (32,0) | #044E | DIRECT |
| WORK | VARIABLE | (24,0) | #046E | DIRECT |
| INT_FILE | VARIABLE | (32,0) | #0486 | DIRECT |
| INTGR | VARIABLE | (18,0) | #04A6 | DIRECT |
| WORK_SET | VARIABLE | (32,0) | #04B8 | DIRECT |
| SIT_LST_FILE | VARIABLE | (32,0) | #04D8 | DIRECT |
| SIT_LST | VARIABLE | (2,0) | #04F8 | DIRECT |
| SIT_SET | VARIABLE | (32,0) | #04FA | DIRECT |
| LISTNAME | VARIABLE | (8,0) | #051A | DIRECT |
| INTGNAME | VARIABLE | (8,0) | #0522 | DIRECT |
| INTGQUST | VARIABLE | (8,0) | #052A | DIRECT |
| PRNTNAME | VARIABLE | (8,0) | #0532 | DIRECT |
| REPTNAME | VARIABLE | (8,0) | #053A | DIRECT |
| BUFFER | VARIABLE | (80,0) | #0542 | DIRECT |
| WORKNAME | VARIABLE | (8,0) | #0592 | DIRECT |
| DATEPRNT | VARIABLE | (8,0) | #059A | DIRECT |
| SEG_TABLE | VARIABLE | (1300,0) | #05A2 | DIRECT |
| LONG_NUMBER | VARIABLE | (4,0) | #0AB6 | DIRECT |
| WIDTH_OF_PAPER | VARIABLE | (4,0) | #0ABA | DIRECT |
| T | VARIABLE | (0,8) | #0ABE | DIRECT |
| DUMY | VARIABLE | (0,8) | #0AC0 | DIRECT |
| VALID | VARIABLE | (0,1) | #0AC2 | DIRECT |
| DONE | VARIABLE | (0,1) | #0AC4 | DIRECT |
| OPEN | VARIABLE | (0,1) | #0AC6 | DIRECT |
| YES | VARIABLE | (0,1) | #0AC8 | DIRECT |
| OVAL | VARIABLE | (0,1) | #0ACA | DIRECT |
| ERROR_STATUS | VARIABLE | (0,1) | #0ACC | DIRECT |
| LEVEL | VARIABLE | (2,0) | #0ACE | DIRECT |

```
NEXT_INTG         VARIABLE    (2,0)      #0AD0    DIRECT
NEXT_LIST         VARIABLE    (2,0)      #0AD2    DIRECT
STAT              VARIABLE    (2,0)      #0AD4    DIRECT
DUMMY             VARIABLE    (2,0)      #0AD6    DIRECT
TOTAL_QUESTIONS   VARIABLE    (2,0)      #0AD8    DIRECT
TOTAL_SITUATIONS
                  VARIABLE    (2,0)      #0ADA    DIRECT
LGCL_IMPT         VARIABLE    (2,0)      #0ADC    DIRECT
NUMBER            VARIABLE    (2,0)      #0ADE    DIRECT
REF_SITUATION     VARIABLE    (2,0)      #0AE0    DIRECT
REF_SINC_STRING   VARIABLE    (100,0)    #0AE2    DIRECT
SPECIFIC          VARIABLE    (0,1)      #0B46    DIRECT
REF_MATCH         VARIABLE    (0,1)      #0B48    DIRECT
KIF_STATUS_BLOCK
                  VARIABLE    (36,0)     #0B4A    DIRECT
COL_STATUS_BLOCK
                  VARIABLE    (36,0)     #0B6E    DIRECT
KEY_FILE          VARIABLE    (48,0)     #0B92    DIRECT
COL_FILE          VARIABLE    (6,0)      #0BC2    DIRECT 1736
1737
MAXIMUM NUMBER OF IDENTIFIERS USED = 256

OPTIMIZATION SUMMARY

DXPSCL  1.7.1  81.254   OPTIMIZATION SUMMARY

"SET_UP  " -- 6000 HEAP BYTES REQUIRED TO OPTIMIZE AT LEVEL 1

"CLEAR_LI" -- 5000 HEAP BYTES REQUIRED TO OPTIMIZE AT LEVEL 1

"ACPT_YES" -- 5500 HEAP BYTES REQUIRED TO OPTIMIZE AT LEVEL 1

6 REDUNDANT COMMON SUBEXPRESSIONS ELIMINATED IN "SEQUENCE"
  "SEQUENCE" -- 9900 HEAP BYTES REQUIRED TO OPTIMIZE AT LEVEL 1

"WORK_DSP" -- 9100 HEAP BYTES REQUIRED TO OPTIMIZE AT LEVEL 1

"CAPTURE_" -- 8000 HEAP BYTES REQUIRED TO OPTIMIZE AT LEVEL 1

"WORK_TAB" -- 8800 HEAP BYTES REQUIRED TO OPTIMIZE AT LEVEL 1

"CENTER  " -- 5900 HEAP BYTES REQUIRED TO OPTIMIZE AT LEVEL 1

"WRITE_VE" -- 5500 HEAP BYTES REQUIRED TO OPTIMIZE AT LEVEL 1

"KIF_WRIT" -- 5000 HEAP BYTES REQUIRED TO OPTIMIZE AT LEVEL 1

"COL_WRIT" -- 5200 HEAP BYTES REQUIRED TO OPTIMIZE AT LEVEL 1

"PRINT_RE" -- 15700 HEAP BYTES REQUIRED TO OPTIMIZE AT LEVEL 1

"RPT_PRIN" -- 11400 HEAP BYTES REQUIRED TO OPTIMIZE AT LEVEL 1

"SCRN1_DI" -- 5200 HEAP BYTES REQUIRED TO OPTIMIZE AT LEVEL 1

"DECISION" -- 11800 HEAP BYTES REQUIRED TO OPTIMIZE AT LEVEL 1

INSTRUCTIONS =    111
  SET_UP   LITERALS =    176   CODE =    486   DATA =     40

INSTRUCTIONS =     22
  CLEAR_LI LITERALS =     24   CODE =     94   DATA =    124

INSTRUCTIONS =     66
  ACPT_YES LITERALS =    102   CODE =    268   DATA =    114

INSTRUCTIONS =    309
  SEQUENCE LITERALS =    122   CODE =   1156   DATA =     88

INSTRUCTIONS =    450
  WORK_DSP LITERALS =    376   CODE =   1940   DATA =     46
```

```
            INSTRUCTIONS =    298
            CAPTURE_  LITERALS =      322   CODE =     1356   DATA =        88

INSTRUCTIONS =    384
            WORK_TAB  LITERALS =      188   CODE =     1578   DATA =        68
            INSTRUCTIONS =     56
            CENTER    LITERALS =       50   CODE =      186   DATA =        80

INSTRUCTIONS =     32
            WRITE_VE  LITERALS =       60   CODE =      158   DATA =        40

INSTRUCTIONS =     18
            KIF_WRIT  LITERALS =       26   CODE =       88   DATA =        40

INSTRUCTIONS =     39
            COL_WRIT  LITERALS =       26   CODE =      178   DATA =        48

INSTRUCTIONS =    841
            PRINT_RE  LITERALS =      552   CODE =     3344   DATA =       108

INSTRUCTIONS =    590
            RPT_PRIN  LITERALS =      342   CODE =     2628   DATA =       124

INSTRUCTIONS =     58
            SCRN1_DI  LITERALS =      222   CODE =      306   DATA =        40

INSTRUCTIONS =    642
            DECISION  LITERALS =      434   CODE =     2680   DATA =      3022
         SOURCE  = .PARADOCS.SRC.SUPER
         OBJECT  = .PARADOCS.OBJ.SUPER
         LISTING = .PARADOCS.LST.SUPER
         MESSAGE = .PARADOCS.L
         MEM1 = 6,4
         MEM2 = 13,4
         MEM3 = 10,4
         PRINT WIDTH = 80
         NUMBER OF LINES/PAGE = 60
         OPTIONS = (* NO OPTIONS SPECIFIED *)
         SUPPRESS PREPROCESSOR LINES = YES

LINE NUMBER                  COPY FILE PATHNAME
              28     .PARADOCS.SRC.LAYOUT
              57     .PARADOCS.SRC.VAR
             104     .PARADOCS.SRC.IO

PREPROC

SOURCE  = .PARADOCS.SRC.LINKPROB
         OBJECT  = .PARADOCS.OBJ.LINKPROB
         LISTING = .PARADOCS.LST.LINKPROB
         MESSAGE = .PARADOCS.L
         MEM1 = 6,4
         MEM2 = 13,4
         MEM3 = 10,4
         PRINT WIDTH = 80
         NUMBER OF LINES/PAGE = 60
         OPTIONS = (* NO OPTIONS SPECIFIED *)
         SUPPRESS PREPROCESSOR LINES = YES

LINE NUMBER                  COPY FILE PATHNAME
              53     .PARADOCS.SRC.LAYOUT
              88     .PARADOCS.SRC.VAR
             114     .PARADOCS.SRC.IO
         LINKED_PROBLEMS (*+             LINKED_P
            +            ACPT_YES
            ,            CHECK_CO
            ,            CLEAR_LI
            ,            CPY_PROB
            ,            NUMERIC_
            ,            LINK_DES
            +              CHANGE_D
           ..            QUESTION
```

```
+          ASSUME_N
,          BOUNDAR1
,          GST_CALC
        REFERENC
+          REF_SCRE
,          RESP_ACP
+             CALC_RES
        *)
DXPSCL
LINKED_PROBLEMS 18      ($WIDELIST,MAP,PAGE,}
19
20      { ***********************************************************
21
22        The following is a flowchart of the procedures used (excluding
23        screen and other small misc. procedures):
24
25
26                       LINKED_PROBLEMS
27                             !
28                             !
29        ----------------------------------------------------------------
30        !       !       !                       !                   !
31        !       !       !    CLEAR_LINE         !                   !
32      CHECK   CPY      !    NUMERIC_CHECK      !                   !
33      CODE  PROBLEM   !    ACPT_YES_NO        !                   !
34
35       ######OVERLAY 1#####   #######OVERLAY 2########   #####OVERLAY 3#####
36       #                  #   #                      #   #                 #
37       #    QUESTIONS     #   #     REFERENCE        #   #                 #
38       #       !          #   #        !             #   #    LINK_DESC    #
39       #    ----------    #   #    ----------        #   #       !         #
40       #    !    !    !   #   #    !         !       #   #       !         #
41       # ASSUME  !  GST   #   #  REF     RESP_ACPT   #   #  CHANGE_DESC    #
42       #   NO   !  CALC   #   #  SCREEN     !        #   #                 #
43       #    BOUNDARIES    #   #        CALC_RESPONSE #   #                 #
44       ####################   ########################   ###################
45
46      ***************************************************************}
47
48
49      PROGRAM LINKED_PROBLEMS ;
50
51      TYPE
52
53         SET_OF_CHAR = SET OF CHAR ;
54         VDT_CONTROL = ARRAY[1..16] OF INTEGER;
55
56      { The following is the record layout for the relative PROBLEM file }
57
58      PROB_RECORD=RECORD        CASE BOOLEAN OF
59                                TRUE:
60
61      { This is the "0" record layout for this file }
62
63        (PROBLEM_CODE    : PACKED ARRAY[1..8] OF CHAR;
64         DESCRIPTION     : PACKED ARRAY[1..30] OF CHAR;
65         NEXT_QUESTION   : INTEGER ;
66         INT_QUESTIONS   : INTEGER ;
67         TIMES_USED      : INTEGER ;
68         TOPIC_CODE      : PACKED ARRAY[1..8] OF CHAR;
69         DATE_ENTERED    : PACKED ARRAY[1..8] OF CHAR;
70         DATE_LAST_USED  : PACKED ARRAY[1..8] OF CHAR;
71         MENTOR_CODE     : PACKED ARRAY[1..6] OF CHAR;
72         NUM_SITUATIONS  : INTEGER ;
73         MINIMUM_LI      : INTEGER ;
74         CALC_LI_FLAG    : CHAR ;
75         FLAG1_FUTURE    : CHAR ;
76         FLAG2_FUTURE    : CHAR ;
77         FLAG3_FUTURE    : CHAR ;
78         DATA_BASE       : CHAR ;
79         PRIMARY_CODE    : PACKED ARRAY[1..8] OF CHAR);
80
81
```

```
 82                        FALSE;
 83
 84     { This is the "1" through "Nth" record layout    }
 85
 86       (NUM_QUESTION      : PACKED ARRAY[1..2] OF CHAR;
 87        DESC_QUESTION     : PACKED ARRAY[1..30] OF CHAR;
 88        YES_NO            : CHAR;
 89        CALCULATE         : CHAR;
 90        INT_QUEST         : CHAR;
 91        REFERENCE         : CHAR;
 92        UNIT_DESC         : PACKED ARRAY[1..10] OF CHAR;
 93        BOUNDARIES        : INTEGER ;
 94        LOWER_1_LIMIT     : REAL ;
 95        UPPER_1_LIMIT     : REAL ;
 96        LOWER_2_LIMIT     : REAL ;
 97        UPPER_2_LIMIT     : REAL ;
 98        REQUIRED          : CHAR;
 99        LGCL_IMPT         : INTEGER ;
100        EXPT_IMPT         : INTEGER ;
101        LGCL_INTR         : INTEGER ;
102        EXPT_INTR         : INTEGER ;
103        LGCL_CMPL         : INTEGER ;
104        EXPT_CMPL         : INTEGER ;
105        STATUS_CODE       : CHAR;
106        SORT_FLAG         : CHAR;
107        FLAG6_FUTURE      : CHAR;
108        FLAG7_FUTURE      : CHAR;
109        FLAG8_FUTURE      : CHAR)
110     END;
111
112
113     { The following is the record layout for the relative SITUATION file }
114
115     SIT_RECORD=RECORD
116
117        SIT_NUM           : PACKED ARRAY[1..4] OF CHAR;
118        SIT_DESCRIPTION   : PACKED ARRAY[1..80] OF CHAR;
119        NEXT_SIT          : INTEGER ;
120        PROB1_LINK        : PACKED ARRAY[1..8] OF CHAR;
121        PROB2_LINK        : PACKED ARRAY[1..8] OF CHAR;
122        PROB3_LINK        : PACKED ARRAY[1..8] OF CHAR;
123        PROB4_LINK        : PACKED ARRAY[1..8] OF CHAR;
124        AUTHOR_CODE       : PACKED ARRAY[1..6] OF CHAR;
125        DATE_ENTERED      : PACKED ARRAY[1..8] OF CHAR;
126        DATE_LAST_USED    : PACKED ARRAY[1..8] OF CHAR;
127        NUM_ENCOUNTERS    : INTEGER ;
128        SINC_STRING       : PACKED ARRAY[1..50] OF INTEGER ;   { ########## }
129        FLAG1_FUTURE      : CHAR ;
130        FLAG2_FUTURE      : CHAR ;
131        FLAG3_FUTURE      : CHAR ;
132        FLAG4_FUTURE      : CHAR ;
133     END;
134
135
136     { The following is the record layout for the relative DESCRIPTION file }
137
138     DESC_RECORD=RECORD
139
140        NEXT_RECORD       : PACKED ARRAY[1..4] OF CHAR;
141        SIT_NUMBER        : PACKED ARRAY[1..4] OF CHAR;
142        TEXT_LINE         : PACKED ARRAY[1..80] OF CHAR;
143     END;
144
145
146     { The following is the record layout for the sequential USERFILE file;
147       later it will be changed to a KIF file, but initially it will be
148       established as a RELATIVE file                                      }
149
150     USER_RECORD=RECORD
151
152        NEXT_RECORD       : PACKED ARRAY[1..4] OF CHAR ;
153        USER_CODE         : PACKED ARRAY[1..6] OF CHAR ;
154        USER_NAME         : PACKED ARRAY[1..30] OF CHAR ;
155        USER_TITLE        : PACKED ARRAY[1..30] OF CHAR ;
```

```
156         ADDRESS1            : PACKED ARRAY[1..30] OF CHAR ;
157         ADDRESS2            : PACKED ARRAY[1..30] OF CHAR ;
158         ADDRESS3            : PACKED ARRAY[1..30] OF CHAR ;
159         PHONE               : PACKED ARRAY[1..12] OF CHAR ;
160         MAX_STATUS          : CHAR ;
161         PRINTER             : CHAR ;
162         NUM_PROBLEMS        : PACKED ARRAY[1..4] OF CHAR ;
163         DATE_ENTERED        : PACKED ARRAY[1..8] OF CHAR ;
164         DATE_LAST_USED      : PACKED ARRAY[1..8] OF CHAR ;
165         TOTAL_TIMES         : PACKED ARRAY[1..6] OF CHAR ;
166     END ;
167
168
169     { The following is the record layout for the sequential USERPROB file;
170       late it will be changed to a KIF file, but initially it will be
171       established as a RELATIVE file                                    }
172
173     USER_PROBLEM_RECORD=RECORD
174
175         NEXT_RECORD         : PACKED ARRAY[1..4] OF CHAR ;
176         USER_CODE           : PACKED ARRAY[1..6] OF CHAR ;
177         PROBLEM_CODE        : PACKED ARRAY[1..8] OF CHAR ;
178         STATUS_CODE         : CHAR ;
179         TIMES_USED          : PACKED ARRAY[1..4] OF CHAR ;
180     END ;
181
182     { The following is the record layout for the RELATIVE work file which
183       is used to store the actual responses to the questions as they are
184       being entered and then used for input to calculated questions     }
185
186     RESP_RECORD=RECORD
187         RESPONSE            : PACKED ARRAY[1..10] OF CHAR ;
188     END ;
189
190
191     { The following is the layout of the RELATIVE formula file used for
192       calculated questions                                              }
193
194     COMP_RECORD=RECORD
195         RCD_NUMBER          : PACKED ARRAY[1..2] OF CHAR ;
196         FORMULA             : PACKED ARRAY[1..80] OF CHAR ;
197     END ;
198
199     {$PAGE}
200     { ******************************************************************}
201
202     { PROGRAM }
203
204     VAR
205
206     CPY_PROB        : RANDOM FILE OF PROB_RECORD ;
207     CPY_SIT         : RANDOM FILE OF SIT_RECORD ;
208     CPY_DESC        : RANDOM FILE OF DESC_RECORD ;
209     CPY_COMP        : RANDOM FILE OF COMP_RECORD ;
210     WORKRESP        : RANDOM FILE OF RESP_RECORD ;
211     COMPFILE        : RANDOM FILE OF COMP_RECORD ;
212     RESP            : RESP_RECORD ;
213     COMP            : COMP_RECORD ;
214
215     PROBLEM         : RANDOM FILE OF PROB_RECORD;
216     SITUATION       : RANDOM FILE OF SIT_RECORD;
217     DESCRIPTION     : RANDOM FILE OF DESC_RECORD;
218     USERFILE        : RANDOM FILE OF USER_RECORD;
219     U_PROB_FILE     : RANDOM FILE OF USER_PROBLEM_RECORD;
220
221     USER            : USER_RECORD;
222     USER_PROB       : USER_PROBLEM_RECORD;
223     PROB            : PROB_RECORD;
224     SIT             : SIT_RECORD;
225     DESC            : DESC_RECORD;
226
227     USER_CODE       :   PACKED ARRAY[1..6] OF CHAR ;
228     USER_RECORDS , U_PROB_RECORDS : INTEGER ;
229     USER_NAME , U_PROB_NAME   :   PACKED ARRAY[1..8] OF CHAR ;
230     PROBLEM_FILE : PACKED ARRAY[1..8] OF CHAR;
```

```
231      DESC_NODE , PROB_NODE , SIT_NODE     : PACKED ARRAY[1..8] OF CHAR;
232      VDT_BLK : VDT_CONTROL;
233
234      RESPNAME      : PACKED ARRAY[1..8] OF CHAR ;
235      COMP_NODE     : PACKED ARRAY[1..8] OF CHAR ;
236      CALC_FLAG , T , DUMY : CHAR;
237      NUMBER , PROB_RCD_NUMBER , USER_RCD_NUMBER : INTEGER ;
238      RECORD_COUNTER , LINE_COUNTER , QUEST_NUMBER , NEXT_QUESTION : INTEGER;
239      INT_JUDGEMENT_CODE , TOTAL_QUESTIONS , INT_QUESTIONS : INTEGER ;
240      YES , CHANGE , OVAL , ERROR_STATUS , NEW_QUEST , NEW_PROB : BOOLEAN ;
241      INTGR , REFRNCE , CALCULATE , DONE : BOOLEAN ;
242      COMPARE_REQUIRED , ALL_SET , ENTRY_REQUIRED , YES_NO_RESP : BOOLEAN ;
243      EQUAL , QUESTIONS_ADDED     BOOLEAN ;
244      MINIMUM , SIT_NUMBER , BEGINNING_NUMBER , STAT : INTEGER;
245      NEW_SIT_NUMBER , TOTAL_SITUATIONS : INTEGER ;
246      ASCII_NUMBER : PACKED ARRAY[1..6] OF CHAR;
247      DUMMY : PACKED ARRAY[1..2] OF CHAR;
248      DATA_BSE , DELETE , REINSTATE , SKIP_ENTRY : BOOLEAN ;
249      TEST_STRING : PACKED ARRAY[1..50] OF INTEGER ;  { ########## }
250      RESP_STRING : PACKED ARRAY[1..10] OF CHAR ;
251      CPY_FILE_NAME    : PACKED ARRAY[1..8] OF CHAR ;
252      PRIMARY_CODE       PACKED ARRAY[1..8] OF CHAR ;
253      MENTOR_CODE      . PACKED ARRAY[1..6] OF CHAR ;
254      VALID_PRIMARY    : BOOLEAN ;
255
256      { ****************************************************************}
257
258
259      (     The following are screen and file handling procedures         )
260
261      PROCEDURE SETFILLER(VAR VDT$ : VDT_CONTROL ;
262        FILL_CHAR: CHAR);
263           EXTERNAL;
264
265      PROCEDURE CLEARSCREEN(VAR VDT$ : VDT_CONTROL);    EXTERNAL;
266
267      PROCEDURE INITSCREEN(VAR VDT$: VDT_CONTROL; LUNO: INTEGER); EXTERNAL;
268
269      PROCEDURE DISPLAY(VAR VDT$: VDT_CONTROL; LINE: INTEGER;
270         COLUMN : INTEGER; BUFFER: PACKED ARRAY[1..?] OF CHAR;
271         LENGTH : INTEGER); EXTERNAL;
272
273      PROCEDURE ACCEPT(VAR VDT$: VDT_CONTROL; LINE,COLUMN: INTEGER;
274          VAR BUFFER: PACKED ARRAY[1..?] OF CHAR; LENGTH: INTEGER;
275          VAR TERM_CHAR: CHAR); EXTERNAL;
276
277
278      { ****************************************************************** }
279
280
281      PROCEDURE OVLY$(OVERLAY_NUMBER : INTEGER);   EXTERNAL ;
282
283      PROCEDURE CLEAR_LINE (LINE_NUMBER : INTEGER) ;    FORWARD ;
284
285      PROCEDURE NUMERIC_CHECK ( VAR FIELD : PACKED ARRAY[1..?] OF CHAR ;
286                         NUM_OF_POS : INTEGER ;
287                         VAR STATUS_FLAG : BOOLEAN );   FORWARD ;
288
289      PROCEDURE ACPT_YES_NO ( VAR YES_NO : CHAR ;
290                                X , Y : INTEGER ;
291                         VAR STATUS_FLAG : BOOLEAN );   FORWARD ;
292
293      PROCEDURE CHECK_CODE ( ROW , COLUMN : INTEGER ;
294                 VAR   DONE , ERROR_STATUS : BOOLEAN ;
295                 VAR   USER_RCD_NUMBER : INTEGER );    FORWARD ;
296
297      PROCEDURE CPY_PROBLEM ;     FORWARD ;
298
299      PROCEDURE QUESTIONS  ;     FORWARD ;
300
301      PROCEDURE REFERENCE  ;     FORWARD ;
302
303      PROCEDURE LINK_DESC  ;     FORWARD ;
304
```

```
305
306     (*+                                                                          *)
307     {*************************************************************************}
308     {           The following checks for correct "Y/N" response              }
309
310     PROCEDURE ACPT_YES_NO ;
ACPT_YES_NO 311
312          VAR    YES_NO_SET , YES_SET : SET_OF_CHAR;
313
314          BEGIN
315   2        STATUS_FLAG := FALSE ;
316   3        YES_NO_SET := ['Y','y','N','n'] ;
317   4        YES_SET := ['Y','y'] ;
318   5
319   6        REPEAT
320   7          ACCEPT(VDT_BLK, X, Y, DUMMY, 1, T);
321   8          YES_NO := DUMMY[1] ;
322   9        UNTIL ( YES_NO IN YES_NO_SET ) ;
323  10        IF ( YES_NO IN YES_SET ) THEN
324  11            STATUS_FLAG := TRUE;
325  12        IF YES_NO = 'y' THEN
326  13            YES_NO := 'Y';
327  14        IF YES_NO = 'n' THEN
328  15            YES_NO := 'N';
329          END;    { ACPT_YES_NO }
```

MAP OF IDENTIFIERS FOR ACPT_YES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
330
331
332     (*                                                                           *)
333     {*************************************************************************}
334
335     PROCEDURE CHECK_CODE ;
336
337     { This procedure captures a user code for a given row and column
338       and if it is blank, it marks the DONE boolean as true; if it
339       cannot find the entered code, it marks the ERROR_STATUS boolean
340       as true; if user code is found, the relative USER_RCD_NUMBER
341       is returned and the user name is displayed on the screen         }
342
343     VAR     LOCATED         BOOLEAN ;
344
345     BEGIN    { CHECK_CODE }
346
347   3    DONE := FALSE ,
348   4    ERROR_STATUS := FALSE ;
349   5
350   6    ACCEPT(VDT_BLK, ROW, COLUMN, USER_CODE, 6, T);
351   7
352   8    IF USER_CODE = '      ' THEN DONE := TRUE ;
CHECK_CODE 353   9
354  10    IF NOT DONE THEN
355  11    BEGIN
356  12       LOCATED := FALSE ;
357  13       USER_RCD_NUMBER := 0 ;
358  14       FOR T := 0 TO USER_RECORDS DO
359  15          IF NOT LOCATED THEN
360  16          BEGIN
```

```
361 17              READ(USERFILE,T,USER);
362 18              IF USER.USER_CODE = USER_CODE THEN
363 19                LOCATED := TRUE ;
364 20              IF NOT LOCATED THEN USER_RCD_NUMBER := USER_RCD_NUMBER + 1 ;
365 21           END ;
366 22
367 23        IF NOT LOCATED THEN ERROR_STATUS := TRUE
368 24        ELSE BEGIN
369 25           DISPLAY(VDT_BLK,ROW,41,USER.USER_NAME,30);
370 26        END ;
371 27
372 28  { The operator must be a mentor to use this program              }
373 29
374 30        IF LOCATED AND USER.MAX_STATUS <> 'M' THEN
375 31        BEGIN
376 32           DONE := TRUE ;
377 33           DISPLAY(VDT_BLK,ROW,41,'Sorry, you are not a mentor  ',99);
378 34        END ;
379 35
380 36     END ;
381 37
382     END ;    { CHECK_CODE }
```

MAP OF IDENTIFIERS FOR  CHECK_CO

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| ROW | PARAMETER | (2,0) | #0028 | DIRECT |
| COLUMN | PARAMETER | (2,0) | #002A | DIRECT |
| DONE | PARAMETER | (0,1) | #002C | INDIRECT |
| ERROR_STATUS | PARAMETER | (0,1) | #002E | INDIRECT |
| USER_RCD_NUMBER | PARAMETER | (2,0) | #0030 | INDIRECT |
| LOCATED | VARIABLE | (0,1) | #0032 | DIRECT |

```
383     (*,                                                              *)
384     {****************************************************************}
385     { The following procedure clears a line on the display           }
386
387     PROCEDURE CLEAR_LINE ;
388
389     VAR   LINE_DATA    : PACKED ARRAY[1..80] OF CHAR ;
390           N              CHAR ;
391
392     BEGIN
393
394  3    FOR N := 1 TO 80 DO
CLEAR_LINE 395  4       LINE_DATA[N] := ' ';
396  5    DISPLAY(VDT_BLK,LINE_NUMBER,1,LINE_DATA,80);
397  6
398     END ;   { CLEAR_LINE }
```

MAP OF IDENTIFIERS FOR  CLEAR_LI

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| LINE_NUMBER | PARAMETER | (2,0) | #0028 | DIRECT |
| LINE_DATA | VARIABLE | (80,0) | #002A | DIRECT |
| N | VARIABLE | (0,8) | #007A | DIRECT |

```
399
400     (*,                                                              *)
401     {****************************************************************}
402
403     { The following procedure accepts a problem name to be copied, checks
404       for validity and transfers all records from the problem, situation
405       and description files into the new problem                     }
406
407     PROCEDURE CPY_PROBLEM ;
408
```

```
409     VAR     COPY_DONE    BOOLEAN ;
410             NUMBER       INTEGER ;
411
412     BEGIN
413  2     COPY_DONE := FALSE ;
414  3     REPEAT    { "UNTIL COPY_DONE" }
415  4
416  5        CLEAR_LINE(8),
417  6        DISPLAY(VDT_BLK,6,6,'DO YOU WISH TO "COPY" A PROBLEM ',99);
418  7        DISPLAY(VDT_BLK,6,38,'CURRENTLY ON THE SYSTEM ?    [ ]',99);
419  8        ACPT_YES_NO(DUMY,6,67,YES);
420  9        IF NOT YES THEN
421 10        BEGIN
422 11           CLEAR_LINE(6) ;
423 12           COPY_DONE := TRUE ;
424 13        END ELSE BEGIN
425 14           CLEAR_LINE(6) ,
426 15           DISPLAY(VDT_BLK,6,2,'PRIMARY CODE TO COPY: [           ]',
427 16                                                                   ,99);
428 17           REPEAT   { "UNTIL YES" }
429 18              YES  = TRUE ;
430 19              ACCEPT(VDT_BLK,6,25,CPY_FILE_NAME,8,T);
431 20              IF CPY_FILE_NAME <> '         ' THEN
432 21              BEGIN
433 22                 CLOSE(CPY_PROB);
434 23                 SETMEMBER(CPY_PROB,PROB_NODE,CPY_FILE_NAME);
435 24                 IOTERM(CPY_PROB,OVAL,FALSE);
436 25                 RESET(CPY_PROB);
437 26                 YES = TRUE ,
438 27
439 28 { Check for valid code and open the copy problem file             }
CPY_PROBLEM 440 29
441 30                 IF STATUS(CPY_PROB) = 0
442 31                   AND CPY_FILE_NAME <> PROBLEM_FILE THEN
443 32                 BEGIN
444 33                    READ(CPY_PROB,0,PROB);
445 34                    DISPLAY(VDT_BLK,7,25,PROB.DESCRIPTION,30);
446 35                    DISPLAY(VDT_BLK,6,41,'IS THIS CORRECT ?   [ ]',99);
447 36                    ACPT_YES_NO(DUMY,6,61,YES);
448 37                 END ELSE BEGIN
449 38                    DISPLAY(VDT_BLK,6,41,'This code is not valid',99);
450 39                    YES := FALSE ;
451 40                 END ;
452 41              END ;
453 42           UNTIL YES ;
454 43
455 44 { Open the situation and description copy files and do the copying }
456 45
457 46           IF CPY_FILE_NAME <> '         ' THEN
458 47           BEGIN
459 48              CLOSE(CPY_PROB);
460 49              IOTERM(CPY_PROB,OVAL,TRUE);
461 50              EXTEND(CPY_PROB);
462 51
463 52              SETMEMBER(CPY_DESC,DESC_NODE,CPY_FILE_NAME);
464 53              IOTERM(CPY_DESC,OVAL,TRUE);
465 54              EXTEND(CPY_DESC);
466 55
467 56              SETMEMBER(CPY_SIT,SIT_NODE,CPY_FILE_NAME);
468 57              IOTERM(CPY_SIT,OVAL,TRUE);
469 58              EXTEND(CPY_SIT);
470 59
471 60              READ(CPY_PROB,0,PROB);
472 61
473 62 { The new problem takes the mentor code of the primary problem     }
474 63
475 64              PROB.PRIMARY_CODE := PRIMARY_CODE ;
476 65              PROB.PROBLEM_CODE := PROBLEM_FILE ;
477 66              PROB.MENTOR_CODE  := MENTOR_CODE ;
478 67              WRITE(PROBLEM,0,PROB);
479 68              NEXT_QUESTION := PROB.NEXT_QUESTION ;
480 69              NUMBER := NEXT_QUESTION - 1 ;
```

```
481 70                  FOR T := 1 TO NUMBER DO
482 71                  BEGIN
483 72                     READ(CPY_PROB,T,PROB);
484 73                     WRITE(PROBLEM,T,PROB);
485 74                  END ;
486 75
487 76                  READ(CPY_SIT,0,SIT);
488 77                  NUMBER := SIT.NEXT_SIT - 1 ;
489 78                  FOR T := 0 TO NUMBER DO
490 79                  BEGIN
491 80                     READ(CPY_SIT,T,SIT);
492 81                     WRITE(SITUATION,T,SIT);
493 82                  END ;
494 83
495 84                  READ(CPY_DESC,0,DESC);
496 85                  DECODE(DESC.NEXT_RECORD,1,STAT,NUMBER);
497 86                  NUMBER := NUMBER - 1 ;
498 87                  FOR T := 0 TO NUMBER DO
499 88                  BEGIN
500 89                     READ(CPY_DESC,T,DESC);
501 90                     WRITE(DESCRIPTION,T,DESC);
502 91                  END ;
503 92
504 93  { Check for presence of computational formula file; if there, copy  }
505 94
506 95                  SETMEMBER(CPY_COMP,COMP_NODE,CPY_FILE_NAME);
507 96                  IOTERM(CPY_COMP,OVAL,FALSE);
508 97                  EXTEND(CPY_COMP);
509 98
510 99                  IF STATUS(CPY_COMP) = 0 THEN
511100                  BEGIN
512101                     SETMEMBER(COMPFILE,COMP_NODE,PROBLEM_FILE);
513102                     EXTEND(COMPFILE);
514103                     READ(CPY_COMP,0,COMP);
515104                     DECODE(COMP.RCD_NUMBER,1,STAT,NUMBER);
516105                     NUMBER := NUMBER - 1 ;
517106                     FOR T := 0 TO NUMBER DO
518107                     BEGIN
519108                        READ(CPY_COMP,T,COMP);
520109                        WRITE(COMPFILE,T,COMP);
521110                     END ;
522111                  END ;
523112
524113                  CLOSE(CPY_PROB);
525114                  CLOSE(CPY_SIT);
526115                  CLOSE(CPY_DESC);
527116                  CLOSE(CPY_COMP);
528117
529118                  NEW_PROB := FALSE ;
530119                  COPY_DONE := TRUE ;
531120
532121              END ;
533122           END ;
534123
535124      UNTIL COPY_DONE ,
536125
537      END ;      { COPY_PROBLEM }
```

MAP OF IDENTIFIERS FOR  CPY_PROB

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| COPY_DONE | VARIABLE | (0,1) | #0028 | DIRECT |
| NUMBER | VARIABLE | (2,0) | #002A | DIRECT |

```
538   (*,                                                                      *)
539   { *********************************************************************}
540   {          The following checks for a proper numeric entry            }
541
```

NUMERIC_CHECK

```
542     PROCEDURE NUMERIC_CHECK ;
543
544        VAR    CHAR_SET ; SET_OF_CHAR ;
545               N        : INTEGER ;
546
547     BEGIN
548  2    STATUS_FLAG := FALSE ;
549  3    CHAR_SET := [' ','0','1','2','3','4','5','6','7','8','9','.',',',
550  4                                                              '-','+'];
551  5    FOR N := 1 TO NUM_OF_POS DO
552  6    BEGIN
553  7       DUMY := FIELD[N].
554  8       IF NOT ( DUMY IN CHAR_SET )
555  9          THEN STATUS_FLAG := TRUE ;
556 10    END;
557     END ;   { NUMERIC_CHECK }
```

MAP OF IDENTIFIERS FOR  NUMERIC_

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| FIELD | PARAMETER | 2(002A) | #002C | INDIRECT |
| NUM_OF_POS | PARAMETER | (2,0) | #002E | DIRECT |
| STATUS_FLAG | PARAMETER | (0,1) | #0030 | INDIRECT |
| CHAR_SET | VARIABLE | (32,0) | #0032 | DIRECT |
| N | VARIABLE | (2,0) | #0052 | DIRECT |

```
558
559     (*,                                                                 *)
560     {*******************************************************************}
561     { This procedure accepts the basic description line for the inter-  }
562     { pretation, and captures up to 12 additional description lines     }
563
564     PROCEDURE LINK_DESC ;
565
566     VAR    BASIC_DESC , ADD_DESC : PACKED ARRAY[1..80] OF CHAR ;
567            LINES : PACKED ARRAY[1..12,1..80] OF CHAR ;
568            LIMIT , NEXT_RECORD , LINE : INTEGER ;
569            LINK_PTR , LINK_CHAR , DSPL_PTR : INTEGER ;
570            VALID_LINKS , FOUND_LINK : BOOLEAN ;
571            PROB_LINK : PACKED ARRAY[1..4,1..8] OF CHAR ;
572            LINK_DISPLAY : PACKED ARRAY[1..8] OF CHAR ;
573            R_ALL_SPACES : BOOLEAN ;
574
575     PROCEDURE CHANGE_DESC ;   FORWARD ;
576
577
578     (*+                                                                 *)
579     {*******************************************************************}
580
581     { The following procedure changes the sit. number for extra description
582       records previously entered for the old "normal" situation when one
583          or more questions are added to the problem                     }
584
```

CHANGE_DESC

```
585     PROCEDURE CHANGE_DESC ;
586
587     VAR
588         NEXT_RECORD : INTEGER ;
589         LIMIT , NUMBER : INTEGER ;
590
591     BEGIN   { CHANGE_DESC }
592
593  3    READ(DESCRIPTION, 0, DESC);
594  4    DECODE(DESC.NEXT_RECORD, 1, STAT, NEXT_RECORD);
595  5    IF NEXT_RECORD > 1 THEN
596  6    BEGIN
597  7       LIMIT := NEXT_RECORD - 1 ;
598  8       FOR RECORD_COUNTER := 1 TO LIMIT DO
599  9       BEGIN
```

```
600 10              READ(DESCRIPTION,RECORD_COUNTER,DESC);
601 11              DECODE(DESC.SIT_NUMBER,1,STAT,NUMBER);
602 12              IF NUMBER = 0 THEN
603 13              BEGIN
604 14                 ENCODE(DESC.SIT_NUMBER,1,STAT,NEW_SIT_NUMBER:4);
605 15                 WRITE(DESCRIPTION,RECORD_COUNTER,DESC);
606 16              END ;
607 17           END ;
608 18        END;
609 19
610     END ;  { CHANGE_DESC }
```

MAP OF IDENTIFIERS FOR   CHANGE_D

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| NEXT_RECORD | VARIABLE | (2,0) | #0028 | DIRECT |
| LIMIT | VARIABLE | (2,0) | #002A | DIRECT |
| NUMBER | VARIABLE | (2,0) | #002C | DIRECT |

```
611    (*-                                                                      *)
612    BEGIN     { LINK_DESC }
613
614  3   CLEARSCREEN(VDT_BLK);
615  4
616  5   READ(PROBLEM,0,PROB);
617  6   DISPLAY(VDT_BLK,1,12,'P A R A D O C S    D E V E L O P M E N T',
618  7                                                                 99);
619  8   DISPLAY(VDT_BLK,1,56,'S Y S T E M',99);
620  9   DISPLAY(VDT_BLK,3,22,'**** INTERPRETATION DESCRIPTION ****',99);
621 10   DISPLAY(VDT_BLK,4,25,'Please describe this situation',99);
622 11   DISPLAY(VDT_BLK,6,06,'PROBLEM CODE: ',99);
623 12   DISPLAY(VDT_BLK,6,25,PROBLEM_FILE,8);
624 13   DISPLAY(VDT_BLK,6,43,PROB.DESCRIPTION,30);
625 14   DISPLAY(VDT_BLK,8,1,'--------------------',99);
626 15   DISPLAY(VDT_BLK,8,24,'B A S I C    D E S C R I P T I O N',99);
627 16   DISPLAY(VDT_BLK,8,60,'--------------------',99);
628 17   DISPLAY(VDT_BLK,10,1,'----------------',99);
629 18   DISPLAY(VDT_BLK,10,19,'A D D I T I O N A L   ',99);
LINK_DESC
630 19   DISPLAY(VDT_BLK,10,41,'D E S C R I P T I O N S',99);
631 20   DISPLAY(VDT_BLK,10,66,'----------------',99);
632 21   DISPLAY(VDT_BLK,24,30,'CORRECT ?    [ ]',99);
633 22
634 23   YES := FALSE ;
635 24
636 25 { Display old reference situation description if questions have been
637 26   added or deleted questions have been reinstated                     }
638 27
639 28   IF QUESTIONS_ADDED THEN
640 29   BEGIN
641 30      READ(SITUATION,0,SIT);
642 31      DISPLAY(VDT_BLK,9,1,SIT.SIT_DESCRIPTION,80);
643 32      READ(DESCRIPTION,0,DESC);
644 33      DECODE(DESC.NEXT_RECORD,1,STAT,NEXT_RECORD);
645 34      NEXT_RECORD := NEXT_RECORD - 1 ;
646 35      IF NEXT_RECORD > 0 THEN
647 36      BEGIN
648 37         LINE := 11 ;
649 38         FOR T := 1 TO NEXT_RECORD DO
650 39         BEGIN
651 40            READ(DESCRIPTION,T,DESC);
652 41            DECODE(DESC.SIT_NUMBER,1,STAT,SIT_NUMBER);
653 42            IF SIT_NUMBER = 0 THEN
654 43            BEGIN
655 44               IF LINE < 23 THEN
656 45                  DISPLAY(VDT_BLK,LINE,1,DESC.TEXT_LINE,80);
657 46               LINE := LINE + 1 ;
658 47            END ;
659 48         END
660 49      END ;
```

```
661  50      CHANGE_DESC ;
662  51    END ;
663  52
664  53    REPEAT
665  54
666  55    { Accept basic description (cannot be all spaces)                    }
667  56
668  57      REPEAT
669  58        ACCEPT(VDT_BLK,9,1,BASIC_DESC,80,T);
670  59        R_ALL_SPACES := TRUE ;
671  60        FOR T := 1 TO 80 DO
672  61          IF BASIC_DESC[T] <> ' ' THEN
673  62            R_ALL_SPACES := FALSE ;
674  63      UNTIL R_ALL_SPACES = FALSE ;
675  64
676  65    { Accept up to 12 additional lines of description which may include
677  66      no secondary linked problem codes (i.e., brackets)                  }
678  67
679  68      LINK_PTR := 0 ;
680  69      FOR T := 1 TO 4 DO
681  70        PROB_LINK[T] := '    ';
682  71      R_ALL_SPACES := FALSE ;
683  72      RECORD_COUNTER := 1 ;
684  73      FOR LINE_COUNTER := 11 TO 22 DO
685  74      BEGIN
686  75        IF NOT R_ALL_SPACES THEN
687  76        BEGIN
688  77          ACCEPT(VDT_BLK,LINE_COUNTER,1,ADD_DESC,80,T);
689  78          LINES[RECORD_COUNTER] := ADD_DESC ;
690  79          R_ALL_SPACES := TRUE ;
691  80          FOR T := 1 TO 80 DO
692  81          BEGIN
693  82            IF ADD_DESC[T] <> ' ' THEN
694  83              R_ALL_SPACES := FALSE ;
695  84            IF ADD_DESC[T] = '[' THEN
696  85              DISPLAY(VDT_BLK,23,26,'No Linked Problem Codes Allowed',
697  86                                                                   99);
698  87          END ;
699  88          IF NOT R_ALL_SPACES THEN
700  89            RECORD_COUNTER := RECORD_COUNTER + 1 ;
701  90        END ;
702  91      END ;
703  92
704  93      IF RECORD_COUNTER < 12 THEN
705  94      BEGIN
706  95        LIMIT := RECORD_COUNTER + 11 ;
707  96        FOR LINE := 22 DOWNTO LIMIT DO
708  97        BEGIN
709  98          FOR T := 1 TO 80 DO ADD_DESC[T] := ' ';
710  99          DISPLAY(VDT_BLK,LINE,1,ADD_DESC,80);
711 100        END ;
712 101      END;
713 102
714 103      ACPT_YES_NO(DUMY,24,43,YES);
715 104
716 105    UNTIL YES ;
717 106
718 107    READ(SITUATION,0,SIT);
719 108    SIT.SIT_DESCRIPTION := BASIC_DESC ;
720 109    SIT.PROB1_LINK := PROB_LINK[1] ;
721 110    SIT.PROB2_LINK := PROB_LINK[2] ;
722 111    SIT.PROB3_LINK := PROB_LINK[3] ;
723 112    SIT.PROB4_LINK := PROB_LINK[4] ;
724 113    WRITE(SITUATION,0,SIT);
725 114
726 115    RECORD_COUNTER := RECORD_COUNTER - 1 ;
727 116
728 117    IF RECORD_COUNTER > 0 THEN
729 118    BEGIN
730 119      READ(DESCRIPTION,0,DESC),
731 120      DECODE(DESC.NEXT_RECORD,1,STAT,NEXT_RECORD);
732 121      DESC.SIT_NUMBER := '   0';
733 122      FOR LINE := 1 TO RECORD_COUNTER DO
734 123      BEGIN
```

```
735 124        DESC.TEXT_LINE := LINES[LINE] ;
736 125        WRITE(DESCRIPTION, NEXT_RECORD, DESC);
737 126        NEXT_RECORD := NEXT_RECORD + 1 ;
738 127     END ;
739 128     ENCODE(DESC.NEXT_RECORD, 1, STAT, NEXT_RECORD:4);
740 129     WRITE(DESCRIPTION, 0, DESC);
741 130  END ;
  LINK_DESC 742 131
743     END ;  { PROB_DESC }
```

MAP OF IDENTIFIERS FOR LINK_DES

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| BASIC_DESC | VARIABLE | (80,0) | #0028 | DIRECT |
| ADD_DESC | VARIABLE | (80,0) | #0078 | DIRECT |
| LINES | VARIABLE | (960,0) | #00C8 | DIRECT |
| LIMIT | VARIABLE | (2,0) | #0488 | DIRECT |
| NEXT_RECORD | VARIABLE | (2,0) | #048A | DIRECT |
| LINE | VARIABLE | (2,0) | #048C | DIRECT |
| LINK_PTR | VARIABLE | (2,0) | #048E | DIRECT |
| LINK_CHAR | VARIABLE | (2,0) | #0490 | DIRECT |
| DSPL_PTR | VARIABLE | (2,0) | #0492 | DIRECT |
| VALID_LINKS | VARIABLE | (0,1) | #0494 | DIRECT |
| FOUND_LINK | VARIABLE | (0,1) | #0496 | DIRECT |
| PROB_LINK | VARIABLE | (32,0) | #0498 | DIRECT |
| LINK_DISPLAY | VARIABLE | (8,0) | #04B8 | DIRECT |
| R_ALL_SPACES | VARIABLE | (0,1) | #04C0 | DIRECT |

```
744    (*,                                                                    *)
745    { ********************************************************************* }
746
747    PROCEDURE QUESTIONS ;
748
749    { This procedure will add, change, delete or reinstate questions for
750      this problem                                                          }
751
752    LABEL 300 ;
753
754
755    PROCEDURE ASSUME_NO ( VAR YES_NO : CHAR ;
756                          X , Y : INTEGER ;
757                          VAR STATUS_FLAG : BOOLEAN ) ;     FORWARD ;
758
759
760    PROCEDURE QST_CALC ;    FORWARD ;
761
762    PROCEDURE BOUNDARIES ;  FORWARD ;
763
764    { ********************************************************************* }
765
766    (*+                                                                     *)
767
768    PROCEDURE ASSUME_NO ;
769
770    { This procedure is the same as ACPT_YES_NO except that if a blank
771      entry is made, it will automatically be filled in with a "N"          }
772
773        VAR    YES_NO_SET , YES_SET : SET_OF_CHAR;
774
775    BEGIN  { ASSUME_NO }
  ASSUME_NO 776
777  3     STATUS_FLAG := FALSE ;
778  4     YES_NO_SET := ['Y','y','N','n'] ;
779  5     YES_SET := ['Y','y'] ;
780  6
781  7     REPEAT
782  8       ACCEPT(VDT_BLK, X, Y, DUMMY, 1, T);
```

```
783   9              IF DUMMY[1] = ' ' THEN
784  10              BEGIN
785  11                DUMMY[1] := 'N' ;
786  12                DISPLAY(VDT_BLK,X,Y,'N',2);
787  13              END ;
788  14              YES_NO := DUMMY[1] ;
789  15           UNTIL ( YES_NO IN YES_NO_SET ) ;
790  16           IF ( YES_NO IN YES_SET ) THEN
791  17                STATUS_FLAG := TRUE;
792  18           IF YES_NO = 'y' THEN
793  19              YES_NO := 'Y';
794  20           IF YES_NO = 'n' THEN
795  21              YES_NO := 'N';
796  22
797       END;   { ASSUME_NO }
```

MAP OF IDENTIFIERS FOR ASSUME_N

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| YES_NO | PARAMETER | (0,8) | #0028 | INDIRECT |
| X | PARAMETER | (2,0) | #002A | DIRECT |
| Y | PARAMETER | (2,0) | #002C | DIRECT |
| STATUS_FLAG | PARAMETER | (0,1) | #002E | INDIRECT |
| YES_NO_SET | VARIABLE | (32,0) | #0030 | DIRECT |
| YES_SET | VARIABLE | (32,0) | #0050 | DIRECT |

```
798      (*,                                                                          *)
799      { ************************************************************** }
800
801      PROCEDURE BOUNDARIES ;
802
803        { This routine checks for valid upper and lower limits IF the
804          question is NOT a Y/N type nor an INTEGER or REFFRENCE type   }
805
806      BEGIN   { BOUNDARIES }
807
808   3              IF NOT INTGR AND NOT REFRNCE THEN
809   4              BEGIN
810   5                REPEAT
811   6                  ALL_SET := FALSE;
812   7
813   8      { If no entry on 1st lower boundary, there are no boundaries at all;
814   9        if an entry is made, the system will check to make sure the lower
815  10        is less than or equal to the upper                                    }
816  11
817  12                  ENTRY_REQUIRED := FALSE ;
BOUNDARIES 818  13                  IF CHANGE AND PROB.BOUNDARIES > 0 THEN
819  14                    ENTRY_REQUIRED := TRUE ;
820  15                  RESP_STRING := '          ';
821  16                  IF NOT CHANGE OR PROB.BOUNDARIES > 0 THEN
822  17                    ACCEPT(VDT_BLK,15,30,RESP_STRING,10,1);
823  18                  IF RESP_STRING = '          ' AND NOT ENTRY_REQUIRED
824  19                  THEN BEGIN
825  20                    PROB.LOWER_1_LIMIT := 0 ;
826  21                    PROB.UPPER_1_LIMIT := 0 ;
827  22                    PROB.LOWER_2_LIMIT := 0 ;
828  23                    PROB.UPPER_2_LIMIT := 0 ;
829  24                    PROB.BOUNDARIES    := 0 ;
830  25                    ALL_SET := TRUE ;
831  26                    CLEAR_LINE(15);
832  27                  END ;
833  28                  IF RESP_STRING <> '          ' THEN
834  29                  BEGIN
835  30                    DECODE(RESP_STRING,1,STAT,PROB.LOWER_1_LIMIT);
836  31                    ENCODE(RESP_STRING,1,STAT,PROB.LOWER_1_LIMIT:10:2);
837  32                    DISPLAY(VDT_BLK,15,30,RESP_STRING,10);
838  33                    IF RESP_STRING[1] <> '*' THEN ALL_SET := TRUE ;
839  34                    IF PROB.BOUNDARIES <> 2 THEN PROB.BOUNDARIES := 1 ;
840  35                  END ;
```

```
841  36              UNTIL ALL_SET ;
842  37
843  38              IF PROB.BOUNDARIES > 0 THEN REPEAT
844  39                ALL_SET := FALSE ;
845  40                ACCEPT(VDT_BLK,15,67,RESP_STRING,10,T);
846  41                DECODE(RESP_STRING,1,STAT,PROB.UPPER_1_LIMIT);
847  42                ENCODE(RESP_STRING,1,STAT,PROB.UPPER_1_LIMIT:10:2);
848  43                DISPLAY(VDT_BLK,15,67,RESP_STRING,10);
849  44                IF RESP_STRING[1] <> '*' AND
850  45                   PROB.LOWER_1_LIMIT <= PROB.UPPER_1_LIMIT THEN
851  46                     ALL_SET := TRUE ;
852  47              UNTIL ALL_SET ;
853  48
854  49  { If first set of boundaries were entered, check for an optional
855  50    second set                                                      }
856  51
857  52              IF PROB.BOUNDARIES > 0 THEN
858  53              BEGIN
859  54                DISPLAY(VDT_BLK,16,10,'2ND LOWER BOUNDARY:[         ]',
860  55                                                                    99);
861  56                DISPLAY(VDT_BLK,16,47,'2ND UPPER BOUNDARY:[         ]',
862  57                                                                    99);
863  58                IF PROB.BOUNDARIES = 2 THEN
864  59                BEGIN
865  60                  ENCODE(RESP_STRING,1,STAT,PROB.LOWER_2_LIMIT:10:2);
866  61                  DISPLAY(VDT_BLK,16,30,RESP_STRING,30);
867  62                  ENCODE(RESP_STRING,1,STAT,PROB.UPPER_2_LIMIT:10:2);
868  63                  DISPLAY(VDT_BLK,16,67,RESP_STRING,30);
869  64                END ;
870  65
871  66                ALL_SET := FALSE;
872  67
873  68  { If no entry on 2nd lower boundary, no secondary boundaries will
BOUNDARIES
874  69    be captured                                                     }
875  70
876  71                REPEAT
877  72                  ENTRY_REQUIRED := FALSE ;
878  73                  IF CHANGE AND PROB.BOUNDARIES > 1 THEN
879  74                    ENTRY_REQUIRED := TRUE ;
880  75                  RESP_STRING := '          ';
881  76                  IF NOT CHANGE OR PROB.BOUNDARIES > 1 THEN
882  77                    ACCEPT(VDT_BLK,16,30,RESP_STRING,10,T);
883  78                  IF RESP_STRING = '          ' AND NOT ENTRY_REQUIRED
884  79                  THEN BEGIN
885  80                    PROB.LOWER_2_LIMIT := 0 ;
886  81                    PROB.UPPER_2_LIMIT := 0 ;
887  82                    PROB.BOUNDARIES    := 1 ;
888  83                    ALL_SET := TRUE ;
889  84                    CLEAR_LINE(16);
890  85                  END ;
891  86                  IF RESP_STRING <> '          ' THEN
892  87                  BEGIN
893  88                    DECODE(RESP_STRING,1,STAT,PROB.LOWER_2_LIMIT);
894  89                    ENCODE(RESP_STRING,1,STAT,PROB.LOWER_2_LIMIT:10:2);
895  90                    DISPLAY(VDT_BLK,16,30,RESP_STRING,10);
896  91                    IF RESP_STRING[1] <> '*'
897  92                      AND PROB.LOWER_2_LIMIT < PROB.LOWER_1_LIMIT
898  93                      THEN ALL_SET := TRUE ;
899  94                    PROB.BOUNDARIES := 2 ;
900  95                  END ;
901  96                UNTIL ALL_SET ;
902  97
903  98                IF PROB.BOUNDARIES = 2 THEN REPEAT
904  99                  ALL_SET := FALSE ;
905 100                  ACCEPT(VDT_BLK,16,67,RESP_STRING,10,T);
906 101                  DECODE(RESP_STRING,1,STAT,PROB.UPPER_2_LIMIT);
907 102                  ENCODE(RESP_STRING,1,STAT,PROB.UPPER_2_LIMIT:10:2);
908 103                  DISPLAY(VDT_BLK,16,67,RESP_STRING,10);
909 104                  IF RESP_STRING[1] <> '*'
910 105                    AND PROB.LOWER_2_LIMIT <= PROB.UPPER_2_LIMIT
911 106                    AND PROB.UPPER_2_LIMIT > PROB.UPPER_1_LIMIT
912 107                    THEN ALL_SET := TRUE ;
```

```
913 108              . UNTIL ALL_SET ;
914 109             END ;
915 110           END ;
916 111
917 112    { Capture absolute limits for integer question              }
918 113
919 114           IF INTGR THEN
920 115             BEGIN
921 116              REPEAT
922 117                ALL_SET := FALSE ;
923 118                ACCEPT(VDT_BLK,15,30,RESP_STRING,10,T);
924 119                DECODE(RESP_STRING,1,STAT,NUMBER);
925 120                ENCODE(RESP_STRING,1,STAT,NUMBER);
926 121                DISPLAY(VDT_BLK,15,30,RESP_STRING,10);
927 122                PROB.LOWER_1_LIMIT := NUMBER * 1 ;
928 123                ACCEPT(VDT_BLK,15,67,RESP_STRING,10,T);
929 124                DECODE(RESP_STRING,1,STAT,NUMBER);
930 125                ENCODE(RESP_STRING,1,STAT,NUMBER);
931 126                DISPLAY(VDT_BLK,15,67,RESP_STRING,10);
932 127                PROB.UPPER_1_LIMIT := NUMBER * 1 ;
933 128                IF PROB.UPPER_1_LIMIT > PROB.LOWER_1_LIMIT AND
934 129                   PROB.UPPER_1_LIMIT <= 32767 AND
935 130                   PROB.LOWER_1_LIMIT >= -32765 THEN
936 131                  ALL_SET := TRUE ;
937 132              UNTIL ALL_SET ;
938 133              PROB.BOUNDARIES := 1 ;
939 134             END ;
940 135
941       END ;    { BOUNDARIES }
942       (*,                                                            *)
943       PROCEDURE QST_CALC ;
944
945       { This procedure will accept and check for valid formula entries for
946         a calculated question                                        }
947
948       VAR      ENTRY       : PACKED ARRAY[1..12] OF CHAR ;
949                LEFT_JSTFD  : PACKED ARRAY[1..12] OF CHAR ;
950                BUFFER      : PACKED ARRAY[1..80] OF CHAR ;
951                TIME_ACPT   : PACKED ARRAY[1..6] OF CHAR ;
952                TIME_JSTFD  : PACKED ARRAY[1..6] OF CHAR ;
953                TIME_PER    : INTEGER ;
954                OP_CHAR     : CHAR ;
955                VALID       : BOOLEAN ;
956                DATA_BASE   : BOOLEAN ;
957                FIRST_ENTRY : BOOLEAN ;
958                FINISHED    : BOOLEAN ;
959                SPACE_FOUND : BOOLEAN ;
960                REPEAT_ENTRY: BOOLEAN ;
961                FOUND_DECIMAL: BOOLEAN ;
962                FOUND_MINUS : BOOLEAN ;
963                DECIMAL_PLACES : INTEGER ;
964                PTR_FORMULA : INTEGER ;
965                PTR_BUFFER  : INTEGER ;
966                PTR1        : INTEGER ;
967                PTR2        : INTEGER ;
968
969       BEGIN   { QST_CALC }
970
971       { Open up computation formula file and display screen fields; write
972         blank formula records for any question number records not already
973         in the computation file                                       }
974
975   7     SETMEMBER(COMPFILE,COMP_NODE,PROBLEM_FILE);
976   8     EXTEND(COMPFILE);
977   9     PTR1 := 1 ;
978  10     FOR N := 0 TO (NEXT_QUESTION - 1) DO
979  11     BEGIN
980  12       FOR T := 1 TO 80 DO
981  13         COMP.FORMULA[T] := ' ' ;
982  14       ENCODE(COMP.RCD_NUMBER,1,STAT,PTR1:2);
983  15       READ(COMPFILE,N,COMP);
984  16       IF COMP.FORMULA[1] = ' ' THEN
985  17         WRITE(COMPFILE,N,COMP);
```

QST_CALC

```
 986 18        PTR1 := PTR1 + 1 ;
 987 19      END ;
 988 20
 989 21      FOR T := 1 TO 80 DO
 990 22        BUFFER[T] := ' ';
 991 23      PTR_FORMULA := 1 ;
 992 24      PTR_BUFFER  := 1 ;
 993 25      FIRST_ENTRY := TRUE ;
 994 26      FINISHED := FALSE ;
 995 27      READ(COMPFILE,QUEST_NUMBER,COMP);
 996 28
 997 29      DISPLAY(VDT_BLK,23,8,'REPRESENTATION OF THE FORMULA ',99);
 998 30      DISPLAY(VDT_BLK,23,38,'(maximum 80 characters) :',99);
 999 31      DISPLAY(VDT_BLK,18,8,'PLEASE ENTER CALCULATION FORMULA ',99);
1000 32      DISPLAY(VDT_BLK,18,41,'(see operating instructions) :',99);
1001 33      DISPLAY(VDT_BLK,19,10,'ENTER CONSTANT, QUESTION NO. ("##nn")',99);
1002 34      DISPLAY(VDT_BLK,19,46,', OR PREVIOUS ("P"): [          ] ',99);
1003 35      CLEAR_LINE(22);
1004 36      DISPLAY(VDT_BLK,22,24,'ANY MORE ENTRIES ? [ ]',99);
1005 37
1006 38      REPEAT   { UNTIL FINISHED }
1007 39
1008 40 { If there is a previously entered formula, display the first field  }
1009 41
1010 42        ENTRY := '           ';
1011 43        IF COMP.FORMULA[PTR_FORMULA] <> ' ' THEN
1012 44        BEGIN
1013 45          PTR1 := 1 ;
1014 46          WHILE COMP.FORMULA[PTR_FORMULA] <> ',' DO
1015 47          BEGIN
1016 48            ENTRY[PTR1] := COMP.FORMULA[PTR_FORMULA] ;
1017 49            PTR1 := PTR1 + 1 ;
1018 50            PTR_FORMULA := PTR_FORMULA + 1 ;
1019 51          END ;
1020 52          PTR_FORMULA := PTR_FORMULA + 1 ;
1021 53        END ;
1022 54        DISPLAY(VDT_BLK,19,68,ENTRY,11);
1023 55        CLEAR_LINE(20);
1024 56        CLEAR_LINE(21);
1025 57        VALID := FALSE ;
1026 58        DATA_BASE := FALSE ;
1027 59
1028 60 { Accept valid field entry or all spaces                            }
1029 61
1030 62        REPEAT   { UNTIL VALID OR ENTRY = '           ' }
1031 63
1032 64          REPEAT_ENTRY := FALSE ;
1033 65          ACCEPT(VDT_BLK,19,68,ENTRY,11,T);
1034 66
1035 67          IF ENTRY <> '           ' THEN
1036 68          BEGIN
1037 69
1038 70 { Left-justify entry and remove intervening spaces                  }
1039 71
1040 72            LEFT_JSTFD := '           ';
1041 73            PTR1 := 1 ;
1042 74            FOR N := 1 TO 11 DO
1043 75            BEGIN
1044 76              IF ENTRY[N] <> ' ' THEN
1045 77              BEGIN
1046 78                LEFT_JSTFD[PTR1] := ENTRY[N] ;
1047 79                PTR1 := PTR1 + 1 ;
1048 80              END ;
1049 81            END ;
1050 82            ENTRY := LEFT_JSTFD ;
1051 83            DISPLAY(VDT_BLK,19,68,ENTRY,11);
1052 84          END ;
1053 85
1054 86 { Check for "Previous" entry (not allowed on first entry)           }
1055 87
1056 88          IF ENTRY[1] = 'P' THEN
1057 89          BEGIN
1058 90            REPEAT_ENTRY := TRUE ;
1059 91            IF NOT FIRST_ENTRY THEN VALID := TRUE ;
```

```
1060 92                   FOR N := 2 TO 11 DO
1061 93                      ENTRY[N] := ' ' ;
1062 94                   DISPLAY(VDT_BLK, 19, 68, ENTRY, 11);
1063 95                END ;
1064 96
1065 97 { Check for valid question number entry for "#nn"                             }
1066 98
1067 99             IF NOT REPEAT_ENTRY AND ENTRY[1] = '##' THEN
1068100             BEGIN
1069101                REPEAT_ENTRY := TRUE ;
1070102                DUMMY[1] := ENTRY[2] ;
1071103                DUMMY[2] := ENTRY[3] ;
1072104                FOR N := 2 TO 11 DO
1073105                   ENTRY[N] := ' ' ;
1074106                DECODE(DUMMY, 1, STAT, PTR1);
1075107                ENCODE(DUMMY, 1, STAT, PTR1:2);
1076108                IF DUMMY[1] = ' ' THEN ENTRY[2] := DUMMY[2] ELSE
1077109                BEGIN
1078110                   ENTRY[2] := DUMMY[1] ;
1079111                   ENTRY[3] := DUMMY[2] ;
1080112                END ;
1081113                DISPLAY(VDT_BLK, 19, 68, ENTRY, 11);
1082114                IF PTR1 > 0 AND PTR1 < QUEST_NUMBER THEN
1083115                BEGIN
1084116                   READ(PROBLEM, PTR1, PROB);
1085117                   IF PROB.YES_NO = 'N'
1086118                      AND PROB.STATUS_CODE <> 'D' THEN VALID := TRUE ;
1087119                   READ(PROBLEM, QUEST_NUMBER, PROB);
1088120                END ;
1089121             END ;
1090122
1091123 { Check for valid question number entry for "@nn"                             }
1092124
1093125             DATA_BASE := FALSE ;
1094126             IF NOT REPEAT_ENTRY AND ENTRY[1] = '@'
1095127             THEN BEGIN
1096128                REPEAT_ENTRY := TRUE ;
1097129                DUMMY[1] := ENTRY[2] ;
1098130                DUMMY[2] := ENTRY[3] ;
1099131                FOR N := 2 TO 11 DO
1100132                   ENTRY[N] := ' ' ;
1101133                DECODE(DUMMY, 1, STAT, PTR1);
1102134                ENCODE(DUMMY, 1, STAT, PTR1:2);
1103135                IF DUMMY[1] = ' ' THEN ENTRY[2] := DUMMY[2] ELSE
1104136                BEGIN
1105137                   ENTRY[2] := DUMMY[1] ;
1106138                   ENTRY[3] := DUMMY[2] ;
1107139                END ;
1108140                DISPLAY(VDT_BLK, 19, 68, ENTRY, 11);
1109141                IF PTR1 > 0 AND PTR1 < NEXT_QUESTION THEN
1110142                BEGIN
1111143                   READ(PROBLEM, PTR1, PROB);
1112144                   IF PROB.YES_NO = 'N'
1113145                      AND PROB.STATUS_CODE <> 'D' THEN VALID := TRUE ;
1114146                   IF VALID THEN DATA_BASE := TRUE ;
1115147                   READ(PROBLEM, QUEST_NUMBER, PROB);
1116148                END ;
1117149             END ;
1118150
1119151 { Check for valid numeric entry, maximum 2 decimal places; minus sign
1120152   (if any) must appear as first character                                      }
1121153
1122154             IF NOT REPEAT_ENTRY AND ENTRY <> '           ' THEN
1123155             BEGIN
1124156                LEFT_JSTFD := ENTRY ;
1125157                ENTRY := '           ';
1126158                SPACE_FOUND := FALSE ;
1127159                VALID := TRUE ;
1128160                FOUND_MINUS := FALSE ;
1129161                FOUND_DECIMAL := FALSE ;
1130162                DECIMAL_PLACES := 0 ;
1131163                FOR N := 1 TO 11 DO
1132164                BEGIN
1133165                   IF NOT SPACE_FOUND THEN
```

```
1134166                 BEGIN
1135167                   CASE LEFT_JSTFD[N] OF
1136168                     ' ' : SPACE_FOUND := TRUE ;
1137169                     '1' , '2' , '3' , '4' , '5' ,
1138170                     '6' , '7' , '8' , '9' , '0' ,
1139171                     '-' , '.' : ENTRY[N] := LEFT_JSTFD[N] ;
1140172                   OTHERWISE
1141173                     VALID := FALSE ;
1142174                     ENTRY[N] := LEFT_JSTFD[N] ;
1143175                   END ;
1144176
1145177                   IF FOUND_DECIMAL AND VALID THEN
1146178                   BEGIN
1147179                     IF LEFT_JSTFD[N] = '.' THEN
1148180                       VALID := FALSE ELSE
1149181                     BEGIN
1150182                       DECIMAL_PLACES := DECIMAL_PLACES + 1 ;
1151183                       IF DECIMAL_PLACES > 2 THEN ENTRY[N] := ' ';
1152184                     END ;
1153185                   END ;
1154186
1155187                   IF FOUND_MINUS AND LEFT_JSTFD[N] = '-'
1156188                     THEN VALID := FALSE ;
1157189                   IF LEFT_JSTFD[N] = '.' THEN FOUND_DECIMAL := TRUE ;
1158190                   IF LEFT_JSTFD[N] = '-' THEN FOUND_MINUS := TRUE ;
1159191
1160192                 END ;
1161193               END ;
1162194               IF FOUND_MINUS AND ENTRY[1] <> '-' THEN VALID := FALSE ;
1163195               DISPLAY(VDT_BLK,19,68,ENTRY,11);
1164196             END ;
1165197
1166198         UNTIL VALID OR ENTRY = '           ' ;
1167199
1168200 { Check to see if this is a "data-base" entry and accept time periods}
1169201
1170202       IF DATA_BASE AND ENTRY <> '           ' THEN
1171203       BEGIN
1172204         DISPLAY(VDT_BLK,20,10,'NUMBER OF PREVIOUS TIME PERIODS TO ',99);
1173205         DISPLAY(VDT_BLK,20,45,'BE READ FROM DATA-BASE:  [     ]   ',99);
1174206         VALID := FALSE ;
1175207
1176208 { Display previously entered data, if any                            }
1177209
1178210         TIME_ACPT := '     ';
1179211         IF COMP.FORMULA[PTR_FORMULA] <> ' ' THEN
1180212         BEGIN
1181213           PTR1 := 1 ;
1182214           WHILE COMP.FORMULA[PTR_FORMULA] <> ';' DO
1183215           BEGIN
1184216             TIME_ACPT[PTR1] := COMP.FORMULA[PTR_FORMULA] ;
1185217             PTR_FORMULA := PTR_FORMULA + 1 ;
1186218             PTR1 := PTR1 + 1 ;
1187219           END ;
1188220           PTR_FORMULA := PTR_FORMULA + 1 ;
1189221         END ;
1190222         DISPLAY(VDT_BLK,20,71,TIME_ACPT,5);
1191223
1192224         REPEAT    { UNTIL VALID }
1193225           VALID := FALSE ;
1194226           ACCEPT(VDT_BLK,20,71,TIME_ACPT,5,T);
1195227           DECODE(TIME_ACPT,1,STAT,TIME_PER);
1196228           ENCODE(TIME_ACPT,1,STAT,TIME_PER:5);
1197229           TIME_JSTFD := TIME_ACPT ;
1198230           TIME_ACPT := '     ';
1199231           PTR1 := 1 ;
1200232           FOR N := 1 TO 6 DO
1201233           BEGIN
1202234             IF TIME_JSTFD[N] <> ' ' THEN
1203235             BEGIN
1204236               TIME_ACPT[PTR1] := TIME_JSTFD[N] ;
1205237               PTR1 := PTR1 + 1 ;
1206238             END ;
1207239           END ;
1208240           DISPLAY(VDT_BLK,20,71,TIME_ACPT,5);
1209241           IF TIME_PER > 0 THEN VALID := TRUE ;
```

```
1210242        UNTIL VALID ;
1211243        FIRST_ENTRY := FALSE ;
1212244     END ;
1213245
1214246 { If not a "data-base" entry, accept the operation character       }
1215247
1216248     IF NOT DATA_BASE AND ENTRY <> '            ' THEN
1217249     BEGIN
1218250        DISPLAY(VDT_BLK,20,10,'OPERATION CHARACTER: [ ]      + add,',99);
1219251        DISPLAY(VDT_BLK,20,45,' - subtract, * multiply, / divide, ',99);
1220252        DISPLAY(VDT_BLK,21,12,'E exponent, R square root, C change',99);
1221253        DISPLAY(VDT_BLK,21,47,' sign, A absolute value, S store ',99);
1222254        VALID := FALSE ;
1223255
1224256 { Display previously entered data, if any                          }
1225257
1226258        TIME_ACPT := '       ';
1227259        IF COMP.FORMULA[PTR_FORMULA] <> ' ' THEN
1228260        BEGIN
1229261           PTR1 := 1 ;
1230262           WHILE COMP.FORMULA[PTR_FORMULA] <> ';' DO
1231263           BEGIN
1232264              TIME_ACPT[PTR1] := COMP.FORMULA[PTR_FORMULA] ;
1233265              PTR_FORMULA := PTR_FORMULA + 1 ;
1234266              PTR1 := PTR1 + 1 ;
1235267           END ;
1236268           PTR_FORMULA := PTR_FORMULA + 1 ;
1237269        END ;
1238270        DISPLAY(VDT_BLK,20,32,TIME_ACPT,1);
1239271
1240272        REPEAT    { UNTIL VALID }
1241273           IF FIRST_ENTRY THEN TIME_ACPT[1] := 'S' ELSE
1242274              ACCEPT(VDT_BLK,20,32,TIME_ACPT,1,T);
1243275           FIRST_ENTRY := FALSE ;
1244276           DISPLAY(VDT_BLK,20,32,TIME_ACPT,1);
1245277           CASE TIME_ACPT[1] OF
1246278              '+' , '-' , '*' , '/' ,
1247279              'E' , 'R' , 'C' , 'A' ,
1248280              'S' : VALID := TRUE ;
1249281           OTHERWISE VALID := FALSE ;   END ;
1250282        UNTIL VALID ;
1251283     END ;
1252284
1253285 { Update buffer and display with new formula entries                }
1254286
1255287     IF ENTRY <> '           ' THEN
1256288     BEGIN
1257289       PTR1 := 1 ;
1258290       WHILE ENTRY[PTR1] <> ' ' DO
1259291       BEGIN
1260292          BUFFER[PTR_BUFFER] := ENTRY[PTR1] ;
1261293          PTR1 := PTR1 + 1 ;
1262294          IF PTR_BUFFER < 80 THEN
1263295             PTR_BUFFER := PTR_BUFFER + 1 ;
1264296       END ;
1265297       BUFFER[PTR_BUFFER] := ',' ;
1266298       IF PTR_BUFFER < 80 THEN PTR_BUFFER := PTR_BUFFER + 1 ;
1267299       PTR1 := 1 ;
1268300       WHILE TIME_ACPT[PTR1] <> ' ' DO
1269301       BEGIN
1270302          BUFFER[PTR_BUFFER] := TIME_ACPT[PTR1] ;
1271303          PTR1 := PTR1 + 1 ;
1272304          IF PTR_BUFFER < 80 THEN
1273305             PTR_BUFFER := PTR_BUFFER + 1 ;
1274306       END ;
1275307       BUFFER[PTR_BUFFER] := ';' ;
1276308       IF PTR_BUFFER < 80 THEN PTR_BUFFER := PTR_BUFFER + 1 ;
1277309       IF PTR_BUFFER = 80 THEN
1278310       BEGIN
1279311          ERROR_STATUS := TRUE ;
1280312          DISPLAY(VDT_BLK,22,50,'FORMULA IS TOO LARGE',99);
1281313          CLEAR_LINE(18);
1282314          CLEAR_LINE(19);
1283315          CLEAR_LINE(20);
```

```
1284316         CLEAR_LINE(21);
1285317       END ;
1286318       DISPLAY(VDT_BLK,24,1,BUFFER,80);
1287319     END ;
1288320
1289321     IF ERROR_STATUS THEN FINISHED := TRUE ;
1290322
1291323 { Check for any more entries                                                          }
1292324
1293325     IF NOT FINISHED THEN
1294326     BEGIN
1295327       ACPT_YES_NO(DUMY,22,45,YES);
1296328       IF NOT YES THEN FINISHED := TRUE ;
1297329     END ;
1298330
1299331 { If buffer is blank, set error status flag                                           }
1300332
1301333     IF FINISHED AND BUFFER[1] = ' ' THEN
1302334       ERROR_STATUS := TRUE ;
1303335
1304336 { Write out formula to file if done and valid                                         }
1305337
1306338     IF FINISHED AND NOT ERROR_STATUS THEN
1307339     BEGIN
1308340       ENCODE(COMP.RCD_NUMBER,1,STAT,QUEST_NUMBER:2);
1309341       COMP.FORMULA := BUFFER ;
1310342       WRITE(COMPFILE,QUEST_NUMBER,COMP);
1311343     END ;
1312344
1313345 UNTIL FINISHED ;
1314346
1315347 CALCULATE := FALSE ;
1316348 READ(PROBLEM,QUEST_NUMBER,PROB);
1317349
1318    END ;   { QST_CALC }
    MAP OF IDENTIFIERS FOR   QST_CALC IDENTIFIER NAME    KIND           SIZE         STACK              PICTURE
                                 (BYTES,BITS) DISPLACEMENT       (PACKED FIELDS ONLY)
                                 LEVEL(DISPL)  (BYTE,BIT)

ENTRY              VARIABLE      (12,0)       #0028      DIRECT
LEFT_JSTFD         VARIABLE      (12,0)       #0034      DIRECT
BUFFER             VARIABLE      (80,0)       #0040      DIRECT
TIME_ACPT          VARIABLE      (6,0)        #0090      DIRECT
TIME_JSTFD         VARIABLE      (6,0)        #0096      DIRECT
TIME_PER           VARIABLE      (2,0)        #009C      DIRECT
OP_CHAR            VARIABLE      (0,8)        #009E      DIRECT
VALID              VARIABLE      (0,1)        #00A0      DIRECT
DATA_BASE          VARIABLE      (0,1)        #00A2      DIRECT
FIRST_ENTRY        VARIABLE      (0,1)        #00A4      DIRECT
FINISHED           VARIABLE      (0,1)        #00A6      DIRECT
SPACE_FOUND        VARIABLE      (0,1)        #00A8      DIRECT
REPEAT_ENTRY       VARIABLE      (0,1)        #00AA      DIRECT
FOUND_DECIMAL      VARIABLE      (0,1)        #00AC      DIRECT
FOUND_MINUS        VARIABLE      (0,1)        #00AE      DIRECT
DECIMAL_PLACES     VARIABLE      (2,0)        #00B0      DIRECT
PTR_FORMULA        VARIABLE      (2,0)        #00B2      DIRECT
PTR_BUFFER         VARIABLE      (2,0)        #00B4      DIRECT
PTR1               VARIABLE      (2,0)        #00B6      DIRECT
PTR2               VARIABLE      (2,0)        #00B8      DIRECT 1319    (*--                                                                               *)
1320    BEGIN   { QUESTIONS }
1321
1322  3 REPEAT
1323  4   READ(PROBLEM,0,PROB);
1324  5   NEXT_QUESTION := PROB.NEXT_QUESTION ;
1325  6   TOTAL_QUESTIONS := NEXT_QUESTION - 1 ;
1326  7   TOTAL_SITUATIONS := PROB.NUM_SITUATIONS ;
1327  8   MINIMUM := PROB.MINIMUM_L] ;
1328  9   MINIMUM := MINIMUM + 0 ;
1329 10   IF MINIMUM = 0 THEN MINIMUM := 25 ;
1330 11   INT_QUESTIONS := PROB.INT_QUESTIONS ;
1331 12
```

```
1332 13     REPEAT
1333 14        ENCODE(DUMMY, 1, STAT, NEXT_QUESTION:2);
1334 15        IF NEXT_QUESTION > 50 THEN DUMMY := '  ';
1335 16        IF NOT DELETE AND NOT REINSTATE THEN
1336 17           DISPLAY(VDT_BLK, 10, 30, DUMMY, 2);
1337 18
1338 19 { Check for question number greater than 1 but less than NEXT_QUEST }
1339 20
1340 21        ERROR_STATUS := FALSE;
1341 22        NEW_QUEST := FALSE;
1342 23        DONE := FALSE;
1343 24        SKIP_ENTRY := FALSE ;
1344 25
1345 26 { No entry or "00" means operator is done with the routien         }
1346 27
     QUESTIONS 1347 28        ACCEPT(VDT_BLK, 10, 30, DUMMY, 2, T);
1348 29        CLEAR_LINE(24);
1349 30        DECODE(DUMMY, 1, STAT, QUEST_NUMBER);
1350 31        ENCODE(DUMMY, 1, STAT, QUEST_NUMBER:2);
1351 32        DISPLAY(VDT_BLK, 10, 30, DUMMY, 2);
1352 33
1353 34        IF QUEST_NUMBER < 0
1354 35           OR QUEST_NUMBER > NEXT_QUESTION
1355 36           OR QUEST_NUMBER > 50)
1356 37              THEN ERROR_STATUS := TRUE;
1357 38
1358 39 { Check for a new question; no questions may be added if delete or  }
1359 40 {                         reinstate                                }
1360 41
1361 42        NEW_QUEST := FALSE ;
1362 43        IF QUEST_NUMBER = NEXT_QUESTION THEN
1363 44        BEGIN
1364 45           IF DELETE OR REINSTATE THEN ERROR_STATUS := TRUE ELSE
1365 46           BEGIN
1366 47              QUESTIONS_ADDED := TRUE;
1367 48              NEW_QUEST := TRUE;
1368 49           END ;
1369 50        END;
1370 51
1371 52        IF QUEST_NUMBER = 0
1372 53           THEN DONE := TRUE;
1373 54
1374 55 { Enforce at least one question to be entered on a new problem      }
1375 56
1376 57        IF QUEST_NUMBER = 0 AND NEXT_QUESTION = 1
1377 58           THEN ERROR_STATUS := TRUE;
1378 59
1379 60     UNTIL ERROR_STATUS = FALSE;
1380 61
1381 62     CHANGE := FALSE ;
1382 63     IF NOT NEW_QUEST AND NOT NEW_PROB
1383 64        THEN CHANGE := TRUE;
1384 65
1385 66     IF QUEST_NUMBER <> 0 THEN
1386 67     BEGIN
1387 68        IF NOT NEW_QUEST THEN
1388 69        BEGIN
1389 70           READ(PROBLEM, QUEST_NUMBER, PROB);
1390 71           DISPLAY(VDT_BLK, 11, 30, PROB.DESC_QUESTION, 30);
1391 72           ENCODE(DUMMY, 1, STAT, PROB.YES_NO);
1392 73           DISPLAY(VDT_BLK, 12, 30, DUMMY, 1);
1393 74           DISPLAY(VDT_BLK, 14, 30, PROB.UNIT_DESC, 10);
1394 75           ENCODE(DUMMY, 1, STAT, PROB.REQUIRED);
1395 76           DISPLAY(VDT_BLK, 17, 30, DUMMY, 1);
1396 77           CASE PROB.STATUS_CODE OF
1397 78              'A' : RESP_STRING := 'Active    ';
1398 79              'R' : RESP_STRING := 'Reinstated';
1399 80              'D' : RESP_STRING := 'Deleted   ';
1400 81           OTHERWISE
1401 82                    RESP_STRING := '          ';
1402 83           END ;
```

```
1403 84            DISPLAY(VDT_BLK,17,60,RESP_STRING,10);
1404 85         END
1405 86         ELSE BEGIN
1406 87            ENCODE(PROB.NUM_QUESTION,1,STAT,QUEST_NUMBER:2);
1407 88            PROB.CALCULATE  := ' ' ;
1408 89            PROB.INT_QUEST  := ' ' ;
1409 90            PROB.REFERENCE  := ' ' ;
1410 91            PROB.BOUNDARIES := 0 ;
1411 92            PROB.LOWER_1_LIMIT := 0 ;
1412 93            PROB.UPPER_1_LIMIT := 0 ;
1413 94            PROB.LOWER_2_LIMIT := 0 ;
1414 95            PROB.UPPER_2_LIMIT := 0 ;
1415 96            PROB.LGCL_IMPT     := 0 ;
1416 97            PROB.LGCL_INTR     := 0 ;
1417 98            PROB.LGCL_CMPL     := 0 ;
1418 99            PROB.EXPT_IMPT     := 0 ;
1419100            PROB.EXPT_INTR     := 0 ;
1420101            PROB.EXPT_CMPL     := 0 ;
1421102            PROB.STATUS_CODE := 'A';
1422103            DISPLAY(VDT_BLK,17,60,'Active    ',10);
1423104            PROB.SORT_FLAG    := ' ';
1424105            PROB.FLAG6_FUTURE := ' ';
1425106            PROB.FLAG7_FUTURE := ' ';
1426107            PROB.FLAG8_FUTURE := ' ';
1427108         END;
1428109
1429110         IF NOT DELETE AND NOT REINSTATE THEN
1430111         BEGIN
1431112            IF PROB.STATUS_CODE = 'D' THEN
1432113            BEGIN
1433114               DISPLAY(VDT_BLK,24,24,'THIS QUESTION IS DELETED',99);
1434115               SKIP_ENTRY := TRUE ;
1435116            END ;
1436117         END ;
1437118
1438119         CALCULATE  := FALSE ;
1439120         REFRNCE    := FALSE ;
1440121         INTGR      := FALSE ;
1441122
1442123         IF NOT DELETE AND NOT REINSTATE AND NOT SKIP_ENTRY THEN
1443124         BEGIN
1444125            ACCEPT(VDT_BLK,11,30,PROB.DESC_QUESTION,30,T);
1445126            IF NOT CHANGE THEN ACPT_YES_NO(PROB.YES_NO,12,30,YES);
1446127            IF PROB.YES_NO = 'Y' THEN
1447128            BEGIN
1448129               PROB.UNIT_DESC := 'Y / N     ';
1449130               DISPLAY(VDT_BLK,14,30,PROB.UNIT_DESC,10);
1450131               PROB.LOWER_1_LIMIT := 0 ;
1451132               PROB.UPPER_1_LIMIT := 0 ;
1452133               PROB.LOWER_2_LIMIT := 0 ;
1453134               PROB.UPPER_2_LIMIT := 0 ;
1454135               PROB.BOUNDARIES    := 0 ;
1455136            END
1456137            ELSE BEGIN
1457138               DISPLAY(VDT_BLK,15,10,'1ST LOWER BOUNDARY:[           ]',99);
1458139               DISPLAY(VDT_BLK,15,47,'1ST UPPER BOUNDARY:[           ]',99);
1459140               DISPLAY(VDT_BLK,12,47,'CALCULATED QUESTION ?     [ ]',99);
1460141               DISPLAY(VDT_BLK,13,8,'FOR REFERENCE ONLY ? [ ]',99);
1461142               DISPLAY(VDT_BLK,13,47,'INTEGER VALUE ?           [ ]',99);
1462143               IF PROB.BOUNDARIES > 0 THEN
1463144               BEGIN
1464145                  ENCODE(RESP_STRING,1,STAT,PROB.LOWER_1_LIMIT:10:2);
1465146                  DISPLAY(VDT_BLK,15,30,RESP_STRING,10);
1466147                  ENCODE(RESP_STRING,1,STAT,PROB.UPPER_1_LIMIT:10:2);
1467148                  DISPLAY(VDT_BLK,15,67,RESP_STRING,10);
1468149               END ;
1469150               DUMMY[1] := PROB.CALCULATE ;
1470151               DISPLAY(VDT_BLK,12,74,DUMMY,1);
1471152               DUMMY[1] := PROB.INT_QUEST ;
1472153               DISPLAY(VDT_BLK,13,74,DUMMY,1);
1473154               IF PROB.INT_QUEST = 'Y' THEN
1474155                  INT_QUESTIONS := INT_QUESTIONS - 1 ;
1475156               DUMMY[1] := PROB.REFERENCE ;
1476157               DISPLAY(VDT_BLK,13,30,DUMMY,1);
1477158
```

```
1478159         300: ASSUME_NO(PROB.CALCULATE,12,74,CALCULATE);
1479160              CLEAR_LINE(23);
1480161              CLEAR_LINE(24);
1481162
1482163              ASSUME_NO(PROB.REFERENCE,13,30,REFRNCE);
1483164              IF REFRNCE THEN CLEAR_LINE(15);
1484165
1485166  { Only allow "integer" questions if the number of these questions will
1486167    be less than 15% of the total number of questions and if the question
1487168    has not already been identified as a "reference"; also, once a
1488169    question has already been established on the system, it cannot be
1489170    changed from integer to non-integer or vice-versa                   }
1490171
1491172              NUMBER := INT_QUESTIONS + 1 ;
1492173              NUMBER := NUMBER * 100 ;
1493174              IF TOTAL_QUESTIONS > 0 THEN
1494175                 NUMBER := NUMBER DIV TOTAL_QUESTIONS
1495176                 ELSE NUMBER := 100 ;
1496177
1497178              IF CHANGE THEN
1498179              BEGIN
1499180                 IF PROB.INT_QUEST = 'Y' THEN
1500181                 BEGIN
1501182                    DISPLAY(VDT_BLK,13,74,'Y]',2);
1502183                    INTGR := TRUE ;
1503184                 END ELSE BEGIN
1504185                    DISPLAY(VDT_BLK,13,74,'N]',2);
1505186                    INTGR := FALSE ;
1506187                 END ;
1507188              END ELSE BEGIN
1508189                 IF NUMBER <= 15 AND NOT REFRNCE THEN
1509190                    ASSUME_NO(PROB.INT_QUEST,13,74,INTGR)
1510191                 ELSE BEGIN
1511192                    DISPLAY(VDT_BLK,13,74,'N]',2);
1512193                    INTGR := FALSE ;
1513194                    PROB.INT_QUEST := 'N' ;
1514195                 END ;
1515196              END ;
1516197
1517198              IF PROB.INT_QUEST = 'Y' THEN
1518199              BEGIN
1519200
1520201  { If this is a new integer question for an existing problem, initialize
1521202    this poisition in the interpretation string of all existing situations
1522203    the "not entered" value for integer questions, -32767               }
1523204
1524205                 IF NEW_QUEST AND NOT NEW_PROB THEN
1525206                 BEGIN
1526207                    FOR Q := 0 TO (TOTAL_SITUATIONS - 1) DO
1527208                    BEGIN
1528209                       READ(SITUATION,Q,SIT);
1529210                       SIT.SINC_STRING[QUEST_NUMBER] := -32767 ;
1530211                       WRITE(SITUATION,Q,SIT);
1531212                    END ;
1532213                 END ;
1533214
1534215                 INT_QUESTIONS := INT_QUESTIONS + 1 ;
1535216                 CLEAR_LINE(15);
1536217                 DISPLAY(VDT_BLK,15,10,'LOWER INT. LIMIT:   [          ]',
1537218                                                                        99);
1538219                 DISPLAY(VDT_BLK,15,47,'UPPER INT. LIMIT:   [          ]',
1539220                                                                        99);
1540221                 IF PROB.BOUNDARIES > 0 THEN
1541222                 BEGIN
1542223                    NUMBER := TRUNC(PROB.LOWER_1_LIMIT);
1543224                    ENCODE(RESP_STRING,1,STAT,NUMBER);
1544225                    DISPLAY(VDT_BLK,15,30,RESP_STRING,10);
1545226                    NUMBER := TRUNC(PROB.UPPER_1_LIMIT);
1546227                    ENCODE(RESP_STRING,1,STAT,NUMBER);
1547228                    DISPLAY(VDT_BLK,15,67,RESP_STRING,10);
1548229                 END ;
1549230              END ;
1550231
1551232              ACCEPT(VDT_BLK,14,30,PROB.UNIT_DESC,30,T);
```

```
1552233
1553234              BOUNDARIES ;
1554235
1555236          END ;
1556237
1557238          ACPT_YES_NO(PROB.REQUIRED,17,30,YES);
1558239
1559240          IF YES AND CALC_FLAG = 'N' THEN
1560241              PROB.LGCL_IMPT := 50 ;
1561242
1562243 { Write detail problem record                                           }
1563244
1564245          ENCODE(PROB.NUM_QUESTION,1,STAT.QUEST_NUMBER:4);
1565246          WRITE(PROBLEM,QUEST_NUMBER,PROB);
1566247
1567248 { If this is a calculated question, accept a valid formula, but if
1568249   nothing is entered go back to "CALCULATE ?" question                  }
1569250
1570251          IF CALCULATE THEN
1571252          BEGIN
1572253             CLEAR_LINE(23);
1573254             CLEAR_LINE(24);
1574255             ERROR_STATUS := FALSE ;
1575256             QST_CALC ;
1576257             IF ERROR_STATUS THEN GOTO 300 ;
1577258          END ;
1578259
1579260 { If a new question, update next question number                         }
1580261
1581262          IF NEW_QUEST THEN
1582263          BEGIN
1583264             NEXT_QUESTION := NEXT_QUESTION + 1 ;
1584265             TOTAL_QUESTIONS := TOTAL_QUESTIONS + 1 ;
1585266          END ;
1586267
1587268 { Update "O" record of problem file                                      }
1588269
1589270          READ(PROBLEM,O,PROB);
1590271          PROB.NEXT_QUESTION := NEXT_QUESTION ;
1591272          PROB.INT_QUESTIONS := INT_QUESTIONS ;
1592273          WRITE(PROBLEM,O,PROB);
1593274
1594275 { Clear out limit line and all variables for next question entry }
1595276
1596277          CLEAR_LINE(12);
1597278          CLEAR_LINE(13);
1598279          CLEAR_LINE(15);
1599280          CLEAR_LINE(16);
1600281          CLEAR_LINE(18);
1601282          CLEAR_LINE(19);
1602283          CLEAR_LINE(20);
1603284          CLEAR_LINE(21);
1604285          CLEAR_LINE(22);
1605286          CLEAR_LINE(23);
1606287          CLEAR_LINE(24);
1607288          DISPLAY(VDT_BLK,12,8,'YES / NO QUESTION ?   [ ]',99);
1608289          DISPLAY(VDT_BLK,11,30,'                              ',30);
1609290          DISPLAY(VDT_BLK,14,30,'          ',10);
1610291          DISPLAY(VDT_BLK,17,30,' ]',2);
1611292          DISPLAY(VDT_BLK,17,60,'          ',10);
1612293
1613294     END;
1614295   END ;
1615296
1616297   IF DELETE AND QUEST_NUMBER <> 0 THEN
1617298   BEGIN
1618299      CLEAR_LINE(24);
1619300      IF PROB.STATUS_CODE = 'D' THEN
1620301         DISPLAY(VDT_BLK,24,20,'THIS QUESTION IS ALREADY DELETED',99)
1621302      ELSE BEGIN
1622303         DISPLAY(VDT_BLK,24,14,'ARE YOU SURE YOU WISH TO DELETE',99);
1623304         DISPLAY(VDT_BLK,24,45,' THIS QUESTION ?   [ ]',99);
1624305         ACPT_YES_NO(DUMY,24,65,YES);
1625306         IF YES THEN
1626307         BEGIN
```

```
1627308              PROB STATUS_CODE := 'D' ;
1628309              DISPLAY(VDT_BLK,17,60,'Deleted      ',99);
1629310              WRITE(PROBLEM,QUEST_NUMBER,PROB);
1630311           END ;
1631312        END ;
1632313     END ;
1633314
1634315     IF REINSTATE AND QUEST_NUMBER <> 0 THEN
1635316     BEGIN
1636317        CLEAR_LINE(24);
1637318        IF PROB.STATUS_CODE <> 'D' THEN
1638319           DISPLAY(VDT_BLK,24,23,'THIS QUESTION IS NOT DELETED',99)
1639320        ELSE BEGIN
1640321           DISPLAY(VDT_BLK,24,12,'ARE YOU SURE YOU WISH TO REIN',99);
1641322           DISPLAY(VDT_BLK,24,41,'STATE THIS QUESTION ? [ ] ',99);
1642323           ACPT_YES_NO(DUMY,24,65,YES);
1643324           IF YES THEN
1644325           BEGIN
1645326              PROB.STATUS_CODE := 'R' ;
1646327              DISPLAY(VDT_BLK,17,60,'Reinstated',99);
1647328              WRITE(PROBLEM,QUEST_NUMBER,PROB);
1648329
1649330 { If a question is reinstated, the system will follow the same logic
1650331   as if new questions were added to the problem, unless the reference
1651332   situation entered equals the present reference situation         }
1652333
1653334              QUESTIONS_ADDED := TRUE ;
1654335              READ(SITUATION,0,SIT);
1655336              TEST_STRING := SIT.SINC_STRING ;
1656337           END ;
1657338        END ;
1658339     END ;
1659340
1660341 UNTIL QUEST_NUMBER = 0;
1661342
1662     END ;   { QUESTIONS }

1663     (*,                                                                    *)
1664     { ********************************************************************* }
1665
1666     PROCEDURE REFERENCE ;
1667
1668     { This procedure accepts a reference situation                          }
1669
1670     LABEL 100 ;
1671
1672     VAR  JUDGEMENT : PACKED ARRAY[1..20] OF CHAR ;
1673
1674
1675     PROCEDURE RESP_ACPT (VAR RESP_CHAR : INTEGER );    FORWARD ;
1676
1677     PROCEDURE REF_SCREEN ;     FORWARD ;
1678
1679
1680     (*+                                                                     *
1681     { ********************************************************************* }
REFERENCE 1682
1683     PROCEDURE REF_SCREEN ;    { Second screen format }
1684
1685     BEGIN
1686  2    READ(PROBLEM,0,PROB);
1687  3    DISPLAY(VDT_BLK,1,12,'P A R A D O C S    D E V E L O P M E N T',
1688  4                                                               99);
1689  5    DISPLAY(VDT_BLK,1,56,'S Y S T E M',99);
1690  6    DISPLAY(VDT_BLK,3,22,'**** SITUATION DATA CAPTURE ****',99);
1691  7    DISPLAY(VDT_BLK,4,13,
1692  8     'Please enter "REFERENCE" responses for all questions',99);
1693  9    DISPLAY(VDT_BLK,6,06,'PROBLEM CODE:',99);
1694 10    DISPLAY(VDT_BLK,6,25,PROBLEM_FILE,8);
1695 11    DISPLAY(VDT_BLK,6,43,PROB.DESCRIPTION,30);
1696 12    DISPLAY(VDT_BLK,7,62,'INTERMEDIATE',99);
1697 13    DISPLAY(VDT_BLK,8,1,'QUESTION      ',99);
```

```
1698 14      DISPLAY(VDT_BLK,8,15,'DESCRIPTION  ',99);
1699 15      DISPLAY(VDT_BLK,8,41,'UNIT          ',99);
1700 16      DISPLAY(VDT_BLK,8,49,'RESPONSE      ',99);
1701 17      DISPLAY(VDT_BLK,8,63,'JUDGEMENT     ',99);
1702 18      DISPLAY(VDT_BLK,24,30,'CORRECT ?   [ ]',99);
1703      END,   { SCRN2_DISPLAY }
1704      (*,                                                                  *)
1705      PROCEDURE RESP_ACPT ;
1706
1707      { This section checks for a valid response and makes the intermediate
1708        judgement, resulting is a value of 1 to 12 as follows:
1709
1710            1 = Below Both Ranges - Numeric response which is lower than both
1711                    lower boundaries (when two sets of boundaries exist)
1712            2 = Below Primary Range - Numeric response which is higher than
1713                    (or equal to) the secondary lower boundary but lower than
1714                    the primary lower boundary (two boundary sets must exist)
1715            3 = Within Both Ranges - Numeric response which is within the
1716                    primary range and two boundary sets exist
1717            4 = Above Primary Range - Numeric response which is lower than (or
1718                    equal to) the secondary upper boundary but higher than th
1719                    primary upper boundary (two boundary sets must exist)
1720            5 = Above Both Ranges - Numeric response which is higher than both
1721                    upper boundaries (when two sets of boundaries exist)
1722            6 = Below Primary Range - Numeric response which is lower than the
1723                    primary lower boundary (and there are no secondary limits
1724            7 = Within Primary Range - Numeric response which is within the
1725                    primary boundaries (and there are no secondary limits)
1726            8 = Above Primary Range - Numeric response which is higher than th
1727                    primary upper boundary (and there are no secondary limits
1728            9 = No Judgement - Numeric response which has no specified limits
1729           10 = Not Entered - Blank response for a non-required question; OR
1730                    any response for a "for reference only" question
1731           11 = Absent - A "N" or "n" response to a Y/N question
1732           12 = Present - A "Y" or "y" response to a Y/N question
1733           13 = Deleted - This will only be put in by the system if a
1734                    question has been previously deleted and then only in
1735                    memory and not on disk
1736
1737      VAR   RESPONSE   : PACKED ARRAY[1..10] OF CHAR;
RESP_ACPT
1738            LIMIT      : PACKED ARRAY[1..5] OF CHAR;
1739            AMOUNT     : REAL;
1740            VALID      : BOOLEAN ;
1741            OUT_OF_RANGE : BOOLEAN ;
1742            LIMIT_INT  : INTEGER ;
1743
1744      PROCEDURE CALC_RESPONSE ;    FORWARD ;
1745
1746
1747
1748      (*+                                                                   *)
1749      PROCEDURE CALC_RESPONSE ;
1750
1751      { This procedure calculates the response based on a predefined formula}
1752
1753      VAR   ENTRY        : PACKED ARRAY[1..12] OF CHAR ;
1754            TIME_UNITS   : PACKED ARRAY[1..6] OF CHAR ;
1755            OP_CODE      : CHAR ;
1756            PTR_FORMULA  : INTEGER ;
1757            PTR_RESPONSE : INTEGER ;
1758            PTR          : INTEGER ;
1759            DATA_BASE    : BOOLEAN ;
1760            PROCESSED    : BOOLEAN ;
1761            NO_ENTRY     : BOOLEAN ;
1762            FINISHED     : BOOLEAN ;
1763            ENABLE       : BOOLEAN ;
1764            F , R1 , R2 , R3 , R4 : REAL ;
1765
1766      BEGIN   { CALC_RESPONSE }
1767
1768      { Open computation file and initialize switches and regiters          }
1769
1770  5   NO_ENTRY := FALSE ;
```

```
1771  6   FINISHED := FALSE ;
1772  7   PTR_FORMULA := 1 ;
1773  8   SETMEMBER(COMPFILE,COMP_NODE,PROBLEM_FILE);
1774  9   RESET(COMPFILE);
1775 10   READ(COMPFILE,RECORD_COUNTER,COMP);
1776 11   F  := 0 ;
1777 12   R1 := 0 ;
1778 13   R2 := 0 ;
1779 14   R3 := 0 ;
1780 15   R4 := 0 ;
1781 16   ENABLE := FALSE ;
1782 17
1783 18   REPEAT   { UNTIL FINISHED }
1784 19
1785 20      IF COMP.FORMULA[PTR_FORMULA] = ',' THEN FINISHED := TRUE ELSE
1786 21      BEGIN
1787 22         DATA_BASE := FALSE ;
1788 23         PROCESSED := FALSE ;
1789 24
1790 25   { For the PROBLEM routine, any formula with an "@" entry will return
1791 26     a response of "no entry" since no "data-base" file exists          }
1792 27
1793 28         IF COMP.FORMULA[PTR_FORMULA] = '@' THEN
  CALC_RESPONSE 1794 29         BEGIN
1795 30            PROCESSED := TRUE ;
1796 31            DATA_BASE := TRUE ;
1797 32            FINISHED  := TRUE ;
1798 33            NO_ENTRY  := TRUE ;
1799 34         END ;
1800 35
1801 36   { Check for a "P" entry which has no effect on the registers        }
1802 37
1803 38         IF NOT PROCESSED AND COMP.FORMULA[PTR_FORMULA] = 'P' THEN
1804 39         BEGIN
1805 40            PROCESSED := TRUE ;
1806 41            PTR_FORMULA := PTR_FORMULA + 2 ;
1807 42         END ;
1808 43
1809 44   { Check for a "#" entry for a previous response                     }
1810 45
1811 46         IF NOT PROCESSED AND COMP.FORMULA[PTR_FORMULA] = '##' THEN
1812 47         BEGIN
1813 48            PROCESSED := TRUE ;
1814 49            PTR_FORMULA := PTR_FORMULA + 1 ;
1815 50            DUMMY := ' ' ;
1816 51            PTR := 1 ;
1817 52            WHILE COMP.FORMULA[PTR_FORMULA] <> ',' DO
1818 53            BEGIN
1819 54               DUMMY[PTR] := COMP.FORMULA[PTR_FORMULA] ;
1820 55               PTR := PTR + 1 ;
1821 56               PTR_FORMULA := PTR_FORMULA + 1 ;
1822 57            END ;
1823 58            PTR_FORMULA := PTR_FORMULA + 1 ;
1824 59            DECODE(DUMMY,1,STAT,PTR_RESPONSE);
1825 60            READ(WORKRESP,PTR_RESPONSE,RESP);
1826 61            IF ENABLE THEN
1827 62            BEGIN
1828 63               R4 := R3; R3 := R2; R2 := R1; R1 := F;
1829 64            END ;
1830 65            ENABLE := TRUE ;
1831 66            IF RESP.RESPONSE = '           ' THEN
1832 67            BEGIN
1833 68               FINISHED := TRUE ;
1834 69               NO_ENTRY := TRUE ;
1835 70            END ELSE DECODE(RESP.RESPONSE,1,STAT,F);
1836 71         END ;
1837 72
1838 73   { Read constant value                                               }
1839 74
1840 75         IF NOT PROCESSED THEN
1841 76         BEGIN
1842 77            PROCESSED := TRUE ;
```

```
1843 78              ENTRY := '              ' ;
1844 79              PTR := 1 ;
1845 80              WHILE COMP.FORMULA[PTR_FORMULA] <> ',' DO
1846 81              BEGIN
1847 82                 ENTRY[PTR] := COMP.FORMULA[PTR_FORMULA] ;
1848 83                 PTR := PTR + 1 ;
1849 84                 PTR_FORMULA := PTR_FORMULA + 1 ;
1850 85              END ;
1851 86              PTR_FORMULA := PTR_FORMULA + 1 ;
1852 87              IF ENABLE THEN
1853 88              BEGIN
1854 89                 R4 := R3; R3 := R2; R2 := R1; R1 := F;
1855 90              END ;
1856 91              ENABLE := TRUE ;
1857 92              DECODE(ENTRY,1,STAT,F);
1858 93           END ;
1859 94
1860 95           PROCESSED := FALSE ;
1861 96
1862 97  { For PROBLEM routine, skip data-base read (and its implied "store")
1863 98    and go directly to the op-code character                              }
1864 99
1865100           IF NOT DATA_BASE AND NOT FINISHED THEN
1866101           BEGIN
1867102
1868103  { Check for "S" for store result in register                             }
1869104
1870105              IF NOT PROCESSED AND COMP.FORMULA[PTR_FORMULA] = 'S' THEN
1871106              BEGIN
1872107                 PROCESSED := TRUE ;
1873108                 PTR_FORMULA := PTR_FORMULA + 2 ;
1874109                 R4 := R3; R3 := R2; R2 := R1; R1 := F;
1875110                 ENABLE := FALSE ;
1876111              END ;
1877112
1878113  { Check for "+" and add F to R1                                          }
1879114
1880115              IF NOT PROCESSED AND COMP.FORMULA[PTR_FORMULA] = '+' THEN
1881116              BEGIN
1882117                 PROCESSED := TRUE ;
1883118                 PTR_FORMULA := PTR_FORMULA + 2 ;
1884119                 F := R1 + F ;
1885120                 R1 := R2; R2 := R3; R3 := R4;
1886121                 ENABLE := TRUE ;
1887122              END ;
1888123
1889124  { Check for "-" and subtract F from R1                                   }
1890125
1891126              IF NOT PROCESSED AND COMP.FORMULA[PTR_FORMULA] = '-' THEN
1892127              BEGIN
1893128                 PROCESSED := TRUE ;
1894129                 PTR_FORMULA := PTR_FORMULA + 2 ;
1895130                 F := R1 - F ;
1896131                 R1 := R2; R2 := R3; R3 := R4;
1897132                 ENABLE := TRUE ;
1898133              END ;
1899134
1900135  { Check for "/" and divide R1 by F                                       }
1901136
1902137              IF NOT PROCESSED AND COMP.FORMULA[PTR_FORMULA] = '/' THEN
1903138              BEGIN
1904139                 PROCESSED := TRUE ;
1905140                 PTR_FORMULA := PTR_FORMULA + 2 ;
1906141                 IF F = 0 THEN
1907142                 BEGIN
1908143                    FINISHED := TRUE ;
1909144                    NO_ENTRY := TRUE ;
1910145                 END ELSE F := R1 / F ;
1911146                 R1 := R2; R2 := R3; R3 := R4;
1912147                 ENABLE := TRUE ;
1913148              END ;
1914149
1915150  { Check for "*" and multiply R1 by F                                     }
1916151
1917152              IF NOT PROCESSED AND COMP.FORMULA[PTR_FORMULA] = '*' THEN
```

```
1918153          BEGIN
1919154            PROCESSED := TRUE ;
1920155            PTR_FORMULA := PTR_FORMULA + 2 ;
1921156            F := R1 * F ;
1922157            R1 := R2; R2 := R3; R3 := R4;
1923158            ENABLE := TRUE ;
1924159          END ;
1925160
1926161 { Check for "E" and raise R1 to the power of F (changed to an integer)}
1927162
1928163          IF NOT PROCESSED AND COMP.FORMULA[PTR_FORMULA] = 'E' THEN
1929164          BEGIN
1930165            PROCESSED := TRUE ;
1931166            PTR_FORMULA := PTR_FORMULA + 2 ;
1932167            PTR := TRUNC(F);
1933168            IF PTR < 1 THEN
1934169            BEGIN
1935170              FINISHED := TRUE ;
1936171              NO_ENTRY := TRUE ;
1937172            END ELSE BEGIN
1938173              F := 1 ;
1939174              FOR I := 1 TO PTR DO
1940175                F := F * R1 ;
1941176            END ;
1942177            R1 := R2; R2 := R3; R3 := R4;
1943178            ENABLE := TRUE ;
1944179          END ;
1945180
1946181 { Check for "R" and take the square root of F                            }
1947182
1948183          IF NOT PROCESSED AND COMP.FORMULA[PTR_FORMULA] = 'R' THEN
1949184          BEGIN
1950185            PROCESSED := TRUE ;
1951186            PTR_FORMULA := PTR_FORMULA + 2 ;
1952187            IF F < 0 THEN
1953188            BEGIN
1954189              FINISHED := TRUE ;
1955190              NO_ENTRY := TRUE ;
1956191            END ELSE F := SQRT(F);
1957192            ENABLE := TRUE ;
1958193          END ;
1959194
1960195 { Check for "C" and multiply F by -1                                      }
1961196
1962197          IF NOT PROCESSED AND COMP.FORMULA[PTR_FORMULA] = 'C' THEN
1963198          BEGIN
1964199            PROCESSED := TRUE ;
1965200            PTR_FORMULA := PTR_FORMULA + 2 ;
1966201            PTR := -1 ;
1967202            F := F * PTR ;
1968203          END ;
1969204
1970205 { Check for "A" and change F to its absolute value                        }
1971206
1972207          IF NOT PROCESSED AND COMP.FORMULA[PTR_FORMULA] = 'A' THEN
1973208          BEGIN
1974209            PROCESSED := TRUE ,
1975210            PTR_FORMULA := PTR_FORMULA + 2 ;
1976211            F := ABS(F) ;
1977212          END ;
1978213
1979214          IF NOT PROCESSED THEN
1980215          BEGIN
1981216            FINISHED := TRUE ;
1982217            NO_ENTRY := TRUE ;
1983218          END ;
1984219        END ;
1985220    END ;
1986221
1987222   UNTIL FINISHED ;
1988223
1989224   ERROR_STATUS := FALSE ;
1990225   IF NO_ENTRY THEN
1991226     RESPONSE := '        '
1992227   ELSE BEGIN
```

```
1993228      ENCODE(RESPONSE,1,STAT,F:10.2);
1994229      NUMERIC_CHECK(RESPONSE,10,ERROR_STATUS);
1995230 END ;
1996231
1997232 IF ERROR_STATUS THEN RESPONSE := '          ';
1998233
1999234 DISPLAY(VDT_BLK,LINE_COUNTER,49,RESPONSE,10);
2000235
2001236 ENTRY_REQUIRED := FALSE ;
2002237
2003    END ;   { CALC_RESPONSE }
```

MAP OF IDENTIFIERS FOR  CALC_RES

| IDENTIFIER NAME | KIND | SIZE (BYTES,BITS) | STACK DISPLACEMENT LEVEL(DISPL) (BYTE,BIT) | PICTURE (PACKED FIELDS ONLY) |
|---|---|---|---|---|
| ENTRY | VARIABLE | (12,0) | #0028 | DIRECT |
| TIME_UNITS | VARIABLE | (6,0) | #0034 | DIRECT |
| OP_CODE | VARIABLE | (0,8) | #003A | DIRECT |
| PTR_FORMULA | VARIABLE | (2,0) | #003C | DIRECT |
| PTR_RESPONSE | VARIABLE | (2,0) | #003E | DIRECT |
| PTR | VARIABLE | (2,0) | #0040 | DIRECT |
| DATA_BASE | VARIABLE | (0,1) | #0042 | DIRECT |
| PROCESSED | VARIABLE | (0,1) | #0044 | DIRECT |
| NO_ENTRY | VARIABLE | (0,1) | #0046 | DIRECT |
| FINISHED | VARIABLE | (0,1) | #0048 | DIRECT |
| ENABLE | VARIABLE | (0,1) | #004A | DIRECT |
| F | VARIABLE | (4,0) | #004C | DIRECT |
| R1 | VARIABLE | (4,0) | #0050 | DIRECT |
| R2 | VARIABLE | (4,0) | #0054 | DIRECT |
| R3 | VARIABLE | (4,0) | #0058 | DIRECT |
| R4 | VARIABLE | (4,0) | #005C | DIRECT |

```
2004    (*--                                                              *)
2005    BEGIN   { RESP_ACPT }
2006
2007  3 VALID := FALSE ;
2008  4 RESP_CHAR := 0 ;
2009  5 OUT_OF_RANGE := FALSE ;
2010  6 JUDGEMENT := '                 ' ;
2011  7
2012  8 REPEAT    { accept response }
2013  9
2014 10 { Check for calculated question, and if not, accept response from kbd}
2015 11
2016 12    IF PROB.CALCULATE = 'Y' AND NOT OUT_OF_RANGE THEN CALC_RESPONSE
2017 13       ELSE ACCEPT(VDT_BLK,LINE_COUNTER,49,RESPONSE,10,T);
2018 14
2019 15 { Check for reference only question                                  }
2020 16
2021 17    IF PROB.REFERENCE = 'Y' THEN
2022 18    BEGIN
2023 19       NUMERIC_CHECK(RESPONSE,10,ERROR_STATUS);
2024 20       IF ERROR_STATUS THEN
2025 21          DISPLAY(VDT_BLK,LINE_COUNTER,61,
2026 22                              'ENTER NUMERIC       ',20)
2027 23       ELSE BEGIN
2028 24          DECODE(RESPONSE,1,STAT,AMOUNT);
2029 25          ENCODE(RESPONSE,1,STAT,AMOUNT:10:2);
2030 26          IF RESPONSE = '**********' THEN
2031 27             DISPLAY(VDT_BLK,LINE_COUNTER,61,
2032 28                              'ENTRY TOO LARGE    ',20)
2033 29          ELSE BEGIN
2034 30             DISPLAY(VDT_BLK,LINE_COUNTER,49,RESPONSE,10);
2035 31             RESP_CHAR := 10 ;
2036 32             VALID := TRUE ;
2037 33             JUDGEMENT := 'For Reference Only  ' ;
2038 34          END ;
2039 35       END ;
2040 36    END ELSE
2041 37    BEGIN    { Non-reference question }
2042 38
```

```
2043 39  ( All spaces entered                                                    }
2044 40
2045 41            IF RESPONSE = '              ' THEN
2046 42            BEGIN
2047 43               RESP_CHAR := 10 ;
2048 44               JUDGEMENT := 'Not Entered
2049 45               VALID := TRUE ;
     RESP_ACPT 2050 46            END ;
2051 47
2052 48  ( Something entered in response field, but not an integer question      }
2053 49
2054 50            IF RESPONSE <> '              ' AND PROB.INT_QUEST <> 'Y' THEN
2055 51            BEGIN   ( non-space, non_integer response }
2056 52               RESP_CHAR := 9 ;
2057 53               JUDGEMENT := '                    ' ;
2058 54               VALID := TRUE ;
2059 55
2060 56  ( YES / NO response                                                     }
2061 57
2062 58            IF YES_NO_RESP THEN
2063 59            BEGIN   ( yes-no response }
2064 60               VALID := FALSE ;
2065 61               IF RESPONSE[1] = 'Y' OR RESPONSE[1] = 'y' THEN
2066 62               BEGIN
2067 63                  RESP_CHAR := 12 ;
2068 64                  JUDGEMENT := 'Present              ';
2069 65                  VALID := TRUE ;
2070 66               END ;
2071 67               IF RESPONSE[1] = 'N' OR RESPONSE[1] = 'n' THEN
2072 68               BEGIN
2073 69                  RESP_CHAR := 11 ;
2074 70                  JUDGEMENT := 'Absent               ';
2075 71                  VALID := TRUE ;
2076 72               END;
2077 73               IF NOT VALID THEN
2078 74                  DISPLAY(VDT_BLK,LINE_COUNTER,61,
2079 75                          'Y / N REQUIRED      ',20);
2080 76            END;   ( yes-no response }
2081 77
2082 78  ( Numeric entry called for                                              }
2083 79
2084 80            IF NOT YES_NO_RESP THEN
2085 81            BEGIN   ( numeric response }
2086 82               NUMERIC_CHECK(RESPONSE,10,ERROR_STATUS);
2087 83               IF ERROR_STATUS THEN
2088 84
2089 85  ( Non numeric character found in response                               }
2090 86
2091 87               BEGIN
2092 88                  VALID := FALSE ;
2093 89                  DISPLAY(VDT_BLK,LINE_COUNTER,61,
2094 90                          'ENTER NUMERIC       ',20);
2095 91               END ELSE
2096 92
2097 93  ( Good numeric entry (unless an overflow entry)                         }
2098 94
2099 95               BEGIN   ( good numeric response }
2100 96                  VALID := TRUE ;
2101 97                  DECODE(RESPONSE,1,STAT,AMOUNT);
2102 98                  ENCODE(RESPONSE,1,STAT,AMOUNT,10:2);
2103 99                  IF RESPONSE = '**********' THEN
2104 100                 BEGIN
2105 101                    DISPLAY(VDT_BLK,LINE_COUNTER,61,
2106 102                           'ENTRY TOO LARGE     ',20);
2107 103                    VALID := FALSE ;
2108 104                 END ELSE BEGIN   ( not an overflow }
2109 105                    DISPLAY(VDT_BLK,LINE_COUNTER,49,RESPONSE,10);
2110 106
2111 107 ( Both primary and secondary boundries present                          }
2112 108
2113 109                 IF PROB.BOUNDARIES = 2 THEN
2114 110                 BEGIN
2115 111                    IF AMOUNT < PROB.LOWER_2_LIMIT THEN
```

```
2116112                BEGIN
2117113                  RESP_CHAR := 1 ;
2118114                  JUDGEMENT := 'Below Both Ranges     ';
2119115                END;
2120116                IF AMOUNT >= PROB.LOWER_2_LIMIT AND
2121117                   AMOUNT <  PROB.LOWER_1_LIMIT THEN
2122118                BEGIN
2123119                  RESP_CHAR := 2 ;
2124120                  JUDGEMENT := 'Below Primary Range  ';
2125121                END;
2126122                IF AMOUNT >= PROB.LOWER_1_LIMIT AND
2127123                   AMOUNT <= PROB.UPPER_1_LIMIT THEN
2128124                BEGIN
2129125                  RESP_CHAR := 3 ;
2130126                  JUDGEMENT := 'Within Both Ranges   ';
2131127                END;
2132128                IF AMOUNT > PROB.UPPER_2_LIMIT THEN
2133129                BEGIN
2134130                  RESP_CHAR := 5 ;
2135131                  JUDGEMENT := 'Above Both Ranges    ';
2136132                END;
2137133                IF AMOUNT <= PROB.UPPER_2_LIMIT AND
2138134                   AMOUNT >  PROB.UPPER_1_LIMIT THEN
2139135                BEGIN
2140136                  RESP_CHAR := 4 ;
2141137                  JUDGEMENT := 'Above Primary Range  ';
2142138                END;
2143139              END;
2144140
2145141 { Just Primary Boundary present                                          }
2146142
2147143              IF PROB.BOUNDARIES = 1 THEN
2148144              BEGIN
2149145                IF AMOUNT < PROB.LOWER_1_LIMIT THEN
2150146                BEGIN
2151147                  RESP_CHAR := 6 ;
2152148                  JUDGEMENT := 'Below Range          ';
2153149                END;
2154150                IF AMOUNT > PROB.UPPER_1_LIMIT THEN
2155151                BEGIN
2156152                  RESP_CHAR := 8 ;
2157153                  JUDGEMENT := 'Above Range          ';
2158154                END;
2159155                IF AMOUNT >= PROB.LOWER_1_LIMIT AND
2160156                   AMOUNT <= PROB.UPPER_1_LIMIT THEN
2161157                BEGIN
2162158                  RESP_CHAR := 7 ;
2163159                  JUDGEMENT := 'Within Range         ';
2164160                END;
2165161              END;
2166162
2167163 { No boundaries listed                                                   }
2168164
2169165              IF PROB.BOUNDARIES = 0 THEN
2170166              BEGIN
2171167                RESP_CHAR := 9 ;
2172168                JUDGEMENT := '                     ';
2173169              END ;
2174170
2175171            END ; { not an overflow }
2176172          END; { good numeric entry }
2177173        END; { numeric entry }
2178174      END;  { non-space, non-integer response }
2179175
2180176 { For an integer question, check for "not entered" or "out of range" }
2181177
2182178       IF PROB.INT_QUEST = 'Y' THEN
2183179       BEGIN { Integer Response }
2184180         VALID := FALSE ;
2185181         IF RESPONSE = '            ' THEN
2186182         BEGIN
2187183           RESP_CHAR := -32767 ;
2188184           VALID := TRUE ;
2189185         END ELSE BEGIN
2190186           DECODE(RESPONSE, 1, STAT, RESP_CHAR);
```

```
2191187                    ENCODE(RESPONSE,1,STAT,RESP_CHAR);
2192188                    DISPLAY(VDT_BLK,LINE_COUNTER,49,RESPONSE,10);
2193189                 IF RESP_CHAR >= PROB.LOWER_1_LIMIT AND
2194190                    RESP_CHAR <= PROB.UPPER_1_LIMIT THEN VALID := TRUE
2195191                 ELSE BEGIN
2196192                    OUT_OF_RANGE := TRUE ;
2197193                    DISPLAY(VDT_BLK,LINE_COUNTER,61,
2198194                          'OUT OF RANGE         ',20);
2199195                    NUMBER := LINE_COUNTER + 1 ;
2200196                    DISPLAY(VDT_BLK,NUMBER,61,'LIMITS:         TO      ',20);
2201197                    LIMIT_INT := TRUNC(PROB.LOWER_1_LIMIT);
2202198                    ENCODE(LIMIT,1,STAT,LIMIT_INT:5);
2203199                    DISPLAY(VDT_BLK,NUMBER,68,LIMIT,5);
2204200                    LIMIT_INT := TRUNC(PROB.UPPER_1_LIMIT);
2205201                    ENCODE(LIMIT,1,STAT,LIMIT_INT:5);
2206202                    DISPLAY(VDT_BLK,NUMBER,76,LIMIT,5);
2207203                 END ;
2208204                 IF VALID THEN
2209205                 BEGIN
2210206                    JUDGEMENT := '                     ';
2211207                    NUMBER := LINE_COUNTER + 1 ;
2212208                    DISPLAY(VDT_BLK,NUMBER,61,
2213209                          '                     ',20);
2214210                 END ;
2215211             END ;
2216212         END ; { Integer Response }
2217213
2218214      END; { non-refernce response }
2219215
2220216      IF RESPONSE = '          ' AND ENTRY_REQUIRED THEN
2221217      BEGIN
2222218         VALID := FALSE ;
2223219         DISPLAY(VDT_BLK,LINE_COUNTER,61,'ENTRY REQUIRED         ',20);
2224220      END;
2225221
2226222      UNTIL VALID ;
2227223
2228224      DISPLAY(VDT_BLK,LINE_COUNTER,61,JUDGEMENT,20);
2229225
2230226 { Store response for response work file                                    }
2231227
2232228      RESP.RESPONSE := RESPONSE ;
2233229
2234    END; { RESP_ACPT }

MAP OF IDENTIFIERS FOR  RESP_ACP

IDENTIFIER NAME     KIND         SIZE         STACK              PICTURE
                                 (BYTES,BITS) DISPLACEMENT       (PACKED FIELDS ONLY)
                                 LEVEL(DISPL) (BYTE,BIT)

RESP_CHAR           PARAMETER    (2,0)        #0028     INDIRECT
RESPONSE            VARIABLE     (10,0)       #002A     DIRECT
LIMIT               VARIABLE     (6,0)        #0034     DIRECT
AMOUNT              VARIABLE     (4,0)        #003A     DIRECT
VALID               VARIABLE     (0,1)        #003E     DIRECT
OUT_OF_RANGE        VARIABLE     (0,1)        #0040     DIRECT
LIMIT_INT           VARIABLE     (2,0)        #0042     DIRECT 2235    (*-                                                                     *)
2236    BEGIN  { REFERENCE }
2237
2238  3 IF NEW_PROB THEN
2239  4 BEGIN
2240  5    SIT.SIT_NUM       := '    0';
2241  6    SIT.NEXT_SIT      := 1 ;
2242  7    SIT.PROB1_LINK    := '         ';
2243  8    SIT.PROB2_LINK    := '         ';
2244  9    SIT.PROB3_LINK    := '         ';
2245 10    SIT.PROB4_LINK    := '         ';
2246 11    SIT.NUM_ENCOUNTERS := 1 ;
2247 12    SIT.FLAG1_FUTURE  := ' ';
2248 13    SIT.FLAG2_FUTURE  := ' ';
2249 14    SIT.FLAG3_FUTURE  := ' ';
2250 15    SIT.FLAG4_FUTURE  := ' ';
```

```
2251 16       FOR T := 1 TO 80 DO
2252 17          SIT.SIT_DESCRIPTION[T] := ' ';
2253 18       SIT.AUTHOR_CODE := USER_CODE ;
2254 19       DATE(SIT.DATE_ENTERED);
2255 20       DATE(SIT.DATE_LAST_USED);
2256 21       FOR T := 1 TO 50 DO                          { ########## }
2257 22          SIT.SINC_STRING[T] := 10;
2258 23       WRITE(SITUATION,0,SIT);
     REFERENCE 2259 24       DESC.NEXT_RECORD := '   1';
2260 25       DESC.SIT_NUMBER := '    ';
2261 26       FOR T := 1 TO 80 DO
2262 27          DESC.TEXT_LINE[T] := ' ';
2263 28       WRITE(DESCRIPTION,0,DESC);
2264 29    END;
2265 30
2266 31
2267 32    IF QUESTIONS_ADDED THEN
2268 33    BEGIN
2269 34       SETNAME(WORKRESP,RESPNAME);
2270 35       CLOSE(WORKRESP);
2271 36       REWRITE(WORKRESP);
2272 37       RECORD_COUNTER := 1;
2273 38       BEGINNING_NUMBER := 1;
2274 39
2275 40  { The following sets up the screen for displaying and accepting }
2276 41  { each question (line item or data point), 15 lines at a time   }
2277 42
2278 43       READ(PROBLEM,0,PROB);
2279 44       CLEARSCREEN(VDT_BLK);
2280 45       REF_SCREEN ;
2281 46       READ(SITUATION,0,SIT);
2282 47       FOR T := 1 TO 50 DO                          { ########## }
2283 48          SIT.SINC_STRING[T] := 10;
2284 49
2285 50  {This is the loop to display and accept each question and response }
2286 51
2287 52       100 : LINE_COUNTER := 9 ;
2288 53       FOR Z := 9 TO 23 DO
2289 54       BEGIN  { line loop }
2290 55
2291 56  { The loop will end after 15 lines or unless last question is reached }
2292 57
2293 58          IF RECORD_COUNTER <> NEXT_QUESTION THEN BEGIN
2294 59
2295 60          READ(PROBLEM,RECORD_COUNTER,PROB);
2296 61          DISPLAY(VDT_BLK,LINE_COUNTER,47,' [',2);
2297 62          DISPLAY(VDT_BLK,LINE_COUNTER,59,'] ',2);
2298 63          DISPLAY(VDT_BLK,LINE_COUNTER,2,PROB.NUM_QUESTION,4);
2299 64          DISPLAY(VDT_BLK,LINE_COUNTER,7,PROB.DESC_QUESTION,30);
2300 65          DISPLAY(VDT_BLK,LINE_COUNTER,38,PROB.UNIT_DESC,10);
2301 66          IF PROB.YES_NO = 'Y' THEN YES_NO_RESP := TRUE
2302 67             ELSE YES_NO_RESP := FALSE;
2303 68          IF PROB.REQUIRED = 'Y' THEN ENTRY_REQUIRED := TRUE
2304 69             ELSE ENTRY_REQUIRED := FALSE;
2305 70          IF PROB.INT_QUEST = 'Y' THEN INTGR := TRUE
2306 71             ELSE INTGR := FALSE;
2307 72          IF PROB.REFERENCE = 'Y' THEN REFRNCE := TRUE
2308 73             ELSE REFRNCE := FALSE;
2309 74
2310 75          IF PROB.STATUS_CODE <> 'D' THEN
2311 76             RESP_ACPT (INT_JUDGEMENT_CODE)
2312 77          ELSE BEGIN
2313 78             INT_JUDGEMENT_CODE := 10 ;
2314 79             DISPLAY(VDT_BLK,LINE_COUNTER,61,'Deleted            ',20);
2315 80          END ;
2316 81
2317 82  { Store intermediate judgement character in appropriate position of
2318 83    situation string , increment record counter (for next question)
2319 84                   and go on to the next line                        }
2320 85
2321 86          SIT.SINC_STRING[RECORD_COUNTER] := INT_JUDGEMENT_CODE;
2322 87
2323 88  { Also write response to work response file for this question number }
```

```
2324  89
2325  90        WRITE(WORKRESP, RECORD_COUNTER, RESP);
2326  91        RECORD_COUNTER := RECORD_COUNTER + 1 ;
2327  92        LINE_COUNTER := LINE_COUNTER + 1 ;
2328  93
2329  94      END ;
2330  95    END; { This ends the line display and accept loop }
2331  96
2332  97  { Are the responses shown on the screen correct ?                        }
2333  98
2334  99    ACPT_YES_NO(DUMY, 24, 43, YES);
2335 100
2336 101  { If the data shown is not correct, return to "loop" for re-entry }
2337 102
2338 103    IF NOT YES THEN
2339 104    BEGIN
2340 105      RECORD_COUNTER := BEGINNING_NUMBER ;
2341 106      GOTO 100 ;
2342 107    END;
2343 108
2344 109  { If the data shown is correct and all questions are answered,      }
2345 110  {        write initial (i.e., "normal") situation record             }
2346 111
2347 112    IF NEW_PROB AND YES AND
2348 113       RECORD_COUNTER = NEXT_QUESTION THEN
2349 114         WRITE(SITUATION, 0, SIT) ;
2350 115
2351 116    IF YES AND RECORD_COUNTER <> NEXT_QUESTION THEN
2352 117    BEGIN
2353 118
2354 119  { If more questions to be answered, clear screen for next 15 resp.}
2355 120
2356 121      CLEARSCREEN(VDT_BLK);
2357 122      REF_SCREEN ,
2358 123      BEGINNING_NUMBER := BEGINNING_NUMBER + 15 ;
2359 124      GOTO 100 ;
2360 125    END ;
2361 126
2362 127  { For reinstate or added questions, if reference situation entered is
2363 128    equal to any other situation currently on file, do not add it to the
2364 129    beginning of the file                                              }
2365 130
2366 131    IF REINSTATE OR QUESTIONS_ADDED THEN
2367 132    BEGIN
2368 133      TEST_STRING := SIT.SINC_STRING ;
2369 134      READ(SITUATION, 0, SIT);
2370 135      TOTAL_SITUATIONS := SIT.NEXT_SIT ;
2371 136      TOTAL_SITUATIONS := TOTAL_SITUATIONS - 1 ;
2372 137      EQUAL := FALSE ;
2373 138      FOR T := 0 TO TOTAL_SITUATIONS DO IF NOT EQUAL THEN
2374 139      BEGIN
2375 140        READ(SITUATION, T, SIT);
2376 141        EQUAL := TRUE ;
2377 142        FOR Q := 1 TO NEXT_QUESTION DO
2378 143        BEGIN
2379 144          IF EQUAL AND TEST_STRING[Q] <> SIT.SINC_STRING[Q] THEN
2380 145            EQUAL := FALSE ;
2381 146        END ;
2382 147      END ;
2383 148      IF EQUAL THEN QUESTIONS_ADDED := FALSE ;
2384 149      SIT.SINC_STRING := TEST_STRING ;
2385 150    END ;
2386 151
2387 152    IF QUESTIONS_ADDED AND NOT NEW_PROB THEN
2388 153    BEGIN
2389 154      TEST_STRING := SIT.SINC_STRING ;
2390 155      READ(SITUATION, 0, SIT);
2391 156      SIT_NUMBER := SIT.NEXT_SIT ;
2392 157      ENCODE(SIT.SIT_NUM, 1, STAT, SIT_NUMBER:4);
2393 158      WRITE(SITUATION, SIT_NUMBER, SIT);
2394 159      NEW_SIT_NUMBER := SIT_NUMBER ;
2395 160      SIT_NUMBER := SIT_NUMBER + 1 ;
2396 161      READ(SITUATION, 0, SIT);
2397 162      SIT.NEXT_SIT := SIT_NUMBER ;
```

```
2398163         SIT.SINC_STRING := TEST_STRING ;
2399164         SIT.NUM_ENCOUNTERS := 1 ;
2400165         SIT.AUTHOR_CODE   := USER_CODE ;
2401166         DATE(SIT.DATE_ENTERED);
2402167         WRITE(SITUATION,0,SIT);
2403168
2404169  { Re-write all "normal" extra description records for new sit. }
2405170
2406171         SIT_NUMBER := SIT_NUMBER - 1 ;
2407172
2408173    END;
2409174
2410175  END; { This ends the questions added routine }
2411176
2412     END ;  { REFERENCE }
```

MAP OF IDENTIFIERS FOR REFERENC

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| JUDGEMENT | VARIABLE | (20,0) | #0028 DIRECT | |

```
2413     (*--                                                              *)
2414     BEGIN  { MAIN PROGRAM }
2415
2416
2417  4    INITSCREEN(VDT_BLK,0);
LINKED_PROBLEMS 2418  5    CLEARSCREEN(VDT_BLK);
2419  6    OVLY$(0);
2420  7
2421  8    PROB_NODE  := 'PROBLEMS';
2422  9    SIT_NODE   := 'SITUATNS';
2423 10    DESC_NODE  := 'DESCRIPT';
2424 11    RESPNAME   := 'RESPFILE';
2425 12    COMP_NODE  := 'COMPFILE';
2426 13    USER_NAME  := 'USERFILE';
2427 14    U_PROB_NAME := 'UPRBFILE';
2428 15
2429 16    DONE   := FALSE;
2430 17    CHANGE := FALSE;
2431 18    NEW_PROB  := FALSE;
2432 19    NEW_QUEST := FALSE;
2433 20    QUESTIONS_ADDED := FALSE ;
2434 21    DELETE := FALSE ;
2435 22    REINSTATE := FALSE ;
2436 23
2437 24 { Open user file and user/problem file and store number of records }
2438 25
2439 26    SETNAME(USERFILE,USER_NAME);
2440 27    SETNAME(U_PROB_FILE,U_PROB_NAME);
2441 28    IOTERM(USERFILE,OVAL,TRUE);
2442 29    EXTEND(USERFILE);
2443 30    IOTERM(U_PROB_FILE,OVAL,TRUE);
2444 31    EXTEND(U_PROB_FILE);
2445 32    READ(USERFILE,0,USER);
2446 33    DECODE(USER.NEXT_RECORD,1,STAT,USER_RECORDS);
2447 34    USER_RECORDS := USER_RECORDS - 1 ;
2448 35    READ(U_PROB_FILE,0,USER_PROB);
2449 36    DECODE(USER_PROB.NEXT_RECORD,1,STAT,U_PROB_RECORDS);
2450 37
2451 38
2452 39    DISPLAY(VDT_BLK,1,12,'P A R A D O C S    D E V E L O P M E N T',99);
2453 40    DISPLAY(VDT_BLK,1,56,'S Y S T E M',99);
2454 41    DISPLAY(VDT_BLK,2,19,'*** LINKED PROBLEM FILE MAINTENANCE ***',99);
2455 42    DISPLAY(VDT_BLK,3,6,'YOUR USER CODE : [    ]',99);
2456 43    DISPLAY(VDT_BLK,4,3,'LINKED PROBLEM CODE : ',99);
2457 44    DISPLAY(VDT_BLK,5,2,'PRIMARY PROBLEM CODE : ',99);
2458 45    DISPLAY(VDT_BLK,4,58,'NEW ?',99);
2459 46    DISPLAY(VDT_BLK,7,6,'PROBLEM NAME : ',99);
2460 47    DISPLAY(VDT_BLK,7,59,'UPDATE DATABASE ? [ ]',99);
```

```
2461 48    DISPLAY(VDT_BLK,10,8,'QUESTION NO   :',99);
2462 49    DISPLAY(VDT_BLK,10,39,'List "00" when completed',99);
2463 50    DISPLAY(VDT_BLK,11,8,'DESCRIPTION  :',99);
2464 51    DISPLAY(VDT_BLK,12,8,'YES / NO QUESTION ? ',99);
2465 52    DISPLAY(VDT_BLK,14,8,'UNIT DESCRIPTION :',99);
2466 53    DISPLAY(VDT_BLK,17,8,'REQUIRED ?',99);
2467 54    DISPLAY(VDT_BLK,17,50,'STATUS  :',99);
2468 55
2469 56    DISPLAY(VDT_BLK,4,24,'[ ',2);
2470 57    DISPLAY(VDT_BLK,5,24,'[ ',2);
2471 58    DISPLAY(VDT_BLK,7,24,'[ ',2);
2472 59    DISPLAY(VDT_BLK,10,29,'[ ',2);
2473 60    DISPLAY(VDT_BLK,11,29,'[ ',2);
2474 61    DISPLAY(VDT_BLK,12,29,'[ ',2);
2475 62    DISPLAY(VDT_BLK,14,29,'[ ',2);
2476 63    DISPLAY(VDT_BLK,17,29,'[ ',2);
2477 64    DISPLAY(VDT_BLK,4,66,'[ ',2);
2478 65
2479 66    DISPLAY(VDT_BLK,4,33,'] ',2);
2480 67    DISPLAY(VDT_BLK,5,33,'] ',2);
2481 68    DISPLAY(VDT_BLK,7,55,'] ',2);
2482 69    DISPLAY(VDT_BLK,10,32,'] ',2);
2483 70    DISPLAY(VDT_BLK,11,60,'] ',2);
2484 71    DISPLAY(VDT_BLK,12,31,'] ',2);
2485 72    DISPLAY(VDT_BLK,14,40,'] ',2);
2486 73    DISPLAY(VDT_BLK,17,31,'] ',2);
2487 74    DISPLAY(VDT_BLK,4,68,'] ',2);
2488 75
2489 76
2490 77    DONE := FALSE ;
2491 78    ERROR_STATUS := TRUE ;
2492 79
2493 80  ( The following accepts a valid user code and checks to make sure
2494 81    the user is a mentor                                                }
2495 82
2496 83    REPEAT
2497 84      CHECK_CODE(3,25,DONE,ERROR_STATUS,USER_RCD_NUMBER);
2498 85      IF ERROR_STATUS THEN
2499 86        DISPLAY(VDT_BLK,3,41,'This user code is not valid    ',99)
2500 87      ELSE DISPLAY(VDT_BLK,3,16,'NAME:                ',99);
2501 88    UNTIL DONE OR NOT ERROR_STATUS;
2502 89
2503 90  ( The following routine accepts a problem file name, checks to see if
2504 91    it exists, and creates it if the operator says "Y" to "NEW?" and if
2505 92    the name is acceptable - cannot begin with space or number and
2506 93    cannot have special characters embedded; the system also checks
2507 94    to make sure that any problem which is to be modified "belongs"
2508 95    to this mentor and not to someone else                              }
2509 96
2510 97    IF NOT DONE THEN REPEAT
2511 98      DUMY := 'Y';
2512 99      ACCEPT(VDT_BLK,4,25,PROBLEM_FILE,8,T);
2513 100
2514 101     IF PROBLEM_FILE = '        ' THEN DONE := TRUE ;
2515 102
2516 103 ( If all spaces entered, then terminate program                        }
2517 104
2518 105     IF NOT DONE THEN
2519 106     BEGIN
2520 107       SETMEMBER(PROBLEM,PROB_NODE,PROBLEM_FILE);
2521 108       IOTERM(PROBLEM,OVAL,FALSE);
2522 109       RESET(PROBLEM);
2523 110
2524 111 ( Check to make sure this is a secondary problem and display primary
2525 112   problem code and description                                        }
2526 113
2527 114       IF STATUS(PROBLEM) = 0 THEN
2528 115       BEGIN
2529 116         READ(PROBLEM,0,PROB);
2530 117         IF PROB.PRIMARY_CODE = '       ' THEN
2531 118         BEGIN
2532 119           DISPLAY(VDT_BLK,5,41,
2533 120             'This is a primary problem code    ',99);
2534 121           DUMY := 'N' ;
```

```
2535122              END ELSE
2536123              BEGIN
2537124                 DISPLAY(VDT_BLK,5,25,PROB.PRIMARY_CODE,8);
2538125                 CLOSE(CPY_PROB);
2539126                 SETMEMBER(CPY_PROB,PROB_NODE,PROB.PRIMARY_CODE);
2540127                 IOTERM(CPY_PROB,OVAL,TRUE);
2541128                 EXTEND(CPY_PROB);
2542129                 READ(CPY_PROB,0,PROB);
2543130                 DISPLAY(VDT_BLK,5,41,PROB.DESCRIPTION,30);
2544131                 CLOSE(CPY_PROB);
2545132                 READ(PROBLEM,0,PROB);
2546133              END ,
2547134           END ;
2548135
2549136 { If problem does not exist, find out if a new one should be created }
2550137
2551138        IF STATUS(PROBLEM) <> 0 THEN
2552139        BEGIN
2553140           ACPT_YES_NO(DUMY,4,67,YES);
2554141           IF YES THEN DUMY := 'Y';
2555142           IF DUMY = 'Y' THEN
2556143           BEGIN
2557144              EXTEND(PROBLEM);
2558145              IF STATUS(PROBLEM) = 0 THEN
2559146              BEGIN
2560147                 PROB.NEXT_QUESTION := 1 ;
2561148                 REPEAT
2562149                    ACCEPT(VDT_BLK,7,25,PROB.DESCRIPTION,30,T);
2563150                 UNTIL PROB.DESCRIPTION[1] <> ' ';
2564151                 ACPT_YES_NO(PROB.DATA_BASE,7,78,DATA_BSE);
2565152
2566153                 PROB.PROBLEM_CODE  := PROBLEM_FILE ;
2567154                 PROB.INT_QUESTIONS := 0 ;
2568155                 PROB.TIMES_USED    := 0 ;
2569156                 PROB.NUM_SITUATIONS := 1 ;
2570157                 PROB.PRIMARY_CODE  := 'XXXXXXXX';
2571158                 DATE(PROB.DATE_ENTERED);
2572159                 DATE(PROB.DATE_LAST_USED);
2573160                 PROB.MENTOR_CODE   := USER_CODE ;
2574161                 PROB.MINIMUM_LI    := 25 ;
2575162                 PROB.TOPIC_CODE    := '         ';          {##########}
2576163                 PROB.CALC_LI_FLAG  := 'N' ;
2577164                 PROB.FLAG1_FUTURE  := ' ' ;
2578165                 PROB.FLAG2_FUTURE  := ' ' ;
2579166                 PROB.FLAG3_FUTURE  := ' ' ;
2580167                 WRITE(PROBLEM,0,PROB),
2581168                 NEW_PROB := TRUE;
2582169
2583170              END
2584171              ELSE DUMY := 'N';
2585172           END;
2586173        END;
2587174     END;
2588175  UNTIL DUMY = 'Y';
2589176
2590177  IF NOT DONE THEN
2591178  BEGIN
2592179
2593180  CLOSE(PROBLEM),
2594181  IOTERM(PROBLEM,OVAL,TRUE);
2595182  EXTEND(PROBLEM);
2596183
2597184 { Open up situation and description files                            }
2598185
2599186  SETMEMBER(SITUATION,SIT_NODE,PROBLEM_FILE);
2600187  IOTERM(SITUATION,OVAL,FALSE);
2601188  EXTEND(SITUATION);
2602189
2603190  SETMEMBER(DESCRIPTION,DESC_NODE,PROBLEM_FILE);
2604191  IOTERM(DESCRIPTION,OVAL,FALSE);
2605192  EXTEND(DESCRIPTION);
2606193
2607194  READ(PROBLEM,0,PROB);
2608195  DISPLAY(VDT_BLK,7,25,PROB.DESCRIPTION,30);
```

```
2609196     DUMMY[1] := PROB.DATA_BASE ;
2610197     DISPLAY(VDT_BLK,7,78,DUMMY,1);
2611198     CALC_FLAG := PROB.CALC_LI_FLAG ;
2612199
2613200  { Accept valid primary problem code for a new secondary problem       }
2614201
2615202     IF NEW_PROB THEN
2616203     BEGIN
2617204        VALID_PRIMARY := FALSE ;
2618205        REPEAT
2619206           ACCEPT(VDT_BLK,5,25,PRIMARY_CODE,8,T);
2620207           CLOSE(CPY_PROB);
2621208           SETMEMBER(CPY_PROB,PROB_NODE,PRIMARY_CODE);
2622209           IOTERM(CPY_PROB,OVAL,FALSE);
2623210           RESET(CPY_PROB);
2624211           IF STATUS(CPY_PROB) = 0 THEN
2625212           BEGIN
2626213              READ(CPY_PROB,0,PROB);
2627214              IF PROB.PRIMARY_CODE <> '          ' THEN
2628215                 DISPLAY(VDT_BLK,5,41,'This is not a primary problem ',99)
2629216              ELSE BEGIN
2630217                 DISPLAY(VDT_BLK,5,41,PROB.DESCRIPTION,30);
2631218                 MENTOR_CODE := PROB.MENTOR_CODE ;
2632219                 VALID_PRIMARY := TRUE ;
2633220                 READ(PROBLEM,0,PROB);
2634221                 PROB.PRIMARY_CODE := PRIMARY_CODE ;
2635222                 PROB.MENTOR_CODE  := MENTOR_CODE ;
2636223                 WRITE(PROBLEM,0,PROB);
2637224
2638225  { Add only a "mentor" record to the User/Problem file                  }
2639226
2640227                 USER_PROB.USER_CODE    := MENTOR_CODE ;
2641228                 USER_PROB.PROBLEM_CODE := PROBLEM_FILE ;
2642229                 USER_PROB.STATUS_CODE  := 'M' ;
2643230                 WRITE(U_PROB_FILE,U_PROB_RECORDS,USER_PROB);
2644231                 U_PROB_RECORDS := U_PROB_RECORDS + 1 ;
2645232                 READ(U_PROB_FILE,0,USER_PROB);
2646233                 ENCODE(USER_PROB.NEXT_RECORD,1,STAT,U_PROB_RECORDS:4);
2647234                 WRITE(U_PROB_FILE,0,USER_PROB);
2648235
2649236              END ;
2650237
2651238           END ELSE DISPLAY(VDT_BLK,5,41,'This is not a valid code     ',
2652239                                                                      99);
2653240        UNTIL VALID_PRIMARY ;
2654241        CLOSE(CPY_PROB);
2655242
2656243  { For a new problem, allow "copying" of any existing primary or
2657244    secondary code (problem, situation and description files)            }
2658245
2659246        CPY_PROBLEM ;
2660247        READ(PROBLEM,0,PROB);
2661248        DISPLAY(VDT_BLK,7,25,PROB.DESCRIPTION,30);
2662249
2663250     END ;
2664251
2665252
2666253  { Check for delete or reinstate if accessing an existing problem       }
2667254
2668255     IF NOT NEW_PROB THEN
2669256     BEGIN
2670257        READ(PROBLEM,0,PROB);
2671258        REPEAT
2672259           ACCEPT(VDT_BLK,7,25,PROB.DESCRIPTION,30,T);
2673260        UNTIL PROB.DESCRIPTION[1] <> ' ';
2674261        ACPT_YES_NO(PROB.DATA_BASE,7,78,DATA_BSE);
2675262        WRITE(PROBLEM,0,PROB);
2676263        DISPLAY(VDT_BLK,8,8,'DO YOU WISH TO DELETE OR REINSTATE A ',99);
2677264        DISPLAY(VDT_BLK,8,45,'QUESTION ?    [ ] ',99);
2678265        ACPT_YES_NO(DUMY,8,59,YES);
2679266        IF YES THEN
2680267        BEGIN
2681268           DISPLAY(VDT_BLK,8,67,'DELETE ?  [ ] ',99);
2682269           ACPT_YES_NO(DUMY,8,78,YES);
```

```
2683270        IF YES THEN DELETE := TRUE ELSE REINSTATE := TRUE ;
2684271      END ;
2685272    END ;
2686273
2687274  { Files are open, repeat question entry until "OO" response          }
2688275
2689276    OVLY$(1);
2690277    QUESTIONS ;
2691278
2692279  { The following section will only be used if this is a new problem,
2693280    if there has been additional questions added to an existing prob-
2694281    lem, or if one or more questions have been reinstated              }
2695282
2696283    DONE := FALSE;
2697284
2698285      { The relative SITUATION file is now open and the following
2699286        routine will initialize the data record for a new problem
2700287        plus capture the inital interpretation(s) in the sequential
2701288                   DESCRIPTION file                                      }
2702289
2703290    OVLY$(2) ;
2704291    REFERENCE ;
2705292
2706293    IF NEW_PROB OR QUESTIONS_ADDED THEN
2707294    BEGIN
2708295
2709296  { Capture description of "normal" interpretation and display old
2710297    reference description if this is a reinstate or added questions   }
2711298
2712299      OVLY$(3) ;
2713300      LINK_DESC ;
2714301
2715302    END ;
2716303
2717304    END ;   { IF NOT DONE THEN }
2718305
2719      END.
```

MAP OF IDENTIFIERS FOR  LINKED_P

| IDENTIFIER NAME | KIND | SIZE (BYTES,BITS) LEVEL(DISPL) | STACK DISPLACEMENT (BYTE,BIT) | PICTURE (PACKED FIELDS ONLY) |
|---|---|---|---|---|
| PROB_RECORD | RECORD | (96,0) | | |
| PROBLEM_CODE | FIELD | (8,0) | (0,0) | UNPACKED |
| DESCRIPTION | FIELD | (30,0) | (8,0) | UNPACKED |
| NEXT_QUESTION | FIELD | (2,0) | (38,0) | UNPACKED |
| INT_QUESTIONS | FIELD | (2,0) | (40,0) | UNPACKED |
| TIMES_USED | FIELD | (2,0) | (42,0) | UNPACKED |
| TOPIC_CODE | FIELD | (8,0) | (44,0) | UNPACKED |
| DATE_ENTERED | FIELD | (8,0) | (52,0) | UNPACKED |
| DATE_LAST_USED | FIELD | (8,0) | (60,0) | UNPACKED |
| MENTOR_CODE | FIELD | (6,0) | (68,0) | UNPACKED |
| NUM_SITUATIONS | FIELD | (2,0) | (74,0) | UNPACKED |
| MINIMUM_LI | FIELD | (2,0) | (76,0) | UNPACKED |
| CALC_LI_FLAG | FIELD | (0,8) | (78,0) | UNPACKED |
| FLAG1_FUTURE | FIELD | (0,8) | (80,0) | UNPACKED |
| FLAG2_FUTURE | FIELD | (0,8) | (82,0) | UNPACKED |
| FLAG3_FUTURE | FIELD | (0,8) | (84,0) | UNPACKED |
| DATA_BASE | FIELD | (0,8) | (86,0) | UNPACKED |
| PRIMARY_CODE | FIELD | (8,0) | (88,0) | UNPACKED |
| NUM_QUESTION | FIELD | (2,0) | (0,0) | UNPACKED |
| DESC_QUESTION | FIELD | (30,0) | (2,0) | UNPACKED |
| YES_NO | FIELD | (0,8) | (32,0) | UNPACKED |
| CALCULATE | FIELD | (0,8) | (34,0) | UNPACKED |
| INT_QUEST | FIELD | (0,8) | (36,0) | UNPACKED |
| REFERENCE | FIELD | (0,8) | (38,0) | UNPACKED |
| UNIT_DESC | FIELD | (10,0) | (40,0) | UNPACKED |

| | | | | |
|---|---|---|---|---|
| BOUNDARIES | FIELD | (2,0) | (50,0) | UNPACKED |
| LOWER_1_LIMIT | FIELD | (4,0) | (52,0) | UNPACKED |
| UPPER_1_LIMIT | FIELD | (4,0) | (56,0) | UNPACKED |
| LOWER_2_LIMIT | FIELD | (4,0) | (60,0) | UNPACKED |
| UPPER_2_LIMIT | FIELD | (4,0) | (64,0) | UNPACKED |
| REQUIRED | FIELD | (0,8) | (68,0) | UNPACKED |
| LGCL_IMPT | FIELD | (2,0) | (70,0) | UNPACKED |
| EXPT_IMPT | FIELD | (2,0) | (72,0) | UNPACKED |
| LGCL_INTR | FIELD | (2,0) | (74,0) | UNPACKED |
| EXPT_INTR | FIELD | (2,0) | (76,0) | UNPACKED |
| LGCL_CMPL | FIELD | (2,0) | (78,0) | UNPACKED |
| EXPT_CMPL | FIELD | (2,0) | (80,0) | UNPACKED |
| STATUS_CODE | FIELD | (0,8) | (82,0) | UNPACKED |
| SORT_FLAG | FIELD | (0,8) | (84,0) | UNPACKED |
| FLAG6_FUTURE | FIELD | (0,8) | (86,0) | UNPACKED |
| FLAG7_FUTURE | FIELD | (0,8) | (88,0) | UNPACKED |
| FLAG8_FUTURE | FIELD | (0,8) | (90,0) | UNPACKED |
| SIT_RECORD | RECORD | (250,0) | | |
| SIT_NUM | FIELD | (4,0) | (0,0) | UNPACKED |
| SIT_DESCRIPTION | | | | |
| | FIELD | (80,0) | (4,0) | UNPACKED |
| NEXT_SIT | FIELD | (2,0) | (84,0) | UNPACKED |
| PROB1_LINK | FIELD | (8,0) | (86,0) | UNPACKED |
| PROB2_LINK | FIELD | (8,0) | (94,0) | UNPACKED |
| PROB3_LINK | FIELD | (8,0) | (102,0) | UNPACKED |
| PROB4_LINK | FIELD | (8,0) | (110,0) | UNPACKED |
| AUTHOR_CODE | FIELD | (6,0) | (118,0) | UNPACKED |
| DATE_ENTERED | FIELD | (8,0) | (124,0) | UNPACKED |
| DATE_LAST_USED | | | | |
| | FIELD | (8,0) | (132,0) | UNPACKED |
| NUM_ENCOUNTERS | | | | |
| | FIELD | (2,0) | (140,0) | UNPACKED |
| SINC_STRING | FIELD | (100,0) | (142,0) | UNPACKED |
| FLAG1_FUTURE | FIELD | (0,8) | (242,0) | UNPACKED |
| FLAG2_FUTURE | FIELD | (0,8) | (244,0) | UNPACKED |
| FLAG3_FUTURE | FIELD | (0,8) | (246,0) | UNPACKED |
| FLAG4_FUTURE | FIELD | (0,8) | (248,0) | UNPACKED |
| DESC_RECORD | RECORD | (88,0) | | |
| NEXT_RECORD | FIELD | (4,0) | (0,0) | UNPACKED |
| SIT_NUMBER | FIELD | (4,0) | (4,0) | UNPACKED |
| TEXT_LINE | FIELD | (80,0) | (8,0) | UNPACKED |
| USER_RECORD | RECORD | (202,0) | | |
| NEXT_RECORD | FIELD | (4,0) | (0,0) | UNPACKED |
| USER_CODE | FIELD | (6,0) | (4,0) | UNPACKED |
| USER_NAME | FIELD | (30,0) | (10,0) | UNPACKED |
| USER_TITLE | FIELD | (30,0) | (40,0) | UNPACKED |
| ADDRESS1 | FIELD | (30,0) | (70,0) | UNPACKED |
| ADDRESS2 | FIELD | (30,0) | (100,0) | UNPACKED |
| ADDRESS3 | FIELD | (30,0) | (130,0) | UNPACKED |
| PHONE | FIELD | (12,0) | (160,0) | UNPACKED |
| MAX_STATUS | FIELD | (0,8) | (172,0) | UNPACKED |
| PRINTER | FIELD | (0,8) | (174,0) | UNPACKED |
| NUM_PROBLEMS | FIELD | (4,0) | (176,0) | UNPACKED |
| DATE_ENTERED | FIELD | (8,0) | (180,0) | UNPACKED |
| DATE_LAST_USED | | | | |
| | FIELD | (8,0) | (188,0) | UNPACKED |
| TOTAL_TIMES | FIELD | (5,0) | (176,0) | UNPACKED |
| USER_PROBLEM_RECORD | | | | |
| | RECORD | (24,0) | | |
| NEXT_RECORD | FIELD | (4,0) | (0,0) | UNPACKED |
| USER_CODE | FIELD | (5,0) | (4,0) | UNPACKED |
| PROBLEM_CODE | FIELD | (8,0) | (10,0) | UNPACKED |
| STATUS_CODE | FIELD | (0,3) | (13,0) | UNPACKED |
| TIMES_USED | FIELD | (4,0) | (20,0) | UNPACKED |
| RESP_RECORD | RECORD | (10,0) | | |
| RESPONSE | FIELD | (10,0) | (0,0) | UNPACKED |
| COMP_RECORD | RECORD | (82,0) | | |
| RCD_NUMBER | FIELD | (2,0) | (0,0) | UNPACKED |
| FORMULA | FIELD | (80,0) | (2,0) | UNPACKED |
| CPY_PROB | VARIABLE | (32,0) | #0080 | DIRECT |
| CPY_SIT | VARIABLE | (32,0) | #00A0 | DIRECT |
| CPY_DESC | VARIABLE | (32,0) | #00C0 | DIRECT |
| CPY_COMP | VARIABLE | (32,0) | #00E0 | DIRECT |

| | | | | |
|---|---|---|---|---|
| WORKRESP | VARIABLE | (32,0) | #0100 | DIRECT |
| COMPFILE | VARIABLE | (32,0) | #0120 | DIRECT |
| RESP | VARIABLE | (10,0) | #0140 | DIRECT |
| COMP | VARIABLE | (32,0) | #014A | DIRECT |
| PROBLEM | VARIABLE | (32,0) | #019C | DIRECT |
| SITUATION | VARIABLE | (32,0) | #01BC | DIRECT |
| DESCRIPTION | VARIABLE | (32,0) | #01DC | DIRECT |
| USERFILE | VARIABLE | (32,0) | #01FC | DIRECT |
| U_PROB_FILE | VARIABLE | (32,0) | #021C | DIRECT |
| USER | VARIABLE | (202,0) | #023C | DIRECT |
| USER_PROB | VARIABLE | (24,0) | #0306 | DIRECT |
| PROB | VARIABLE | (96,0) | #031E | DIRECT |
| SIT | VARIABLE | (250,0) | #037E | DIRECT |
| DESC | VARIABLE | (88,0) | #0478 | DIRECT |
| USER_CODE | VARIABLE | (6,0) | #04D0 | DIRECT |
| USER_RECORDS | VARIABLE | (2,0) | #04D6 | DIRECT |
| U_PROB_RECORDS | VARIABLE | (2,0) | #04D8 | DIRECT |
| USER_NAME | VARIABLE | (8,0) | #04DA | DIRECT |
| U_PROB_NAME | VARIABLE | (8,0) | #04E2 | DIRECT |
| PROBLEM_FILE | VARIABLE | (8,0) | #04EA | DIRECT |
| DESC_NODE | VARIABLE | (8,0) | #04F2 | DIRECT |
| PROB_NODE | VARIABLE | (8,0) | #04FA | DIRECT |
| SIT_NODE | VARIABLE | (8,0) | #0502 | DIRECT |
| VDT_BLK | VARIABLE | (32,0) | #050A | DIRECT |
| RESPNAME | VARIABLE | (8,0) | #052A | DIRECT |
| COMP_NODE | VARIABLE | (8,0) | #0532 | DIRECT |
| CALC_FLAG | VARIABLE | (0,8) | #053A | DIRECT |
| T | VARIABLE | (0,8) | #053C | DIRECT |
| DUMY | VARIABLE | (0,8) | #053E | DIRECT |
| NUMBER | VARIABLE | (2,0) | #0540 | DIRECT |
| PROB_RCD_NUMBER | VARIABLE | (2,0) | #0542 | DIRECT |
| USER_RCD_NUMBER | VARIABLE | (2,0) | #0544 | DIRECT |
| RECORD_COUNTER | VARIABLE | (2,0) | #0546 | DIRECT |
| LINE_COUNTER | VARIABLE | (2,0) | #0548 | DIRECT |
| QUEST_NUMBER | VARIABLE | (2,0) | #054A | DIRECT |
| NEXT_QUESTION | VARIABLE | (2,0) | #054C | DIRECT |
| INT_JUDGEMENT_CODE | | | | |
| | VARIABLE | (2,0) | #054E | DIRECT |
| TOTAL_QUESTIONS | VARIABLE | (2,0) | #0550 | DIRECT |
| INT_QUESTIONS | VARIABLE | (2,0) | #0552 | DIRECT |
| YES | VARIABLE | (0,1) | #0554 | DIRECT |
| CHANGE | VARIABLE | (0,1) | #0556 | DIRECT |
| OVAL | VARIABLE | (0,1) | #0558 | DIRECT |
| ERROR_STATUS | VARIABLE | (0,1) | #055A | DIRECT |
| NEW_QUEST | VARIABLE | (0,1) | #055C | DIRECT |
| NEW_PROB | VARIABLE | (0,1) | #055E | DIRECT |
| INTGR | VARIABLE | (0,1) | #0560 | DIRECT |
| REFRNCE | VARIABLE | (0,1) | #0562 | DIRECT |
| CALCULATE | VARIABLE | (0,1) | #0564 | DIRECT |
| DONE | VARIABLE | (0,1) | #0566 | DIRECT |
| COMPARE_REQUIRED | | | | |
| | VARIABLE | (0,1) | #0568 | DIRECT |
| ALL_SET | VARIABLE | (0,1) | #056A | DIRECT |
| ENTRY_REQUIRED | VARIABLE | (0,1) | #056C | DIRECT |
| YES_NO_RESP | VARIABLE | (0,1) | #056E | DIRECT |
| EQUAL | VARIABLE | (0,1) | #0570 | DIRECT |
| QUESTIONS_ADDED | VARIABLE | (0,1) | #0572 | DIRECT |
| MINIMUM | VARIABLE | (2,0) | #0574 | DIRECT |
| SIT_NUMBER | VARIABLE | (2,0) | #0576 | DIRECT |
| BEGINNING_NUMBER | | | | |
| | VARIABLE | (2,0) | #0578 | DIRECT |
| STAT | VARIABLE | (2,0) | #057A | DIRECT |
| NEW_SIT_NUMBER | VARIABLE | (2,0) | #057C | DIRECT |
| TOTAL_SITUATIONS | | | | |
| | VARIABLE | (2,0) | #057E | DIRECT |
| ASCII_NUMBER | VARIABLE | (6,0) | #0580 | DIRECT |
| DUMMY | VARIABLE | (2,0) | #0586 | DIRECT |
| DATA_BSE | VARIABLE | (0,1) | #0588 | DIRECT |

```
DELETE          VARIABLE    (0,1)       #058A       DIRECT
REINSTATE       VARIABLE    (0,1)       #058C       DIRECT
SKIP_ENTRY      VARIABLE    (0,1)       #058E       DIRECT
TEST_STRING     VARIABLE    (100,0)     #0590       DIRECT
RESP_STRING     VARIABLE    (10,0)      #05F4       DIRECT
CPY_FILE_NAME   VARIABLE    (8,0)       #05FE       DIRECT
PRIMARY_CODE    VARIABLE    (8,0)       #0606       DIRECT
MENTOR_CODE     VARIABLE    (6,0)       #060E       DIRECT
VALID_PRIMARY   VARIABLE    (0,1)       #0614       DIRECT
```

MAXIMUM NUMBER OF IDENTIFIERS USED = 250
OPTIMIZATION SUMMARY

DXPSCL 1.7.1 81.254    OPTIMIZATION SUMMARY

"ACPT_YES" -- 5500 HEAP BYTES REQUIRED TO OPTIMIZE AT LEVEL 1

"CHECK_CO" -- 6400 HEAP BYTES REQUIRED TO OPTIMIZE AT LEVEL 1

"CLEAR_LI" -- 5000 HEAP BYTES REQUIRED TO OPTIMIZE AT LEVEL 1

"CPY_PROB" -- 9400 HEAP BYTES REQUIRED TO OPTIMIZE AT LEVEL 1

"NUMERIC_" -- 5200 HEAP BYTES REQUIRED TO OPTIMIZE AT LEVEL 1

"CHANGE_D" -- 5600 HEAP BYTES REQUIRED TO OPTIMIZE AT LEVEL 1

"LINK_DES" -- 10400 HEAP BYTES REQUIRED TO OPTIMIZE AT LEVEL 1

"ASSUME_N" -- 5700 HEAP BYTES REQUIRED TO OPTIMIZE AT LEVEL 1

4 REDUNDANT COMMON SUBEXPRESSIONS ELIMINATED IN "BOUNDARI"
"BOUNDARI" -- 9000 HEAP BYTES REQUIRED TO OPTIMIZE AT LEVEL 1

6 REDUNDANT COMMON SUBEXPRESSIONS ELIMINATED IN "QST_CALC"
"QST_CALC" -- 17700 HEAP BYTES REQUIRED TO OPTIMIZE AT LEVEL 1

6 REDUNDANT COMMON SUBEXPRESSIONS ELIMINATED IN "QUESTION"
"QUESTION" -- 15600 HEAP BYTES REQUIRED TO OPTIMIZE AT LEVEL 1

"REF_SCRE" -- 6000 HEAP BYTES REQUIRED TO OPTIMIZE AT LEVEL 1

4 REDUNDANT COMMON SUBEXPRESSIONS ELIMINATED IN "CALC_RES"
"CALC_RES" -- 11700 HEAP BYTES REQUIRED TO OPTIMIZE AT LEVEL 1

"RESP_ACP" -- 11100 HEAP BYTES REQUIRED TO OPTIMIZE AT LEVEL 1

1 REDUNDANT COMMON SUBEXPRESSIONS ELIMINATED IN "REFERENC"
"REFERENC" -- 10900 HEAP BYTES REQUIRED TO OPTIMIZE AT LEVEL 1

"LINKED_P" -- 16300 HEAP BYTES REQUIRED TO OPTIMIZE AT LEVEL 1

```
INSTRUCTIONS =   56
ACPT_YES  LITERALS =    98   CODE =    214   DATA =    112

INSTRUCTIONS =   96
CHECK_CO  LITERALS =    78   CODE =    394   DATA =     58

INSTRUCTIONS =   22
CLEAR_LI  LITERALS =    24   CODE =     94   DATA =    124

INSTRUCTIONS =  474
CPY_PROB  LITERALS =   232   CODE =   2030   DATA =     50

INSTRUCTIONS =   29
NUMERIC   LITERALS =    50   CODE =    100   DATA =     86

INSTRUCTIONS =   81
CHANGE_D  LITERALS =    32   CODE =    366   DATA =     52

INSTRUCTIONS =  514
LINK_DES  LITERALS =   492   CODE =   2290   DATA =   1224
```

```
INSTRUCTIONS =     71
ASSUME_N  LITERALS =    104   CODE =    284    DATA =    112

INSTRUCTIONS =    586
BOUNDARI  LITERALS =    146   CODE =   2622    DATA =     42

INSTRUCTIONS =   1025
QST_CALC  LITERALS =    684   CODE =   4338    DATA =    192

INSTRUCTIONS =   1062
QUESTION  LITERALS =    742   CODE =   4732    DATA =     46

INSTRUCTIONS =    141
REF_SCRE  LITERALS =    334   CODE =    740    DATA =     44

INSTRUCTIONS =    497
CALC_RES  LITERALS =     90   CODE =   2038    DATA =    102

INSTRUCTIONS =    652
RESP_ACP  LITERALS =    508   CODE =   2686    DATA =     70

INSTRUCTIONS =    449
REFERENC  LITERALS =    128   CODE =   1896    DATA =     70

INSTRUCTIONS =   1295
LINKED_P  LITERALS =    760   CODE =   5940    DATA =   1562
```

I claim:

1. A method for making decisions within a problem sphere comprising the steps of:
   (a) defining the logical sphere of the problem by capturing descriptive information according to parameters supplied by an expert who acts as a mentor;
   (b) characterizing each unique situation in terms of intermediate judgments about each parameter so defined;
   (c) assessing the relative logical and experiential importance of each intermediate judgment;
   (d) subdivding the intermediate judgments into classes of major importance and minor importance;
   (e) identifying a presented example as being logically identical to previously encountered situations in a given fraction of its intermdiate judgments.

2. The method of claim 1 wherein step (e) comprises identifying a presented example as being logically iddentical to a previously encountered situation by comparing the presented example with a judgment base consisting of stored intermediate judgments.

3. The method of claim 1 wherein step (e) comprises identifying a presented example as being logically identical to a previously encountered situation in only its major intermediate judgments by comparing the presented example with a judgment base consisting of stored intermediate judgments.

4. The method of claim 1 wherein step (e) comprises identifying a presented example as being logically identical to a previously encountered situation in a given fraction of its major intermediate judgments by comparing the presented example with a judgment base consisting of stored intermediate judgments.

5. The method of claim 1 or of claim 2 or of claim 3 or of claim 4 further comprising the steps of:
   (f) describing the logical differences between a presented example and previously encountered situations in terms of those intermediate judgments which differ;
   (g) Accepting from the mentor verification of an interpretation;
   (h) accepting an interpretation from the mentor where no interpretation can be derived; and
   (i) storing the accumulated logically unique intermediate judgments representative of presented situations in a judgment base without storing the input data values thereof.

6. The decisional method of claim 5 wherein the structure of the stored judgment base is reported by defining each situation in terms of its differences from a common reference state.

7. The decisional method of claim 5 wherein the structure of the stored judgment base is reported by producing a decision-tree algorithmic model.

8. A method for generating an output decision state from a paramorphic model of a decisional process in which a presented situation is transduced into intermediate judgments representative of the presented situation according to parameterization given by a mentor expressing the data in terms of individual data types, data units, data requirements, and data ranges comprising the steps of:
   (a) attempting to identify a presented example as being logically identical to a previously encountered situation by comparing all of the intermediate judgments representative of the presented situation with the judgment base of the paramorphic model;
      (1) if a logically identical situation is found, generating an output decision state; and
      (2) if no logically identical situation comprising all of the intermediate judgments representative of the presented situation is found in the judgment base, attempting to identify the presented example as being logically identical to a previously encountered situation in only its intermediate judgments of major logical significance;
   (b) if a situation which is logically identical in only a intermediate judgments of major logical significance is found, generating an internal decision state from the paramorphic model, displaying the internal decision state together with its differences from the output decision state of closest logical significance, requesting verification of the internal decision state from the mentor, augmenting the judgment base, and then repeating the attempt of (a); and (1) if no logically identical situation comprising intermediate judgments of major logical significance representative of the presented situation is found in the judgment base, attempting to identify the presented example as being logically identical to a previously encountered situation in percentage of the intermediate judgments of major logical significance and (2) if a situation which is logically identical in only a percentage of intermediate judgments of major logical significance is found, generating an internal decision state from the paramorphic model, displaying the internal decision state together with its differences from the output decision state of closest logical significance, requesting verification of the internal decision state from the mentor, augmenting the judgment base, and then repeating the attempt of (a) and (c) if no logically identical situation is found in the judgment base, requesting an interpretation of the presented situation from the mentor, storing the interpretation, and, (1) reporting a stored interpretation of the output decision state if a logically identical situation is found.

9. The method of claim 8 which includes recalculation of all values within the judgment base and re-storage of the judgment base, and repeating the logical identical situation attempt of (a)(1).

10. A system for making decisions based on a set of intermediate judgments about a given situation comprising:

(a) means for capturing descriptive information according to parameters supplied by an expert who acts as a mentor, such information being characterized in terms of intermediate judgments;

(b) means for assessing the relative logical and experiental importance of each intermediate judgment;

(c) means for subdividing the intermediate judgments into classes of major and minor importance; and (d) means for identifying a presented example as being logically identical to a previously encountered situation in a given fraction of its intermediate judgments.

11. The system of claim 10 wherein said identifying means includes means for identifying a presented example as being logically identical to a previously encountered situation.

12. The system of claim 10 wherein said identifying means includes means for identifying a presented example as being logically identical to a previously encountered situation in only its major intermediate judgments.

13. The method of claim 10 wherein said identifying means includes means for identifying a presented example as being logically identical to a previously encountered situation in a given fraction of its major intermediate judgments.

14. The system of claim 10 or of claim 11 or of claim 12 or of claim 13 further comprising:

(e) means for describing the differences between a presented example and the previously encountered situation of closest logical significance;

(f) means for accepting from the mentor verification of an interpretation;

(g) means for accepting an interpretation from the mentor where no interpretation can be derived;

(h) means for storing the accumulated logically unique intermediate judgments representative of presented situations in a judgment base.

* * * * *

UNITED STATES PATENT AND TRADEMARK OFFICE
CERTIFICATE OF CORRECTION

PATENT NO. : 4,595,982
DATED : June 17, 1986
INVENTOR(S) : Frank N. Burt

It is certified that error appears in the above—identified patent and that said Letters Patent is hereby corrected as shown below:

At col. 7, Line 16 insert

-- © 1983 F. N. Burt as an unpublished work. --

Signed and Sealed this

Twenty-seventh Day of October, 1987

Attest:

DONALD J. QUIGG

Attesting Officer

Commissioner of Patents and Trademarks